US011282139B1

(12) United States Patent
Winklevoss et al.

(10) Patent No.: US 11,282,139 B1
(45) Date of Patent: Mar. 22, 2022

(54) SYSTEMS, METHODS, AND PROGRAM PRODUCTS FOR VERIFYING DIGITAL ASSETS HELD IN A CUSTODIAL DIGITAL ASSET WALLET

(71) Applicant: Gemini IP, LLC, New York, NY (US)

(72) Inventors: Cameron Howard Winklevoss, New York, NY (US); Tyler Howard Winklevoss, New York, NY (US); Eric Winer, New York, NY (US); Daniel William Halley James, Brooklyn, NY (US)

(73) Assignee: Gemini IP, LLC, New York, NY (US)

( * ) Notice: Subject to any disclaimer, the term of this patent is extended or adjusted under 35 U.S.C. 154(b) by 756 days.

(21) Appl. No.: 15/920,042

(22) Filed: Mar. 13, 2018

Related U.S. Application Data

(63) Continuation-in-part of application No. 15/847,096, filed on Dec. 19, 2017, now Pat. No. 9,965,804, which is a continuation of application No. 14/318,456, filed on Jun. 27, 2014, now Pat. No. 9,892,460, application No. 15/920,042, filed on Mar. 13, 2018, which is a continuation-in-part of application No. 14/818,148, filed on Aug. 4, 2015, now Pat. No. 10,354,325, which is a continuation-in-part of application No. 14/611,136, filed on Jan. 30, 2015, now Pat. No. 10,269,009, and a continuation-in-part of application No. 14/320,900, filed on Jul. 1, 2014, now Pat. No. 10,068,228, and a continuation-in-part of application No. 14/318,456, filed on Jun. 27, 2014, now Pat. No. 9,892,460.

(Continued)

(51) Int. Cl.
*G06Q 40/04* (2012.01)

(52) U.S. Cl.
CPC .................................... *G06Q 40/04* (2013.01)

(58) Field of Classification Search
None
See application file for complete search history.

(56) References Cited

U.S. PATENT DOCUMENTS 4,790,431 A 12/1988 Reel et al.
5,675,649 A 10/1997 Brennan et al.
(Continued)

FOREIGN PATENT DOCUMENTS

CA 2627540 A1 9/2009
CN 103927656 7/2014
(Continued)

OTHER PUBLICATIONS

Blockchain: Bitcoin Wallet Cryptography Security, Challenges and Countermeasures. Journal of Internet Banking and Finance. www.investopedia.com/university/exchange-traded-funds/. May 15, 2012. (visited on Oct. 15, 2020) (Year: 2012).*
(Continued)

*Primary Examiner* — Gregory A Pollock
*Assistant Examiner* — Shacole C Tibljas
(74) *Attorney, Agent, or Firm* — Lee & Hayes, P.C.

(57) ABSTRACT

An exemplary method includes generating, by a trust computer system, script instructions to carry out a transaction involving one or more digital wallets held in a trust custody account so as to verify control of digital assets held in the one or more digital wallets, the trust computer system being operatively connected to a decentralized digital asset network that uses a decentralized electronic ledger in the form of a blockchain maintained by a plurality of computer systems to track asset ownership and/or transactions in a digital asset system, and generating script instructions includes accessing a statement associated with an event that occurred within a predetermined time frame, and generating, by the trust computer system, based on the script instructions, a transaction that involves a zero net payment from the account along with the statement, and payment of a transaction fee from a separate operating account.

24 Claims, 116 Drawing Sheets

| Transaction Ledger 135 | | | | | | |
|---|---|---|---|---|---|---|
| Transaction ID | Date | Fee | Origin Identifiers | Amount from Origin | Destination Identifiers | Destination Amount |
| f05dbf23bc69b7fc155f337<br>3aa6e41cdc1c75da613685<br>95c017b13d7b7c16552 | 2014-06-24<br>20:41:32 | 0 | 19Zmw5kMbkTjA7qRUdUEiwLqgRaMRRLDkh<br>19Zmw5kMbkTjA7qRUdUEiwLqgRaMRRLDkh | 500<br>500 | 1228NoyhmuUt9G9mdEm3mN4nb73c1UgNKt | 1000 |
| 9cd9cef3b96936c8c3a1b7c<br>1f6a0de17a3cfcf94c575b7<br>92638bef85c069de58 | 2014-06-24<br>20:41:32 | 0.0001 | 1EvwbspD9jYbHZZ5q6TFbPxftkM8ej5YqP | 45.9983 | 1PXdpLs2k3ETn9vcL45Rp3UiHxHiiMJzXb<br>1856XTQKH2uUS1GG965Rncn8Ym56jhtkGC | 42.1724747<br>3.8257253 |
| 5f3fb8557633e61e9ab20e<br>b461552a97423c7b3a38b7<br>414e7c672d41efd9c830 | 2014-06-24<br>20:41:32 | 0 | 1So7FXhfiaW7EYWwiv2ayA9duahXb85Rnv | 303.92706127 | 17ZQyJ7KtgfNhGVWVLc8gdDi6ByyRUqZ8G<br>12eqJZbQuRoYqa6BxGtWq8p8dSUpw2qCek | 154.77363532<br>149.15342595 |
| 535936b199bb3fcbc8d15e<br>e38bb735c6929dd360ea05<br>e27a19514bc4be82d69f | 2014-06-24<br>20:41:32 | 0.00005 | 1JW8RphYjfsnTyV4W62GHpm9QhA2wVPvap | 18.0475292 | 18v9zL9SkSWp3pgVDtrVtTNQafFaukXoUk<br>1GnhQNChqguuqgGAtVuijmqxPtk8PZy4EV | 17.2974792<br>0.75 |
| 4616da18de8943f33da984<br>12a6fc8f70c5c0843637d7f<br>b18b9ea9986f31b55ef | 2014-06-24<br>20:41:32 | 0.0001 | 1GD64WARGDLYG71WTTgCpRMpePr18nmGij | 5 | 1Hrj1qUAer7yUNP8pPxSmhQoifGqW3NfFA<br>1NRNnusa3D4sxxzigSfvwmK1thDnR9w3ZJ<br>1GD64WARGDLYG71WTTgCpRMpePr18nmGij | 3.45703882<br>0.01388369<br>1.52897749 |

Related U.S. Application Data

(60) Provisional application No. 62/629,417, filed on Feb. 12, 2018, provisional application No. 61/989,047, filed on May 6, 2014, provisional application No. 61/986,685, filed on Apr. 30, 2014, provisional application No. 61/978,724, filed on Apr. 11, 2014, provisional application No. 61/971,981, filed on Mar. 28, 2014, provisional application No. 61/955,017, filed on Mar. 18, 2014, provisional application No. 61/933,428, filed on Jan. 30, 2014, provisional application No. 61/920,534, filed on Dec. 24, 2013, provisional application No. 61/903,245, filed on Nov. 12, 2013, provisional application No. 61/900,191, filed on Nov. 5, 2013, provisional application No. 61/891,294, filed on Oct. 15, 2013, provisional application No. 61/857,691, filed on Jul. 23, 2013, provisional application No. 61/857,141, filed on Jul. 22, 2013, provisional application No. 61/856,323, filed on Jul. 19, 2013, provisional application No. 61/841,760, filed on Jul. 1, 2013, provisional application No. 61/841,177, filed on Jun. 28, 2013.

(56) References Cited

U.S. PATENT DOCUMENTS 5,799,287 A 8/1998 Dembo
5,950,176 A 9/1999 Keiser et al.
6,021,257 A 2/2000 Chikauchi
6,157,920 A 12/2000 Jakobsson et al.
6,505,174 B1 1/2003 Keiser et al.
6,523,012 B1 2/2003 Glassman et al.
6,583,712 B1 6/2003 Reed et al.
7,167,565 B2 1/2007 Rajasekaran
7,330,538 B2 2/2008 Dunsmuir
7,391,865 B2 6/2008 Orsini et al.
7,487,123 B1 2/2009 Keiser et al.
7,677,974 B2 3/2010 Van Luchene
7,716,484 B1 5/2010 Kaliski, Jr.
7,870,058 B2 1/2011 Maltzman
7,873,573 B2 1/2011 Realini
7,999,748 B2 8/2011 Ligtenberg et al.
8,108,278 B2 1/2012 Tzekin et al.
8,108,283 B2 1/2012 Dimitri et al.
8,139,770 B2 3/2012 Zheng et al.
8,224,702 B2 7/2012 Mengerink et al.
8,229,855 B2 7/2012 Huang et al.
8,229,859 B2 7/2012 Samid
8,239,330 B2 8/2012 Montero et al.
8,249,965 B2 8/2012 Tumminaro
8,255,297 B2 8/2012 Morgenstern et al.
8,275,692 B2 9/2012 Cartledge et al.
8,306,910 B2 11/2012 Wilkes
8,326,751 B2 12/2012 Driemeyer et al.
8,352,326 B2 1/2013 Betzler et al.
8,452,703 B2 5/2013 O'Leary et al.
8,606,685 B2 12/2013 Keiser et al.
8,630,951 B2 1/2014 Wilkes
8,688,525 B2 4/2014 Minde
8,688,563 B2 4/2014 Mehew et al.
8,712,914 B2 4/2014 Lyons et al.
8,719,131 B1 5/2014 Roth et al.
D759,073 S 6/2016 Winklevoss
9,794,074 B2 10/2017 Toll et al.
9,853,977 B1 12/2017 Laucius et al.
9,892,460 B1 2/2018 Winklevoss et al.
9,898,782 B1 2/2018 Winklevoss et al.
9,942,231 B1 4/2018 Laucius et al.
9,965,804 B1 5/2018 Winklevoss et al.
9,965,805 B1 5/2018 Winklevoss et al.
2002/0143614 A1 10/2002 MacLean et al.
2002/0171546 A1 11/2002 Evans et al.
2003/0009413 A1 1/2003 Furbush et al.
2003/0014749 A1 1/2003 Simons et al.
2003/0225672 A1 12/2003 Hughes et al.
2004/0049464 A1 3/2004 Ohmori et al.
2004/0143710 A1 7/2004 Walmsley
2004/0193657 A1 9/2004 Saito et al.
2004/0243488 A1 12/2004 Yamamoto et al.
2005/0044022 A1 2/2005 Spirgel et al.
2005/0240510 A1 10/2005 Schweickert et al.
2007/0117615 A1 5/2007 Van Luchene
2007/0146797 A1 6/2007 Sakai et al.
2007/0219869 A1 9/2007 Haines et al.
2007/0271455 A1 11/2007 Nakano et al.
2008/0109280 A1 5/2008 Csoka
2008/0120221 A1 5/2008 Toneguzzo
2008/0140578 A1 6/2008 Felt et al.
2008/0167965 A1 7/2008 Von Nothaus et al.
2008/0215474 A1* 9/2008 Graham ................ G06Q 40/04 705/37
2008/0243703 A1 10/2008 Al-Herz et al.
2008/0249957 A1 10/2008 Masuyama et al.
2008/0281444 A1 11/2008 Krieger et al.
2009/0089168 A1 4/2009 Schneck
2009/0094134 A1 4/2009 Toomer et al.
2009/0098939 A1 4/2009 Hamilton, II et al.
2009/0119200 A1 5/2009 Riviere
2009/0132830 A1 5/2009 Haga et al.
2009/0265268 A1 10/2009 Huang et al.
2010/0094771 A1 4/2010 VanderPal
2010/0174646 A1 7/2010 Cole et al.
2010/0228674 A1 9/2010 Ogg et al.
2010/0250360 A1 9/2010 Ball et al.
2010/0306084 A1 12/2010 Ciptawilangga
2011/0110516 A1 5/2011 Satoh
2011/0112662 A1 5/2011 Thompson et al.
2011/0231913 A1 9/2011 Feng et al.
2011/0270748 A1* 11/2011 Graham, III ........... G06Q 40/00 705/40
2011/0302412 A1 12/2011 Deng et al.
2012/0078693 A1 3/2012 Wilkes
2012/0101886 A1 4/2012 Subramanian et al.
2012/0123924 A1* 5/2012 Rose .................. G06Q 20/3276 705/35
2012/0185395 A1 7/2012 Wilkes
2012/0239543 A1* 9/2012 Ryan ...................... G06Q 20/10 705/37
2012/0278200 A1 11/2012 van Coppenolle et al.
2013/0036373 A1 2/2013 Alderfer et al.
2013/0041773 A1 2/2013 Muse
2013/0054471 A1 2/2013 Samid
2013/0061049 A1 3/2013 Irvine
2013/0159699 A1 6/2013 Torkkel
2013/0166455 A1 6/2013 Feigelson
2013/0191277 A1 7/2013 O'Leary et al.
2013/0232023 A2 9/2013 Muse
2013/0238478 A1 9/2013 Bruno
2013/0246233 A1 9/2013 Hakim
2013/0254052 A1 9/2013 Royyuru et al.
2013/0311266 A1 11/2013 Vichich et al.
2013/0311348 A1* 11/2013 Samid .................... G06Q 40/04 705/37
2013/0317972 A1 11/2013 Morgenstern et al.
2013/0317984 A1 11/2013 O'Leary
2013/0325701 A1 12/2013 Schwartz
2014/0025473 A1 1/2014 Cohen
2014/0032267 A1 1/2014 Smith et al.
2014/0040157 A1 2/2014 Cohen et al.
2014/0081710 A1 3/2014 Rabie
2014/0122903 A1 5/2014 Endo et al.
2014/0141869 A1 5/2014 Shore
2014/0156497 A1 6/2014 Mehew et al.
2014/0164251 A1 6/2014 Loh
2014/0233740 A1 8/2014 Niamut et al.
2014/0280476 A1 9/2014 Chiussi et al.
2014/0310527 A1 10/2014 Veugen et al.
2014/0344015 A1* 11/2014 Puertolas-Montanes ................... G06Q 30/0217 705/7.29
2015/0033301 A1 1/2015 Pianese
2015/0120567 A1 4/2015 Van Rooyen et al.
2015/0120569 A1 4/2015 Belshe

(56) References Cited

U.S. PATENT DOCUMENTS

2015/0170112 A1* 6/2015 DeCastro ............ G06Q 20/381 705/39
2015/0193744 A1 7/2015 Adleman
2015/0227897 A1 8/2015 Loera
2015/0244690 A1 8/2015 Mossbarger
2015/0262137 A1 9/2015 Armstrong
2015/0262138 A1 9/2015 Hudon
2015/0262139 A1 9/2015 Shtylman
2015/0262140 A1 9/2015 Armstrong
2015/0262141 A1 9/2015 Rebernik
2015/0262168 A1 9/2015 Armstrong
2015/0262171 A1 9/2015 Langschaedel
2015/0262172 A1 9/2015 Rebernik
2015/0262173 A1 9/2015 Durbin et al.
2015/0262176 A1 9/2015 Langschaedel
2015/0310424 A1 10/2015 Myers
2015/0324787 A1 11/2015 Schaffner
2015/0332283 A1 11/2015 Witchey
2015/0341422 A1 11/2015 Färnlöf et al.
2015/0348169 A1 12/2015 Harris
2015/0356523 A1 12/2015 Madden
2015/0356555 A1 12/2015 Pennanen
2015/0363777 A1 12/2015 Ronca et al.
2015/0363783 A1 12/2015 Ronca et al.
2015/0379510 A1 12/2015 Smith
2016/0027229 A1 1/2016 Spanos et al.
2016/0028552 A1 1/2016 Spanos et al.
2016/0078219 A1 3/2016 Hernan
2016/0080156 A1 3/2016 Kaliski, Jr. et al.
2016/0086187 A1 3/2016 Joao
2016/0092988 A1* 3/2016 Letourneau .......... G06Q 20/363 705/66
2016/0112200 A1 4/2016 Kheterpal et al.
2016/0125040 A1 5/2016 Kheterpal et al.
2016/0162873 A1 6/2016 Zhou
2016/0203448 A1 7/2016 Metnick
2017/0005804 A1 1/2017 Zinder
2017/0017955 A1 1/2017 Stern
2017/0091750 A1 3/2017 Maim
2017/0124535 A1 5/2017 Juels
2017/0132630 A1 5/2017 Castinado
2018/0121918 A1* 5/2018 Higgins ................. G06Q 20/02

FOREIGN PATENT DOCUMENTS

EP 2634738 A1 4/2013
WO WO 00/26745 5/2000
WO WO2000026745 A2 5/2000
WO WO 01/67409 9/2001
WO WO 01/86373 11/2001
WO WO 2008/127428 10/2008
WO WO2011008630 1/2011
WO 2016-015041 1/2012
WO WO2013034278 A2 3/2013
WO WO 2015/059669 4/2015
WO WO 2015/085393 6/2015
WO WO 2015/113519 8/2015
WO WO 2015/179020 11/2015
WO WO 2016/008659 1/2016
WO WO 2016/022864 2/2016
WO WO 2016/029119 2/2016
WO WO-2019006446 A1 * 1/2019 ........... G06Q 20/223

OTHER PUBLICATIONS

"What Is Blockchain Technology?" Quora. N.p. Jan. 15, 2009. Web. Jun. 9, 2017. <https://www.quora.com/What-is-)lockchain-technology-1 >. (Year: 2009).*

"What is Blockchain Technology?" Quora. N.p., Jan. 15, 2009. Web. Jul. 21, 2017. <https://www.quora.com/What-is-blockchaintechnology-1 >.

Nick Szabo, Bit gold, unenumerated.blogspot.com (Mar. 29, 2006) Internet Archive, https://web.archive.org/web/20060329122942/http://unenumerated.blogspot.com/2005/12/bit-gold.html.

Notice of References Cited, U.S. Appl. No. 12/192,809 (dated Oct. 10, 2012).

Online auctions: An in-depth look, National Consumers League, http://www.nclnet.org/personal-finance/121-online-auctions/279online-auctions-an-in-depth-look (last visited May 30, 2014).

PPCoin Proof of Stake Minting Setup Guide, Bitcoin Forum (Apr. 25, 2013) https://bitcointalk.org/index.php?topic=187714.0 (last visited Jul. 22, 2013).

PPCoin, Wikipedia, http://en.wikipedia.org/wiki/PPCoin (last visited Jul. 22, 2013).

Private Bitcoin Insurance, Inscrypto, http://go.inscrypto.com (last visited Jan. 24, 2014).

Proof-of-stake, Wikipedia, http://en.wikipedia.org/wiki/Proof-of-stake (last visited Jul. 22, 2013).

Proof-of-work System, Wikipedia, http://en.wikipedia.org/wiki/Proof-of-work (last visited Jul. 22, 2013).

Protocol of Bitcoin, Wikipedia, http://en.wikipedia.org/wiki/Bitcoin_mining (last visited Jul. 22, 2013).

Rachel Abrams, Winklevoss Twins to List Bitcoin Fund on Nasdaq, The New York Times DealB%k, http://dealbook.nytimes.com/2014/05/08/winklevoss-twins-to-list-bitcoin-fund-on-nasdaq/ (last visited May 8, 2014).

Rob Wile, Shares of No-Name Tech Company Go Crazy After It Announces It's Getting Into The Bitcoin Game, Business Insider, http://www.businessinsider.com/wpcs-bitcoin-2013-12?nr_email_referer=1&utm_source=Triggermail&utm_medium=email&utm_content=emailshare (last visited Dec. 30, 2013).

Satoshi Nakamoto, Bitcoin: A Peer-to-Peer Electronic Cash System (Oct. 31, 2008).

Securing Your Wallet, Bitcoin.org (Jul. 21, 2013) Internet Archive, http://web.archive.org/web/20130721194621/http://bitcoin.org/en/secure-your-wallet.

Security for Your Peace of Mind, Coinbase, https://coinbase.com/security (last visited Oct. 28, 2013).

Shamir's Secret Sharing, Wikipedia, http://en.wikipedia.org/wiki/Shamir's_Secret_Sharing (last visited Jul. 22, 2013).

Some Things You Need To Know, Bitcoin.org (May 2, 2013) Internet Archive, http://web.archive.org/web/20130502051011/http://bitcoin.org/en/you-need-to-know.

Stephen Foley & Alice Ross, Bitcoin bubble grows and grows, Financial Times, http://www.ft.com/intl/cms/s/0/b4be7d8e-9c73-11e2-9a4b-00144feabdc0/html (last visited Oct. 30, 2013).

Sunny King & Scott Nadal, PPCoin: Peer-to-Peer Crypto-Currency with Proof-of-Stake, (Aug. 19, 2012).

TigerDirect.com Now Accepts Bitcoin Payments!, TigerDirect, http://www.tigerdirect.com/bitcoin/ (last visited Feb. 6, 2014).

U.S. Appl. No. 60/884,172, (filed Jan. 9, 2007).

U.S. Appl. No. 61/225,256, (filed Jul. 14, 2009).

USD Average Price History, BitcoinAverage, https://bitcoinaverage.com/charts.htm@USD-averages-all (last visited Feb. 24, 2014).

Using Offline Wallets in Armory, Armory (May 20, 2013) Internet Archive, http://web.archive.org/web/20130520100213/https://bitcoinarmory.com/using-offline-wallets-in-armory/.

Victoria Turk, Bitcoin 'Banks' Are Trying to Rebrand Cryptocurrencies for the Mainstream, Motherboard, http://motherboard.vice.com/en_ca/read/bitcoin-banks-try-to-rebrand-cryptocurrencies-for-the-mainstream (last visited May 5, 2014).

Why Bitcoin Is Changing The World, Bitcoin.org (Jun. 20, 2013) Internet Archive, http://web.archive.org/web/20130620062218/http://bitcoin.org/en/innovation.

Winklevoss Bitcoin Trust Amendment No. 3 to Form S-1 Registration Statement, SEC (May 8, 2014), available at http://www.sec.gov/Archives/edgar/data/1579346/000119312514190365/d721187ds1 a.htm.

World Gold Council, How SPDR Gold Shares (2840 HK) are Created and Redeemed (Mar. 2013).

Bitcoin, A Primer for Policymakers(2013).

Bitcoin: a first assessment, FX and Rates | Global, Bank of America Merrill Lynch (Dec. 5, 2013).

(56) References Cited

OTHER PUBLICATIONS

Bitcoin: Questions, Answers, and Analysis of Legal Issues, Congressional Research Service (Dec. 20, 2013).
The audacity of bitcoin, Risks and opportunities for corporates and investors,Global Rates & FX Research, J.P. Morgan (Feb. 11, 2014), http://www.jpmorganmarkets.com/GlobalFXStrategy.
John Heggestuen, BITCOIN: How It Works, And How It Could Fundamentally Change How Companies And Individuals Handle Payments, Bl Intelligence (Jan. 30, 2014).
Bitcoin: Intrinsic Value as Conduit for Disruptive Payment Network Technology, Wedbush, Computer Services Financial Technology (Dec. 1, 2014).
Digitizing Trust: Leveraging the Bitcoin Protocol Beyond the "Coin", Wedbush, Computer Services: Financial Technology (Jan. 2, 2014).
Bitcoin: Watch the Innovation, Not the Price, Wedbush, Computer Services: Financial Technology (Feb. 14, 2014).
"How Bitcoin is Driving Digital Innovation in Entertainment, Mediaand Communications (EMC), PwC Consumer Intelligence Series, Digital Disruptor, (Jan. 27, 2014)."
Bitcoins and Banks: Problematic currency, interesting payment system, UBS, Global Research (Mar. 28, 2014).
François R. Velde, Bitcoin: A primer, The Federal Reserve Bank of Chicago, Chicago Fed Letter (Dec. 2013).
David Andolfatto, Bitcoin and Beyond: The Possibilities and Pitfalls of Virtual Currencies, Federal Reserve Bank of St. Louis, Dialogue With the Fed, Beyond Today's Financial Headlines (Mar. 31, 2014).
All About Bitcoin, Goldman Sachs, Global Macro Research, Top of Mind, Issue 21 (Mar. 11, 2014).
Julieta Duek and Demian Brener, Bitcoin: Understanding and Assessing potential Opportunities, Quasar Ventures, (Jan. 2014).
"Yacine Ghalim and Max Niederhofer, bitcoin: Primer, State of Play, Discussion, Courmayeur, Sunstone Capital (Jan. 24, 2014)."
Timing and Sizing the Era of Bitcoin, Wedbush, Computer Services: Financial Technology (May 27, 2014).
State of Bitcoin 2014, CoinDesk (Feb. 26, 2014).
Ronald A. Glantz, Pantera Primer, (Mar. 11, 2014).
Anton Badev and Matthew Chen, Bitcoin: Technical Background and Data Analysis, Finance and Economics Discussion Series, Divisions of Research & Statistics and Monetary Affairs, Federal Reserve Board, Washington, D.C. (Oct. 7, 2014).
Bitcoin Moves Closer to Regulation, Stratfor Flobal Intelligence (Jan. 29, 2015), https://www.stratfor.com/sample/analysis/bitcoin-moves-closer-regulation#axzz/ (last visited Jan. 30, 2015).
BLOCKTRAIL|Bitcoin Block Explorer, Blocktrail (Aug. 18, 2014), https://www.blocktrail.com/.
Jerry Bito and Andrea Castillo, BITCOIN A Primer for Policymakers, Mercatus Center, George Mason University (2013).
Daniel Palmer, Coinfloor Plans Europe's First Bitcoin ETF, Adds USD Support, CoinDesk (Oct. 21, 2014), http://www.coindesk.com/coinfloor-launch-bitcoin-trading-fund-adds-new-currencies/ (last visited Oct. 22, 2014).
U.S. Appl. No. 61/954,434, filed Mar. 17, 2014.
U.S. Appl. No. 61/990,017, filed May 7, 2014.
U.S. Appl. No. 62/042,676, filed Aug. 27, 2014.
U.S. Appl. No. 62/056,100, filed Sep. 26, 2014.
U.S. Appl. No. 62/086,669, filed Dec. 2, 2014.
U.S. Appl. No. 62/099,992, filed Jan. 15, 2015.
David Harper, Exploring the Exponentially Weighted Moving Average, Investopedia (Mar. 18, 2007) Internet Archive, https://web.archive.org/web/20070318160651/http://www. investopedia.com/articles/07/EWMA.asp.
Ken Hawkins, Exchange-Traded Funds (ETFs), Investopedia (May 12, 2013) Internet archive, https://web.archive.org/web/20130512125447/http://www.investopedia.com/university/exchange-traded-fund/.
Proof of stake instead of proof of work, Bitcoin Forum, https://bitcointalk.org/index.php?topic=27787 (last visited Nov. 6, 2015).
Trading Namecoins for Bitcoins, Bitcoin Forum, https://bitcointalk.org/index.php?topic=6289.0 (last visited Nov. 6, 2015).
Daniel Cawrey, Eschewing Price, Pantera Launches Bitindex to Track Bitcoin, CoinDesk (Jul. 10, 2014), http://www.coindesk.com/eschewing-price-pantera-launches-bitindex-track-bitcoin/ (last visited Jul. 11, 2014).
"Coinsetter Launches Out of Beta, Platform Now a Full U.S.Bitcoin Exchange, Coinsetter blog (Jul. 24, 2014), http://www.coinsetter.com/blog/2014/07/24/coinsetter-launches-beta-platform-now-full-us-bitcoin-exchange/ (last visited Jul. 24, 2014)."
Request for Administrative Ruling on the Application of FinCEN's Regulations to a Virtual Currency Trading Platform, United States Department of the Treasury, FinCEN, (Oct. 27, 2014).
Request for Administrative Ruling on the Application of FinCEN's Regulations to a Virtual Currency Payment System, United States Department of the Treasury, FinCEN, (Oct. 27, 2014).
Daniel Roberts, On Winklevoss Bitcoin index, it's open season for developers, FORTUNE, (Jul. 22, 2014).
Evan L. Greebel et al., Recent Key Bitcoin and Virtual Currency Regulatory and Law Enforcement Developments, Virtual Currency Advisory, Katten Muchin Rosenman LLP (Nov. 13, 2014).
BTC, Google Finance, https://www.google.com/finance?q=CURRENCY%3ABTC&ei=T-euU7jVFZOUwQPNklHYCQ (last visited Jul. 11, 2014).
Sanjay Panikkar et al., ADEPT: An loT Practitioner Perspective, IBM (2015).
Bitcoins the hard way: Using the raw Bitcoin protocol, Ken Shirriff's blog, (Feb. 3, 2014) Internet Archive, https://web.archive.org/web/20140203192446/http://www.righto.com/2014/02/bitcoins- hard-way-using-raw bitcoin.html.
NYC Bitcoin Exchange Coinsetter Launches Out of Beta With Institutional and Consumer Trading, MarketWatch (published Jul. 24, 2014), http://www.marketwatch.com/story/nyc-bitcoin-exchange-coinsetter-launches-out-of-beta-with-institutional-and-consumer-trading-2014-07-24 (last visited Jul. 24, 2014).
Major Bitcoin Investment Firm Launches Bitindex, The Crypto Crimson, (published Jul. 10, 2014), http://cryptocrimson.com/2014/07/major-bitcoin-investment-firm-launches-bitindex/ (last visited Jul. 11, 2014).
"We make it easy to build secure, high-level services on topof the Bitcoin protocol, Trusted Coin (Dec. 26, 2013) Intemet Archive, https://web.archive.org/web/20131226232433lhttps://api.trustedcoin.com/f."
WINKBTCO Index, Bloomberg Finance L.P. (Jun. 16, 2014).
"What Is Blockchain Technology?" Quora. N.p. Jan. 15, 2009. Web. Jun. 9, 2017. <https://www.quora.com/What-is-blockchain-technology-1 >.
[ANN] M-of-N "Fragmented Backups" now in Armory (command-line only), Bitcoin Forum (Mar. 6, 2013), https://bitcointalk.org/index.php?topic=149820.0 (last visited Dec. 4, 2013).
2-of-3 Paper Wallets, Bitcoin Forum (published Jan. 29, 2013), https://bitcointalk.org/index.php?topic=139625. msg1487254 (last visited Dec. 4, 2013).
A Physical Price Tag For A Digital Currency. Introducing Bittag., BitTag, http://bittag.net/ (last visited Feb. 5, 2014).
A powerful trading platform for Bitcoin traders, BTXTrader.com (Aug. 13, 2013) Internet Archive, https://web.archive.org/web/20130813052513/http://www.btxtrader.com/.
About Bitcoin, Bitcoin.org (May 2, 2013) Internet Archive, http://web.archive.org/web/20130502214154/http://bitcoin.org/en/about.
An Open Source P2P Digital Currency, Bitcoin.org, http://bitcoin.org/en/ (last visited Jul. 22, 2013).
Ashlee Vance & Brad Stone, The Bitcoin-Mining Arms Race Heats Up, BloombergBusinessweek, http://www.businessweek.com/articles/2014-01-09/bitcoin-mining-chips-gear-computing-groups-competition-heats-up (last visited Jan. 9, 2014).
Bitcoin Fund Exclusively Available On EXANTE's Platform, EXANTE, https://exante.eu/press/news/266/ (last visited Oct. 10, 2013).
Bitcoin Now on Bloomberg, Bloomberg Now (Apr. 30, 2014) Internet Archive, https://web.archive.org/web/20140430184511/http://www.bloomberg.com/now/2014-04-30/bitcoin now-bloomberg/.
Bitcoin Theft Insurance, Ecoin Club (published Dec. 3, 2013), http://ecoinclub.com/bitcoin-insurance/ (last visited Dec. 5, 2013).

(56) References Cited

OTHER PUBLICATIONS

Bitcoin, Wikipedia (Jun. 24, 2013), Internet Archive http://web.archive.org/web/20130624030646/http://en.wikipedia.org/wiki/Bitcoin.
Bitcoinaverage code repository, GitHub, https://github.com/bitcoinaverage/bitcoinaverage/commits/master?page=134 (last visited Feb. 24, 2014).
BitcoinAverage.com—independent bitcoin price, Bitcoin Forum, https://bitcointalk.org/index.php?topic=270190.0 (last visited Feb. 24, 2014).
BitcoinAverage.com, Reddit, http://www.reddit.com/r/Bitcoin/comments/1jl9c2/ (last visited Feb. 24, 2014).
Bitcoin's First Kiosk, Robocoin (Jul. 2, 2013) Internet Archive, https://web.archive.org/web/20130702171110/https://robocoinkiosk.com/.
Bitcoin's First Real ATM, Robocoin Blog, http://blog.robocoinkiosk.com/ (last visited Nov. 11, 2013).
Bitflash Weekly Review (Apr. 14, 2014), Pantera, https://panteracapital.com/bitflash/ (last visited Apr. 15, 2014).
Bob Sullivan, 'Deadbeat bidders' dog eBay sellers, NBCNews.com (published Sep. 5, 2002), http://www.nbcnews.com/id/3078738/ns/technology_and_sciencetech_and_gadgets/t/deadbeat-bidders-dog-ebay-sellers/#.U4inz_ldXuS (last visited May 30, 2014).
Brian Cohen, JPMorgan Chase Building Bitcoin-Killer, Lets Talk Bitcoin (published Dec. 9, 2013) http://letstalkbitcoin.com/jpmorgan-chase-building-bitcoin-killer/ (last visited Dec. 10, 2013).
Buying and Selling Linden Dollars, Second Life, http://community.secondlife.com/t5/English-Knowledge-Base/Buying-and-selling-Linden-dollars/ta-p/700107 (last visited Dec. 9, 2013).
Charts, Bitcoin Charts (May 10, 2013) Internet Archive, https://web.archive.org/web/20130510172057/http://bitcoincharts.com/charts/.
Choose Your Wallet, Bitcoin.org (May 30, 2013) Internet Archive, http://web.archive.org/web/20130530072551/http://bitcoin.org/en/choose-your-wallet.
Circle (May 19, 2014) Internet Archive, https://web.archive.org/web/20140519175717/https://www.circle.com/.
Coinbase, Bitcoin Wallet (Jul. 22, 2013) Internet Archive, http://web.archive.org/web/20130722200359/https://coinbase.com/.
Coinbase, Bitcoin Wallet, https://coinbase.com/ (last visited Aug. 15, 2013).
CoinDesk Bitcoin Price Index, CoinDesk, http://www.coindesk.com/price/ (last visited Oct. 23, 2013).
CoinDesk, This week we released the first version of our mobile app on iPhone, Twitter (published May 2, 2014), https //twitter com/coindesk/status/462255287177453568?refsrc=email (last visited May 5, 2014).
Durnford, Barter network aims to help Mile End's cash-strapped live well, The Gazette [Montreal, Que] (Jan. 23, 1996).
Electrum, Bitcoin wiki, https://en.bitcoin.it/wiki/Electrum (last visited Jul. 22, 2013).
Elliptic Vault Secure, Worry-free Storage For Your Bitcoins, Elliptic.co (Jan. 12, 2014) Internet Archive, https://web.archive.org/web/20140112043128/https://www.elliptic.co/vault.
FAQ: What's The Difference Between PPCoin and Bitcoin?, GitHub, https://github.com/ppcoin/ppcoin/wiki/FAQ (last visited Jul. 22, 2013).
First Bitcoin Capital Corp.(otc markets:BITCF) Launches Digital Currency Exchange, CoinQX.com in Beta, The Wall Street Journal MarketWatch, http://www.marketwatch.com/story/first-bitcoin-capital-corpotc-markets-bitcf-launches-digital-currency-exchange-coinqxcom-in-beta-2014-05-21 (last visited May 21, 2014).
How Bitcoin Works Under The Hood, Imponderable Things (Scott Driscoll's Blog) (published Jul. 14, 2013), http://www.imponderablethings.com/2013/07/how-bitcoin-works-under-hood.html (last visited Oct. 10, 2013).
How DigiCash Blew Everything, NEXT (published Jan. 1999), http://cryptome.org/jya/digicrash.htm (last visited Jan. 9, 2014).
How Does Bitcoin Work?, Bitcoin.org, (May 1, 2013) Internet Archive, http://web.archive.org/web/20130501092121/http://bitcoin.org/en/how-it-works.
How is Mt.Gox weighted average calculated?, Bitcoin Forum (Mar. 18, 2013), https://bitcointalk.org/index.php?topic= 154548.0 (last visited Jul. 25, 2013).
Ina Steiner, eBay Mulls New Feature to Eliminate Deadbeat Bidders, Ecommerce Bytes Blog (published May 12, 2012), http://www.ecommercebytes.eom/C/blog/blog.pl?/pl/2012/5/1336831866.html (last visited May 30, 2014).
Independent Bitcoin Price, BitcoinAverage, https://bitcoinaverage.com/explain.htm (last visited Mar. 4, 2014).
Introducing BDIC: Bitcoin's decentralized, privately-funded version of the FDIC, Reddit (published Dec. 4, 2013), http://www.reddit.com/r/Bitcoin/comments/1s365o/introducing_bdic_bitcoins_decentralized/ (last visited Dec. 5, 2013).
James Ball, Meet the seven people who hold the keys to worldwide internet security, The Guardian, http://www.theguardian.com/technology/2014/feb/28/seven-people-keys-woridwide-intemet-security-web (last visited Mar. 7, 2014).
Jeremy Allaire, What We Have Been Up to at Circle, The Circle Blog (May 19, 2014) Internet Archive, https://web.archive.org/web/20140519162958/https://www.circle.com/2014/05/15/circle-update/.
Joe Adler, Bitcoin Backers Seek FDIC-Style Insurance, American Banker (Jan. 22, 2014), http://www.americanbanker.com/issues/179_15/bitcoin-backers-seek-fdic-style-insurance-1065089-1.html?zkPrintable=true.
John Biggs, Xapo Raises $20 Million To Bury Your Bitcoin Underground, TechCrunch (Mar. 14, 2014) Internet Archive, https://web.archive.org/web/20140314042301/http://techcrunch.com/2014/03/13/xapo-raises-20-million-to-bury-your-bitcoin-underground/.
Jon Matonis, CoinDesk Launches Proprietary Bitcoin Price Index, CoinDesk (published Sep. 11, 2013), http://www.coindesk.com/coindesk-launches-proprietary-bitcoin-price-index/ (last visited Oct. 30, 2013).
Jon Southurst, ATM Industry Association Publishes Report on Bitcoin ATMs, CoinDesk (published Mar. 20, 2014), http://www.coindesk.com/atm-industry-association-publishes-report-bitcoin-atms/ (last visited Mar. 21, 2014).
Jonathan Shieber, Circle Emerges From Stealth To Bring Bitcoin To The Masses, TechCrunch (May 18, 2014) Internet Archive, https://web.archive.org/web/20140518130248/http://techcrunch.com/2014/05/15/circle-emerges-from-stealth-to-bring-bitcoin-to-the-masses/.
Larry Ren, Proof of Stake Velocity: Building the Social Currency of the Digital Age, www.reddcoin.com (Apr. 2014).
Lisa Fleisher, London's New Bitcoin Exchange Hopes to Avoid Mt. Gox Fate, The Wall Street Journal (published Apr. 30, 2014), http://blogs.wsj.com/digits/2014/04/30/londons-new-bitcoin-exchange-hopes-to-avoid-mt-gox-fate/ (last visited May 1, 2014).
Markets API, Bitcoin Charts (Jun. 3, 2013) Internet Archive, https://web.archive.org/web/20130603091557/http://bitcoincharts.com/about/markets-api.
Max Raskin, Cameron and Tyler Winklevoss on Bitcoin and Their Public Persona, BloombergBusinessweek, http://www.businessweek.com/articles/2013-08-08/cameron-and-tyler-winklevoss-on-bitcoin-and-their-public-persona (last visited Aug. 8, 2013).
TrueUSD: A USD-Backed Stablecoin You CanTrust—TrustToken, https://blog.trusttoken.com/trueusd-a-usd-backed-stablecoin-you-can-trust-9688796cfd0d, Jan. 24, 2018—accessed Apr. 16, 2018, 13 pgs., Internet.
Compound: The Money Market Protocol, Version 0.2, Feb. 2018, Robert Leshner, Geoffrey Hayes, https://compound.finance (10 pgs.).
Monero (cryptocurrency)—Wikipedia, en.wikipedia.org; https://en.wikipedia.org/wiki/Monero_(cryptocurrency).
Custody Services, Gemimi.com, https://gemini.com/custody-services/, last modified Nov. 21, 2017.
Tether White Paper, Tether: Fiat currencies on the Bitcoin blockchain, tether.to, https://tether.to/wp-content/uploads/2016/06/TetherWhitePaper.pdf (20 pgs.).

(56) References Cited

OTHER PUBLICATIONS

United States Securities and Exchange Commission, Amendment No. 9 to Form S-1 Registration Statement Under the Securities Act of 1933, Winklevoss Bitcoin Trust as filed with the Securities and Exchange Commission on Feb. 8, 2017, Sponsored by Digital Asset Services, LLC, (153 pgs.).

International Search Report and Written Opinion issued in Application No. PCT/US16/25189 dated Jul. 1, 2016 (15 pp.).

"Digital Currency Exchange Goes Live to Public in Melbourne, Australia," AlphaPoint, https://globenewswire.com/news-release/2015/12/10/794524/0/en/Digjtal-Currency-Exchange-Goes-Live-to-Public-in-Melbourne-Australia.html, Dec. 10, 2015, 3 pages.

"Nasdaq Linq Enables First-Ever Private Securities Issuance Documented with Blockchain Technology," Nasdaq, https://globenewswire.com/news-release/2015/12/30/798660/0/en/Nasdaq-Linq-Enables-First-Ever-Private-Securities-Issnance-Documented-With-Blockchain-Technology.html, Dec. 30, 2015, 3 pages.

International Search Report and Written Opinion issued in Application No. PCT/US16/040711 dated Oct. 4, 2016 (14 pages).

"Blockchain Technologies Corp Makes History, 2016 Iowa Caucus Results Forever Documented on Blockchain," https://globenewswire.com/news-release/2016/02/06/808320/10159855/en/Blockchain-Technologies-Corp-Makes-History-2016-Iowa-Caucus-Results-Forever-Documented-on-Blockchain.html, Feb. 5, 2016, 2 pages.

"AlphaPoint Announces Blockchain Solution Custom-Built for Financial Institutions," AlphaPoint, https://globenewswire.com/news-release/2015/10/26/779929/0/en/AlphaPoint-Announces-Blockchain-Solution-Custom-Built-for-Financial-Institutions.html, Oct. 26, 2015, 3 pages.

"Nasdaq Launches Enterprise-Wide Blockchain Technology Initiative," Nasdaq, https://globenewswire.com/news-release/2015/05/11/734456/10133665/en/Nasdaq-Launches-Enterprise-Wide-Blockchain-Technology-Initiative.htmi, May 11, 2015, 3 pages.

"RR Donnelley to Pursue New Blockchain-Enabled Capabilities for Publishing Industry," https://globenewswire.com/news-release/2016/03/14/819355/0/en/RR-Donnelley-to-Pursue-New-Blockchain-Enabled-Capabilities-for-Publishing-Industry.html, Mar. 14, 2016, 3 pages.

* cited by examiner

| Transaction Ledger 115 | | | | | | |
|---|---|---|---|---|---|---|
| Transaction ID | Date | Fee | Origin Identifiers | Amount from Origin | Destination Identifiers | Destination Amount |
| f06dbf23bc69b7fc155f337<br>3aa6e41cdc1c75da613685<br>95c017b13d7b7c16552 | 2014-06-24<br>20:41:32 | 0 | 19Zmw5kMbkTjA7qRUdUEiwLqgRaMRRLDkh<br>19Zmw5kMbkTjA7qRUdUEiwLqgRaMRRLDkh | 500<br>500 | 122BNoyhmuUt9G9mdEm3mN4nb73c1UgNKt | 1000 |
| 9cd9cef3b96936c8c3a1b7c<br>1f6a0de17a3cfcf94c575b7<br>92638bef85c069de58 | 2014-06-24<br>20:41:32 | 0.0001 | 1EvwbspD9jYbH2ZSq6TFbPxftkM8ej5YqP | 45.9983 | 1PXdpLs2k3ETn9vcL4SRp3UiHxHiiMJzXb<br>18S6XTQKH2uU51GG965Rncn8YmS6jhtkGC | 42.1724747<br>3.8257253 |
| 5f3fb8557633e61e9ab20e<br>b461552a97423c7b3a38b7<br>414e7c672d41efd9c830 | 2014-06-24<br>20:41:32 | 0 | 15u7FXhfiaW7EYWwiv2ayA9duahXb85Rnv | 303.92706127 | 17ZQyJ7KtgfNhGVWVLc8gdDi6ByyRUqZ8G<br>12eqIZbQpRoYqa6BxGtWq8p8d5UpwZqCek | 154.77363532<br>149.15342595 |
| 535936b199bb3fcbc8d15e<br>e38bb735c6929dd360ea05<br>e27a19514bc4be82d69f | 2014-06-24<br>20:41:32 | 0.00005 | 1JW8RphYjfsnTyV4W62GHpm9QhA2wVPvap | 18.0475292 | 18v9zL9SkSWp3pgVDtrVtTNQafFaukXoUk<br>1GnhQNChqguuqgGAtVuijmqxPtk8PZy4EV | 17.2974792<br>0.75 |
| 4616da18de8943f33da984<br>12a6fc8f70c5c0843637d7f<br>b28b9ea9986f31b55ef | 2014-06-24<br>20:41:32 | 0.0001 | 1GD64WARGDLYG71WTTgCpRMpePr18nmGij | 5 | 1Hrj1qUAer7yUNP8pPxSmhQoifGqW3NfFA<br>1NRNnusa3D4sxxzig5fvwmX1thDnR9w3ZJ<br>1GD64WARGDLYG71WTTgCpRMpePr18nmGij | 3.45703882<br>0.01388369<br>1.52897749 |

FIG. 2

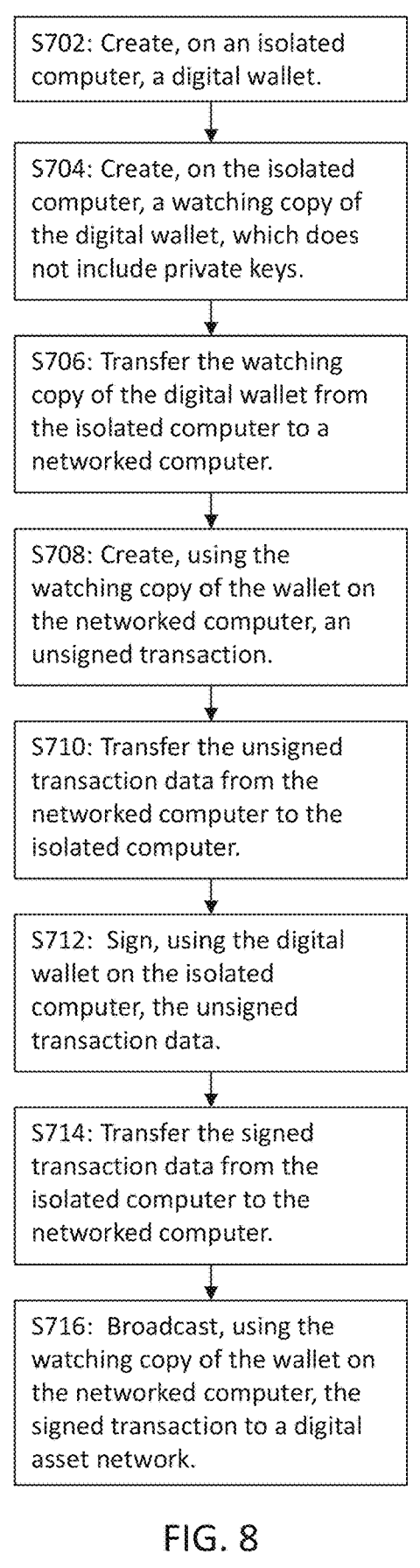

S702: Create, on an isolated computer, a digital wallet.

↓

S704: Create, on the isolated computer, a watching copy of the digital wallet, which does not include private keys.

↓

S706: Transfer the watching copy of the digital wallet from the isolated computer to a networked computer.

↓

S708: Create, using the watching copy of the wallet on the networked computer, an unsigned transaction.

↓

S710: Transfer the unsigned transaction data from the networked computer to the isolated computer.

↓

S712: Sign, using the digital wallet on the isolated computer, the unsigned transaction data.

↓

S714: Transfer the signed transaction data from the isolated computer to the networked computer.

↓

S716: Broadcast, using the watching copy of the wallet on the networked computer, the signed transaction to a digital asset network.

FIG. 8

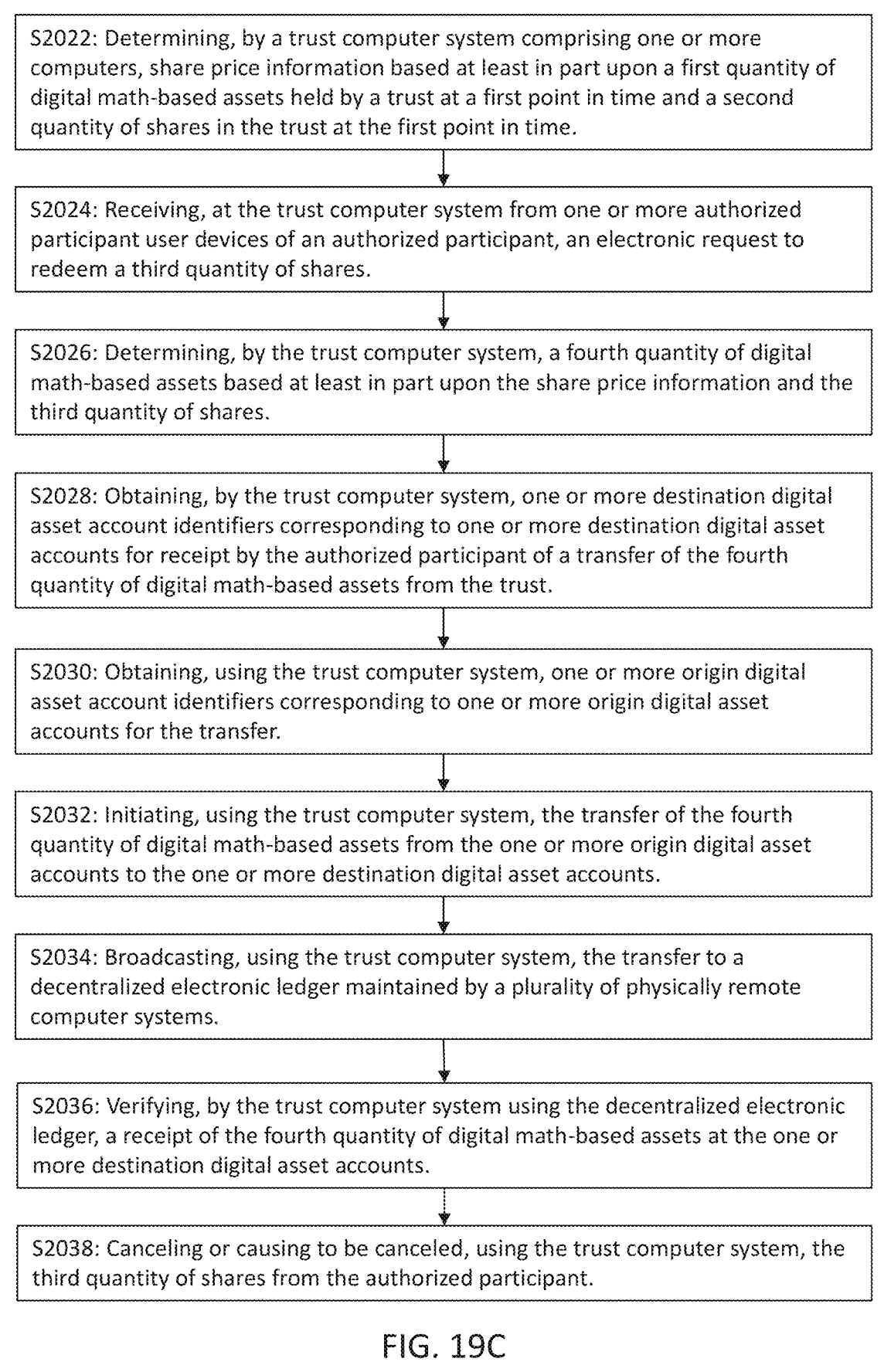

S2022: Determining, by a trust computer system comprising one or more computers, share price information based at least in part upon a first quantity of digital math-based assets held by a trust at a first point in time and a second quantity of shares in the trust at the first point in time.

↓

S2024: Receiving, at the trust computer system from one or more authorized participant user devices of an authorized participant, an electronic request to redeem a third quantity of shares.

↓

S2026: Determining, by the trust computer system, a fourth quantity of digital math-based assets based at least in part upon the share price information and the third quantity of shares.

↓

S2028: Obtaining, by the trust computer system, one or more destination digital asset account identifiers corresponding to one or more destination digital asset accounts for receipt by the authorized participant of a transfer of the fourth quantity of digital math-based assets from the trust.

↓

S2030: Obtaining, using the trust computer system, one or more origin digital asset account identifiers corresponding to one or more origin digital asset accounts for the transfer.

↓

S2032: Initiating, using the trust computer system, the transfer of the fourth quantity of digital math-based assets from the one or more origin digital asset accounts to the one or more destination digital asset accounts.

↓

S2034: Broadcasting, using the trust computer system, the transfer to a decentralized electronic ledger maintained by a plurality of physically remote computer systems.

↓

S2036: Verifying, by the trust computer system using the decentralized electronic ledger, a receipt of the fourth quantity of digital math-based assets at the one or more destination digital asset accounts.

↓

S2038: Canceling or causing to be canceled, using the trust computer system, the third quantity of shares from the authorized participant.

FIG. 19C

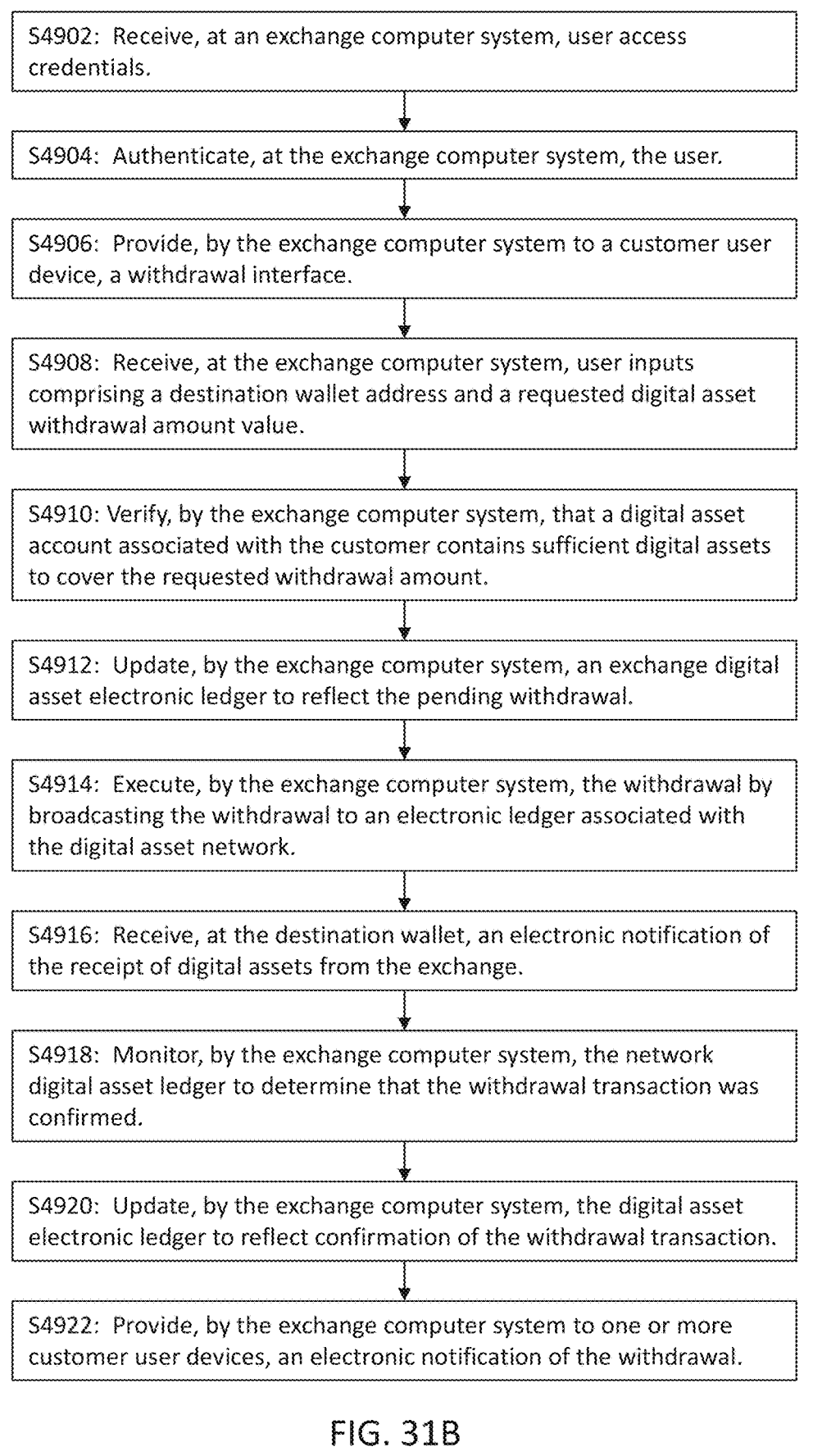

S4902: Receive, at an exchange computer system, user access credentials.

↓

S4904: Authenticate, at the exchange computer system, the user.

↓

S4906: Provide, by the exchange computer system to a customer user device, a withdrawal interface.

↓

S4908: Receive, at the exchange computer system, user inputs comprising a destination wallet address and a requested digital asset withdrawal amount value.

↓

S4910: Verify, by the exchange computer system, that a digital asset account associated with the customer contains sufficient digital assets to cover the requested withdrawal amount.

↓

S4912: Update, by the exchange computer system, an exchange digital asset electronic ledger to reflect the pending withdrawal.

↓

S4914: Execute, by the exchange computer system, the withdrawal by broadcasting the withdrawal to an electronic ledger associated with the digital asset network.

↓

S4916: Receive, at the destination wallet, an electronic notification of the receipt of digital assets from the exchange.

↓

S4918: Monitor, by the exchange computer system, the network digital asset ledger to determine that the withdrawal transaction was confirmed.

↓

S4920: Update, by the exchange computer system, the digital asset electronic ledger to reflect confirmation of the withdrawal transaction.

↓

S4922: Provide, by the exchange computer system to one or more customer user devices, an electronic notification of the withdrawal.

FIG. 31B

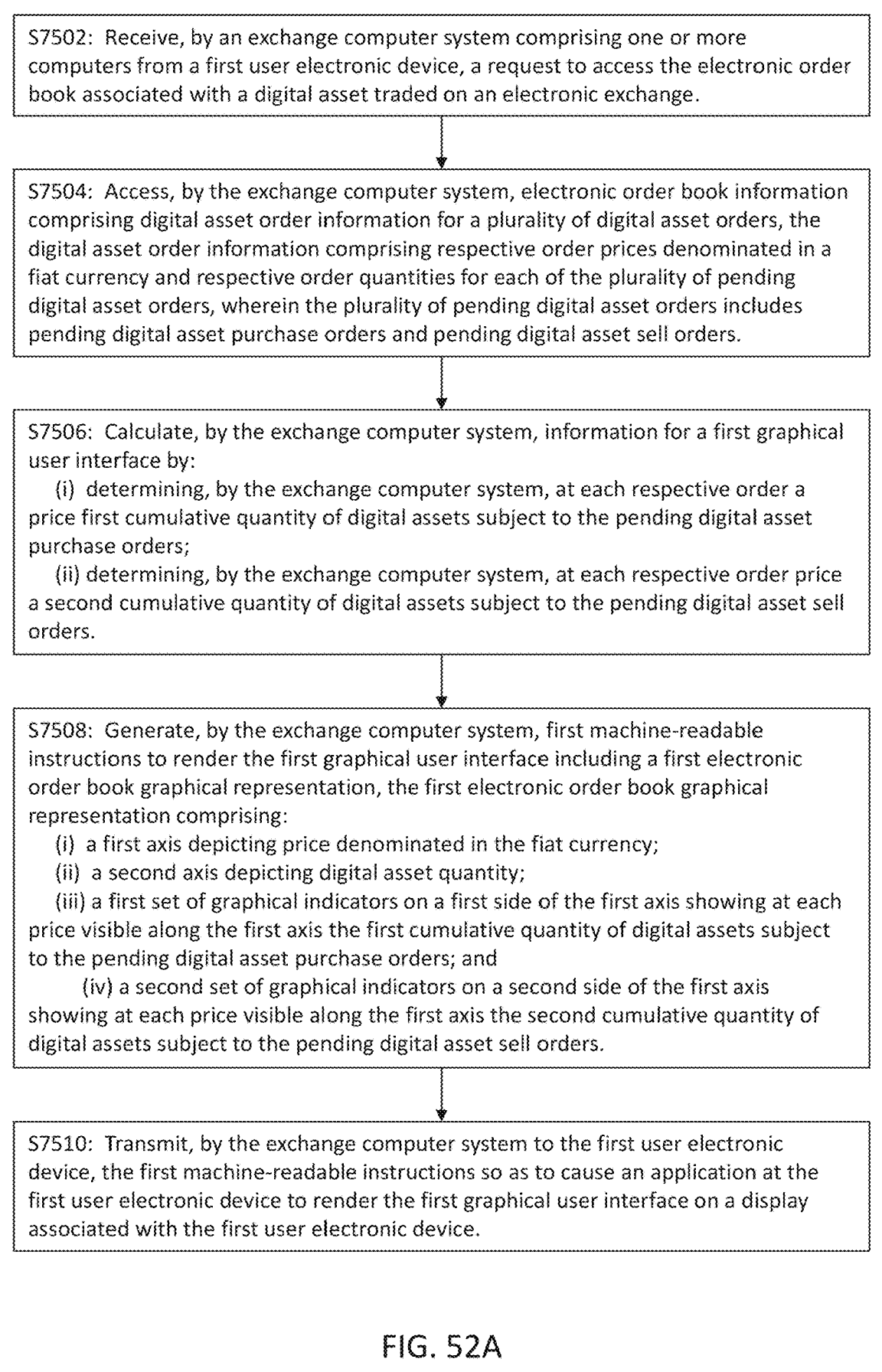

S7502: Receive, by an exchange computer system comprising one or more computers from a first user electronic device, a request to access the electronic order book associated with a digital asset traded on an electronic exchange.

↓

S7504: Access, by the exchange computer system, electronic order book information comprising digital asset order information for a plurality of digital asset orders, the digital asset order information comprising respective order prices denominated in a fiat currency and respective order quantities for each of the plurality of pending digital asset orders, wherein the plurality of pending digital asset orders includes pending digital asset purchase orders and pending digital asset sell orders.

↓

S7506: Calculate, by the exchange computer system, information for a first graphical user interface by:

(i) determining, by the exchange computer system, at each respective order a price first cumulative quantity of digital assets subject to the pending digital asset purchase orders;

(ii) determining, by the exchange computer system, at each respective order price a second cumulative quantity of digital assets subject to the pending digital asset sell orders.

↓

S7508: Generate, by the exchange computer system, first machine-readable instructions to render the first graphical user interface including a first electronic order book graphical representation, the first electronic order book graphical representation comprising:

(i) a first axis depicting price denominated in the fiat currency;

(ii) a second axis depicting digital asset quantity;

(iii) a first set of graphical indicators on a first side of the first axis showing at each price visible along the first axis the first cumulative quantity of digital assets subject to the pending digital asset purchase orders; and (iv) a second set of graphical indicators on a second side of the first axis showing at each price visible along the first axis the second cumulative quantity of digital assets subject to the pending digital asset sell orders.

↓

S7510: Transmit, by the exchange computer system to the first user electronic device, the first machine-readable instructions so as to cause an application at the first user electronic device to render the first graphical user interface on a display associated with the first user electronic device.

FIG. 52A

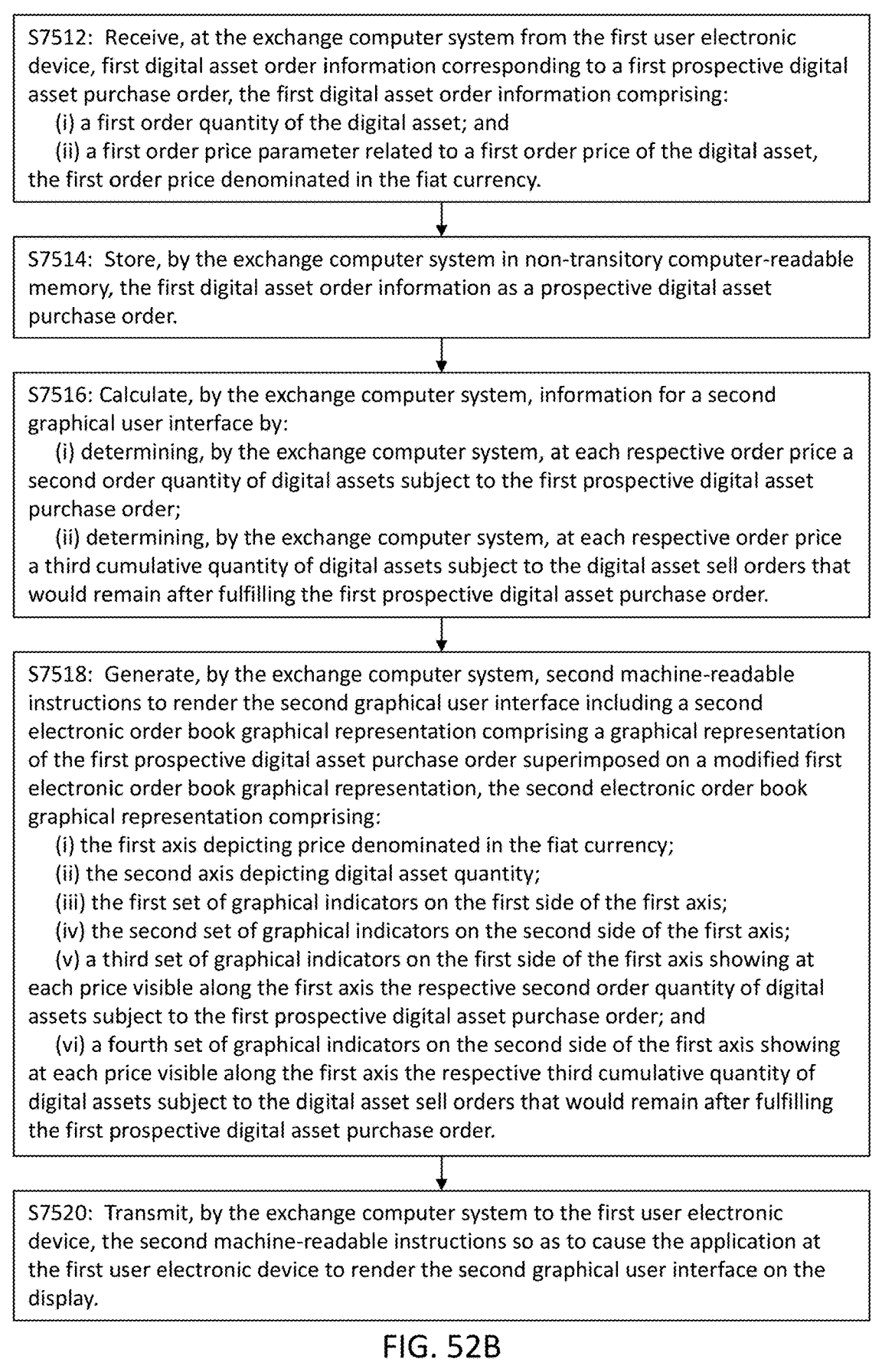

S7512: Receive, at the exchange computer system from the first user electronic device, first digital asset order information corresponding to a first prospective digital asset purchase order, the first digital asset order information comprising:
(i) a first order quantity of the digital asset; and
(ii) a first order price parameter related to a first order price of the digital asset, the first order price denominated in the fiat currency.

↓

S7514: Store, by the exchange computer system in non-transitory computer-readable memory, the first digital asset order information as a prospective digital asset purchase order.

↓

S7516: Calculate, by the exchange computer system, information for a second graphical user interface by:
(i) determining, by the exchange computer system, at each respective order price a second order quantity of digital assets subject to the first prospective digital asset purchase order;
(ii) determining, by the exchange computer system, at each respective order price a third cumulative quantity of digital assets subject to the digital asset sell orders that would remain after fulfilling the first prospective digital asset purchase order.

↓

S7518: Generate, by the exchange computer system, second machine-readable instructions to render the second graphical user interface including a second electronic order book graphical representation comprising a graphical representation of the first prospective digital asset purchase order superimposed on a modified first electronic order book graphical representation, the second electronic order book graphical representation comprising:
(i) the first axis depicting price denominated in the fiat currency;
(ii) the second axis depicting digital asset quantity;
(iii) the first set of graphical indicators on the first side of the first axis;
(iv) the second set of graphical indicators on the second side of the first axis;
(v) a third set of graphical indicators on the first side of the first axis showing at each price visible along the first axis the respective second order quantity of digital assets subject to the first prospective digital asset purchase order; and
(vi) a fourth set of graphical indicators on the second side of the first axis showing at each price visible along the first axis the respective third cumulative quantity of digital assets subject to the digital asset sell orders that would remain after fulfilling the first prospective digital asset purchase order.

↓

S7520: Transmit, by the exchange computer system to the first user electronic device, the second machine-readable instructions so as to cause the application at the first user electronic device to render the second graphical user interface on the display.

FIG. 52B

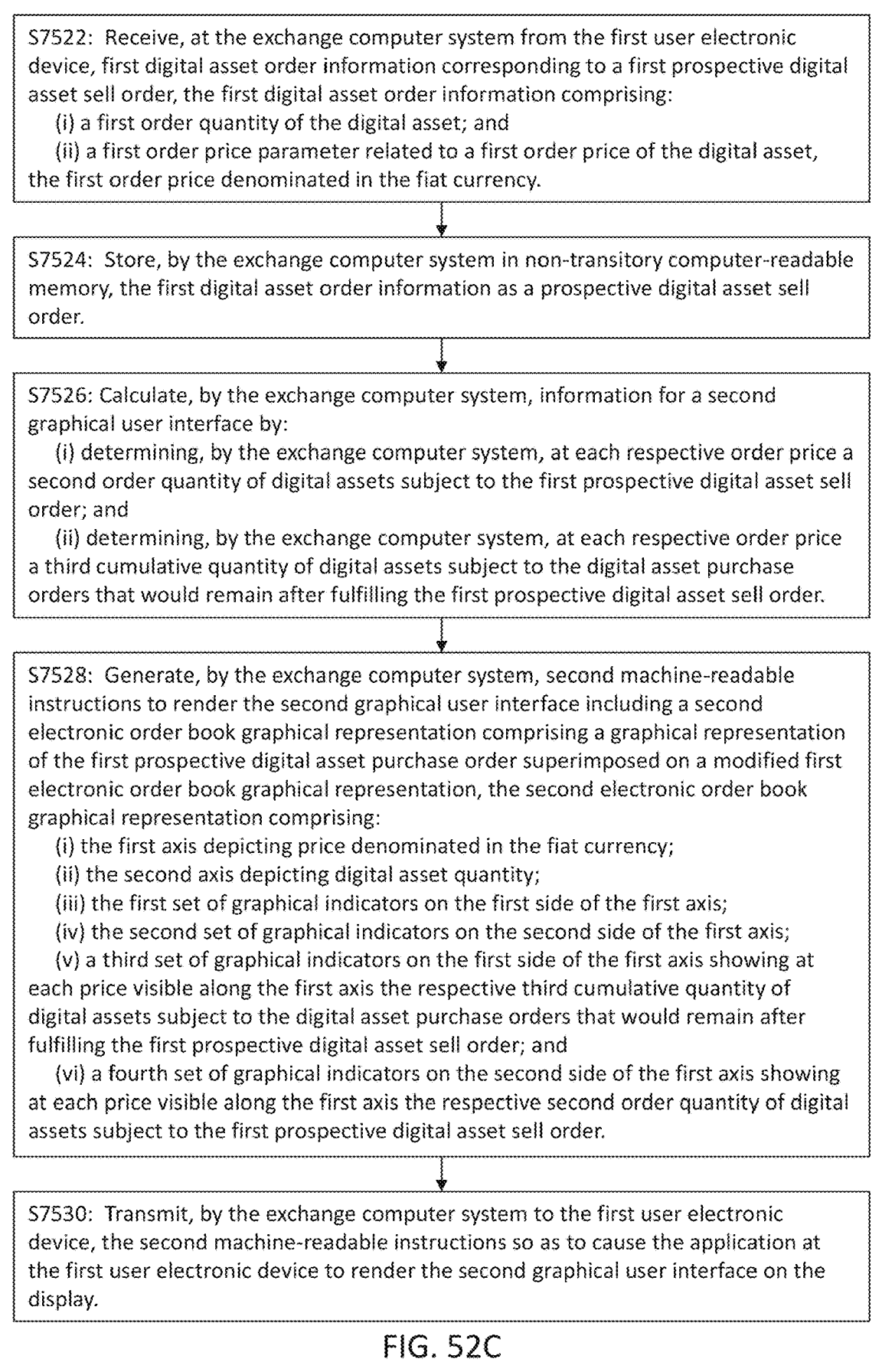

S7522: Receive, at the exchange computer system from the first user electronic device, first digital asset order information corresponding to a first prospective digital asset sell order, the first digital asset order information comprising:
(i) a first order quantity of the digital asset; and
(ii) a first order price parameter related to a first order price of the digital asset, the first order price denominated in the fiat currency.

↓

S7524: Store, by the exchange computer system in non-transitory computer-readable memory, the first digital asset order information as a prospective digital asset sell order.

↓

S7526: Calculate, by the exchange computer system, information for a second graphical user interface by:
(i) determining, by the exchange computer system, at each respective order price a second order quantity of digital assets subject to the first prospective digital asset sell order; and
(ii) determining, by the exchange computer system, at each respective order price a third cumulative quantity of digital assets subject to the digital asset purchase orders that would remain after fulfilling the first prospective digital asset sell order.

↓

S7528: Generate, by the exchange computer system, second machine-readable instructions to render the second graphical user interface including a second electronic order book graphical representation comprising a graphical representation of the first prospective digital asset purchase order superimposed on a modified first electronic order book graphical representation, the second electronic order book graphical representation comprising:
(i) the first axis depicting price denominated in the fiat currency;
(ii) the second axis depicting digital asset quantity;
(iii) the first set of graphical indicators on the first side of the first axis;
(iv) the second set of graphical indicators on the second side of the first axis;
(v) a third set of graphical indicators on the first side of the first axis showing at each price visible along the first axis the respective third cumulative quantity of digital assets subject to the digital asset purchase orders that would remain after fulfilling the first prospective digital asset sell order; and
(vi) a fourth set of graphical indicators on the second side of the first axis showing at each price visible along the first axis the respective second order quantity of digital assets subject to the first prospective digital asset sell order.

↓

S7530: Transmit, by the exchange computer system to the first user electronic device, the second machine-readable instructions so as to cause the application at the first user electronic device to render the second graphical user interface on the display.

FIG. 52C

Time Until Auction Close

00:00:28

Current Auction Data (10/02/2016)

| Time (ET) | Highest Bid ($)* | Lowest Ask ($)* | Indicative Price ($) | Auction Qty (BTC) | Diff ($) | Diff (%) |
|---|---|---|---|---|---|---|
| ○ 15:59:30 | 604.98 | 605.45 | 604.25 | 1600.00 | -0.87 | -0.16 |
| ○ 15:59:15 | 604.98 | 605.45 | 604.25 | 1600.00 | -0.87 | -0.16 |
| ○ 15:59:00 | 604.99 | 605.44 | 604.48 | 1149.70 | -0.73 | -0.12 |
| ○ 15:58:00 | 605.47 | 605.48 | 604.48 | 1155.26 | -1.00 | -0.16 |
| ○ 15:57:00 | 605.47 | 605.48 | 604.49 | 1100.00 | -0.99 | -0.16 |
| ○ 15:56:00 | 605.47 | 605.48 | 604.90 | 1103.11 | -0.58 | -0.09 |
| ○ 15:55:00 | 605.47 | 605.48 | 604.25 | 1141.90 | -1.23 | -0.20 |

*Highest Bid ($) and Lowest Ask ($) are from the continuous trading order book at the time of the indicative or final auction event.*

SYSTEMS, METHODS, AND PROGRAM PRODUCTS FOR VERIFYING DIGITAL ASSETS HELD IN A CUSTODIAL DIGITAL ASSET WALLET

RELATED APPLICATIONS

This application claims priority to U.S. Provisional Patent Application Ser. No. 62/629,417, filed Feb. 12, 2018 entitled SYSTEMS, METHODS, AND PROGRAM PRODUCTS FOR VERIFYING DIGITAL ASSETS HELD IN A CUSTODIAL DIGITAL ASSET WALLET, the entire content of which is incorporated by reference herein as if fully set forth herein.

This application also claims priority as a continuation-in-part to U.S. patent application Ser. No. 15/847,096, filed on Dec. 19, 2017, entitled SYSTEMS, METHODS, AND PROGRAM PRODUCTS FOR OPERATING EXCHANGE TRADED PRODUCTS HOLDING DIGITAL MATH-BASED ASSETS, which in turn is a continuation of U.S. patent application Ser. No. 14/318,456, filed Jun. 27, 2014 and entitled SYSTEMS, METHODS, AND PROGRAM PRODUCTS FOR OPERATING EXCHANGE TRADED PRODUCTS HOLDING DIGITAL MATH-BASED ASSETS, issued as U.S. Pat. No. 9,892,460 on Feb. 13, 2018, which in turn claims priority to U.S. Ser. No. 61/989,047, filed on May 6, 2014, U.S. Ser. No. 61/986,685, filed on Apr. 30, 2014, U.S. Ser. No. 61/978,724, filed on Apr. 11, 2014, U.S. Ser. No. 61/971,981, filed on Mar. 28, 2014, U.S. Ser. No. 61/955,017, filed on Mar. 18, 2014, U.S. Ser. No. 61/933,428, filed on Jan. 30, 2014, U.S. Ser. No. 61/920,534, filed on Dec. 24, 2013, U.S. Ser. No. 61/903,245, filed on Nov. 12, 2013, U.S. Ser. No. 61/900,191, filed on Nov. 5, 2013, U.S. Ser. No. 61/891,294, filed on Oct. 15, 2013, U.S. Ser. No. 61/857,691, filed on Jul. 23, 2013, U.S. Ser. No. 61/857,141, filed on Jul. 22, 2013, U.S. Ser. No. 61/856,323, filed on Jul. 19, 2013, U.S. Ser. No. 61/841,760, filed on Jul. 1, 2013, and U.S. Ser. No. 61/841,177, filed on Jun. 28, 2013, and the entire contents of all of these application are incorporated herein by reference.

This application also claims priority as a continuation-in-part to U.S. Ser. No. 14/818,148 entitled COMPUTER-GENERATED GRAPHICAL INTERFACE filed Aug. 4, 2015 which in turn claims priority as a continuation-in-part to U.S. Ser. No. 14/611,136, filed on Jan. 30, 2015, which in turn claims priority as a continuation-in-part to U.S. Ser. No. 14/320,900, filed on Jul. 1, 2014, which in turn claims priority as a continuation-in-part to U.S. Ser. No. 14/318,456, filed on Jun. 27, 2014, which in turn claims priority to U.S. Ser. No. 61/989,047, filed on May 6, 2014, U.S. Ser. No. 61/986,685, filed on Apr. 30, 2014, U.S. Ser. No. 61/978,724, filed on Apr. 11, 2014, U.S. Ser. No. 61/971,981, filed on Mar. 28, 2014, U.S. Ser. No. 61/955,017, filed on Mar. 18, 2014, U.S. Ser. No. 61/933,428, filed on Jan. 30, 2014, U.S. Ser. No. 61/920,534, filed on Dec. 24, 2013, U.S. Ser. No. 61/903,245, filed on Nov. 12, 2013, U.S. Ser. No. 61/900,191, filed on Nov. 5, 2013, U.S. Ser. No. 61/891,294, filed on Oct. 15, 2013, U.S. Ser. No. 61/857,691, filed on Jul. 23, 2013, U.S. Ser. No. 61/857,141, filed on Jul. 22, 2013, U.S. Ser. No. 61/856,323, filed on Jul. 19, 2013, U.S. Ser. No. 61/841,760, filed on Jul. 1, 2013, and U.S. Ser. No. 61/841,177, filed on Jun. 28, 2013, the contents of each of which are incorporated by reference as if fully set forth herein. This application further claims priority as a continuation-in-part to U.S. Ser. No. 29/518,239, filed on Feb. 20, 2015, U.S. Ser. No. 29/518,241, filed on Feb. 20, 2015, and U.S. Ser. No. 29/518,242, filed on Feb. 20, 2015, the contents of each of which are incorporated by reference as if fully set forth herein.

This application further relates to U.S. Ser. No. 14/318,475, filed on Jun. 27, 2014, U.S. Ser. No. 14/315,156, filed on Jun. 25, 2014, U.S. Ser. No. 14/315,173, filed on Jun. 25, 2014, and U.S. Ser. No. 14/313,873, filed on Jun. 24, 2014, the contents of each of which are incorporated by reference as if fully set forth herein.

FIELD

The present invention generally relates to digital math-based assets, and computer systems, methods and program products that verify control over digital assets held in a custodial digital asset wallet of a digital asset exchange.

SUMMARY

Systems, methods, and program products for use with custodial electronics wallets for ETPs holding digital assets, including digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, IOcoin, Terracoin, Liquidcoin, BBQcoin, BitBars, Gas, Tether and PhenixCoin to name a few, and other financial products or services based on the same, are disclosed.

In embodiments, a computer-implemented method includes steps of (a) generating, by a trust computer system, script instructions to carry out a transaction involving one or more digital wallets held in a trust custody account so as to verify control of digital assets held in the one or more digital wallets, the trust computer system being operatively connected to a decentralized digital asset network that uses a decentralized electronic ledger in the form of a blockchain maintained by a plurality of physically remote computer systems to track at least one of asset ownership or transactions in a digital math based asset system, the step of generating script instructions includes: (i) accessing a statement associated with an event that occurred within a predetermined time frame; (b) generating, by the trust computer system, based on the script instructions, a transaction with the following parameters: (i) a first input of a first amount of digital assets from a digital asset account associated with the trust custody account as accessed through the decentralized digital asset network using a trust custody account digital asset account identifier; (ii) a first output of a second amount of digital assets to the digital asset account associated with the trust custody account as accessed through the decentralized digital asset network using the trust custody account digital asset account identifier, the first amount of digital assets being equal to the second amount of digital assets; (iii) a second input of a third amount of digital assets from a digital asset account associated with an operating account as accessed through the decentralized digital asset network using an operating account digital asset account identifier; (iv) a second output of a fourth amount of digital assets to the digital asset account associated with the operating account as accessed through the decentralized digital asset network using the operating account digital asset account identifier, the fourth amount of digital assets being reduced relative to the third amount by a transaction fee amount; (v) a third output that comprises the statement in a memo field; (vi) applying a digital signature to the transaction using a private key associated with the trust custody account; (c) performing, by the trust computer system, the transaction.

In embodiments, the step of generating script instructions includes: (ii) determining whether the statement fits within memo field length constraints of the script associated with the digital asset type; (iii) if the determining step (ii) indicates that the statement fits within the memo field length constraints, maintaining the statement in its original form; and (iv) if the determining step (ii) indicates that the statement does not fit within the memo field length constraints, generating a cryptographic hash of the statement.

In embodiments, the determining step (ii) indicates that the statement does not fit within the memo field length constraints and the third output comprises the statement as the cryptographic hash.

In embodiments, the statement is a news headline.

In embodiments, the predetermined time period is a most recent time period as measured backwards from a present time.

In embodiments, the trust computer system is associated with an administrative computer system of at least one of the following types of financial markets: futures exchange, commodities exchange, currency exchange, spot exchange and lending exchange.

In embodiments, the trust computer system is associated with an administrative computer system of at least one of the following types of investment funds: exchange traded fund and mutual fund.

In embodiments, the digital math-based asset is bitcoin.

In embodiments, the digital math-based asset is based on a mathematical protocol for proof of work.

In embodiments, the mathematical protocol is open source.

In embodiments, the mathematical protocol includes a one-way cryptographic algorithm.

In embodiments, the mathematical protocol includes a sequential hard memory function.

In embodiments, the digital math-based asset is based on a mathematical protocol for proof of stake.

In embodiments, the mathematical protocol is open source.

In embodiments, the digital math-based asset is based on a cryptographic mathematical protocol.

In embodiments, the digital math-based asset is based on a mathematical protocol for a hybrid of proof of work and proof of stake.

In embodiments, the digital math-based asset is based on a mathematical protocol for proof of stake velocity.

In embodiments, the mathematical protocol relies upon ownership of respective digital math-based asset as a function of duration of ownership.

In embodiments, the digital math-based asset is based on a mathematical protocol for proof of burn.

In embodiments, a number of digital math-based assets in the decentralized digital assert network is limited.

In embodiments, a number of digital math-based assets in the decentralized digital assert network is not limited.

In embodiments, a specified number of digital math-based assets in the decentralized digital assert network is added into circulation during a defined time period.

In embodiments, the step of generating, by a trust computer system, script instructions is initiated in response to a request for proof of control from a verifier computer system that sends a pre-selected statement to the trust computer system.

In embodiments, the verifier computer system is an auditor computer system.

In embodiments, the method further includes steps of: (d) accessing, by the verifier computer system, a plurality of updates to the decentralized electronic ledger; (e) analyzing, by the verifier computer system, each of the plurality of updates for a confirmation of receipt, by a node in the decentralized digital asset network, of the third output; and (f) determining, by the verifier computer system, whether the statement in the third output is correct by comparing the statement with the pre-selected statement.

In embodiments, the step (c) of performing, by the trust computer system, the transaction includes: (i) removing the first amount of digital assets from the digital asset account associated with the trust custody account as accessed through the decentralized digital asset network using a trust custody account digital asset account identifier; (ii) adding the second amount of digital assets to the digital asset account associated with the trust custody account as accessed through the decentralized digital asset network using the trust custody account digital asset account identifier, the first amount of digital assets being equal to the second amount of digital assets; (iii) removing the third amount of digital assets from the digital asset account associated with the operating account as accessed through the decentralized digital asset network using an operating account digital asset account identifier; (iv) adding the fourth amount of digital assets to the digital asset account associated with the operating account as accessed through the decentralized digital asset network using the operating account digital asset account identifier, the fourth amount of digital assets being reduced relative to the third amount by a transaction fee amount; and (v) generating the third output that comprises the statement in a memo field.

BRIEF DESCRIPTION OF THE DRAWINGS

Exemplary embodiments of the present invention will be described with references to the accompanying figures, wherein:

FIG. 2 is an exemplary screen shot of an excerpt of an exemplary bitcoin transaction log showing addresses in accordance with exemplary embodiments of the present invention;

FIG. 8 is a flow chart of a method of performing a secure transaction in accordance with exemplary embodiments of the present invention;

FIG. 19C is a flow chart of an exemplary process for redemption of shares in an exchange traded product holding digital math-based assets in accordance with exemplary embodiments of the present invention;

FIGS. 31A-B are a schematic diagram and corresponding flow chart of a process for digital asset exchange account digital asset withdrawal in accordance with exemplary embodiments of the present invention;

FIGS. 52A-C are flow charts of exemplary processes for generating graphical user interfaces representing an electronic order book in accordance with exemplary embodiments of the present invention.

DETAILED DESCRIPTION

Digital Math-Based Assets and Bitcoin

Figure 1:
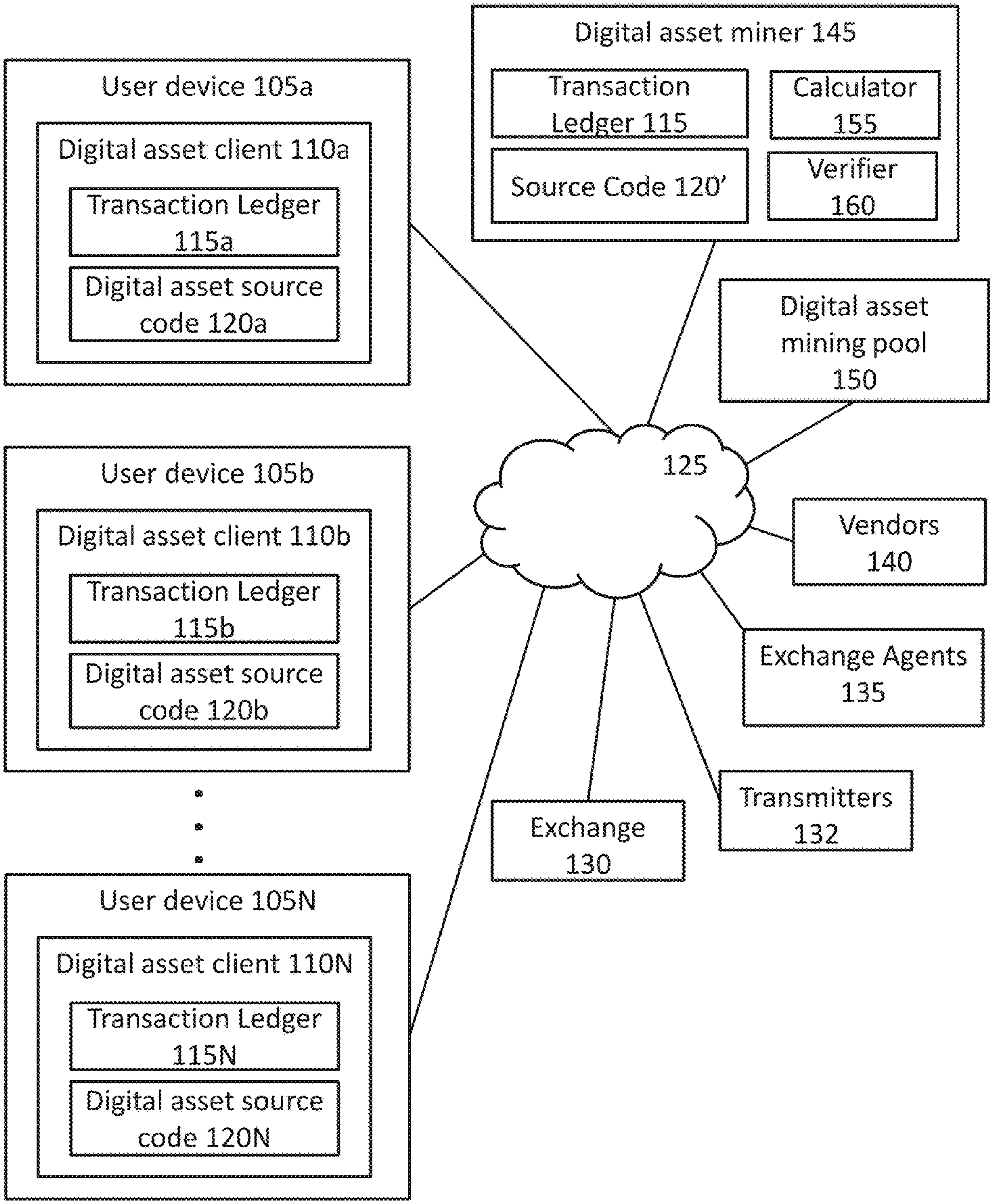
FIG. 1 is a schematic diagram of a digital asset network in accordance with exemplary embodiments of the present invention.

A digital math-based asset is a kind of digital asset based upon a computer generated mathematical and/or cryptographic protocol that may, among other things, be exchanged for value and/or be used to buy and sell goods or pay for services. A digital math-based asset may be a non-tangible asset that is not based upon a governmental rule, law, regulation, and/or backing. The Bitcoin system represents one form of digital math-based asset. A bitcoin may be a unit of the Bitcoin digital math-based asset. Other examples of digital math-based assets include Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, IOcoin, Terracoin, Liquidcoin, BBQcoin, BitBars, Gas, Tether and PhenixCoin, to name a few. In embodiments, digital math-based assets, such as bitcoin, may be accepted in trade by merchants, other businesses, and/or individuals in many parts of the world.

Digital assets may also include "tokens," which like other digital assets can represent anything from loyalty points to vouchers and IOUs to actual objects in the physical world. Tokens can also be tools, such as in-game items, for interacting with other smart contracts. A token is a "smart contract" running on top of a blockchain network (such as the Ethereum Blockchain, the Bitcoin Blockchain, to name a few). As such, it is a set of code with an associated database. In embodiments, the database may be maintained by an issuer. The code describes the behavior of the token, and the database is basically a table with rows and columns tracking who owns how many tokens.

In embodiments, a smart contract may be a computer protocol intended to digitally facilitate, verify, or enforce the negotiation or performance of credible transactions without third parties. In embodiments, smart contracts may also allow for the creation of tokens.

In embodiments, a digital math-based asset may be based on an open source mathematical and/or cryptographic protocol, which may exist on a digital asset network, such as a Bitcoin network. The network may be centralized, e.g., run by one or more central servers, or decentralized, e.g., run through a peer-to-peer network. Digital math-based assets may be maintained, tracked, and/or administered by the network.

A digital math-based asset system may use a decentralized electronic ledger system, which may be maintained by a plurality of physically remote computer systems. Such a ledger may be a public transaction, which may track asset ownership and/or transactions in a digital math-based asset system. The ledger may be a decentralized public transaction ledger, which can be distributed to users in the network, e.g., via a peer-to-peer sharing. Ledger updates may be broadcast to the users across the network. Each user may maintain an electronic copy of all or part of the ledger, as described herein. In embodiments, a digital asset system may employ a ledger that tracks transactions (e.g., transfers of assets from one address to another) without identifying the assets themselves.

In embodiments, a digital asset ledger, such as the Bitcoin blockchain, can be used to achieve consensus and to solve double-spending problems where users attempt to spend the same digital assets in more than one transaction. In embodiments, before a transaction may be cleared, the transaction participants may need to wait for some period of time, e.g., a six-confirmation wait (typically one hour in the context of the Bitcoin network, 15 minutes in the context of the Litecoin network, to name a few), before feeling confident that the transaction is valid, e.g., not a double count. Each update to the decentralized electronic ledger (e.g., each addition of a block to the Bitcoin blockchain) following execution of a transaction may provide a transaction confirmation. After a plurality of updates to the ledger, e.g., 6 updates, the transaction may be confirmed with certainty or high certainty.

In embodiments, a blockchain can be a public transaction ledger of the digital math-based asset network, such as the Bitcoin network. For example, one or more computer systems (e.g., miners) or pools of computer systems (e.g., mining pools) can solve algorithmic equations allowing them to add records of recent transactions (e.g., blocks), to a chain of transactions. In embodiments, miners or pools of miners may perform such services in exchange for some consideration such as an upfront fee (e.g., a set amount of math-based assets) and/or a payment of transaction fees (e.g., a fixed amount or set percentage of the transaction) from users whose transactions are recorded in the block being added.

The digital asset network (e.g., Bitcoin network) may timestamp transactions by including them in blocks that form an ongoing chain called a blockchain. In embodiments, the addition of a block may occur periodically, e.g., approximately every 2.5 minutes or every 10 minutes, to name a few. Such blocks cannot be changed without redoing the work that was required to create each block since the modified block. The longest blockchain may serve not only as proof of the sequence of events but also records that this sequence of events was verified by a majority of the digital asset network's computing power. The blockchain recognized by the nodes corresponding to the majority of computing power will become the accepted blockchain for the network. In embodiments, confirmation of a transaction may be attained with a high degree of accuracy following the addition of six blocks to the blockchain after a transaction was performed. As long as a majority of computing power is controlled by nodes that are not cooperating to attack the network, they will generate the longest blockchain of records and outpace attackers.

In embodiments, transaction messages can be broadcast on a best effort basis, and nodes can leave and rejoin the network at will. Upon reconnection, a node can download and verify new blocks from other nodes to complete its local copy of the blockchain.

In the exemplary Bitcoin system, a bitcoin is defined by a chain of digitally-signed transactions that began with its creation as a block reward through bitcoin mining. Each owner transfers bitcoin to the next by digitally signing them over to the next owner in a bitcoin transaction. A payee can then verify each previous transaction, e.g., by analyzing the blockchain, to verify the chain of ownership.

Other examples of different types of blockchains noted above that are consistent with embodiments of present invention pose unique problems. Certain currencies present unique challenges in that transactions and/or wallets may be shielded. For example, Monero is based on the CryptoNight proof-of-work hash algorithm and possesses significant algorithmic differences relating to blockchain obfuscation. Monero provides a high level of privacy and is fungible such that every unit of the currency can be substituted by another unit. Monero is therefore different from public-ledger cryptocurrencies such as Bitcoin, where addresses with coins previously associated with undesired activity can be blacklisted and have their coins refused by others.

In embodiments, "proof of brain" may be a type of token reward algorithm used in social media blockchain systems that encourages people to create and curate content. In embodiments, proof of brain may enable token distribution by upvote and like-based algorithms, which may be integrated with websites to align incentives between application owners and community members to spur growth.

In particular, ring signatures mix spender's address with a group of others, making it more difficult to establish a link between each subsequent transaction. In addition, Monero provides "stealth addresses" generated for each transaction which make it impossible to discover the actual destination address of a transaction by anyone else other than the sender and the receiver. Further, the "ring confidential transactions" mechanism hides the transferred amount as well. Monero is designed to be resistant to application-specific integrated circuit mining, which is commonly used to mine other cryptocurrencies such as Bitcoin, however, it can be mined somewhat efficiently on consumer grade hardware such as x86, x86-64, ARM and GPUs.

Another example of a modified blockchain consistent with embodiments of the present invention discussed above is Darkcoin. Darkcoin adds an extra layer of privacy by automatically combining any transaction its users make with those of two other users-a feature it calls Darksend-so that anyone analyzing the blockchain has a harder time figuring out where a particular user's money ended up.

Yet another example of a modified blockchain consistent with embodiments of the present invention discussed above is Zcash. The Zcash network supports different types of transactions: embodiments of the present i Transparent transactions use a transparent address (e.g., "t-addresse). In embodiments, transactions between two t-addresses behave like Bitcoin transactions and the balance and amounts transferred are publicly visible on the Zcash blockchain. Unlike the Bitcoin Blockchain, the Zcash network may also support shielded transactions using a shield address (e.g., shield addr). In embodiments, the embodiments, te.g., using a, the Zcash network may also support ons and the balance and amounts tre.g., "zk-SNARKS" or te.g., using a, the Zcash network may also support ons and the balance and amounts t Zcash blockchain icly amount transferred into and out of a z-address is private if between two z-addresses r, th may be public if between a z-address and a t-address.

FIG. 2 is an exemplary screen shot of an excerpt of a bitcoin transaction log or transaction ledger 115 showing digital asset account identifiers (e.g., addresses) corresponding to origin and destination accounts for each transaction and amount information for each transaction. The exemplary log 115 includes transaction identifiers, date and/or time information, fee information, digital asset account identifiers for the origin accounts, digital asset account identifiers for the destination accounts, and amounts transferred to and from each account. Such a ledger may also include description information (such as notes describing a transaction, e.g. "rent payment") and/or balance information. Other forms of transaction logs can be used consistent with the present invention. In an embodiment the description information may be included as a message in a request for a transaction, as is discussed in detail with respect to FIGS. 53 and 54 and discussed below. The description information discussed above thus may also be used to confirm control of over a particular account.

As can be seen in FIG. 2, digital asset transfers may begin from a single origin and be sent to a single destination or multiple destinations. Similarly, digital assets may be transferred from multiple origins to one or more destinations.

An exemplary embodiment of a digital asset network is illustrated in FIG. 1. In embodiments, other digital math-based assets can be maintained and/or administered by other digital math-based asset networks. Without meaning to limit the invention, a digital math-based asset network will be discussed with reference to a Bitcoin network by example. A digital math-based asset network, such as a Bitcoin network, may be an online, end-user to end-user network hosting a public transaction ledger 115 and governed by source code 120 comprising cryptologic and/or algorithmic protocols. A digital asset network can comprise a plurality of end users, a . . . N, each of which may access the network using one or more corresponding user device 105*a*, 105*b*, . . . 105N. In embodiments, user devices 105 may be operatively connected to each other through a data network 125, such as the Internet, a wide area network, a local area network, a telephone network, dedicated access lines, a proprietary network, a satellite network, a wireless network, a mesh network, or through some other form of end-user to end-user interconnection, which may transmit data and/or other information. Any participants in a digital asset network may be connected directly or indirectly, as through the data network 125, through wired, wireless, or other connections.

In the exemplary embodiment, each user device 105 can run a digital asset client 110, e.g., a Bitcoin client, which can comprise digital asset source code 120 and an electronic transaction ledger 115. The source code 120 can be stored in processor readable memory, which may be accessed by and/or run on one or more processors. The electronic transaction ledger 115 can be stored on the same and/or different processor readable memory, which may be accessible by the one or more processors when running the source code 120. In embodiments, the electronic transaction leger 115*a* (contained on a user device 105*a*) should correspond with the electronic transaction ledgers 115*b* . . . 115N (contained on user devices 105*b* . . . 105N), to the extent that the corresponding user device has accessed the Internet and been updated (e.g., downloaded the latest transactions). Accordingly, the electronic transaction ledger may be a public ledger. Exemplary embodiments of digital asset clients 110 for the Bitcoin network (Bitcoin clients) include Bitcoin-Qt and Bitcoin Wallet, to name a few. In embodiments, some of the transactions on the public ledger may be encrypted or otherwise shielded so that only authorized users may access ledger information about such transactions or wallets.

In addition, a digital asset network, such as a Bitcoin network, may include one or more digital asset exchange 130, such as Bitcoin exchanges (e.g., BitFinex, BTC-e). Digital asset exchanges may enable or otherwise facilitate the transfer of digital assets, such as bitcoin, and/or conversions involving digital assets, such as between different digital assets and/or between a digital asset and non-digital assets, currencies, to name a few. The digital asset network may also include one or more digital asset exchange agents 135, e.g., a Bitcoin exchange agent. Exchange agents 135 may facilitate and/or accelerate the services provided by the exchanges. Exchanges 130, transmitters 132, and/or exchange agents 135 may interface with financial institutions (e.g., banks) and/or digital asset users. Transmitters 132 can include, e.g., money service businesses, which could be licensed in appropriate geographic locations to handle financial transactions. In embodiments, transmitters 132 may be part of and/or associated with a digital asset exchange 130. Like the user devices 105, digital asset exchanges 130, transmitters 132, and exchange agents 135 may be connected to the data network 125 through wired, wireless, or other connections. They may be connected directly and/or indirectly to each other and/or to one or more user device 105 or other entity participating in the digital asset system.

Digital assets may be sub-divided into smaller units or bundled into blocks or baskets. For example, for bitcoin, subunits, such as a Satoshi, as discussed herein, or larger units, such as blocks of bitcoin, may be used in exemplary embodiments. Each digital asset, e.g., bitcoin, may be subdivided, such as down to eight decimal places, forming 100 million smaller units. For at least bitcoin, such a smaller unit may be called a Satoshi. Other forms of division can be made consistent with embodiments of the present invention.

In embodiments, the creation and transfer of digital math-based assets can be based on an open source mathematical and/or cryptographic protocol, which may not be managed by any central authority. Digital assets can be transferred between one or more users or between digital asset accounts and/or storage devices (e.g., digital wallets) associated with a single user, through a network, such as the Internet, via a computer, smartphone, or other electronic device without an intermediate financial institution. In embodiments, a single digital asset transaction can include amounts from multiple origin accounts transferred to multiple destination accounts. Accordingly, a transaction may comprise one or more input amounts from one or more origin digital asset accounts and one or more output amounts to one or more destination accounts. Origin and destination may be merely labels for identifying the role a digital asset account plays in a given transaction; origin and destination accounts may be the same type of digital asset account.

In embodiments, a digital math-based asset system may produce digital asset transaction change. Transaction change refers to leftover digital asset amounts from transactions in digital asset systems, such as Bitcoin, where the transactions are comprised of one or more digital inputs and outputs. A digital asset account can store and/or track unspent transaction outputs, which it can use as digital inputs for future transactions. In embodiments, a wallet, third-party system, and/or digital asset network may store an electronic log of digital outputs to track the outputs associated with the assets contained in each account. In digital asset systems such as Bitcoin, digital inputs and outputs cannot be subdivided. For example, if a first digital asset account is initially empty and receives a transaction output of 20 BTC (a bitcoin unit) from a second digital asset account, the first account then stores that 20 BTC output for future use as a transaction input. To send 15 BTC, the first account must use the entire 20 BTC as an input, 15 BTC of which will be a spent output that is sent to the desired destination and 5 BTC of which will be an unspent output, which is transaction change that returns to the first account. An account with digital assets stored as multiple digital outputs can select any combination of those outputs for use as digital inputs in a spending transaction. In embodiments, a digital wallet may programmatically select outputs to use as inputs for a given transaction to minimize transaction change, such as by combining outputs that produce an amount closest to the required transaction amount and at least equal to the transaction amount.

Referring again to FIG. 1, a digital asset network may include digital asset miners 145. Digital asset miners 145 may perform operations associated with generating or minting new digital assets, and/or operations associated with confirming transactions, to name a few. Digital asset miners 145 may collaborate in one or more digital asset mining pools 150, which may aggregate power (e.g., computer processing power) so as to increase output, increase control, increase likelihood of minting new digital assets, increase likelihood of adding blocks to a blockchain, to name a few.

In embodiments, the processing of digital asset transactions, e.g., bitcoin transactions, can be performed by one or more computers over a distributed network, such as digital asset miners 145, e.g., bitcoin miners, and/or digital asset mining pools 150, e.g., bitcoin mining pools. In embodiments, mining pools 150 may comprise one or more miners 145, which miners 145 may work together toward a common goal. Miners 145 may have source code 120', which may govern the activities of the miners 145. In embodiments, source code 120' may be the same source code as found on user devices 105. These computers and/or servers can communicate over a network, such as an internet-based network, and can confirm transactions by adding them to a ledger 115, which can be updated and archived periodically using peer-to-peer file sharing technology. For example, a new ledger block could be distributed on a periodic basis, such as approximately every 10 minutes. In embodiments, the ledger may be a blockchain. Each successive block may record transactions that have occurred on the digital asset network. In embodiments, all digital asset transactions may be recorded as individual blocks in the blockchain. Each block may contain the details of some or all of the most recent transactions that are not memorialized in prior blocks. Blocks may also contain a record of the award of digital assets, e.g., bitcoin, to the miner 145 or mining pool 150 who added the new block, e.g., by solving calculations first.

A miner 145 may have a calculator 155, which may solve equations and/or add blocks to the blockchain. The calculator 155 may be one or more computing devices, software, or special-purpose device, to name a few. In embodiments, in order to add blocks to the blockchain, a miner 145 may be required to map an input data set (e.g., the blockchain, plus a block of the most recent transactions on the digital asset network, e.g., transactions on the Bitcoin network, and an arbitrary number, such as a nonce) to a desired output data set of predetermined length, such as a hash value. In embodiments, mapping may be required to use one or more particular cryptographic algorithms, such as the SHA-256 cryptographic hash algorithm or scrypt, to name a few. In embodiments, to solve or calculate a block, a miner 145 may be required to repeat this computation with a different nonce until the miner 145 generates a SHA-256 hash of a block's header that has a value less than or equal to a current target set by the digital asset network. In embodiments, each unique block may only be solved and added to the blockchain by one miner 145. In such an embodiment, all individual miners 145 and mining pools 150 on the digital asset network may be engaged in a competitive process and may seek to increase their computing power to improve their likelihood of solving for new blocks. In embodiments, successful digital asset miners 145 or mining pools 150 may receive an incentive, such as, e.g., a fixed number of digital assets (e.g., bitcoin) and/or a transaction fee for performing the calculation first and correctly and/or in a verifiable manner.

In embodiments, the cryptographic hash function that a miner 145 uses may be one-way only and thus may be, in effect, irreversible. In embodiments, hash values may be easy to generate from input data, such as valid recent network transaction(s), blockchain, and/or nonce, but neither a miner 145 nor other participant may be able to determine the original input data solely from the hash value. Other digital asset networks may use different proof of work algorithms, such as a sequential hard memory function, like scrypt, which may be used for Litecoin. As a result, generating a new valid block with a header less than the target prescribed by the digital asset network may be initially difficult for a miner 145, yet other miners 145 can easily confirm a proposed block by running the hash function at least once with a proposed nonce and other identified input data. In embodiments, a miner's proposed block may be added to the blockchain once a defined percentage or number of nodes (e.g., a majority of the nodes) on the digital asset network confirms the miner's work. A miner 145 may have a verifier 160, which may confirm other miners' work. A verifier 160 may be one or more computers, software, or specialized device, to name a few. A miner 145 that solved such a block may receive the reward of a fixed number of digital assets and/or any transaction fees paid by transferors whose transactions are recorded in the block. "Hashing" may be viewed as a mathematical lottery where miners that have devices with greater processing power (and thus the ability to make more hash calculations per second) are more likely to be successful miners 145. In embodiments, as more miners 145 join a digital asset network and as processing power increases, the digital asset network may adjust the complexity of the block-solving equation to ensure that one newly-created block is added to the blockchain approximately every ten minutes. Digital asset networks may use different processing times, e.g., approximately 2.5 minutes for Litecoin, approximately 10 minutes for Bitcoin, to name a few.

In addition to archiving transactions, a new addition to a ledger can create or reflect creation of one or more newly minted digital assets, such as bitcoin. In embodiments, new digital math-based assets may be created through a mining process, as described herein. In embodiments, the number of new digital assets created can be limited. For example, in embodiments, the number of digital assets (e.g., bitcoin) minted each year is halved every four years until a specified year, e.g., 2140, when this number will round down to zero. At that time no more digital assets will be added into circulation. In the exemplary embodiment of bitcoin, the total number of digital assets will have reached a maximum of 21 million assets in denomination of bitcoin. Other algorithms for limiting the total number of units of a digital math-based asset can be used consistent with exemplary embodiments of the present invention. For example, the Litecoin network is anticipated to produce 84 million Litecoin. In embodiments, the number of digital assets may not be capped and thus may be unlimited. In embodiments, a specified number of coins may be added into circulation each year, e.g., so as to create a 1% inflation rate.

In embodiments, the mining of digital assets may entail solving one or more mathematical calculations. In embodiments, the complexity of the mathematical calculations may increase over time and/or may increase as computer processing power increases. In embodiments, result of solving the calculations may be the addition of a block to a blockchain, which may be a transaction ledger, as described further below. Solving the calculations may verify a set of transactions that has taken place. Solving the calculations may entail a reward, e.g., a number of digital math-based assets and/or transaction fees from one or more of the verified transactions.

Different approaches are possible for confirming transactions and/or creating new assets. In embodiments, a digital asset network may employ a proof of work system. A proof of work system may require some type of work, such as the solving of calculations, from one or more participants (e.g., miners 145) on the network to verify transactions and/or create new assets. In embodiments, a miner 145 can verify as many transactions as computationally possible. A proof of work system may be computationally and/or energy intensive. In embodiments, the network may limit the transactions that a miner 145 may verify.

In embodiments, a digital asset network may employ a proof of stake system. In a proof of stake system, asset ownership may be tied to transaction verification and/or asset creation. Asset ownership can include an amount of assets owned and/or a duration of ownership. The duration of ownership may be measured linearly as time passes while a user owns an asset. In an exemplary embodiment, a user holding 4% of all digital assets in a proof of stake system can generate 4% of all blocks for the transaction ledger. A proof of stake system may not require the solution of complex calculations. A proof of stake system may be less energy intensive than a proof of work system. In embodiments, a hybrid of proof of work and proof of stake systems may be employed. For example, a proof of work system may be employed initially, but as the system becomes too energy intensive, it may transition to a proof of stake system.

Proof or work and proof of stake are both examples of consensus algorithms. Such consensus algorithms have as their goal providing a method of reaching consensus to improve the system whether it be on ways of improving transactions, upgrading the network, etc.

In embodiments, asset creation and/or transaction confirmation can be governed by a proof of stake velocity system. Proof of stake velocity may rely upon asset ownership where the function for measuring duration of ownership is not linear. For example, an exponential decay time function may ensure that assets more newly held correspond to greater power in the system. Such a system can incentivize active participation in the digital math-based asset system, as opposed to storing assets passively.

In embodiments, a proof of burn system may be employed. Proof of burn may require destroying assets or rendering assets unspendable, such as by sending them to an address from which they cannot be spent. Destroying or rendering assets unusable can be an expensive task within the digital math-based asset system, yet it may not have external costs such as the energy costs that can be associated with mining in a proof of work system.

Blockchains can include a consensus generating protocol through which the network determines whether a transaction is valid, included in the ledger and in what order each transaction should be included. Examples of such facilities, can include mining, proof of work, proof of stake protocols, to name a few.

Digital Asset Accounts and Transaction Security

Digital assets may be associated with a digital asset account, which may be identified by a digital asset address. A digital asset account can comprise at least one public key and at least one private key, e.g., based on a cryptographic protocol associated with the particular digital asset system, as discussed herein. One or more digital asset accounts may be accessed and/or stored using a digital wallet, and the accounts may be accessed through the wallet using the keys corresponding to the account.

Public Keys

A digital asset account identifier and/or a digital wallet identifier may comprise a public key and/or a public address. Such a digital asset account identifier may be used to identify an account in transactions, e.g., by listing the digital asset account identifier on a decentralized electronic ledger (e.g., in association with one or more digital asset transactions), by specifying the digital asset account identifier as an origin account identifier, and/or by specifying the digital asset account identifier as a destination account identifier, to name a few. The systems and methods described herein involving public keys and/or public addresses are not intended to exclude one or the other and are instead intended generally to refer to digital asset account identifiers, as may be used for other digital math-based asset. A public key may be a key (e.g., a sequence, such as a binary sequence or an alphanumeric sequence) that can be publicly revealed while maintaining security, as the public key alone cannot decrypt or access a corresponding account. A public address may be a version of a public key. In embodiments, a public key may be generated from a private key, e.g., using a cryptographic protocol, such as the Elliptic Curve Digital Signature Algorithm ("ECDSA").

In exemplary embodiments using bitcoin, a public key may be a 512-bit key, which may be converted to a 160-bit key using a hash, such as the SHA-256 and/or RIPEMD-160 hash algorithms. The 160-bit key may be encoded from binary to text, e.g., using Base58 encoding, to produce a public address comprising non-binary text (e.g., an alphanumeric sequence). Accordingly, in embodiments, a public address may comprise a version (e.g., a shortened yet not truncated version) of a public key, which may be derived from the public key via hashing or other encoding. In embodiments, a public address for a digital wallet may comprise human-readable strings of numbers and letters around 34 characters in length, beginning with the digit 1 or 3, as in the example of 175tWpb8K1S7NmH4Zx6rew F9WQrcZv245W. The matching private key may be stored in a digital wallet or mobile device and protected by a password or other techniques and/or devices for providing authentication.

In embodiments, other cryptographic algorithms may be used such as:

(1) The elliptic curve Diffie-Hellman (ECDH) key agreement scheme;

(2) The Elliptic Curve Integrated Encryption Scheme (ECIES), also known as Elliptic Curve Augmented Encryption Scheme or simply the Elliptic Curve Encryption Scheme;

(3) The Elliptic Curve Digital Signature Algorithm (ECDSA) which is based on the Digital Signature Algorithm;

(4) The deformation scheme using Harrison's p-adic Manhattan metric;

(5) The Edwards-curve Digital Signature Algorithm (EdDSA) which is based on Schnorr signature and uses twisted Edwards curves;

(6) The ECMQV key agreement scheme which is based on the MQV key agreement scheme; and (7) The ECQV implicit certificate scheme.

In other digital asset networks, other nomenclature mechanisms may be used, such as a human-readable string of numbers and letters around 34 characters in length, beginning with the letter L for Litecoin or M or N for Namecoin or around 44 characters in length, beginning with the letter P for PPCoin, to name a few.

Private Keys

A private key in the context of a digital math-based asset, such as bitcoin, may be a sequence such as a number that allows the digital math-based asset, e.g., bitcoin, to be transferred or spent. In embodiments, a private key may be kept secret to help protect against unauthorized transactions. In a digital asset system, a private key may correspond to a digital asset account, which may also have a public key or other digital asset account identifier. While the public key may be derived from the private key, the reverse may not be true.

In embodiments related to the Bitcoin system, every Bitcoin public address has a matching private key, which can be saved in the digital wallet file of the account holder. The private key can be mathematically related to the Bitcoin public address and can be designed so that the Bitcoin public address can be calculated from the private key, but importantly, the same cannot be done in reverse.

A digital asset account, such as a multi-signature account, may require a plurality of private keys to access it. In embodiments, any number of private keys may be required. An account creator may specify the number of required keys (e.g., 2, 3, 5, to name a few) when generating a new account. More keys may be generated than are required to access and/or use an account. For example, 5 keys may be generated, and any combination of 3 of the 5 keys may be sufficient to access a digital asset account. Such an account setup can allow for additional storage and security options, such as backup keys and multi-signature transaction approval, as described herein.

Because a private key provides authorization to transfer or spend digital assets such as bitcoin, security of the private key can be important. Private keys can be stored via electronic computer files, but they may also be short enough that they can be printed or otherwise written on paper or other media. An example of a utility that allows extraction of private keys from an electronic wallet file for printing purposes is Pywallet. Other extraction utilities may also be used consistent with the present invention.

In embodiments, a private key can be made available to a program or service that allows entry or importing of private keys in order to process a transaction from an account associated with the corresponding public key. Some wallets can allow the private key to be imported without generating any transactions while other wallets or services may require that the private key be swept. When a private key is swept, a transaction is automatically broadcast so that the entire balance held by the private key is sent or transferred to another address in the wallet and/or securely controlled by the service in question.

In embodiments, using Bitcoin clients, such as BlockChain.info's My Wallet service and Bitcoin-QT, a private key may be imported without creating a sweep transaction.

In embodiments, a private key, such as for a Bitcoin account, may be a 256-bit number, which can be represented in one or more ways. For example, a private key in a hexadecimal format may be shorter than in a decimal format. For example, 256 bits in hexadecimal is 32 bytes, or 64 characters in the range 0-9 or A-F. The following is an example of a hexadecimal private key:

E9 87 3D 79 C6 D8 7D C0 FB 6A 57 78 63 33 89 F4 45 32 13 30 3D A6 1F 20 BD 67 FC 23 3A A3 32 62

In embodiments, nearly every 256-bit number is a valid private key. Specifically, any 256-bit number between 0x1 and 0xFFFF FFFF FFFF FFFF FFFF FFFF FFFF FFFE BAAE DCE6 AF48 A03B BFD2 5E8C D036 4141 is a valid private key. In embodiments, the range of valid private keys can be governed by the secp256k1 ECDSA standard used by Bitcoin. Other standards may also be used.

In embodiments, a shorter form of a private key may be used, such as a base 58 Wallet Import format, which may be derived from the private key using Base58 and/or Base58Check encoding. The Wallet Import format may be shorter than the original private key and can include built-in error checking codes so that typographical errors can be automatically detected and/or corrected. For private keys associated with uncompressed public keys, the private key may be 51 characters and may start with the number 5. For example, such a private key may be in the following format:

5Kb8kLf9zgWQnogidDA76MzPL6TsZZY36hWXMss SzNydYXYB9KF

In embodiments, private keys associated with compressed public keys may be 52 characters and start with a capital L or K.

In embodiments when a private key is imported, each private key may always correspond to exactly one Bitcoin public address. In embodiments, a utility that performs the conversion can display the matching Bitcoin public address.

The Bitcoin public address corresponding to the sample above is:

1CC3X2gu58d6wXUWMffpuzN9JAfTUWu4Kj

In embodiments, a mini private key format can be used. Not every private key or Bitcoin public address has a corresponding mini private key; they have to be generated a certain way in order to ensure a mini private key exists for an address. The mini private key is used for applications where space is critical, such as in QR codes and in physical bitcoin. The above example has a mini key, which is:

SzavMBLoXU6kDrqtUVmffv

In embodiments, any bitcoin sent to the designated address 1CC3X2gu58d6wXUWMffpuzN9JAfTUWu4Kj can be transferred or spent by anybody who knows the private key in any of the three formats (e.g., hexadecimal, base 58 wallet format, or mini private key). That includes bitcoin presently at the address, as well as any bitcoin that are ever sent to it in the future. The private key is only needed to transfer or spend the balance, not necessarily to see it. In embodiments, the bitcoin balance of the address can be determined by anybody with the public Block Explorer at http://www.blockexplorer.com/address/1CC3X2gu58d6wXUWMffpuzN9JAfTUWu4Kj—even if without access to the private key.

In embodiments, a private key may be divided into segments, encrypted, printed, and/or stored in other formats and/or other media, as discussed herein.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital crypto-currency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a Bitcoin client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

In embodiments, a digital wallet may be a custodial digital wallet. Further, the custodial digital wallet may be a segregated custodial wallet or a commingled custodial wallet. Segregated custodial digital wallets hold digital assets for the benefit of a single customer or entity. Commingled custodial accounts hold digital assets for multiple users or customers of the custodian. Segregated custodial wallets are useful for institutional clients, mutual funds and hedge funds, for example.

While many digital asset holders may hold their digital assets in their own wallets, various custodial services, like Gemini custodial services exist. In embodiments, the present invention may be used with custodial wallets. In embodiments, custodial wallets may be commingled custodial wallets which commingle digital assets from more than one client. In embodiments, custodial wallets may be segregated custodial wallets, in which digital assets for a specific client is held using one or more unique digital asset addresses maintained by the custodial service. For segregated custodial wallets, the amount of digital assets held in such wallet(s) may be verified and audited on their respective blockchain. In embodiments, segregated custodial accounts may be used for digital asset holders such as hedge funds, mutual funds, exchange traded funds, to name a few. Proof of control as described herein may be implemented to verify the amount of assets held in custodial wallets, including both segregated custodial wallets and commingled custodial wallets.

Signatures

A transaction may require, as a precondition to execution, a digital asset signature generated using a private key and associated public key for the digital asset account making the transfer. In embodiments, each transaction can be signed by a digital wallet or other storage mechanism of a user sending a transaction by utilizing a private key associated with such a digital wallet. The signature may provide authorization for the transaction to proceed, e.g., authorization to broadcast the transaction to a digital asset network and/or authorization for other users in a digital asset network to accept the transaction. A signature can be a number that proves that a signing operation took place. A signature can be mathematically generated from a hash of something to be signed, plus a private key. The signature itself can be two numbers such as r and s. With the public key, a mathematical algorithm can be used on the signature to determine that it was originally produced from the hash and the private key, without needing to know the private key. Signatures can be either 73, 72, or 71 bytes long, to name a few.

In embodiments, the ECDSA cryptographic algorithm may be used to ensure that digital asset transactions (e.g., bitcoin transactions) can only be initiated from the digital wallet holding the digital assets (e.g., bitcoin). Alternatively or in addition, other algorithms may be employed.

In embodiments, a transaction from a multi-signature account may require digital asset signatures from a plurality of private keys, which may correspond to the same public key and/or public address identifying the multi-signature digital asset account. As described herein, a greater number of private keys may be created than is necessary to sign a transaction (e.g., 5 private keys created and only 3 required to sign a transaction). In embodiments, private keys for a multi-signature account may be distributed to a plurality of users who are required to authorize a transaction together. In embodiments, private keys for a multi-signature account may be stored as backups, e.g., in secure storage, which may be difficult to access, and may be used in the event that more readily obtainable keys are lost. As noted above, there are a variety of cryptographic algorithms that may be used.

Market Places

Figure 3:
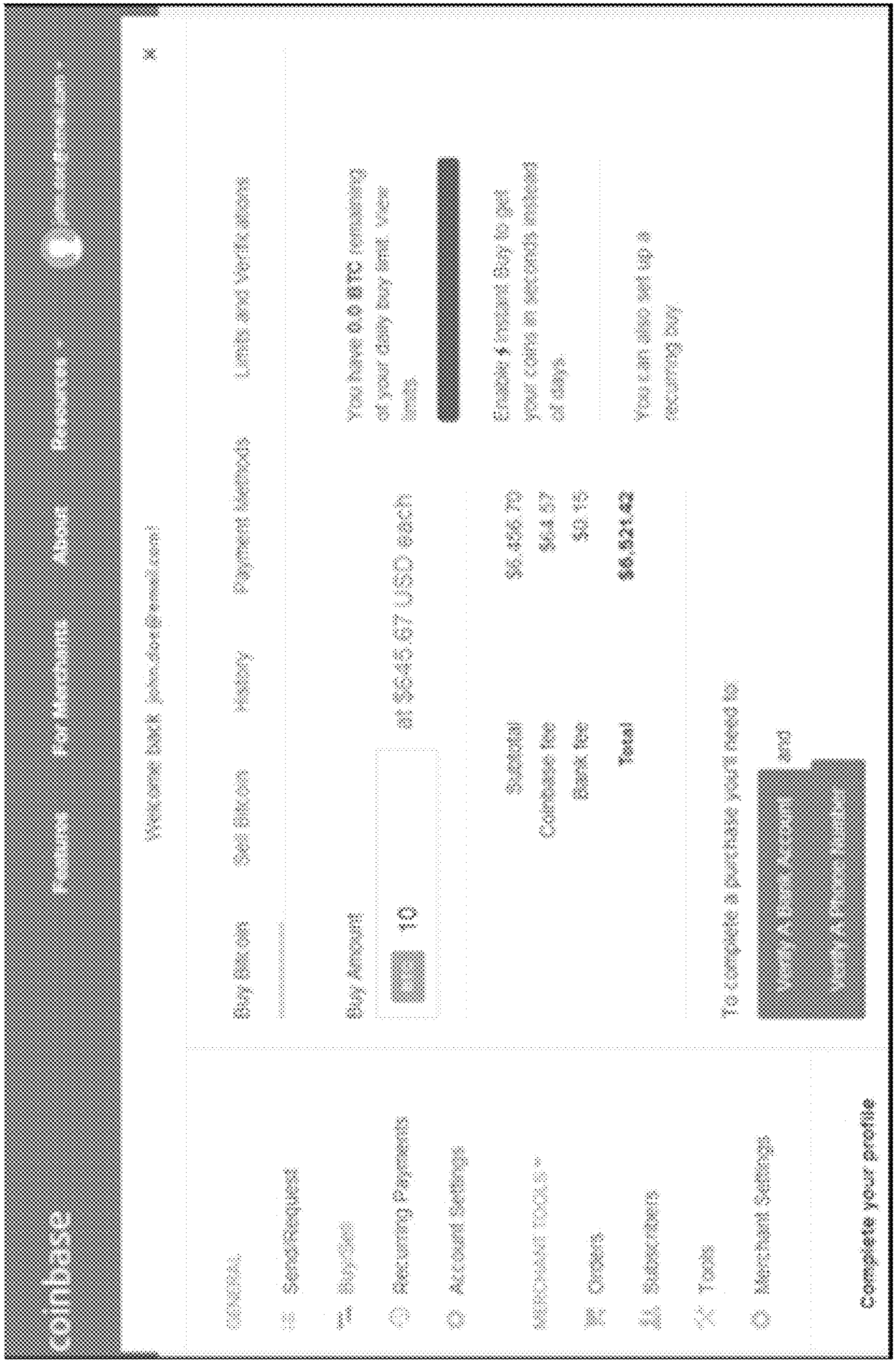
FIG. 3 is an exemplary exchange agent interface in accordance with exemplary embodiments of the present invention.

A digital asset market place, such as a Bitcoin market place, can comprise various participants, including users, vendors, exchanges, exchange agents, and/or miners/mining pools. The market contains a number of digital asset exchanges, which facilitate trade of digital assets using other currencies, such as United States dollars. Exchanges may allow market participants to buy and sell digital assets, essentially converting between digital assets (e.g., bitcoin) and currency, legal tender, and/or traditional money (e.g., cash). In embodiments, a digital asset exchange market can include a global exchange market for the trading of digital assets, which may contain transactions on electronic exchange markets. In embodiments, a digital asset exchange market can also include regional exchange markets for the trading of digital assets, which may contain transactions on electronic exchange markets. In accordance with the present invention, exchanges and/or transmitters may also be used to facilitate other transactions involving digital assets, such as where digital assets are being transferred from differently denominated accounts or where the amount to transfer is specified in a different denomination than the digital asset being transferred, to name a few. Gemini Trust Company LLC ("Gemini") at (www.gemini.com) is an example of a digital asset exchange 130. By example, registered users of Gemini may buy and sell digital assets such as Bitcoin and Ether in exchange for fiat such as U.S. dollars or other digital assets, such as Ether and Bitcoin, respectively. A Bitcoin exchange agent 135 can be a service that acts as an agent for exchanges, accelerating the buying and selling of bitcoin as well as the transfer of funds to be used in the buying and/or selling of bitcoin. Coinbase is an example of a company that performs the role of a Bitcoin exchange agent 135. Coinbase engages in the retail sale of bitcoin, which it obtains, at least in part, from one or more exchanges. FIG. 3 illustrates an exemplary Coinbase website interface for buying bitcoin. Other Coinbase options include "Sell Bitcoin," "Send Money," "Request Money," and "Recurring Payments." Other options could also be made available consistent with exemplary embodiments of the present invention.

In addition to the services that facilitate digital asset transactions and exchanges with cash, digital asset transactions can occur directly between two users. In exemplary uses, one user may provide payment of a certain number of digital assets to another user. Such a transfer may occur by using digital wallets and designating the public key of the wallet to which funds are being transferred. As a result of the capability, digital assets may form the basis of business and other transactions. Digital math-based asset transactions may occur on a global scale without the added costs, complexities, time and/or other limits associated with using one or more different currencies.

Vendors 140 may accept digital assets as payment. A vendor 140 may be a seller with a digital wallet that can hold the digital asset. In embodiments, a vendor may use a custodial wallet. In embodiments, a vendor 140 may be a larger institution with an infrastructure arranged to accept and/or transact in digital assets. Various vendors 140 can offer banknotes and coins denominated in bitcoin; what is sold is really a Bitcoin private key as part of the coin or banknote. Usually, a seal has to be broken to access the Bitcoin private key, while the receiving address remains visible on the outside so that the bitcoin balance can be verified. In embodiments, a debit card can be tied to a Bitcoin wallet to process transactions.

Digital Asset Exchange

A digital asset exchange, such as a digital math-based asset exchange, may allow users to sell digital assets in exchange for any other digital assets or fiat currency and/or may allow users to sell fiat currency in exchange for any digital assets. Accordingly, an exchange may allow users to buy digital assets in exchange for other digital assets or fiat currency and/or to buy fiat currency in exchange for digital assets. In embodiments, a digital asset exchange may integrate with a foreign exchange market or platform. A digital asset exchange may be configured as a centralized exchange or a decentralized exchange, as discussed herein.

Figure 26:
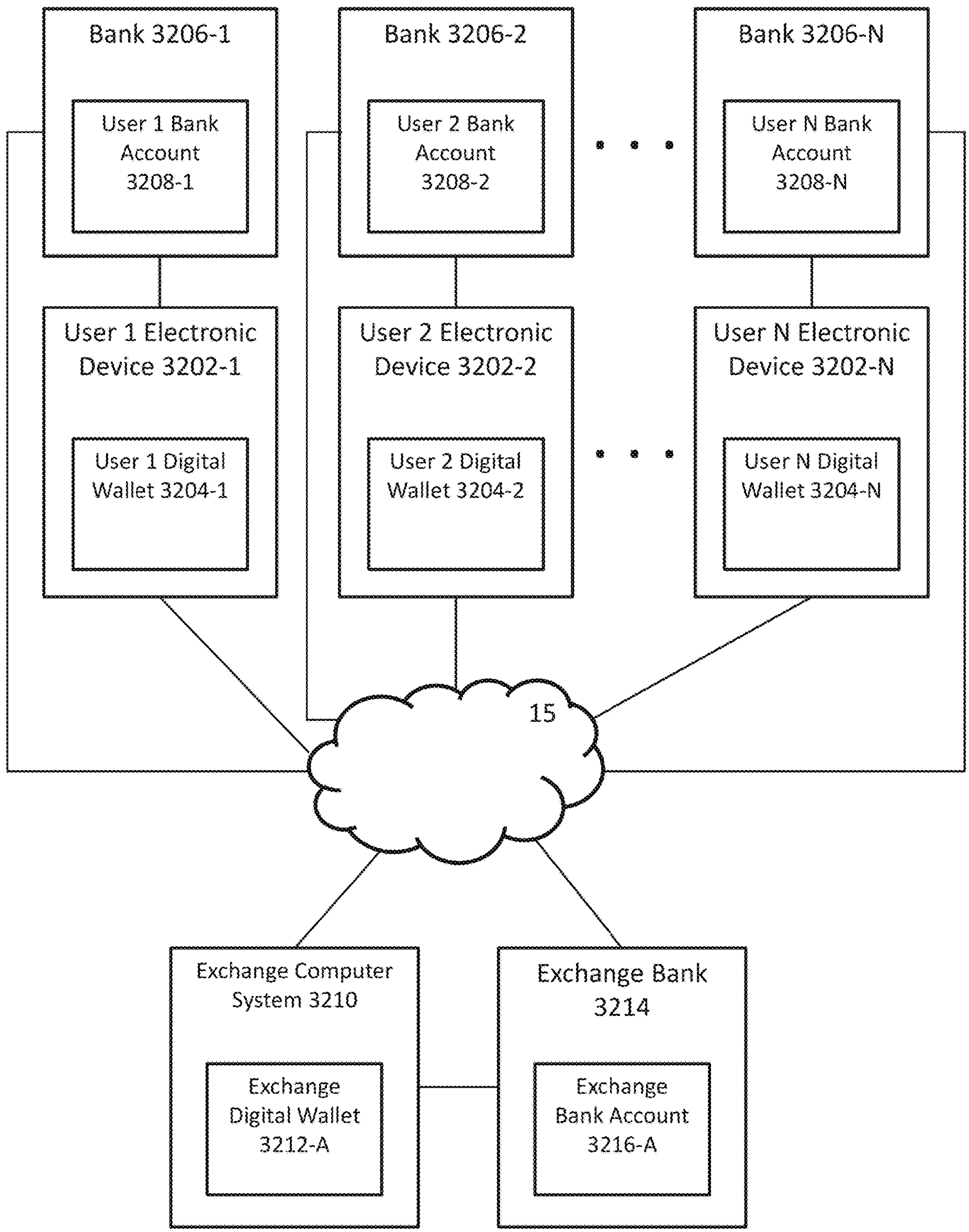
FIG. 26 is an exemplary exchange agent interface in accordance with exemplary embodiments of the present invention.

FIG. 26 is a schematic diagram illustrating various potential participants in a digital asset exchange, in exemplary embodiments. The participants may be connected directly and/or indirectly, such as through a data network 15, as discussed herein. Users of a digital asset exchange may be customers of the exchange, such as digital asset buyers and/or digital asset sellers. Digital asset buyers may pay fiat (e.g., U.S. Dollars, Euros, Yen, to name a few) in exchange for digital assets (e.g., bitcoin, litecoin, dogecoin, to name a few). Digital asset sellers may exchange digital assets (e.g., bitcoin) for fiat (e.g., U.S. Dollars). In embodiments, instead of fiat, other forms of digital assets may also be used. Users may connect to the exchange through one or more user electronic devices 3202 (e.g., 3202-1, 3202-2, . . . , 3202-N), such as computers, laptops, tablet computers, televisions, mobile phones, smartphones, and/or PDAs, to name a few. A user electronic device 3202 may access, connect to, and/or otherwise run one or more user digital wallets 3204. In embodiments, buyers and/or sellers may access the exchange using their own electronic devices and/or through a digital asset kiosk. A digital asset enabled kiosk can receive cash, including notes, coins or other legal tender, (of one or more fiat currencies) from a buyer to use in buying a quantity of digital assets. A digital asset kiosk may dispense cash (of one or more fiat currencies) to a seller of digital assets. In embodiments, a digital asset kiosk may receive funds from and/or dispense funds to a card, such as a prepaid or reloadable card, or electronic wallet or electronic account. In embodiments, an electronic wallet may be stored on a user electronic device, such as a mobile electronic device, or other computing device.

Users may also have user bank accounts 3208 held at one or more banks 3206. In embodiments, users may be able to access their bank accounts from a user electronic device 3202 and/or from a digital wallet 3204.

A digital asset exchange computer system 3210 can include software running on one or more processors, as discussed herein, as well as computer-readable memory comprising one or more database. A digital asset exchange can include one or more exchange digital wallets 3212, e.g., digital wallet 3212-A. Exchange digital wallets may be used to store digital assets in one or more denominations from one or more parties to a transaction. In embodiments, exchange digital wallets may store digital assets owned by the exchange, which may be used where an exchange is a counter-party to an exchange transaction, which can allow exchange transactions to occur even when a buyer and a seller are not otherwise both available and in agreement on transaction terms.

A digital asset exchange may have one or more bank accounts, e.g., bank account 3216-A, held at one or more banks 3214, such as exchange banks or exchange partner banks, which are banks associated with and/or in partnership with the exchange. In embodiments, exchanges may access other repositories for fiat currency. An exchange bank account may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to the buyer, to an exchange, or to an authorized third party. Upon receipt by the appropriate recipient of the requisite amount of digital assets, the exchange may authorize the release of the fiat currency to the digital asset seller. In embodiments, an exchange may hold funds in escrow in both bank accounts and digital wallets.

Figure 27A:
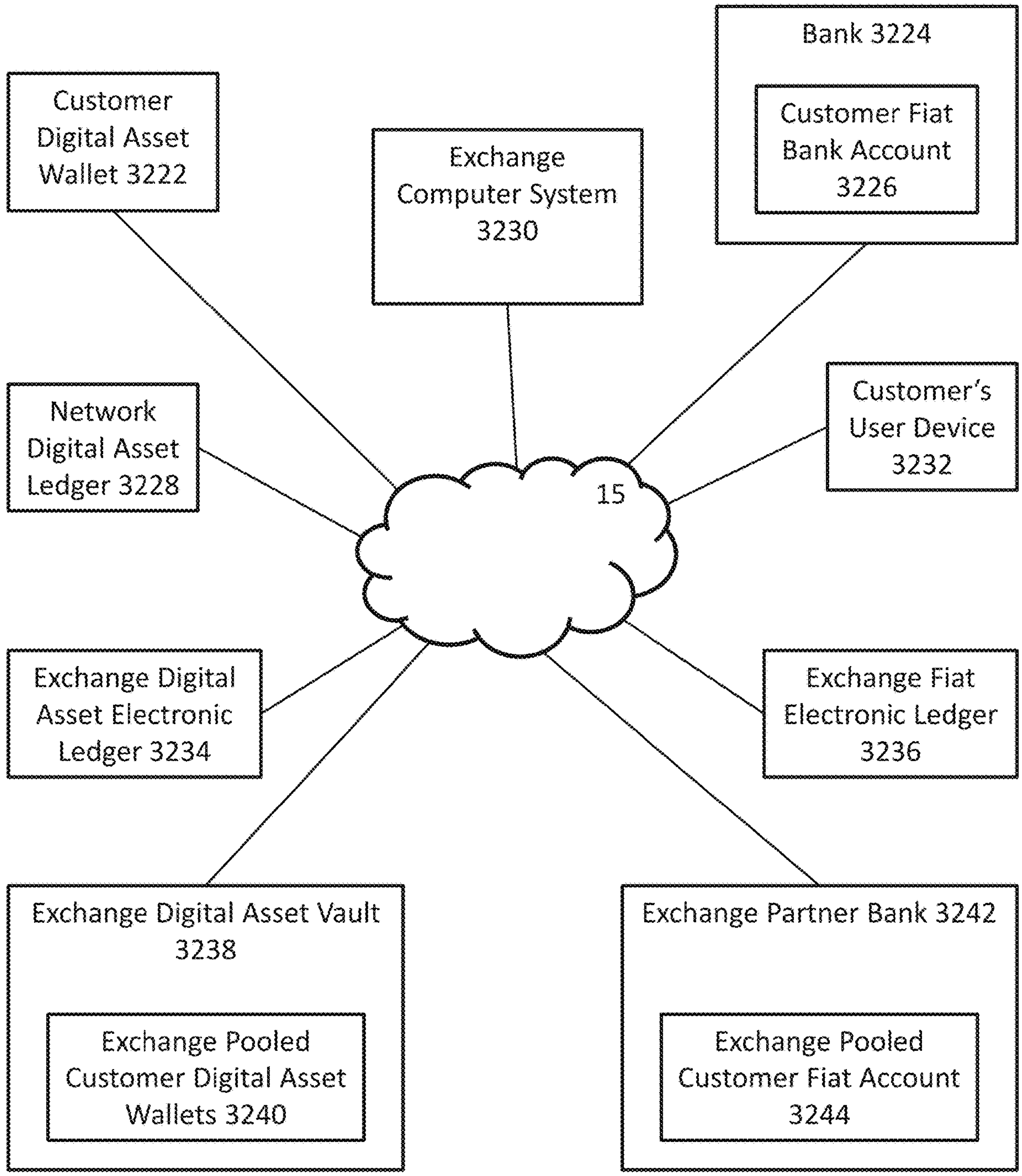
FIGS. 27A-B are schematic diagrams illustrating participants in a digital asset exchange in accordance with exemplary embodiments of the present invention.

FIG. 27A is another schematic diagram illustrating entities associated with a digital asset exchange in an exemplary embodiment of the present invention. Each entity may operate one or more computer systems. Computer systems may be connected directly or indirectly, such as through a data network. Entities associated with a digital asset exchange can include the exchange, an exchange computer system 3230, customer digital asset wallets 3222 (e.g., bitcoin wallets), customer banks 3224 having customer fiat bank accounts 3226, a digital asset network ledger 3228 (e.g., the Bitcoin blockchain), a digital asset network (e.g., the Bitcoin network), one or more exchange customers using one or more customer user device 3232, an exchange digital asset electronic ledger 3234, one or more exchange digital asset vaults 3238, an exchange fiat electronic ledger 3236, and one or more exchange partner banks 3242, which can have exchange pooled customer fiat accounts 3244. The exchange digital asset vaults 3238 can store a plurality of digital asset wallets, which may be pooled exchange customer wallets 3240. In embodiments, the exchange may have a single partner bank 3242 with a pooled exchange customer fiat account 3244. Such an account may be associated with insurance protection.

The exchange may employ an electronic ledger system to track customer digital assets and/or customer fiat holdings. Such a system may allow rapid electronic transactions among exchange customers and/or between exchange customers and the exchange itself using its own digital asset and fiat holdings or those of its sponsor or owner. In embodiments, the electronic ledger system may facilitate rapid computer-based automated trading, which may comprise use by one or more computer systems of a trading API provided by the exchange. The electronic ledger system may also be used in conjunction with cold storage digital asset security systems by the exchange. Fiat (e.g., USD) and digital assets (e.g., bitcoin) can be electronically credited and/or electronically debited from respective (e.g., flat and digital asset) electronic ledgers. Clearing of transactions may be recorded nearly instantaneously on the electronic ledgers. Deposits of fiat with the exchange and withdrawals from the exchange may be recorded on the electronic fiat ledger, while deposits and withdrawals of digital assets may be recorded on the electronic digital asset ledger. Electronic ledgers may be maintained using one or more computers operated by the exchange, its sponsor and/or agent, and stored on non-transitory computer-readable memory operatively connected to such one or more computers. In embodiments, electronic ledgers can be in the form of a database.

A digital asset exchange computer system can include one or more software modules programmed with computer-readable electronic instructions to perform one or more operations associated with the exchange. Each module can be stored on non-transitory computer-readable memory operatively connected to such one or more computers. An exchange may have a user on-boarding module to register users with the exchange and/or create accounts for new and/or existing exchange users. The exchange may employ systems and methods to ensure that the identity of exchange customers is verified and/or the destination of fiat currency and/or digital assets is known. Accordingly, the exchange may require new exchange customers to provide valid (e.g., complying with certain types, such as a driver's license or passport, or complying with certain characteristics) photo identification, a current address, a current bill, such as a utility bill, biometric information (e.g., a fingerprint or hand scan), and/or bank account information. A user on-boarding module can include back-end computer processes to verify and store user data as well as a front-end user interface by which a user can provide information to the exchange, select options, and/or receive information (e.g., through a display). The user on-boarding module can provide the front-end interface to one or more user devices and/or platforms, such as a computer, mobile phone (e.g., running an exchange-related mobile application), and/or digital asset kiosk, to name a few.

Figure 27B:
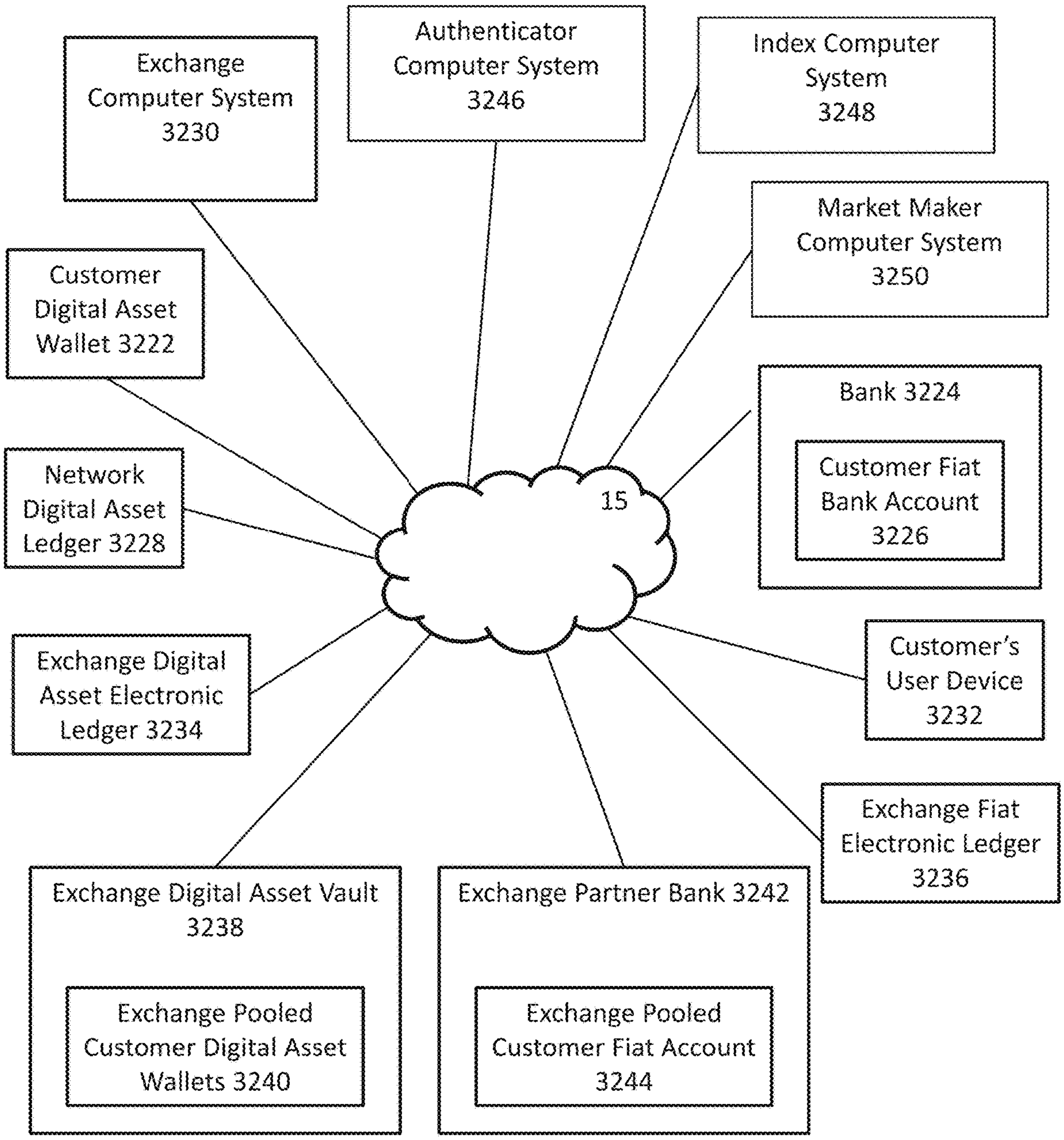

FIG. 27B shows another schematic diagram illustrating entities associated with a digital asset exchange in an exemplary embodiment of the present invention. In addition to the participants described with respect to FIG. 27A, a digital asset exchange may communicate with an authenticator computer system 3246 (to authenticate users, e.g., using multi-factor authentication and/or comparisons to databases of flagged users, to name a few), an index computer system 3248 (e.g., for generating and/or providing a digital asset index, which may be a price index), and/or a market maker computer system 3250. A market maker may be an exchange user that provides liquidity for the exchange, by purchasing or selling digital assets.

In embodiments, an exchange computer system may calculate different fees for a market maker. The fee calculation may vary with market conditions, such as price, digital asset supply (e.g., sell orders), and digital asset demand (e.g., buy orders). In embodiments, transaction fees charged by an exchange may be different for purchase and sale transactions. Fees may be based upon a user's identity, a user's transaction history, the quantity of digital assets and/or flat currency associated with a user account, a rate schedule associated with a particular account or account type (e.g., there could be different rates for institutional or foreign users), time of day, and/or whether the user is operating as a market maker or a market taker for a given transaction, to name a few.

Figure 28A:
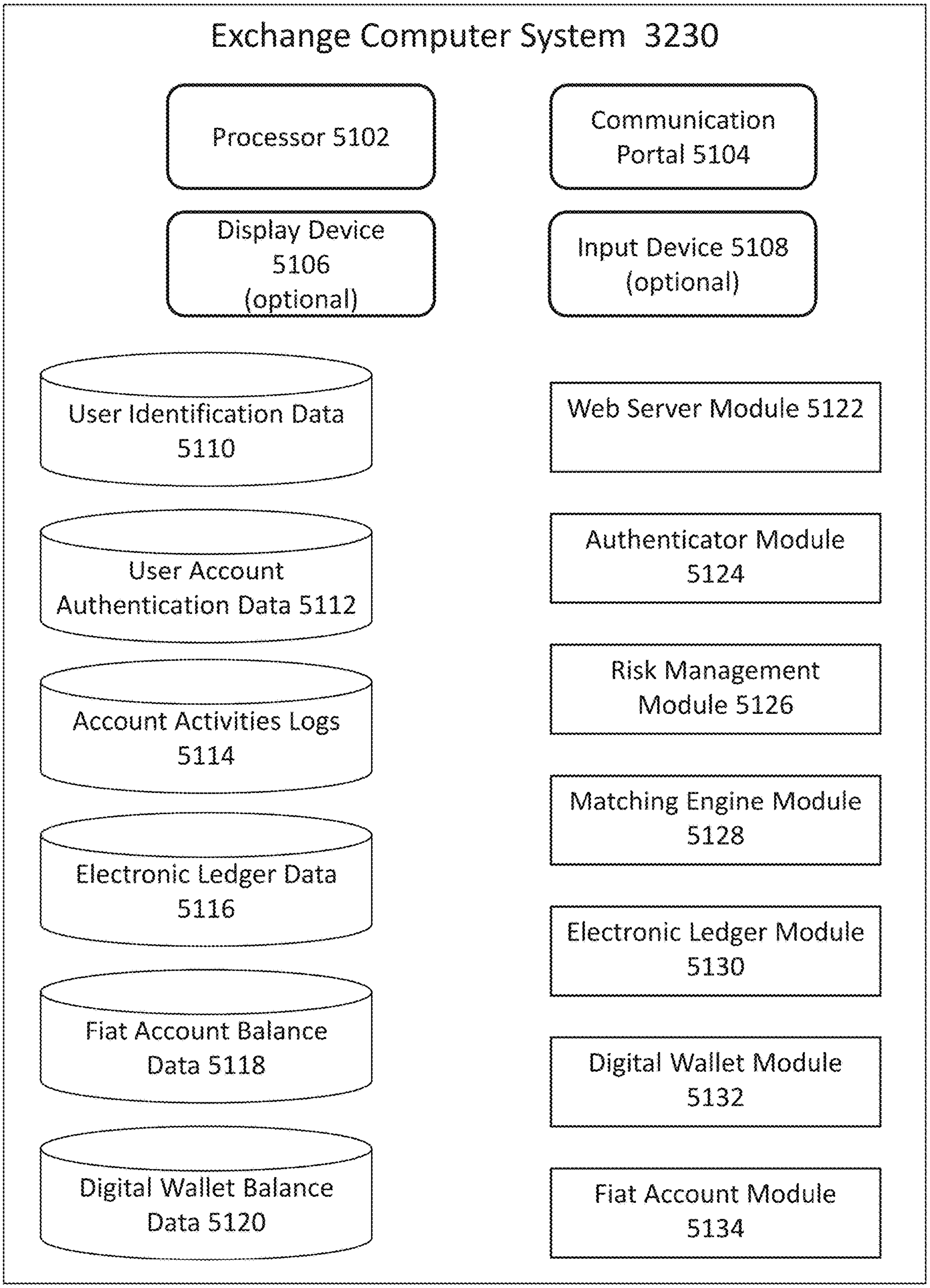
FIGS. 28A-B are schematic diagrams of exemplary exchange computer systems in accordance with exemplary embodiments of the present invention.
Figure 28B:
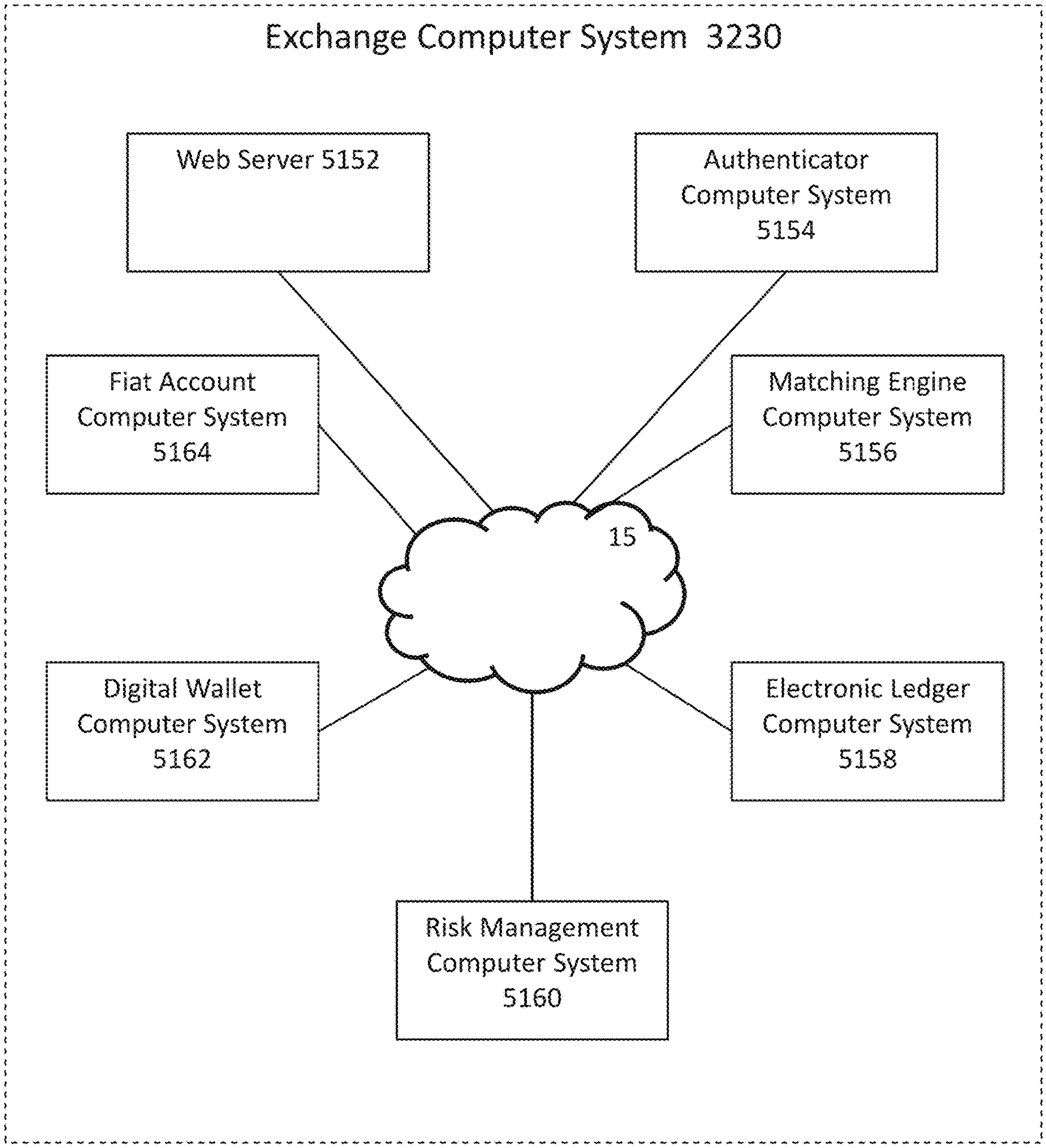

FIGS. 28A-B are schematic diagrams of exemplary exchange computer systems in accordance with exemplary embodiments of the present invention. FIG. 28A shows hardware, data, and software modules, which may run on one or more computers. FIG. 28B shows an exemplary distributed architecture for the exchange computer system.

As shown in FIG. 28A, an exchange computer system 3230 can include one or more processors 5102, a communication portal 5104 (e.g., for sending and/or receiving data), a display device 5106, and/or an input device 5108. The exchange computer system 3230 can also include non-transitory computer-readable memory with one or more database and data stored thereon. Data can include user identification data 5110 (e.g. know your customer data obtained during the user onboarding process), user account authentication data 5112 (e.g., login credentials, multi-factor authentication data, and/or anti-money laundering verifications), account activities logs 5114, electronic ledger data 5116, fiat account balance data 5118, and/or digital wallet balance data 5120. One or more software modules may be stored in the memory and running or configured to run on the one or more processors. Such modules can include a web server module 5122, authenticator module 5124, risk management module 5126, matching engine module 5128, electronic ledger module 5130, digital wallet module 5132, and/or fiat account module 5134. The processes performed by such modules, the data produced thereby and/or the data accessed thereby are described herein.

An account activities log 5114 may track all user requests received by the exchange computer system. The computer system may generate usage statistics and/or analyze user activity for patterns, e.g., to detect fraudulent behavior.

In embodiments, the risk management module 5126 may analyze user activity logs (e.g., access logs, transaction logs, user electronic requests, website navigation logs, mobile application usage logs, to name a few) to identify behavioral patterns, anomalies, and/or potential fraudulent activity (such as fraudulent electronic requests).

In embodiments, an exchange may conduct user or account verification procedures. In embodiments, these user or account verification procedures may comprise participating with third-party vendors in connection with certain Know Your Customer services. In embodiments, an exchange may implement alternative anti-money laundering (AML) measures. In embodiments, AML measures may include monitoring each transaction on the digital asset exchange for particular factors (e.g., amounts of transaction, location of transaction, volume of activity, to name a few). In the United States, the exchange may provide a user on-boarding mechanism that receives a user registration request, receives a user domicile (e.g., a state of domicile), and/or directs the user to an anti-money laundering user interface based upon the domicile. In embodiments, this interface may be generated at a user device using display data transmitted from the exchange computer system.

A matching engine 5128 may apply a continuous order book price time priority matching algorithm. In embodiments, the matching engine may apply option points at low and/or high frequencies.

As shown in FIG. 28B an exchange computer system can include a web server 5152, an authenticator computer system 5154, a matching engine computer system 5156, an electronic ledger computer system 5158, a risk management computer system 5160, a digital wallet computer system 5162, and/or a fiat account computer system 5164. The exchange computer system 3230 may communicate with one or more external computer systems, such as bank computer systems, index computer systems, user computer system (e.g., institutional or individual users), and/or user electronic devices. Each computer system may comprise one or more computers and/or one or more processors, a communication portal, display devices, and/or input devices, to name a few.

A web server 5152 may provide display data to one or more user device 102, e.g., user device 102-1. Display data may comprise website content (e.g., HTML, JavaScript, and/or other data from which a user device can generate and/or render one or more webpages) and/or application content, such as mobile application content, to be used in generating or providing display content for one or more software application. In embodiments, the web server 5152 may authenticate a user account by verifying a received username and password combination.

An authenticator computer system 5154 may perform authentication of user login credentials, multi-factor authentication, and/or compare users against databases, such as government databases, for compliance with anti-money laundering laws and/or regulations.

A matching engine computer system 5156 may match buy (purchase) orders with sell orders, receive orders, and/or update an electronic order book, to name a few.

An electronic ledger computer system 5158 may track and/or store account balances, update account balances, compute account balances, report account balances, and/or place holds on account funds while transactions are in progress (e.g., set an account hold indicator), to name a few.

A risk management computer system 5160 may perform processes to detect fraudulent transactions and/or security breaches. Such a sub-system may monitor access data describing access of the exchange (e.g., IP addresses, accounts, times of access, to name a few), monitor trading data, analyze trading data, determine patterns, determine anomalies, and/or determine violations of pre-programmed security rules, to name a few.

A digital wallet computer system 5162 may generate digital wallets, generate instructions for digital wallet key storage and/or retrieval, allocate digital assets among digital wallets, track digital assets, store digital asset, and/or transfer digital assets, to name a few.

A fiat account computer system 5164 may manage omnibus or pooled accounts for holding customer funds. The fiat account computer system may process receipts of funds, e.g., from a bank, via a wire transfer, via a credit card or ACH transfer, and/or via check, to name a few. Accordingly, the fiat account computer system may communicate with one or more external systems, such as a bank computer system. In embodiments, the fiat account computer system may process withdrawals.

Figure 29:
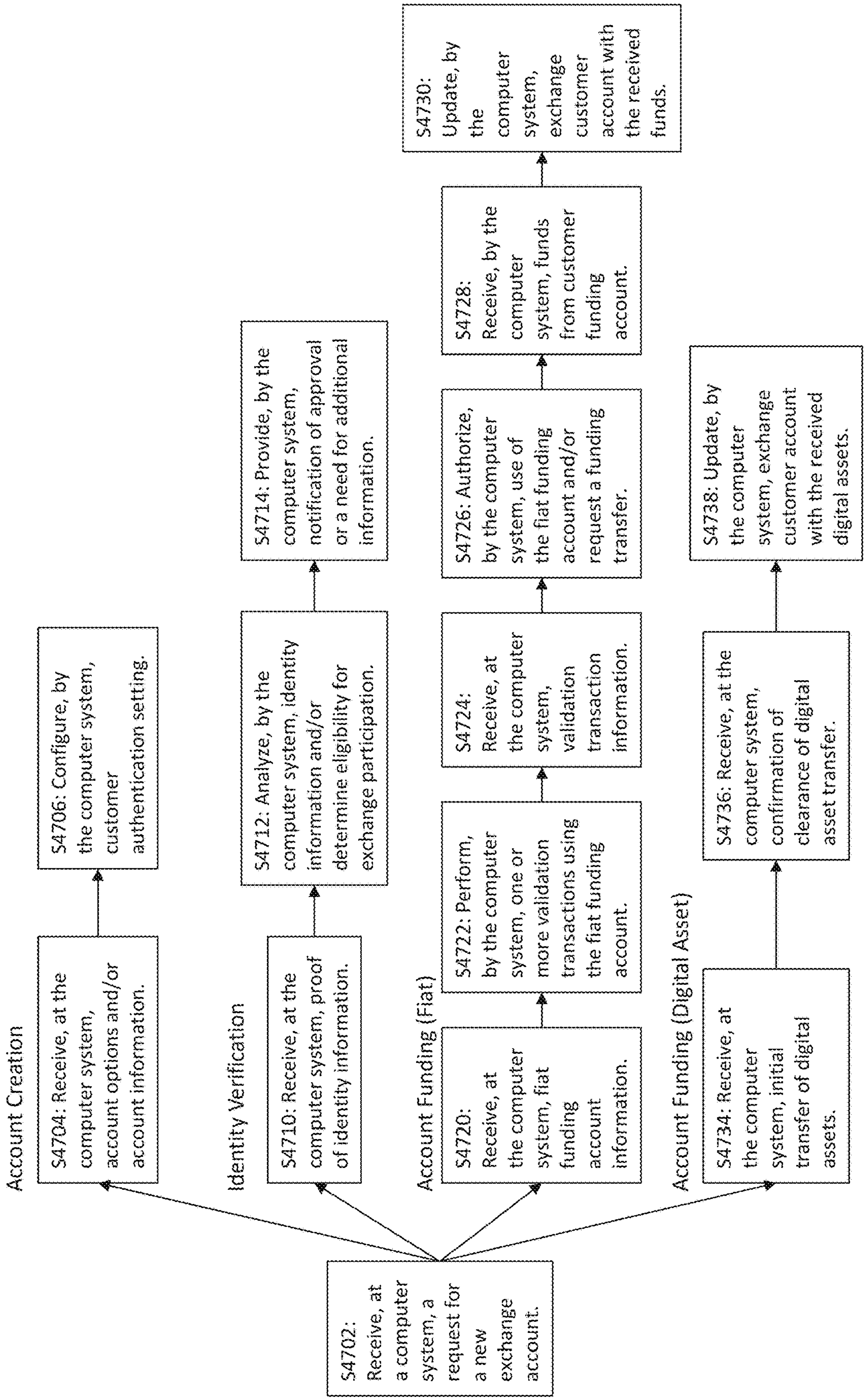
FIG. 29 is an exemplary flow chart for processes for digital asset exchange account creation and account funding in accordance with exemplary embodiments of the present invention.

FIG. 29 is an exemplary flow chart for processes for digital asset exchange account creation and account funding in accordance with exemplary embodiments of the present invention. The processes may be performed by an exchange computer system, which may comprise one or more computers. In embodiments, any steps in the processes may be performed by third-party computer systems, which may be operatively connected to the exchange computer system, e.g., through the Internet. The processes may be performed in conjunction with a user interface, such as a website or mobile application on a smart phone, which can receive user inputs and/or display content to the user. In a step S4702, an exchange computer system may receive an electronic request for a new exchange account. Upon receiving such a request, the exchange computer system may perform account creation, identity verification, fiat account funding, and/or digital asset account funding processes.

Referring to the account creation process shown in FIG. 29, in a step S4704 the exchange computer system may receive account options and/or account information. Account options can include an account type (e.g., individual, business, investor, to name a few), which may correspond to different features, fees, limits, and/or services, such as the ability to transact once a day or multiple times a day, the ability to withdraw funds immediately or once a day, and/or access to a trading API, to name a few. Account information can include a username, password, contact information, actual name of user, location or domicile of user, to name a few. In a step S4706 the exchange computer system may configure customer authentication settings, which may involve setting up two-factor authentication for the user on one or more user devices.

Referring to the identity verification process shown in FIG. 29, in a step S4710 the exchange computer system may receive proof of identity information, which can include a scan of a government-issued identification document (e.g., a driver's license, a passport, a social security card), a copy of a utility bill, a photograph, biometric information (e.g., a fingerprint, palm scan, eye scan, to name a few), and/or identifying information such as a social security number or other government issued identification number, to name a few. In a step S4712 the exchange computer system may analyze the identity information, which may include verifying the information against one or more databases of identity information. Analyzing identity information may comprise verifying the accuracy of the information and/or determining eligibility for participation in the exchange (e.g., based on domicile and/or minimum age, to name a few). In a step S4714 the exchange computer system may provide to a user device a notification of approval, a notification of rejection, or a notification that additional information is required.

Referring to the fiat account funding process shown in FIG. 29, in a step S4720 the exchange computer system may receive fiat funding account information. Such information can include a bank account number (e.g., a routing number), a bank name, an account type, and/or an account holder's name, to name a few. In a step S4722, the exchange computer system may perform one or more validation transactions using the fiat funding account. Such transaction may comprise small deposits into the fiat funding account. In a step S4724, the exchange computer system may receive validation transaction information, which may include a transaction amount, date, and/or time. In a step S4726, the exchange computer system may electronically authorize use of the fiat funding account and/or request a funding transfer. Accordingly, the exchange computer system may provide an electronic notification, e.g., via email, via a website, and/or via a mobile phone application (e.g., via a push notification), to name a few, that the fiat funding account is authorized for use with the exchange. A customer may electronically initiate a transaction, e.g., through an exchange-provided user interface or user electronic device operatively connected to the exchange, to transfer funds to the exchange. In a step S4728, the exchange computer system may receive an electronic notification indicating that funds were received, e.g., in an exchange bank account at a partner bank, from the customer fiat funding account. In a step S4730, the exchange computer system can update an exchange customer account with the received funds. Updating an exchange customer account can comprise electronically updating a fiat electronic ledger stored one or more computer readable media operatively connected to the exchange computer system to reflect the received funds and/or updating a display of the amount of funds in the account or a data ledger on a user computer device or on a printed and/or digitally transmitted receipt provided to the user and/or a user device.

Referring to the digital asset account funding process shown in FIG. 29, in a step S4734, the exchange computer system can receive an initial transfer of digital assets. In a step S4736, the exchange computer system can receive a confirmation of clearance of the digital asset transfer. In a step S4738, the exchange computer system can update an exchange customer account with the received digital assets. Updating an exchange customer account can include making an electronic entry in an exchange digital asset electronic ledger and/or providing a notification that the digital assets are received.

Figure 30A:
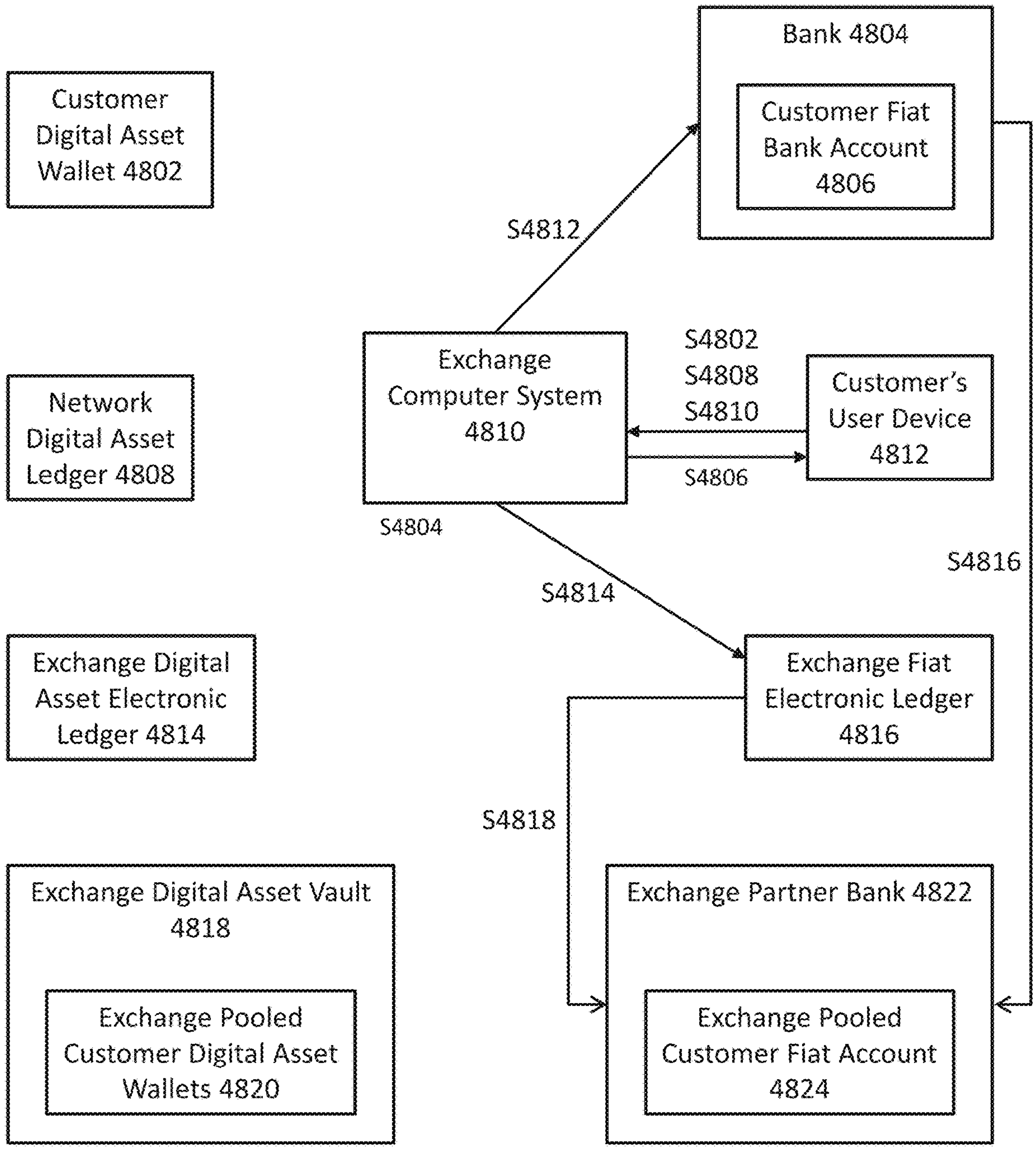
FIGS. 30A-B are an exemplary schematic diagram and corresponding flow chart of a process for digital asset exchange customer account fiat funding via an exchange-initiated request in accordance with exemplary embodiments of the present invention.
Figure 30B:
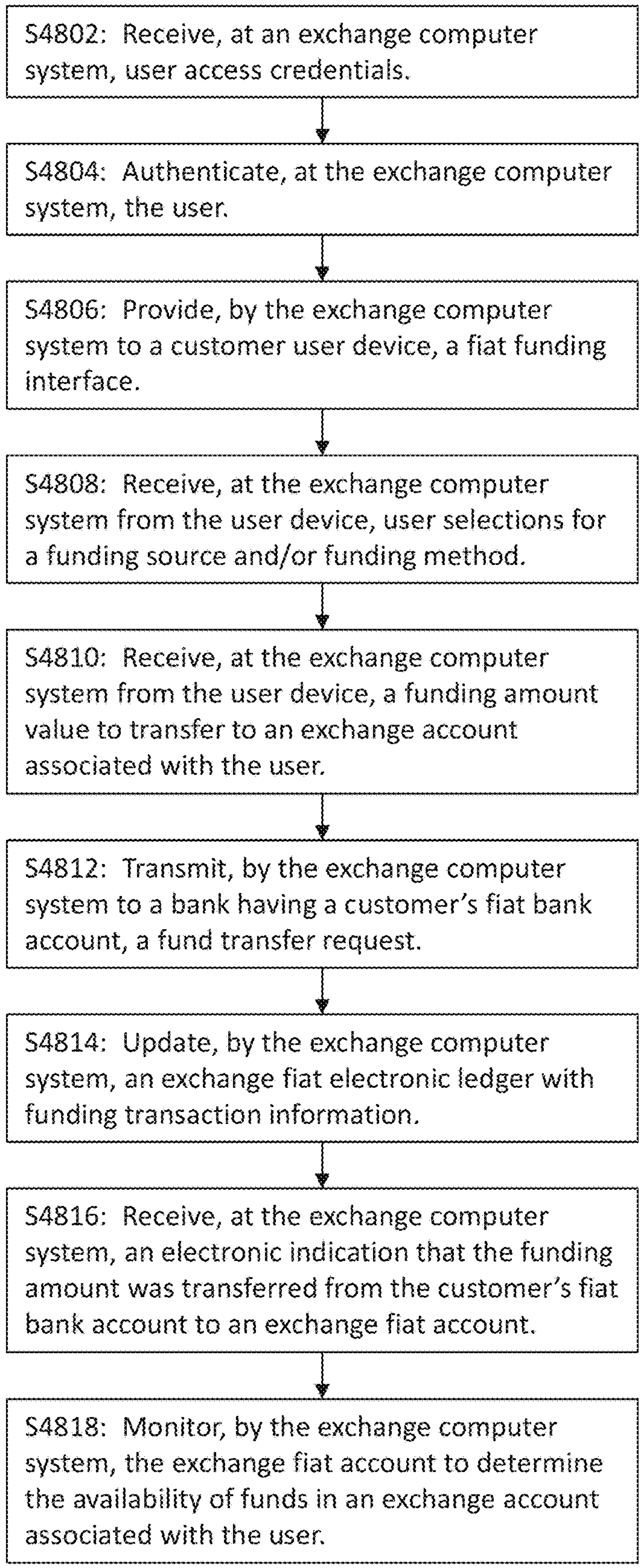

FIG. 30A is an exemplary schematic diagram of an exchange, and FIG. 30B is a corresponding flow chart of a process for digital asset exchange customer account fiat funding via an exchange-initiated request, such as ACH in accordance with exemplary embodiments of the present invention. An exchange computer system 4810 can interface with a customer digital asset wallet 4802, a bank 4804 with a customer fiat bank account 4806, an exchange partner bank 4822 with an exchange pooled customer fiat account 4824, a network digital asset ledger 4808, and/or a customer's user device 4812, to name a few. In addition to the exchange computer system 4810, the exchange can include an exchange digital asset electronic ledger 4814, an exchange fiat electronic ledger 4816, and an exchange digital asset vault 4818 with exchange pooled customer digital asset wallets 4820. Any of these entities or components may communicate directly and/or indirectly, e.g., through a data network, such as the Internet. In embodiments, encryption and/or other security protocols may be used. These entities and components are further described with respect to FIG. 27A.

Referring to FIG. 30B, in a step S4802 the exchange computer system can receive, e.g., from a user device, user access credentials. In a step S4804, the exchange computer system can authenticate the user, such as by verifying the received access credentials. In a step S4806, the exchange computer system may provide to a customer user device a fiat funding interface. In a step S4808, the exchange computer system may receive from the user device user selections for a funding source and/or funding method. The funding source may identify a bank account or other fiat account. The funding method may identify ACH transfer or wire transfer, to name a few. In a step S4810, the exchange computer system can receive from the user device a funding amount value to transfer to an exchange account associated with the user. In embodiments, S4808 and S4810 may be a single step. Accordingly, the exchange computer system may receive from a user electronic device a user electronic request comprising a funding amount and a funding method, wherein the funding method is an ACH transfer and the request further identifies a verified user bank account.

In a step S4812, the exchange computer system can transmit a fund transfer request to a bank where the customer has a fiat bank account. Accordingly, the exchange computer system may transmit to an exchange partner bank an electronic funding request comprising the funding amount and the user bank account identifier.

In a step S4814, the exchange computer system can update an exchange fiat electronic ledger with the funding transaction information. In a step S4816, the exchange computer system can receive an electronic indication that the funding amount was transferred from the customer's fiat bank account to an exchange fiat account, e.g., at a partner bank. In a step S4818, the exchange computer system can monitor the exchange fiat account to determine the availability of funds in an exchange account associated with the user. In embodiments, the exchange computer system may generate and/or provide an electronic notification to one or more user devices associated with a user account that funds are available for use on the exchange. In embodiments, the notification may indicate a current balance of a user account (e.g., in fiat currency and/or digital asset quantities).

Figure 30C:
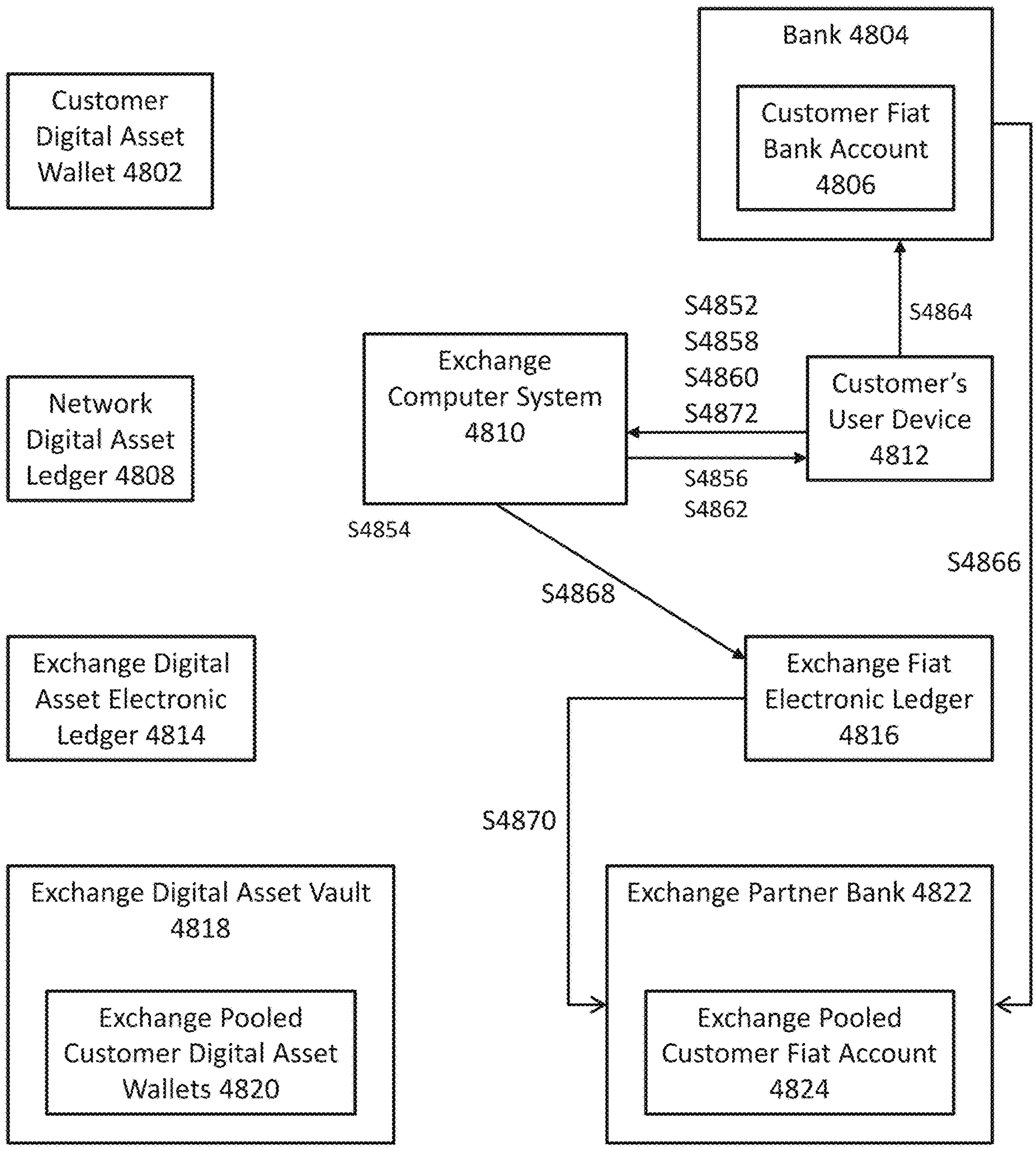
FIGS. 30C-E are an exemplary schematic diagram and corresponding flow chart of a process for digital asset exchange customer account fiat funding via a customer-initiated request in accordance with exemplary embodiments of the present invention.
Figure 30D:
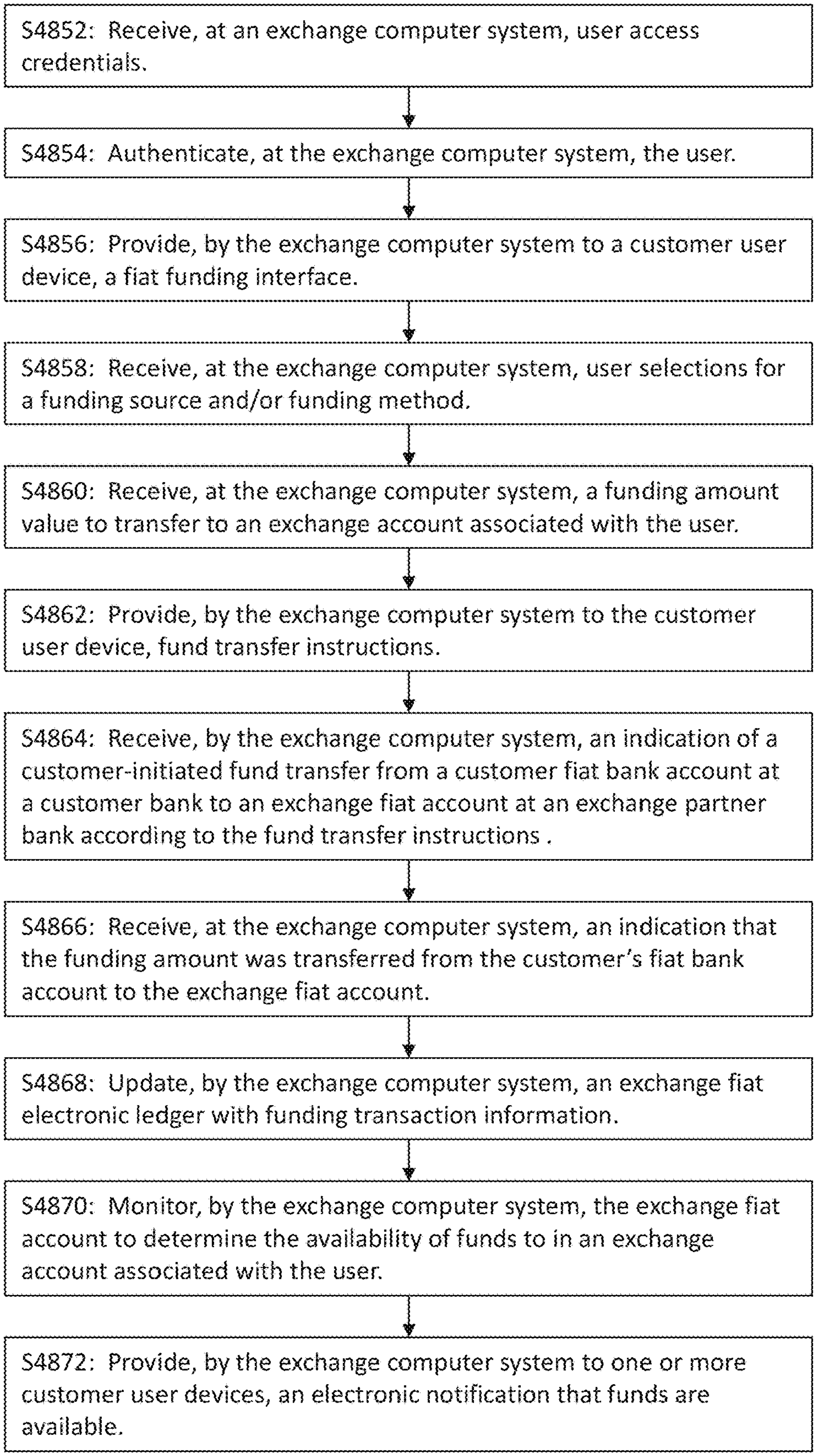

FIG. 30C is an exemplary schematic diagram of an exchange, and FIG. 30D is a corresponding flow chart of a process for digital asset exchange customer account fiat funding via a customer-initiated request, such as a wire transfer, in accordance with exemplary embodiments of the present invention. The components and entities associated with an exchange that are shown in FIG. 30C are described with respect to FIG. 27A.

FIG. 30D is a flow chart showing an exemplary process for digital asset exchange customer account fiat funding. In a step S4852, an exchange computer system can receive user access credentials. In a step S4854, the exchange computer system can authenticate the user by verifying the received access credentials. Verifying the access credentials can comprise comparing the credentials to a secure credentials database. In a step S4856, the exchange computer system can provide to a customer user device a fiat funding interface. In a step S4858, the exchange computer system can receive from the customer user device, user selections for a funding source and/or funding method. The funding method may be a customer-initiated method, such as a wire transfer. In a step S4860, the exchange computer system can receive a funding amount value to transfer to an exchange account associated with the user. In a step S4862, the exchange computer system can provide to the customer user device fund transfer instruction, e.g., wire instructions. In a step S4864, the exchange computer system may receive an electronic indication of a customer-initiated fund transfer from a customer fiat bank account a customer bank to an exchange fiat account at an exchange partner bank according to the fund transfer instructions. In embodiments, step S4864 may be skipped. In a step S4866, the exchange computer system may receive an indication that the funding amount was transferred from the customer's fiat bank account to the exchange fiat account. In a step S4868, the exchange computer system can update an exchange fiat electronic ledger with the funding transaction information, which may include an amount value, customer account ID, transaction date and/or time, to name a few. In a step S4870, the exchange computer system can monitor the exchange fiat account to determine the availability of funds in an exchange account associated with the user. In a step S4872, the exchange computer system can provide an electronic notification to one or more customer user devices that funds are available for use on the exchange.

Figure 30E:
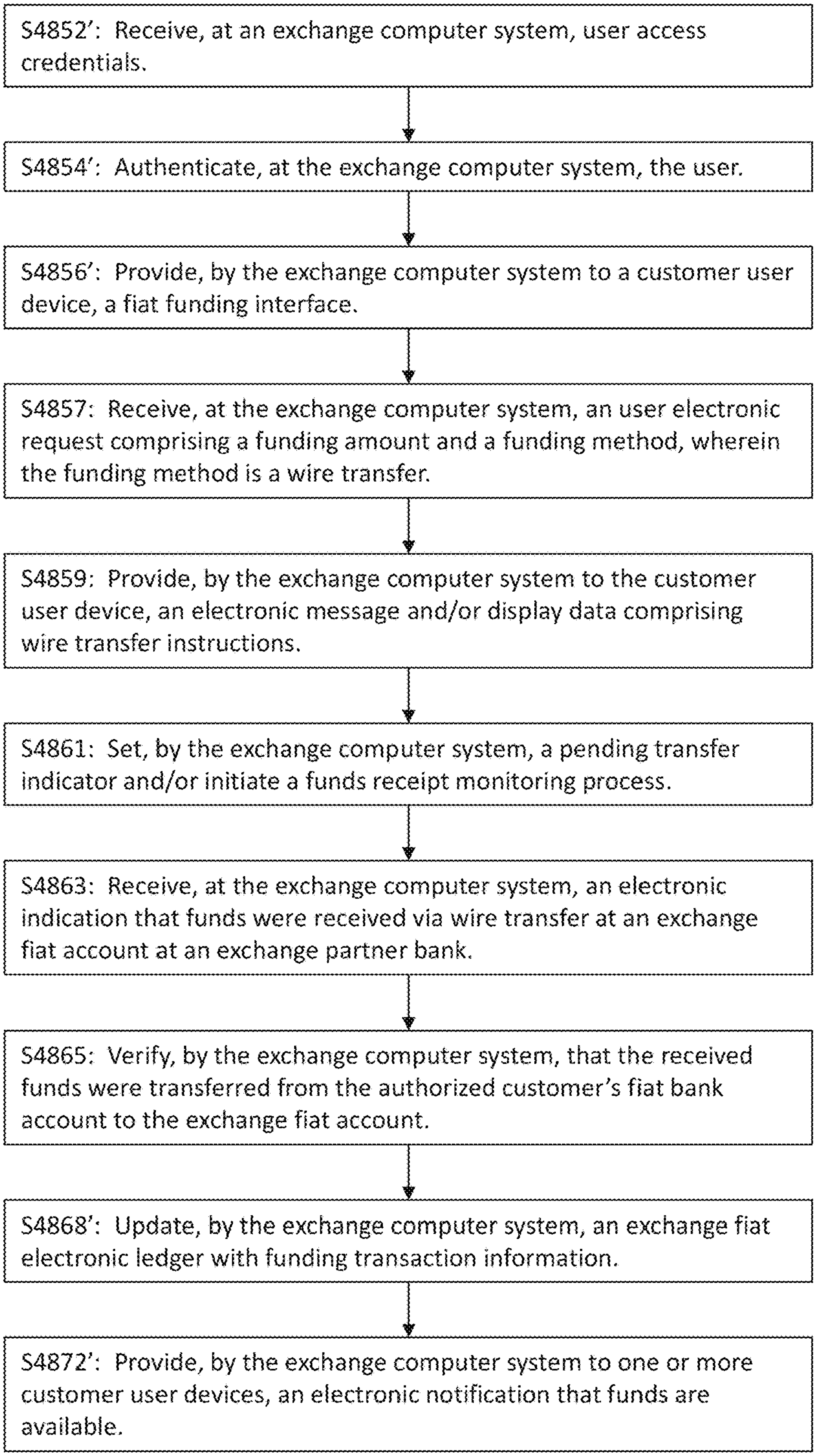

FIG. 30E is a flow chart showing another exemplary process for digital asset exchange customer account fiat funding. In a step S4852', an exchange computer system can receive user access credentials. In a step S4854', the exchange computer system can authenticate the user by verifying the received access credentials. Verifying the access credentials can comprise comparing the credentials to a secure credentials database. In a step S4856', the exchange computer system can provide to a customer user device a fiat funding interface. In a step S4857, the exchange computer system can receive a user electronic request comprising a funding amount and a funding method (e.g., a wire transfer). In a step S4859, the exchange computer system can provide to the customer user device, an electronic message and/or display data comprising wire transfer instructions. In a step S4861, the exchange computer system can set a pending transfer indicator and/or initiate a funds receipt monitoring process. In a step S4863, the exchange computer system can receive an electronic indication that funds were received via wire transfer at an exchange fiat account at an exchange partner bank. In a step S4865, the exchange computer system can verify that the received funds were transferred from the authorized customer's fiat bank account to the exchange fiat account. In a step S4868', the exchange computer system can update an exchange fiat electronic ledger with the funding transaction information, which may include an amount value, customer account ID, transaction date and/or time, to name a few. In a step S4870, the exchange computer system can monitor the exchange fiat account to determine the availability of funds in an exchange account associated with the user. In a step S4872', the exchange computer system can provide an electronic notification to one or more customer user devices that funds are available for use on the exchange.

Figure 31A:
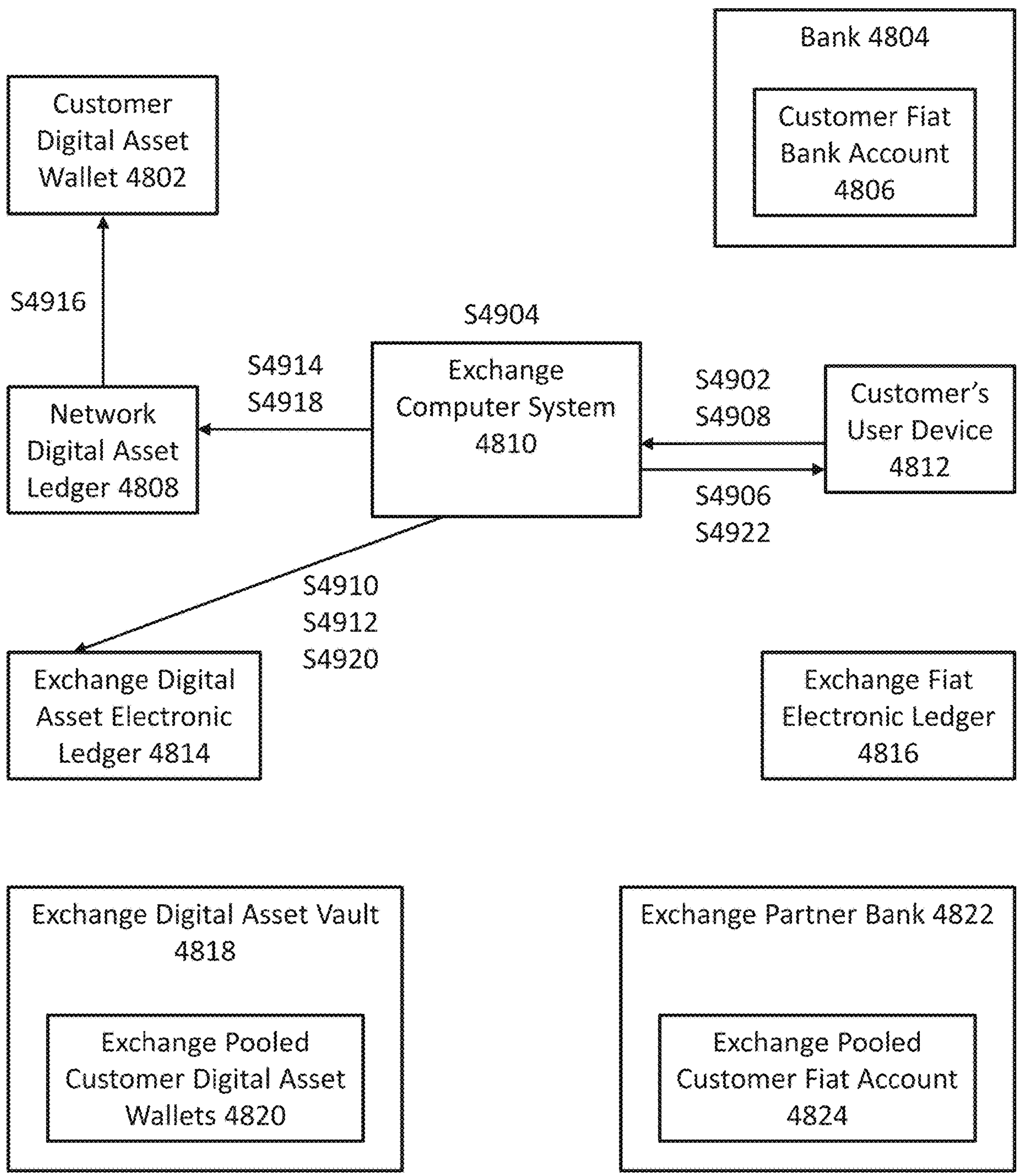

FIG. 31A is an exemplary schematic diagram of an exchange, and FIG. 31B is a corresponding flow chart of a process for digital asset exchange account digital asset withdrawal in accordance with exemplary embodiments of the present invention. The components and entities associated with an exchange that are shown in FIG. 31A are described herein with respect to FIG. 27A.

Referring to FIG. 31B, in a step S4902, an exchange computer system can receive user access credentials. User access credentials can include any of a username, password, fingerprints, access card scan (e.g., swipe of a card associated with the exchange and having a magnetic strip), and/or a pin (e.g., a number provided via SMS, other text message service, or email for multi-factor authentication), to name a few. In a step S4904, the exchange computer system can authenticate the user based upon the received user access credentials. In a step S4906, the exchange computer system may provide to a customer user device a withdrawal interface. In a step S4908, the exchange computer system may receive from the customer user device user inputs comprising at least a destination wallet address and a requested digital asset withdrawal amount value. In a step S4910, the exchange computer system may verify that a digital asset account associated with the customer contains sufficient digital assets to cover the requested withdrawal amount. In embodiments, such verification can comprise reading a digital asset electronic ledger and/or determining a customer digital asset balance, e.g., based on summing transactions recorded on a digital asset electronic ledger. In a step S4912, the exchange computer system may update an exchange digital asset electronic ledger to reflect the pending withdrawal. In embodiments, recording an entry in the electronic ledger prior to the withdrawal may be performed to prevent double spending. In other embodiments, such a step may be skipped. In a step S4914, the exchange computer system may execute the withdrawal, e.g., by broadcasting the withdrawal to a digital asset network electronic ledger, e.g., the Bitcoin Blockchain. In a step S4916, the destination wallet may receive an electronic notification of the receipt of digital assets from the exchange. In a step S4918, the exchange computer system may monitor the network digital asset ledger to determine whether and/or when the withdrawal transaction is confirmed. In a step S4920, the exchange computer system may update the digital asset electronic ledger, e.g., by debiting the withdrawal amount from the customer's exchange account, to reflect confirmation of the withdrawal transaction. In a step S4922, the exchange computer system may provide to one or more customer user devices an electronic notification of the withdrawal. Such a notification can include at least the customer's new digital asset balance.

A digital asset exchange can include additional systems, which may include software modules, for performing various functions of the exchange. For example, an exchange can include an account management system, which may comprise a user account registration system for new users and/or an existing user account management system. The exchange can include a trading system, which may comprise an interactive trading interface system, an automated trading interface system, a trade confirmation notification system, and/or a trade transaction fee processing system. A fund transfer system can include a fiat account funding and redemption system, a digital asset accounting funding and redemption system, and an account funding and redemption fee processing system. An exchange can also include a trade settlement system. A customer service system can include a trade dispute resolution interface system and a customer account management assistance system. A customer reporting system can include a gain an loss reporting system and a transaction history system. A fraud analysis system can monitor transactions to detect fraudulent and/or unauthorized transactions.

Exchange Digital Asset Storage Structure

Deposited customer fiat may be held in a pooled fiat account maintained in a partner bank. Meanwhile, digital assets held by the exchange may be maintained in pooled digital wallets, such as aggregated custodial wallets. The exchange may store digital assets using any of the security and/or storage systems and methods discussed herein. The exchange can employ any combination of varying levels of secure storage for its wallets. For example, portions of digital assets held by the exchange may be maintained in cold storage with neither the wallet's private nor public keys ever having been exposed to a digital asset network or other external network, such as the Internet. Other digital assets may be stored in air-gapped hot wallets, which may be wallets generated offline with transactions generated offline, e.g., on an isolated computer, and transferred to a networked computer via a temporary physical connection or manual transfer. Isolated computer systems are physically and operationally isolated from other computer systems. For example, an isolated computer system may be an air gapped computer system. Other digital assets may be maintained in hot wallets, e.g., to satisfy withdrawals from the exchange. The exchange may determine the amount of assets to hold in hot wallets, which may be based on historical exchange activity and/or anticipated need. A hot wallet liquidity module may analyze and predict the amount of assets per wallet and/or during a time period required to meet anticipated need and may also initiate transfers of assets to or from hot wallets to maintain desired levels. For example, a hot wallet liquidity module could determine that it is desirable to maintain digital assets in certain defined amounts (e.g., 0.5 bitcoin), and/or certain defined fiat amounts (e.g., $100 worth of bitcoin) and/or of certain defined quantities sufficient to cover transactions anticipated during a defined period (e.g., the day's transaction). In embodiments, initiating an electronic transfer may comprise electronically generating and providing an electronic notification to devices associated with one or more exchange administrators of a need to transfer assets and/or an amount of assets to transfer. The exchange may designate one or more wallets for receiving incoming digital assets only. For example, the exchange may employ a single digital wallet for each receipt of digital assets, e.g., from exchange users. The receiving wallet may be destroyed after the received assets are transferred to one or more other wallets.

The exchange may employ any of a number of different exchange digital wallet systems. As discussed herein, the exchange may operate a pooled or omnibus digital wallet system, e.g., as part of a centralized exchange system. The pooled system may use an electronic ledger to track digital asset ownership for each exchange customer. Customers may transfer digital assets from their own digital wallets to an exchange address in order to fund their digital asset account on the exchange. The ledger can track (e.g., record) such funding events, as well as withdrawal events. Transfers of digital assets among customers can also be accounted for using the ledger. With a pooled wallet system, internal transactions on the exchange (e.g., transactions that do not entail transferring funds to or from the exchange or exchange wallets but rather transactions between exchange wallets) can be settled without delay, since the transfer can be logged through electronic ledger updates and does not have to otherwise be processed by a digital asset network.

In another embodiment, the exchange digital wallet system may comprise exchange operated wallets for each exchange customer. The wallets may be maintained in trust by the exchange for each customer. Transactions may be processed by the digital asset network, e.g., the Bitcoin network. The keys to each customer wallet may be held by the customer and/or by the exchange. Transactions may be settled via the digital asset network in real-time (with any corresponding confirmation period) as they occur, or transactions may be settled in a batch, which may entail broadcasting a plurality of transactions to the network at a particular time or periodically throughout a day.

In another embodiment of an exchange digital wallet system, the exchange customers may own and/or manage their own wallets, e.g., as part of a decentralized exchange system. The exchange would not hold any customer digital assets, and customers would hold the private keys to their wallets. The exchange may match customers, as described herein, so that a digital asset seller can transfer digital assets from the seller's digital wallet to a digital wallet corresponding to a digital asset buyer.

In embodiments, the digital wallet may be a custodial digital wallet. The custodial digital wallet may be segregated, that is, unique to a particular customer or commingled, including digital assets of multiple customers. In such an embodiment, the custodian holds digital assets in the custodial wallet for the benefit of its customers. The custodian would hold the private key to each custodial wallet whether it be segregated or commingled. Transactions may be made between different custodial wallets or between custodial wallets and exchange customer wallets in the manner described above.

Centralized Digital Asset Exchange

In embodiments, the exchange may hold customer fiat currency and/or digital assets in centralized, pooled accounts or wallets. As discussed herein, the exchange may maintain an electronic ledger to record transactions among users of the exchange. Separate electronic flat account ledgers and electronic digital asset ledgers may be maintained. Maintaining a ledger may involve electronically updating the ledger to reflect pending transactions and/or completed transactions, which may involve debiting assets from a user's account and/or crediting assets to a user's account. Broadcast to a digital asset network and confirmation from a digital asset network may not be performed for transactions within the exchange, e.g., transactions between a digital asset seller selling digital assets that are stored by the exchange and a buyer paying with fiat currency that is held in an exchange bank account, such as a pooled account.

In embodiments, for both a decentralized and a centralized exchange the exchange may provide the ability for customers to purchase digital assets from the exchange and/or sell digital assets to the exchange such that the exchange operator or owner is the counter-party to the transaction. Transaction amount limits may be place on such transactions and/or additional fees may be charged.

Exchange Operations Systems

In embodiments, a digital asset exchange may require users to open designated accounts associated with the user in order to participate in the exchange. Each user may have a digital math-based asset account to record and maintain such user's digital math-based assets and a fiat account to record and maintain such user's fiat assets. In embodiments, the fiat assets recorded in the fiat account may be U.S. Dollars held in one or more omnibus bank accounts with one or more FDIC-insured depository institutions or banks. In embodiments, a digital math-based asset computer system of a digital asset exchange may record in an electronic ledger information associated with a user account, such as digital math-based asset purchase orders, digital math-based asset sell orders, digital math-based asset purchase offers, digital math-based asset sell offers. In embodiments, digital math-based asset purchase offers and digital math-based asset sell offers may be converted into digital math-based asset purchase orders and digital math-based asset sell orders, respectively, according to a user's instructions, if certain user-specified factors are met (e.g., digital math-based assets are within a given price, quantity, period of time, to name a few). In embodiments, when the digital math-based asset computer system matches an electronic digital math-based asset purchase order with an electronic digital math-based asset sell order, the digital math-based asset computer system may record the trade in an electronic ledger, effectively transferring ownership of the seller's traded digital math-based assets to the buyer, and ownership of the related purchase price in fiat currency from the buyer to the seller. In embodiments, the changes in a user's ownership of digital math-based assets and fiat currency recorded in the electronic ledger are reflected in a user's digital math-based asset account and fiat account.

In embodiments, a digital asset exchange may accept payment methods (e.g., credit card transactions; Automated Clearing House (ACH) debits, wire transfers, digital asset transactions, to name a few) for purchases of digital assets.

In embodiments, users may utilize sub-accounts subordinate to the master account. In embodiments, sub-accounts can be used asentities for traders, or can be used by machines associated with an owner, as discussed in U.S. patent application Ser. No. 15/071,902, filed Mar. 16, 2016 and entitled AUTONOMOUS DEVICES, which is expressly incorporated by reference.

In embodiments, a digital asset exchange may hold digital math-based assets and/or fiat currency in trust for users before, during and after a trade. Fiat currency may be maintained in accounts with a state or federally chartered bank and may be eligible for FDIC insurance, subject to compliance with applicable federal regulation. In embodiments, a digital asset exchange may also operate a digital math-based asset storage system, in which users may deposit digital math-based assets. In embodiments, fiat currency may be transmitted to a digital asset exchange's omnibus account. In embodiments, the exchange may transmit fiat currency back to a user upon receiving a request from a user.

In embodiments, a digital asset exchange may comply with relevant laws and regulations whereby the exchange may operate in a highly regulated banking environment and permit necessary supervision by relevant legal authorities.

In embodiments, when a user commences an electronic digital math-based asset purchase order to acquire digital math-based assets, the user may either have fiat currency in an associated user account or the buyer may send fiat currency to the digital asset exchange's omnibus account at the applicable bank. In embodiments, when a seller commences a an electronic digital math-based asset sell order to sell digital math-based assets, the seller may either have digital math-based assets in an associated user account or may send digital math-based assets to a digital math-based asset account. In embodiments, the seller may send digital math-based assets to one or more of digital wallets held by the exchange. In embodiments, exchange transactions may only be completed after the digital math-based asset computer system verifies that the digital math-based asset accounts and fiat accounts associated with the users involved in the transaction at least equal the quantities required by the transaction.

In embodiments, the exchange may permit trading twenty-four hours a day, seven days a week. In embodiments, the exchange may shut down for scheduled maintenance periods. In embodiments, the exchange may prohibit users from transferring fiat currency outside of normal business hours, in order to comply with applicable laws and regulations. In embodiments, the exchange may allow users to deposit and withdraw digital math-based assets outside of normal business hours. In embodiments, the exchange may permit users to sell digital math-based assets for fiat currency or buy digital math-based assets with fiat currency if the user holds sufficient fiat currency in its associated account prior to initiating the transaction.

In embodiments, as discussed herein, exchange customers looking to buy digital assets may be matched to customers looking to sell digital assets, which matching may be performed by an exchange trading engine. Transaction volumes and prices may be based at least in part upon bids and asks that are received by the trading engine from the customers.

Figure 32:
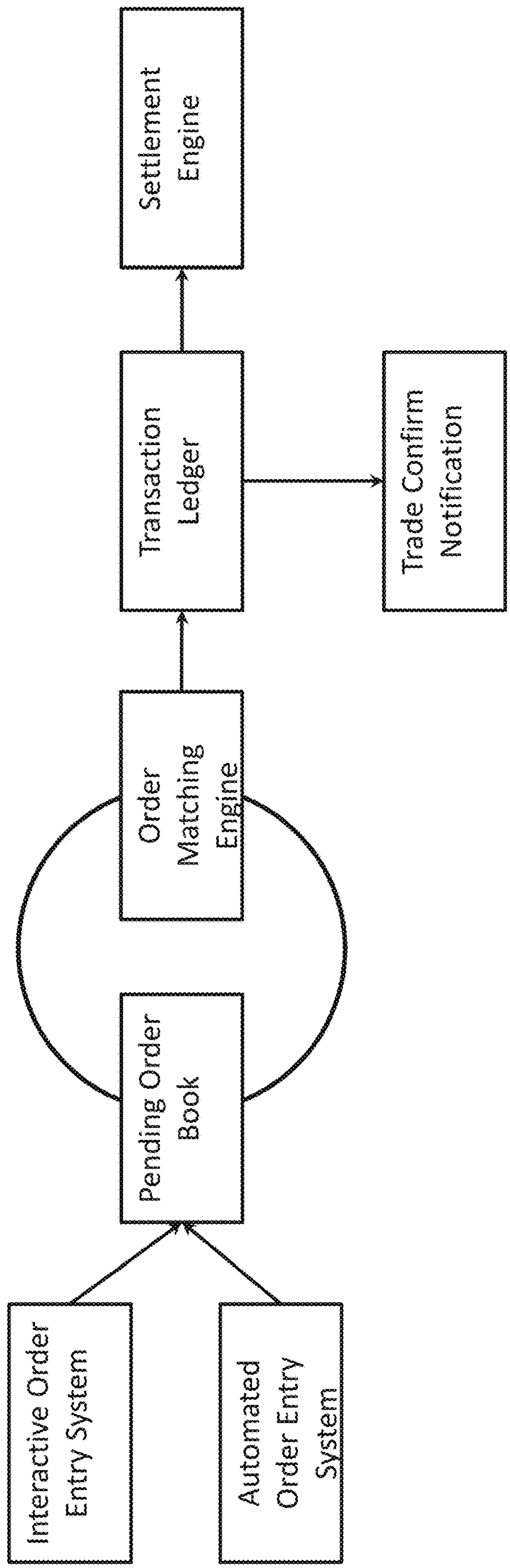
FIG. 32 is an exemplary schematic diagram of a digital asset exchange transaction system in accordance with exemplary embodiments of the present invention.
Figure 33:
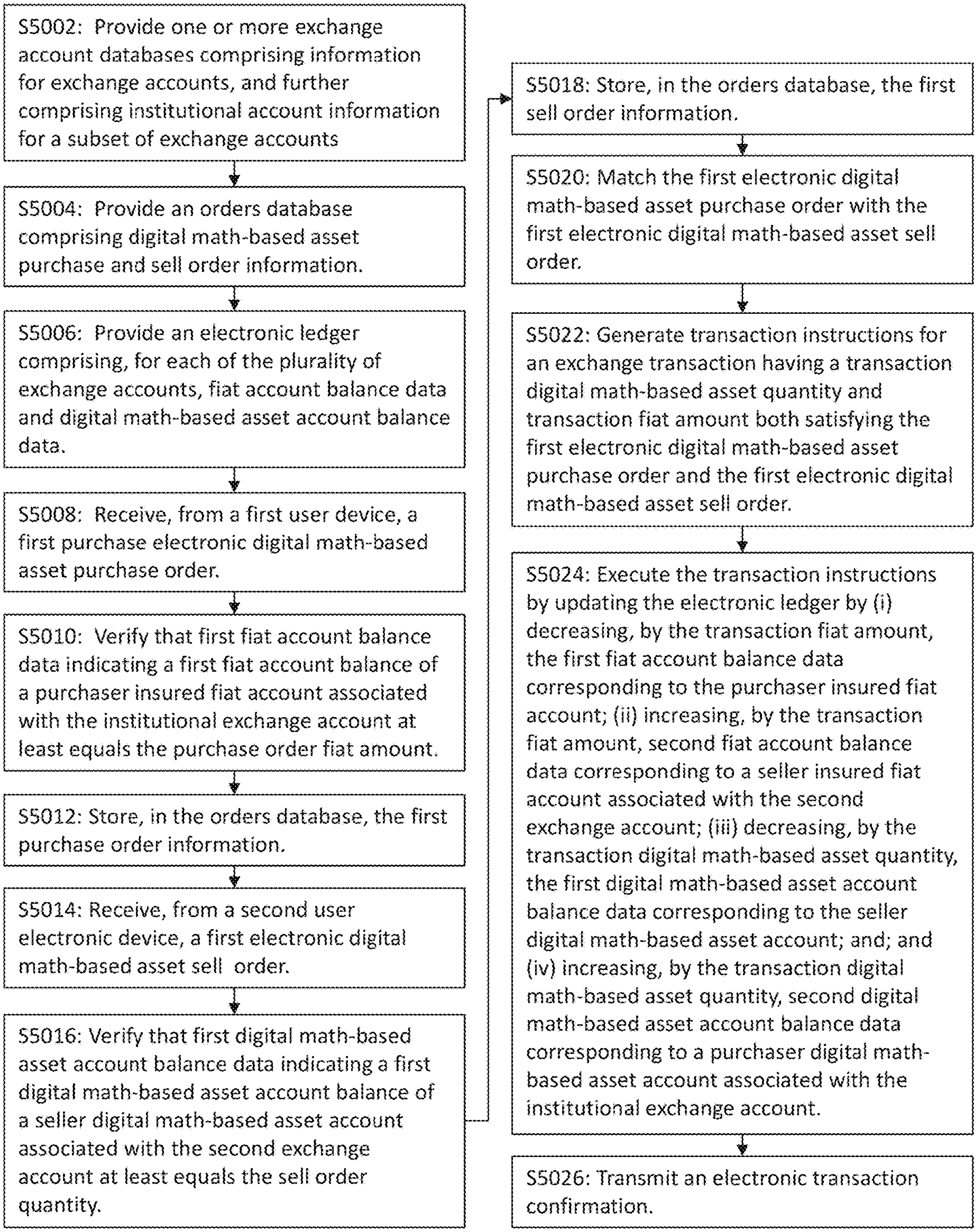
FIG. 33 is an exemplary flow chart of operational transaction processes of a digital math-based asset electronic exchange in accordance with exemplary embodiments of the present invention.

FIG. 32 illustrates an exemplary embodiment of an exchange trading system in accordance with embodiments of the present invention. An interactive order entry system may provide one or more interfaces through which exchange customers may initiate exchange transactions. An automated order entry system may comprise one or more trading APIs that allow customer computer-initiated transactions. Orders may be electronically stored in an electronic pending order book. An exchange order matching engine, which can comprise a computer system, may match bids and asks or otherwise match buyers and sellers of pending transactions. A transaction ledger may track transactions. A settlement engine may process the transactions, which may include providing trade confirmations or otherwise carrying out the transactions.

In embodiments, a digital asset exchange may employ systems and methods to manage and/or reduce digital asset transaction change. Digital asset transaction change refers to leftover digital asset amounts from transactions in digital asset systems, such as Bitcoin, where the transactions are comprised of one or more digital inputs and outputs. A wallet stores unspent transaction outputs, which it can use as digital inputs for future transactions. In embodiments, a wallet or third-party system may store an electronic log of digital outputs to track the outputs associated with the assets contained in each wallet. In digital asset systems such as Bitcoin, digital inputs and outputs cannot be subdivided. For example, if a first wallet is initially empty and receives a transaction output of 20 BTC from a second wallet, the first wallet then stores that 20 BTC output for future use as a transaction input. To send 15 BTC, the first wallet must use the 20 BTC as an input, 15 BTC of which will be a spent output that is sent to the desired destination and 5 BTC of which will be an unspent output, which is transaction change that returns to the first wallet. A wallet with digital assets stored as multiple digital outputs can select any combination of those outputs for use as digital inputs in a spending transaction.

For transactions involving sending digital assets from exchange wallets to non-exchange wallets (e.g., when a user requests a withdrawal of digital assets from the user's exchange account), a digital asset exchange may employ systems and methods to reduce transaction change, e.g., to avoid a temporary decrease in liquidity due to the unavailability of funds during a transaction confirmation period, to which the change in systems such as Bitcoin is subject.

To manage and/or reduce transaction change, in embodiments, an exchange may maintain wallets containing varying sized digital outputs so that an output or combination of outputs can be selected as digital input for a transaction, where the total input amount can have a size either equal to or greater than but close to the transaction amount. Accordingly, the exchange may employ a wallet balancing module running one or more balancing algorithms on one or more processors to distribute digital assets to wallets in digital outputs of various sizes and various quantities of each size. These output sizes and quantities thereof may be predetermined and programmed into the wallet balancing module and/or may be adjusted algorithmically to better reduce transaction change in light of actual current or historical exchange transaction activity. Wallet balancing operations may be performed continuously, periodically throughout a day, once a day (e.g., at midnight), once a week, at some other interval, as balancing is required for one or more transactions, and/or as the wallet balancing module determines a wallet imbalance that exceeds a threshold tolerable imbalance. In embodiments, an exchange wallet balancing module may perform balancing operations after receiving a digital asset withdrawal request from a user and before transferring the digital assets to the user.

An exchange may also reduce transaction change by programming multiple outputs for a single transaction. In embodiments, digital asset withdrawals may be processed only at specified times or periodically, e.g., in the morning and in the evening. Such a system may facilitate batch processing of withdrawals using multiple digital transaction outputs. In embodiments, digital asset storage or protection services, such as insurance or storage warranties, may be offered through a digital asset exchange. Transaction insurance or warranties may also be offered, e.g., to guarantee an exchange transaction for a particular volume at a particular price.

Order Book Types

In embodiments of a digital asset exchange in accordance with the present invention, one or more types of order books may be used. For example, in embodiments, a digital asset exchange may feature central limit order books that follow a price-time priority model.

In embodiments, a continuous order book and/or auction order book may be used with any pair of digital assets and/or digital asset and flat currency. For example, in embodiments the following trading pairs and order books may be available:

| | Continuous Order Book | Auction Order Book |
|---|---|---|
| BTC/USD | Yes | Yes |
| ETH/USD | Yes | Yes |
| ETH/BTC | Yes | No |

In the above example, BTC/USD is a pairing of Bitcoin with U.S. dollars, ETH/USD is a pairing of Ethers and U.S. Dollars and ETH/BTC is a pairing of Ethers and Bitcoin.

In embodiments, both a continuous order book and an auction order book may not be available, for example, an auction order book may not be available for an ETH/BTC pairing. In embodiments, however, an auction could be provided based on digital currency to digital currency pairings, such as ETH/BTC. In embodiments, other pairings may also be available such as other digital assets with other fiat currencies, or other digital asset pairs.

In embodiments, a digital asset exchange may operate during limited hours, or may operate 24 hours a day, seven days a week, except for brief maintenance periods.

In embodiments, clients may submit as many orders as desired with any of the execution options described below. Alternatively, in embodiments, the number of orders may be restricted.

In embodiments, a digital asset exchange may be a full reserve exchange in which all orders are fully funded. In full reserve exchange embodiments, a client's outstanding interest on orders books of the digital asset exchange cannot exceed their account balance at any time and all open orders reduce a client's available balance until such orders are fulfilled or canceled. In other embodiments, a digital set exchange may offer margin trading.

Order Types

In embodiments, a digital asset exchange may support the following order types and execution options:

| | Description | Specifies Price | Can Trade Against Resting Orders | Can Rest on Continuous Order Book | Can Trade in Auction |
|---|---|---|---|---|---|
| Market | Filled immediately against resting orders at the current best available price. | No | Yes | No | No |
| Limit | Filled at or better than a specified price. Any quantity that is not filled rests on the continuous order book until it is filled or canceled. | Yes | Yes | Yes | Yes |
| Limit: Immediate-or-Cancel (IOC) | Filled immediately at or better than a specified price. Any quantity that is not filled immediately is canceled and does not rest on the continuous order book. | Yes | Yes | No | No |
| Limit: Maker-or-Cancel (MOC) | Rests on the continuous order book at a specified price. If any quantity can be filled immediately, the entire order is canceled. | Yes | No | Yes | Yes |
| Limit: Auction-Only (AO) Limit | Rests on the auction order book and is filled at or better than a specified price at the conclusion of an auction. Any quantity that is not filled is canceled. | Yes | No | No | Yes |

It will be appreciated that in embodiments, different combinations of order types may be available and in embodiments, additional order types may be available and some order types may not be available. In embodiments, order types may differ for pairings of digital assets and/or fiat currencies.

Continuous Order Book

In embodiments, a digital asset exchange may have a continuous book. The continuous book may support market orders and/or limit orders.

In embodiments, a continuous order book may be implemented, by way of example, in accordance with the following:

1. Alice places a limit order to buy 16.65 BTC at a price of 5885.65 USD.
2. Bob places a limit order to sell 21.84 BTC at a price of 5924.85 USD.
3. Both orders rest on continuous order book.

Limit Orders

In embodiments, limit orders have a side, a limit price in fiat (e.g. USD) and a quantity in digital asset (e.g., Bitcoin or Ether). Example:

Execution Options

In embodiments, continuous book limit orders support the following execution options:

Option 1: Standard (Good until canceled)

The order may be filled in part or fully before being booked. The order will rest on the book until complete filled or cancelled.

Option 2: Immediate or Cancel

The order never rests on the book. The order is filled to the extent possible based on existing orders on the order book, and any remainder is cancelled.

Option 3: Market or Cancel

The order rests on the book to add liquidity. The order will be cancelled if any part of it would be filled immediately.

Market Buys in the Continuous Book

In embodiments, a continuous book may offer market buys. Market buys may be placed with a gross notional value in fiat (e.g., USD). A fee may be deducted from the gross amount. Market buys are filled against resting orders on the book. Any remainder to the order is cancelled when filled. As a circuit breaker, in embodiments, a threshold may be applied to a market buy, e.g., filling up a market buy up to a fixed percentage (e.g., 20%) or an aggregate amount (e.g., x digital assets or y fiat) against the market at time of order, with the remainder of the order being cancelled.

In embodiments, market buys in the continuous book may be implemented, by way of example, in accordance with the following:

1. Charlie wants to buy 5000 USD worth of bitcoin. He places a market buy order that is immediately filled against Bob's resting limit order to sell 21.849 BTC at a price of 5924.98 USD.
2. Charlie receives 0.84177499 BTC which his 4987.50 USD worth of BTC at the current market price of 5924.98 USD. 4968.50 USD is the net notional value of Charlie's market buy, which is the 5000 USD gross notional value of the market buy less his 12.50 USD fee.
3. Bob's limit sell continues to rest on the books with a remaining quantity of 21.007225 BTC.

Market Sells in the Continuous Book

In embodiments, a continuous book may offer market sells. Market sells are placed with a quantity in digital assets. As a circuit breaker, in embodiments, a threshold may be applied to a market sell, e.g., filing up a market sell up to a fixed percentage (e.g., 20%) or an aggregate amount (e.g., x digital assets or y fiat) against the market at time of order, with the remainder of the order being cancelled.

In embodiments, market sells in the continuous book may be implemented, by way of example, in accordance with the following:

1. David wants to sell 3 BTC at whatever the market price is. He places a market sell order that immediately crosses with Alice's resting limit order to buy 16.65 BTC at a price of 5885.65 USD.
2. David nets 17,612.81 USD form his market sell. 17,656.95 USD less his 44.14 USD fee.
3. Alice's limit buy continues to rest on the books with a remainder quantity of 13.65 BTC.

Priority of Matching on Continuous Book

In embodiments, the priority of matching orders resting on the books may be filled in using price time priority.

In embodiments, priority of matching orders resting on the books filled in using price time priority may be implemented, by way of example, in accordance with the following:

At T1: Alice places a limit order to buy 2 BTC at 5788.52 USD.

At T2: Charlie places a limit order to buy 0.5 BTC at 5788.58 USD

At T3: Bob places a limit order to buy 3 BTC at 5788.52 USD

At T4: David places a limit order to sell 5.25 BTC at 5788.50 USD

David's order then completely fills, crossing first with Charlie then Alice and then partially filling Bob's order, which was placed last time at an acceptable price. Because of price improvement, David's order fills at a higher price than his limit price.

| PARTICIPANT | ORDER TIME | ORDER PRICE | FILLED QUANTITY | FILLED PRICE | RESTING QUANTITY |
|---|---|---|---|---|---|
| ∨ David | X + 3 | 5788.50 USD | 0.5 BTC | 5788.55 USD | 4.75 BTC |
| ∧ Charlie | X + 1 | 5788.55 USD | 0.5 BTC | 5788.55 USD | 0 BTC |
| ∧ Alice | X | 5788.52 USD | 0 BTC | 5788.52 USD | 2 BTC |
| ∧ Bob | X + 2 | 5788.52 USD | 0 BTC | 5788.52 USD | 3 BTC |

| PARTICIPANT | ORDER TIME | ORDER PRICE | FILLED QUANTITY | FILLED PRICE | RESTING QUANTITY |
|---|---|---|---|---|---|
| \/ David | X + 3 | 5788.50 USD | 2 BTC | 5788.52 USD | 2.75 BTC |
| /\ Alice | X | 5788.52 USD | 2 BTC | 5788.52 USD | 0 BTC |
| /\ Bob | X + 2 | 5788.52 USD | 0 BTC | 5788.52 USD | 3 BTC |

| PARTICIPANT | ORDER TIME | ORDER PRICE | FILLED QUANTITY | FILLED PRICE | RESTING QUANTITY |
|---|---|---|---|---|---|
| \/ David | X + 3 | 5788.50 USD | 2.75 BTC | 5788.52 USD | 0 BTC |
| /\ Bob | X + 2 | 5788.52 USD | 2.75 BTC | 5788.52 USD | 0.25 BTC |

| PARTICIPANT | ORDER TIME | ORDER PRICE | RESTING QUANTITY |
|---|---|---|---|
| /\ Bob | X + 2 | 5788.52 USD | 0.25 BTC |

In embodiments, resting limit order could also be filled on a continuous book in price-time priority.

In embodiments, resting limit order filled on a continuous book in price-time priority may be implemented, by way of example, in accordance with the following:

1. At time X+1, Charlie's resting limit buy order for 0.5 BTC at $5,786.55 is filled.
2. At time X, Alice's resting limit buy order for 2 BTC at 5788.52 USD is completely filed.
3. At time X+2, Bob's resting limit buy order for 3 BTC at 5788.52 US is partially filed for 2.75 BTC, 0.25 BTC remains resting on the book.

Auctions

Auction Order Book

In embodiments, a digital asset exchange may have an auction order book. In embodiments, the auction order book is blind but the public auction events contain information that allows market participants to understand when there is an imbalance of buy or sell interest. In embodiments, the auction order book supports auction-only (AO) market and limit orders. These orders rest until the auction runs, at which time the orders will be either filled or cancelled. In general, self-trading should not be not allowed. An incoming order that would cross with a resting order on the auction book from the same account is cancelled.

In embodiments, a digital asset exchange in accordance with the present invention may conduct auctions for certain trading pairs periodically (e.g., every day (including weekends and holidays)) and/or aperiodically (e.g., a specific announced times, which may be irregular). Such auctions offer a technical advantage of fostering moments of elevated liquidity and price discovery.

In embodiments, auctions may be implemented, by way of example, in accordance with the following representative schedules:

BTC/USD AUCTION SCHEDULE

| New York | 8 am | 3:51-<br>3:50 pm | 3:59 pm | 3:59 pm | 3:59:15-<br>3:59:45 pm | 4 pm |
|---|---|---|---|---|---|---|
| UTC (EDT) | 12:00 | 19:50 | 19:51-<br>19:59 | 19:59 | 19:59:15-<br>19:59:45 | 20:00 |
| UTC (EST) | 13:00 | 20:50 | 20:51-<br>20:59 | 20:59 | 20:51:15-<br>20:59:45 | 21:00 |
| SGT/HKT | 11 am | 6:50 pm | 6:51-<br>6:59 pm | 6:59 pm | 6:59:15 -<br>6:59:45 pm | 7 pm |
| JST | 12:00 | 19:50 | 19:50 -<br>19:59 | 19:59 | 19:50:15-<br>19:59:45 | 20:00 |
| UTC | 03:00 | 10:50<br>10:59 | 10:51- | 10:59<br>10:59:45 | 10:59:15- | 11:00 |
| | Begin accepting orders for auction. | First auction simulation runs. First indicative price is published via API and website UI. | The auction simulation is repeated and the indicative price is published every minute. | Auction-Only (AO) Limit orders may no longer be canceled but may still be placed. | The auction simulation is repeated and the indicative price is published every 15 seconds. | Auction runs. Auction-Only (AO) Limit orders are filled or cancelled. If successful, auction results are published as a bulk trade via API and website UI.5 |

ETH/USD AUCTION SCHEDULE

| New York | 8 am | 3:50 pm | 3:51-3:59 pm | 3:59 pm | 3:59:15-3:59:45 pm | 4 pm |
|---|---|---|---|---|---|---|
| UTC (EDT) | 12:00 | 19:50 | 19:51-19:59 | 19:59 | 19:59:15-19:59:45 | 20:00 |
| UTC (EST) | 13:00 | 20:50 | 20:51-20:59 | 20:59 | 20:51:15- | 21:00 20:59:45 |
| | Begin accepting orders for auction. | First auction simulation runs. First indicative price is published via API and website UI. | The auction simulation is repeated and the indicative price is published every minute. | Auction-Only (AO) Limit orders may no longer be canceled but may still be placed. | The auction simulation is repeated and the indicative price is published every 15 seconds. | Auction runs. Auction-Only (AO) Limit orders are filled or cancelled. If successful, auction results are published as a bulk trade via API and website UI. |

In embodiments, the auction order book may have time constraints, so that auction order windows may only be placed within a specified time window. Thus, the auction order book for a given auction may open a set time period in advance of the auction (e.g., 8 hours before the auction begins), as the opening of the auction order window. For example, if an auction is set to begin at 4:00 p.m. Eastern Standard Time, the Auction could begin at 8:00 a.m. Eastern Standard Time, as illustrated above.

In embodiments, once an auction window opens, auction-only order may not be cancelled after the final indicated price has been published, e.g., one minute before the auction runs. In the above example, that would be 3:59 p.m.

In embodiments, auction-only orders may be accepted up until the auction runs.

In embodiments, auction only orders placed outside of the auction order window may be rejected.

Auction Event

In embodiments, at a set time period before the auction begins, e.g., 10 minutes, an indicative auction event window may be opened. An indicative auction event is a simulation of what would happen if the auction ran at that point in time. In embodiments, an indicative auction uses the same pricing algorithm as the final auction price determination. In embodiments, although the auction order book is blind, indicative auction events show when there is a buy/sell interest imbalance so participants may adjust their orders.

During an indicative auction window, indicative results may be published at set time intervals, such as once a minute, twice a minute, four times a minute, to name a few, and will continue to be published until the indicative auction window closes. In embodiments, the indicative auction window will not close until the auction is run.

In the example above, for an auction beginning at 4:00 p.m. Eastern Standard Time, an indicative auction window may be opened 10 minutes prior at 3:50 p.m. Eastern Standard Time. Indicate results are published once a minute starting at the opening of the indicative auction window at 3:50 p.m. Eastern Standard Time, 10 minutes before the 4:00 p.m. auction. Starting at one minute before the auction window, 3:59 p.m. Eastern Standard Time, the indicative price may be published every 15 seconds. An indicative auction window will close when the auction window opens at 4:00 p.m., with the last indicative price published at 3:59:45 p.m. Eastern Time. Of course, other time periods can be used to set the opening and closing of the indicative auction windows and one or more intervals of publication can be used in that windows.

Figure 55:
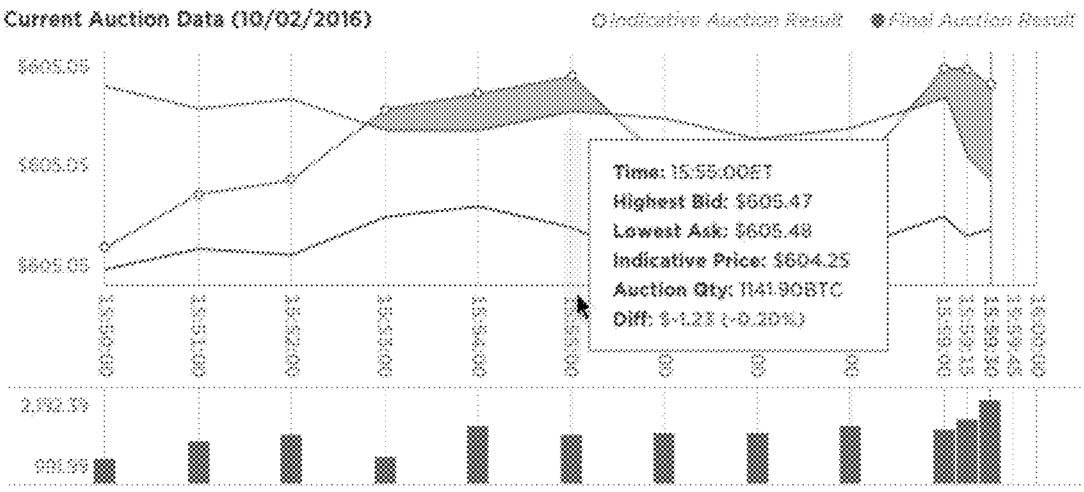
FIG. 55 illustrates an example of indicative auction results as may be published during an indicative auction window.

FIG. 55 illustrates an example of indicative auction results as may be published during an indicative auction window.

In embodiments, the final auction run at a final auction run time, e.g., 4:00 p.m. Eastern Standard Time in the above examples. In embodiments, at the final auction run time, no more orders on the continuous or auction order books are accepted. In embodiments, the midpoint of the best bid and best ask from the auction price will be taken as the auction collar price. In embodiments, an index value may be taken as the auction collar price.

The final auction price for every auction is established as the price that executes the greatest aggregate quantity and minimizes the imbalance between buy and sell orders across both the auction and continuous order books. The imbalance is defined as the absolute value of the difference between total buy orders and total sell orders at a given price across both the auction and continuous order books. Other pairings and timings may be used in accordance with the embodiments of the present invention.

Within this auction design, the market is open to accepting orders until the time the auction algorithm runs.

Limit Orders for Auctions

In embodiments, limits order may be placed in auctions. Typically, limit orders have a side (e.g., buy or sell), a limit price in fiat (e.g., USD), and a quantity in digital asset (e.g., BTC).

In embodiments, once a limit order is placed for an auction, the order will rest until the auction runs and the auction window closes.

In embodiments, if the auction succeeds, limit orders will be filled based on:

1. Price-time priority
2. If the auction price is equal to the limit price or a price improvement (auction price is lower than the limit buy order or higher than the limit sell order).

Market Orders for Auctions

In embodiments, auction-only market buys and sells are like their continuous book counterparts except that they will rest on the book until they are cancelled or the auction runs. If the auction succeeds, auction-only market orders may be filled according to time priority, unlike in the continuous book where market orders are filled immediately. Although uncommon, auction-only market orders may be partially filled or even unfilled. This can happen when the auction has an unusually large buy-sell interest imbalance.

Auction Example

In the example below, there are two prices, $99 and $100, that will execute the greatest aggregate quantity across both the auction and continuous order books, which is 30. However, at the $99 price, the imbalance between buy and sell orders is greater than it is at the $100 price. As a result, the final auction price will be $100 because this price executes the greatest aggregate quantity and minimizes the imbalance between buy and sell orders across both the auction and continuous order books.

| Price | Total Buy Interest | Total Sell Interest | Auction Quantity | Imbalance |
|---|---|---|---|---|
| $98 | 100 | 10 | 10 | 90 |
| $99 | 60 | 30 | 30 | 30 |
| $100 | 30 | 30 | 30 | 0 |
| $101 | 10 | 60 | 10 | 50 |
| $102 | 0 | 100 | 0 | 100 |

Priority of Limit Orders

In embodiments, all limit orders at the same specified price are treated equally and executed in the order in which they were received. Partially filled resting limit orders retain their priority until canceled.

Auction Methodology

In embodiments, a Walrasian auction that seeks to identify the price with the greatest aggregate quantity may be employed. In such embodiments, each possible price is tested summing up buy and sell quantities. The price that would execute the greatest possible "wins" may be selected. In embodiments, in the event of a tie between two or more prices that would execute the same quantity, the exchange may select the price that minimizes the imbalance between the buy and sell orders across the auction order book and/or the auction and continuous order books. In embodiments, in the event of a tie between two or more adjacent prices that would execute the same quantity, the auction price may be the midpoint of the two adjacent prices. In embodiments, in the event of a tie between two or more adjacent prices that would execute the same quantity, the auction price may be the price that is closest to the collar price. In the event that the two prices are equally close to the collar price, the auction price may be the midpoint of the two prices.

In embodiments, the auction price is established as the price that executes the greatest aggregate quantity (i.e. auction quantity) across both the auction-only and continuous order books. It is possible that there is not an exact match between buy and sell interest at this price, and so some orders will partially filled or not be filled at all. Auction-only market orders may be filled by time priority. To avoid time conflicts, the market may be paused for a brief period (e.g., milliseconds) while the final price, quantity, and controls are calculated.

In embodiments, in order to provide the most liquidity to the marketplace, resting limit orders on the continuous order book may be used in the auction price and quantity calculations. In embodiments, for a resting limit order to be eligible for inclusion, the auction price must be equal to or better than the resting limit price (less than or equal to for bids, or greater than or equal to for asks). Resting limit orders on the continuous order book may be filled according to time priority and are subject to improvements in price.

In embodiments, the auction may fail if an equilibrium cannot be achieved, for example, if the auction quantity is zero. A zero auction quantity could occur when no auction orders are received, or if only one-way auction orders are received (e.g., buy only or sell only orders). In embodiments, a collar may also be placed on the auction. For example, a collar may be placed on the auction price, by using fixed percentage (e.g., 1 percent, 5 percent, 10 percent) of a benchmark against the continuous book price at given time period or set of time period. In embodiments, the benchmark could be a midpoint of the spot price of the continuous book price at the given time period—e.g., auction price. In embodiments, the benchmark could be a weighted average (such as a time weighted average, volume weighted average, or time and volume weighted average) of the continuous book during a pre-set window (e.g., 10 minutes for before auction, 1 hour before the auction, 12 hours before the auction, 24 hours before the auction, to name a few).

In embodiments, digital asset exchange computer system 3230 may set a collar for the auction trade, including a collar minimum and a collar maximum. First, the digital asset exchange computer system 3230 may access, from at least a first database stored on a computer readable medium operatively connected to the digital asset computer system, pricing data associated with the first pair at a predefined time associated with a time of the auction trade order. In embodiments, pricing data can include a spot price. In embodiments, a pricing data may be based on the last transaction immediately prior to the auction. In embodiments, a pricing data may be based on an average of the most recent bid/ask price for the digital asset. In embodiments, the pricing data may be set based on a blended digital asset price as discussed elsewhere herein. For example, a single exchange digital asset price could be determined based on a volume weighted average and/or time weighted average of recent digital asset pricing. In embodiments, a blended digital asset price may be based on a pricing from digital assets taken from a plurality of exchanges (such as qualified exchanges). In embodiments, pricing data may be a blended digital asset price comprising a plurality of digital asset exchanges (e.g., 4) executing trade data for a fixed period of time (e.g., a 10 minute period) using a volume weighting with a fixed percentage (e.g., 5%) of the highest priced trades and a second fixed percentage (e.g., 5%) of the lowest priced trades removed. The digital asset exchange computer system 3230 may calculate a collar minimum for the auctionr based on the pricing data less an amount equal to a first percentage of the pricing data, and a collar maximum for the auction based on the pricing data plus an amount equal to the first percentage of the pricing data. Thus, a collar may be based on a spot price at the time for the auction, plus or minus a defined range, such as a percentage of the spot price or other pricing data. In embodiments, the collar could be set using percentages such as 1%, 2%, 3%, 5%, 10% of the spot price or other pricing data, to name a few. By way of illustration, if a 5% collar is used with a spot price of 1 BTC=USD$10,000, the collar would be set at between USD$9,500 and USD$10,500.

Accordingly, in embodiments, in substep S5604*a*, the digital asset exchange computer system 3230 may retrieve a current pricing information (e.g., bid/ask price) from continuous trading order book 5702*a* associated with a first digital asset pairing and establish a spot price for the first digital asset pairing. As noted above, in embodiments, the spot price may be the average of the current bid/ask price or may be the price used in the last transaction in the continuous trading book, to name a few. In embodiments, the spot price may be a blended digital asset price, in which one or more different order books from one or more digital asset exchanges or index databases may be required to be access to obtain such price. In embodiments, the blended digital asset price may be obtained by being calculated and/or by accessing a blended digital asset price database (not shown). In substep S5604*b*, the digital asset exchange computer system may establish the collar, for example, based on adding and/subtracting a fixed percentage of the spot price to the spot price as discussed above, for example.

In embodiments, the collar may be a blended digital asset price consisting of 4 digital asset exchanges' executed trade data for a 10 minute period volume weighted with 5% of the highest priced trades and 5% of the lowest priced trades removed.

In embodiments, the digital asset exchange computer system 3230 may determine whether the price in the auction is within the limits of the collar determined above (e.g., at or above the collar minimum and at or below the collar maximum).

In embodiments, if the final auction price falls outside the collar, the auction may also fail.

In embodiments, in the event auction fails, the exchange may cancel all the auction-only orders unfilled, close the auction and/or publish as market data for the auction that it failed, either with or without a reason for such failure. In embodiments, where the auction fails because the final auction price falls outside the collar, the price and quantity of the auction that would have otherwise been executed may be published as part of the market data, with an indication that the auction failed.

In embodiments, if the event auction succeeds, the digital asset exchange may fill all eligible auction only and/or continuous book order by strict time priority. In embodiments, continuous book orders may not be filled. The digital asset exchange may also notify the market participants whose orders were filled, such as through the alert system discussed herein. In embodiments, the digital asset exchange may also notify the market participants whose orders were not filled, such as through the alert system discussed herein. The digital asset exchange may also cancel all remaining unfilled and partially filled auction-only orders to the extent such partially filled auction-only orders remain unfiled. The digital asset exchange may then close the auction order book for this auction window. In embodiments, the digital asset exchange may published a market data auction event showing the outcome of the auction, through, e.g., an API or other electronic publication. In embodiments, historical trades may show a bulk trade event for the auction volume. In embodiment, normal operations, such as continuous order book trading, may resume once the auction process is completed.

In embodiments, in addition to publishing the final auction price and whether or not it failed, the collar price may also be published as part of an API or other electronic publication.

Market Place Controls

In embodiments, marketplace controls may be put in place in an effort to foster a fair and orderly market. Examples of marketplace controls can include one or more of the following:

- Orders: Automatic cancellation of any order, or the remaining portion of any order, on a continuous order book that would move the market price by more than a defined percentage (e.g., 20%) in either direction, as compared to the prior prevailing market price;
- Auctions: Automatic cancellation of an auction if the final auction price deviates from the collar price by more than five percent in either direction at the time the auction runs; and
- Self-trade prevention: a digital asset exchange may prohibit a client from crossing with itself on a continuous order book or with itself on an auction order book.

In embodiments, other controls may be put in place consistent with the present invention.

Clearly Erroneous Transaction Policy

A digital asset exchange may, in embodiments, declare a transaction null and void when it is determined to be clearly erroneous.

Marketplace Disruptions

Errors or disruptions may occur on an exchange during the order entry, order matching, or trading process. In embodiments, if any such errors or disruptions occur, the digital asset exchange may cancel any order and/or reverse any trade, in whole or in part.

Market Data

In embodiments, the results of each auction may be made available as pricing data for a digital asset though, e.g., an API. In general, an API is a set of routines or subroutines, protocols and tools for building software applications, which facilitate communications between various software components. An API may be for a web-based system, operating system, database system, computer hardware or software library. An API specification can take many forms, but often includes specifications for routines, data structures, object classes, variables or remote calls. POSIX, Windows API and ASPI are examples of different forms of APIs. Documentation for the API is usually provided to facilitate usage.

In embodiments, auction order book data may not be publically available. In embodiments, auction order book data may be available with a time delay after each auction completes through, e.g., an API. In embodiments, auction data, like other digital asset pricing data, may be used an input to a blended digital asset price, or other index or benchmark.

In embodiments, a digital asset exchange may publish market data using APIs, such as public REST APIs and private REST APIs. Public REST APIs may provide market data such as: current order book, recent trading activity and/or trade history, to name a few. Private REST APIs allows participants to manage both orders and funds, by for example, placing and/or cancelling orders, viewing active orders, viewing trading history and/or trade volume, retrieving available balances, to name a few.

Notifications

In embodiments, individual auction-only and continuous order book market participants may be notified their order has been filled via an email, sms, push notification, or other message and/or a status update on their activity feed. In embodiments, the same alerting system may be used for continuous order book execution.

Decentralized Digital Asset Exchange

Figure 34A:
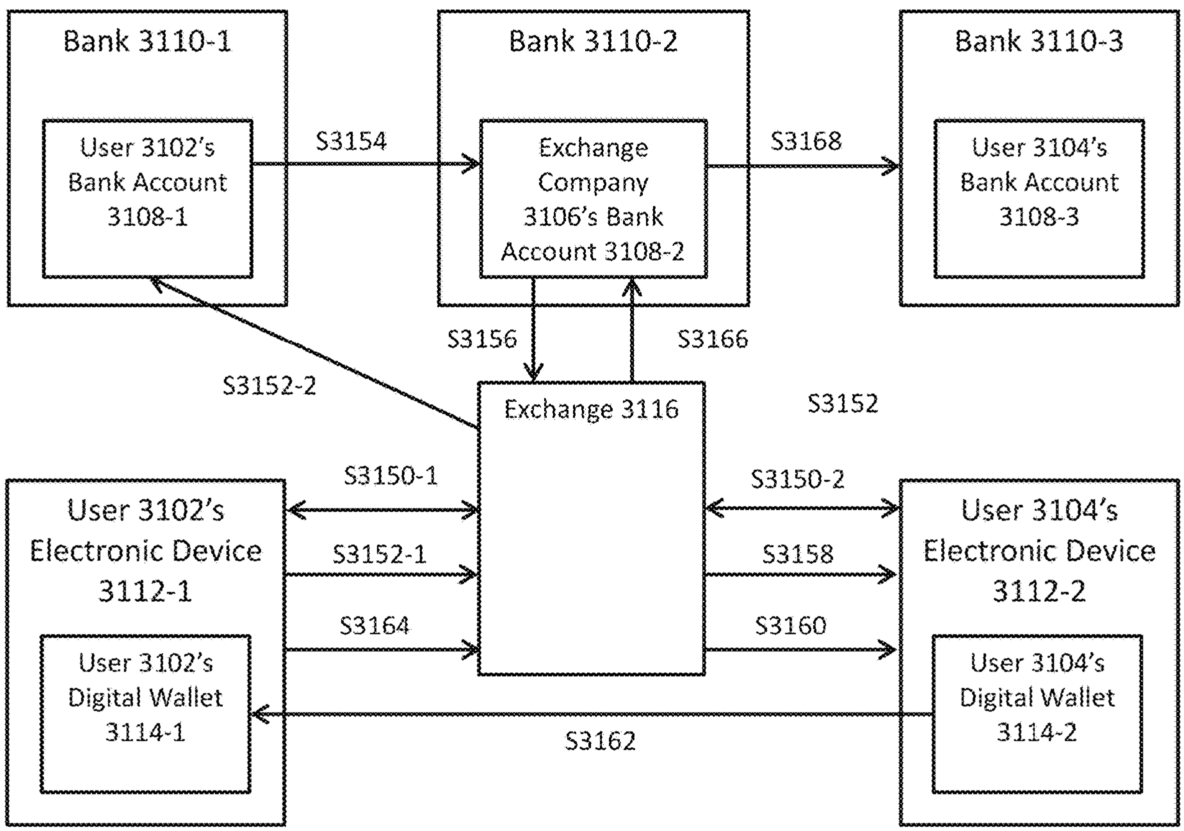
FIGS. 34A-B are a schematic diagram and corresponding flow chart showing participants in and processes for a digital asset exchange system in accordance with exemplary embodiments of the present invention.
Figure 34B:
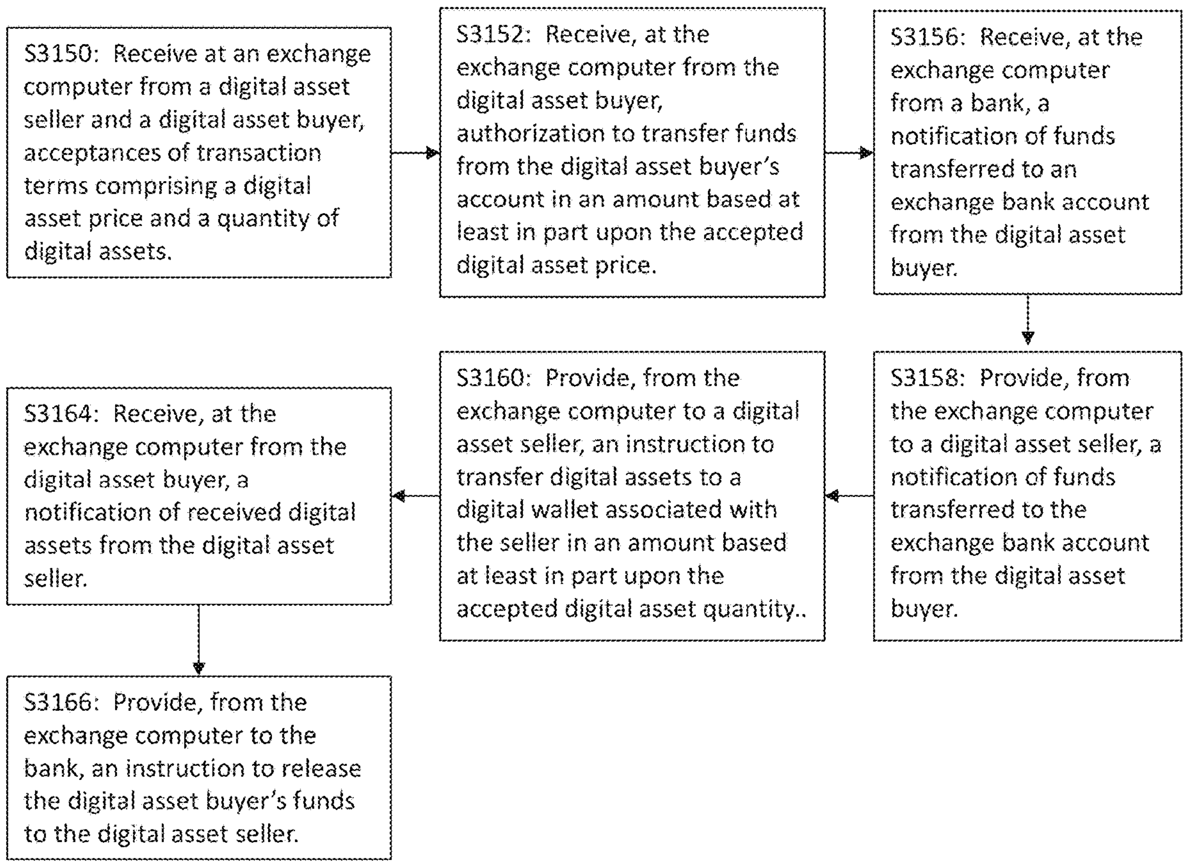

FIGS. 34A-B are a schematic diagram and corresponding flow chart showing participants in and processes for a digital asset exchange system in accordance with exemplary embodiments of the present invention. A digital asset exchange may provide conversions among digital math-based assets and fiat currencies. In embodiments, conversions may be performed between differently denominated digital math-based assets. In embodiments, a digital asset exchange may facilitate the buying and selling of digital assets in exchange for other digital assets, non-digital assets, fiat currencies, or other financial instruments. The parties to such a transaction may be individuals, organizations, and or institutions. In embodiments, the exchange itself or its operator or owner may be the counter-party to an exchange transaction.

FIG. 34B is a flow chart corresponding to the digital asset exchange system illustrated in FIG. 34A. In a step S3150, one or more exchange computers comprising an exchange computer system may receive from a digital asset buyer acceptances of transaction terms comprising a digital asset price and a quantity of digital assets.

In a step S3152, the exchange computer system may receive from the digital asset buyer authorization to transfer funds from the digital asset buyer's account in an amount based at least in part upon the accepted digital asset price.

In a step S3156, the exchange computer system may receive from a bank, a notification of funds transferred to an exchange bank account from the digital asset buyer.

In a step S3158, the exchange computer system may provide to a digital asset seller a notification of funds transferred to the exchange bank account from the digital asset buyer.

In a step S3160, the exchange computer system may provide to a digital asset seller, an instruction to transfer digital assets to a digital wallet associated with the seller in an amount based at least in part upon the accepted digital asset quantity. In embodiments, the digital asset seller may transfer digital assets to a digital wallet associated with (e.g., owned by and/or operated by) the exchange. The exchange may hold such funds in escrow until the buyer's payment is received, e.g. into a bank account (for fiat currencies) or into a digital wallet (for other digital assets).

In a step S3164, the exchange computer system may receive from the digital asset buyer a notification of received digital assets from the digital asset seller.

In a step S3166, the exchange computer system may provide to the bank, an instruction to release the digital asset buyer's funds to the digital asset seller.

In another embodiment, the exchange can act as a counter-party to transactions where digital assets are bought and/or sold for a differently denominated digital asset or a fiat currency. In embodiments, the system illustrated in FIG. 34A can be used to perform exchange transactions with multiple counter-parties. An exchange computer system may identify a digital asset seller and a plurality of buyers. The exchange computer system may determine, obtain, or receive (e.g., from computers, digital asset kiosks, or user electronic devices associated with the buyers) public addresses of digital asset wallets associated with the buyers. The exchange computer system may also determine, obtain, or receive digital wallet information (e.g., public address, public key, and/or private key) associated with the seller. In embodiments, wallet information of any exchange participant may be stored by the exchange computer system in one or more databases, which may be accessed as part of a transaction. A participant in an exchange transaction may also input (e.g., via downloadable software or a website associated with the exchange) and/or otherwise transmit to the exchange required digital wallet information from which to send or in which to receive digital assets. The exchange computer system may use the digital wallet information of the exchange transaction participants to generate transaction instructions. For example, the exchange computer system may pre-program instructions to transfer a certain amount of digital assets from the seller wallet to each buyer wallet. The exchange computer system may also input the digital wallet access credentials (e.g., a public and private key) so that the transaction may proceed.

Generation of Digital Asset Exchange Graphical User Interfaces

The particular systems, methods, and program products of embodiments of the present invention that generate graphical user interface (GUI) provide a solution to electronic order book data visualization problems. The potential for large numbers of orders in an electronic order book creates a technical data visualization problem, whereby it can be difficult for a user (e.g., a trader) to determine how a particular order or prospective order will impact the market or the market within a particular digital asset exchange system or how a particular order will be fulfilled based upon pending orders in a current order book. Embodiments of the present invention provide electronic order book visualization interfaces that include a representation of a prospective order defined by order parameters, which may be edited by the user. Upon editing prospective order parameters, the prospective order graphical representation may be updated to reflect the new parameters. These interfaces can provide a user with an intuitive depiction of both the current market and the effect of the prospective order on the market. The interfaces can also show how a prospective order may be fulfilled, not fulfilled, and/or the degree to which a prospective order will likely be fulfilled based on the current electronic order book. The interfaces also provide an unconventional visualization that can facilitate faster comprehension of the bounds of order book data (e.g., order prices and corresponding order volumes).

FIGS. 35A-L are exemplary screen shots of graphical user interfaces generated and/or provided by an exchange computer system. In embodiments, the exchange computer system may transmit display data to user devices, which can comprise machine-readable instructions to render such user interfaces. User interfaces may be based at least in part upon user activity (transaction histories, order information, such as potential order parameters, actual order parameters, order fulfillment data, order dates and/or times, to name a few) and/or market activity (e.g., prices, historical prices, price movements, high and/or low prices within a time period, transaction volume, order book information, to name a few, either globally or on one or more particular digital asset exchanges). The exchange computer system may track such data, compute such data, generate such data, and/or obtain such data (e.g., via one or more application programming interfaces (APIs)). Data for generating a user interface may be stored in non-transitory computer-readable memory operatively connected to the exchange computer system. The exchange computer system may process logical rules governing user interface content and/or layout to generate display data and/or instructions for rendering an interface at a user electronic device. Such data and/or instructions may be transmitted to the user device, which may render the interface. In embodiments, the user device may executed the machine-readable instructions to render the interface, which may be a dynamic interface that changes in response to user inputs and/or receipt of updated data values.

Figure 35A:
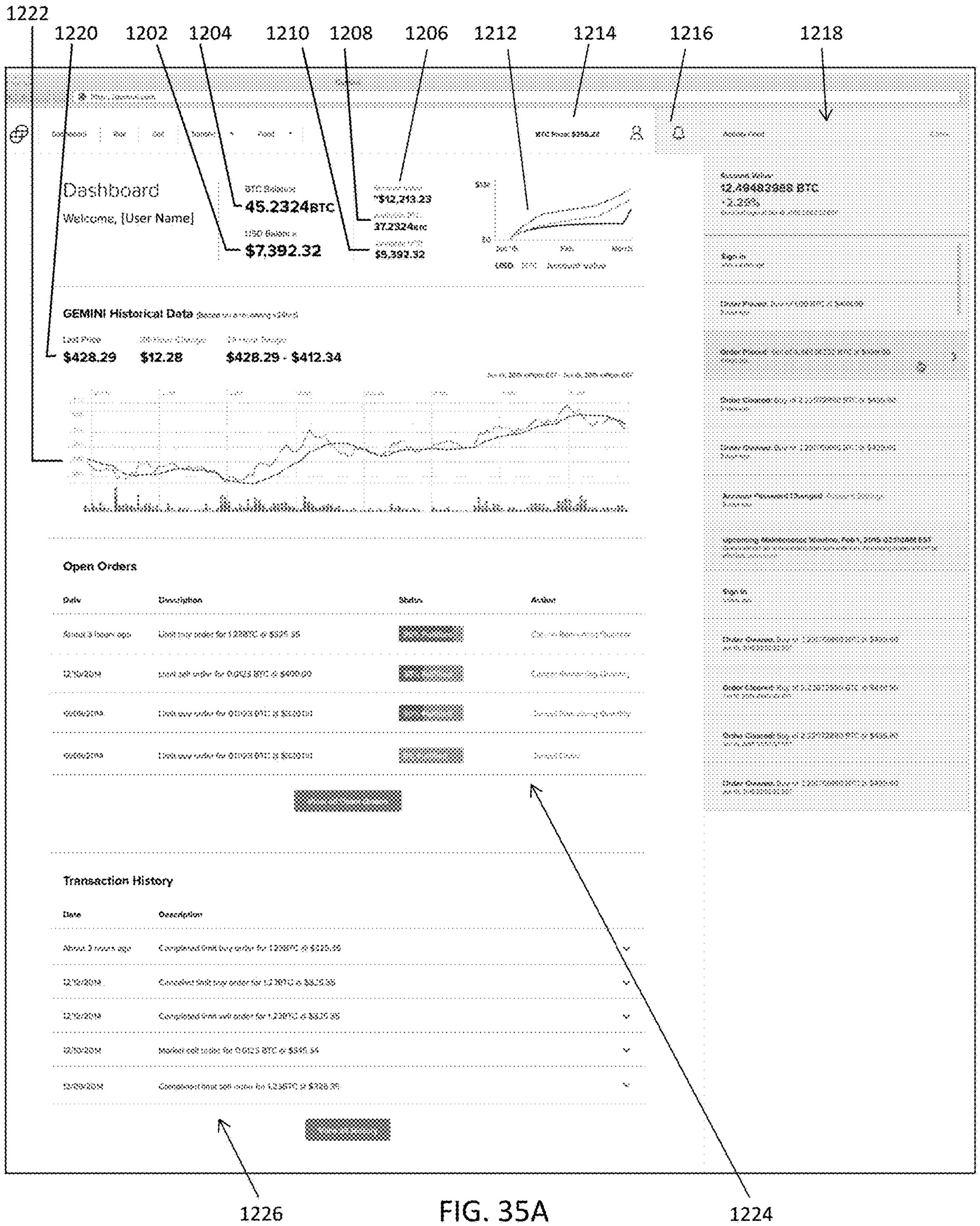
FIGS. 35A-L are exemplary screen shots of user interfaces provided by an exchange computer system in accordance with exemplary embodiments of the present invention.

Turning to FIG. 35A, a screenshot of a GUI for use with a digital asset exchange according to exemplary embodiments described herein is illustrated. The GUI may comprise a dashboard, which may present an overview of user activity (e.g., for a particular user or user account), exchange-wide activity, and/or broader market activity (e.g., based upon one or more exchanges or based upon a digital asset index, to name a few). For example, a current digital asset price 1214 may be displayed. Such price may be the market price based on the electronic order book of the digital asset exchange. In embodiments, such current digital asset price 1214 may be based upon one or more other exchanges and/or digital asset indices, which may provide a blended price (e.g., weighted by transaction volume at each price).

The dashboard GUI may present various information associated with a digital asset exchange, for example, balance information (including fiat currency balances 1202 and/or digital asset balances 1204), account value information (including present, past, and/or predicted values), historical trends, open orders, past orders, and/or user history, to name a few. Accordingly, such a dashboard interface may include account summary information, such as one or more digital asset balances 1204 and/or fiat currency (e.g., U.S. Dollar) balances 1202 associated with a particular user account or master account, which may be an umbrella account with a plurality of user sub-accounts. The dashboard interface may also include an account value 1206, which may be a sum of all digital asset balances and fiat currency balances. In embodiments, the account value may be expressed in digital asset quantities and/or in fiat currency amounts. Accordingly, the exchange computer system may estimate a conversion amount either from a digital asset balance to a fiat currency value or from a fiat currency balance to a digital asset value, which conversions may be based upon order book information for the exchange and/or a digital asset index, such as a current market price. The dashboard interface may also indicate values for available digital assets 1208 and available fiat currencies 1210 associated with a user account. Amounts available may be based upon account balances and pending orders, such as by subtracting pending digital asset purchase order amounts from a fiat currency balance of a user's fiat currency account associated with (e.g., held in custody by) the exchange or subtracting pending digital asset sale order amounts from a digital asset balance of a user's digital asset account associated with (e.g., held in custody by) the exchange. One or more graphs 1212 illustrating account balances and/or total account value, in digital asset amounts or fiat currency amounts, may be provided in the interface. In embodiments, graphs showing each account balance and a total account value may be overlaid on each other.

A dashboard GUI may include options to access different data. Such options may comprise graphical buttons, hyperlinks, text, and/or icons, to name a few. The GUI can include a user account data selection option, settings selection option, and/or a notification selection option 1216, selection of any of which may cause the digital asset exchange computer system to provide respective data, menus, and/or updated GUIs. For example, a notification selection option 1216 may be used to access a notifications menu or notifications listing.

A dashboard GUI may further include exchange historical data 1220, such as a last price (e.g., price for the most recent executed transaction), a 24-hour change (e.g., a delta between the market price 24 hours prior and the current market price), price deltas over different time ranges (e.g., 30 minutes, 1 hour, 12 hours, 1 week, 1 month, 3 months, 1 year, 5 years, to name a few), a 24-hour range (e.g., showing the lowest and highest prices during the interval), and/or price ranges within other time ranges, to name a few. The dashboard GUI may also include a historical price and/or historical volume graph 1222. The graph may show exchange transaction prices over time and/or corresponding exchange transaction volumes over time. The graph may show transaction data from one or more other digital asset exchanges and/or digital asset indices. Any of this data may be overlaid on the graph. For example, digital asset index data may be overlaid on exchange transaction data.

A dashboard GUI may include an open orders listing 1224 showing open orders associated with an exchange user account. An open orders listing 1224 may indicate the date, time, and/or approximate time (e.g., about 3 hours ago) at which each order was placed. The listing 1224 may include a description of the order, e.g., order type, such as market or limit, purchase or sell, and/or order parameters, such as digital asset quantity, order price, limit order price, and/or total fiat currency amount. The listing 1224 may include an order status indicator, which may comprise a graphical indication, such as a status bar, of the degree to which each order is filled and/or text indicating the same (e.g., a percentage). The order listing 1224 may also include action options, selection of which may cause the exchange computer system to perform an action, such as canceling an order or canceling the remaining unfulfilled portion of an order. A truncated open order listing 1224 may be presented, which may include an option to view more or view all open orders.

A dashboard GUI may include a transaction history listing 1226. A transaction history may list some or all transactions associated with an exchange user account. A transaction history listing 1226 may indicate the date, time, and/or approximate time (e.g., about 3 hours ago) of each transaction and/or a description of the transaction (e.g., order type and/or order parameters, final order status, such as completed or canceled). In embodiments, the transaction history listing 1226 may include one or more options to display additional information (e.g., order details) for each transaction. A truncated transaction history listing may be provided, which may include an option to display more or all transactions (e.g., a view all history button).

A dashboard GUI may include an activity feed 1218 that displays summary information describing transactions, other actions (e.g., account funding), notifications, market activity, and/or exchange activity, to name a few. An activity feed 1218 may be accessed via a notification selection option 1216. Activity feeds are discussed herein with respect to FIGS. 12K-L.

Figure 35B:
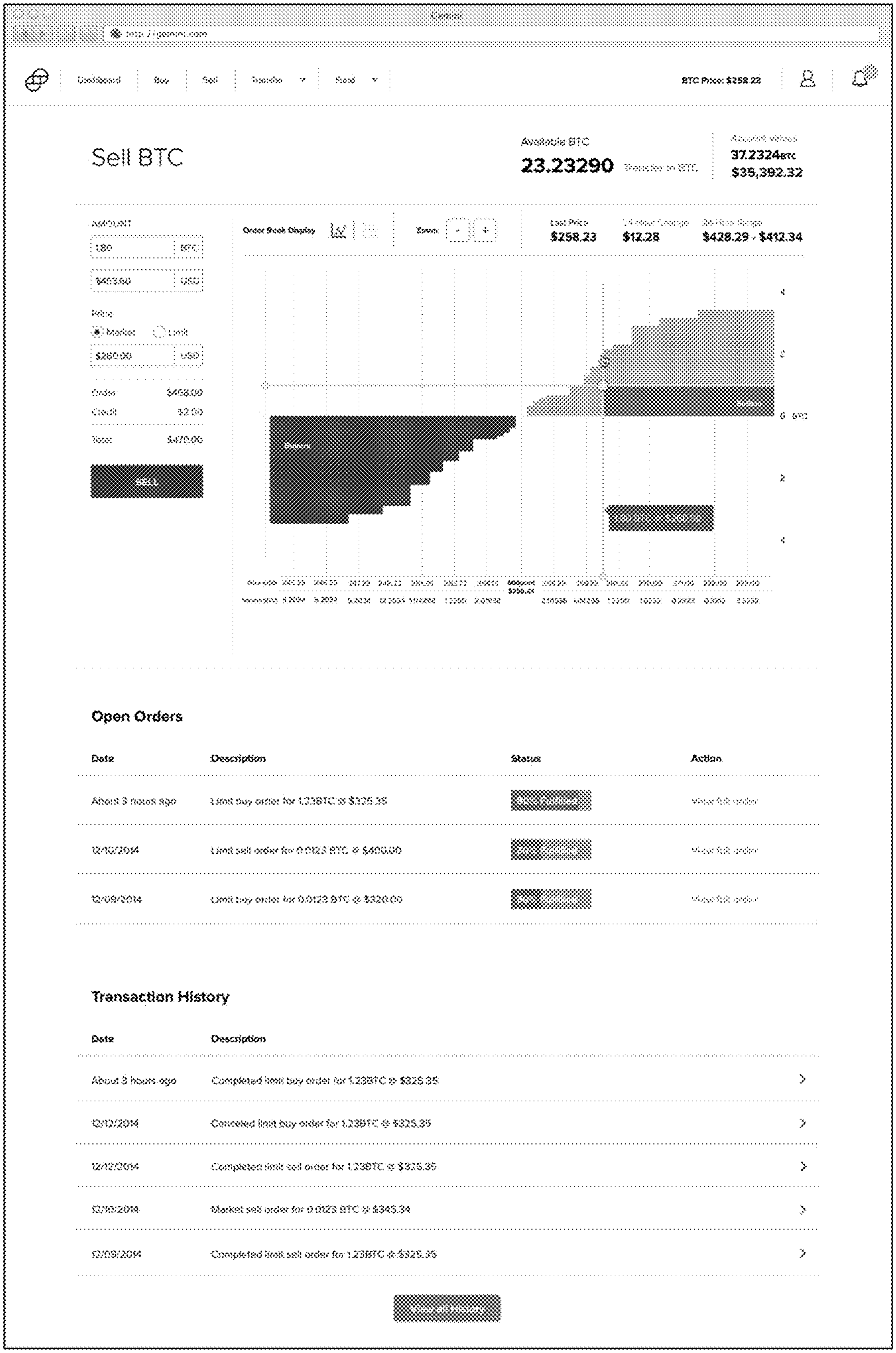

Referring to FIG. 35B, a screenshot of a GUI for use with selling a quantity of digital assets on a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input order parameters for a prospective sell order. Such order parameters can include a desired digital asset amount (e.g., a quantity of bitcoin) to sell, a total fiat amount to be sold (which may be a total digital asset value to be sold denominated in a fiat currency, such as USD), a digital asset price (e.g., a fiat currency amount corresponding to a single unit of digital assets), and/or an order type (e.g., market order, limit order). As shown, a user may designate a value of a digital asset to be sold based upon a market price determined by past and/or current sales of digital assets across a digital asset exchange.

The GUI may include a graphical representation of the order book and the prospective sell order. In embodiments, a first axis, such as the horizontal axis, may show price, and a second axis, such as a vertical axis, may show digital asset quantity. Digital asset quantity may increase in both directions moving away from the price axis. Sell orders may be shown on a first side of the price axis (e.g., above the price axis), while buy orders may be shown on a second side of the price axis (e.g., below the price axis). Accordingly, all pending digital asset sell and purchase orders from the electronic order book may be shown. In embodiments, less than all order may be shown based on the display bounds for one or both axes. A prospective sell order graphical representation may show the digital asset quantity for sale at each price at which it is for sale (e.g., the sell price and higher prices). Such a representation is evident in the dark portion in the upper right quadrant of the graph with respect to the price axis and the digital asset quantity axis taken at the spread point (this dark portion is the bottom right quadrant with respect to the prospective order crosshairs). The prospective sell order graphical representation may also show which pending buy orders from the order book will satisfy the sell order and/or how the sell order, once executed, will modify the existing order book. This can be seen as the dark portion in the lower left quadrant of the graph. A graphical indicator of one or more order parameters (e.g., digital asset quantity and price) may be overlaid on the graph, e.g., near the crosshairs. The exemplary GUI shows a prospective sell limit order with a limit order price above the market price. Accordingly, the order will not be satisfied by the pending purchase orders.

Figure 35C:
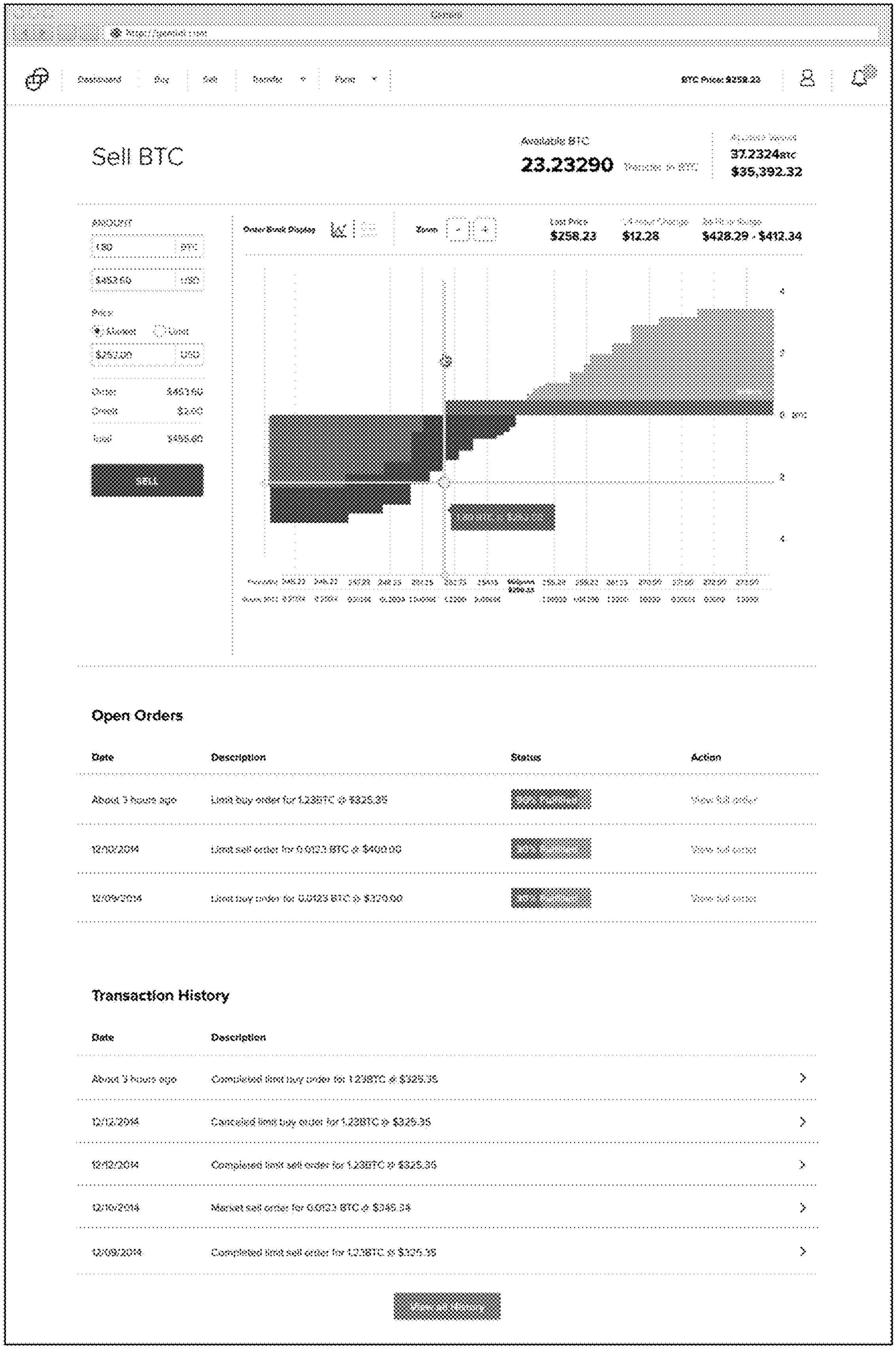

Turning to FIG. 35C, a screenshot of a GUI for use with a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be sold. As shown, a user may designate a value of a digital asset to be sold based upon a price determined by past and/or current purchases of digital assets across a digital asset exchange. The exemplary GUI shows a sell limit order with an order price lower than the market price. Accordingly, at least a portion of the sell limit order will be fulfilled by the pending purchase orders. The upper right quadrant of the graph shows the sell order book. The light colored order book graphical representation may indicate the cumulative volumes at each price that are subject to pending sell orders. In embodiments, it may also include the volumes from the prospective sell order. The dark region in the upper right quadrant may indicate the order volume and order prices (e.g., the sell order limit price and any prices above it). In embodiments, the dark region may only show the portion of the prospective sell order that will be unfulfilled by the pending purchase orders.

Figure 35D:
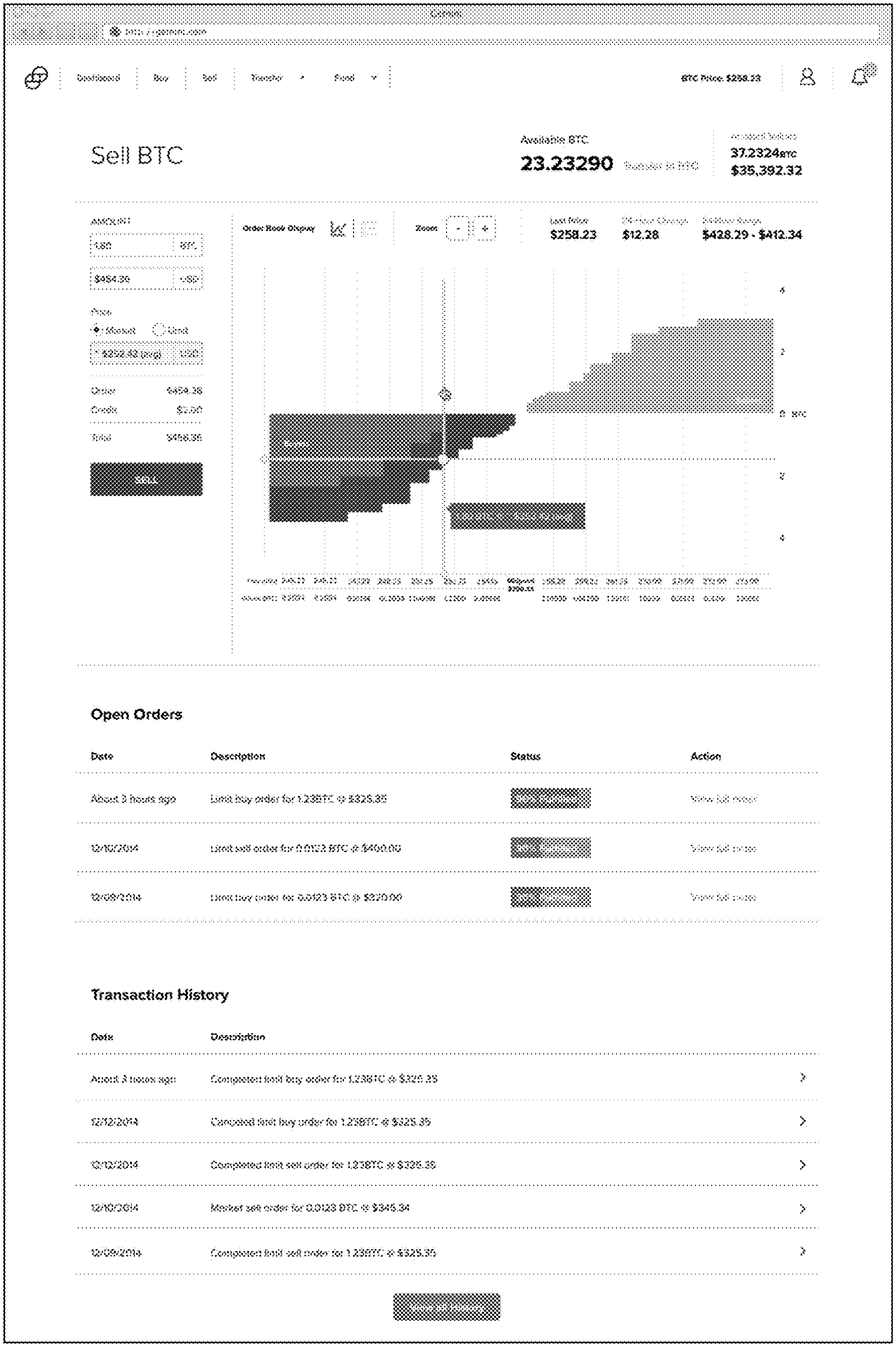
Figure 35E:
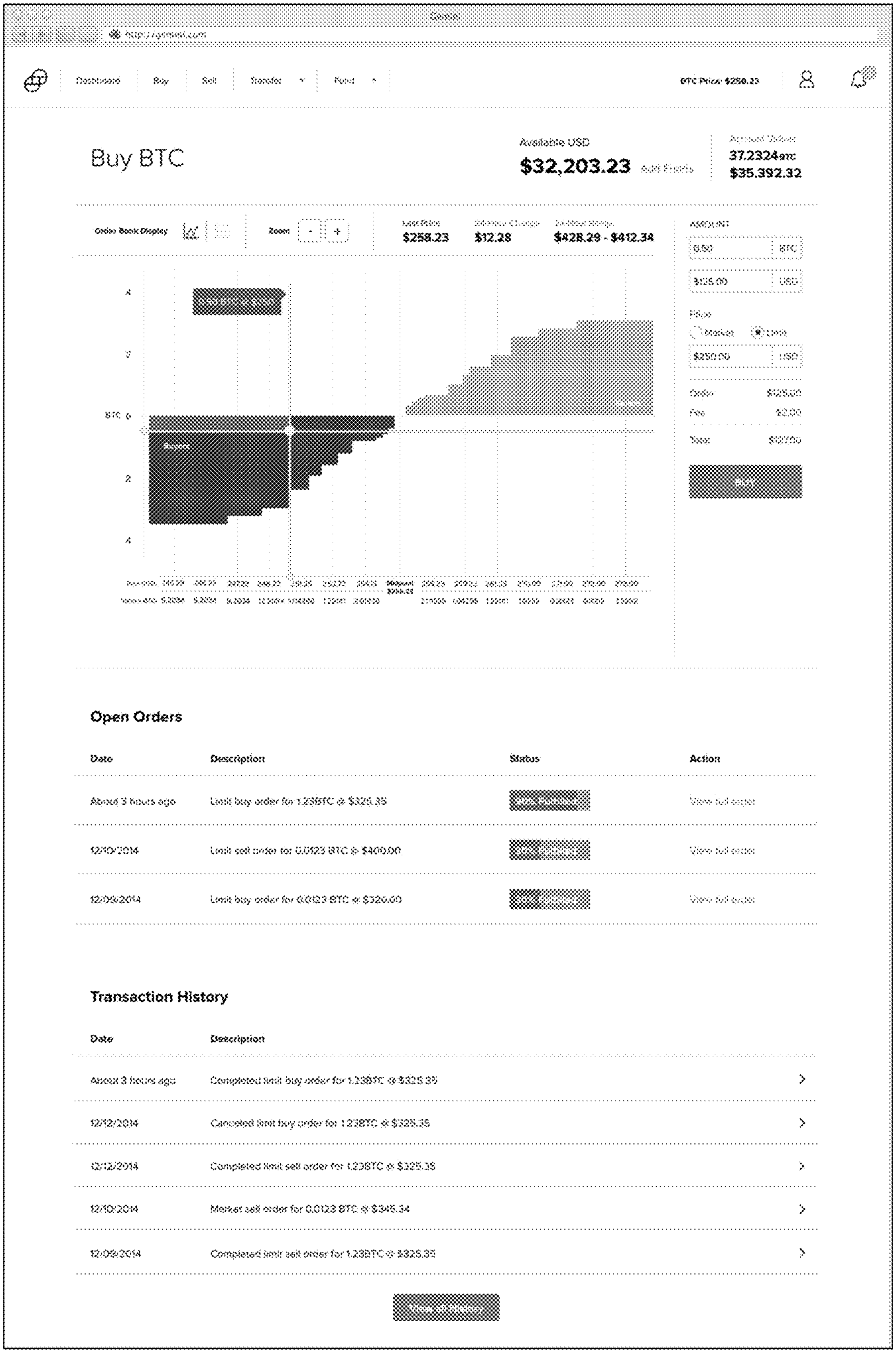

Turning to FIG. 35D, a screenshot of a GUI for use with a digital asset exchange according to exemplary embodiments described herein is illustrated. The GUI shown may present various information associated with selling digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be sold. As shown, a user may designate a value of a digital asset to be sold based upon a past and/or current averaged market value of digital assets traded across a digital asset exchange. The exemplary GUI shows a market sell order. The exchange computer system may execute the order at a current market price. In embodiments, the exchange computer system may place a plurality of market orders to satisfy the order (e.g., until the specified digital asset order quantity is reached and/or until the specified total cost is reached).

Referring to FIG. 12E, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon a price determined by past and/or current purchases of digital assets across a digital asset exchange. The exemplary GUI shows a prospective limit purchase order with an order price lower than the market price. Accordingly, the prospective order will not be satisfied by the existing sell orders. The sell order book graphical representation thus remains unchanged. The light region in the lower left quadrant shows the prospective purchase order.

Figure 35F:
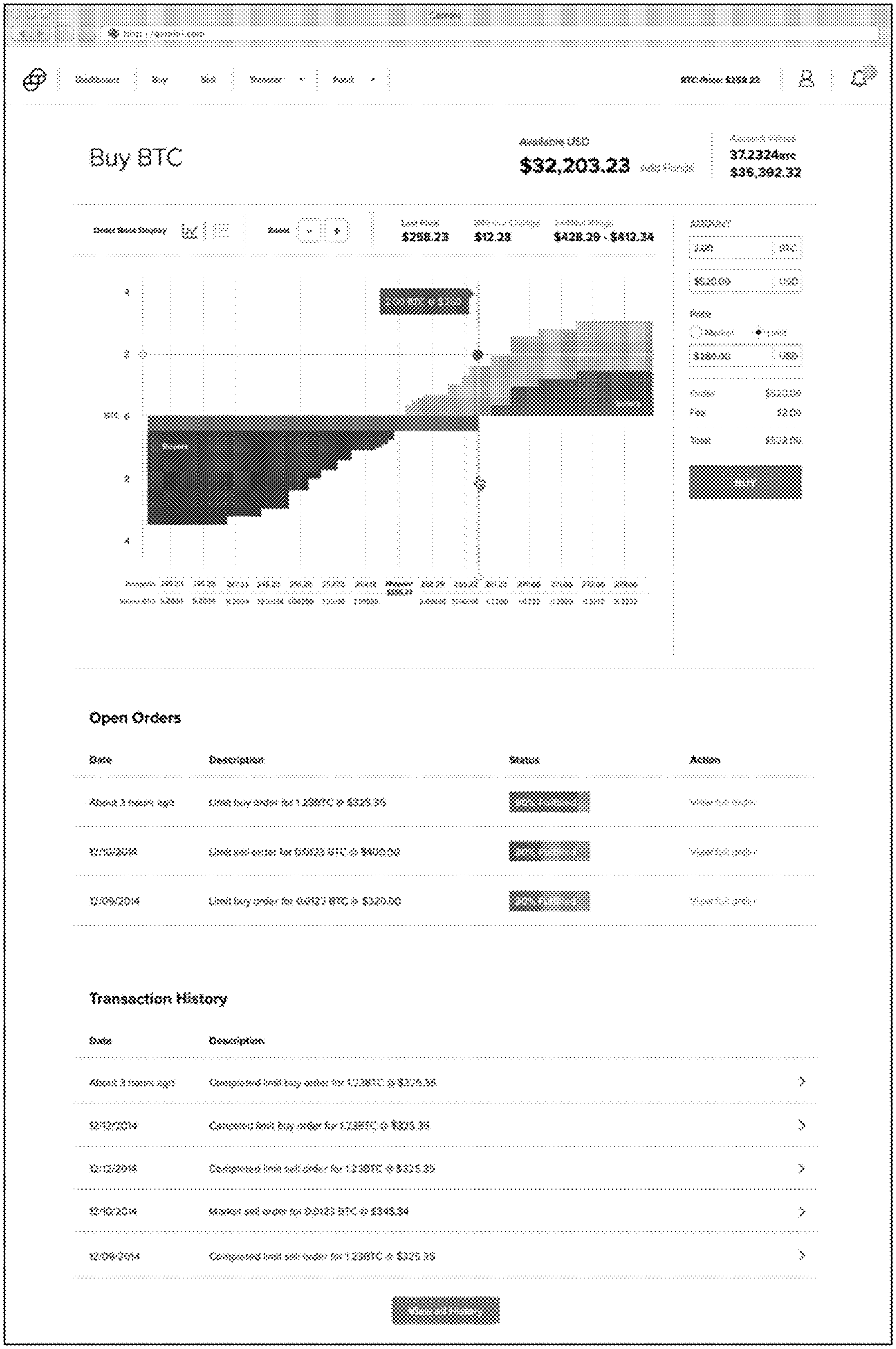

Turning to FIG. 35F, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon a price determined by past and/or current sales of digital assets across a digital asset exchange. The exemplary GUI shows a prospective digital asset limit purchase order with a limit order price higher than the market price. Therefore, at least a portion of the order will be satisfied by the pending sell orders. Thus the prospective purchase order graphical representation overlaps a portion of the pending sell order book graphical representation. In the upper right quadrant, the dark region shows the projected post-order graphical representation, which reflects that certain sell orders were fulfilled by the prospective purchase order, shifting the remaining sell order book to the right and decreasing the available sell order volume.

Figure 35G:
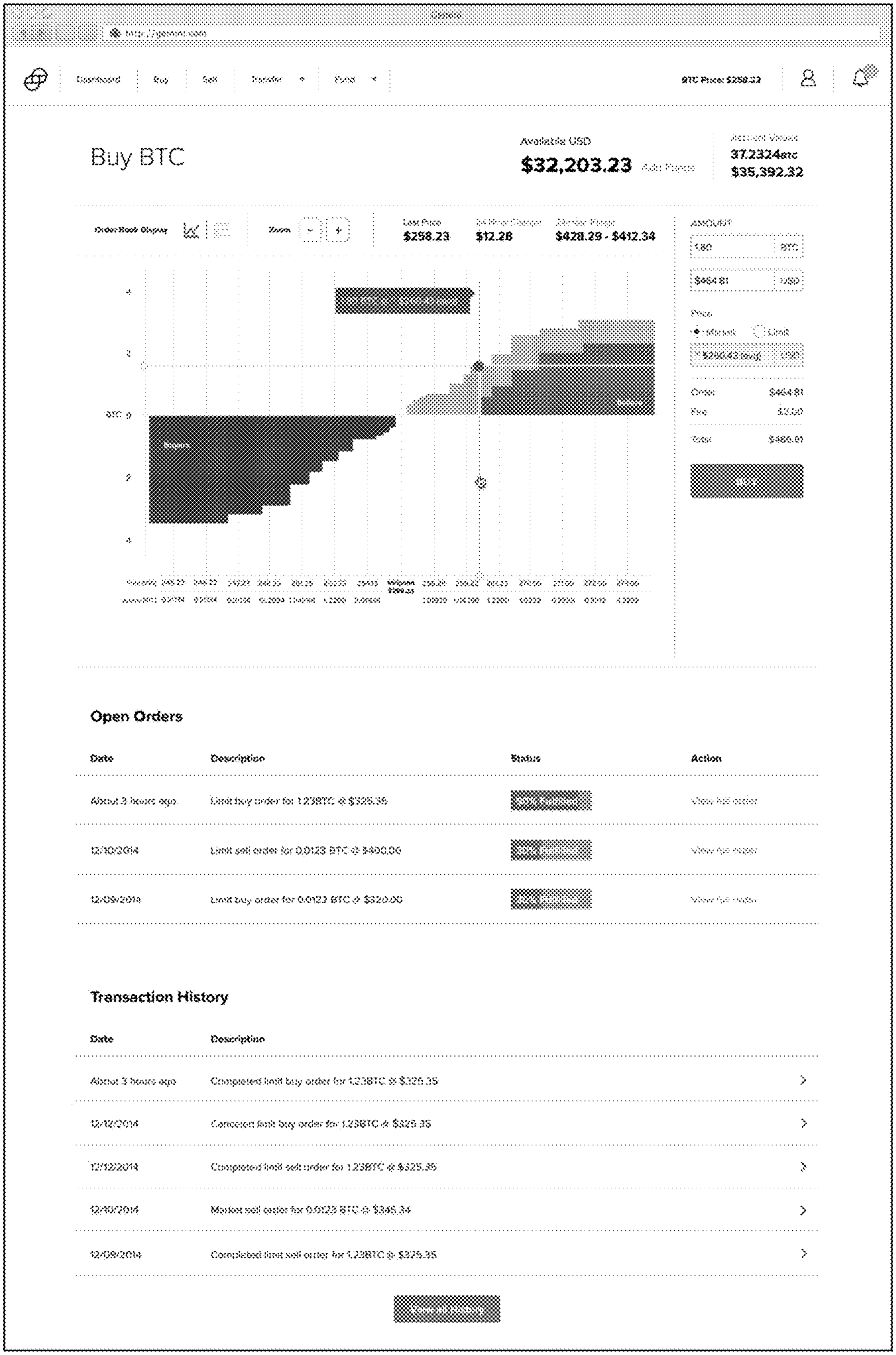

Turning to FIG. 35G, a screenshot of a GUI for use with a digital asset exchange according to exemplary embodiments described herein is illustrated. The GUI shown may present various information associated with purchasing digital assets on a digital asset exchange, for example, balance information (including digital currency and real-world currency), account value information (including present, past, and/or predicted values), historical trends (such as asset pricing), open orders, past orders, and/or user history, to name a few. The GUI shown may include one or more input fields through which a user can input information such as a desired amount or value of digital assets to be purchased. As shown, a user may designate a value of a digital asset to be purchased based upon an averaged market value of digital assets traded across a digital asset exchange. The exemplary GUI shows a prospective market purchase order. In the upper right quadrant, the dark region shows a post-order sell order book, which provides a visualization of how the sell order book will be modified by the prospective order. In this case, fulfilling the purchase order volume will reduce the available volume in the sell order book.

Figure 35H:
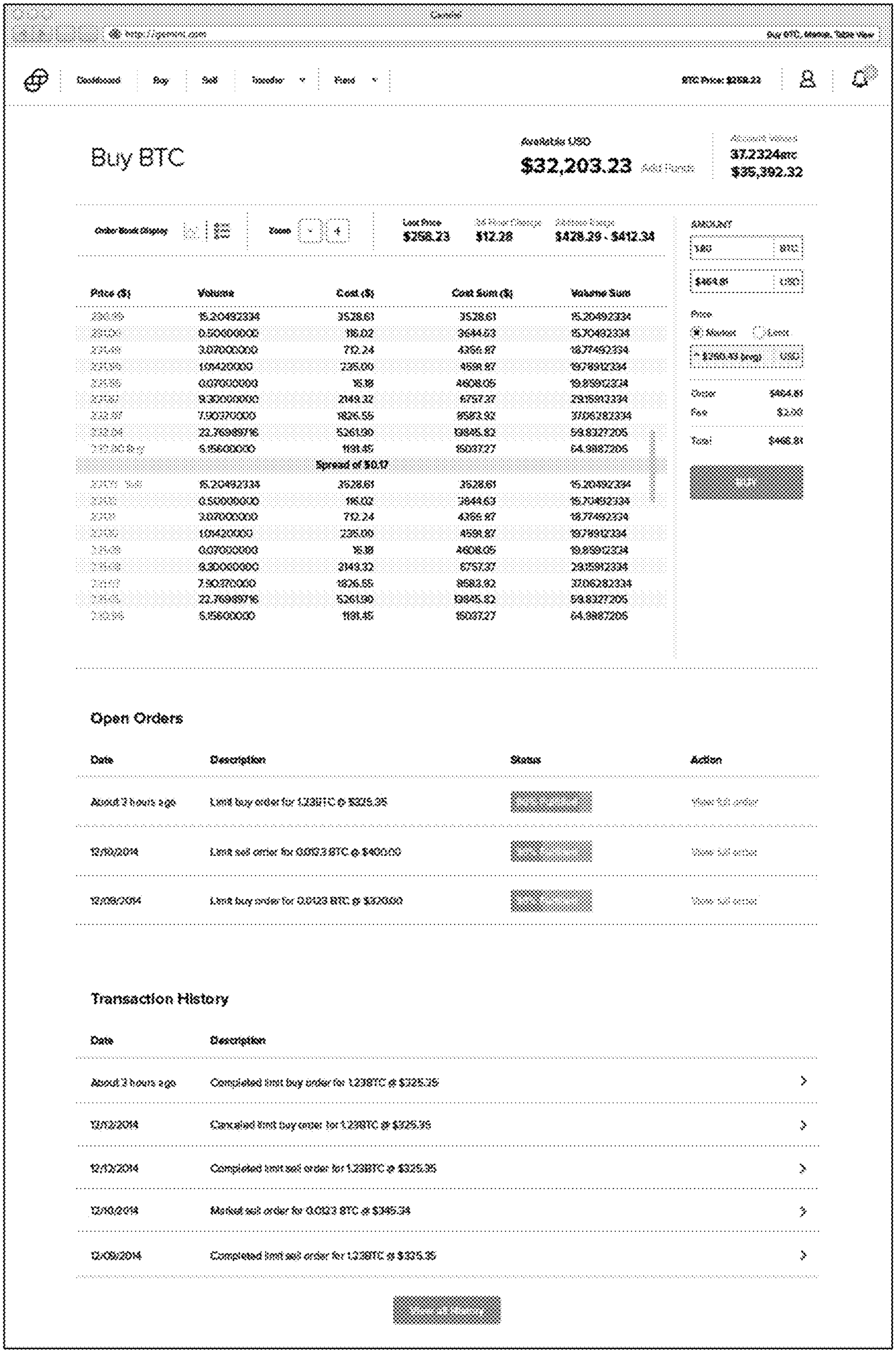
Figure 35I:
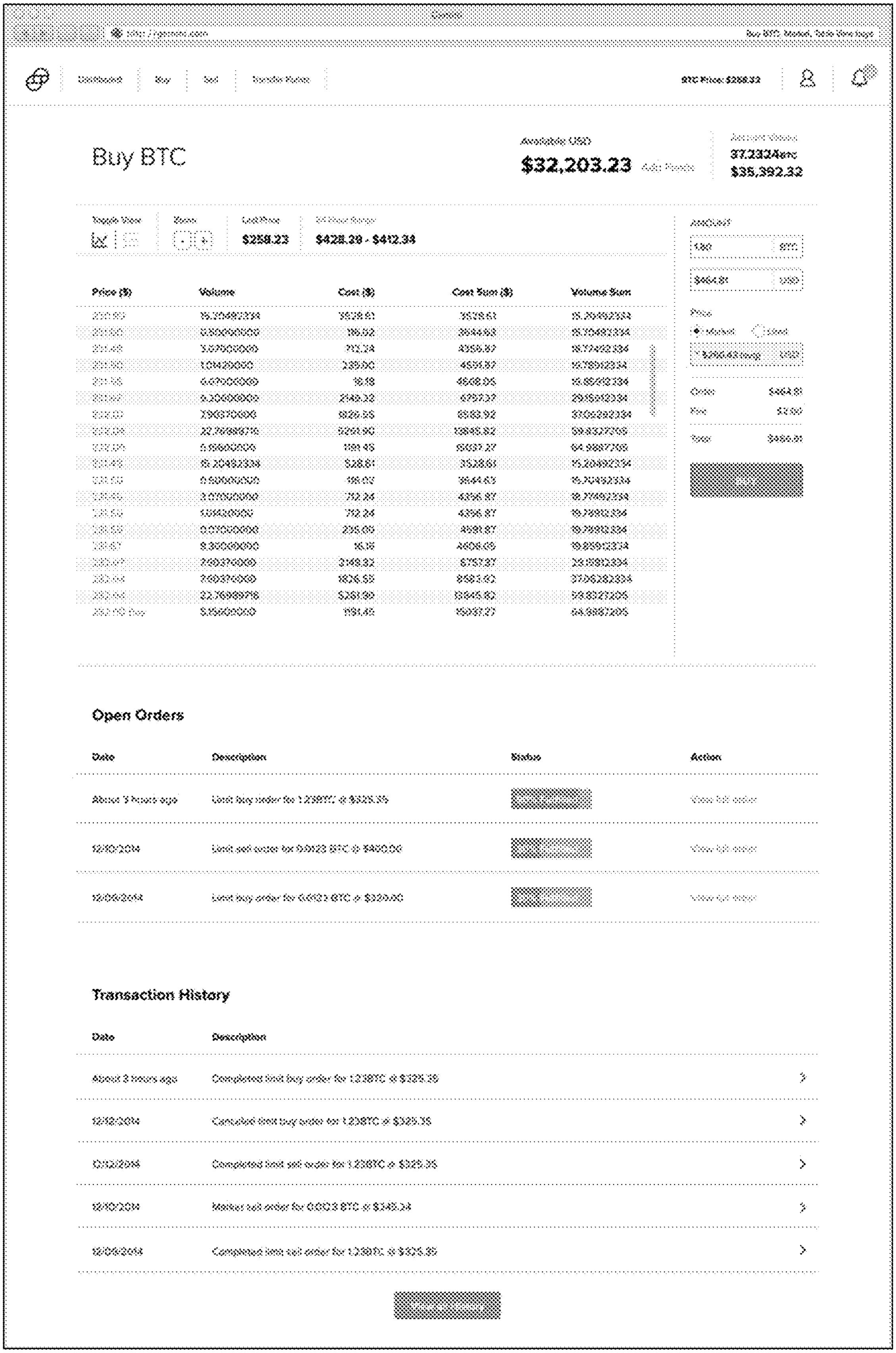
Figure 35J:
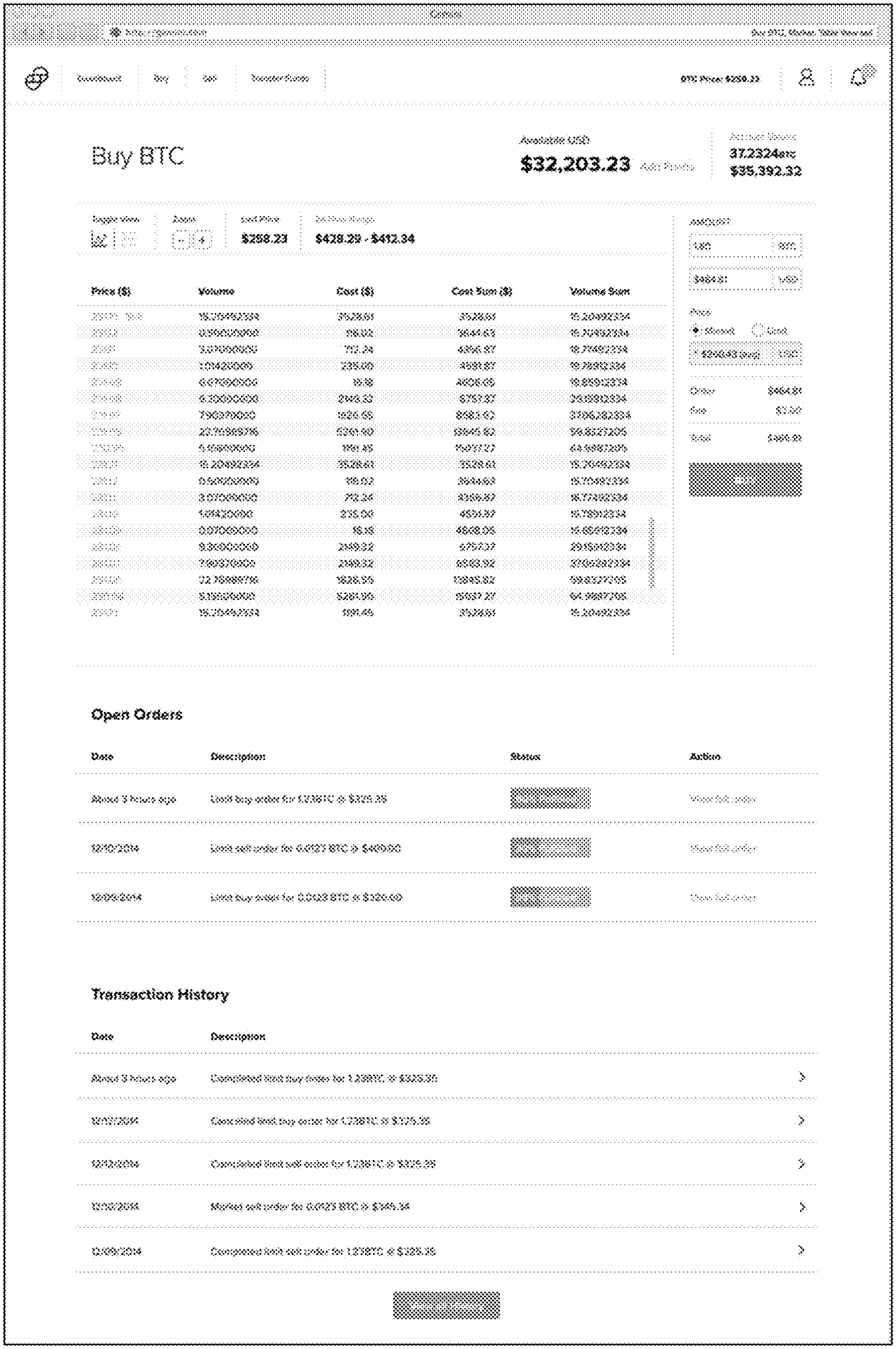

FIGS. 35H-J are screen shots of exemplary graphical user interfaces showing digital asset order listings for pending digital asset orders in an electronic order book in accordance with exemplary embodiments of the present invention. Like the dashboard and order graph GUIs described herein, an order listing GUI may display market activity data, exchange activity data, and/or user account data (e.g., account balances and/or values). An order listing GUI may provide user input fields where a user can specify order parameters, such as order types, order price (e.g., denominated in fiat currency), order amount (e.g., a quantity of digital assets), and/or order value (e.g., a total fiat amount corresponding to a price, such as a user specified price, and a quantity). An order listing GUI may include an open orders listing and/or a transaction history listing.

FIG. 35H shows a listing of pending digital asset orders from an electronic order book of the digital asset exchange, where the listing is centered at a spread value. The pending digital asset orders can include both digital asset purchase orders and digital asset sell orders. A pending order may be an order or portion of an order that is not yet fulfilled. The order listing may include for each order any of an order price (e.g., a price per unit of digital asset), order volume (e.g., a quantity of digital assets), order cost (e.g., the product of the order price and order volume), cost sum (e.g., a cumulative cost that sums the cost of the preceding orders of the same order type approaching the spread value), and a volume sum (e.g., a cumulative volume that sums the order volumes of the preceding orders of the same order type approaching the spread value).

A spread value may be displayed between the listing of pending purchase orders and the listing of pending sell orders. A graphical and/or textual indicator may indicate a current spread value, which may be determined based on the difference between the highest order price for a pending purchase order and the lowest order price for a pending sell order.

The order listings may be arranged according to price. Thus, the sell order listing may be arranged from highest price to lowest price, with the lowest price listed just before the spread value. After the spread value the purchase order listing may start with the highest purchase price and continue to list orders at each subsequent lower order price. In embodiments, the purchase orders may be listed above the spread value, and the sell orders may be listed below. In other embodiments, the sell orders may be listed first, above the spread value, and the purchase orders may be listed below the spread value. In embodiments, a subset of orders may be displayed in the graphical order listing at a given time. For example, a scroll bar may be used to navigate to additional orders towards the top and/or bottom of the list.

FIG. 35I shows an electronic order book listing where the list has been navigated (e.g., scrolled) up to display additional orders (e.g., buy orders).

FIG. 35J shows an electronic order book listing where the list has been navigated (e.g., scrolled) down to display additional orders (e.g., sell orders).

Figure 35K:
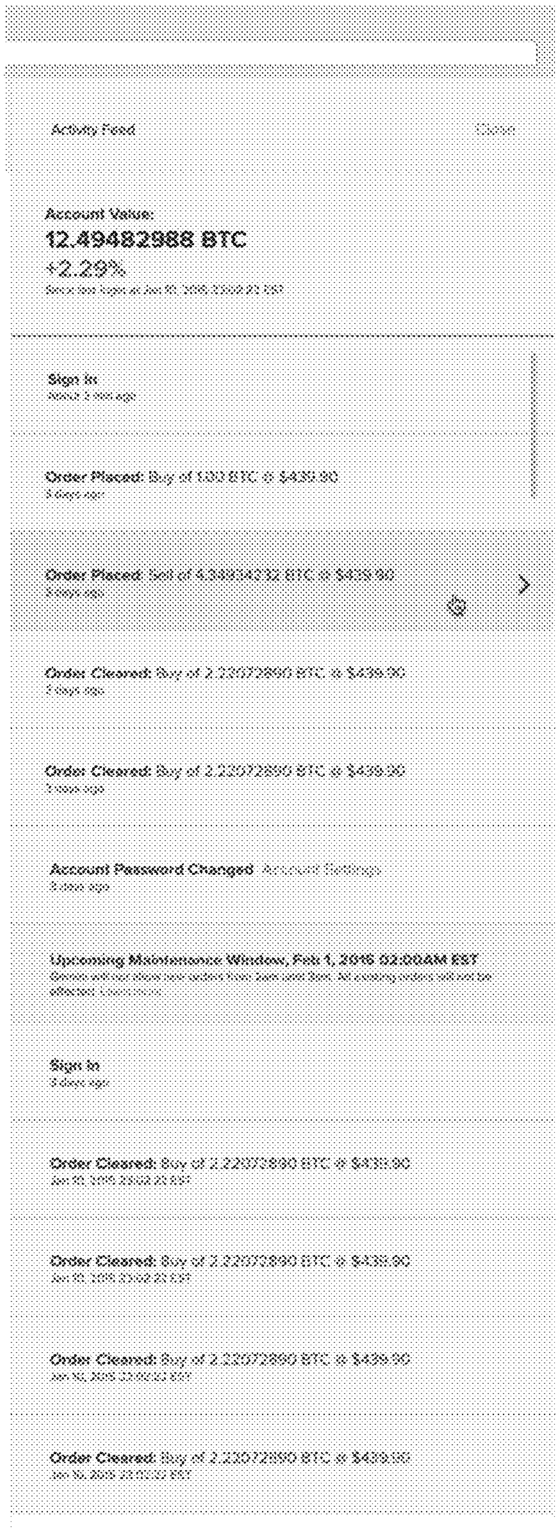
Figure 35L:
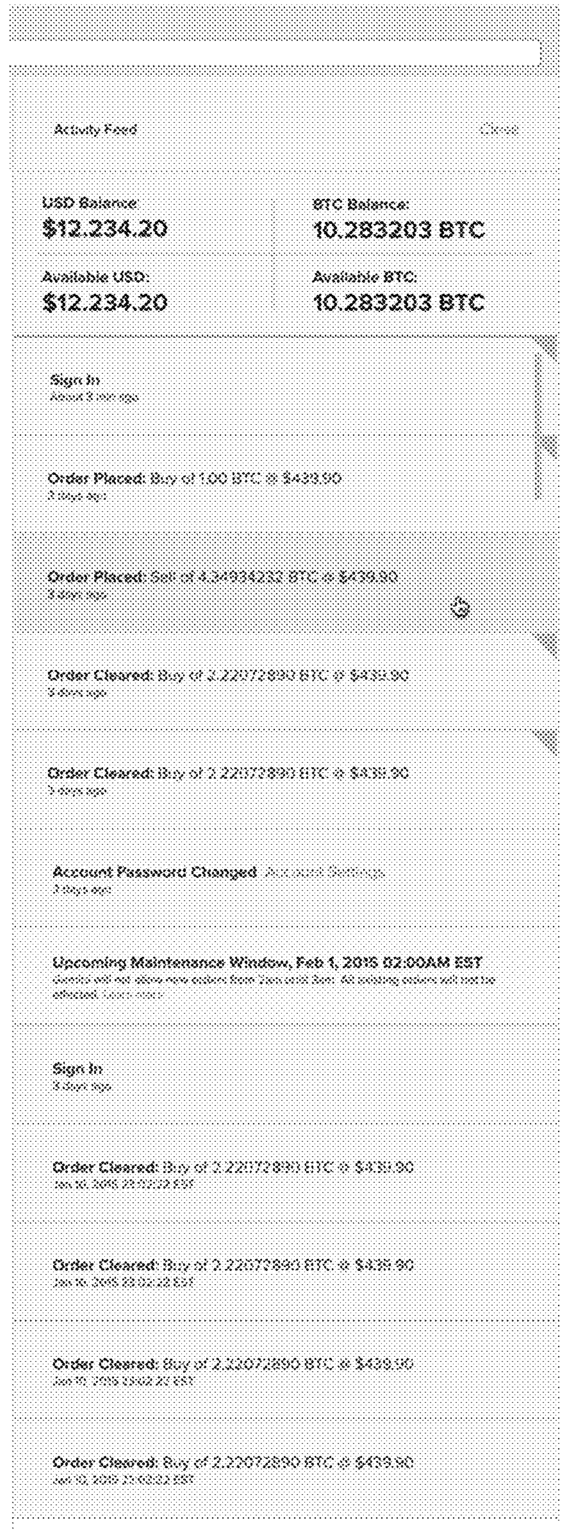

FIGS. 35K-L are screen shots of exemplary graphical user interfaces showing an activity feed related to a user account registered with a digital asset exchange. As illustrated, an activity feed may include account summary information, such as account balances, account values, and/or changes in account value (e.g., over a time period or since a particular time, such as a time of last logon to the exchange computer system). The activity feed may list events, which may be related to user actions (e.g., logging on, placing an order, canceling an order) and/or independent events (e.g., the clearing of an order). Each event may have a description (e.g., order parameters, status information) and/or an associated date and/or time indicator. The activity feed may also display digital asset news events and/or messages (e.g., schedule information for exchange computer system maintenance). Selecting (e.g., clicking, tapping, hovering) an activity feed entry may cause the GUI to display additional information related to the entry. The activity feed may be navigated (e.g., scrolling, selecting a button for additional entries) to display additional entries, which may be older activity feed entries.

FIG. 35L illustrates that unread activity feed entries may comprise an unread indicator, which may comprise a different color (e.g., background color) and/or a graphical representation (e.g., shape, triangle shape, icon, or text in the upper right corner or elsewhere within the entry). The unread indicator may be removed after a user hovers over the respective activity feed entry, selects it (e.g., clicks or taps it), and/or upon a subsequent opening of the activity feed.

FIGS. 50A-E are exemplary screen shots of user interfaces related to purchase transactions provided by an exchange computer system in accordance with exemplary embodiments of the present invention. Each graphical user interface may include navigation options for accessing other user interfaces (e.g., webpages or application GUIs). Such navigation options can include a dashboard selector 7302

(e.g., to access a dashboard GUI), a buy selector 7304 (e.g., to access a buy order GUI), a sell selector 7306 (e.g., to access a sell order GUI), and/or a transfer fund selector 7308 (e.g., to transfer funds to or from the exchange). Additional navigation options may be provided for accessing other GUIs, accessing data, and/or modifying the GUIs (e.g., displaying a menu, such as a drop-down menu, displaying an overlay or graphical panel). These additional navigation options can include a user account selector 7309 and/or an alerts or activity feed selector 7311, which may toggle display of an activity feed 7310. As illustrated, the activity feed 7310 can include user account information 7312, such as a fiat account balance, digital asset account balance, available fiat amount (e.g., not subject to pending orders), and/or available digital asset amount (e.g., not subject to pending orders). In embodiments where a digital asset exchange handles multiple fiat currencies and/or multiple digital assets, the interface may reflect such summary information for each currency and asset. In embodiments, the GUIs may also include order history listings, which may show completed orders and/or open orders.

The purchase order GUIs may include market summary information and/or exchange summary information 7318 (e.g., last price, 24-hour change, 24-hour range, and/or such values over other time periods). A time indicator may indicate a time at which the summary information was last updated.

Each purchase order GUI may also include purchase order parameter input fields, such as a digital asset quantity input field 7322, which may include a digital asset identifier (e.g., BTC). Such a digital asset identifier may be changeable by a user to select a particular digital asset type for the transaction. Purchase order parameter input fields can also include an order type selector 7324 (e.g., for choosing between market and limit orders), an order price input field 7326, and/or a total cost field 7328. In embodiments, the order price input field 7326 and/or the total cost field 7328 may comprise fiat currency identifiers, which may be changeable to specify or view a price in different fiat currencies. In embodiments, exchange transactions from one digital asset to a second digital asset may be performed, in which case the fiat currency identifiers would be replaced with digital asset identifiers.

In embodiments, the user may input one or more purchase order parameters and the exchange computer system may calculate one or more other purchase order parameters. In embodiments, only a user may change the order price. Accordingly, a user input in the total cost field 7328 may cause the exchange computer system to calculate a digital asset quantity order based at least in part upon the price parameter and/or to populate the calculated digital asset quantity in the digital asset quantity input field 7322. Similarly, a user input in the digital asset quantity input field 7322 may cause the exchange computer system to calculate, based at least in part upon the price parameter, a total cost and/or populate that total cost in the total cost field 7328. In other embodiments, the exchange computer system may be able to calculate and/or re-calculate the order price, in addition to the other order parameters. If two parameters are entered by a user the exchange computer system may calculate the last parameter and/or populate its respective field. If the user then changes one of the three parameters after those fields are each populated the exchange computer system may recalculate one of the parameters (e.g., the second to last parameter input, the third to last parameter input).

Selection of a purchase option 7336 (e.g., a purchase graphical button) may cause the exchange computer system to place a purchase and/or execute an order corresponding to the input order parameters.

Order information based at least in part upon the order parameters may be calculated and displayed in the GUIs. For example, an order sub-total 7330 may be the value from the total cost field 7328. A fees value 7332 may indicate any fees associated with the transaction (e.g., fees charged by the exchange, government fees, to name a few). An order total 7334 may indicate the sum of the order sub-total 7330 and the fees 7332.

Tables, charts, and/or graphs may provide graphical representations of exchange data, such as electronic order book data, prospective order data, and/or pending order data. An order book display type indicator 7320 may be used to toggle between different graphical representation types, such as toggling between an order book graph and an order book listing.

Figure 50A:
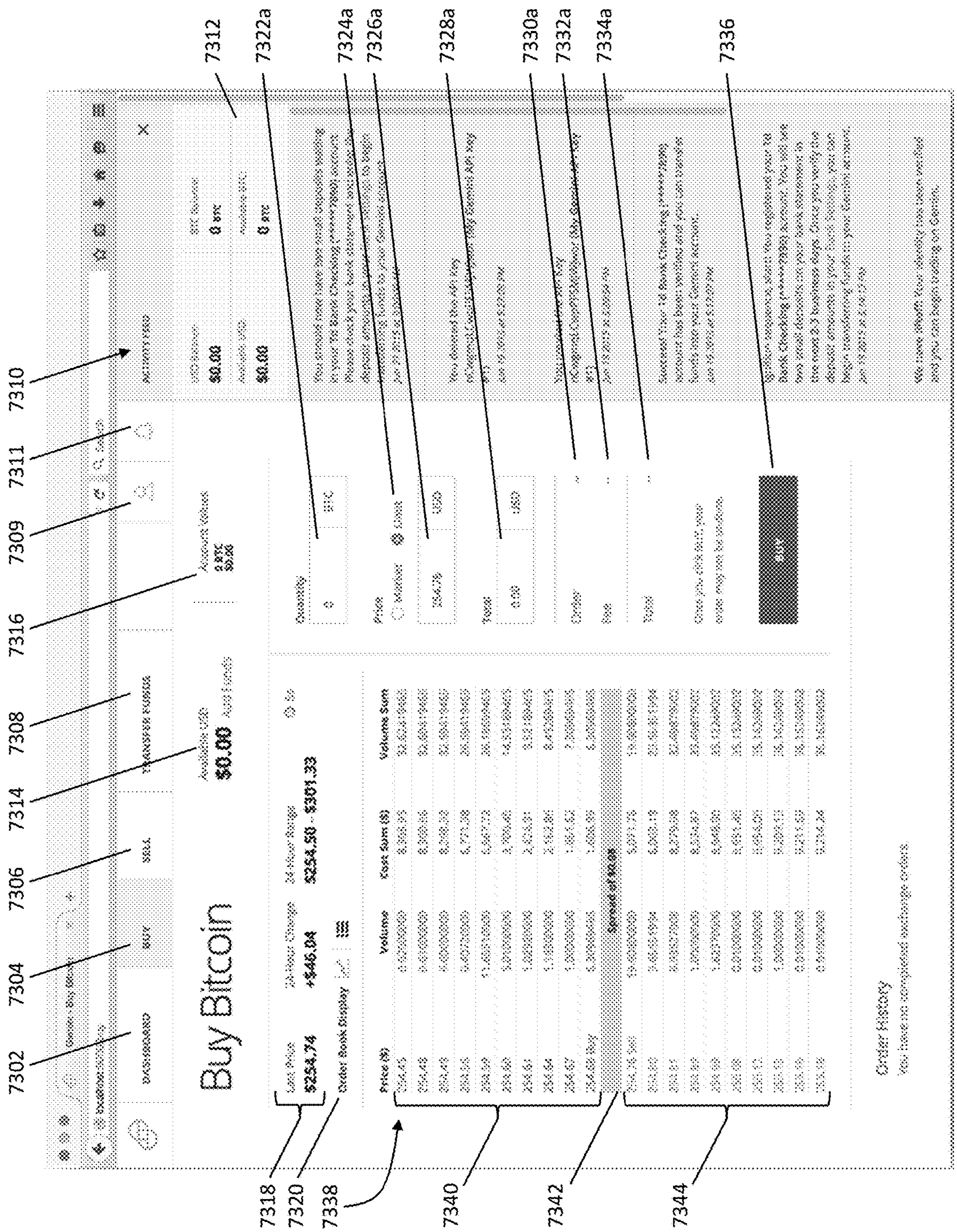
FIGS. 50A-E are exemplary screen shots of user interfaces related to purchase transactions provided by an exchange computer system in accordance with exemplary embodiments of the present invention.

FIG. 50A shows a purchase order graphical user interface comprising an order book listing 7338. The order book listing 7338 may be a table comprising respective entries for each of a plurality of pending digital asset orders. In embodiments, the listing may comprise an entry for each order in the order book. In embodiments, the order book listing can comprise a truncated listing of orders in the exchange order book. Additional entries may be accessed by scrolling through the listing and/or selecting an option to display more entries. An entry may include order parameters such as an order price and/or digital asset volume or quantity. The order book listing 7338 may be arranged according to price, e.g., increasing order price or decreasing order price. A purchase or buy order book listing 7340 may comprise entries for each pending digital asset purchase order, and a sell order book listing 7344 may comprise entries for each pending digital asset sell order. The purchase orders may be grouped together in the purchase order book listing 7340, while the sell orders may be grouped together in the sell order book listing 7344. A graphical representation of a spread value 7342 may be displayed between the purchase and sell order book listings. The spread value graphical representation 7342 may comprise text indicating the spread value, which may be the price difference between the lowest sell order price and the highest purchase order price.

An order book listing entry may also include a cost sum, which may be a sum of the costs (e.g. product of price and digital asset quantity) of all preceding orders in the listing moving away from the spread value. Accordingly, the cost sum will be calculated separately on the buy side and the sell side of the order book listing. Similarly, an entry can include a volume sum, which may comprise a sum of the volumes of the previous order entries in the listing moving away from the spread value. In embodiments, the order book listing 7338 may include an entry for the prospective purchase order, which may be positioned within the purchase order book listing 7340 according to its order price parameter. Such an entry for a prospective order may be rendered with a different color (e.g., font color, background color, border color, to name a few).

Figure 50B:
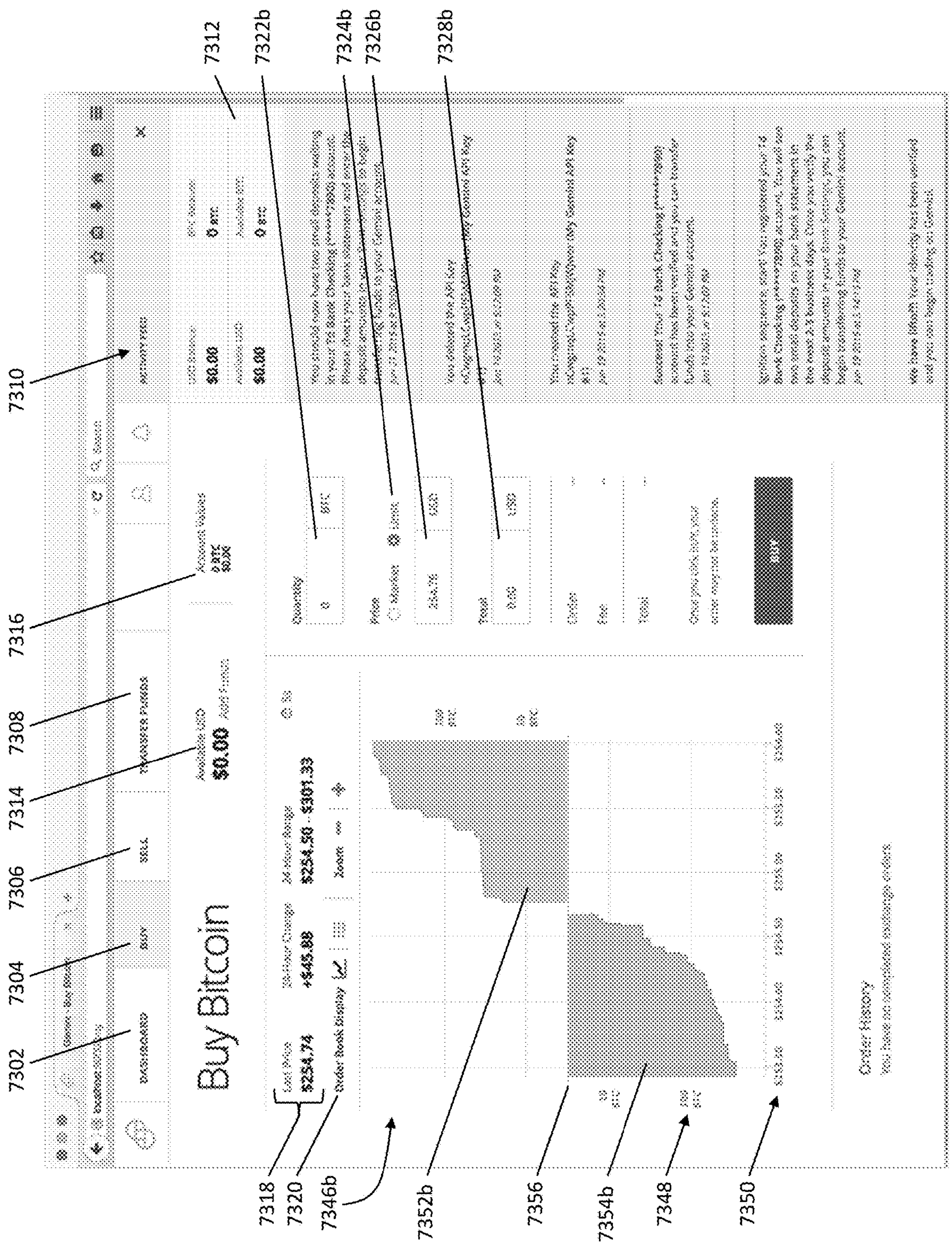

FIG. 50B shows a purchase order GUI comprising an electronic order book graphical representation 7346*b*. The order book graphical representation may have been selected using the order book display type indicator 7320. The order book graphical representation may be a graph having an order price axis 7356, which may be a first axis depicting order prices. It may be a horizontal axis. Price values 7350 may be displayed corresponding to the scaling of the order price axis 7356. The graph may also comprise a digital asset quantity axis 7348, which may extend outward from the order price axis 7356 in two directions, each direction indicating increasing digital asset quantity. In embodiments, the digital asset quantity axis 7348 may have a logarithmic scaling. A first order book graphical representation, which may be a sell order book graphical representation 7352*b*, may be depicted on a first side of (e.g., above) the order price axis 7356. The sell order book graphical representation 7352*b* may show at each order price a corresponding cumulative quantity of digital assets subject to pending digital asset sell orders. A second order book graphical representation, which may be a purchase order book graphical representation 7354*b*, may be depicted on a second side (e.g., below) the order price axis 7356. The purchase order book graphical representation 7354*b* may show at each order price a corresponding cumulative quantity of digital assets subject to pending digital asset purchase orders. A gap along the order price axis 7356 between the sell and purchase order book graphical representations may represent the spread value. In embodiments, a textual indicator of the spread value may be overlaid on the graph.

In embodiments, the order book graphical representations may only show a subset of pending digital asset purchase and/or sell orders. For example, a user may manipulate the scaling of the graph, such as by using zoom controls. A user may navigate the graph by scrolling or panning. In embodiments, the positions of the sell and buy order book graphical representations with respect to the order price axis 7356 may be flipped. The sell and buy order book graphical representations may be rendered using different colors and/or different shading or hatching techniques. For example, the sell order book graphical representation 7352*b* may be rendered as orange while the purchase order book graphical representation 7354*b* may be rendered as blue.

As can be seen, a digital asset quantity input field 7322*b* indicates a quantity of 0 digital assets. Accordingly, the graph may not show any representation corresponding to the prospective order defined by order parameters input by a user and/or calculated by the exchange computer system.

Figure 50C:
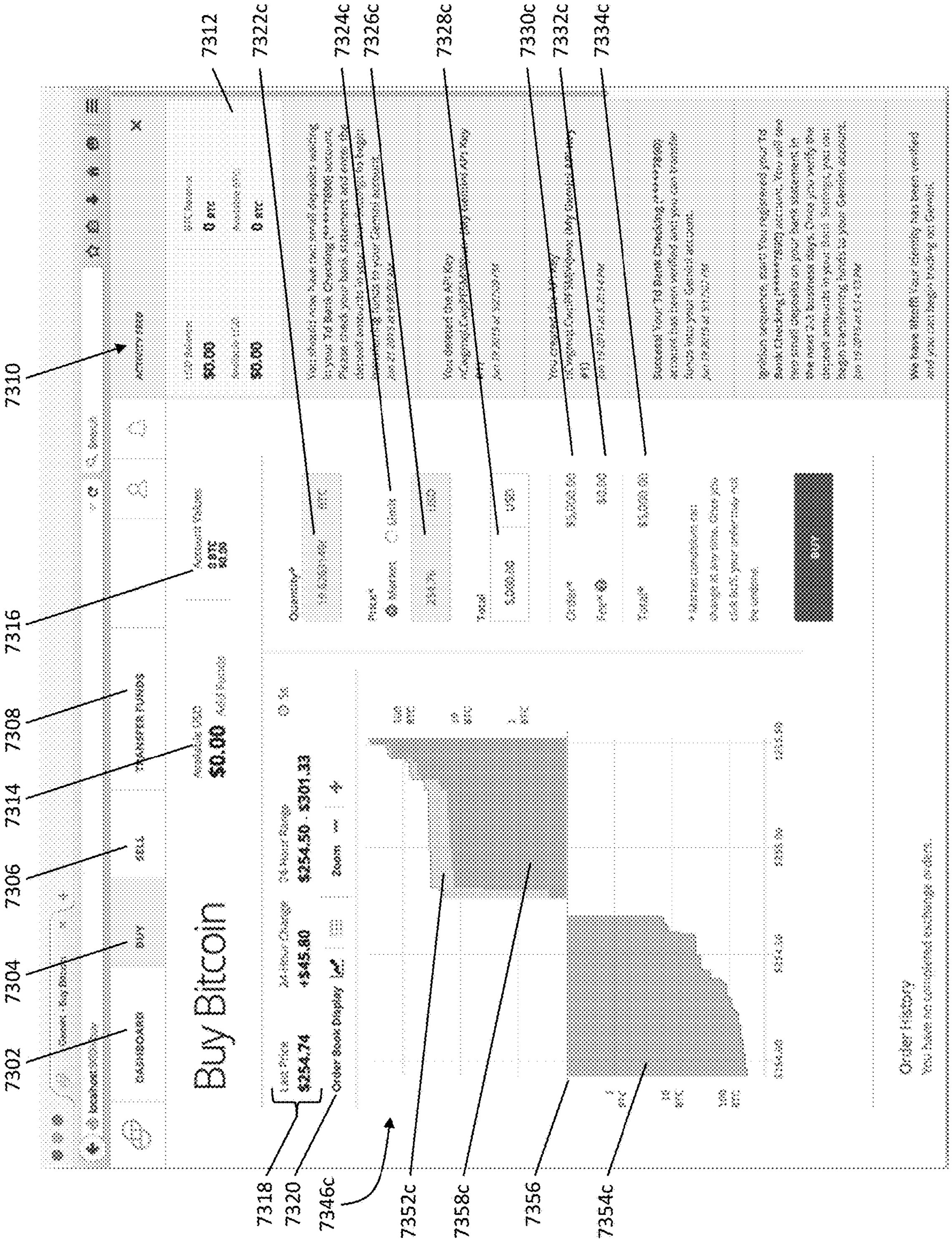

FIG. 50C shows a purchase order GUI comprising a graphical representation 7346*c* showing an electronic order book and prospective market purchase order. The order parameters define a prospective purchase order, which may be not yet submitted and therefore not yet pending on the electronic order book. The order type selector 7324*c* indicates that a market order was selected. Digital asset quantity input field 7322*c* contains a positive non-zero quantity, and accordingly a total cost field 7328*c* contains a positive non-zero quantity. The order price field 7326*c* contains an order price, which may be a current market price determined automatically by the exchange computer system upon a selection of a market order type. In embodiments, the order price for a market order may not be editable by a user. Accordingly, inputting and/or changing the value in the digital asset quantity input field 7322*c* may cause the computer system to calculate and/or re-calculate a corresponding total cost based at least in part upon the current market price. Similarly, inputting and/or changing the value in the total cost field 7328*c* may cause the computer system to calculate and/or re-calculate a corresponding digital asset order quantity based at least in part upon the current market price.

The order book and prospective order graphical representation 7346*c* comprises a sell order book graphical representation 7352*c* showing the pending digital asset sell orders and a purchase order book graphical representation 7354*c* showing the pending digital asset purchase orders. In embodiments, the purchase order book graphical representation 7354*c* may also depict the prospective purchase order data, which may be added to the pending purchase orders or overlaid as a separate graphical representation on the purchase order book graphical representation 7354*c*. In embodiments, the purchase order book graphical representation 7354*c* may show be a post-order purchase order book graphical representation showing the purchase orders that would exist after the prospective order is placed and/or executed. A post-order sell order book graphical representation 7358*c* may be overlaid on the graph to indicate how the prospective order would move the market. Such overlays may be rendered with a different color or a different shade of a color than the existing current order book graphical representations. For the exemplary market purchase order, the exchange computer system may place a series of orders starting with the lowest available price (e.g., whatever volume is available to purchase at the lowest sell order price) and increasing in price until the total cost is reached and/or until the digital asset order quantity is reached.

Figure 50D:
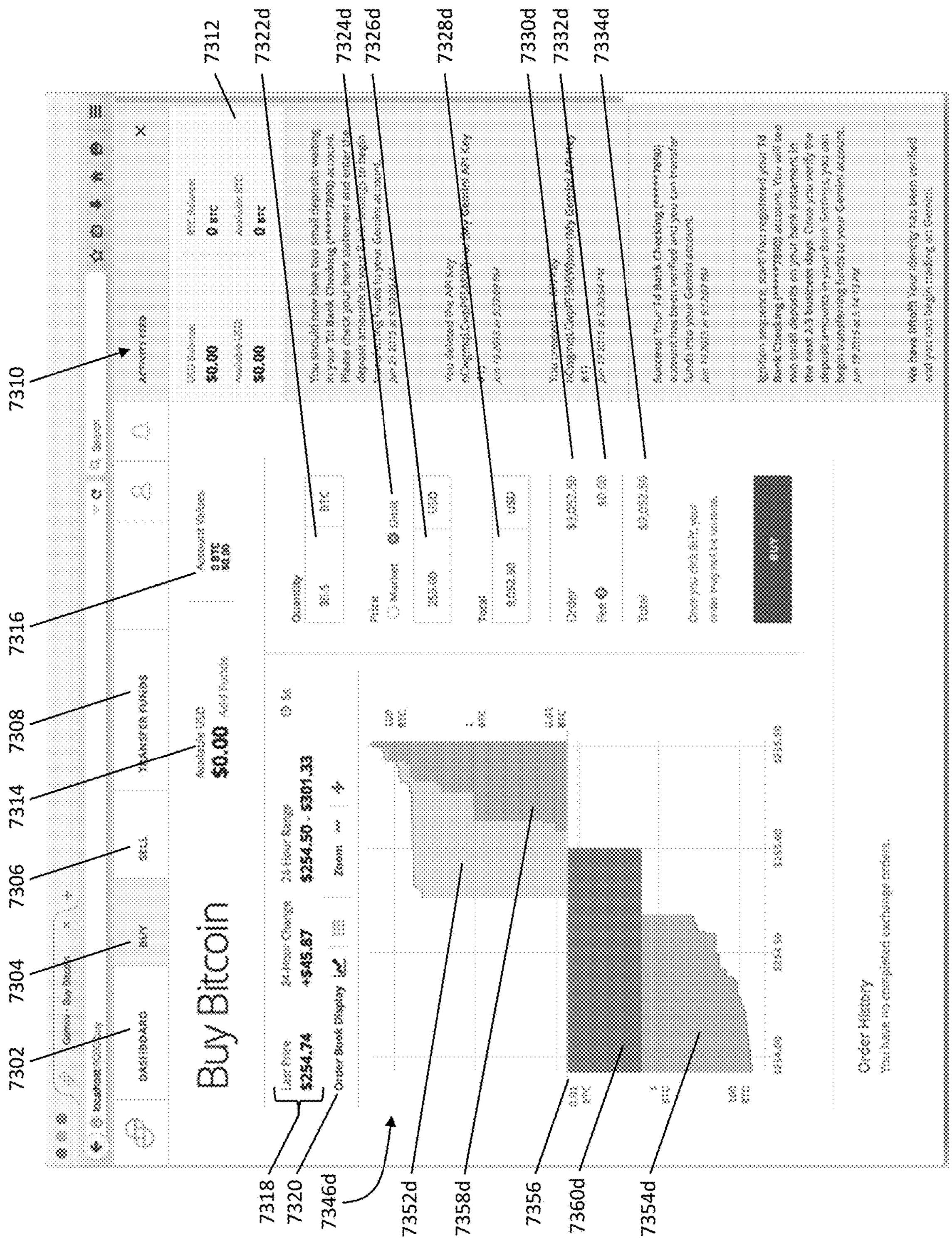

FIG. 50D shows a purchase order GUI comprising a graphical representation 7346*d* showing an electronic order book and prospective limit purchase order. The order type selector 7324*d* indicates a limit order, and the limit order price is specified in input field 7326*d*. The exemplary limit purchase order price is greater than the current market price. The order parameters define a limit order that can be characterized as in the money because at least a portion of the prospective order would be satisfied (e.g., fulfilled) by the currently pending sell orders.

The graph 7346*d* shows the current sell order book graphical representation 7352*d* and a post-order purchase order book graphical representation 7354*d*. This may show the purchase orders that would exist after the prospective limit purchase order is placed and/or executed. Accordingly, where only a portion of the prospective limit purchase order would be satisfied by the existing pending sell orders, the projected remainder of the prospective order may be added to the purchase order book graphical representation 7354*d*. That remainder of the limit purchase order (e.g., the portion that would not be satisfied by the current sell orders) may be represented on the graph by the limit purchase order graphical representation 7360*d*, which is overlaid on the purchase order book graphical representation 7354*d*. It shows the remaining (e.g., unfulfilled) prospective digital asset order quantity at the limit price and lower prices. In embodiments, the limit purchase order graphical representation 7360*d* may be rendered as a darker shade or different shade of the color used to render the current purchase order book graphical representation 7354*d*. Because the exemplary order is a limit order in the money, the remaining limit purchase order graphical representation 7360*d* makes clear that the prospective order exceeds the existing spread point (buying above the spread) and overlaps with some sell order prices, shown in the sell order book graphical representation 7352*d*. The overlapping portion would be fulfilled (e.g., fulfilled upon placement of the prospective order). The graph may include a post-order sell order book graphical representation 7358*d*, which may indicate the data that would compromise the sell order book after the prospective purchase order was placed and/or fulfilled. The remaining limit purchase order graphical representation 7360*d* does not overlap with the post-order sell order book graphical representation 7358*d*, illustrating that the remaining portion would not be fulfilled by the sell orders. Limit orders may be fulfilled by the exchange computer system matching engine in the order in which the orders were placed.

Figure 50E:
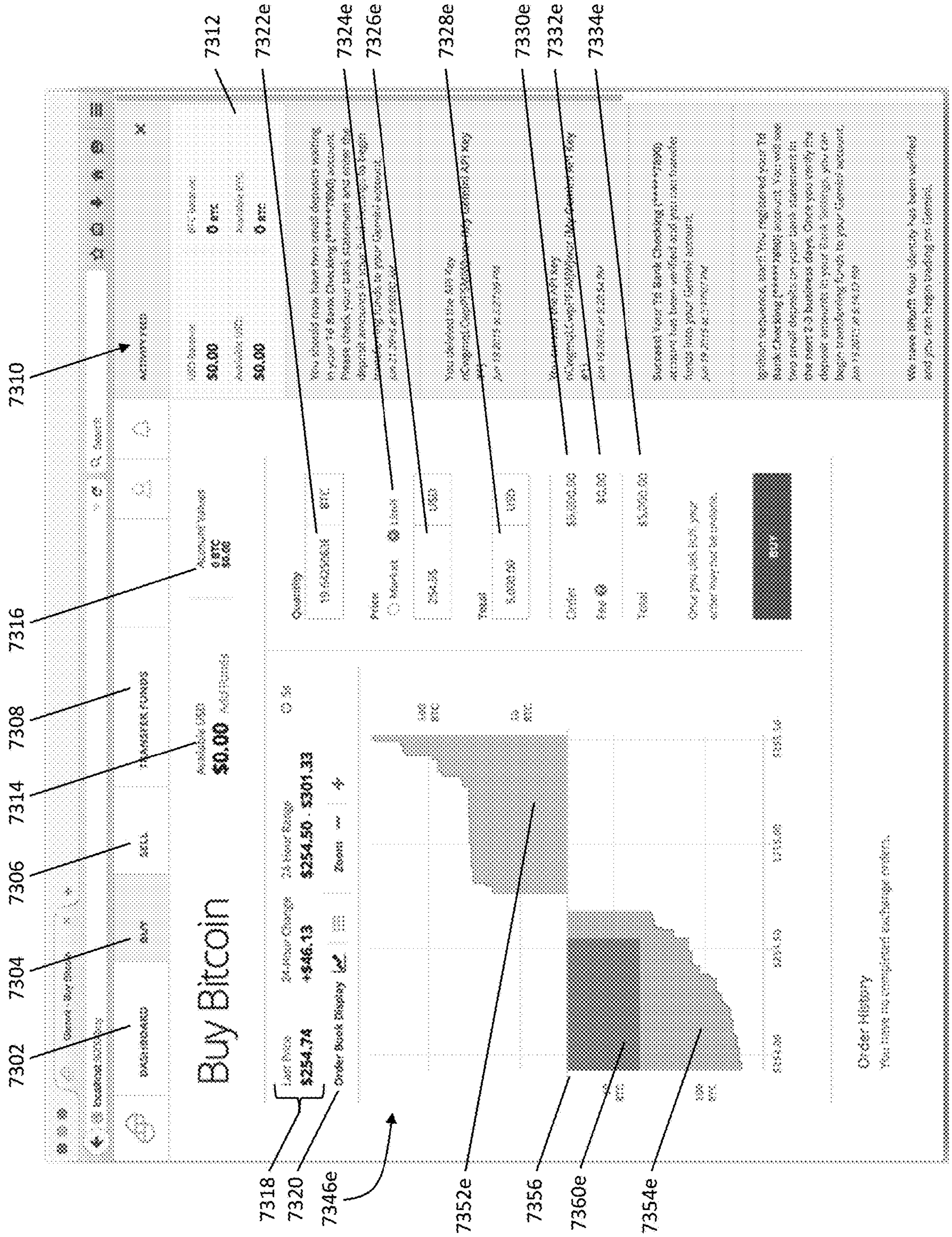

FIG. 50E shows a purchase order GUI comprising a graphical representation 7346*e* showing an electronic order book and prospective limit purchase order. The order type selector 7324*e* indicates a limit order, and the limit order price is specified in input field 7326*e*. The limit purchase order price is lower than the current market price. The order parameters define a limit order that can be characterized as out of the money because the order would not be satisfied by the currently pending sell orders.

The graph 7346*e* shows the current sell order book graphical representation 7352*e* and the purchase order book graphical representation 7354*e*. The limit purchase order is represented on the graph by the limit purchase order graphical representation 7360*e*, which is overlaid on the purchase order book graphical representation 7354*e*. In embodiments, the purchase order book graphical representation 7354*e* may be a post-order representation showing the purchase order book including the prospective purchase order. The limit purchase order graphical representation 7360*e* indicates the digital asset order quantity at the limit price and lower prices. As can be seen, there is no overlap in prices between the prospective purchase order and the sell order book. Accordingly, no portion of the prospective purchase order will be satisfied by the current sell order book. As illustrated, the sell order book will remain unchanged as a result of this purchase order. The purchase order would remain on the books until the user cancels it, until it automatically expires (e.g., in accordance with a predefined order expiry period), and/or until the market moves such that one or more sell orders are placed that satisfy the limit purchase order.

FIGS. 51A-E are exemplary screen shots of user interfaces related to sale transactions provided by an exchange computer system in accordance with exemplary embodiments of the present invention. The sell order GUIs may be rendered similar to the corresponding purchase order GUIs. In embodiments, the order parameter input fields may be located on a different side of the page (e.g., to the left of the order book graphical representation and/or listing instead of to the right).

Figure 51A:
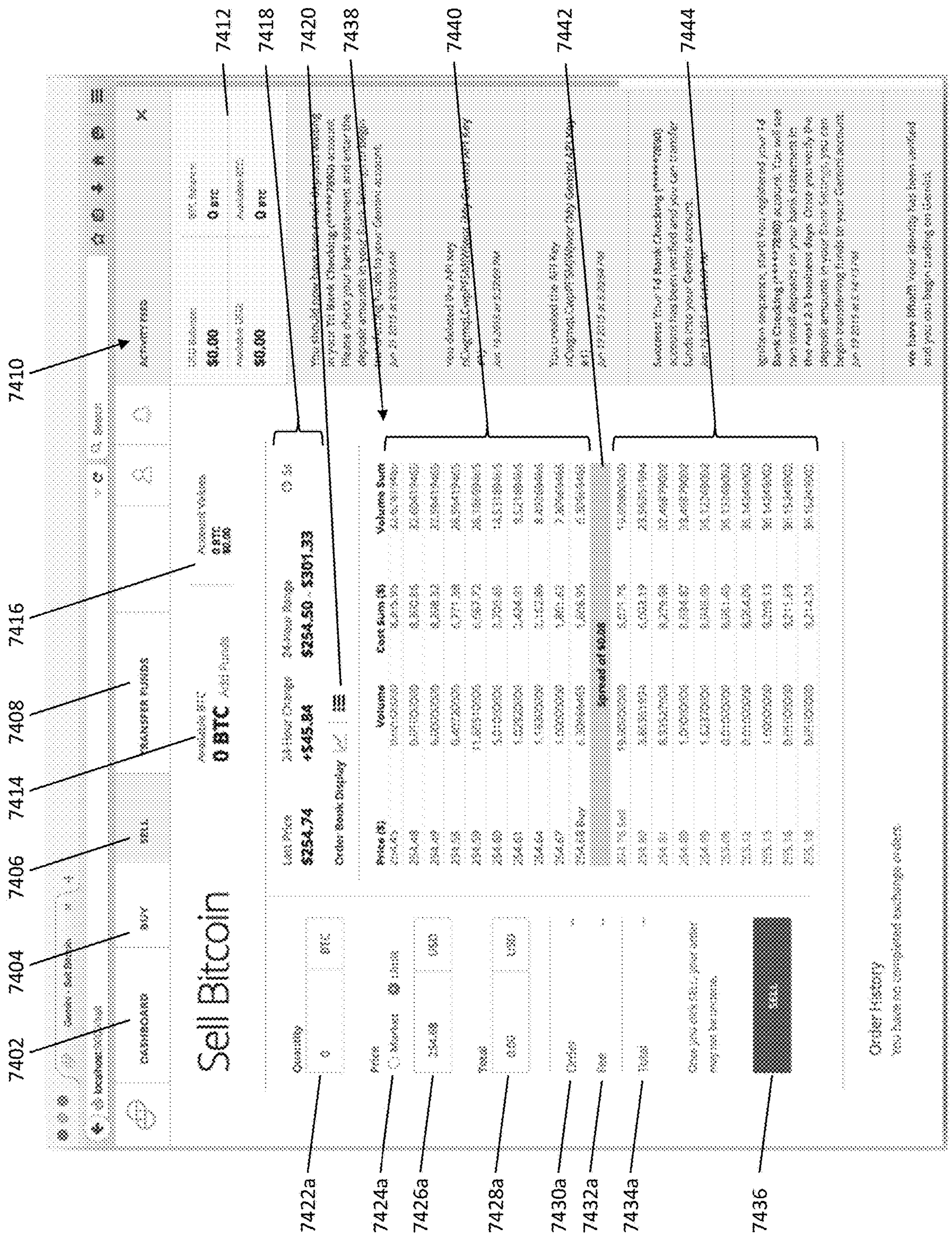
FIGS. 51A-E are exemplary screen shots of user interfaces related to sale transactions provided by an exchange computer system in accordance with exemplary embodiments of the present invention.

FIG. 51A shows a sell order graphical user interface comprising an order book listing 7438. This order book listing may be rendered similar to the order book listing 7348 for a purchase order GUI, described with respect to FIG. 50A.

Figure 51B:
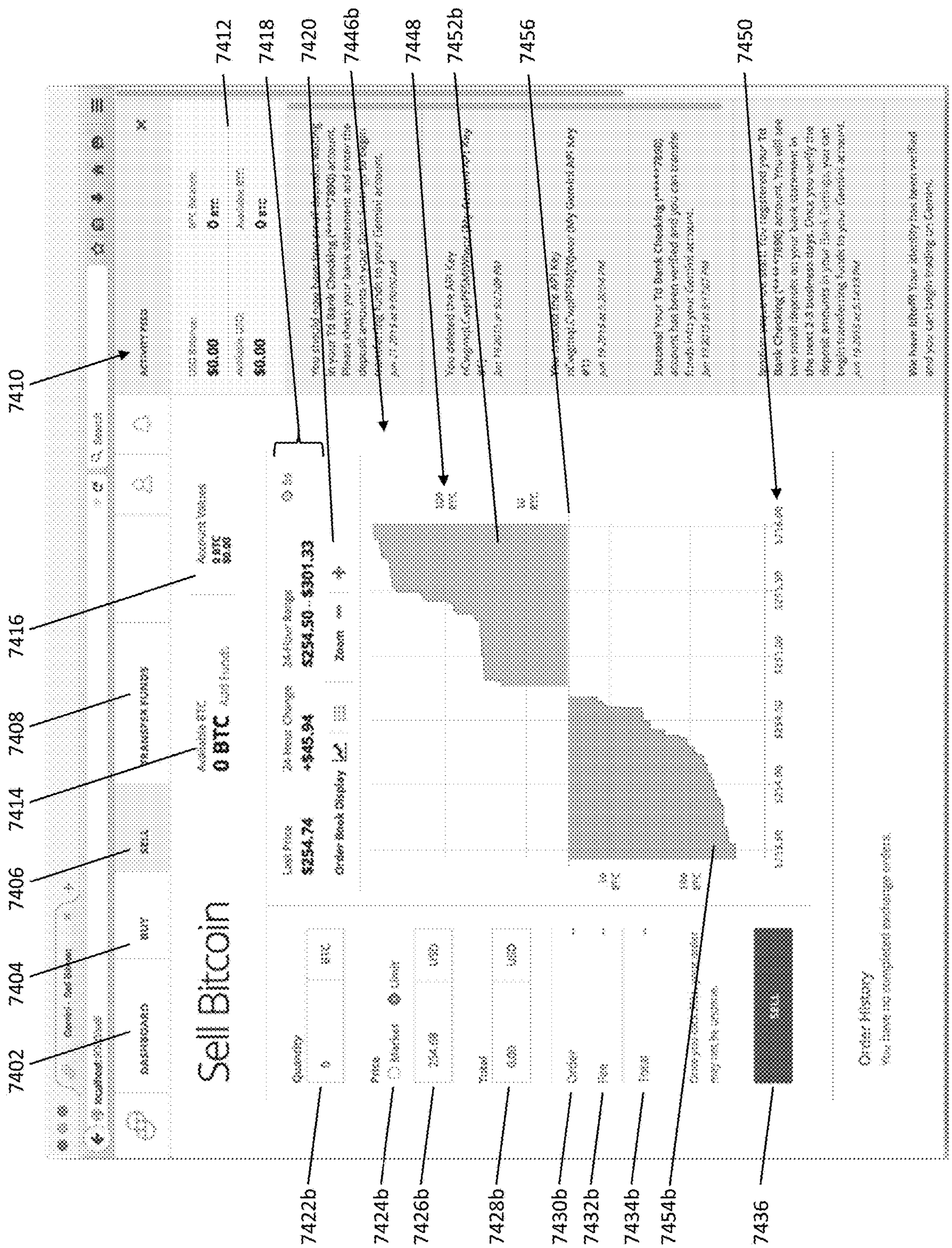

FIG. 51B shows a purchase order GUI comprising an electronic order book graphical representation 7446*b*. No prospective order is illustrated as part of the graphical representation 7446*b* because the digital asset order quantity is zero. As with FIG. 50B, the graph 7446*b* may include a sell order book graphical representation 7452*b* (e.g., above the price axis 7456) and a purchase order book graphical representation 7454*b* (e.g., below the price axis 7456).

Figure 51C:
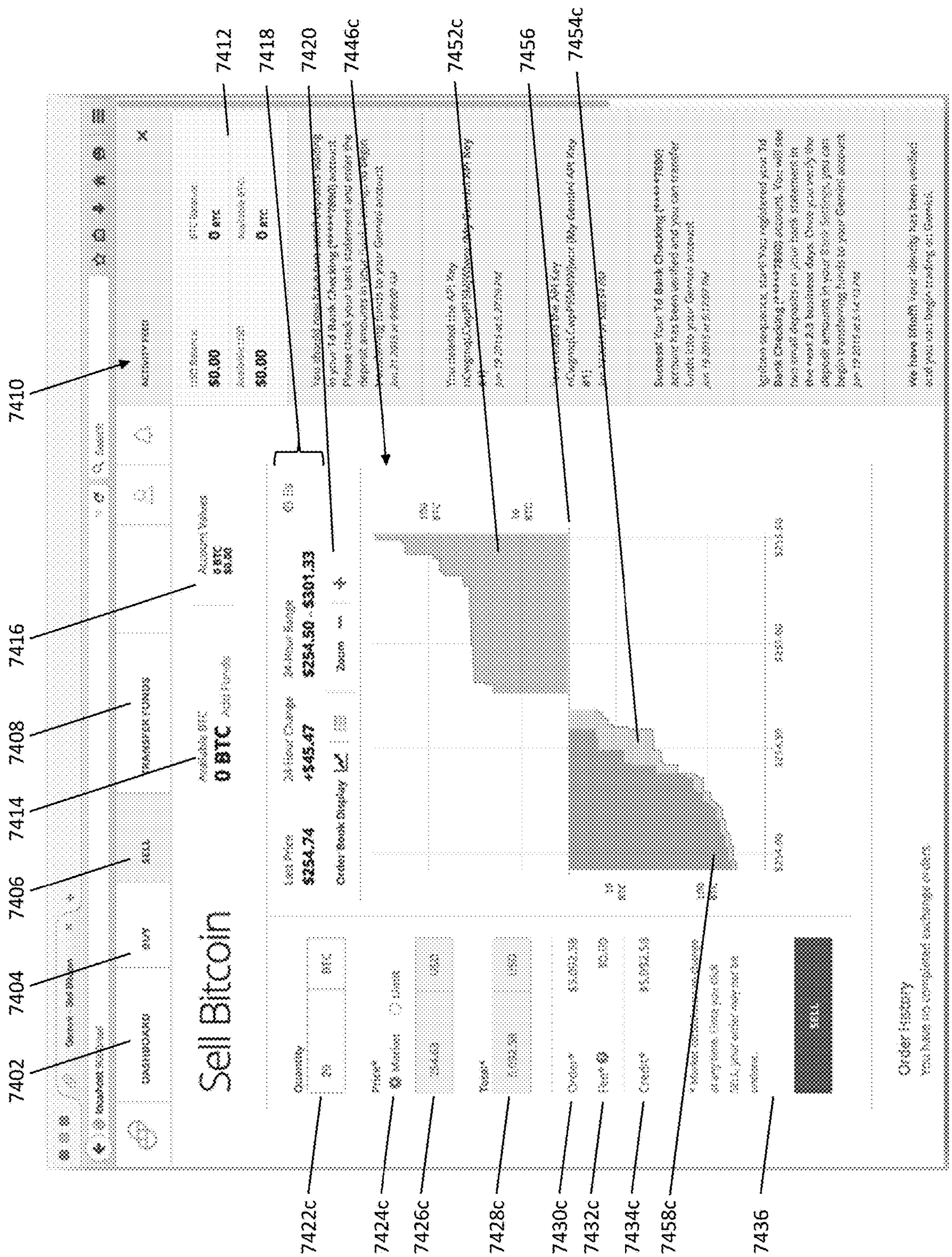

FIG. 51C shows a sell order GUI comprising a graphical representation 7446*c* showing an electronic order book and prospective market sell order. A market order is indicated by the order type selector 7424*c*. The graphical representation 7446*c* includes a sell order book graphical representation 7452*c* showing currently pending sell orders and a purchase order graphical representation 7454*c* showing currently pending purchase orders. A post-order purchase order book graphical representation 7458*c* indicates the cumulative order data that would comprise the purchase order book after placement and/or execution of the prospective sell order defined by the order parameters in the order parameter input fields. As with market purchase orders, a market sell order may cause the exchange computer system to place a plurality of sell orders until the order parameters are satisfied.

Figure 51D:
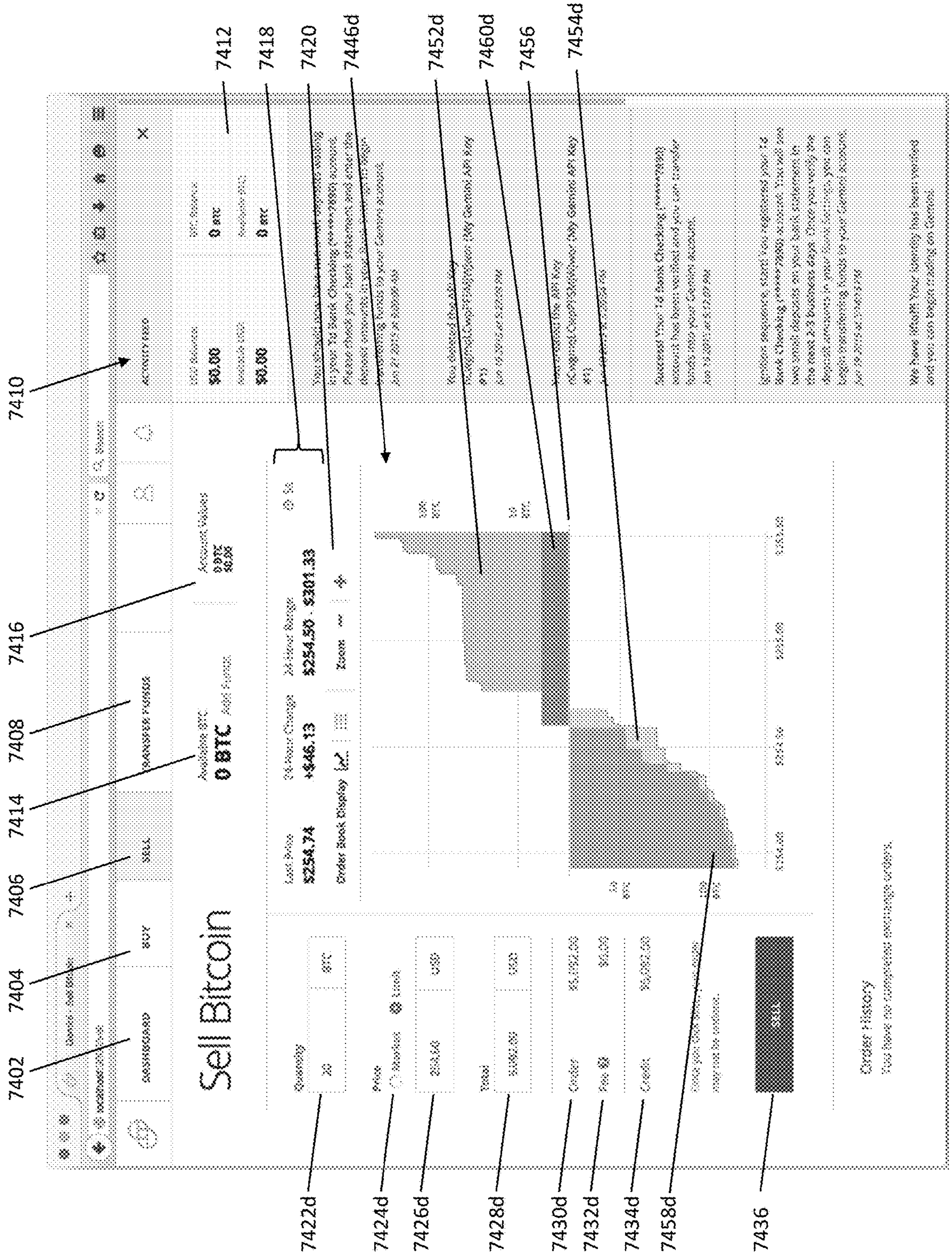

FIG. 51D shows a sell order GUI comprising a graphical representation 7446*d* showing an electronic order book and prospective limit sell order. The limit sell order price specified in field 7426*d* is less than the market price, and therefore the order will be in the money. At least a portion of the sell order will be satisfied by the currently pending purchase orders. The graph 7446*d* includes a sell order book graphical representation 7452*d* and a purchase order book graphical representation 7454*d*. The sell order book graphical representation 7452*d* may show the cumulative pending sell orders as well as the portion of the prospective sell order that would be unfulfilled by the current purchase orders and thus remain on the books. The unfulfilled portion of the prospective limit sell order may be indicated by a remaining prospective sell order graphical representation 7460*d*, which may be overlaid on the graph, e.g., on the sell order book side of the price axis 7456. The prospective sell order graphical representation 7460*d* may indicate the prospective digital asset order quantity at the sell order limit price and higher prices. Meanwhile, a post-order purchase order book graphical representation 7458*d* may be provided in the graph 7446*d*. It may be overlaid on the current purchase order book graphical representation 7454*d*. As can be seen, the prospective sell order overlaps at least some prices at which purchase orders exist shown in the current purchase order book graphical representation 7454*d*. Accordingly, at least a portion of the prospective sell order would be executed upon placement of the order.

Figure 51E:
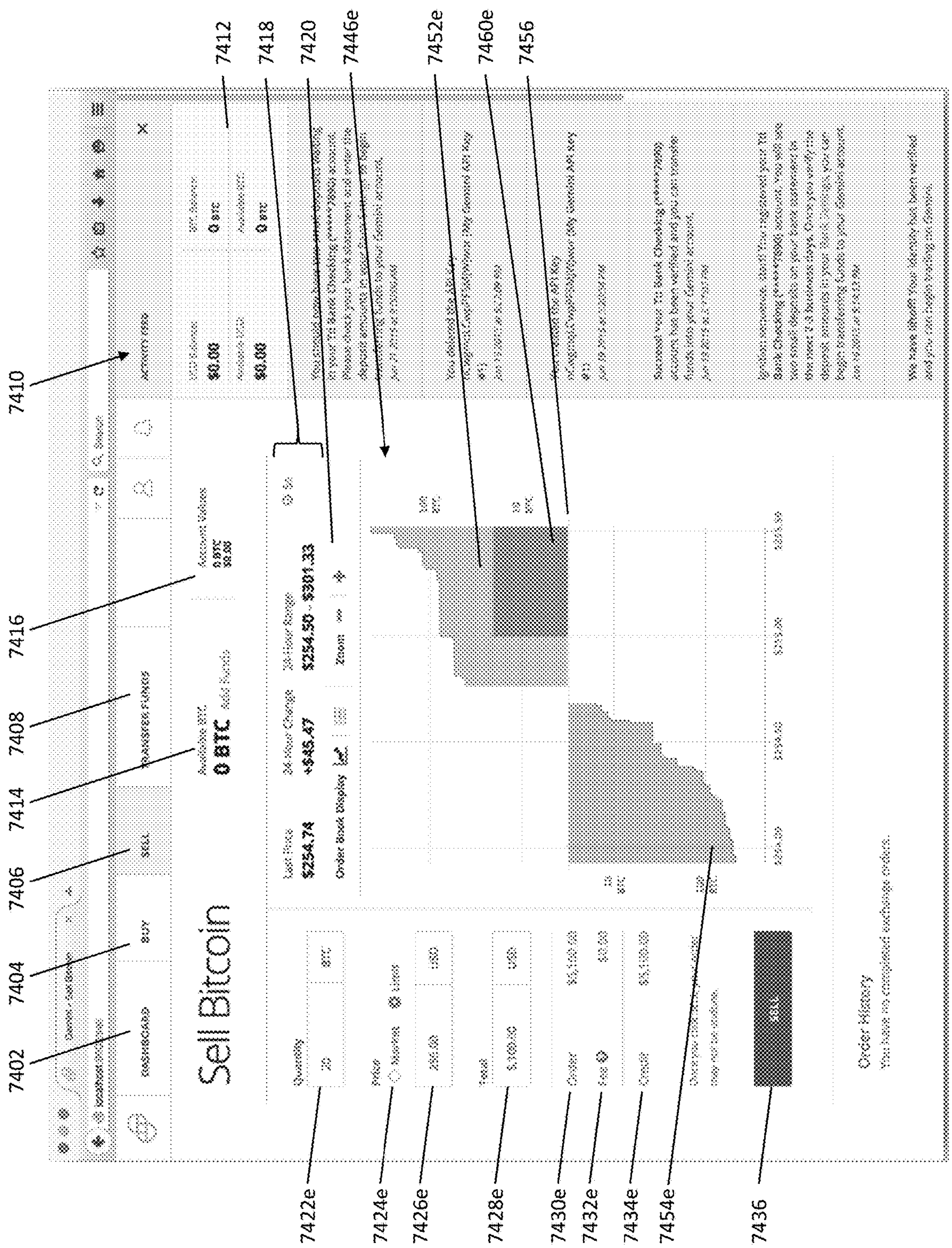

FIG. 51E shows a sell order GUI comprising a graphical representation 7446*e* showing an electronic order book and prospective limit sell order. The limit sell order price specified in field 7426*e* is greater than the market price, and therefore the order will be out of the money. The graph 7446*e* includes a sell order book graphical representation 7452*e* and a purchase order book graphical representation 7454*e*. A prospective sell order graphical representation 7460*e* may show the order parameters of the prospective limit sell order. The prospective digital asset order quantity may be shown at the sell limit price and higher prices. As illustrated there is no overlap with existing purchase orders. Accordingly, the prospective order would not be satisfied by the current purchase order book, and there is no post-order purchase book graphical representation because there would be no change to the purchase order book due to the prospective order.

It will be understood that information displayed across various exemplary embodiments of GUIs described herein may be displayed in the form of text and/or graphical representations. Such displayed information may be manipulated to a desired configuration by a user, for example, through scaling (such as minimization and maximization), highlighting, coloring, and/or rearrangement, to name a few.

FIGS. 52A-C are flow charts of exemplary processes for generating graphical user interfaces representing an electronic order book in accordance with exemplary embodiments of the present invention. These processes may enable a user of a user electronic device to view an electronic order book graphical representation. Such a representation may be updated automatically and/or dynamically, such as in response to changing data in the electronic order book (e.g., due to new orders, canceled orders, and/or filled or partially filled order), and/or in response to user input of new or changed order parameters). The electronic order book graphical representation can enable the user to view how a prospective order defined by its order parameters may move the market, the degree to which the prospective order will be filled and/or unfilled by currently pending orders, and/or a graphical comparison to the pending orders that comprise the electronic order book. An exchange computer system may interact with an application at a user electronic device (e.g., an installed and/or downloadable application, which may be a dedicated application or a general application, such as a web browser application, carrying out specific instructions provided by the exchange computer system). Interacting with the application can comprise sending and/or receiving data and/or transmitting machine-readable instructions to cause the application to render display content, such as particular graphical user interfaces or updates thereto. Transmitting such instructions to an application may activate it and/or cause it to carry out the instructions. Accordingly, the processes described in herein may dynamically generate graphical user interfaces and/or dynamically provide such graphical user interfaces (e.g., the instructions for rendering the graphical user interfaces) to one or more user electronic devices. In embodiments, the graphical user interface can be rendered by a viewer application on a remote device.

FIG. 52A shows an exemplary process for generating machine-readable instructions to render a graphical user interface comprising an electronic order book graphical representation. In a step S7502, an exchange computer system comprising one or more computers may receive from a user device, a request to access the electronic order book associated with a digital asset traded on an electronic exchange. Such a request may comprise a user selection of an order book display type indicator corresponding to a graphical representation display type.

In a step S7504, the exchange computer system may access, from non-transitory computer-readable memory, electronic order book information comprising digital asset order information for a plurality of digital asset orders. The digital asset order information may comprise respective order prices denominated in a fiat currency and respective order quantities for each of the plurality of pending digital asset orders. The plurality of pending digital asset orders can include pending digital asset purchase orders and pending digital asset sell orders.

In a step S7506, the exchange computer system may calculate information for a first graphical user interface by determining at each respective order a price first cumulative quantity of digital assets subject to the pending digital asset purchase orders; and by determining at each respective order price a second cumulative quantity of digital assets subject to the pending digital asset sell orders.

In a step S7508, the exchange computer system may generate first machine-readable instructions to render the first graphical user interface including a first electronic order book graphical representation. The first electronic order book graphical representation may comprise a first axis depicting price denominated in the fiat currency; a second axis depicting digital asset quantity; a first set of graphical indicators on a first side of the first axis showing at each price visible along the first axis the first cumulative quantity of digital assets subject to the pending digital asset purchase orders; and a second set of graphical indicators on a second side of the first axis showing at each price visible along the first axis the second cumulative quantity of digital assets subject to the pending digital asset sell orders. In embodiments, the first axis may be a horizontal axis and the second axis may be a vertical axis. In embodiments, the axes may be flipped. In embodiments, the second axis may have a logarithmic scale.

In embodiments, the machine-readable instructions may comprise computer code such as Javascript, HTML, CSS to name a few. In embodiments, the machine-readable instructions may comprise data and/or layout instructions in a language associated with one or more user electronic device operating system types (e.g., iOS, Android, Windows, to name a few) and/or associated with applications (e.g., mobile applications) running on user electronic devices. In embodiments, the machine-readable instruction may comprise data such as JSON data.

In a step S7510, the exchange computer system may transmit to the first user electronic device the first machine-readable instructions so as to cause the first user electronic device (e.g., an application running on the first user electronic device, such as a dedicated downloadable application or a web browser application, which may be mobile applications) to render the first graphical user interface on a display associated with the first user electronic device. In embodiments, a web browser running one the first user electronic device may render the first graphical user interface, e.g., in a webpage. In embodiments, the exchange computer system may transmit the first machine-readable instructions to one or more other user electronic devices and/or other computer systems.

FIG. 52B shows an exemplary process for generating machine-readable instructions to render a graphical user interface for display by a viewer application comprising an electronic order book graphical representation and a prospective purchase order graphical representation. In embodiments, a viewer application may in addition to rendering a graphical user interface for display on a display device, such as an LED screen, may also accept user input of data or other information.

In a step S7512, the exchange computer system may receive from the first user electronic device, first digital asset order information corresponding to a first prospective digital asset purchase order. The first digital asset order information comprise a first order quantity of the digital asset and a first order price parameter related to a first order price of the digital asset. In embodiments, the first order price parameter may comprise a market order indicator. Accordingly, the first order price may be a market price. In embodiments, the exchange computer system may automatically determine the market price for the first order price, e.g., upon receipt of a market order indicator. In embodiments, the first order price parameter may comprise a limit order indicator. Accordingly, the first order price may be a limit price, which may be specified by the user.

In a step S7514, the exchange computer system may store in non-transitory computer-readable memory, the first digital asset order information as a prospective digital asset purchase order.

In a step S7516, the exchange computer system may calculate information for a second graphical user interface by determining at each respective order price a second order quantity of digital assets subject to the first prospective digital asset purchase order and by determining at each respective order price a third cumulative quantity of digital assets subject to the digital asset sell orders that would remain after fulfilling the first prospective digital asset purchase order. The exchange computer system may be specifically programmed to perform these non-routine calculations. They generate data values that enable the exchange computer system to generate machine-readable instructions for an unconventional GUI that provides enhanced order book visualization showing the potential impact of a prospective order. The potential impact of the order can include a visualization of how the order fits within the pending orders of the order book and/or how the order, once placed, will increase or decrease the pending cumulative sell order volumes and/or purchase order volumes available in the order book at each price. In embodiments, the second graphical user interface may be an updated version of the first graphical user interface.

In a step S7518, the exchange computer system may generate second machine-readable instructions to render the second graphical user interface including a second electronic order book graphical representation comprising a graphical representation of the first prospective digital asset purchase order superimposed on a modified first electronic order book graphical representation (e.g., modified to comprise a post-order electronic order book representation). The second electronic order book graphical representation may comprise the first axis depicting price denominated in the fiat currency; the second axis depicting digital asset quantity; the first set of graphical indicators on the first side of the first axis; the second set of graphical indicators on the second side of the first axis; a third set of graphical indicators on the first side of the first axis showing at each price visible along the first axis the respective second order quantity of digital assets subject to the first prospective digital asset purchase order; and a fourth set of graphical indicators on the second side of the first axis showing at each price visible along the first axis the respective third cumulative quantity of digital assets subject to the digital asset sell orders that would remain after fulfilling the first prospective digital asset purchase order.

In embodiments, the third set of graphical indicators may not be displayed, such as for a market order. In embodiments, the first prospective digital asset purchase order may be characterized as out of the money, and the third respective cumulative quantity of digital assets at each price may be zero.

In embodiments, at least one of the first axis or the second axis of the first electronic order book graphical representation have a different scale than the corresponding first axis and the corresponding second axis of the second electronic order book graphical representation. In embodiments, the scaling may be changed upon receipt of an electronic request from the user (e.g., via selection of an element, such as a rendered button, of the graphical user interface). In embodiments, the user may navigate and/or scroll along the axes of the graph and/or zoom in and/or out.

In embodiments, the exchange computer may further determine at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. The first set of graphical indicators of the second electronic order book graphical representation may show at each price visible along the first axis the fourth cumulative quantity of digital assets.

In a step S7520, the exchange computer system may transmit to the first user electronic device, the second machine-readable instructions so as to cause the first user electronic device (e.g., an application running on the first user electronic device, e.g., on one or more processors) to render the second graphical user interface on the display. The first user electronic device (e.g., the application running thereon) may render the second electronic order book graphical representation according to the second machine-readable instructions.

FIG. 52C shows an exemplary process for generating machine-readable instructions to render a graphical user interface comprising an electronic order book graphical representation and a prospective sell order graphical representation In a step S7522, the exchange computer system may receive from the first user electronic device, first digital asset order information corresponding to a first prospective digital asset sell order. The first digital asset order information may comprise a first order quantity of the digital asset and a first order price parameter related to a first order price of the digital asset, the first order price denominated in the fiat currency.

In a step S7524, the exchange computer system may store in non-transitory computer-readable memory, the first digital asset order information as a prospective digital asset sell order.

In a step S7526, the exchange computer system may calculate information for a second graphical user interface by determining at each respective order price a second order quantity of digital assets subject to the first prospective digital asset sell order and by determining at each respective order price a third cumulative quantity of digital assets subject to the digital asset purchase orders that would remain after fulfilling the first prospective digital asset sell order. These non-routine calculations enable generation of an unconventional GUI that can show electronic order book data with a visualization that enhances rapid understanding of the bounds of the pending buy and sell orders as well as how the prospective order may interact with the existing orders (e.g., to be fulfilled, partially fulfilled, unfulfilled, and/or to move the market by changing the pending orders that remain on the electronic order book).

In a step S7528, the exchange computer system may generate second machine-readable instructions to render the second graphical user interface including a second electronic order book graphical representation comprising a graphical representation of the first prospective digital asset purchase order superimposed on a modified first electronic order book graphical representation (e.g., modified to comprise a post-order electronic order book graphical representation). The second electronic order book graphical representation may comprise the first axis depicting price denominated in the fiat currency; the second axis depicting digital asset quantity; the first set of graphical indicators on the first side of the first axis; the second set of graphical indicators on the second side of the first axis; a third set of graphical indicators on the first side of the first axis showing at each price visible along the first axis the respective third cumulative quantity of digital assets subject to the digital asset purchase orders that would remain after fulfilling the first prospective digital asset sell order; and a fourth set of graphical indicators on the second side of the first axis showing at each price visible along the first axis the respective second order quantity of digital assets subject to the first prospective digital asset sell order. These machine-readable instructions may provide an unconventional GUI that facilitates order book visualization, including visualization of the degree to which a prospective order may be satisfied and how it may move the market.

In embodiments, the exchange computer system may determine at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. The first set of graphical indicators of the second electronic order book graphical representation may show at each price visible along the first axis the fourth cumulative quantity of digital assets.

In a step S7530, the exchange computer system may transmit to the first user electronic device, the second machine-readable instructions so as to cause an application at the first user electronic device to render the second graphical user interface on the display. The first user electronic device may render the second electronic graphical user interface according to the second machine-readable instructions.

In embodiments, transmitting data and/or machine-readable instructions to a user electronic device and/or to an application on the user electronic device may activate the application and/or cause it to render display content on a display screen.

In embodiments, graphical user interfaces similar to those described herein may be generated to show order book and order information related to other types of exchange transactions, such as a first digital asset to a second digital asset, a first fiat currency to a second fiat currency, or a first commodity to a second commodity, to name a few.

Setup and Storage of Digital Assets and/or Digital Wallets

Digital asset accounts may be securely generated, accessed, and/or used (e.g., for transactions) from a secure administrative portal. In embodiments, the administrative portal, which may be used for key generation, parsing, and/or reassembly, may be a secure system for transacting in digital math based assets comprising a first computer system comprising one or more processors that generate one or more digital wallets and one or more respective private keys and one or more respective public keys, each of the one or more private keys being segmented into one or more private key segments; one or more writing devices operatively connected to the one or more first computer systems, each of the one or more writing devices adapted to write at least one private key segment of a corresponding one of the one or more private keys, along with information correlating the at least one private key segment to one of the one or more public keys; and at least one networked computer comprising one or more processors that access at least one of the digital wallets using a corresponding one of the one or more private keys as reassembled using the corresponding private key segments.

In embodiments, the administrative portal may further comprise a second computer system comprising one or more processors for reassembling the corresponding one of the one or more private keys based on input into the second computer system of the corresponding private key segments. In embodiments, the input device may be a scanner, a keyboard, a touchscreen, a mouse, a microphone, a camera, and/or a digital card reader, to name a few.

In embodiments, the first computer system of the administrative portal and/or the second computer system may not be associated with a network. In embodiments, the first computer system of the administrative portal and the networked computer system may be a common computer system. In embodiments, the second computer system of the administrative portal and the networked computer system may comprise a common computer system. In further embodiments, the first computer system, the second computer system, and the networked computer system may be a common computer system.

In embodiments, referring to FIGS. 4A-4D, the administrative portal may comprise an accounting computer 25 and a secure location 10, as described herein.

Figure 4A:
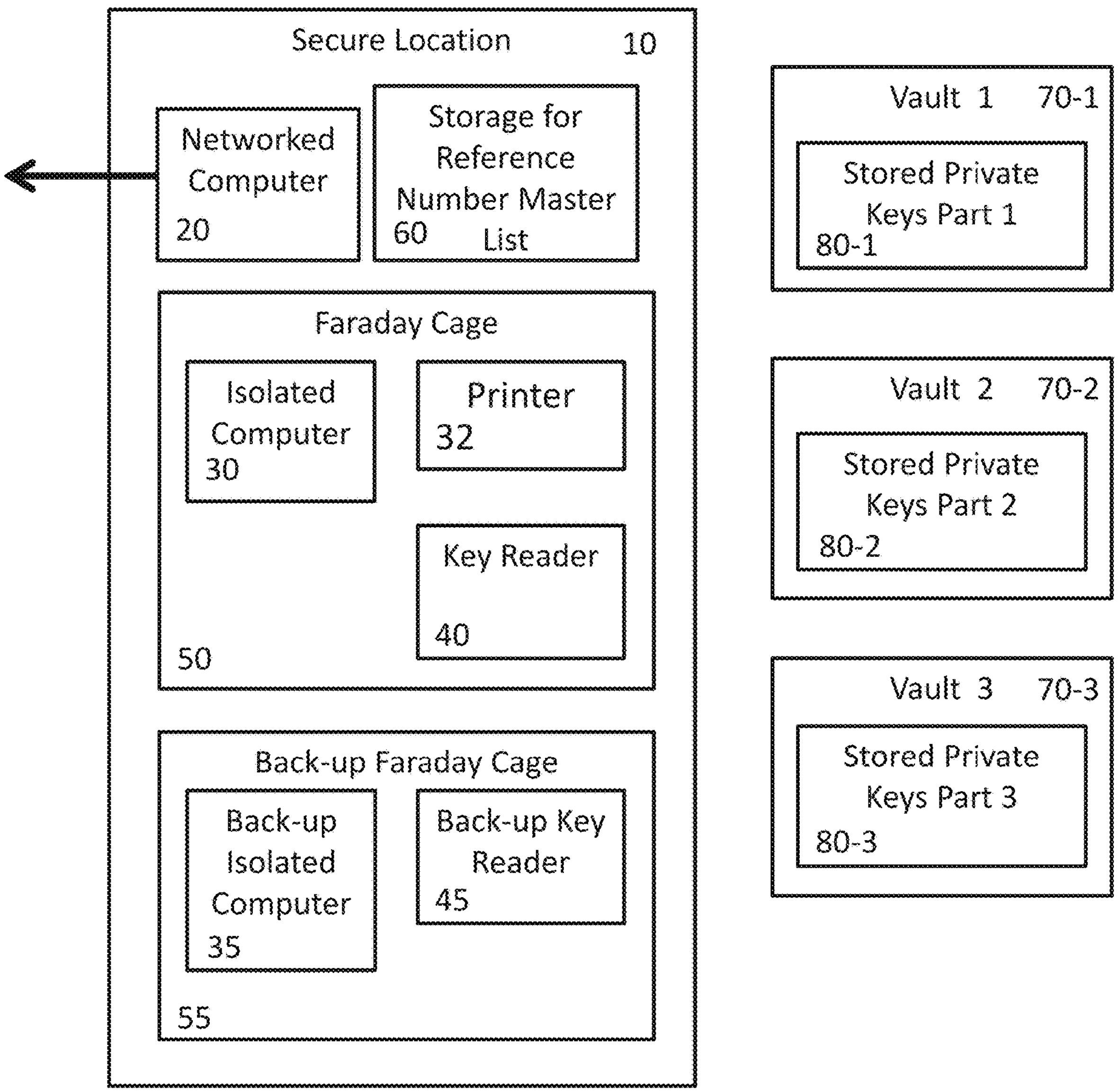
FIGS. 4A-4D are exemplary block diagrams of components of security systems for an ETP holding digital math-based assets in accordance with various exemplary embodiments of the present invention.

Referring to the exemplary embodiment illustrated in FIG. 4A, at a secure location 10, a digital asset account holder, administrator, manager, and/or custodian may maintain at least two computers. In embodiments, an administrator, manager, and/or custodian may be contracted to manage one or more digital asset accounts and/or oversee security for the accounts. In embodiments, secure location 10 may be a room with restricted entry. In embodiments, secure location 10 may have a user entry log to provide an access record for the location.

In the exemplary embodiment depicted in FIG. 4A, at secure location 10, the first computer may be a networked computer 20, which may comprise one or more computing devices. Networked computer 20 and/or other computers in the system may have the ability to cycle or otherwise change IP addresses. The second computer may be a non-networked, isolated computer 30, which may comprise one or more computing devices. In embodiments, the networked computer 20 and the isolated computer 30 may be separate aspects of one computing device. For example, a hard drive partition may be used to separate the networked and non-networked functions. In embodiments, the computers may comprise one or more processors and/or computer readable memory. Networked computer 20 and isolated computer 30 may be located in close proximity to each other, as in the same room, or may be located in separate locations within secure location 10. It will be appreciated by those in the art that secure location 10 may comprise a plurality of secure locations. In embodiments, isolated computer 30 may be located in a Faraday cage 50. The Faraday cage 50 may prevent electronic eavesdropping or interference from electromagnetic waves. In alternative embodiments, the functions ascribed above to networked computer 20 and isolated computer 30 may be performed by one or more networked and/or isolated computers at one or more locations.

In the exemplary embodiment depicted in FIG. 4A, networked computer 20 can communicate with a registry, exchange, other external entities, e.g., APs, and/or all or part of a digital asset network to send and/or receive digital assets (e.g., to create transactions), to compute balances, and/or to transmit or otherwise broadcast signed or otherwise finalized transactions. In embodiments, networked computer 20 may be used to distribute digital assets among one or more digital asset accounts and/or digital wallets. The networked computer 20 may be connected to the Internet directly (e.g., through Ethernet, Wi-Fi, Bluetooth, or any connection known in the art or hereafter developed) or indirectly (e.g., through another computer to which it is directly connected), or may be connected to a network other than the Internet.

In embodiments, the digital assets may be stored in one or more digital wallets residing on one or more computing devices, such as remote servers, personal computers, tablet devices, mobile devices, such as smart phones, or PDAs, to name a few. In the exemplary embodiment of FIG. 4A, isolated computer 30 may be used to generate electronic wallets and/or key pairs, which may include both private and public keys. In embodiments, keys comprise strings or alphanumeric characters or other characters, optionally of a pre-determined length, may comprise one or more pieces of computer code, or may comprise other formats of keys known in the art. In embodiments, digital wallets may be created on isolated computer 30 using a "clean-boot" with a bootable CD, such as a Linux Live CD. The specific version of the operating system may be maintained in secret to avoid security risks.

In embodiments, digital asset accounts and/or digital wallets may be generated by an entity upon receipt of a request to transfer digital assets to the entity and/or may be pre-generated at the time that security measures (e.g., a vault storage system) is set up, to name a few. The digital asset accounts each may be associated with unique private-public key pairs (which may include a plurality of private keys). In embodiments, the key pairs may be created as part of the digital wallet creation process. In other embodiments, the key pairs may be created before or after the creation of the one or more digital wallets and associated with the wallets as a separate step. In embodiments, the assets stored in a digital wallet may be accessed with a key pair, even if the original wallet is destroyed or otherwise unavailable. In such embodiments, only the key pair need be maintained and/or stored to retrieve the assets associated with a given digital wallet. Accordingly, in an embodiment of the present invention, digital wallets may be deleted or otherwise destroyed following the storage of their associated keys. Assets may be added to the wallet even after its destruction using the public key. Assets may thus be stored in a wallet after the wallet is destroyed. The wallet may be re-generated using its keys.

In embodiments, the private key may not be used directly with or on the networked computer 20. In embodiments, a public key (without the corresponding private key) may only be able to receive digital assets for deposit purposes. In embodiments, assets may be transferred to a wallet using its public key and without the transferor knowing the private key. Implementation of the foregoing may require customized software, e.g., software that modifies the standard digital asset protocols.

In embodiments, isolated computer 30 may also be used in conjunction with, e g., one or more printers or other writing devices, to print the key pairs or may be used otherwise to arrange for the storage of one or more aspects and/or portions (or segments or coded and/or encrypted segments) of the key pairs. A printer 32 or other writing device to write, print, or otherwise store the keys may be provided with the isolated computer 30. Such printer(s) and/or other writing device(s) may be connected, directly and/or indirectly, to the isolated computers, such as through hardwire, wireless, or other connection. That device may also be located within a Faraday cage, which may be the same Faraday cage housing isolated computer 30. Storage of the keys is described further below.

In embodiments, one or more isolated computers 30 can be used in conjunction with one or more printers or other writing devices to write, print or otherwise store keys. It will be appreciated by one of skill in the art, that in embodiments it may be desirable to limit the number or printers or other writing devices to as few as possible to reduce risk of exposure of private keys, while in embodiments it may be desirable to have a larger number of printers or other writing devices to handle the volume of wallets and/or keys that need to be generated and/or written by the system for its operation.

Private keys may be stored in the selected format along with their corresponding public keys. In embodiments, the private key may be stored with a reference number which may correlate the private key to its corresponding public key. The reference number may be (or may be stored as) a number, alphanumeric code, bar code, QR code, to name a few. A reference number master list may identify a private key, the reference number, and the corresponding public key. The reference number master list may be printed or etched on paper or some other substrate, may be stored digitally on a tape CD, DVD, computer hard drive, or other medium, or otherwise stored in a manner known in the art. The substrates or media just described may have any suitable size, including microscopic or nano scales. In embodiments, the reference number master list may be stored in a secure storage chamber 60 at secure location 10. Storage chamber 60 may be a lockbox, fireproof box, or other secure chamber. If storage is electronic or digital, chamber 60 may protect against electromagnetic waves.

The private and/or public keys and/or any reference number may be stored in a variety of formats, as described herein. The keys may be divided into separate segments for storage. For example, a 51-character key may be divided into three 17-character segments. The same reference number that correlates the private key to the public key or an additional reference number or other identifier may indicate which key segments are part of the same key. The reference identifier or another identifier may be provided and stored with the one or more segments to indicate their order in the assembled key. A numbering schema or other convention may also be used to identify the order of key segments. For example, a first segment may begin with an "A", a second segment may begin with a "B", and a third segment may begin with a "C". The key segments may be stored in one or more locations. In embodiments, the key segments may be divided among a plurality of vaults 70, as described herein.

In embodiments, keys and/or key segments may be stored digitally and/or electronically, e.g., on one or more computer hard drive, disk, tape, memory card, flash memory, CD-ROM, and/or DVD, to name a few. In embodiments, the keys and/or key segments may be printed on any substrate, including paper, papyrus, plastic, and/or any substrate known in the art. In embodiments, the substrate may be fireproof or fire resistant, such as a fireproof plastic. The substrate may be resistant to fluids, e.g., water resistant, or otherwise nonabsorbent. Other printing options may be holographic printing, three-dimensional printing, raised printing, such as Braille lettering, and/or invisible ink printing, such as using inks that require a special light and/or treatment, e.g., heat and/or chemicals, for viewing. In embodiments, keys may be etched, e.g., in wood, metal, glass, plastic, or other compositions known in the art, e.g., to produce a card. In embodiments, a magnetic encoding may be used to write to the card. In embodiments, etched or printed keys or key segments may take any shape, such as coin-shaped tokens or rectangular blocks, to name a few. In embodiments, keys or key segments may be printed, etched, or otherwise stored as alphanumeric strings. In embodiments, keys or key segments may be printed, etched, or otherwise stored in a form readable by programmed devices, such as scanners. Such a form may be a QR code, a bar code, another available scanable code format and/or a proprietary code format. In embodiments, quality control operations may ensure that the keys or key segments are printed accurately and/or are able to be read. In embodiments, printed or etched keys or key segments may be coated to prevent reading the key without removing or otherwise altering the coating. Such a coating may be a UV coating and/or may block X-rays or other forms of scanning or reading. The coating may be scratched off to reveal the data contained below it. The back of the substrate may also be coated to prevent reading through the substrate. Such a coating may provide an indication of whether a printed key or key segment was accessed or attempted to be accessed (e.g., it can be detected whether someone scratched the coating away).

In embodiments, security measures may be established and implemented to reduce the risk of digital wallets being compromised. Further, redundancies can be put in place to provide and/or help ensure that any information necessary to access digital math-based assets in digital wallets can be maintained and/or accessed by the account holders as appropriate, necessary, and/or desired.

Multiple private keys may be required to access a digital wallet. Multiple keys may be stored in the same manner as key segments. In embodiments, where a second private key is required, the one or more individuals or systems providing the second key may be located in different administrative portals, different rooms, and/or different geographies from the one or more individuals or systems providing the first private key. Accordingly, a plurality of administrative portals may be employed by secure digital asset storage systems in accordance with the present invention. In embodiments, a plurality of portals may be used for retrieval of stored digital assets (e.g., by requiring a signature or private key from at least two individuals located in at least two different portals). In embodiments, one portal may be used for re-assembling key segments and thus providing one private key, and an individual in a second location may be required to provide a second key or signature before a digital wallet may be accessed. The second key or signature may be encrypted and/or segmented as described herein with respect to a single private key.

In embodiments, a digital wallet may have more than one private key (e.g., multi-signature wallets). The plurality of private keys may be stored securely in the same manner as a single private key. Each private key segment pertaining to a single wallet may be stored in separate vaults, which may be electronic and/or physical vaults. By allowing for multi-signature wallets, the wallet can provide for approval/signature authority from more than one individual or entity as a further means to control access to digital assets held in such wallet. In embodiments, a signature authority may be an automated electronic signature authority, such as a computer or computer system programmed with transaction approval rules. The automated electronic signature authority may only provide a signature when a transaction satisfies the transaction approval rules. In other embodiments, required signature authorities may be individuals who may be located in different administrative portals, different rooms, and/or different geographies. Accordingly, a plurality of administrative portals may be employed by secure digital asset storage systems in accordance with the present invention. In embodiments, one portal may be used for re-assembling key segments and thus providing one private key, and an individual or system in a second location may be required to provide a second key or signature before a digital wallet may be accessed. The second location may be a second portal, a location in a different building, and/or a different geography, to name a few. The second key or signature may be encrypted and/or segmented as described herein with respect to a single private key.

Keys or key segments may be encrypted and/or ciphered, using one or more ciphers, as an additional security measure. The encryption and/or ciphers may be applied by computers running encryption software, separate encryption devices, or by the actions of one or more persons, e.g., prior to input of the encrypted and/or ciphered data into one or more computers. In embodiments, a key may be stored in reverse order and/or translated (e.g., by adding 1 to each digit and/or advancing each alphabetic character by one position in the Western alphabet, by substitution such as by mapping each character to a different character (e.g., A=3, 5=P, to name a few), to name a few). In embodiments, other encryption algorithms can comprise scrambling of a sequence of characters, addition of characters, and/or hashing. Other encryption techniques are possible. See, e.g., David Kahn, The Codebreakers: The Story of Secret Writing, 1967, ISBN 0-684-83130-9. See also, Bruce Schneier, Applied Cryptography, John Wiley & Sons, 1994, ISBN: 0-471-59756-2. The encryption and/or ciphers may protect against use of the keys by an unauthorized entity who obtains the keys or key segments or copies thereof. The encoding and/or cipher may be maintained in secret and applied to decrypt or decode the keys only when keys must be accessed and used. In embodiments, ciphering may refer to an alphanumeric translation or reordering, while encryption may refer to higher level algorithms, including hashing algorithms. In embodiments, encryption and ciphering may refer to the same processes, in which case descriptions herein of processes involving both encryption and ciphering steps may only entail performance of one such step so as not to be repetitive.

Following storage of the key pairs, the key pairs may be erased from isolated computer 30. Erasure may occur using the computer operating system's delete features, customized software or computer code designed to remove the data from computer memory, magnets used to physically erase the data from the computer's storage drives, and/or other techniques known in the art.

A key reader 40 may be provided to assemble, read, and/or de-crypt the keys or key segments. The key reader 40 may be contained within a Faraday cage, which may be the same Faraday cage housing isolated computer 30. The key reader 40 may read keys that are printed, etched, digitally stored, or otherwise stored. Key reader 40 may be a scanner (e.g., photo scanner or bar code scanner), QR reader, laser, computer hardware, CD reader, and/or digital card reader, to name a few. Key reader 40 may include or be operationally connected to a microscope or magnifying device, such as for keys that are printed in microscopic sizes or other small sizes. In embodiments, key reader 40 may be paired with optical character recognition ("OCR") technology to create digitally recognized copies of keys that may have been printed, etched, or otherwise stored in a form not immediately readable by a computer.

In embodiments, key reader 40 may comprise an input device, such as a keyboard, touchscreen, mouse, and/or microphone, to name a few. An input device may be used for manual entry of keys and/or key segments into one or more computers so that the computer may further process the key segments. Key reader 40 may be operationally connected to isolated computer 30, which may be a direct connection (e.g., a USB cable, Ethernet cable, Bluetooth, or Wi-Fi, to name a few). In embodiments, key reader 40 may be operationally connected to networked computer 20. Key reader 40 may be operationally connected to a separate computing device.

In embodiments, reassembled keys may be input directly into a networked computer 20, which may then be used to access one or more digital wallets and/or perform one or more transactions. Key reader 40 and/or corresponding software (e.g., running on a computer operationally connected to the key reader) may be programmed or otherwise designed to assemble key segments into completed keys. Key reader 40 and/or corresponding software (e.g., running on a computer operationally connected to the key reader) may also correlate the private keys with their corresponding public keys, optionally using the reference number master list. In embodiments, one or more pieces of software may be used to retrieve, decrypt, assemble, and/or decipher keys and/or key segments. In embodiments, such software may be run on any of one or more secure storage system computers and/or user devices. In embodiments, multiple authority may be required to initiated a retrieval of stored private keys.

Figure 4B:
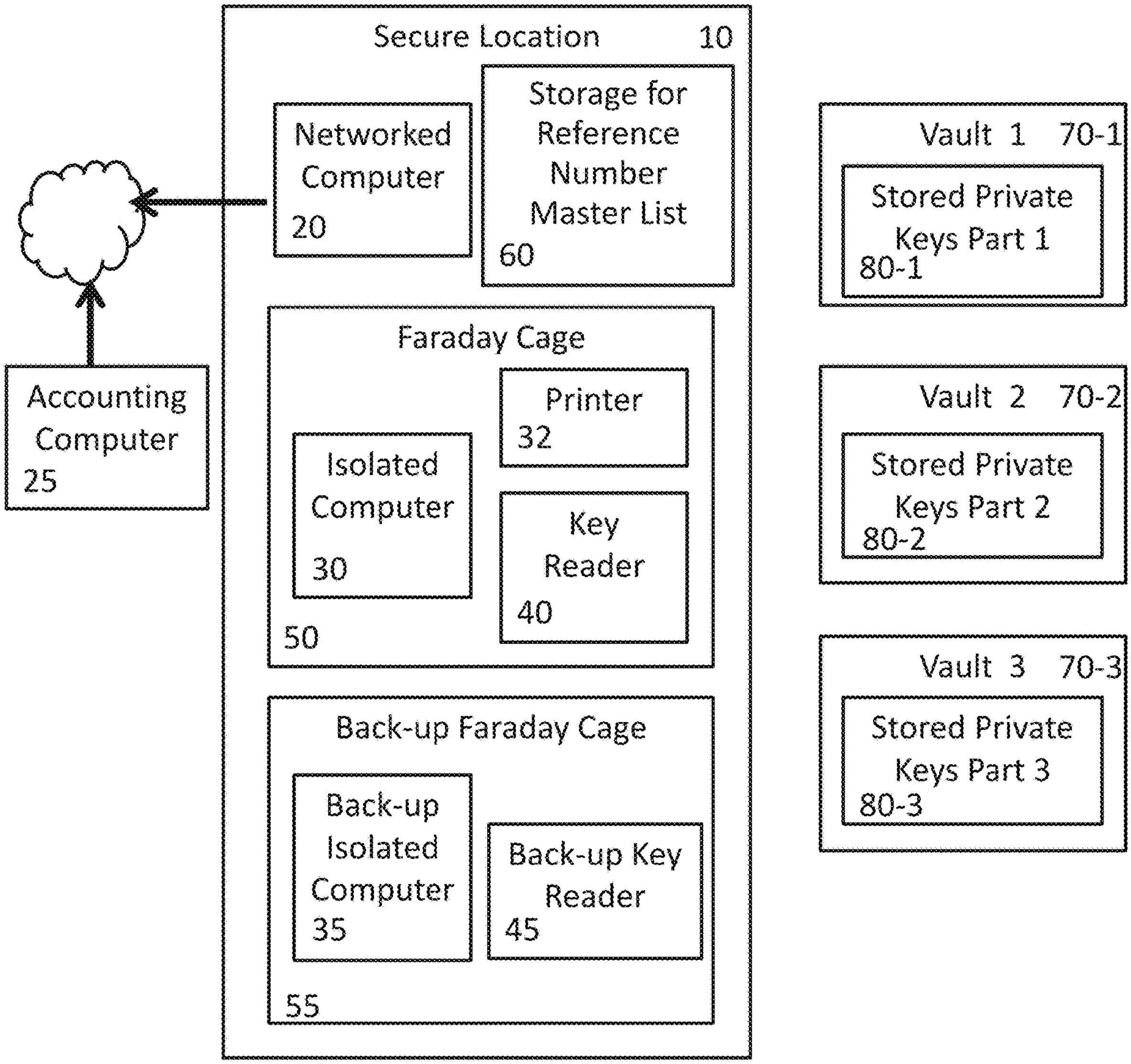
Figure 4C:
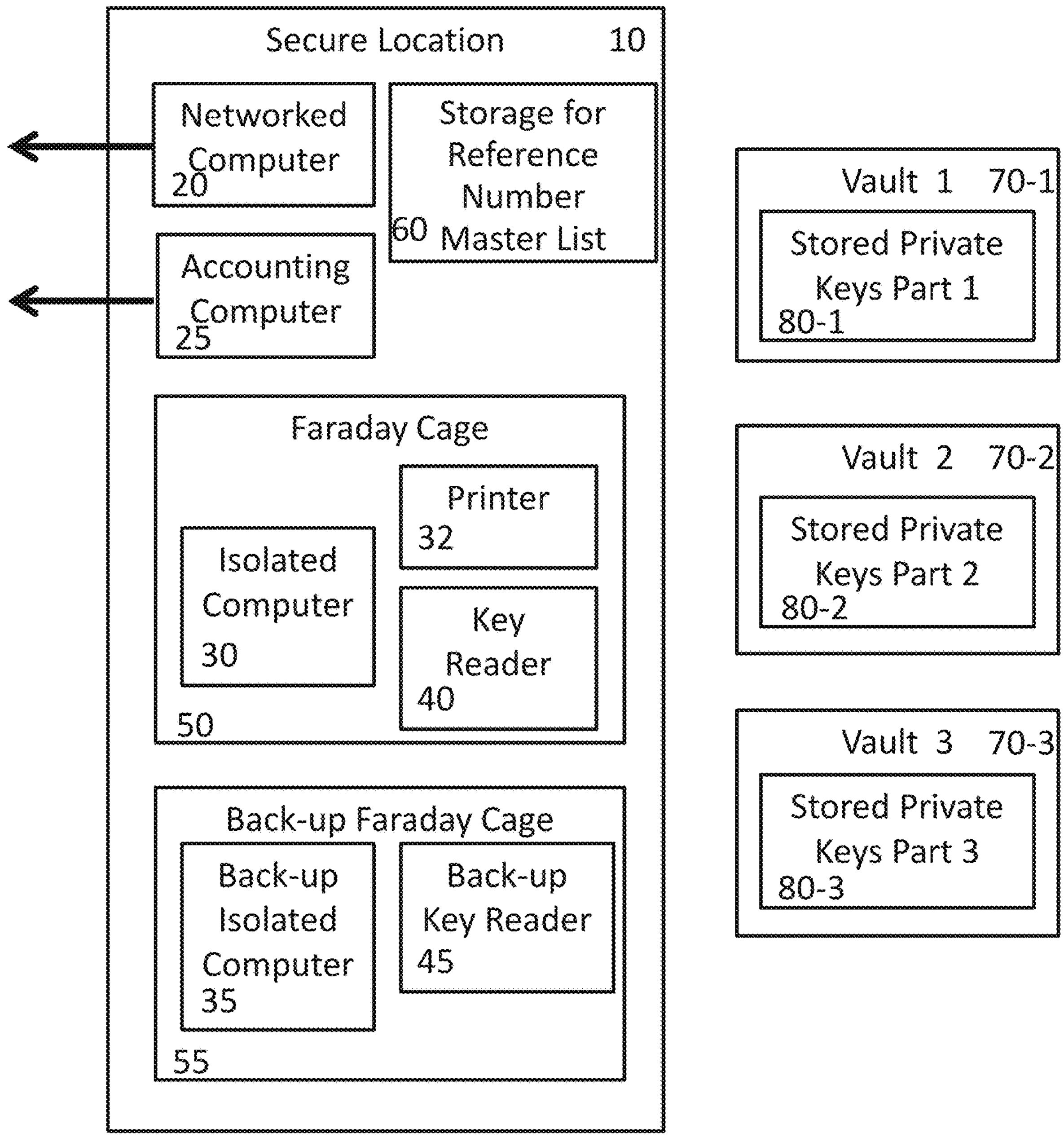

In embodiments, a back-up isolated computer 35 and/or a back-up key reader 45 may be provided at secure location 10, as illustrated in FIGS. 4A-4C. The back-up isolated computer 35 and key reader 45 may be contained in a back-up Faraday cage 55, which may be separate from main Faraday cage 50. In embodiments, all or part of the administrative portal may be duplicated and/or backed up. A duplicate administrative portal or portion thereof may be located in a separate geographic area. A duplicate portal may serve as a disaster recovery operations portal.

In embodiments, a digital math-based asset miner, such as a bitcoin miner, may be located at or within the administrative portal. The miner may be one or more computers. In embodiments, the miner may be operationally connected to any of the computers and/or devices at the administrative portal described above.

Figure 4D:
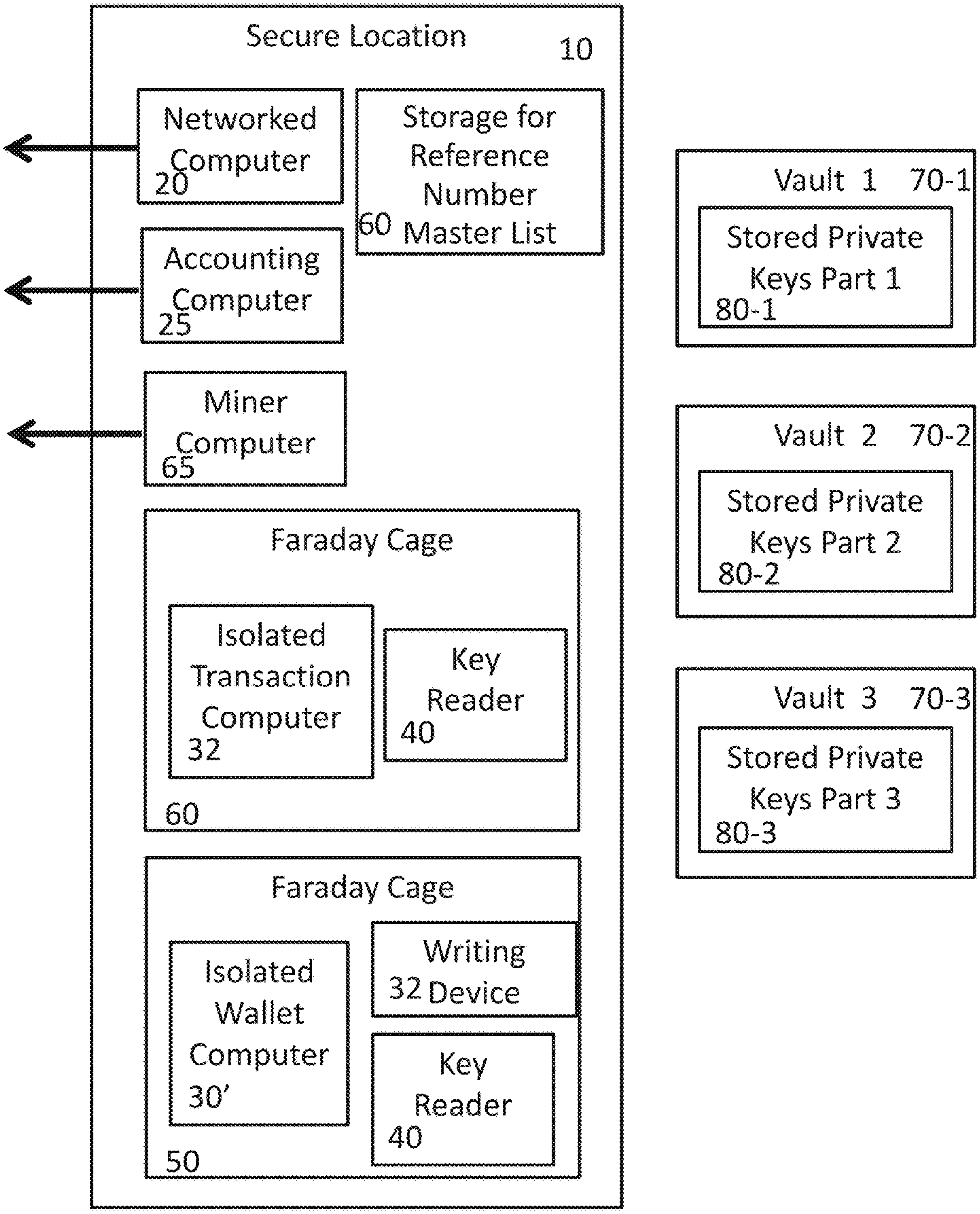

In embodiments, referring to FIG. 4D, the secure location can house one or more networked computers 20, one or more accounting computers 25, one or more digital asset miner computers 65, one or more isolated transaction computers 32 operatively connected to one or more key readers 40, and one or more isolated wallet computers 30', operatively connected to one or more writing devices 32 and, in embodiments, to one or more key readers 40. Each isolated transaction computer 60 and/or isolated wallet computer 30' may be isolated from each other and/or other computers electronically using a secure environment, such as a Faraday cage 50, 60.

One or more vaults 70, 70-1, 70-2, 70-3, 70-N, may be used to hold assets. Vaults may be any secure storage facilities, structures, and/or systems. For example, a vault may be a bank vault or a safety deposit box. Vaults may have appropriately controlled environments (e.g., regulated temperature and/or humidity, to name a few) to enable long-term storage of keys and/or key segments substrates. Vaults may be operated by one or more entities, which may be separate entities. In embodiments, only bonded employees may be permitted access to the vaults. Also, vaults may be located in one or more physical (e.g., geographic) and/or digital (e.g., residing on one or more separate computer servers or hard drives) locations. In embodiments, vaults may be used in conjunction with digital wallets and/or other devices and/or systems known in the art for storing digital assets and/or data.

In the exemplary embodiments of FIGS. 4A-D, the private keys 80 may be divided into three segments, 80-1, 80-2, and 80-3 for storage. Each segment may be stored in a separate one of vaults 70-1, 70-2, and 70-3. In embodiments, two segments, four segments, five segments or another number of segments can be used in accordance with embodiments the present invention. In embodiments, each key segment may be stored in a vault operated by the same entity or by one or more different entities.

In embodiments, one or more duplicate copies of each key or key segment may be produced. Such duplicate copies may be stored in separate vaults, e.g., three sets of keys split into three segments may be stored in nine vaults, four sets of keys split into two segments may be stored in eight vaults, and/or the copies of key segments may be distributed among some other number of vaults, to name a few. See, e.g., FIGS. 9A-9D, to name a few. Duplicate copies may serve as a back-up in case one copy of a key or key segment becomes corrupted, lost, or otherwise unreadable.

In embodiments, vaults may hold the keys in an organized or categorized fashion so as to facilitate location of one or more keys or key segments. In embodiments, a sorting reference number may be used to organize the keys or key segments. The sorting reference number may be the same as the reference number that correlates private and public keys. In embodiments, etched coins or other materials or printed keys or key segments may be stacked or otherwise arranged according to the reference number. In embodiments, an index or card catalog may describe the location of the keys. In embodiments, an automated machine may store and retrieve key segments from storage slots, which machine may receive an input to indicate which keys or key segments to retrieve.

Figure 36A:
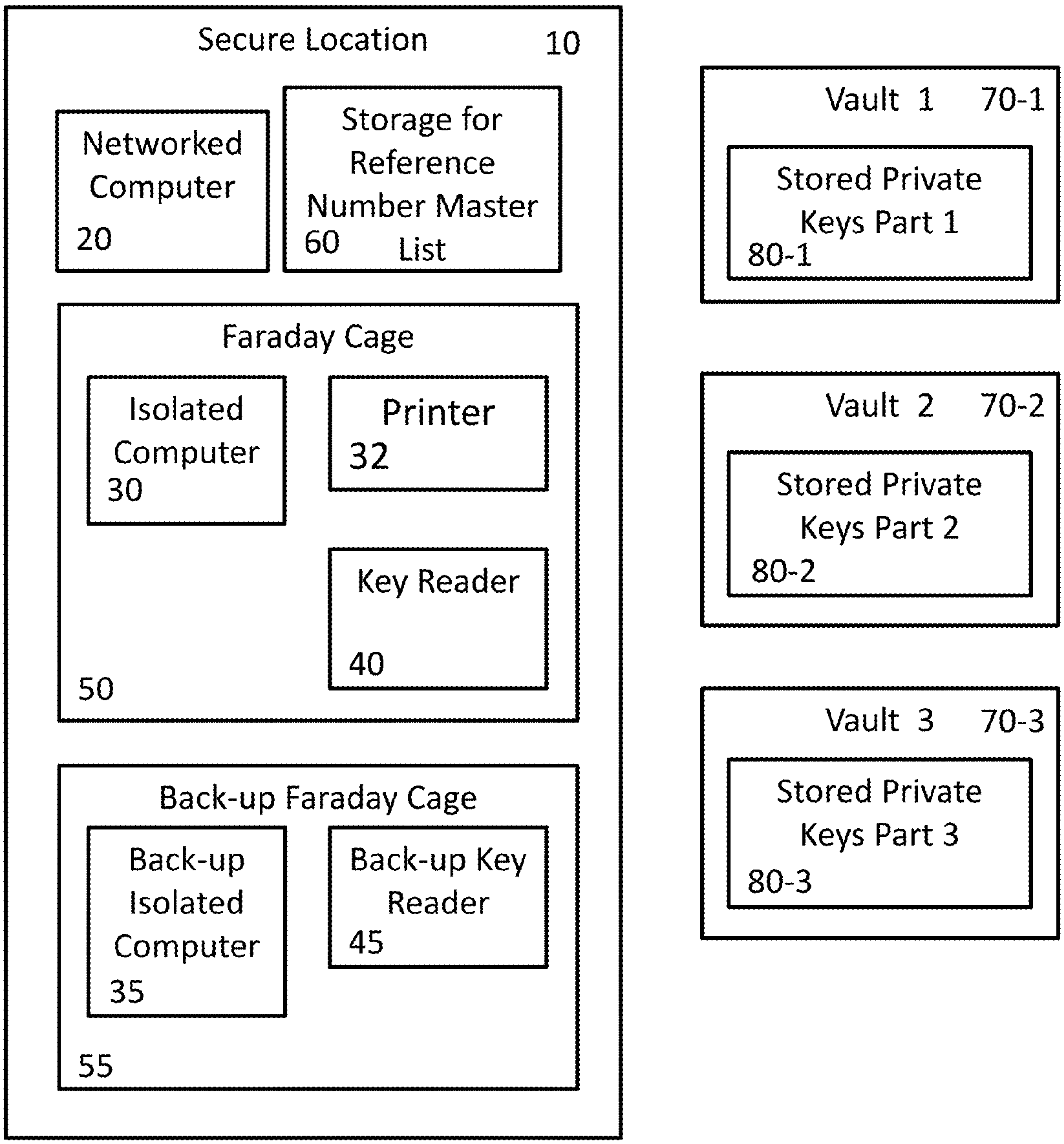
FIGS. 36A-D are exemplary block diagrams of components of security systems for an exchange holding digital math-based assets in accordance with various exemplary embodiments of the present invention.
Figure 36B:
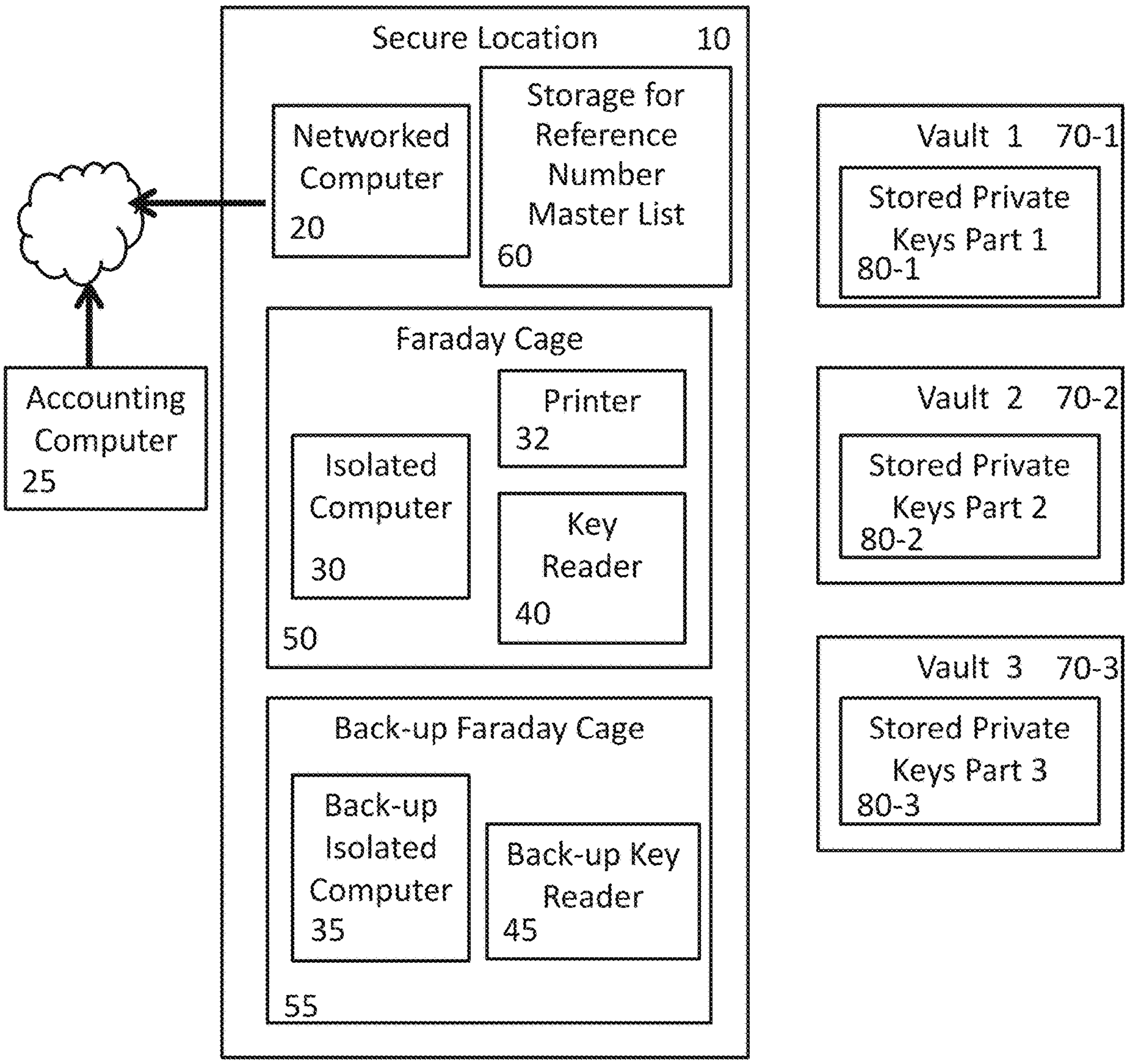
Figure 36C:
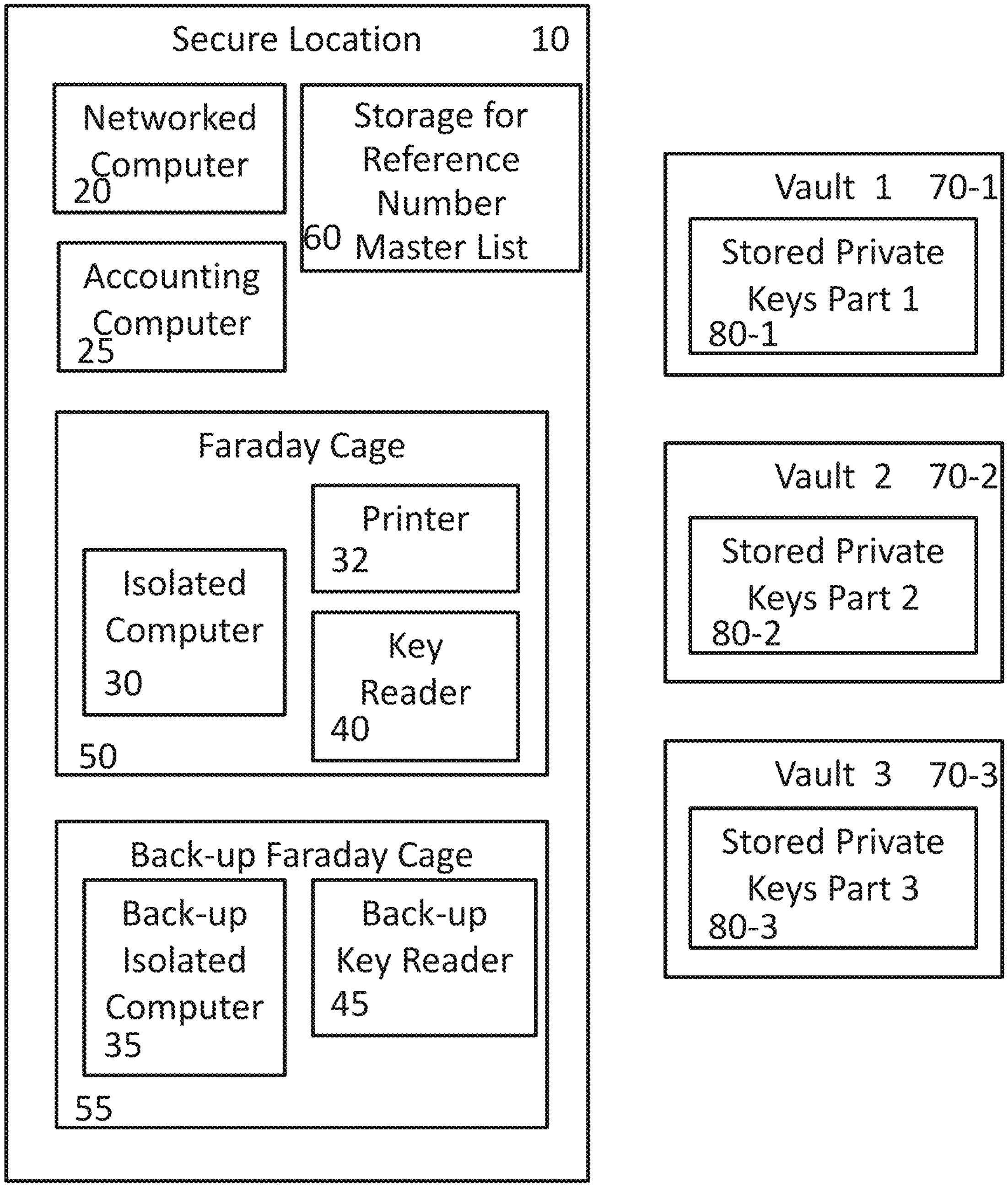

FIGS. 36B and 36C illustrate exemplary embodiments of the present invention where one or more computers 25 running accounting software to account for the assets and/or expenses of an account holder can be located either within the secure location 10 (e.g., FIG. 36B) or outside of the secure location 10 (e.g., FIG. 36C). In embodiments, such accounting software as well as possibly other software may be stored, accessed and/or operated on one or more networked computers 20 in the secure location 10. In embodiments, the accounting computer 25 may be the same or different from isolated computer 30 and/or networked computer 20 and/or a mining computer.

Digital Wallets

In embodiments, digital math-based assets can be stored and/or transferred using either a website or software, such as downloaded software. The website and/or downloadable software may comprise and/or provide access to a digital wallet. Each digital wallet can have one or more individual digital asset accounts (e.g., digital asset addresses) associated with it. Each user can have one or more digital wallets to store digital math-based assets, digital crypto-currency, assets and the like and/or perform transactions involving those currencies or assets. In embodiments, service providers can provide services that are tied to a user's individual account.

Digital wallets and/or the digital asset accounts associated with and/or stored by a digital wallet may be accessed using the private key (which may be used in conjunction with a public key or variant thereof). Accordingly, the generation, access, use, and storage of digital asset accounts is described herein with respect to generation, access, use, and storage of digital wallets. Such descriptions are intended to be representative of digital asset accounts and not exclusive thereof.

A digital wallet can be generated using a digital asset client 110 (e.g., a Bitcoin client). In embodiments, a digital wallet can be created using a key pair system, such as an asymmetric key pair like a public key and a private key. The public key can be shared with others to designate the address of a user's individual account and/or can be used by registries and/or others to track digital math-based asset transactions involving a digital asset account associated with the digital wallet. Such transactions may be listed or otherwise identified by the digital wallet. The public key may be used to designate a recipient of a digital asset transaction. A corresponding private key can be held by the account holder in secret to access the digital wallet and perform transactions. In embodiments, a private key may be a 256-bit number, which can be represented by a 64-character hexadecimal private key and/or a 51-character base-58 private key. As discussed herein, private keys of other lengths and/or based on other numbering systems can be used, depending upon the user's desire to maintain a certain level of security and convenience. Other forms of key pairs, or security measures can be used consistent with embodiments of the present invention.

In embodiments, a digital wallet may store one or more private keys or one or more key pairs which may correspond to one or more digital asset accounts.

In embodiments, a digital wallet may be a computer software wallet, which may be installed on a computer. The user of a computer software wallet may be responsible for performing backups of the wallet, e.g., to protect against loss or destruction, particularly of the private and/or public key. In embodiments, a digital wallet may be a mobile wallet, which may operate on a mobile device (e.g., mobile phone, smart phone, cell phone, iPod Touch, PDA, tablet, portable computer, to name a few). In embodiments, a digital wallet may be a website wallet or a web wallet. A user of a web wallet may not be required to perform backups, as the web wallet may be responsible for storage of digital assets. Different wallet clients may be provided, which may offer different performance and/or features in terms of, e.g., security, backup options, connectivity to banks or digital asset exchanges, user interface, and/or speed, to name a few.

Figure 28C:
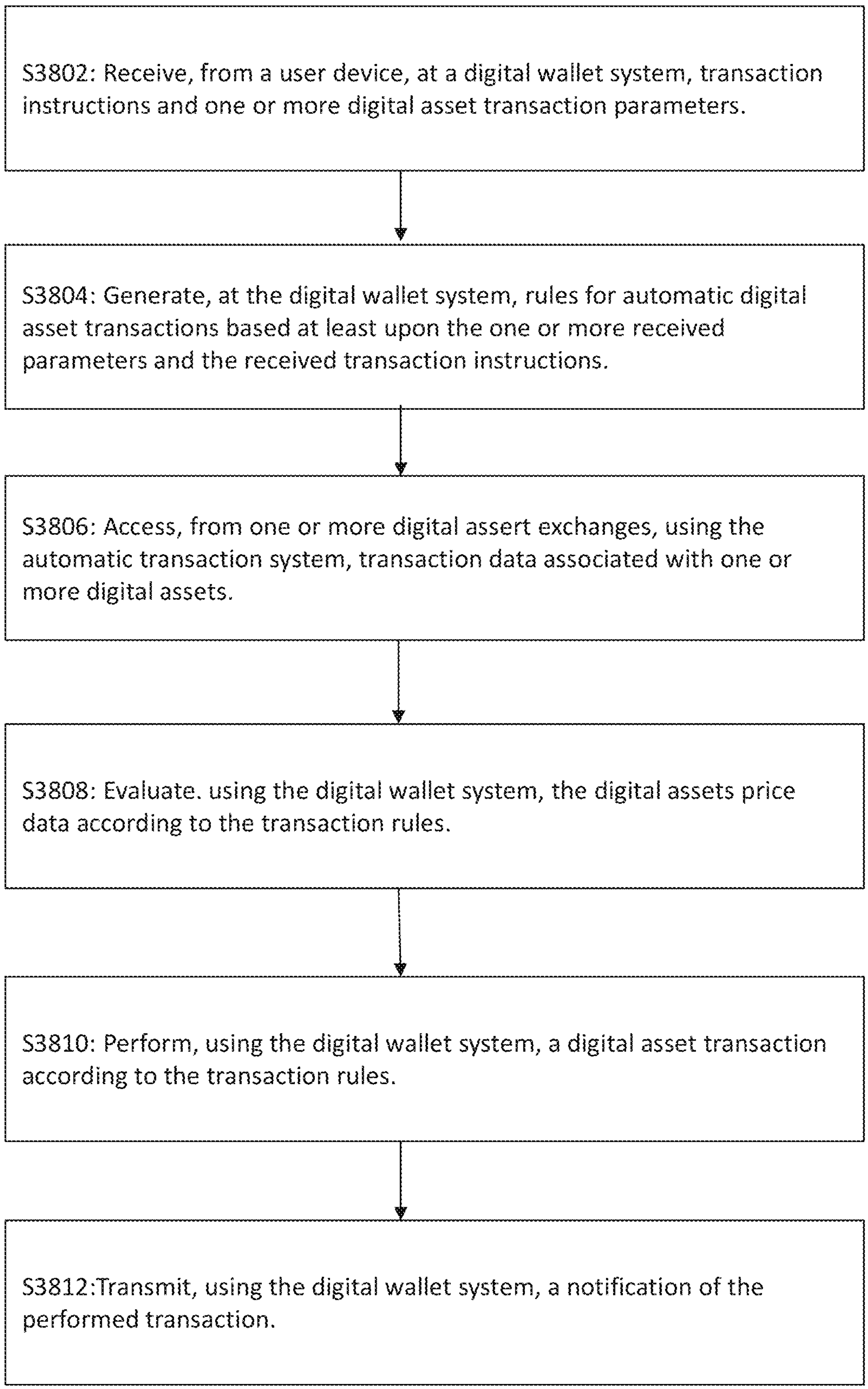
FIG. 28C is an exemplary flow chart for a process for converting from, to or between digital assets in accordance with exemplary embodiments of the present invention.

The digital asset exchange computer system 3230 may be used to convert digital assets into fiat or other digital assets as well as to exchange fiat for digital assets. In embodiments, a digital asset exchange computer system 3230 may include one or more databases that are used to store user account authentication data, fiat account data, digital wallet data, digital asset customer account data and transaction data, including transaction parameters and transaction instructions. A digital wallet system is operatively connected to a decentralized digital asset network that uses a decentralized electronic ledger in the form of a blockchain maintained by a plurality of physically remote computer systems to track at least one of asset ownership or transactions in a digital asset exchange system. The digital wallet system includes one or more digital wallet modules. FIG. 28C illustrates an exemplary process by which the digital exchange computer system including the digital wallet system conducts transactions. The digital wallet system receives, from a user device, transaction instructions and one or more transaction parameters associated with a transaction as indicated in step S3802. In embodiments, the transactions parameters include on or more of (1) a digital asset strike price as a threshold for sale of a specified amount of digital assets when the price equals, rises above or falls below a predefined threshold, wherein the amount of digital assets to transact may be specified in a different denomination; (2) digital asset denominations; (3) digital asset amounts; (4) time periods; (5) rates of change; or (6) absolute amounts of change. The transaction instructions include at least one of the following (1) buy; (2) sell; (3) hold; or (4) convert to a different denomination of digital asset or fiat currency.

In embodiments, the digital wallet system generates transaction rules for automatic digital asset transactions based at least the one or more received transaction parameters and the received transaction instructions as indicated at step S3804. The transaction rule include computer code running on the one or more computers to perform a transaction when one or more specified conditions are met or not met, based on the rules.

In embodiments, the digital wallet system accesses transaction data including price data associated with the specified amount of digital assets and stores the transaction data in the one or more databases as indicated in step S3806. In an embodiment the digital wallet system may access the transaction data using an application programming interface of an exchange agent. At step S3808, the digital wallet system evaluates the price data according to the transaction rules and, at step S3810, performs automated transactions when pre-defined conditions are met or not met in accordance with the transaction rules and the price data. This evaluation may include testing the transaction data against one or more logical conditions embodied in the transaction rules. In embodiments, these logical conditions include determining at least one of whether the digital asset price has reached or crossed a threshold value; or whether a rate of change in price has reached or crossed a threshold value. The digital wallet system may format the transaction data to be compatible with the digital wallet system.

In embodiments, at step S3812, the digital wallet system may generate one or more notifications to one or more user devices, with the notices includes at least one of a status update on transactions; notification of at least one of incomplete, pending or failed transactions; a log of all transactions as performed by at least one of the digital wallet system or by a user and a log of all transaction opportunities, including transactions declined or not otherwise authorized and transmits the one or more notifications to the user devices.

The digital asset exchange computer system also includes a fund transfer system including a fiat account funding and redemption system, a digital asset account funding and redemption system operatively connected to the digital wallet system and operatively connected to the decentralized digital asset network and a settlement engine operatively connected to the decentralized digital asset network and configured to carry out transactions. The settlement engine may be configured to process specified customer transactions to purchase or sell digital assets according to a user's instructions, if certain user specified factors are met. The user specified factors include that at least one of digital assets are: (a) within a given price, (b) quantity, or (c) period of time. In embodiments, the settlement engine may perform steps of holding, by the digital asset exchange computer system, funds in escrow until a buyer's payment of fiat is received into a bank account; receiving, by the digital asset exchange computer system from a digital asset buyer device, a notification of received digital assets from a digital asset seller; and providing, by the digital asset exchange computer system to a bank computer system associated with a digital asset exchange bank, n instruction to release the digital asset buyer's funds to the digital asset seller. The settlement engine may include pre-program instructions to transfer an amount of digital assets from a seller wallet to at least one buyer wallet upon the occurrence of user specified conditions.

In embodiments, the transaction may be at least one of formation, buying and selling of derivative products, including call options and put options. In embodiments, the transaction may be at least one or more of digital asset lending, delayed settlements, derivative swaps, futures and forwards.

In embodiments, the digital asset account funding and redemption system is configured to process funding of a digital asset account held by the exchange from an exchange customer by receiving, by the digital asset exchange computer system, an initial transfer of digital assets; receiving, by the digital asset exchange computer system, a confirmation of clearance of the digital asset transfer; and updating, by the digital asset exchange computer system, an existing customer account in the one more or more databases with the received digital assets including making an electronic entry in an exchange digital asset electronic ledger and providing a notification that digital assets are received.

In embodiments, the digital asset account funding and redemption system is configured to process withdrawing a digital asset account held by the exchange from an exchange customer. For example, the digital asset account funding and redemption system may provide a withdrawal interface to a first customer user device associated with a first customer, receive user first withdrawal data including at least a first destination wallet address and a first request digital wallet asset withdrawal amount value from the first customer user device, verify that the first digital asset account associated with the first customer contains sufficient digital assets to cover the requested withdrawal amount by reading a digital asset electronic ledger to determine a first digital asset account balance; update the exchange digital asset electronic ledger to reflect the first withdrawal data as pending, execute a first withdrawal based on the first withdrawal data by broadcasting the first withdrawal to a digital asset network electronic ledger, monitor the network digital asset ledger to determine that a transaction based on the first withdrawal is confirmed and update the digital asset ledger to reflect confirmation of the first withdrawal. In embodiments, the digital wallet system may request authority from a user to proceed with the automated transactions before executing the automated transactions. In embodiments, the digital wallet system may require receipt of a user's authorization before performing a transaction by at least one of telephone dialing a number and entering specified digits, text message, email, or via a computer application or a user's mobile wallet. In embodiments the digital wallet system will automatically perform the transaction if no response is received within a predetermined amount of time set by a user in advance or by default.

The digital asset exchange computer system may also include a fraud analysis system configured to detect fraudulent and/or unauthorized transactions.

In embodiments, the digital math-based asset is bitcoin. In embodiments, the digital math-based asset is based on a mathematical protocol for proof of work. The mathematical protocol may be open source. In embodiments, the mathematical protocol includes a one-way cryptographic algorithm. In embodiments, the mathematical protocol includes a sequential hard memory function. The digital math-based asset may be based on a mathematical protocol for proof of stake and is open source. In embodiments, the digital math-based asset is based on a cryptographic mathematical protocol. The digital math-based asset may be based on a mathematical protocol for a hybrid of proof of work and proof of stake. The digital math-based asset may be based on a mathematical protocol for proof of stake velocity. The mathematical protocol may rely upon ownership of respective digital math-based asset as a function of duration of ownership. The digital math-based asset may be based on a mathematical protocol for proof of burn.

In embodiments, a number of digital math-based assets in the decentralized digital assert network is limited. In embodiments, a number of digital math-based assets in the decentralized digital assert network is not limited. A specified number of digital math-based assets in the decentralized digital asset network may be added into circulation during a defined time period.

In embodiments, the digital wallet is activated by a private key, which is mathematically related to a public address in a one-way function. In embodiments, the digital wallet includes a multi-signature account which requires a plurality of private keys to access the digital assets held by the multi-signature account. In embodiments, more keys are generated for the multi-signature account than are required to access and/or use an account.

Figure 36D:
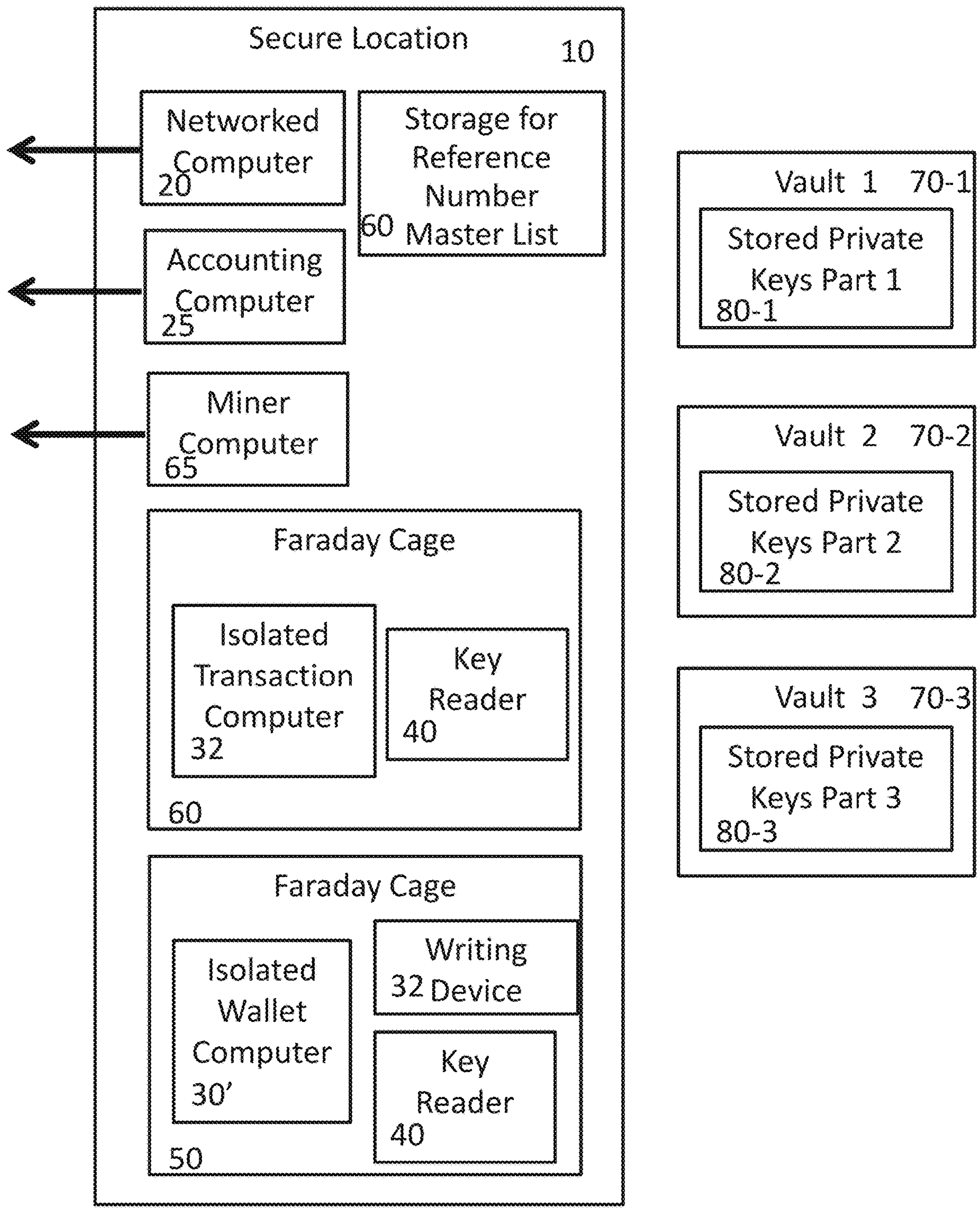

In embodiments, an accounting computer 25 may be a hardware security module, which may comprise hardware (e.g., one or more processors, computer-readable memory, communications portals, and/or input devices, to name a few) and/or software (e.g., software code designed to verify transactions, flag potentially erroneous transactions, and/or stop potentially erroneous or unauthorized transactions). Such a device may verify spending transactions before the transactions are executed. A hardware security module may flag transactions for review (e.g., by portal administrators), before the transactions may be confirmed. A hardware security module may be an offline device, which may be given a daily account activity log (e.g., a log of exchange withdrawals, deposits, exchange transactions (e.g., purchases and sales), purchase order receipts, and/or sell order receipts, to name a few) to determine whether proposed transactions, particularly spending transactions, are valid. A protocol for identifying owners of a digital wallet may be used to verify that spending transactions will deliver the correct amount of assets to the correct address. In embodiments, a quorum of a specified size may be required to override a hardware security module. In embodiments, a transaction may be processed using both an isolated and a networked computer, as discussed herein. Such a transaction may be performed using an air-gapped digital wallet, such as described in the context of FIG. 36D, and isolated wallet computer 30' within faraday cage 50 or the isolated transaction computer 32 in faraday cage 60 which are air gapped from network computer 20. In embodiments, an unsigned transaction may be performed on a networked computer, which may only contain one or more wallets capable of watching transactions and/or performing unsigned transactions. A non-networked, isolated computer may contain one or more complete wallets, which may be used to sign transactions. The transaction may be transferred to the isolated computer for signing. Hence, an air gap or other lack of a required communication connection may exist between the isolated and networked computer. In embodiments, the unsigned transaction data may be transferred manually, such as by saving the data from the networked computer to a removable storage medium (e.g., a USB flash drive, CD, CD-ROM, DVD, removable hard drive, disk, memory card, to name a few), and inputting or otherwise operatively connecting the storage medium to the isolated computer. The isolated computer may then access and sign the transaction data. The signed transaction data may then be transferred back to the networked computer using the same or different method of transfer as used for the unsigned transaction data. The networked computer may then access and upload, distribute, or otherwise act on the signed transaction data to complete the transaction. In embodiments, the isolated computer may generate and sign (e.g., with a private key) transaction instructions, which may then be transferred to the networked computer for distribution to the digital asset network. In embodiments, the networked computer and the isolated computer may be operatively connected, e.g., using a wired connection (e.g., a USB cable, Ethernet cable, Laplink cable, to name a few) or using a wireless connection (e.g., Bluetooth, Wi-Fi, infrared, radio, to name a few). Such operative connection may replace the manual transfer of transaction data between the computers, and in embodiments, security measures, such as firewalls or automated separable physical connector devices (e.g., controlled from the isolated computer), may be employed to protect against unauthorized access, particularly to the isolated computer. "Air gap, air wall or air gapping" is a network security measure employed on one or more computers to ensure that a secure computer network is physically isolated from unsecured networks, such as the public Internet or an unsecured local area network. The name arises from the technique of creating a network that is physically separated (with a conceptual air gap) from all other networks. To prevent unauthorized data extrusion through electromagnetic or electronic exploits, there is often a specified amount of space between the air gapped system and outside walls and between its wires and the wires for other technical equipment. For a system with extremely sensitive data (such as a private key of a digital asset account), as explained previously, a Faraday cage can be used to prevent electromagnetic radiation (EMR) escaping from the air-gapped equipment.

Figure 5A:
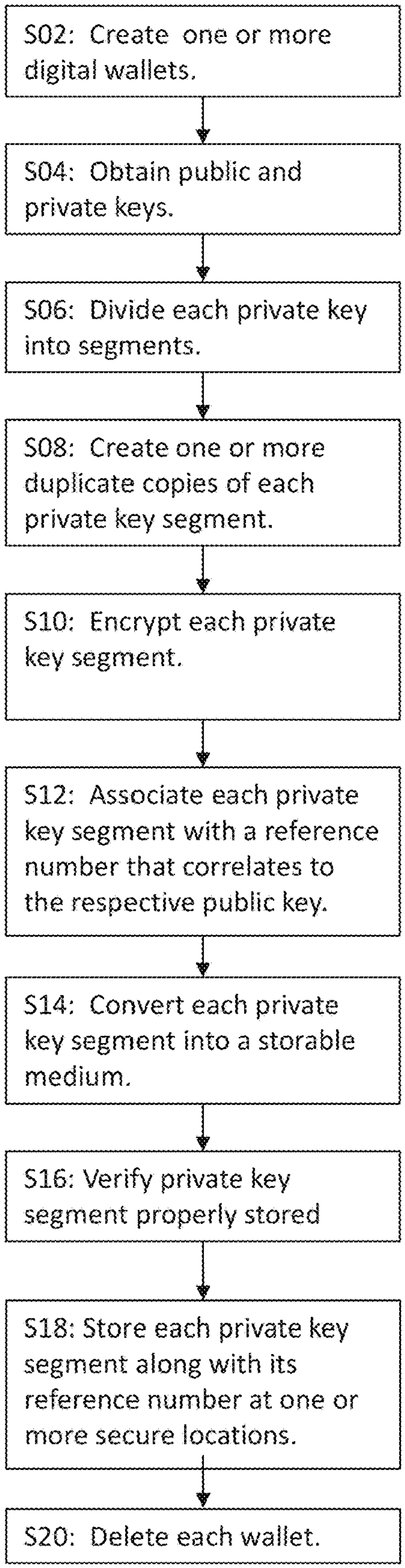
FIGS. 5A and 5B are flow charts of exemplary processes for creating and securing digital wallets in accordance with exemplary embodiments of the present invention.
Figure 5B:
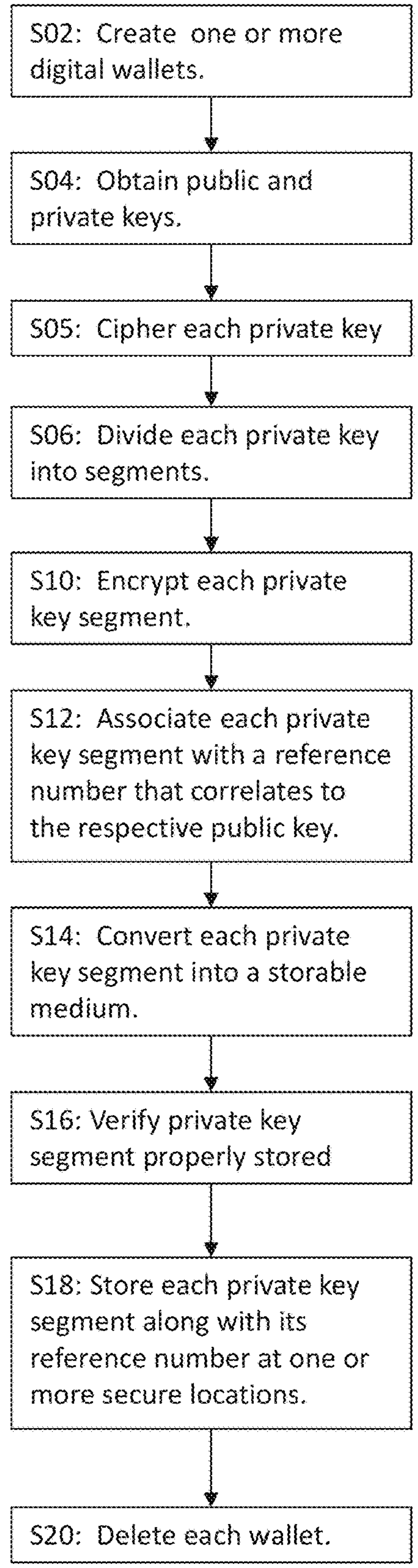

FIG. 5A illustrates an exemplary embodiment of a process for creating digital wallets and storing their keys. In a step S02 one or more digital wallets may be created using one or more isolated wallet computers 30'. In a step S04, the public and private keys associated with the created digital wallets may be obtained using one or more isolated wallet computers 30'. In embodiments, referring to FIG. 5B, in a step S05 each private key may be ciphered. In a step S06, each private key, which may be a ciphered private key following step S05, may be divided into segments. In a step S08, one or more duplicate copies of each private key segment may be created. In some embodiments, the private key may be divided into 2, 3, 4 or more segments. In embodiments, each private key segment may be encrypted or otherwise encoded in a step S10. In embodiments, steps S08 and/or S10 may be skipped. In a step S12, each private key segment may be associated with a reference number, correlating the private key segment to the respective public key and/or indicating the order of the private key segment within the complete key. In a step S14, each encrypted private key segment may be converted to a storable medium, such as by printing each private key segment on paper. In a step S16, the private key segment as converted in the storable medium (e.g., printed) is verified to confirm it was properly and retrievable stored. In embodiments, this step may be skipped. In a step S18, each private key segment is stored along with its reference number at one or more secure locations. In a step S20, each digital wallet is deleted, leaving the stored keys as a means to regenerate the wallets.

Figure 6A:
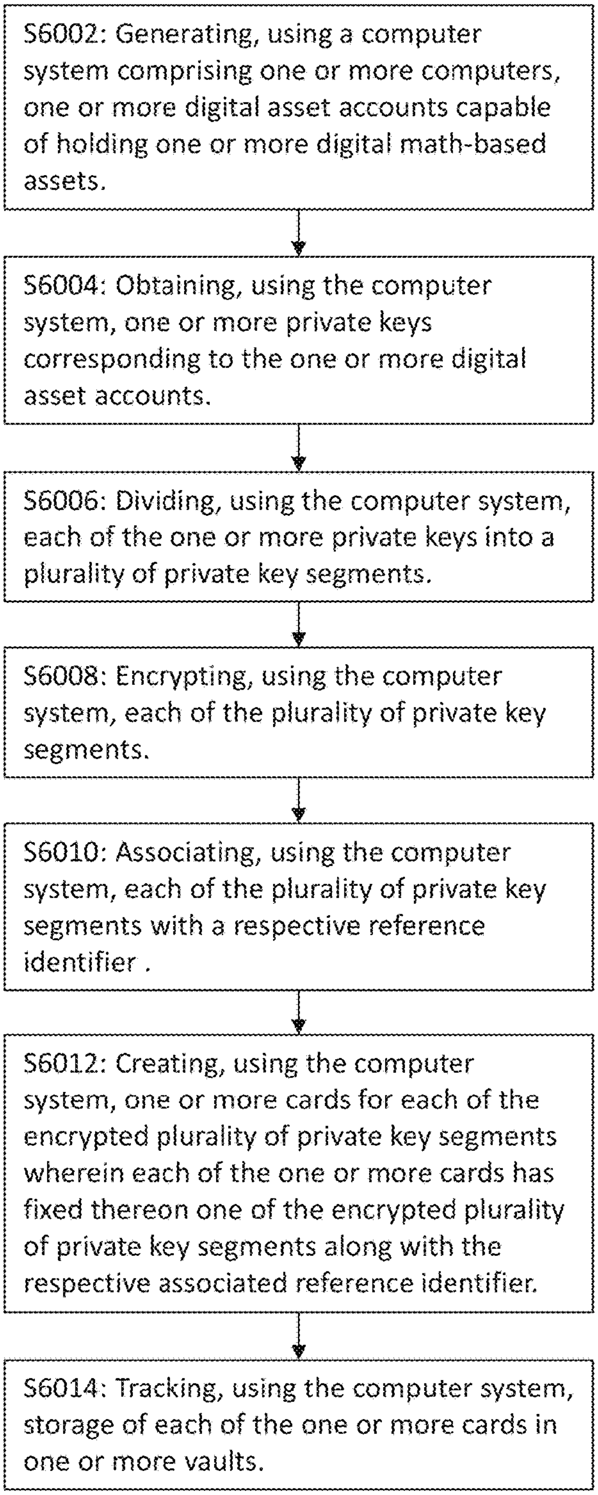
FIGS. 6A-6D are flow charts of exemplary processes for generating digital asset accounts and securely storing the keys corresponding to each account in accordance with exemplary embodiments of the present invention.

FIG. 6A is a flow chart of a process for generating digital asset accounts and securely storing the keys corresponding to each account. In embodiments, the process may be performed using one or more isolated computers not connected to any external data networks. The isolated computer may comprise a clean copy of an operating system (e.g., a clean boot) stored in computer-readable memory and running on one or more processors.

In a step S6002, a computer system comprising one or more computers may be used to generate one or more digital asset accounts capable of holding one or more digital math-based assets. In embodiments, such accounts may be associated with digital asset ownership and/or possession without physically holding a digital asset in any location. A digital asset software client, which may comprise part of a digital wallet or may be accessed using a digital wallet, may be used to generate the digital asset accounts.

In a step S6004, the computer system may be used to obtain one or more private keys corresponding to the one or more digital asset accounts. In embodiments, the private keys may be generated as part of the digital asset account creation process.

In a step S6006, the computer system may be used to divide each of the one or more private keys into a plurality of private key segments. In embodiments, such as with a multi-signature wallet, at least one private key for each digital asset account may be divided into private key segments.

In a step S6008, the one or more computers may be used to encrypt each of the plurality of private key segments. Encryption can comprise any of the techniques described herein, such as character substitution, scrambling, mapping, and/or hashing, to name a few. The computer system can apply one or more algorithms to perform the encryption. Symmetric and or asymmetric encryption algorithms may be applied.

In a step S6010, the one or more computers may be used to generate and/or associate each of the plurality of private key segments with a respective reference identifier. A reference identifier may be a number, alphanumeric sequence, or other unique sequence that can be used to identify key segments, which may be used for storage and/or retrieval of key segments. The reference identifier for each key segment may be stored on a reference identifier master list, which may be stored electronically and/or on a physical substrate. The reference identifier master list may associate with each other the reference identifiers for key segments corresponding to the same key, and/or may also associate a digital asset account identifier (e.g., a public key or public address) with the key segments.

In a step S6012, the one or more computers may be used to create one or more cards for each of the encrypted plurality of private key segments. Each card may have fixed thereon one of the encrypted plurality of private key segments along with the respective associated reference identifier. The cards may be paper, such as index cards, 8½ in.×11 in. sheets of paper, or other paper products. In other embodiments, the cards may include plastic or metal. The cards may be laminated. A writing device may fix the key segments and reference identifiers to the cards by techniques such as printing, etching, and/or magnetically encoding, to name a few. A scanable code, such as a bar code or QR code, may be used to write the keys to the cards.

In embodiments, collated sets of cards may be produced for a plurality of digital asset accounts. Each set may contain only one card per private key such that the private key segments for a single private key are divided among different sets of cards.

In embodiments, following creation of the one or more cards, quality control steps can be performed. A reading device may be used to read each of the cards to ensure readability.

In a step S6014, the one or more computers may be used to track storage of each of the one or more cards in one or more vaults. Vaults may be geographically remote. Vaults can include bank vaults and/or precious metal vaults. In embodiments, a main set of vaults and one or more sets of backup vaults may be used. A main set of vaults can be located in a geographically proximate area, such as a metropolitan area of a city, while backup sets of vaults may be located in geographically remote areas. The backup vaults may contain duplicate copies of the cards. Vault locations for each card or set of cards may be included on the reference identifier master list.

In embodiments, the process can further include receiving at the computer system a quantity of digital math-based assets, and storing those digital assets in the one or more securely stored digital asset accounts. In embodiments, storing the digital asset can comprise transferring the digital assets into accounts with securely stored private keys. Accordingly, storing can comprise generating electronic transfer instructions for an electronic transfer of the quantity of digital math-based assets to the one or more digital asset accounts and broadcasting the electronic transfer instructions to a decentralized electronic ledger maintained by a plurality of physically remote computer systems.

Figure 6B:
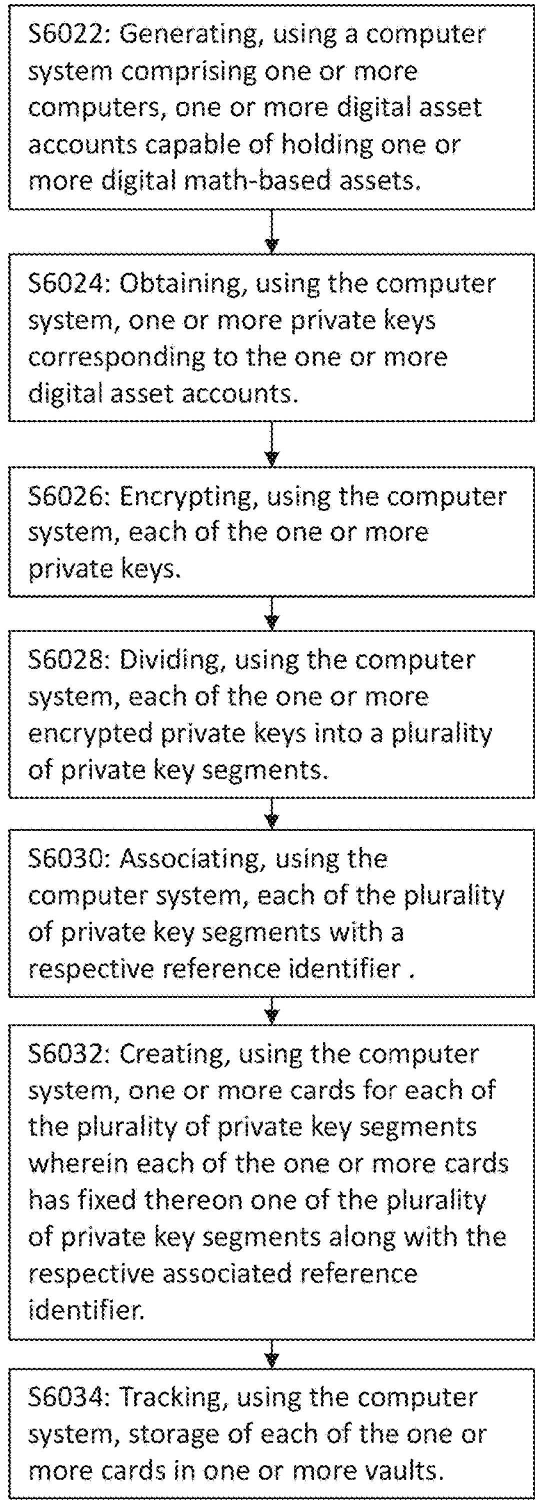

FIG. 6B is a flow chart of another exemplary process for generating digital asset accounts and securely storing the keys corresponding to each account.

In a step S6022, a computer system comprising one or more computers may be used to generate one or more digital asset accounts capable of holding one or more digital math-based assets, as described with respect to step S6002 of FIG. 6A.

In a step S6024, the computer system may be used to obtain one or more private keys corresponding to the one or more digital asset accounts, as described with respect to step S6004 of FIG. 6A.

In a step S6026, the computer system may be used to encrypt each of the one or more private keys.

After encryption, in a step S6028, the computer system may be used to divide each of the encrypted private keys into a plurality of key segments.

In a step S6030, the one or more computers may be used to generate and/or associate each of the plurality of private key segments with a respective reference identifier.

In a step S6032, the one or more computers may be used to create one or more cards for each of the plurality of private key segments.

In a step S6034, the one or more computers may be used to track storage of each of the one or more cards in one or more vaults.

Figure 6C:
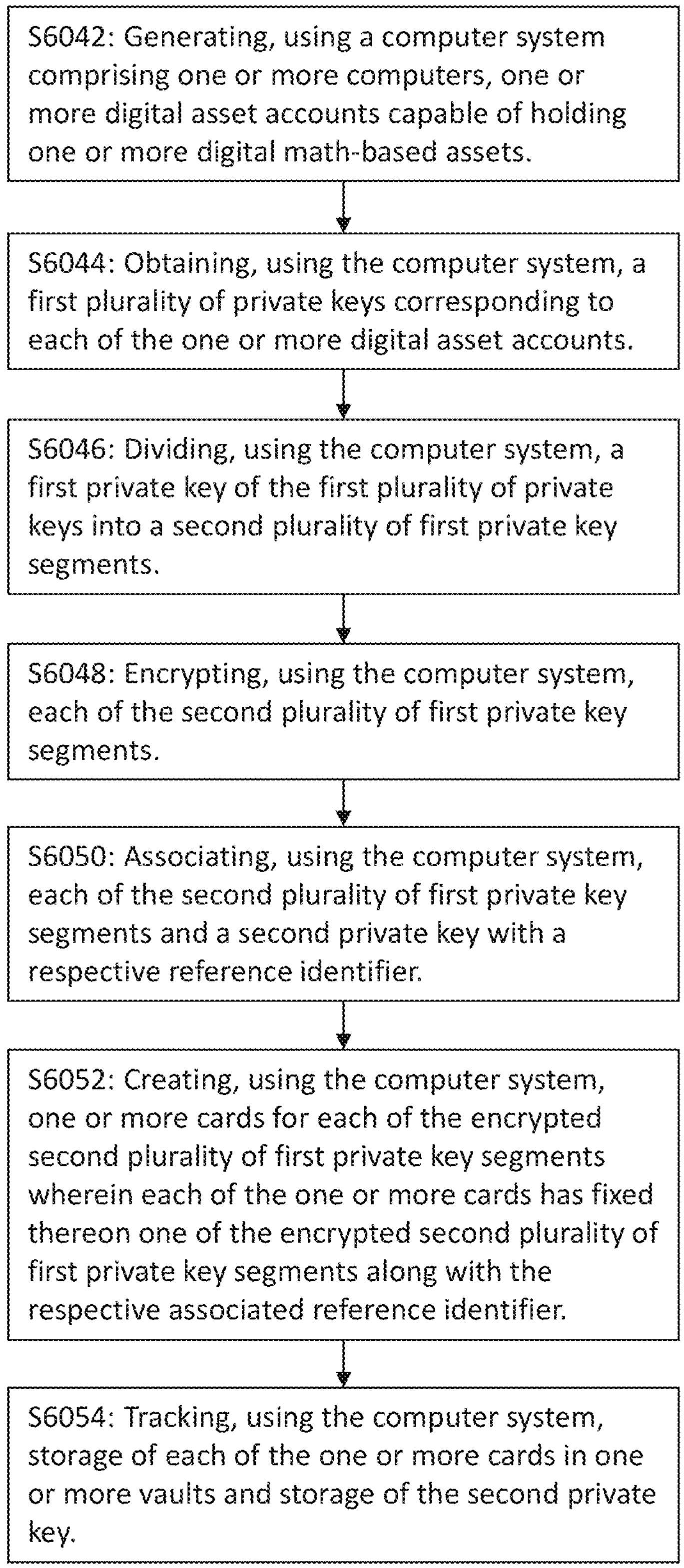

FIG. 6C is a flow chart of another exemplary process for generating digital asset accounts and securely storing the keys corresponding to each account. The exemplary process may generate and store keys for, a multi-signature digital asset account, where at least one of the private keys is divided into a plurality of key segments.

In a step S6042, a computer system comprising one or more computers may be used to generate one or more digital asset accounts capable of holding one or more digital math-based assets.

In a step S6044, the computer system may be used to obtain a first plurality of private keys corresponding to each of the one or more digital asset accounts. Each first plurality of private keys can comprise the private keys of a multi-signature account.

In a step 6046, the computer system may be used to divide a first private key of the first plurality of private keys into a second plurality of first private key segments. For a multi-signature digital asset account at least one of the private keys may be divided into private key segments.

In a step S6048, the computer system may be used to encrypt each of the second plurality of first private key segments. In embodiments, the second key may be encrypted.

In a step S6050, the computer system may be used to generate and/or associate each of the second plurality of first private key segments with a respective reference identifier.

In a step S6052, the computer system may be used to create one or more one or more cards for each of the encrypted second plurality of first private key segments wherein each of the one or more cards has fixed thereon one of the encrypted second plurality of first private key segments along with the respective associated reference identifier. In embodiments, the second key may be written, e.g. using the writing device, to one or more physical substrates, such as paper, plastic, and/or metal. In other embodiments, the second key may be stored electronically.

In a step S6054, the computer system may be used to track storage of each of the cards in one or more vaults, as well as to track storage of the second private key. A reference identifier master list may identify the storage locations of each key and key segment.

Figure 6D:
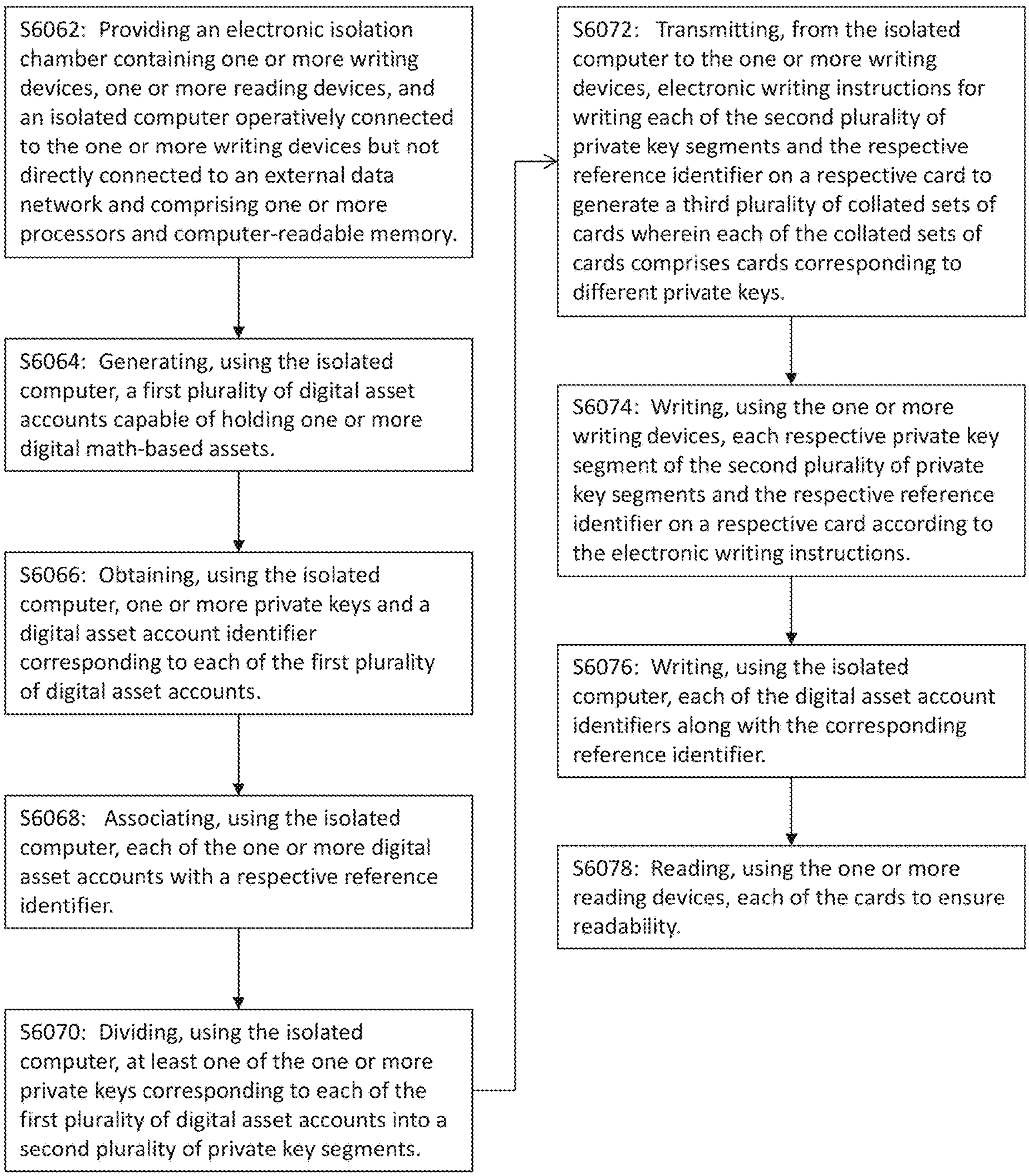

FIG. 6D is a flow chart of an exemplary process for securely generating digital asset accounts and storing associated keys using a secure portal.

In a step S6062, an electronic isolation chamber may be provided containing one or more writing devices (e.g., printers, engravers, magnetic card encoders, to name a few), one or more reading devices (e.g., scanners, bar code scanners, QR readers, magnetic card readers, to name a few), and an isolated computer operatively connected to the one or more writing devices but not directly connected to an external data network and comprising one or more processors and computer-readable memory.

In a step S6064, the isolated computer may be used to generate a first plurality of digital asset accounts capable of holding one or more digital math-based assets. In embodiments, the first plurality of digital asset accounts may comprise multi-signature digital asset accounts.

In a step S6066, the isolated computer may be used to obtain one or more private keys and a digital asset account identifier corresponding to each of the first plurality of digital asset accounts.

In a step S6068, the isolated computer may be used to associate each of the one or more digital asset accounts with a respective reference identifier. The reference identifier may comprise an alphanumeric sequence. In embodiments, respective reference identifiers may be associated with one or more keys or key segments corresponding to the respective digital asset accounts.

In a step S6070, the isolated computer may be used to divide at least one of the one or more private keys corresponding to each of the first plurality of digital asset accounts into a second plurality of private key segments. In embodiments, each private key segment may be required to regenerate the respective private key. In embodiments, a subset of the second plurality of private key segments (e.g., 3 of 5 keys) could be sufficient to regenerate the respective private key.

In a step S6072, the isolated computer may transmit to the one or more writing devices, electronic writing instructions for writing each of the second plurality of private key segments and the respective reference identifier on a respective card to generate a third plurality of collated sets of cards wherein each of the collated sets of cards comprises cards corresponding to different private keys. In embodiments, the third plurality of collated sets can include one or more duplicate sets for each of the collated sets of cards. In embodiments, the isolated computer may be used to generate the electronic writing instructions prior to transmitting them to the one or more writing devices.

In a step S6074, the one or more writing devices may be used to write each respective private key segment of the second plurality of private key segments and the respective reference identifier on a respective card according to the electronic writing instructions. In embodiments, step S6074 can comprise printing and/or etching each respective private key segment of the plurality of private key segments and the respective reference identifier on respective separate cards. In embodiments, each respective private key segment of the plurality of private key segments may be magnetically encoded on respective separate cards. The respective reference identifiers may be printed on the respective cards, e.g., to be readable without a magnetic card reader. Each respective private key segment of the second plurality of private key segments may be written, e.g., printed, as a scanable code, such as a bar code and/or a QR code.

In a step S6076, the isolated computer may be used to write each of the digital asset account identifiers along with the corresponding reference identifier. In embodiments, step S6076 can further comprise the steps of transmitting, from the isolated computer to the one or more writing devices, second electronic writing instructions for writing each of the digital asset account identifiers along with the corresponding reference identifier, and writing, using the one or more writing devices, each of the digital asset account identifiers along with the corresponding reference identifier according to the second writing instructions. In embodiments, writing according to the second writing instructions can comprise writing to an electronic storage medium, such as a flash drive, hard drive, and/or disc. In embodiments, the electronic storage medium could include a hardware storage module ("HSM"). In embodiments, writing according to the second writing instructions can comprise writing to a physical storage medium, such as paper.

In a step S6078, the one or more reading devices may be used to read each of the cards to ensure readability. In embodiments, step S6078 may be performed after step S6076. In embodiments, step S6078 may be performed before step S6076.

Figure 15A:
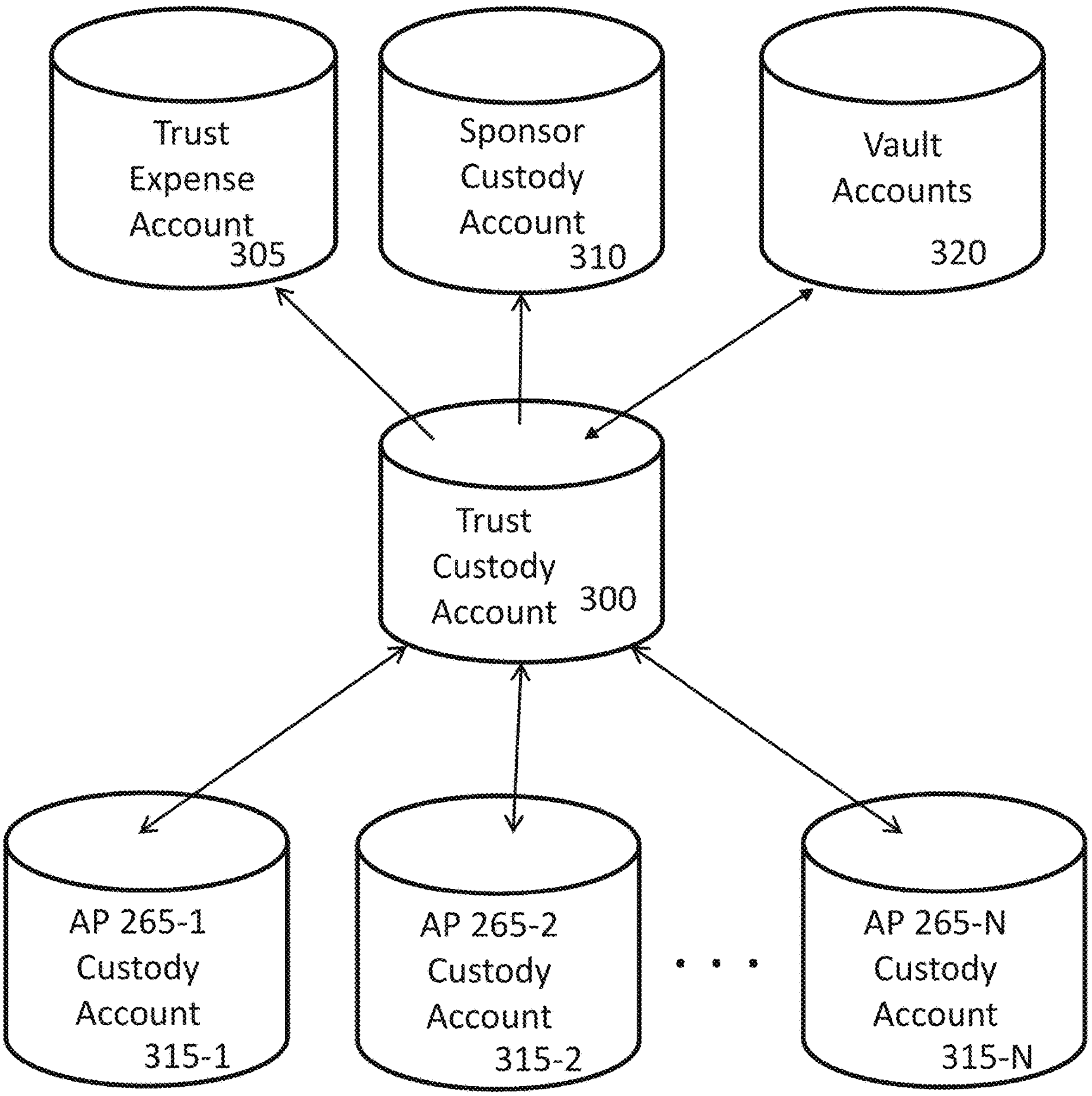
FIGS. 15A and 15B are schematic diagrams of the accounts associated with a trust in accordance with exemplary embodiments of the present invention.

In embodiments, the process illustrated by FIG. 15D can further comprise the step of writing, using the isolated computer, the respective digital asset account identifiers to a removable electronic storage medium, e.g., for transfer to an accounting computer.

In embodiments, the process can further comprise the step of destroying the isolated computer, the one or more writing devices, and the one or more reading devices, or destroying any one of those devices.

In embodiments, the method can further comprise the step of encrypting, using the isolated computer, each of the second plurality of private key segments. In embodiments, encryption techniques can include symmetric-key encryption, asymmetric-key encryption, scrambling, substitution, hashing, or adding characters.

In embodiments, the method can further comprise the step of tracking, using the isolated computer, storage of each of the third plurality of collated sets of cards. In embodiments, each of the third plurality of collated sets of cards may be stored in a vault. In embodiments, each collated set of cards may be stored in a separate vault.

FIGS. 4B and 4C illustrate exemplary embodiments of the present invention where one or more computers 25 running accounting software to account for the assets and/or expenses of an account holder can be located either within the secure location 10 (e.g., FIG. 4B) or outside of the secure location 10 (e.g., FIG. 4C). In embodiments, such accounting software as well as possibly other software may be stored, accessed and/or operated on one or more networked computers 20 in the secure location 10. In embodiments, the accounting computer 25 may be the same or different from isolated computer 30 and/or networked computer 20 and/or a mining computer.

In embodiments, an accounting computer 25 may be a hardware security module, which may comprise hardware (e.g., one or more processors, computer-readable memory, communications portals, and/or input devices, to name a few) and/or software (e.g., software code designed to verify transactions, flag potentially erroneous transactions, and/or stop potentially erroneous or unauthorized transactions). Such a device may verify spending transactions before the transactions are executed. A hardware security module may flag transactions for review (e.g., by portal administrators), before the transactions may be confirmed. A hardware security module may be an offline device, which may be given a daily account activity log (e.g., a log of ETP redemptions and/or creations) to determine whether proposed transactions, particularly spending transactions, are valid. A protocol for identifying owners of a digital wallet may be used to verify that spending transactions will deliver the correct amount of assets to the correct address. In embodiments, a quorum of a specified size may be required to override a hardware security module. In embodiments, a transaction may be processed using both an isolated and a networked computer, as discussed herein. Such a transaction may be performed using an air-gapped digital wallet, such as described in the context of FIG. 4D, and isolated wallet computer 30' within faraday cage 50 or the isolated transaction computer 32 in faraday cage 60 which are air gapped from network computer 20. In embodiments, an unsigned transaction may be performed on a networked computer, which may only contain one or more wallets capable of watching transactions and/or performing unsigned transactions. A non-networked, isolated computer may contain one or more complete wallets, which may be used to sign transactions. The transaction may be transferred to the isolated computer for signing. Hence, an air gap or other lack of a required communication connection may exist between the isolated and networked computer. In embodiments, the unsigned transaction data may be transferred manually, such as by saving the data from the networked computer to a removable storage medium (e.g., a USB flash drive, CD, CD-ROM, DVD, removable hard drive, disk, memory card, to name a few), and inputting or otherwise operatively connecting the storage medium to the isolated computer. The isolated computer may then access and sign the transaction data. The signed transaction data may then be transferred back to the networked computer using the same or different method of transfer as used for the unsigned transaction data. The networked computer may then access and upload, distribute, or otherwise act on the signed transaction data to complete the transaction. In embodiments, the isolated computer may generate and sign (e.g., with a private key) transaction instructions, which may then be transferred to the networked computer for distribution to the digital asset network. In embodiments, the networked computer and the isolated computer may be operatively connected, e.g., using a wired connection (e.g., a USB cable, Ethernet cable, Laplink cable, to name a few) or using a wireless connection (e.g., Bluetooth, Wi-Fi, infrared, radio, to name a few). Such operative connection may replace the manual transfer of transaction data between the computers, and in embodiments, security measures, such as firewalls or automated separable physical connector devices (e.g., controlled from the isolated computer), may be employed to protect against unauthorized access, particularly to the isolated computer.

Figure 7:
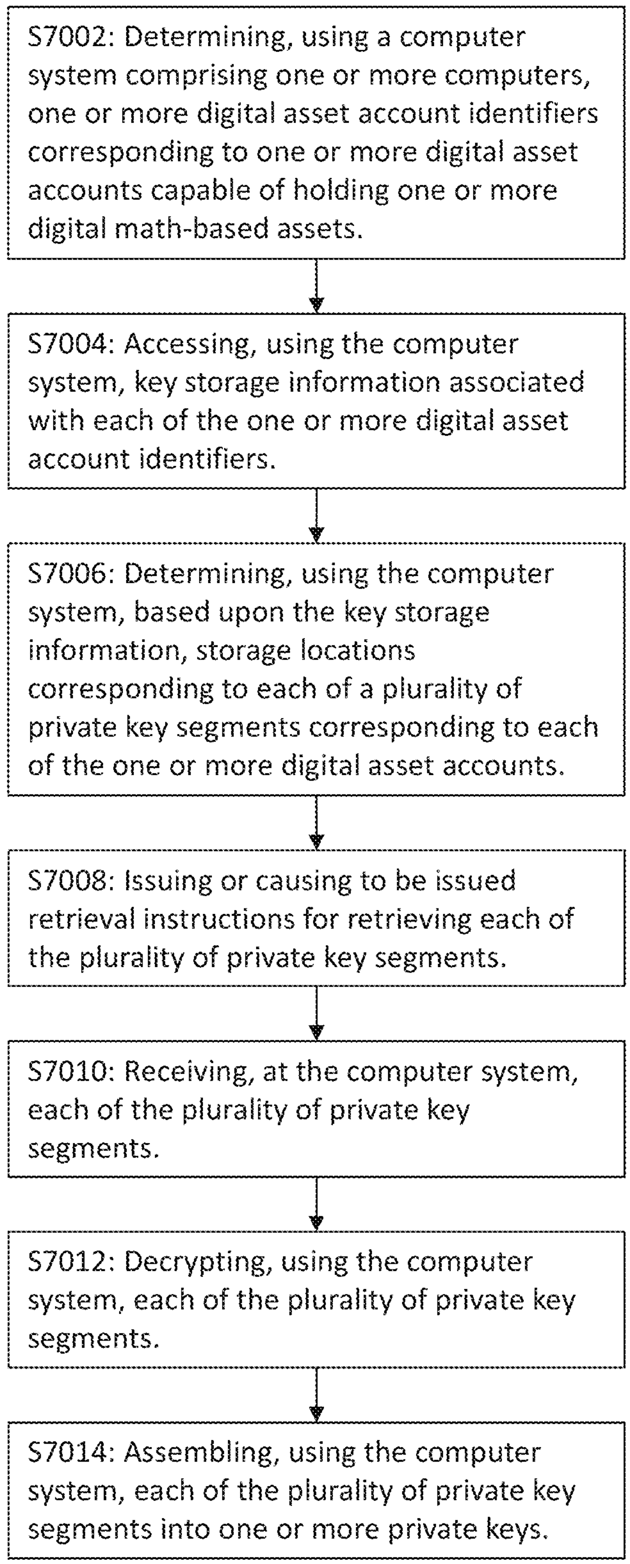
FIG. 7 is a flow chart of an exemplary process for retrieving securely stored keys associated with a digital asset account in accordance with exemplary embodiments of the present invention.

FIG. 7 is a flow chart of a process for retrieving securely stored private keys in accordance with exemplary embodiments of the present invention.

In exemplary embodiments, in step S7002, a computer system comprising one or more computers may be used to determine one or more digital asset account identifiers corresponding to one or more digital asset accounts capable of holding one or more digital math-based assets.

In a step S7004, the computer system may be used to access key storage information associated with each of the one or more digital asset account identifiers. In embodiments, the key storage information may comprise a reference identifier associated with one or more stored private key segments.

In a step 7006, the computer system may be used to determine, based upon the key storage information, storage locations corresponding to each of a plurality of private key segments corresponding to each of the one or more digital asset accounts.

In a step 7008, retrieval instructions for retrieving each of the plurality of private key segments may be issued or caused to be issued.

In a step 7010, each of the plurality of private key segments may be received at the computer system.

In a step 7012, the computer system may be used to decrypt each of the plurality of private key segments.

In a step 7014, the computer system may be used to assemble each of the plurality of private key segments into one or more private keys.

In embodiments, the process depicted in FIG. 7 may further comprise the step of accessing, using the computer system, the one or more digital asset accounts associated with the one or more private keys. In further embodiments, the process depicted in FIG. 7 may further comprise the steps of accessing, using an isolated computer of the computer system, wherein the isolated computer is not directly connected to an external data network, the one or more digital asset accounts associated with the one or more private keys; generating, using the isolated computer, transaction instructions comprising one or more transfers from the one or more digital asset accounts; transferring the transaction instructions to a networked computer of the computer system; and broadcasting, using the networked computer, the transaction instructions to a decentralized electronic ledger maintained by a plurality of physically remote computer systems.

FIG. 8 describes an exemplary method of performing secure transactions. In a step S702, a digital wallet may be created on an isolated computer. In a step S704, a watching copy of the digital wallet, which may not include any private keys, may be created on the isolated computer. In a step S706, the watching copy of the digital wallet may be transferred from the isolated computer to a networked computer. In a step S708, an unsigned transaction may be created using the watching copy of the wallet on the networked computer. In a step S710, data associated with the unsigned transaction may be transferred from the networked computer to the isolated computer. In a step S712, the unsigned transaction data may be signed using the digital wallet on the isolated computer. In a step S714, the signed transaction data may be transferred from the isolated computer to the networked computer. In a step S716, the signed transaction data may be broadcast, using the watching copy of the wallet on the networked computer, to a digital asset network. In embodiments, the broadcast of a signed transaction may complete a transaction and/or initiate a verification process that may be performed by the network.

In embodiments, processes for generating digital asset accounts and/or storing associated keys may be performed by a secure system, e.g., an administrative portal. The system can comprise an electronic isolation chamber, such as a Faraday cage. The system can further comprise one or more isolated computers within the electronic isolation chamber and comprising one or more processors and computer-readable memory operatively connected to the one or more processors and having stored thereon instructions for carrying out the steps of (i) generating, using the one or more isolated computers, one or more digital asset accounts capable of holding one or more digital math-based assets; (ii) obtaining, using the one or more isolated computers, one or more private keys corresponding to the one or more digital asset accounts; (iii) dividing, using the one or more isolated computers, at least one of the one or more private keys for each digital asset account into a plurality of private key segments, wherein each private key segment will be stored; (iv) associating, using the one or more isolated computers, each of the plurality of private key segments with a respective reference identifier; and (v) transmitting, from the one or more isolated computers to one or more writing devices operatively connected to the one or more isolated computers, electronic writing instructions for writing a plurality of cards, collated into a plurality of sets having only one private key segment per digital asset account, and each card containing one of the plurality of private key segments along with the respective associated reference identifier. The system can further comprise one or more writing devices located within the electronic isolation chamber and configured to perform the electronic writing instructions, including collating the plurality of cards into the plurality of sets. The system can also comprise one or more reading devices located within the electronic isolation chamber and configured to read the plurality of private key segments along with the respective associated reference identifier from the one or more cards. The reading devices may be used for quality control, to ensure that the cards are readable.

Cold Storage

In embodiments, a digital asset account holder may operate one or more computers to manage, process, and/or store the transactions and/or digital assets. In embodiments, a portion, consisting of some or all, of the digital assets may be stored in cold storage, which involves no outside connections. Cold storage may be a bank vault, a precious metal vault, a lockbox, or some other secure room or area. There may be no communication channels connecting to the cold storage area. In embodiments, electronic vaults may be used. Electronic vaults may comprise cloud storage, one or more hard drives, flash drives, memory cards or like storage technology, to name a few. Electronic vaults may hold one or more keys and/or key segments, which may be encrypted and/or encoded as described herein.

In embodiments, the cold storage may comprise a divided storage system. In a divided storage system, components or portions of components may be stored at multiple locations. Components may be at least digital wallets, public and/or private keys, or assets.

Figure 9A:
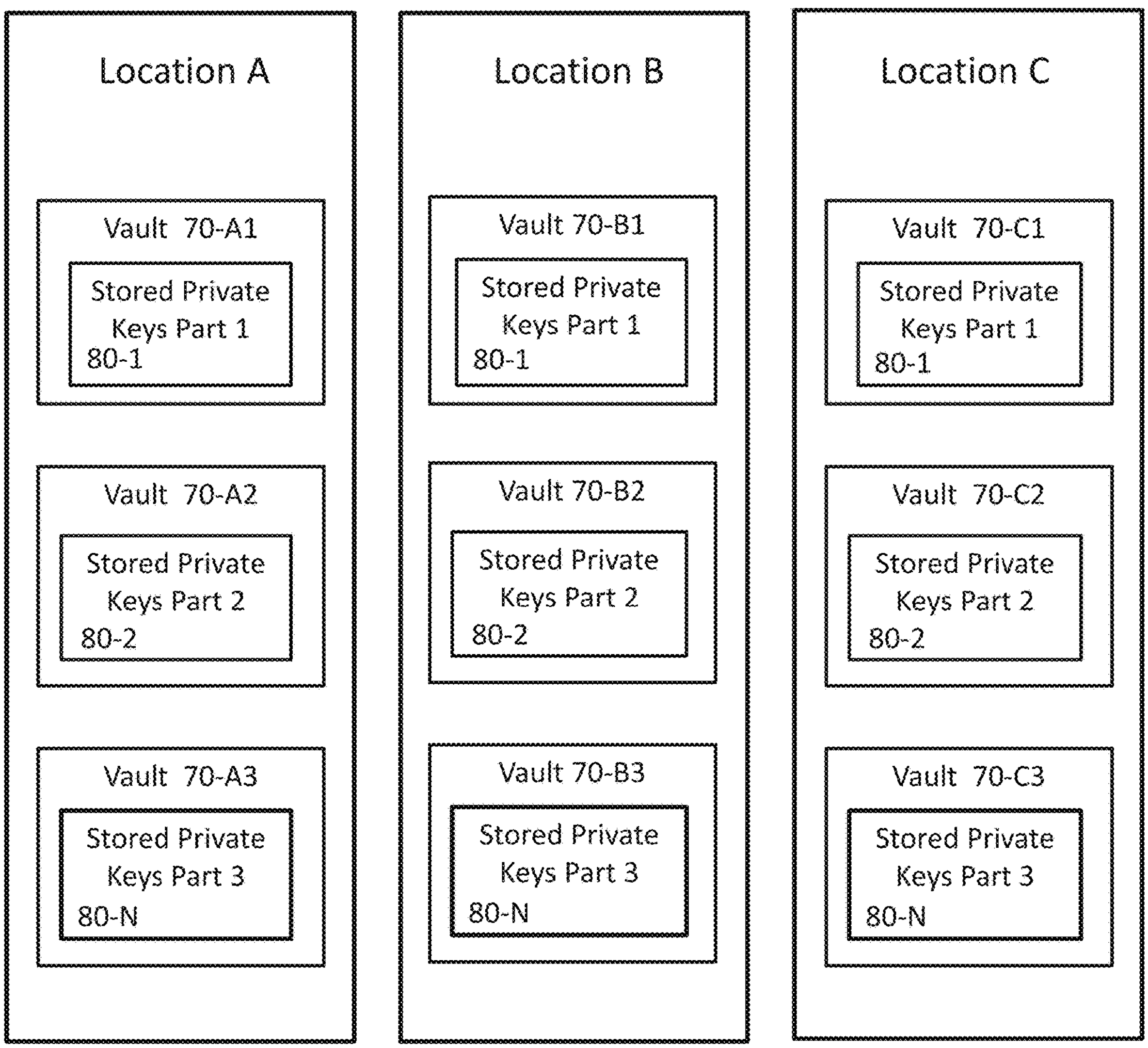
FIGS. 9A-9D are schematic diagrams of cold storage vault systems in accordance with exemplary embodiments of the present invention.

FIG. 9A is a schematic diagram of a cold storage vault system in accordance with exemplary embodiments of the present invention. In embodiments, each private key to be stored in vaults 70 for cold storage may be divided into one or more segments 80. In embodiments, each segment can be stored in a separate vault 70. In this manner, the risk of each of the segments 80 being reassembled into a complete key may be reduced due to the segregation of each piece of each key. Each vault may then be located at different locations, e.g., Locations A, B, and C. In embodiments, each vault (e.g., 70-Aa, 70-A2, 70-A3) may be located at different locations in the same general vicinity (e.g., the general vicinity of Location A, which may be New York City). Each vault may have a user entry log to provide a record of access to the vault and/or may employ security measures to ensure only authorized access.

Duplicate sets of the segmented private keys may then be made and stored in separate vaults (e.g., one duplicate copy divided between Vaults 70-B1, 70-B2, and 70-B3, and another duplicate copy divide between Vaults 70-C1, 70-C2, and 70-C3). Each set of segmented keys 80 may be located in the same general vicinity (e.g., Location B for Vaults 70-B1, 70-B2, and 70-B3 and Location C for Vaults 70-C1, 70-C2, and 70-C3), with each general vicinity being different from other general vicinities (e.g., Location B may be Philadelphia and Location C may be Indianapolis, Ind.). Locations may include domestic and/or international locations. Locations can be selected based on at least one or more of the following parameters: ease of access, level of security, diversity of geographic risk, diversity of security/terror risk, diversity of available security measures, location of suitable vaults in existence (e.g., custodian vaults for a trust associated with an ETP), space available at vaults, jurisdictional concerns, to name a few. In embodiments, three geographic locations can be used wherein Location A is within a short intraday time of transit (e.g., 1 hour), Location B is within a longer intraday time of transit (e.g., 3-4 hours), and Location C is within one or more day times of transit (e.g., 1-2 days). In embodiments, the location of the vaults may be within a distance that allows segments of key pairs to be retrieved within a redemption waiting period (e.g., 3 days). A complete key set (e.g., stored private keys parts 1-3) may be stored in each vault general location (e.g., Location A, Location B, Location C).

Figure 9B:
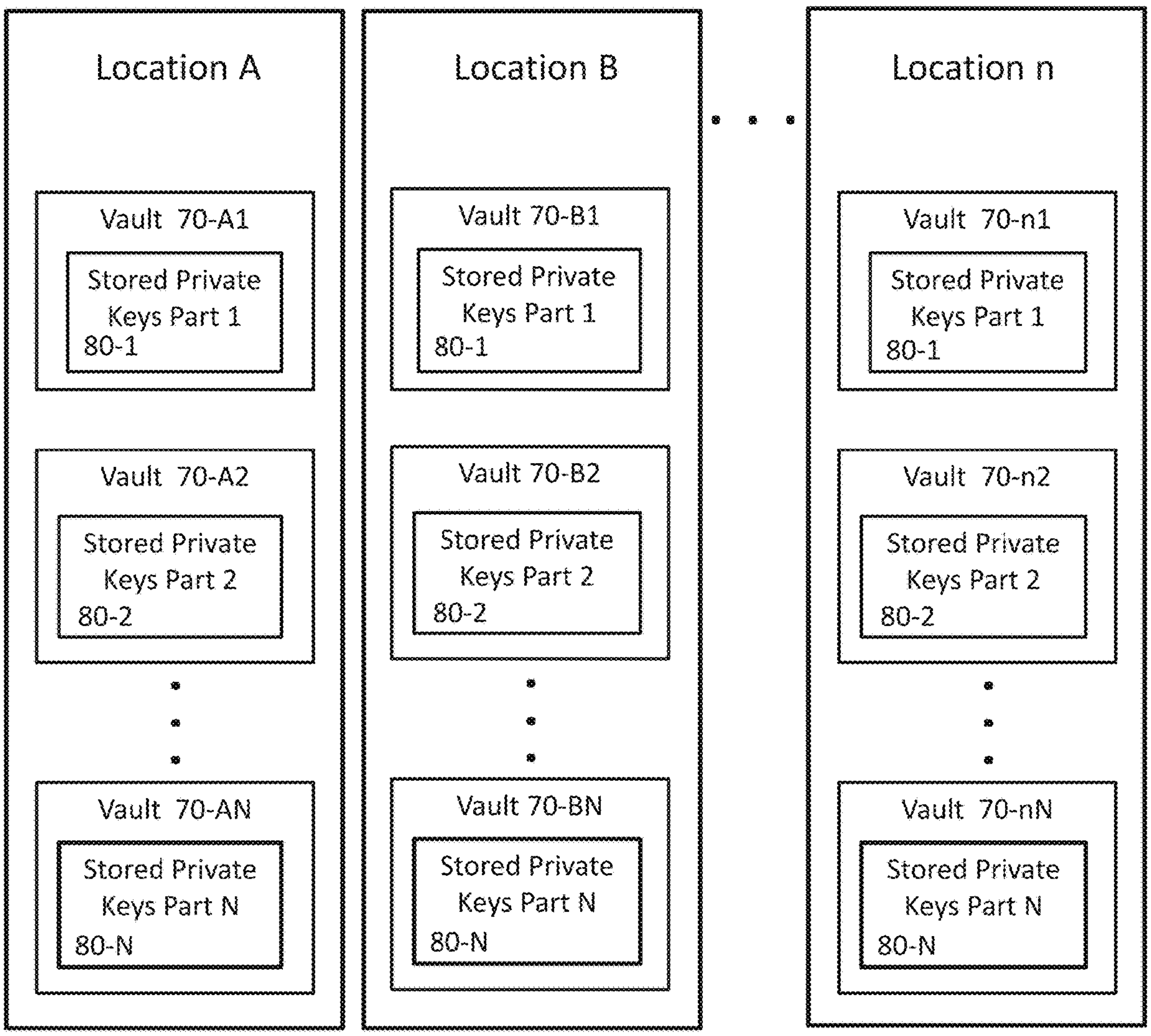

In FIG. 9A, three segments have been used, but other numbers of segments can also be used consistent with embodiments of the present inventions. FIG. 9B illustrates that any number of vault general locations (e.g., A-N) may be used, which may entail n number of complete key sets. In embodiments, the keys may be broken into any number of key segments, 1-N. In embodiments, in order to reassemble one complete key, all N segments may have to be reassembled together.

Figure 9C:
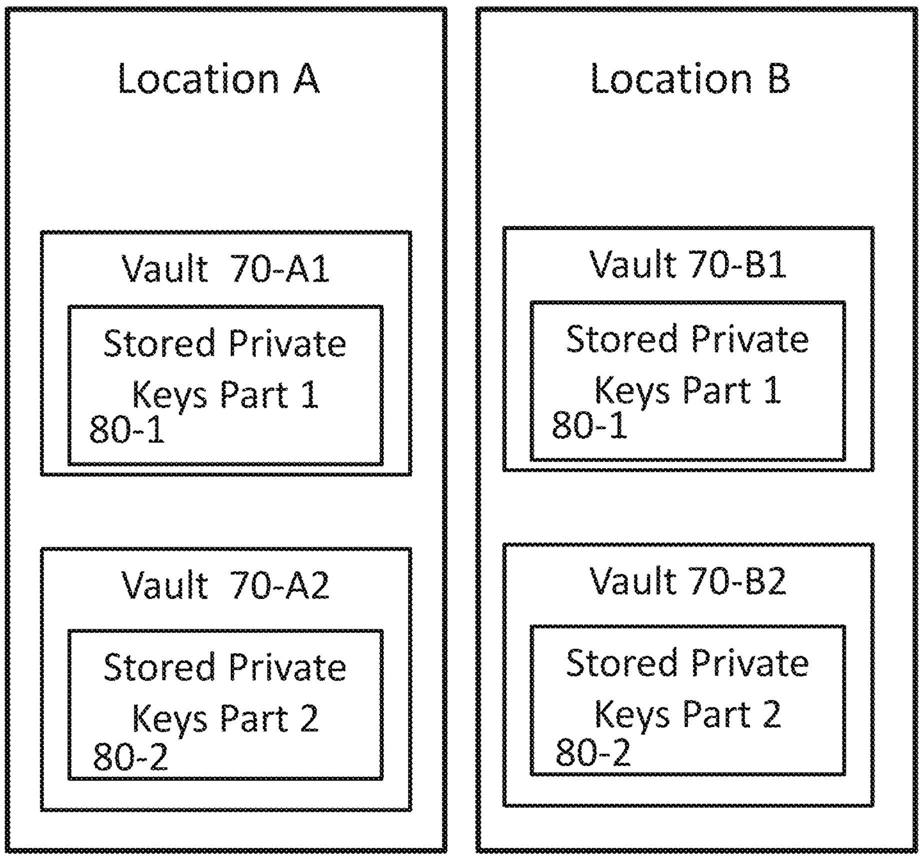

In embodiments, there may be two sets of segmented keys, as illustrated in FIG. 9C, which may be located in two general locations (e.g., A and B). In embodiments, the keys may be parsed into two segments (e.g., 80-1 and 80-2), as illustrated in FIG. 9C.

Figure 9D:
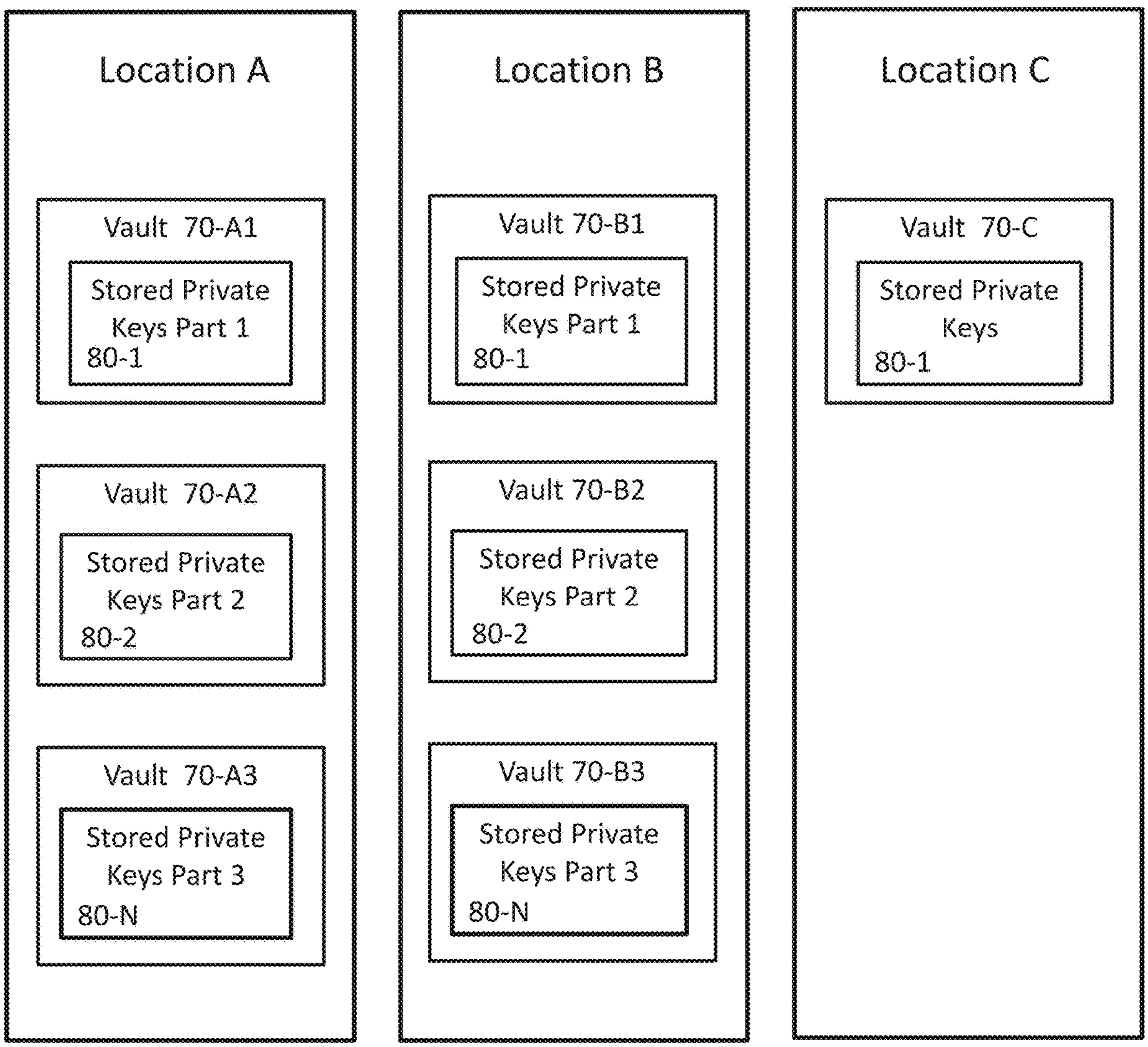

In embodiments, duplicate sets may not be embodied in same form as the original set and/or other duplicate sets. For example, two sets may be stored on paper, and a third set is stored on papyrus. In embodiments, at least one set of segmented keys can be stored on paper, while at least one set is stored on one or more disks, memory sticks, memory cards, tapes, hard drives, or other computer readable media. In embodiments, the same number of segments can be used for each set. In embodiments, a different number of segments can be used for at least two of the sets (e.g., 3 segments for 1 set, and 4 segments for 1 set). In embodiments, different types of coding and/or encryption can be used for at least two sets. FIG. 9D illustrates three sets of key copies, where the third copy 80 stored in vault 70-C may not be divided into segments. Such a key copy may be encrypted like any of the other key segments.

A cold storage back-up may be provided by a one-way electronic data recordation system. The system can function as a write-only ledger. Upon deposit of digital assets into cold storage, the corresponding private keys may be transmitted to the recordation system, which will store a record of the transaction. When digital assets are removed from a wallet, a record of the removal and/or wallet destruction can be sent to the system. In the event that wallet keys must be retrieved, the recordation system can be accessed to determine the wallet keys. Accessing the recordation system to retrieve keys can be designed to be a difficult operation, only to be performed in the event of an emergency need to recover wallet keys.

Key Storage Service

Digital asset storage services and/or digital asset protection may be provided in accordance with the present invention. Digital asset storage may use any of the secure storage systems and methods described herein, including those described with respect to a digital asset ETP. In embodiments, a digital asset storage service may be provided to other entities (e.g., a trust associated with an ETP, authorized participants in the trust, retailers, banks, or other digital asset users), to provide secure storage of digital assets. Such a storage service may use any of the security measures described herein. In embodiments, a digital asset storage service may comprise, form a part of, and/or be associated with a digital asset insurance system, as described herein.

Digital asset protection can be digital asset insurance and/or digital asset warranties. Digital asset insurance may be insured key storage, which may entail secure storage of one or more keys, such as private keys, where the secure storage service may guarantee the return of the stored private key and will pay out some amount if the key cannot be returned. In embodiments, a digital asset warranty can be a warranty against key loss, which may be a warranty against key loss by a digital asset storage service.

A digital asset storage service and/or a digital asset protection system may be associated with and/or accessed through one or more digital wallets. In embodiments, digital asset protection and/or storage services may only be available when using a particular digital asset wallet and/or when employing particular storage mechanisms or procedures. In embodiments, a digital wallet may provide an option to request and/or accept protection and/or an option to request and/or accept storage of one or more keys associated with the wallet. In embodiments, a wallet may prompt and/or require a user to store the private key of the wallet, e.g., using the secure digital asset storage service.

Figure 10A:
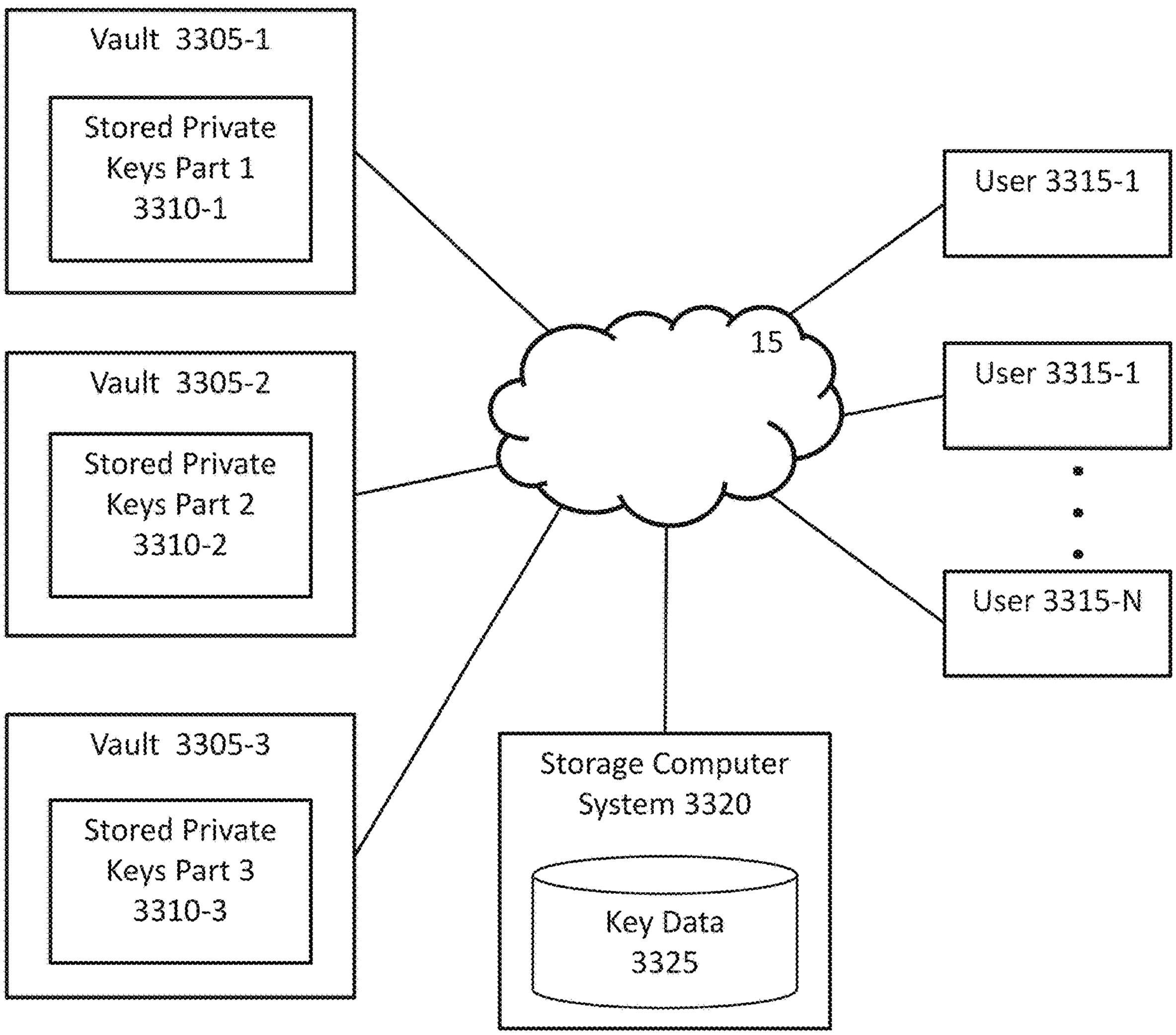
FIGS. 10A and 10B are schematic diagrams of vault arrangements for a digital asset network in accordance with exemplary embodiments of the present invention.

FIG. 10A illustrates an exemplary system for providing secure digital asset storage and/or protection. A storage computer system 3320 may store in computer-readable media or otherwise be connected to one or more databases containing data 3335 relating to one or more digital asset or key storage policies. In embodiments, data 3335 can also include information relating to a stored or insured digital wallet, such as public keys, public addresses, and/or key storage information, which may comprise identification codes or other indicators of where keys or key segments are stored. The storage computer system 3320 may store key data 3325 in internal or external computer-readable memory comprising one or more databases. Key data 3325 can include public key data, information identifying a key owner or wallet owner, information (e.g., an identifying code) identifying or correlating a wallet's keys or key segments, and/or information identifying location and/or retrieval information for stored keys or key segments, to name a few.

The exemplary system illustrated in FIG. 10A can include a plurality of secure storage locations, such as vaults 3305-1, 3305-2, and 3305-3. Private keys or key segments 3310-1, 3310-2, and 3310-3 may be stored in each vault in accordance with the secure storage systems and methods discussed herein, such as cold storage vaulting in different locations. Vaults may be connected to a network 15 at times and disconnected at other times. The network 15 may be any data network or a plurality of connected networks, internal, such as an intranet, or external, such as the Internet. A plurality of keys corresponding to a multi-key wallet may be stored in separate vaults. In embodiments, one or more keys may be divided into segments, which can be stored in separate vaults. Keys may be divided whether from single private key wallets or multi-key wallets.

One or more users 3315 may be, e.g., customers and/or claimants of a digital asset storage and/or protection system. Users 3315 may obtain key storage for one or more digital wallets containing digital assets in one or more denominations. Users 3315 may access or otherwise participate in a digital asset storage and/or protection system using one or more user device. In embodiments, the same digital wallet may be accessed from a plurality of user devices using the same key combinations (e.g., private and public keys).

Figure 10B:
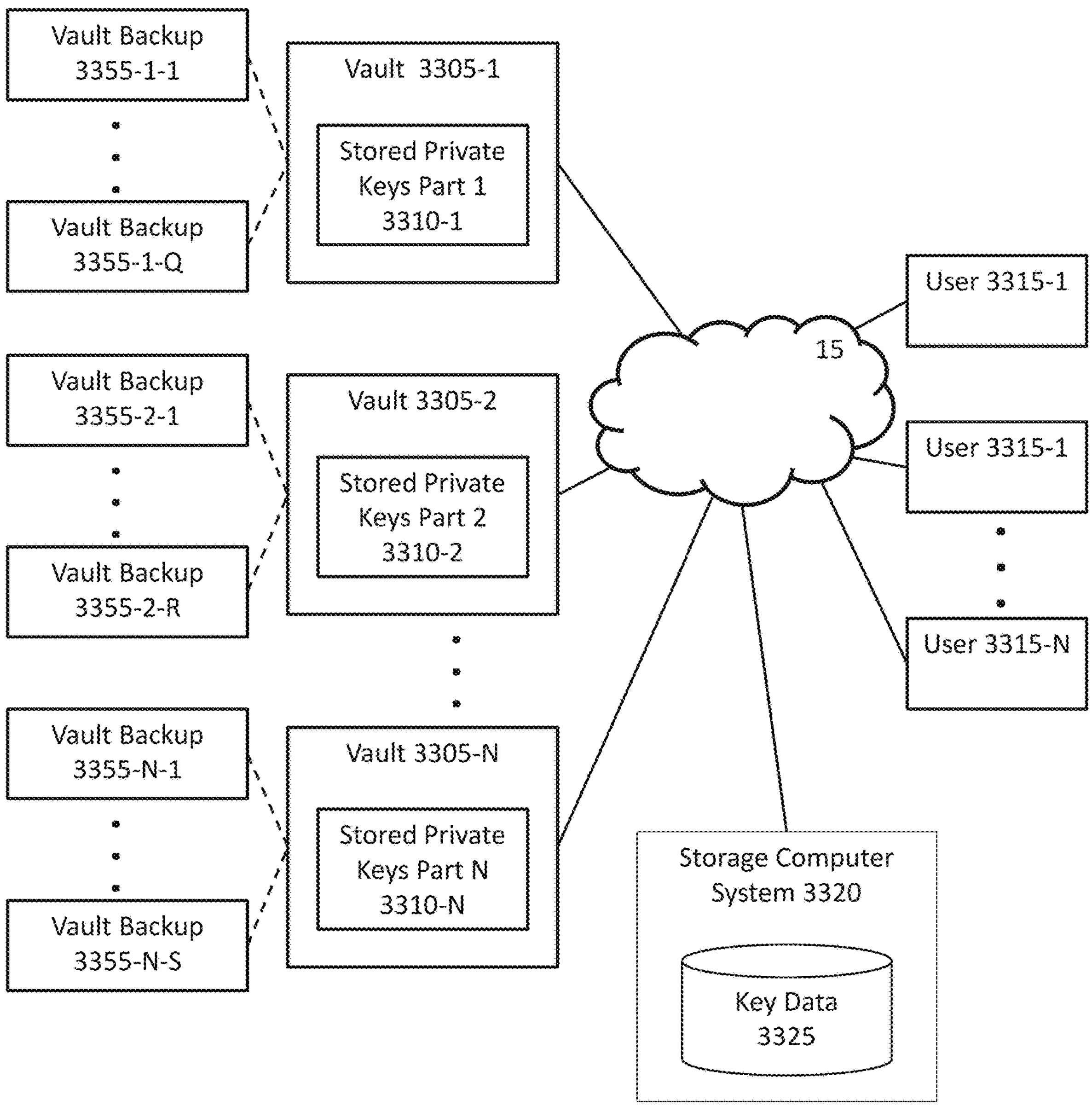

FIG. 10B shows another exemplary embodiment of a system for providing secure digital asset storage and/or protection. A plurality of vaults 3305-1 to 3305-N may be employed to store keys or key segments in segregated locations. In embodiments, vaults may be secure locations, such as safety deposit boxes, bank vaults, rooms with controlled access, to name a few. Vaults may be physical and/or electronic repositories for keys or key segments. In addition, each vault may have one or more backups 3355 (e.g., Q number of backups for vault 3305-1, R number of backups for vault 3305-2, and S number of backups for vault 3305-N). Vault backups may be other vaults or other secure storage facilities, units, or devices. Vault backups may utilize the same or different types of storage from each other and/or from the primary vault. For example, a primary vault may include printed paper copies of keys or key segments stored in a bank lockbox, while a backup may comprise an offline encrypted hard drive storing data corresponding to keys or key segments. Vault backups 3355 can be any of physical storage of printed or transcribed keys or key segments, remote cloud storage, hard drive, disk, CD, DVD, memory card, flash drive, tape drive, and/or tape library, to name a few.

Storage of Keys by a Digital Asset Storage Service

Figure 11A:
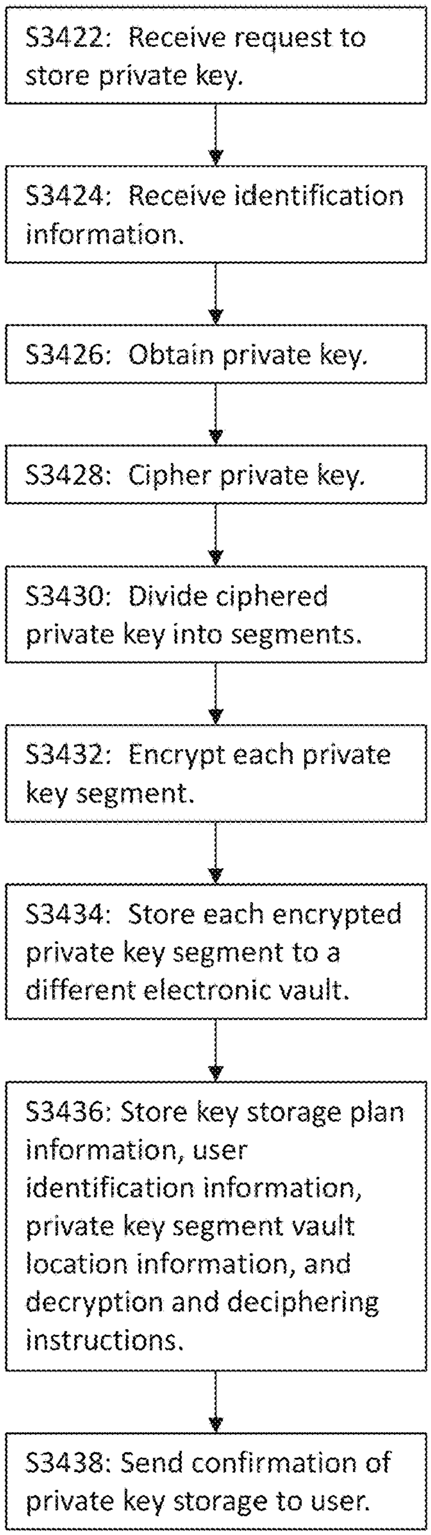
FIGS. 11A-11B are flow charts of processes for generating key storage and insurance in accordance with exemplary embodiments of the present invention.
Figure 11B:
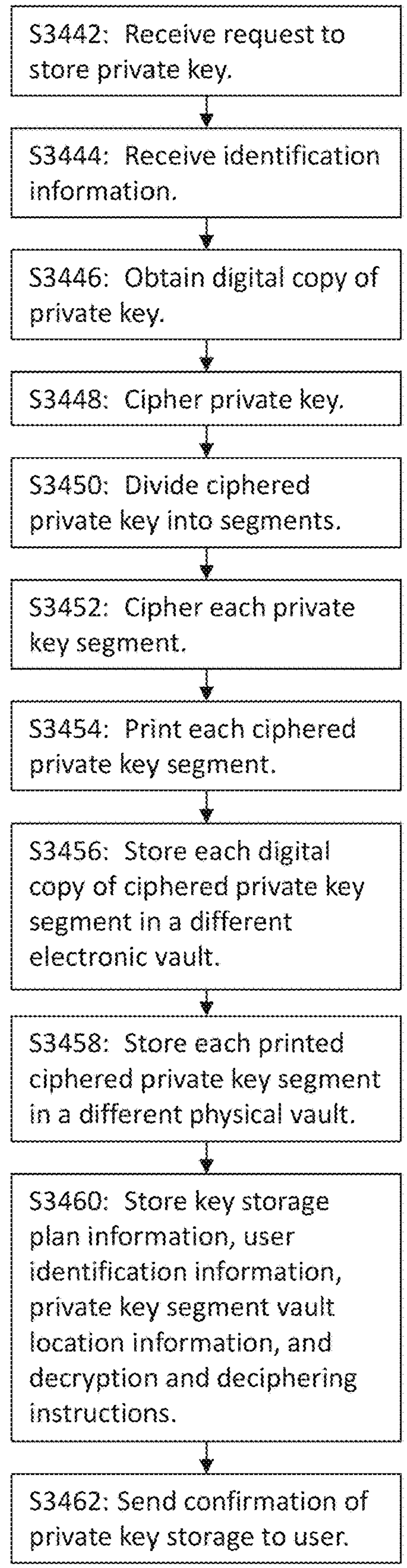

As discussed herein, a digital asset storage service may be provided to users of a digital asset network to provide secure storage of digital assets. In embodiments, the secure storage service may be used in conjunction with a digital asset protection plan, such as an insurance or warranty plan, although the storage service may also be used without insurance or warranties. FIGS. 11A-11B describe exemplary processes for storing private keys, which may be used solely as a key storage service or in conjunction with protection plans, such as insurance or warranty plans.

In embodiments, a user of a digital asset network may provide one or more keys or key segments to the key storage service for storage. Keys or key segments may be provided to the storage service via email or other electronic data transfer, any of which may be secure or otherwise encrypted. A user may use software to generate a wallet with one or more private keys and/or to divide the keys into segments. The software may include the ability to transmit, e.g., via a secure connection, the keys or key segments to the secure storage company. In embodiments, keys may be delivered to a key storage company in person, via mail, or via fax. Such keys may be stored in accordance with the secure and cold storage vault security mechanisms discussed herein, which may include dividing the keys into segments if not already divided.

Keys may also be generated at the secure storage company, e.g., at the secure storage site. Accordingly, a user may log into a website or otherwise connect to a portal for accessing wallet generation software. Such software may be running on one or more processors located at the secure storage company. The user may use the wallet generation software to create a wallet with one or more private keys. The user may also use such software to split one or more keys into key segments. Each key or key segment may then be printed, transcribed, or otherwise prepared for storage. In embodiments, the software may be programmed to transmit each key or key segment to a different printer, printing device, or electronic storage device, any of which may be located in different rooms, on different premises, in different geographies, and/or in separate vaults, to name a few. Thus, the key storage service may then store each key or key segment in separate locations, in accordance with the secure storage mechanisms discussed herein, such as the cold storage vault systems. Accordingly, the key storage company may never have access to an assembled key or to the required plurality of keys to a multi-key wallet.

Upon a user's request for retrieval of a stored key or keys, the secure key storage company may send to the user originals or copies, physically or electronically, of the keys or key segments. In embodiments, the key storage company may never reassemble keys or access a digital wallet itself. The secure key storage company may charge fees at setup and/or at retrieval, as well as recurring storage fees.

FIG. 11A describes an exemplary embodiment of a process for secure key storage and arranging for insurance or warranties against lost private keys, which process may be performed using a digital asset storage system, as discussed herein. The digital asset storage system may comprise and/or form a part of a digital asset protection system. FIG. 11A refers to the storage of private keys, but the process may apply to the storage of both private and public keys.

FIG. 11A is a flow chart of an exemplary process for securely storing private key information, which may be performed by a secure digital asset storage system. In a step S3422, a request to store a private key may be received at the secure digital asset storage system. In embodiments, such a request may comprise a request for insured private key storage. Such a request may originate from one or more other computers or electronic devices, such as a mobile phone, digital asset transaction kiosk, and/or personal computer, to name a few.

In a step S3424, a user may provide identification information, which may be received at the storage system Identification information may comprise any of a name, contact information (e.g., address, telephone number, e-mail address, to name a few), government ID information (e.g., an image of a driver's license, a driver's license ID number, a passport number, to name a few), biometric information (e.g., a voice sample, current photograph, eye scan, fingerprint, to name a few), username, password, and/or one or more security questions, to name a few. The identification information may be provided by and/or correspond to the requestor of private key storage and/or the private key owner. In embodiments, the digital asset insurance system may receive and/or store a user's identification information.

In a step S3426, the storage system may obtain a private key to be stored. The storage system may receive the key or fetch it, e.g., from a user electronic device, such as a mobile phone. In embodiments, the storage system may also obtain a public key to be stored.

In a step S3428, the storage system may cipher the private key, as described herein. In embodiments, the private key may not be ciphered before dividing it into segments. In other embodiments, the private key may be encrypted.

In a step S3430, the digital asset storage system may divide the ciphered private key into any number of segments. In the case of a multi-key wallet, the keys may not be divided into segments. However, keys to a multi-key wallet may be encrypted and/or ciphered.

In a step S3432, the storage system may encrypt each private key segment. In embodiments, encryption and/or ciphering may occur only before or only after dividing a key into segments. In embodiments, the key segments may not be encrypted after the segments are created. The key segments may be ciphered or not processed further.

In a step S3434, the storage system may transfer each encrypted private key segment to a different electronic vault for storage. In embodiments, the vaults may not be electronic, and the key segments may be printed or otherwise transcribed on a physical substrate and stored in the vaults. Any number of vaults may be used (e.g., one vault for each key segment, multiple vaults for redundant copies of each key segment, one or more vaults with two or more key segments stored together, to name a few). A code, such as a bar code or QR code, may be provided along with the key segments (e.g., printed with a physically transcribed copy of a key segment electronically saved with an electronic key segment, or appended to an electronic key segment, to name a few). The code may identify the key segments (e.g., which key segments are part of the same key) and/or the order of the key segments.

In a step S3436, the storage system may store, in one or more databases, key storage plan information (e.g., a subscription for key storage costing $1.99/month), user identification information, private key segment vault location information, and decryption and deciphering instructions. The databases may be computer-readable databases or physical (e.g., paper) databases that may be scanned and then read by one or more computers. In embodiments, the stored information may be sent to a user and/or an storage system administrative coordinator, which may be a computer that can handle retrieval of stored keys.

In a step S3438, the digital asset storage system may send confirmation of private key storage (e.g., over a data transfer network) to the user (e.g., requestor of private key storage or other person associated with the received identification information) and/or a third party. Confirmation of storage may be recorded by the storage system and/or another entity associated with the storage system.

FIG. 11B illustrates that physical back-ups of the secured private key may be employed by a secure digital asset storage system. In a step S3442, a request to store a private key may be received at the storage system.

In a step S3444, the storage system may receive user or digital wallet owner account identification information.

In a step S3446, the storage system may obtain (e.g., receive or fetch) a private key.

In a step S3448, the storage system may cipher the private key. In embodiments, no ciphering may occur before dividing the key into segments.

In a step S3450, the storage system may divide the private key (or ciphered private key) into segments.

In a step S3452, the storage system may cipher each private key segment.

In a step S3454, the storage system may print each ciphered private key segment. One or more copies of the key segments may be printed and/or otherwise transcribed onto any substrate and/or multiple substrates (e.g., paper, plastic, metal, to name a few). A code, such as a QR code or bar code, may be used to identify corresponding key segments and/or the order of the key segments. Such a code may be printed or otherwise provided with the key segments.

In a step S3456, the digital asset storage system may store each ciphered private key segment, as discussed herein. The key segments may be stored in electronic vaults (e.g., hard drives, tape drives, solid state memory, to name a few). Separate vaults may be used for each key segment, although multiple key segments corresponding to multiple different private keys may be stored in the same vault.

In a step S3458, the storage system may store each printed key segment in a physical vault, which may be separate vaults for each key segment.

In a step S3460, the storage system may store, in one or more databases, key storage plan information, user identification information, private key segment vault location information, deciphering instructions, and decryption instructions, where applicable.

In a step S3462, the storage system may send confirmation of private key storage to the user.

Recovering Stored Keys from a Digital Asset Key Storage Service

A user of a secure storage service or system may request access to a stored key, which may be a means of recovering a lost key.

Figure 12A:
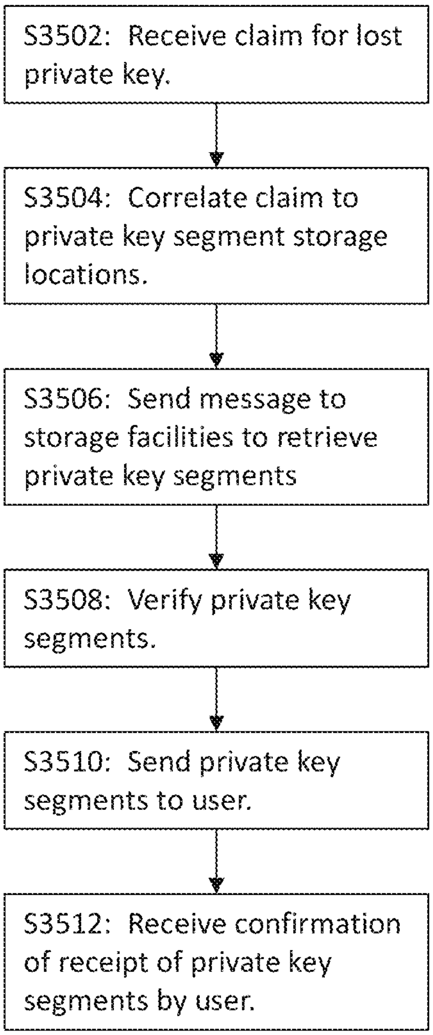
FIGS. 12A-12C are flow charts of processes for recovering key segments in accordance with exemplary embodiments of the present invention.

FIG. 12A is a flow chart describing an exemplary process for recovering a key, which may be performed by one or more computers. In embodiments, the process may entail recovering (e.g., retrieving from storage) a plurality of keys or key segments.

In a step S3502, a user may submit a claim for a lost private key, which may be received by a computer system of a secure storage service storing a copy of the user's private key. A claim may be a request for retrieval of one or more stored keys.

In a step S3504, the storage system, using the computer system, may correlate the received claim to one or more locations where private key segments are stored. For example, the computer system may access a database of policy information to determine where (e.g., in which vaults) a claimants keys or key segments are stored.

In a step S3506, a message, which may constitute instructions, may be transmitted to one or more storage facilities to retrieve the private key segments. A computer system may automatically generate such a message based upon the information pertaining to stored keys or key segments. Such a key retrieval message can include a security code or other authorization to access a secure storage location. In embodiments, the computer system may employ security measures, such as a secure code or digital signature, to provide verification and/or authentication of a retrieval message.

In a step S3508, the private key segments may be verified. Keys or key segments may be retrieved from their respective storage locations. Quality control measures may verify that the correct key segments were retrieved and/or that the keys or key segments are readable, e.g., by a specially programmed scanning device, such as a QR scanner.

In a step S3510, the private key segments may be transmitted to a device and/or account corresponding to the user. One or more secure transmissions may be used. Two-factor authentication may be required of the recipient before a transmission is sent and/or opened by the recipient. In embodiments, the system may decrypt, reassemble, and/or decipher private keys and/or key segments before returning the keys and/or key segments to a user. In embodiments, a user may be provided with the option of having the system perform the decrypting, reassembling, and/or deciphering steps. In embodiments, software may be provided to a user to enable such steps to be performed by a user or under a user's control. In embodiments, the computer system may never decrypt keys or key segments that were encrypted by a user. Accordingly, in step S3510, the user may be provided with key segments and/or reassembled keys, which may be in various states of security (e.g., ciphered, segmented, and/or encrypted).

In a step S3512, the system may receive confirmation that the user received the private keys or key segments. A user device may automatically generate and/or transmit a confirmation upon receipt of the keys or key segments, upon reassembling thereof, upon opening a corresponding digital asset wallet, or upon instruction for a user, to name a few. Such confirmation may provide an indication that the secure storage service and/or protection service met its obligation, e.g., to the customer.

Figure 12B:
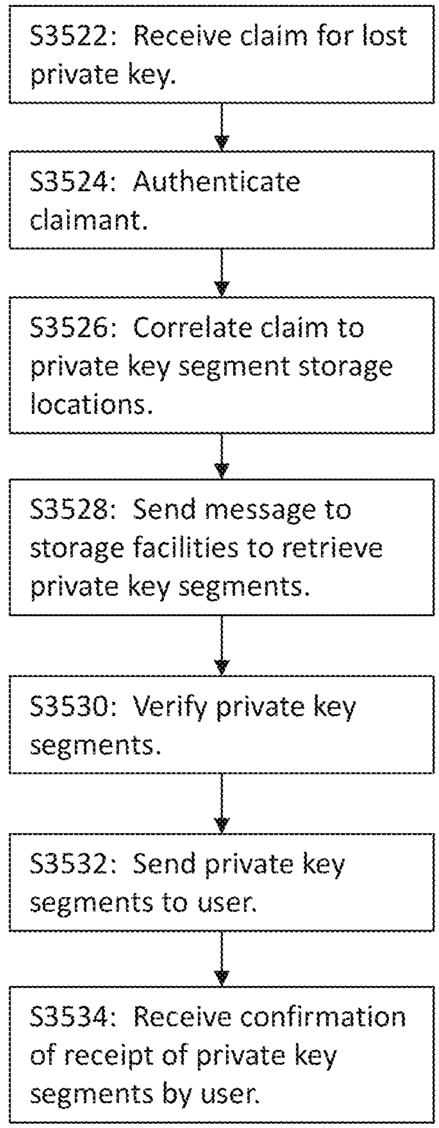

FIG. 12B illustrates another exemplary process for recovering a key. Such process may be performed by one or more computers. The process may be considered the same as the process of FIG. 12A, except with the addition of a user authentication step S3524.

Thus, in a step S3522, a user may submit a claim for a lost private key, which may be received by a secure storage service storing a copy of the user's private key.

In a step S3524, the secure storage system may authenticate the identity of the claimant. Authentication may involve any of receipt of any of a user's identification information, such as name, username, password, biometric information, or the like. In embodiments, three forms of identification information may be required. In embodiments, a claimant may receive a phone call, which may be auto-generated and auto-executed by the system, which may provide the claimant with a code to input at a user device. In embodiments, the user may be required to repeat a phrase, which may be a unique phrase. Voice analysis and/or recognition techniques may be employed. The user may be required to submit a current picture or video. The system may compare the received identification information to a database of authorized user identification information in order to authenticate the identity of the claimant.

In a step S3526, the system may correlate the received claim to one or more locations where private key segments may be stored.

In a step S3528, a message, which may constitute instructions, may be transmitted to one or more storage facilities to retrieve the private key segments.

In a step S3530, the private key segments may be verified.

In a step S3532, the private key segments may be transmitted to a device and/or account corresponding to the user. In embodiments, decryption, reassembly, and or deciphering of private keys and/or key segments may occur before or after returning the keys and/or key segments to a user and may be performed by the system or by a user, who may use software provided by the system.

In a step S3534, the system may receive confirmation that the user received the private key segments.

Figure 12C:
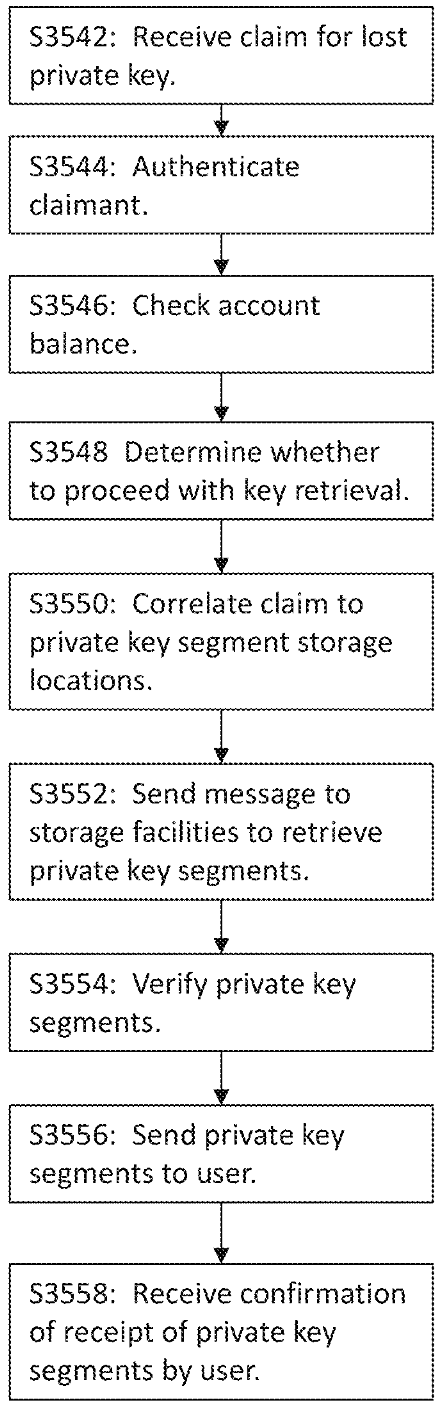

Another exemplary process for recovering a key is provided in FIG. 12C. Such process may be performed by one or more computers. The process may be considered the same as the process of FIG. 12B, except with the addition of steps to check the account balance of the account and a determination step of whether to proceed with the key retrieval.

Thus, in a step S3542, a user may submit a claim for a lost private key, which may be received by a secure storage service storing a copy of the user's private key.

In a step S3544, the secure storage system may authenticate the identity of the claimant, in manners described for step S3524 of FIG. 12B.

In a step S3546, the system may check the account balance of the account.

In a step S3548, the system may determine whether to proceed with the requested key retrieval. In embodiments, retrieval may be halted if an account balance is above a threshold or below a threshold.

In a step S3550, the system may correlate the received claim to one or more locations where private key segments may be stored.

In a step S3552, a message, which may constitute instructions, may be transmitted to one or more storage facilities to retrieve the private key segments.

In a step S3554, the private key segments may be verified.

In a step S3556, the private key segments may be transmitted to a device and/or account corresponding to the user of the account. In embodiments, decryption, reassembly, and or deciphering of private keys and/or key segments may occur before or after returning the keys and/or key segments to a user and may be performed by the system or by a user, who may use software provided by the system.

In a step S3558, the system may receive confirmation that the user received the private key segments.

In exemplary embodiments, a user of a secure storage service or system may be required to provide proof of control of an account before a lost key for that account may be recovered and provided to the user. Exemplary systems and methods for implementing such proof of control are described in further detail below.

ETP

In embodiments, an ETP can be provided using a digital math-based asset, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, IOcoin, Terracoin, Liquidcoin, BBQcoin, BitBars, Gas, Tether and PhenixCoin, to name a few. An ETP may be a special purpose entity, statutory trust, business trust, or other corporate form established under the laws (e.g., of a state of the United States) that continuously issues and/or redeems its shares in exchange for a portfolio of specified assets, such as digital assets, currencies, physical commodities, securities and/or other assets. The ETP may issue equity securities which it may register with the US Securities and Exchange Commission. The ETP may list the equity securities for trading in the secondary market at intraday prices on a stock exchange. Each issued share of an ETP may represent a ratable undivided interest in its underlying portfolio of assets. In embodiments, shares of an ETP may be created only in large blocks or lot sizes, such as creation units. In embodiments, only large market participants may be authorized participants ("APs") who may obtain creation units in exchange for a deposit of a specified amount of assets into the ETP's portfolio. APs may hold or sell into the secondary market the individual shares comprising the creation units issued.

In embodiments, an AP can be a person or entity who is a registered broker-dealer or other securities market participant such as a bank or other financial institution which is not required to register as a broker-dealer to engage in securities transactions, is a participant in a third-party clearing agency, such as the DTC, has entered into an Authorized Participant Agreement with the trustee and the sponsor, and/or has established an AP custody account. In embodiments, only APs may place orders to create or redeem one or more baskets of trust shares. For example, a basket of shares can be a block of 10,000 shares, 20,000 shares, 30,000 shares, 40,000 shares, 50,000 shares, 75,000 shares, 100,000 shares, and/or some other denomination of shares.

In embodiments, an Authorized Participant Agreement can be an agreement entered into by an AP, the sponsor and/or the trustee which provides the procedures for the creation and redemption of baskets of trust shares and for the delivery of the digital math-based assets, e.g., Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, IOcoin, Terracoin, Liquidcoin, BBQcoin, BitBars, Gas, Tether and PhenixCoin, required for such creations and redemptions.

In embodiments, an AP custody account can be a segregated account for digital math-based assets, e.g., a segregated bitcoin account, owned by an AP and established with the trustee and/or custodian by an Authorized Participant Custody Account Agreement. An AP custody account can be used to facilitate the deposit and withdrawal of digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, IOcoin, Terracoin, Liquidcoin, BBQcoin, BitBars, Gas, Tether and PhenixCoin, to name a few, by an AP in creation and redemption processes, as discussed herein by way of example with respect to FIGS. 17A-B and 19A-C.

In embodiments, an Authorized Participant Custody Account Agreement can be the agreement between an AP and the trustee which can establish an AP custody account.

In embodiments, in order to initiate the issuance of shares, an AP may place a creation order with the trustee and/or administrator of the ETP. Upon the trustee's acceptance of the order, the trustee and/or administrator, using the trust computer system, may notify the AP of the exact amount or quantity of portfolio assets that is required to be deposited into the ETP's account in exchange for one or more creation baskets, which are valued at their current net asset value. In embodiments, the trustee and/or administrator may hold the ETP's portfolio assets on behalf of all shareholders. In embodiments, the trustee and/or administrator may be authorized to make transfers from the trust account to third parties only under certain specific circumstances, such as to pay for the ETP's permitted operational expenses or to redeem creation units tendered for redemption by an AP. A redemption of creation units may be the reverse of a creation; the AP may place a redemption order with the trustee. Upon the trustee's and/or administrator's acceptance of the order, the AP may tender to the trustee the stated number of creation units for redemption and in exchange may receive the pro rata amount or quantity of portfolio assets represented by such shares. The trustee and/or administrator may then cancel and/or instruct a third party clearing agency (e.g., DTC) to cancel all shares comprising the creation units so delivered. This continuous issuance and redemption feature of an ETP provides an arbitrage mechanism for APs, who may either create or redeem creation units when the current trading price of the individual shares on the secondary market deviates from the underlying net asset value of such creation units, thereby reducing such deviation between the trading price and the underlying net asset value.

In embodiments, the trust may have an investment objective for shares to reflect the performance of a blended price of digital math-based assets, e.g., a blended bitcoin price of bitcoin, less expenses of the trust's operations. The shares can be designed for investors who want a cost-effective and convenient way to invest in digital math-based assets with minimal credit risk.

In embodiments, the trust can directly hold digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, IOcoin, Terracoin, Liquidcoin, BBQcoin, BitBars, Gas, Tether and PhenixCoin, using the trust's hardware and/or software security system, which in embodiments may include storage of the trust's digital assets and/or the private keys relating to the digital wallets holding the trust's digital assets in one or more locations in, for example, high security vaults.

In embodiments, the trust may hold any combination assets, including digital math-based assets, physical commodities, securities and/or other assets. A trust agreement may specify and/or limit which assets a particular trust may hold.

ETP Participants

Figure 13:
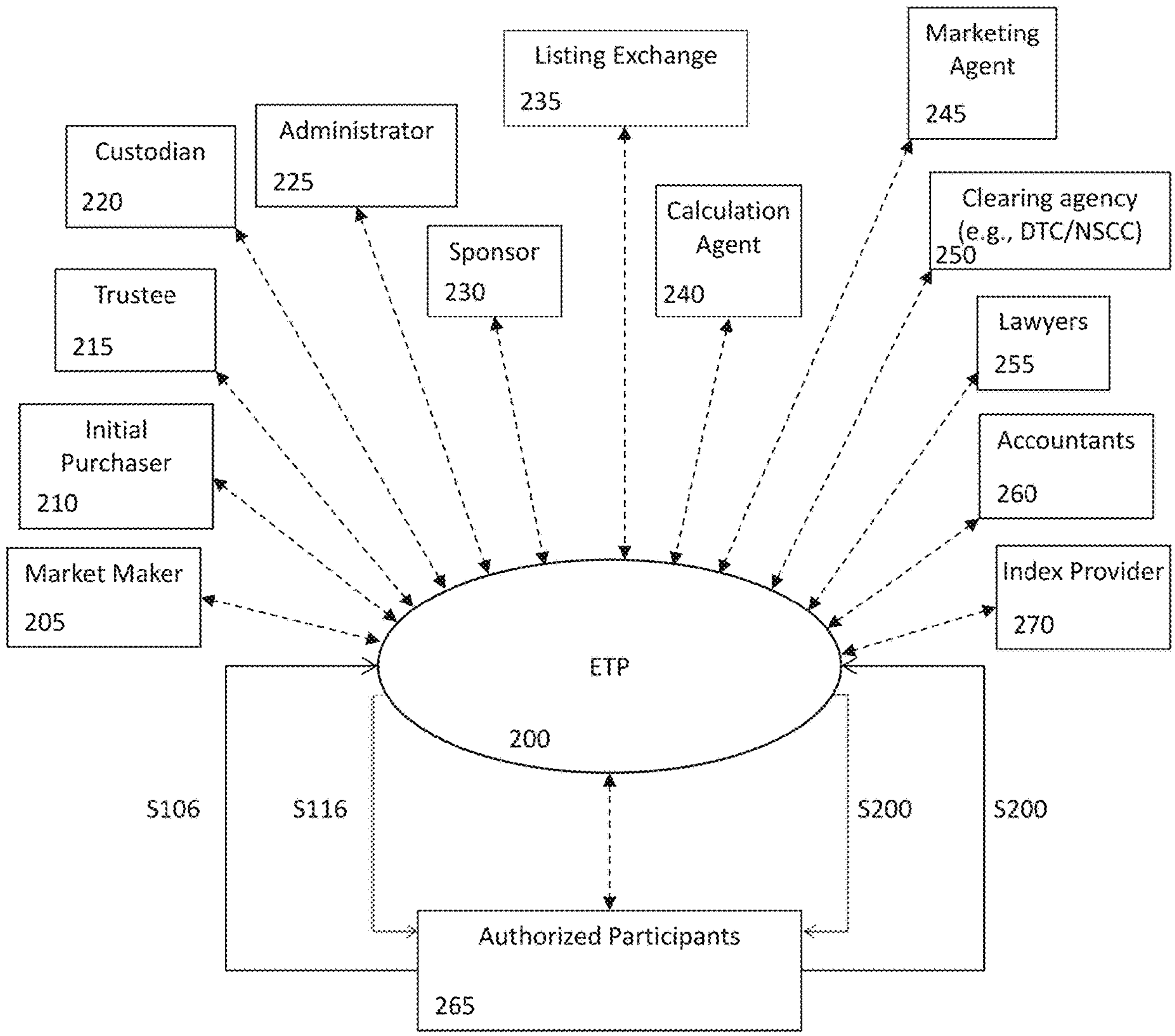
FIG. 13 is a schematic diagram of the participants in an ETP holding digital math-based assets in accordance with exemplary embodiments of the present invention.

As illustrated in FIG. 13, in exemplary embodiments, an ETP may include one or more participants, such as one or more market makers 205, purchasers 210, trustees 215, custodian 220, administrator 225, sponsor 230, listing exchange 235, calculation agent 240, marketing agent 245, third-party clearing agency 250 (e.g., the DTC or NSCC), attorneys 255, accountants 260, and/or authorized participants 265, to name a few. In embodiments, one or more of these roles may be performed by the same entity (e.g., the same entity may be the custodian and the administrator). In embodiments, more than one entity may perform the same role or part of a role, such as more than one market maker may be used for the same ETP. Various combinations of entities can be used consistent with exemplary embodiments of the present invention.

In embodiments, an ETP may involve an underlying trust and one or more of the entities discussed herein. FIG. 13 provides an overview of at least some of the possible participants in an ETP. A sponsor 230 may establish the ETP, which generally may be established as a common law or statutory trust under state law. One trust may be created or multiple trusts for different ETPs may be established at one time. A single trust established as a series trust may also create multiple series for different ETPs. The sponsor 230 may have contractual rights involving the trust. The sponsor 230 may pay SEC registration fees and may provide seed capital for the trust, to name a few. Additionally, the sponsor 230 may prepare, sign, and/or file trust registration statements and/or other formation documents, periodic SEC reports, and/or registration statement updates. The sponsor 230 may create free-writing prospectuses and other promotional materials about the trust and may file such materials with the SEC, as required by government regulation. The sponsor 230 may participate in marketing activities for the trust, such as road shows. The sponsor 230 may maintain the trust's public website for viewing by the holders of the trust's securities, prospective purchasers of its shares, and/or any entity desirous of viewing the trust's public website.

An initial purchaser 210 may provide seed capital to the trust in exchange for a set number of creation units of the same value. A market maker 205 may undertake to buy or sell creation units in the trust at specified prices at all times.

A custodian 220 can safe keep the trust's assets and can engage one or more sub-custodians to do so in different locations. In embodiments, the one or more sub-custodians may comprise different entities. In embodiments, the one or more sub-custodians may comprise different aspects of the same entity or may be affiliated entities. A custodian 220 may hold copies of segmented private keys in one or more vaults.

An administrator 225 can keep books and records for the trust, conduct other ministerial duties and/or may calculate the trust's daily net asset value, daily share price, and/or other pertinent information about the trust, the trust's assets, and/or the trust shares.

The trustee 215, the custodian 220 and/or the administrator 225 may be the same person or entity, may be different operations of the same person or entity, may be different persons or entities, or may be multiple persons or entities performing the same and/or overlapping functions.

A listing exchange 235 is a venue where shares registered with the SEC may be listed and traded during business days. The listing exchange 225 can track using one or more computers and publish electronically using one or more computers an estimated intraday indicative value ("IIV") of a trust regularly, e.g., every 15 seconds. A calculation agent 240 using one or more computers may also perform daily calculations of trust assets using methods known in the art and may provide the IIV. The trustee 215 and/or the administrator 225 may also serve as the calculation agent 240 and may be the same person and/or entity, different operations of the same person and/or entity, and/or may be different persons.

A marketing agent 245 may also be engaged to provide services to the trust relating to the public marketing of its shares for sale. The marketing agent 245 may review marketing documents for regulatory compliance, e.g., rules of the Financial Industry Regulatory Authority ("FINRA") and/or relevant regulatory authority. The marketing agent may file the trust's marketing materials with FINRA and/or relevant regulatory authority.

The processes of clearance and settlement of trust shares may be performed by a clearing agency or a registered third-party entity 250, such as the Depository Trust Company ("DTC") and/or the National Securities Clearing Corporation ("NSCC"). Shares may be available only in book-entry form, meaning that individual certificates may not be issued for the trust's shares. Instead, shares may be evidenced by one or more global certificates that the trustee may issue to a clearing agency or a registered third-party entity 250, e.g., DTC. The global certificates may evidence all of the trust's shares outstanding at any time. As a result, in embodiments, shares may be only transferable through the book-entry system the third-party clearing agency 250. Shareholders may hold and/or transfer their shares directly through the third-party clearing agency 250, if they are participants in the clearing agency 250, or indirectly through entities that are participants in the clearing agency 250 (e.g., participants in DTC). Transfers may be made in accordance with standard securities industry practice.

An index provider 270 may license its intellectual property to the trust for pricing, portfolio selection, and/or other services, and may, using one or more computers, calculate and/or upkeep the index during the term of the license. In embodiments, for example, an index of digital asset values (such as bitcoin values) or blended digital asset prices (such as blended bitcoin prices) may be used to price the digital assets transferred to and/or from the trust and/or held by the trust. Other forms of valuation of the digital assets (such as bitcoin) can also be used as discussed herein.

Lawyers 255 and accountants 260 may provide services to the sponsor 230 and/or the trust and/or other participants in the trust.

In embodiments, transactions with the trust may be restricted to one or more APs 265. The trust may establish requirements for becoming an AP, e.g., must be an entity of a certain size, financially or otherwise, must be a large market investor, like a broker-dealer and/or a bank, must seek and obtain formal approval from the trustee, must enter into an agreement with the trustee and/or other such requirements known in the art, to name a few. In embodiments, APs may be broker-dealers and/or banks. APs may enter into an AP agreement with the trust and/or the sponsor 230, which may include rules for the issuance and/or redemption of creation units. Depending on the nature of the trust's intended assets, an AP may be required to hold and deliver specific commodities, e.g., a digital math-based asset, directly to the trust.

In embodiments, a trustee 215 may be generally responsible for the day-to-day administration of the trust. A trustee 215 (or its designee, such as the custodian 220 and/or administrator 225) may perform one or more of the following tasks associated with the trust:

- establishing and/or having established, using one or more computers, wallets for digital math-based assets (e.g., Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, IOcoin, Terracoin, Liquidcoin, BBQcoin, BitBars, Gas, Tether and PhenixCoin, to name a few) to be used by the trust associated with an ETP holding such digital math-based assets (e.g., Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, IOcoin, Terracoin, Liquidcoin, BBQcoin, BitBars, Gas, Tether and PhenixCoin, to name a few);

- establishing and/or having established, using one or more computers, digital wallets for custody and other accounts to be used on behalf of participants in the trust, e.g., AP custody accounts 315, sponsor custody accounts 310, trust custody accounts 300, trust expense account 305, and/or vault accounts 320, to name a few;
- transferring and/or having transferred, using one or more computers, digital math-based assets from and/or to one or more digital wallets associated with one or more digital wallets associated with one or more accounts, including AP custody accounts 315, trust custody accounts 300, trust expense accounts 305, sponsor custody account 310, and/or vault accounts 320, to name a few;
- determining and/or having determined, using one or more computers, expenses and fees to be paid by the trust, including, e.g., sponsor fees, legal fees, accounting fees, extraordinary expenses fees, and/or transaction fees, to name a few;
- paying and/or having paid, using one or more computers, expenses and fees to be paid by the trust, including, e.g., sponsor fees, legal fees, accounting fees, extraordinary expenses, and/or transaction fees, to name a few;
- calculating or having calculated, using one or more computers, an ANAV, an ANAV per share, a NAV, and/or a NAV per share;
- receiving and/or processing, using one or more computers, orders from APs to create and/or redeem creation units and/or baskets and/or coordinating the processing of such orders with a clearing agency or a registered third-party entity 250;
- transferring and/or having transferred and/or facilitating transfers, using one or more computers, of digital math-based assets of the trust as needed into and/or out of custody accounts and/or vault accounts to cover redemptions and/or to pay expenses and fees to be paid by the trust, including, e.g., sponsor fees, legal fees, accounting fees, extraordinary expenses fees, and/or transaction fees, to name a few;
- selling and/or arranging for sale remaining digital math-based assets of the trust at termination of the trust and/or distributing the cash proceeds to the shareholders of record;
- supervising and/or arranging for the supervision of the safekeeping of the digital math-based assets deposited with the trust by APs in connection with the creation of creation units and/or baskets;
- administering and/or having administered and/or maintaining and/or having maintained custody accounts on behalf of the trust, APs, the sponsor and/or others;
- administering and/or having administered and/or maintaining and or having maintained and/or supervising the maintenance, upkeep and/or transfer of private key information to and/or from vaults; and/or
- generating and/or having generated, using one or more computers, encryption, splitting, QR coding (or other bar coding) and printing the paper tokens, to name a few.

As described in greater detail herein with respect to FIGS. 5 and 17, an AP may provide assets to the trust in exchange for shares in the trust, and an AP may redeem shares in the trust for assets.

Secondary Market Activities

Figure 14:
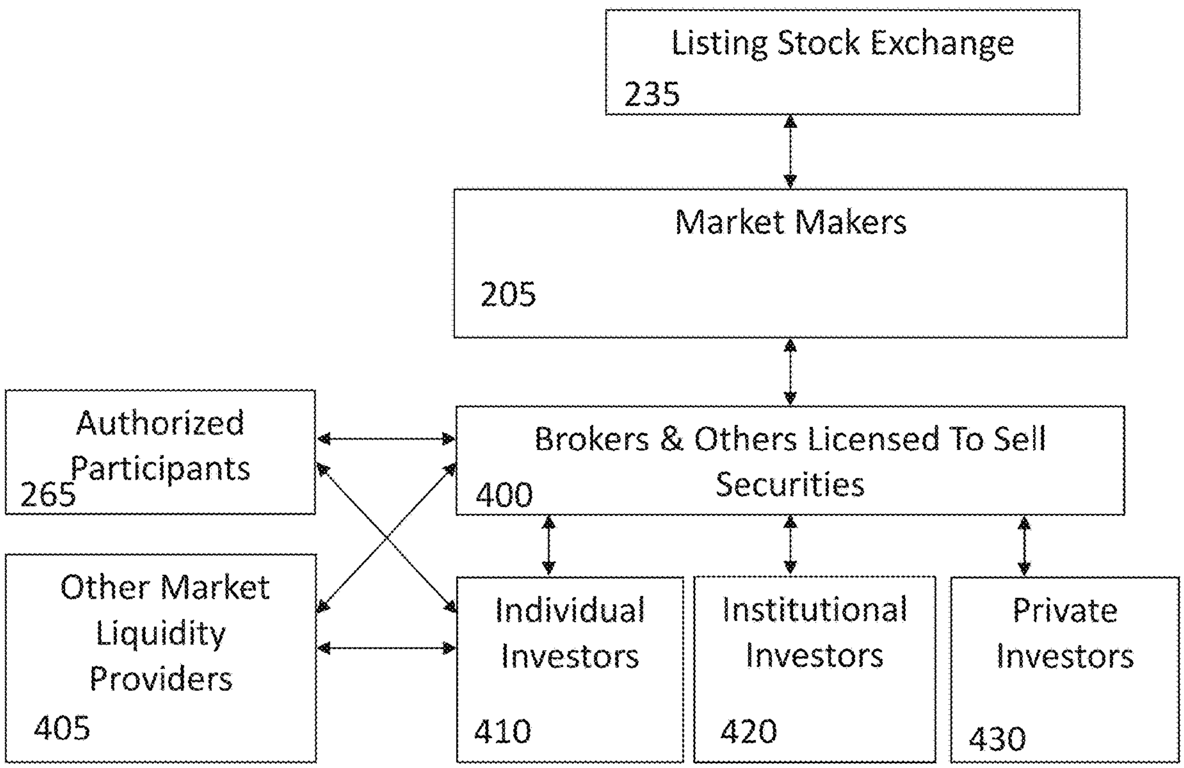
FIG. 14 is a schematic diagram of an exemplary secondary market for shares in the trust in accordance with exemplary embodiments of the present invention.

FIG. 14 is a schematic diagram of an exemplary secondary market for shares in the trust in accordance with exemplary embodiments of the present invention. In embodiments, the secondary market can include one or more listing stock exchanges 235 (e.g., NYSE, NASDAQ, AMEX, LSE, to name a few), one or more market makers 205, one or more brokers and/or other licensed to sell securities 400, authorized participants 265, other market liquidity providers 405, individual investors 410, institutional investors 420 and private investors 430, to name a few.

As described earlier, in the primary market APs 265 may obtain and/or redeem shares in the trust through the creation and redemption redeem processes. APs 265 may then sell shares in a secondary market. APs 265 may also buy shares in the secondary market. In an exemplary secondary market for shares in the trust for a digital math-based asset ETP, e.g., a Bitcoin ETP, a listing stock exchange 235 may be the primary listing venue for individual ETP shares. In embodiments, the listing stock exchange 235 may be required to file listing rules with the SEC if no applicable listing rules already exist. The listing exchange 235 may enter into a listing agreement with the sponsor 230. In embodiments, the listing exchange 235 may appoint the lead market maker and/or other market makers 205. The market makers 205 may facilitate the secondary market trading of shares in the trust underlying the ETP. Market makers 205 may facilitate creations and/or redemptions of creation units through one or more APs. In embodiments, such creations and/or redemptions may be related to market demand, e.g., to satisfy market demand.

Still referring to FIG. 14, individual investors 410, institutional investors 420, and/or private investors 430 may buy and/or sell one or more shares in the trust. In embodiments, these investors may buy and/or sell shares through brokers 400 or others licensed to sell securities. Brokers 400 and/or others licensed to sell securities may receive cash and/or other assets from investors in order to buy one or more shares in the trust. Brokers 400 and/or others licensed to sell securities may receive one or more shares from investors to sell for cash and/or other assets.

Other market liquidity providers 405 may also participate in the secondary market. In embodiments, other market liquidity providers 405 may buy and/or sell one or more shares on a list stock exchange 235. In embodiments, other market liquidity providers 405 may buy and/or sell one or more creation units through one or more APs 265. Other market liquidity providers 405 may include, by way of example, arbitragers, prop traders, "upstairs", private investors, dark pools, to name a few.

ETP Setup

In an exemplary embodiment, the ETP may be based on an ownership stake in a digital asset investors trust, such as a Bitcoin investors trust. A trust may be created as a common law trust or a statutory trust that may elect, grantor trust status. It will be appreciated by those in the art that other forms of trust are possible, including but not limited to master trusts, owner trusts, and revolving asset trusts. Such a trust may register its shares with the SEC under the Securities Act of 1933, as amended, to sell shares to the public. A trust may hold portfolio assets that may require the sponsor or administrator of the trust to register as a commodity pool operator under the Commodity Exchange Act with the U.S. Commodity Futures Trading Commission ("CFTC").

In embodiments, the trust's assets may be digital math-based assets, such as bitcoin, held in one or more digital wallets maintained by and/or for the trustee 215. Other forms of asset storage and security are discussed herein. In embodiments, the trust assets can include other forms of digital math-based assets, such as other forms of digital assets, digital math-based assets, peer-to-peer electronic cash system, digital currency, synthetic currency, or digital crypto-currency. Exemplary digital assets can include Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, IOcoin, Terracoin, Liquidcoin, BBQcoin, BitBars, Gas, Tether and PhenixCoin, to name a few. In embodiments, the trust's assets can include additional assets besides digital math-based assets, such as, other commodities, currencies, futures, derivatives, and/or securities, to name a few.

The trust's assets may be held in various forms of storage using any of the security systems and methods described herein. In embodiments, the trust may employ a hardware and/or software security system to protect the digital math-based assets, such as bitcoin assets. In embodiments, the trustee 215, the administrator 225, the custodian 220, and/or some other entity may perform operations related to creations and redemptions from a secure administrative portal. In embodiments, digital asset accounts and/or digital wallets may be created after a request for a deposit is made, at the time the trust's security measures are set up (e.g., 10,000 wallets created at the outset), at some intermediate point during the life of the trust, or at any other time where digital wallets are deemed necessary or desirous, e.g., to ensure that the amount of assets in any given wallet remains below some threshold.

At set up of a trust, seed baskets and/or initial baskets may be issued to one or more initial purchasers 210 in connection with the formation of the trust.

In embodiments, creations may involve the transfer of assets to the trust, and redemptions may involve the withdrawal of assets from the trust, as discussed herein. In embodiments, the trust may be passive, such as not actively managed, in which case it may be subject to the additions or reductions in the asset inventory caused by creations and/or redemptions. In embodiments, the trust may restrict issuance and/or redemption of shares to creation units. In embodiments, creation units may describe the specific number of shares that may be exchanged for digital assets of the same value. Creation units may be lot sizes of a pre-defined number of shares. In embodiments, creation units may be large lot sizes of shares. For example, in embodiments, a creation unit may be 10,000 shares, 20,000 shares, 30,000 shares, 40,000 shares, 50,000 shares, 75,000 shares, 100,000 shares, and/or some other denomination of shares. In embodiments, the creation unit may be based on some fractional amount of shares. In embodiments, a creation unit may correlate to a creation deposit (for creations) or withdrawal proceeds (for redemptions) that comprise a lot size of assets, securities, to name a few. For example, in embodiments a creation of 50,000 shares may correlate to a creation deposit of 10,000 digital assets (e.g., bitcoin). In embodiments, a creation unit may correlate to a creation deposit or withdrawal proceeds that comprise a lot size of fractional denominations of assets, e.g., 100 Satoshis, 200 Satoshis, 10,000 Satoshis, or some other denomination of Satoshi.

In embodiments, one or more creation units may be created in a process in which one or more creation deposits is transferred to the trust in exchange for issuance a specified set number of shares in the fund, e.g., 50,000 shares. For a redemption, as described herein, an AP may redeem one or more creation units in exchange for the related withdrawal proceeds and resulting in the cancellation of a corresponding set number of shares. In embodiments, an AP may only transact in whole creation units. Thus, the AP may only deposit assets equal to one or more whole creation units. Similarly, the AP may relinquish shares amounting to one or more whole creation units in order to redeem those creation units. In embodiments, transactions involving fractional amounts of a creation unit may be allowed.

Transactions may occur on a daily basis. In embodiments, transactions may occur multiple times each day. In embodiments, the frequency of transactions may be limited by rule so as to limit the number of transactions, e.g., one transaction per week, three transactions in a given month, to name a few. In embodiments, transactions may be limited by rule to occurring during certain time periods, such as only on a given day of the week (e.g., Mondays) or only on a given day of the month (e.g., the first day of the month), after 3 P.M., to name a few. In embodiments, transactions may be limited to occurring on business days.

The trust may accept only a single commodity, currency or other asset. In embodiments, multiple types of commodities, currencies or assets may be accepted, for example, like a basket currency model. Those in the art will appreciate that the asset may be a commodity, currency and/or other asset which may be physical, digital, or otherwise existing.

In embodiments, only an AP may obtain shares in the trust. Thus, in the primary market for shares only APs can participate. However, in a secondary market, APs may sell or otherwise transfer shares in whatever manner and for whatever consideration they choose. In embodiments, APs may sell shares for cash and/or other remuneration. A shareholder can own beneficial interest in shares in the trust. In embodiments, an AP's ability to transfer shares may be limited by securities laws, FINRA, and/or corporate compliance procedures, to name a few. Shares in a trust may include units of fractional undivided beneficial interest in and ownership of a trust.

Administration of the trust may involve the use of one or more accounts, including one or more custody accounts. In embodiments, referring to FIG. 15A, such accounts may include AP custody accounts 315, trust custody accounts 300, vault accounts 320, sponsor custody accounts 310, and/or trust expense accounts 305, to name a few.

Figure 15B:
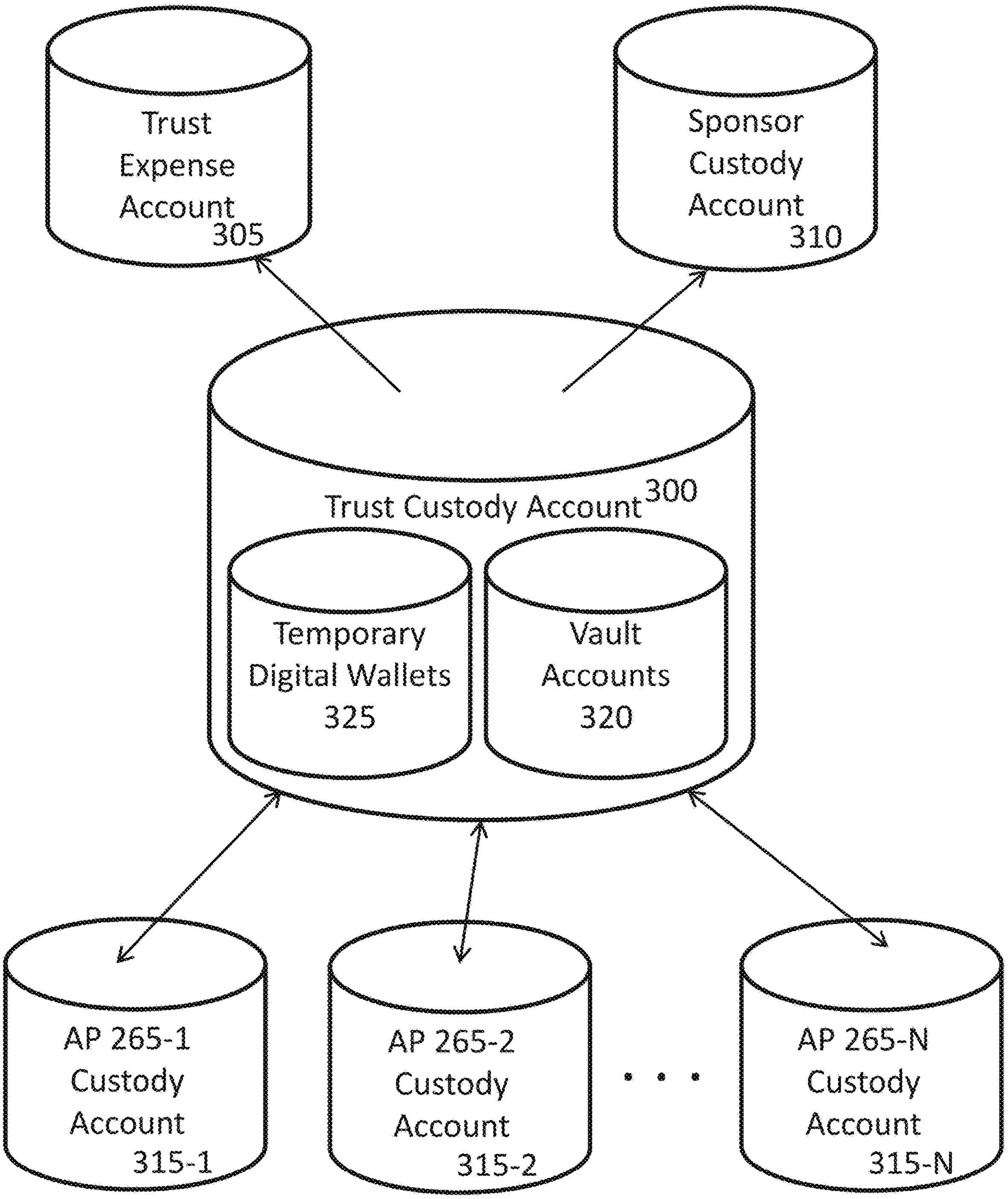

A custody account can be a segregated account operated by the trustee on behalf of another involved with the trust, e.g., sponsor or AP, to name a few. In embodiments, a custody account may be a digital wallet, a digital asset account, and/or a Bitcoin account. In embodiments, a custody account may be created, e.g., by the trustee, for each new transaction, e.g., creation, redemption, payment of sponsor's fee, to name a few. Referring to the exemplary embodiment illustrated in FIG. 15A, a trust custody account 300 may be owned by the trust. The trust custody account 300 may be the primary holder of the trust's assets, e.g., bitcoin. In an exemplary embodiment of the present invention, the trust custody account 300 may store public and private keys for one or more digital wallets holding the trust's digital assets, e.g., bitcoin. In embodiments, referring to FIG. 15B, the trust custody account 300 may comprise one or more temporary digital wallets 325 and/or one or more vault accounts 320. Vault accounts 320 may be digital wallets. Vault accounts 320 may be stored in a secure manner as discussed herein. Vault accounts 320 may be used for longer-term storage of digital assets. Temporary digital wallets 325 may be hot storage, which may be accounts and/or wallets that are accessed with greater frequency than vault accounts 320 in order to, for example, perform transactions. In embodiments, the trust custody account 300 may be a segregated account, segregating the assets it holds from all other assets held by the custodial operations of the trustee. The trust custody account 300 may facilitate the acceptance of creation deposits from an AP custody account 315, the distribution of assets, e.g., bitcoin, to an AP as part of a redemption, and/or the distribution of assets to a trust expense account 305 and/or a sponsor custody account 310. The trust expense account 305 may be owned by the trustee 215. In embodiments, a trust expense account 305 can be a segregated digital asset account, such as a segregated Bitcoin account, of the trustee 215 to which the trustee can transfer digital assets, e.g., bitcoin, from a trust custody account 300 in order to pay expenses of the trust not assumed by the sponsor 230. A trust expense account 305 can be established with the trustee 215 by a trust agreement.

In embodiments, trust expense account 305 may be used by the trustee 215 to pay extraordinary expenses that have not been assumed by the sponsor 230. Indirect payment of such expenses may occur when assets are distributed to the trustee's trust expense account 305. The trustee 215 may then sell or otherwise transfer assets from the trust expense account in order to satisfy expenses. A sponsor custody account 310 may be used to accept payments by the trust of a sponsor's fee. In embodiments, payments may be made in digital math-based assets, such as bitcoin. Payment of the sponsor's fee may be a periodic, e.g., monthly, event. One or more AP custody accounts 315-1 . . . 315-N may be owned by one or more APs, 265-1 . . . 265-N. AP custody account 315 may be used to receive deposits of assets from an AP for use in a creation, as detailed in FIGS. 17A and 17B and/or may be used to receive distributions of assets to an AP during a redemption, as detailed in FIG. 19A.

It should be appreciated by those of skill in the art that each of these accounts may be made up of one or more accounts, and/or one or more digital wallets.

Figure 16:
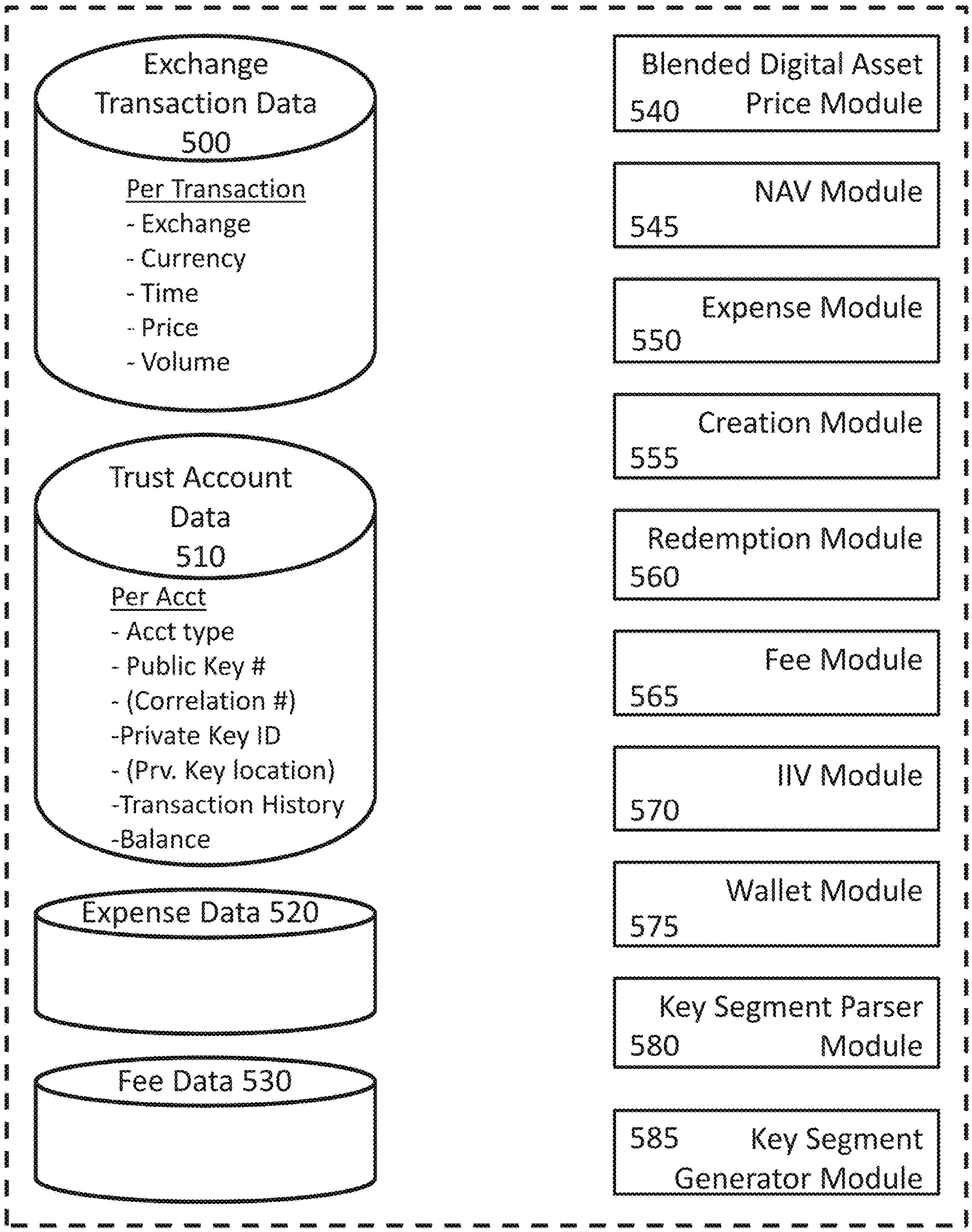
FIG. 16 is a block diagram of the data and modules in an exemplary embodiment of a trust computer system in accordance with the present invention.

The trustee and/or administrator and/or custodian may use one or more trust computers in performance of the processes and/or tasks described herein. A trust computer system may be located at an administrative portal. As illustrated in FIG. 16, a trust computer system may contain exchange transaction data 500, which may, for one or more transactions (e.g., each transaction), store exchange data, currency data, time data, price data, and/or volume data, to name a few. A trust computer system may contain trust account data 510, which may, for one or more accounts, store account types, public keys, correlation numbers, private keys and/or private key IDs (which may indicate the location of stored private keys and/or key segments), transaction history data, and/or account balance data, to name a few. A trust computer system may also contain expense data 520 and/or fee data 530.

Still referring to FIG. 16, a trust computer system may contain a blended digital asset price module 540, a NAV module 545, an expense module 550, a creation module 555, a redemption module 560, a fee module 565, an IIV module 570, a wallet module 575, a key parser module 580, and/or a key segment generator module 585, to name a few.

Investments Into ETP

In embodiment, the trust for the ETP can create and/or redeem shares from time to time. In some embodiments, the creation and/or redemption must be in whole baskets, e.g., a block of a fixed number of shares, e.g., 50,000 shares. The creation and/or redemption of baskets can require, respectively, the delivery to the Trust or the distribution from the Trust of the number of bitcoin represented by the baskets being created and/or redeemed, the amount of which can be based on the combined NAV of the underlying assets relating to the number of shares included in the baskets being created and/or redeemed. In embodiments, an initial number of bitcoin required for deposit with the Trust to create Shares can be a fixed amount per basket. In embodiments, the number of bitcoin required to create a basket or to be delivered upon the redemption of a basket may change over time, due to, e.g., the accrual of trust's expenses, the transfer of the trust's bitcoin to pay sponsor's fee and/or the transfer of the trust's bitcoin to pay any trust expenses not assumed by the Sponsor, to name a few.

In embodiments, the number of whole and fractional bitcoin in the deposit required for a basket ("Creation Basket Deposit") may be determined by dividing the number of bitcoin held by the trust by the number of baskets outstanding, as adjusted for the number of whole and fractional bitcoin constituting estimated accrued but unpaid fees and expenses of the trust. Fractions of a bitcoin smaller than a Satoshi (i.e., 0.00000001 of a bitcoin) which are included in the Creation Basket Deposit amount are disregarded in the foregoing calculation. All questions as to the composition of a Creation Basket Deposit will be conclusively determined by the Trustee. The Trustee's determination of the Creation Basket Deposit shall be final and binding on all persons interested in the Trust.

In embodiments, baskets may be created and/or redeemed only by APs, such as APs who pay a transaction fee for each order to create and/or redeem Baskets and/or have the right to sell the shares included in the Baskets they create to other investors. In embodiments, the Trust may or may not issue fractional baskets.

In embodiments, a method for purchasing shares of a trust associated with an exchange traded product holding digital math-based assets may comprise receiving, at a trust computer system from an AP computer system, a request from an AP to purchase shares in the trust; providing or creating, at the trust computers system, one or more digital wallets associated with a trust custody account to hold digital math-based assets, each digital wallet have a respective public key and a respective private key; providing, from the trust computer system to the AP computer system, each respective public key; receiving, at the trust computers systems, into the one or more digital wallets a first amount of digital math-based assets, from one or more digital wallets associated with an AP; sending, from the trust computer system to a digital asset network, an asset notification to provide for the asset transfer recorded on a public transaction ledger of a digital asset network to reflect the transfer of the first amount of digital math-based assets; receiving, at the trust computer system, confirmation from the digital asset network, that the transfer is valid; and sending instructions to a third-party clearing entity to transfer a first amount of shares in the trust to the AP.

Figure 17A:
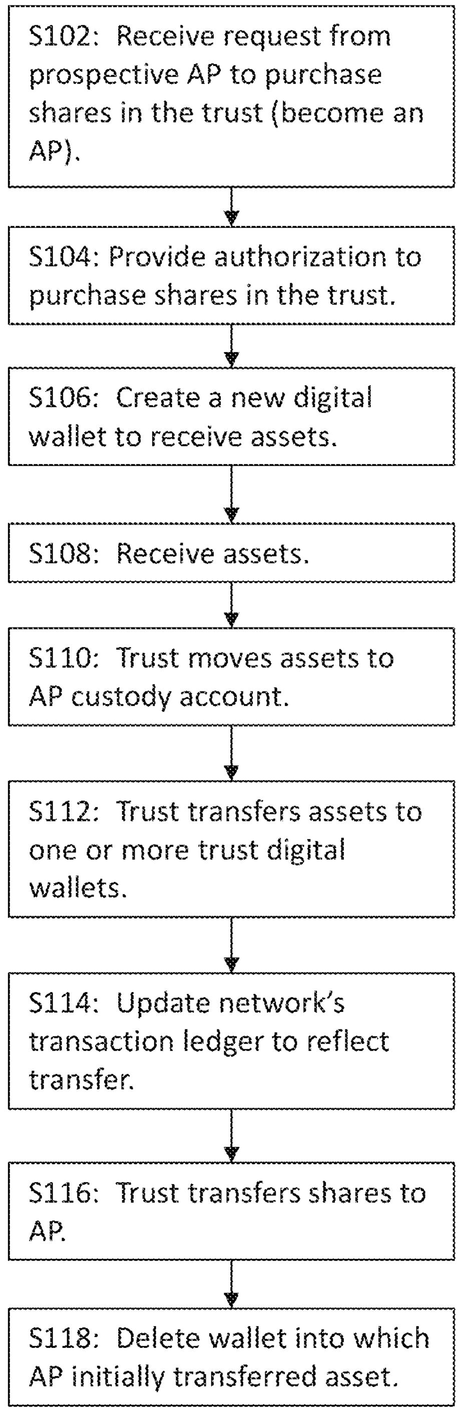
FIGS. 17A and 17B are flow charts of processes for investing in the trust in accordance with exemplary embodiments of the present invention.

FIG. 17A is a flow chart of a process for investing in the trust in accordance with exemplary embodiments of the present invention. In embodiments, the process depicted in FIG. 17A may be performed by the trustee, the administrator, the custodian, and/or one or more computers operated by one or more of those entities or another entity. In exemplary embodiments, in step S102, a request may be received from a prospective AP to become an AP and/or to purchase shares in the trust. At this point the prospective AP may be made an AP with the trust for the ETP. In a step S104, authorization may be provided, e.g., from the trustee, to purchase shares in the trust. In embodiments, step S104 may begin a settlement process. In embodiments, the settlement process will comprise a window, e.g., a 3-day window, during which an AP may hedge its position in the market. In embodiments, the AP may obtain digital assets amounting to a creation deposit to create the creation unit. For example, the AP may purchase bitcoin required for the creation deposit, or may otherwise have sufficient bitcoin, e.g., stored in a digital wallet, to settle a creation unit order. In a step S106, the trustee may create one or more new digital wallets to receive assets from an AP. In a step S108, the trust may receive assets, e.g., from an AP. In embodiments, the assets may comprise one or more creation units. In embodiments, the assets may be deposited by the AP directly into an AP custody account. Where assets are not deposited directly into an AP custody account, in a step S10 the trustee may move the assets into an AP custody account. In a step S112, the trustee may transfer assets to one or more trust digital wallets. In embodiments, these digital wallets may be vault digital wallets which may be intended to hold assets for long term storage. In a step S114, the trustee may send an asset notification to provide for the asset transfer recorded on a network's transaction ledger or may otherwise update or cause to be updated the network's transaction ledger to reflect the transfer. In step S116, the trustee may transfer or direct the transfer, e.g., by a third-party clearing agency 250 (e.g., the DTC), of shares in the trust to the AP. In step S118, the trustee may delete the wallet or wallets into which the AP initially transferred the assets.

In an exemplary embodiment, the fund asset can be a digital asset. In exemplary embodiments, the digital asset can be a bitcoin. To obtain shares in the trust, an AP may convert cash or anything of value to one or more digital assets. This conversion may be performed independently of the ETP or may be performed through an entity or system related to the ETP or may be performed through the ETP. In an exemplary embodiment, the AP obtains digital assets through an exchange. The AP may also have stored digital assets, e.g., an inventory of assets, which it may choose to deposit with the ETP. The AP may then deposit the digital assets with the ETP in exchange for one or more creation units of shares. Deposit of digital assets may occur via a public registry. The transfer of digital assets may occur as a peer-to-peer ("P2P") transaction, also known in the art as an end-user to end user transaction.

In embodiments, the AP may first place a creation order with the trustee, e.g., by transmitting the creation order to an administrative operations division of the trustee. In embodiments, as described above, shares may only be issued in creation units and/or in exchange for digital assets of predefined amounts. For example, one creation unit may consist of 50,000 shares and may be issued by the trustee in correlation with a deposit of the requisite amount of digital assets into the trust's account.

The trustee may accept the AP's creation order, which may begin a settlement period, e.g., a 3-day settlement period, during which the AP may engage in a settlement process. The settlement process may allow an AP time to hedge, with one possible goal being to avoid or limit risk. In embodiments, no-limit risk may be applicable. In embodiments, a goal of the hedging process may be to protect, e.g., from price movements, the AP's position in the digital assets being delivered to the trust.

In embodiments, the trustee, using one or more computers, may establish one or more digital wallets for each creation. In embodiments, the one or more digital wallets may comprise an AP custody account, which may receive assets deposited by an AP. In embodiments, an AP custody account may remain open throughout the process, and new digital wallets within the account may be created as needed and/or desired to fulfill orders and allow transfers. In embodiments, the trust may provide its own digital wallet system, which may include an interface and a programmed back end, or the trust may use an existing system. In embodiments, an AP may identify the public address of the digital wallet from which it will transfer assets to the trust.

At or before the close of the settlement window, the AP may instruct the trustee to transfer the required digital assets from the AP custody account for deposit into the trust. Upon such transfer from the AP to the trust, the AP may have satisfied its obligation. The trust, through a third-party clearing agency 250 (e.g., the DTC), may then issue shares in the required number of creation units to the AP.

In an exemplary embodiment, digital assets may be transferred from the AP to the trust by transferring the assets first from the AP's one or more outside digital wallets to the AP custody account's one or more digital wallets and, second, from the AP custody account's one or more digital wallets to the trust custody account's one or more digital wallets. In embodiments, both the transferor and the transferee's digital wallets may be required to report the transaction(s) to a registry or other system or entity in order for the transaction(s) to complete. In embodiments, there may be a time window within which both wallets must report the transaction(s). In embodiments, a transaction ledger will be updated to reflect the transfer(s).

Figure 17B:
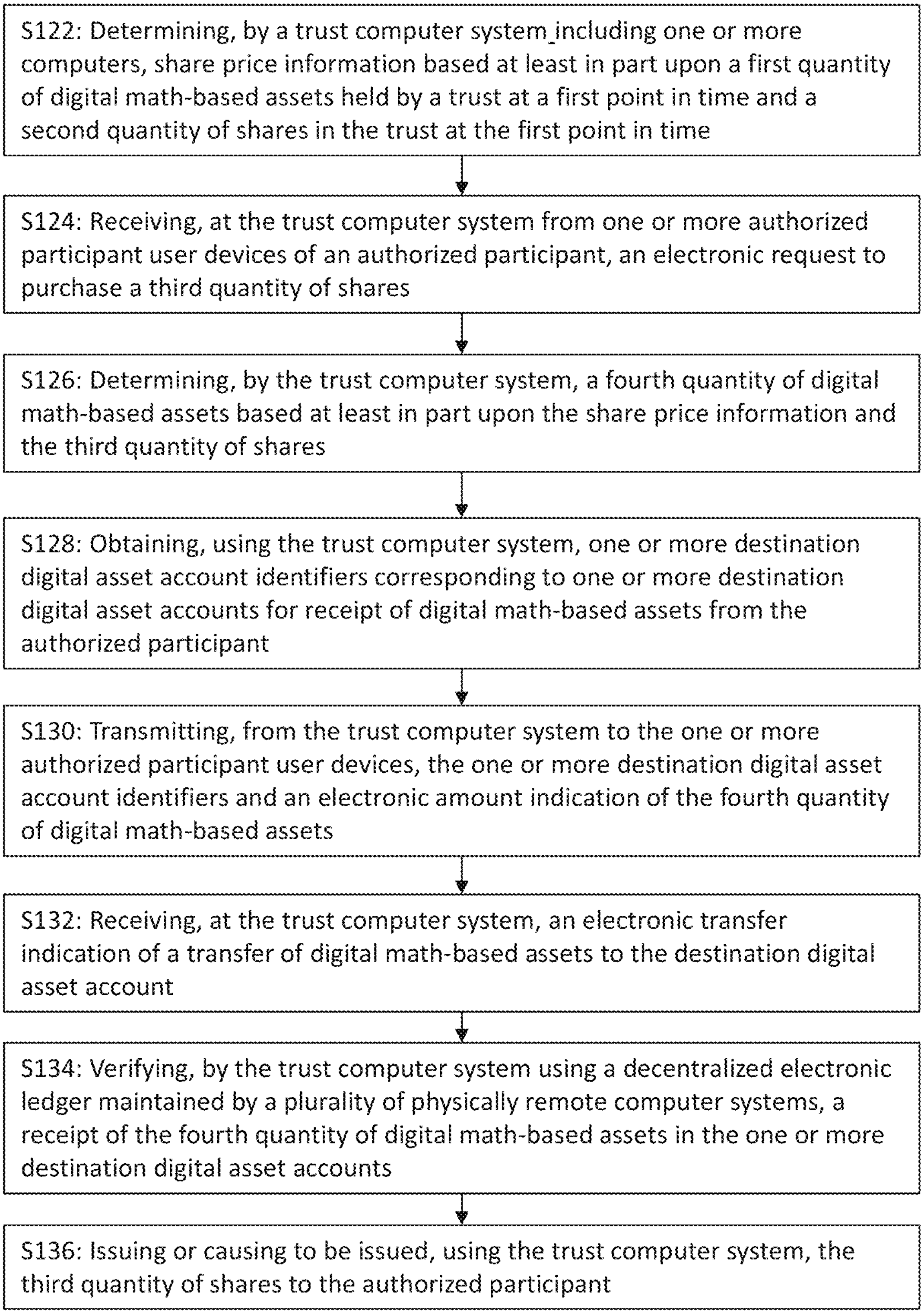

FIG. 17B is a flow chart of a process for investing in the trust in accordance with exemplary embodiments of the present invention. In embodiments, the process depicted in FIG. 17B may be performed by the trustee of the trust, the administrator of the trust on behalf of the trust, the custodian, and/or one or more computers operated by one or more of those entities or another entity. In exemplary embodiments, in step S122, a trust computer system including one or more computers may determine share price information based at least in part upon a first quantity of digital math-based assets held by a trust at a first point in time and a second quantity of shares in the trust at the first point in time. In embodiments, the share price information may then be transmitted from the trust computer system to the one or more authorized participant user devices. In embodiments, the step S122 may further comprise the steps of determining, by the trust computer system, a fifth quantity of digital math-based assets held by the trust that are attributable to shareholders; determining, by the trust computer system, a sixth quantity of digital math-based assets by subtracting from the fifth quantity a seventh quantity of digital math-based assets associated with trust expenses; and dividing the sixth quantity by an eighth quantity of outstanding shares. In embodiments, the share price information, may be a quantity of digital math-based assets per share and/or per a basket of shares corresponding to a number of shares associated with one creation unit of shares. In embodiments, the basket of shares may comprise one or more quantities of shares selected from the group consisting of: 5,000 shares, 10,000 shares, 15,000 shares, 25,000 shares, 50,000 shares, and 100,000 shares.

In a step S124, the trust computer system may receive, from one or more authorized participant user devices of an authorized participant, an electronic request to purchase a third quantity of shares.

In a step S126, the trust computer system may determine a fourth quantity of digital math-based assets based at least in part upon the share price information and the third quantity of shares.

In a step S128, the trust computer system may be used to obtain one or more destination digital asset account identifiers corresponding to one or more destination digital asset accounts for receipt of digital math-based assets from the authorized participant. In embodiments, the one or more destination digital asset account identifiers may comprise one or more digital asset account addresses and/or public keys.

In a step S130, the one or more destination digital asset account identifiers and an electronic amount indication of the fourth quantity of digital math-based assets may be transmitted from the trust computer system to the one or more authorized participant user devices.

In a step S132, an electronic transfer indication of a transfer of digital math-based assets to the destination digital asset account may be received at the trust computer system. In embodiments, the electronic transfer indication may further comprise an identification of one or more origin digital asset accounts.

In a step S134, the trust computer system may verify, using a decentralized electronic ledger maintained by a plurality of physically remote computer systems, a receipt of the fourth quantity of digital math-based assets in the one or more destination digital asset accounts. In embodiments, step S134 may further comprise the steps of accessing, using the trust computer system, a plurality of updates to the decentralized electronic ledger; analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger. In embodiments, the plurality of updates to the decentralized electronic ledger may comprise new blocks added to a bitcoin blockchain.

In a step S136, the trust computer system may be used to issue or cause to be issued the third quantity of shares to the authorized participant.

In embodiments, the process depicted in FIG. 17B may further comprise the step of transferring, using the trust computer system, the fourth quantity of digital math-based assets into one or more digital asset accounts associated with a trust custody account. In further embodiments, the process depicted in FIG. 17B may further comprise the step of transmitting, from the trust computer system to the one or more authorized participant user devices, an electronic receipt acknowledgement indicating the receipt of the fourth quantity of digital math-based assets. In still further embodiments, the process depicted in FIG. 17B may further comprise the step of transmitting or causing to be transmitted, to the one or more authorized participant user devices, an electronic share issuance indication of the issuing of the third quantity of shares.

In embodiments a system for determining and/or providing a blended digital math-based asset price can comprise one or more processors and one or more computer-readable media operatively connected to the one or more processors and having stored thereon instructions for carrying out the steps of: (i) determining, by a trust computer system including one or more computers, share price information based at least in part upon a first quantity of digital math-based assets held by a trust at a first point in time and a second quantity of shares in the trust at the first point in time; (ii) receiving, at the trust computer system from one or more authorized participant user devices of an authorized participant, an electronic request to purchase a third quantity of shares; (iii) determining, by the trust computer system, a fourth quantity of digital math-based assets based at least in part upon the share price information and the third quantity of shares; (iv) obtaining, using the trust computer system, one or more destination digital asset account identifiers (e.g., one or more digital asset account addresses, and/or one or more digital asset account public keys, to name a few) corresponding to one or more destination digital asset accounts for receipt of digital math-based assets from the authorized participant; (v) transmitting, from the trust computer system to the one or more authorized participant user devices, the one or more destination digital asset account identifiers and an electronic amount indication of the fourth quantity of digital math-based assets; (vi) receiving, at the trust computer system, an electronic transfer indication of a transfer of digital math-based assets to the destination asset account; (vii) verifying, by the trust computer system using a decentralized electronic ledger maintained by a plurality of physically remote computer systems, a receipt of the fourth quantity of digital math-based assets in the one or more destination digital asset accounts; and (viii) issuing or causing to be issued, using the trust computer system, the third quantity of shares to the authorized participant.

Deposit Distribution Waterfalls Among Wallets

The creation process involves the deposit of digital assets into the trust's accounts. During a creation, assets or other funds may be deposited into one or more trust accounts. In embodiments, a trust may limit the number of assets or amount of funds stored in each of its wallets, e.g., for security reasons to reduce exposure if any one wallet is compromised. In multi-wallet structures, various asset distributions among the wallets are possible, and various distribution methods or waterfalls may be employed.

In embodiments, wallets may be filled in a pre-determined order. In embodiments, wallets may be filled according to one or more desired capacities or account balances, e.g., deposit 10,000 bitcoin in each wallet before proceeding to deposit in the next wallet.

Figure 18A:
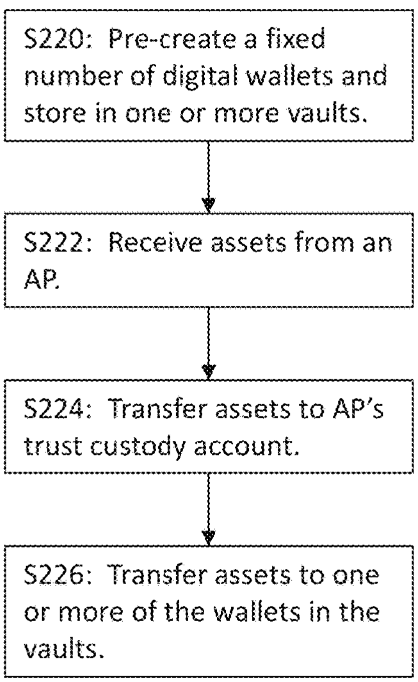
FIGS. 18A-18D are flow charts of various exemplary processes for assigning digital math-based assets, such as bitcoin, obtained during a creation and distributing them among digital wallets in accordance with embodiments of the present invention.
Figure 18B:
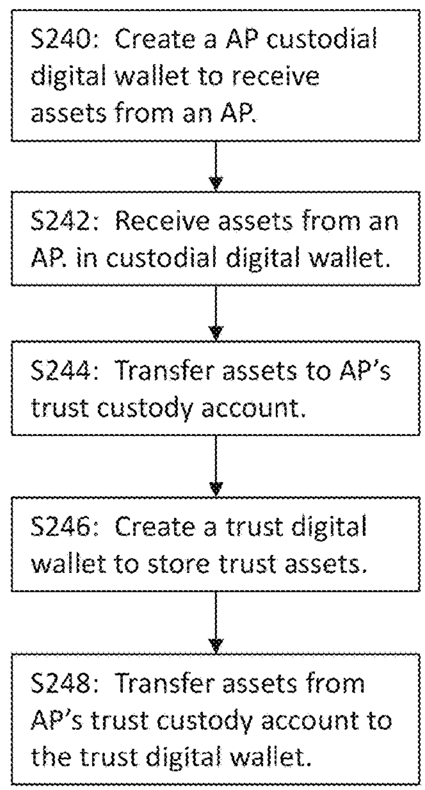

FIGS. 18A and 18B are flow charts of various exemplary processes for assigning digital assets (e.g., bitcoin) obtained at creation and distributing them among digital wallets in accordance with embodiments of the present invention.

For example, with reference to FIG. 18A, an exemplary creation distribution waterfall is illustrated. In embodiments, these steps may be performed using AP computer systems, operated by one or more APs requesting creation units, and trust computer systems, operated by the trustee, custodian and/or administrator on behalf of the trust.

In step S220, a fixed number of digital wallets to be stored in one or more vaults can be created in advance of anticipated use. In creating the digital wallets, as described herein e.g., in relation to FIG. 5A, the private key for each wallet may be parsed into two or more segments and/or encoded and stored in paper form. In embodiments, the key segments may be further encrypted before storing in paper form. The corresponding public key may be kept readily available for the administrator and/or custodian to access.

In step S222, an AP using an AP computer system can send to the trustee, custodian and/or administrator using a trust computer system, which in turn receives, assets (e.g., digital math assets such as bitcoin) to be deposited into the trust. For example, the trust computer system can send electronically to the AP computer system a public key associated with a trust custody account to receive the digital assets. The AP can then enter the public key into an AP digital wallet on the AP computer system to send the required digital assets (e.g., bitcoin) from the AP account to the trust custody account using the AP's private key and the public key associated with the trust custody account. The trust computer system can then acknowledge (e.g., electronically) receipt of the transferred digital assets in the trust custody account. In embodiments, one or more AP accounts and/or one or more trust custody accounts can be used. The trust custody account can be an AP custody account and/or a vault account, as appropriate, to name a few.

In embodiments, in step S224, after receipt of digital assets deposited into the trust, digital assets deposited by an AP into the trust, can be transferred using the trust computer system to one or more digital wallets associated with an AP trust custody account. In embodiments, the initial transfer of assets may be made directly one or more AP accounts into one or more AP custody accounts.

In step S226, the digital assets in the digital wallets associated with the AP trust custody account may be transferred using the trust computer system in whole or part into one or more of the previously created digital wallets whose private key segments are stored in vaults. In embodiments, the digital assets may be distributed by the trust computer system to trust wallets, such as discussed in the context of FIG. 18B herein, or according to another distribution algorithm.

With reference to FIG. 18B, an exemplary creation distribution waterfall is illustrated. In embodiments, these steps may be performed using AP computer systems, operated by one or more APs requesting creation units, and trust computer systems, operated by the trustee, custodian and/or administrator on behalf of the trust.

In step S240, an AP custodial digital wallet can be created using the trust computer system to receive assets from an AP digital wallet on an AP computer system.

In step S242, an AP using an AP computer system can send to the trustee, custodian and/or administrator using a trust computer system (which in turn receives) assets (e.g., digital math assets such as bitcoin) to be deposited into the trust. For example, the trust computer system can send electronically to the AP computer system a public key associated with a trust custody account to receive the digital assets. The AP can then enter the public key into an AP digital wallet on the AP computer system to send the required digital assets (e.g., bitcoin) from the AP account to the trust custody account using the AP's private key and the public key associated with the trust custody account. The trust computer system can then acknowledge (e.g., electronically) receipt of the transferred digital assets in the trust custody account. In embodiments, one or more AP accounts and/or one or more trust custody accounts can be used. The trust custody account can be an AP custody account and/or a vault account, as appropriate, to name a few.

In step S244, after receipt of digital assets deposited into the trust, digital assets deposited by an AP into the trust, can be transferred using the trust computer system to one or more digital wallets associated with an AP trust custody account. In embodiments, the initial transfer of assets may be made directly one or more AP accounts into one or more AP custody accounts.

In embodiments, the creation distribution methodology/algorithm can depend at least in part upon one or more of the following criteria or parameters:

- setting a maximum amount of digital assets stored in each wallet (e.g., limiting to 10,000 bitcoin in each wallet);
- setting a minimum amount of digital assets stored in each wallet (e.g., at least 100 bitcoin in each wallet);
- setting a maximum ratio of maximum amount to minimum amount of digital assets stored in each wallet (e.g., a 10-to-1 ratio);
- setting a random amount of digital assets to be stored in each wallet, wherein the random amount is greater than a minimum amount and less than a maximum amount;
- limiting the number of uses of each wallet (e.g., never using the same wallet more than once);
- resetting the maximum amount and the minimum amount of digital assets stored in each wallet based at least in part on increased or decreased volume of digital assets held by the trust;
- setting a maximum amount of digital assets transferred to each wallet in any given transaction (e.g., limiting to 10,000 bitcoin in each wallet);
- setting a minimum amount of digital assets transferred to each wallet in any given transaction (e.g., at least 100 bitcoin in each wallet);
- setting a maximum ratio of maximum amount to minimum amount of digital assets transferred to each wallet in any given transaction (e.g., a 10-to-1 ratio);
- setting a random amount of digital assets to be transferred to each wallet in any given transaction, wherein the random amount is greater than a minimum amount and less than a maximum amount;
- limiting the number of transfers to a given wallet (e.g., never using the same wallet more than once, never make more than two transfers to the same wallet during a year period, to name a few);
- resetting the maximum amount and the minimum amount of digital assets transferred to and/or from each wallet based at least in part on increased or decreased volumes of digital assets held by the trust; and/or
- performing transfers to one or more wallets, e.g., vault wallets, at random and/or varied times of day (e.g., make a transfer at 4:00 PM ET on one day and make a transfer at 4:18 PM ET the following day; make a transfer to one wallet at 4:00 PM ET and another wallet at 5:13 PM ET the same day).

Figure 18C:
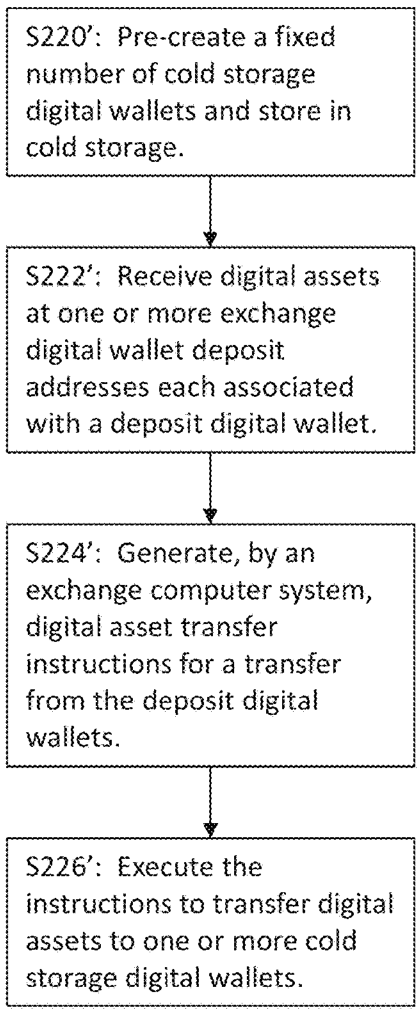

With reference to FIG. 18C, an exemplary deposit distribution waterfall is illustrated. In embodiments, these steps may be performed using an exchange computer system.

In step S220', a fixed number of digital wallets to be stored in one or more vaults can be created in advance of anticipated use. In generating the digital wallets, as described herein e.g., in relation to FIG. 5A, the private key for each wallet may be parsed into two or more segments and/or encoded and stored in paper form. In embodiments, the key segments may be further encrypted before storing in paper form. In embodiments, the private keys, which can include multiple private keys for multi-signature wallets, may be stored electronically, e.g., on non-transitory computer-readable memory. The corresponding public key may be kept readily available for an exchange employee and/or private key custodian to access. In embodiments, cold storage wallet private keys may be stored remotely, e.g., in a bank vault, bank safety deposit box, and/or precious metal vault. In embodiments, cold storage wallet private keys may be stored in a locked room and/or in a safe, which may be located at the premises of exchange employees.

In step S222', an exchange user using computer system or user device can send to a deposit address associated with a deposit digital wallet maintained by the exchange, which in turn receives, assets (e.g., digital math assets such as bitcoin) to be deposited with the exchange. For example, the exchange computer system can send electronically to the user device a public key or deposit address associated with an exchange deposit wallet to receive the digital assets. The user can then enter the public key or address into a user digital wallet on the user device to send the digital assets (e.g., bitcoin) to the exchange deposit wallet using a private key associated with the user digital wallet and the address associated with the exchange deposit wallet. The exchange computer system can then acknowledge (e.g., electronically) receipt of the transferred digital assets in the deposit wallet. In embodiments, one or more private keys associated with deposit digital wallets may be stored in cold storage.

In embodiments, in step S224', the exchange computer system may generate digital asset instructions (e.g., machine-readable instructions comprising at least a destination digital wallet address) for a transfer from the deposit digital wallet to one or more cold storage wallets.

In step S226', the digital assets in the deposit digital wallets may be transferred using the exchange computer system in whole or part into one or more of the previously created cold storage digital wallets whose private key segments are stored in cold storage. In embodiments, the digital assets may be distributed by the exchange computer system to exchange digital wallets, such as discussed in the context of FIG. 18D herein, or according to another distribution algorithm.

Figure 18D:
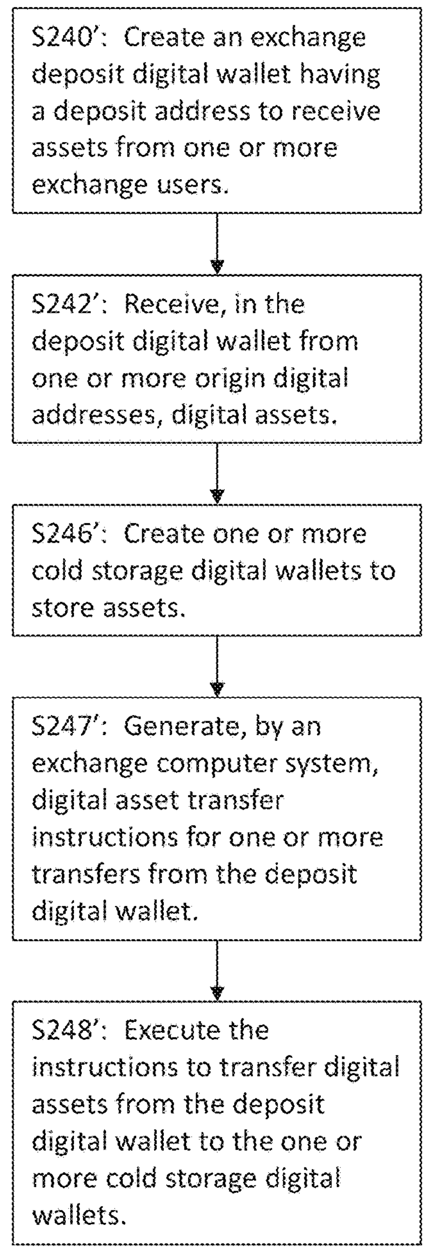

With reference to FIG. 18D, an exemplary deposit distribution waterfall is illustrated. In embodiments, these steps may be performed using an exchange computer system.

In step S240', an exchange deposit digital wallet can be created using the exchange computer system to receive assets from one or more user digital wallets.

In step S242', digital assets may be received in the deposit digital wallet from one or more origin digital addresses (e.g., corresponding to exchange user digital wallets).

In step S246', one or more cold storage digital wallets may be created to store digital assets. In embodiments, such cold storage digital wallets may already exist and be stored according to the secure storage systems and methods described herein.

In a step S247', the exchange computer system may generate digital asset transfer instructions for transfers from the deposit digital wallet. The transfer instructions may be generated based at least in part upon a distribution algorithm. In embodiments, the deposit distribution methodology/algorithm can depend at least in part upon one or more of the following criteria or parameters:

- setting a maximum amount of digital assets stored in each wallet (e.g., limiting to 10,000 bitcoin in each wallet);
- setting a minimum amount of digital assets stored in each wallet (e.g., at least 100 bitcoin in each wallet);

setting a maximum ratio of maximum amount to minimum amount of digital assets stored in each wallet (e.g., a 10-to-1 ratio);

setting a random amount of digital assets to be stored in each wallet, wherein the random amount is greater than a minimum amount and less than a maximum amount;

limiting the number of uses of each wallet (e.g., never using the same wallet more than once);

resetting the maximum amount and the minimum amount of digital assets stored in each wallet based at least in part on increased or decreased volume of digital assets held by the exchange;

setting a maximum amount of digital assets transferred to each wallet in any given transaction (e.g., limiting to 10,000 bitcoin in each wallet);

setting a minimum amount of digital assets transferred to each wallet in any given transaction (e.g., at least 100 bitcoin in each wallet);

setting a maximum ratio of maximum amount to minimum amount of digital assets transferred to each wallet in any given transaction (e.g., a 10-to-1 ratio);

setting a random amount of digital assets to be transferred to each wallet in any given transaction, wherein the random amount is greater than a minimum amount and less than a maximum amount;

limiting the number of transfers to a given wallet (e.g., never using the same wallet more than once, never make more than two transfers to the same wallet during a year period, to name a few);

resetting the maximum amount and the minimum amount of digital assets transferred to and/or from each wallet based at least in part on increased or decreased volumes of digital assets held by the exchange; and/or performing transfers to one or more wallets, e.g., vault wallets, at random and/or varied times of day (e.g., make a transfer at 4:00 PM ET on one day and make a transfer at 4:18 PM ET the following day; make a transfer to one wallet at 4:00 PM ET and another wallet at 5:13 PM ET the same day).

In a step S248', the digital asset transfer instructions may be executed using the exchange computer system to transfer digital assets from the deposit digital wallet to the one or more cold storage digital wallets.

Redemptions From ETP

In embodiments a method for redeeming shares in a trust associated with an exchange traded product holding digital math-based assets may comprise receiving, at a trust computer system from an AP computer system, a redemption order from an AP to redeem a first number of shares in the trust; determining, using the trust computer system, one or more trust wallets to access to satisfy the redemption order; generating, using the trust computer system, instructions to a custodian to retrieve at least one copy of each private key segment corresponding to the one or more trust wallets; sending the instructions to the custodian; reassembling, using the trust computer system, the one or more trust wallets using the at least one copy of each private key segment; transferring, using the trust computer system, from the one or more trust wallets a first number of digital math-based assets to an AP wallet associated with the AP; generating, using the trust computer system, instructions to the third-party clearing agency to cancel the first number of shares in the trust of the AP; and sending the instructions to the third-party clearing agency. In embodiments, the trustee using the trust computer system may approve the redemption order and/or send confirmation (e.g., electronically) of the order.

In embodiments, the redemption distribution from the trust may consist of a transfer to the redeeming AP's Authorized Participant Custody Account of the number of the bitcoin held by the trust in the Trust Custody Account evidenced by the shares being redeemed. In embodiments, fractions of a bitcoin included in the redemption distribution smaller than a Satoshi (i.e., 0.00000001 of a bitcoin) may be disregarded. In embodiments, redemption distributions may be subject to the deduction of any applicable tax or other governmental charges that may be due.

Figure 19A:
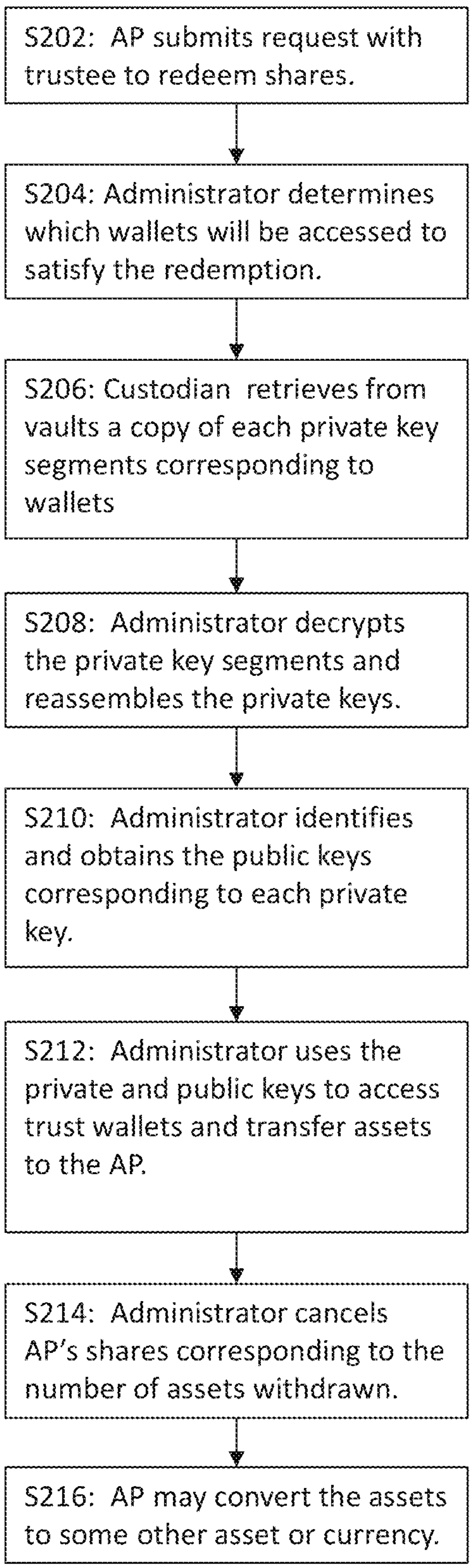
FIGS. 19A and 19B are flow charts of processes for redeeming shares in the trust in accordance with exemplary embodiments of the present invention.

FIG. 19A is a flow chart of a process for redeeming shares in the trust in accordance with exemplary embodiments of the present invention. In embodiments, the processes depicted in FIG. 19A may be performed by the trustee, the administrator, the custodian, and/or a trust computer system comprising one or more computers operated by one or more of those entities or another entity.

In step S202, the trust computer system may receive a request, e.g., a redemption order, from an AP computer system for an AP to redeem shares in the trust. In embodiments, the trustee using the trust computer system may approve the redemption order and/or send confirmation (e.g., electronically) of the order. In embodiments, a settlement process entailing, for example, a 3-day settlement window, may be triggered. Other durations of settlement periods may be used as convenient. In embodiments, the trust computer system may receive from the AP computer system one or more public keys associated with AP wallets and/or AP accounts to which redemption proceeds are designated by the AP to be distributed. For example, public key information may be sent electronically from the AP computer system to the trust computer system using, e.g., a digital wallet, e-mail, text message, a digital asset exchange, electronic communications, to name a few. In embodiments, the trustee may designate one or more existing trust custody wallets and/or create one or more new wallets using the trust computer system to be used as AP custody accounts. In embodiments, the trustee may determine the number of digital assets (e.g., bitcoin) required for the redemption, e.g., by using the trust computer system to multiply the number of shares to be redeemed by the NAV value per share less any transaction fees associated with the redemption. In embodiments, depending upon the timing of the redemption, an ANAV value per share may be used in lieu of the NAV value per share. The trust may request and/or receive, e.g., through the third-party clearing agency 250 (e.g., the DTC), shares to be redeemed.

In step S204, the trust computer system may determine one or more wallets to access to satisfy the redemption. The determination as to how many and which wallets should be used to redeem assets may be based at least in part on one or more of the parameters discussed herein (see, e.g., Redemption Distribution Waterfalls Among Wallets).

In step S206, the trustee may instruct the custodian to retrieve from one or more vaults a copy of each private key segment comprising one or more private keys corresponding to the digital wallets that will be accessed to satisfy the redemption. In embodiments, special security measures may be implemented to limit the risk of one or more key segments being lost, damaged and/or stolen in transport. For example, bonded armored cars can be used to transport key segments. The timing of key segment retrieval and transport may be spaced so that only one segment is transported at a time. The timing and/or route of retrieval may also be randomized and/or varied to avoid predictability of transport of key segments from the vault to the administrative portal.

In step S208, the trustee, administrator and/or custodian using the trust computer system may use the retrieved private key segments to reassemble the private keys. In embodiments, this may be performed by decrypting the private key segments and reassembling the segments into a complete private key. In embodiments, the retrieved private key segments may be scanned using key reader 40, and decrypted (as necessary) using decryption software on the isolated computer 30 as part of the trust computer system, and combined and associated with the corresponding public key to regenerate a trust wallet.

Figure 19B:
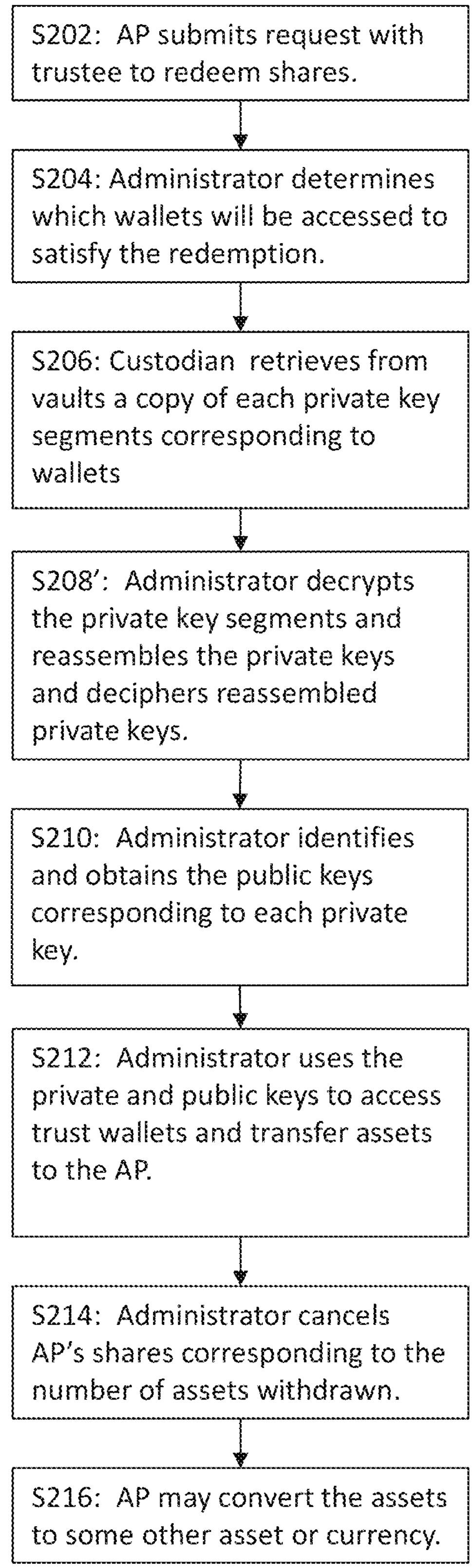

In embodiments, as described in a step S208' in FIG. 19B, the trustee, administrator, and/or custodian using the trust computer system may decrypt the private key segments, reassemble the key segments into full keys, and/or reverse any cipher that was previously applied. In embodiments, these sub-steps of step S208' may be performed in any order which will result in a properly reassembled private key. In embodiments, they are performed in the reverse order of the steps used to secure and store the keys. In embodiments, the key segments are decrypted first, then reassembled into a complete key, then deciphered. The complete deciphered key may then be used to access and/or transact using a digital wallet.

In step S210, the trust computer system may identify and/or correlate the one or more private keys with the associated public keys to create one or more digital wallets to access the digital assets. In embodiments, preassembled wallets may be generated on one or more isolated transaction computers 32 to hold public key and private key information and transfer instructions awaiting closing. In embodiments, the use of preassembled wallets may expedite the wallet generation process associated with digital math based assets. In embodiments, the trust computer system may include one or more digital asset miners (e.g., bitcoin miners) to allow for prompt transfer of ledger information to reassembled digital wallets. In embodiments, digital math-based assets earned by the digital asset miners may be added to the trust and/or paid to the administrator and/or sponsor as a fee.

In step S212, the trust computer system may reassemble, regenerate, or otherwise access the one or more trust custody account digital wallets (which may, in embodiments, be vault wallets) using the private and/or public keys. The trust computer system may transfer, from the one or more vault wallets to one or more digital wallets in the AP custody account, the assets being redeemed, and then transfer such assets being redeemed to the AP's one or more outside digital wallets. In embodiments, the AP wallet may be an AP custodial wallet. In embodiments, the trust computer system may delete or destroy one or more wallets involved in the transaction, e.g., the AP custody wallet and/or any vault wallets that were emptied, to name a few.

In step S214, the trustee may cancel and/or instruct to cancel, e.g., using the third-party clearing agency 250 (e.g., DTC), the AP's shares corresponding to the number of assets withdrawn and delivered to the AP.

In embodiments, in step S216, the AP may convert the assets to some other asset or currency or use them to conduct one or more transactions.

In embodiments, security measures, such as described with respect to FIG. 8, may be implemented. In embodiments, a wallet created on the isolated computer 30 may be copied in part to create a watching wallet that may create unsigned transactions and/or broadcast already signed transactions. In embodiments, the watching wallet may not contain private key data. The watching wallet may be loaded onto the networked computer 20. The networked computer 20 may then be used to create one or more unsigned transactions. The unsigned transaction data may be transferred from the networked computer 20 to the isolated computer 30. Such transfer may be manual, such as by downloading the unsigned transaction data to a removable storage device comprising computer readable medium (e.g., a USB flash drive, CD, CD-ROM, DVD, removable hard drive, disk, memory card, to name a few), physically disconnecting the storage device from the networked computer 20, operatively connecting the storage device to the isolated computer 30, and uploading the unsigned transaction data to the isolated computer 30. In embodiments, networked computer 20 may be connected, directly or indirectly, to isolated computer 30, which connection may comprise security measures, such as a firewall, designed to prevent unauthorized access of the isolated computer 30. After receiving the unsigned transaction data, the digital wallet on the isolated computer 30 may be used to sign the transaction. The signed transaction data may then be transferred from the isolated computer 30 to the networked computer 20 in any of the manners described herein. The networked computer 20 may then broadcast the signed transaction data to the network, which may complete the transaction.

FIG. 19C is a flow chart of another exemplary process for redemption of shares in an ETP.

In a step S2022, a trust computer system comprising one or more computers may determine share price information based at least in part upon a first quantity of digital math-based assets held by a trust at a first point in time and a second quantity of shares in the trust at the first point in time. In embodiments, the share price information may be transmitted to one or more authorized participant user devices. The share price information can comprise a net asset value per share, an adjusted net asset value per share, and/or a net asset value per a basket of shares (e.g., where the number of shares comprising the basket of shares may be associated with one creation unit of shares), to name a few. In embodiments, the basket of shares can comprise any of 5,000 shares, 10,000 shares, 15,000 shares, 25,000 shares, 50,000 shares, or 100,000 shares, to name a few.

In a step S2024, the trust computer system may receive from one or more authorized participant user devices of an authorized participant, an electronic request (e.g., a redemption order) to redeem a third quantity of shares.

In a step S2026, the trust computer system may determine a fourth quantity of digital math-based assets based at least in part upon the share price information and the third quantity of shares. Determining the fourth quantity of digital assets can comprise obtaining a net asset value per share; determining a digital math-based asset value of the third quantity of shares based upon the net asset value per share; determining transaction fees (e.g., denominated in a unit of the digital math-based asset) and/or expenses associated with the electronic request to redeem shares; and determining the fourth quantity of digital math-based assets by subtracting the transaction fees from the digital math-based asset value of the third quantity of shares.

In a step S2028, the trust computer system may obtain one or more destination digital asset account identifiers corresponding to one or more destination digital asset accounts for receipt by the authorized participant of a transfer of the fourth quantity of digital math-based assets from the trust. The destination digital asset accounts may correspond to an authorized participant custody account.

In a step S2030, the trust computer system may obtain one or more origin digital asset account identifiers corresponding to one or more origin digital asset accounts for the transfer. In embodiments, the origin digital asset accounts may be securely stored accounts, as described herein. The origin digital asset accounts may correspond to a trust custody account.

In a step S2032, the trust computer system may initiate the transfer of the fourth quantity of digital math-based assets from the one or more origin digital asset accounts to the one or more destination digital asset accounts. Initiating a transfer of assets from the trust can comprise retrieving or causing to be retrieved (e.g., issuing retrieval instructions) one or more private keys associated with the one or more origin digital asset accounts, and accessing the one or more origin digital asset accounts using at least the one or more private keys.

Retrieving keys can comprise issuing retrieval instructions for retrieving a plurality of encrypted private keys corresponding to the one or more origin digital asset accounts; receiving, at the trust computer system, the plurality of encrypted private keys; and obtaining, using the trust computer system, one or more private keys by decrypting the plurality of private keys.

In other embodiments, retrieving keys can comprise issuing, using the trust computer system, retrieval instructions for retrieving a plurality of private key segments corresponding to the one or more origin digital asset accounts; receiving, at the trust computer system, the plurality of private key segments; and obtaining, using the trust computer system, one or more private keys by assembling the plurality of private keys.

In still other embodiments, retrieving keys can comprise issuing, using the trust computer system, retrieval instructions for retrieving a plurality of encrypted private key segments corresponding to the one or more origin digital asset accounts; receiving, at the trust computer system, the plurality of encrypted private key segments; and obtaining, using the trust computer system, one or more private keys by decrypting the plurality of private key segments and assembling the segments into one or more private keys.

For a multi-signature digital asset account, retrieving keys can comprise issuing, using the trust computer system, retrieval instructions for retrieving a plurality of encrypted private key segments corresponding to the one or more origin digital asset accounts; receiving, at the trust computer system, the plurality of encrypted private key segments; obtaining, using the trust computer system, one or more first private keys by decrypting the plurality of private key segments and assembling the segments into one or more first private keys; and obtaining, using the trust computer system, at least one second private key corresponding to the one or more origin digital asset accounts.

In a step S2034, the trust computer system may broadcast the transfer to a decentralized electronic ledger maintained by a plurality of physically remote computer systems.

In a step S2036, the trust computer system may verify, using the decentralized electronic ledger, a receipt of the fourth quantity of digital math-based assets at the one or more destination digital asset accounts. Transaction verification can comprise accessing, using the trust computer system, a plurality of updates to the decentralized electronic ledger (e.g., new blocks added to a bitcoin blockchain); analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger.

In a step S2038, the trust computer system may cancel or cause to be canceled (e.g., by issuing instructions to a third-party clearing agency) the third quantity of shares from the authorized participant.

In embodiments, the process can include determination of and/or institution of a settlement period associated with the electronic request to redeem shares.

In embodiments, the trust computer system may be operated by a trustee and/or an administrator of the trust.

In embodiments a system for determining and/or providing a blended digital math-based asset price can comprise one or more processors and one or more computer-readable media operatively connected to the one or more processors and having stored thereon instructions for carrying out the steps of (i) determining, by a trust computer system comprising one or more computers, share price information based at least in part upon a first quantity of digital math-based assets held by a trust at a first point in time and a second quantity of shares in the trust at the first point in time; (ii) receiving, at the trust computer system from the one or more authorized participant user devices of the authorized participant, an electronic request to redeem a third quantity of shares; (iii) determining, by the trust computer system, a fourth quantity of digital math-based assets based at least in part upon the share price information and the third quantity of shares; (iv) obtaining, by the trust computer system, one or more destination digital asset account identifiers corresponding to one or more destination digital asset accounts for receipt by the authorized participant of a transfer of the fourth quantity of digital math-based assets from the trust; (v) obtaining, using the trust computer system, one or more origin digital asset account identifiers corresponding to one or more origin digital asset accounts for the transfer; (vi) initiating, using the trust computer system, the transfer of the fourth quantity of digital math-based assets from the one or more origin digital asset accounts to the one or more destination digital asset accounts; (vii) broadcasting, using the trust computer system, the transfer to a decentralized electronic ledger maintained by a plurality of physically remote computer systems; (viii) verifying, by the trust computer system using the decentralized electronic ledger, a receipt of the fourth quantity of digital math-based assets at the one or more destination digital asset accounts; and (ix) canceling or causing to be canceled, using the trust computer system, the third quantity of shares from the authorized participant.

Redemption Distribution Waterfalls Among Wallets

In embodiments, a redemption distribution waterfall may be implemented using one or more computers based at least in part on one or more parameters. Retrieval distributions may be dictate the order in which digital wallets (and/or their associated private and/or public keys) are retrieved from storage (e.g., from varying levels of cold storage, such as an on-premises safe, nearby safety deposit box, and/or geographically remote bank or secure storage facility). Retrieval distributions may also dictate quantities of digital assets to transfer from each wallet. In embodiments, redemption distribution algorithms may control such retrievals, e.g., by generating retrieval instructions, indicating one or more wallets to retrieve, and/or indicating one or more amounts to transfer from each identified wallet. In embodiments, such parameters may include at least one or more of the following:

- the order in which the wallet was created (e.g., first wallet created is first wallet used, last wallet created is last wallet used, to name a few);
- the order in which the wallet was filled (e.g., first wallet filed is first wallet used, last wallet created is last walled used, to name a few);
- a random order in which the wallet was created;
- a random order in which the wallet was filled;
- a random selection of the wallet;
- the vault in which the wallet is stored;
- the custodian of a vault storing the pair segments associated with a wallet;
- the amount of digital assets needed for a redemption compared to available in the wallet;
- the relative amount of digital assets held in the wallet (e.g., use the largest wallets first, use the smallest wallets first, to name a few); and/or
- the risk that a wallet has been compromised, to name a few.

Proof of Control

It has been a widespread problem with custodial accounts for digital assets that the digital assets purportedly being held are in fact not present. Such digital custodial accounts present a series of technical issues associated with not only securely holding digital assets in a custodial nature, but also proving control over such digital assets, while minimizing security risks and depleting digital assets. Previous attempts to prove control have required that a transaction involving the custodial account be exercised, which when a transaction fee is charged reduces the overall assets within the custodial account. The transaction fee poses a problem in this case because the fees are conventionally paid from the digital wallets held in the administrative account, so that providing many proofs of control over time may ultimately lead to depletion of the digital assets held in the digital wallets.

Exemplary embodiments of the present invention address the technical challenge by providing proof of control from a custodial digital asset account, with payment of the transaction fee associated with the proof of control event from a separate operating account. Embodiments of proof of control systems can be applied to a wide variety of implementations associated with digital asset wallets, such as custodial wallets for exchange traded products, hedges funds, trusts, and other fiduciaries, or non-custodial wallets. The proof of control itself may be in the form of a message sent along with a zero net transfer of digital assets from the administrative account. The message may relate to a recent event, such as an event that occurred within a very recent time period (e.g., the previous 10 minutes, previous hour, previous 12 hours, previous 24 hours, previous day, previous week, previous month, to name a few). As noted above the message may be or include the additional information that is included in the logs displayed in FIG. 2. For example, the message may be a recent newspaper headline, blog post title, price at a given date and time from an exchange, like the Gemini Auction price on a given date, to name a few. Since the transaction fee is paid from the digital asset operating account, the digital assets held in the digital wallets of the custodial account are not depleted.

Figure 53:
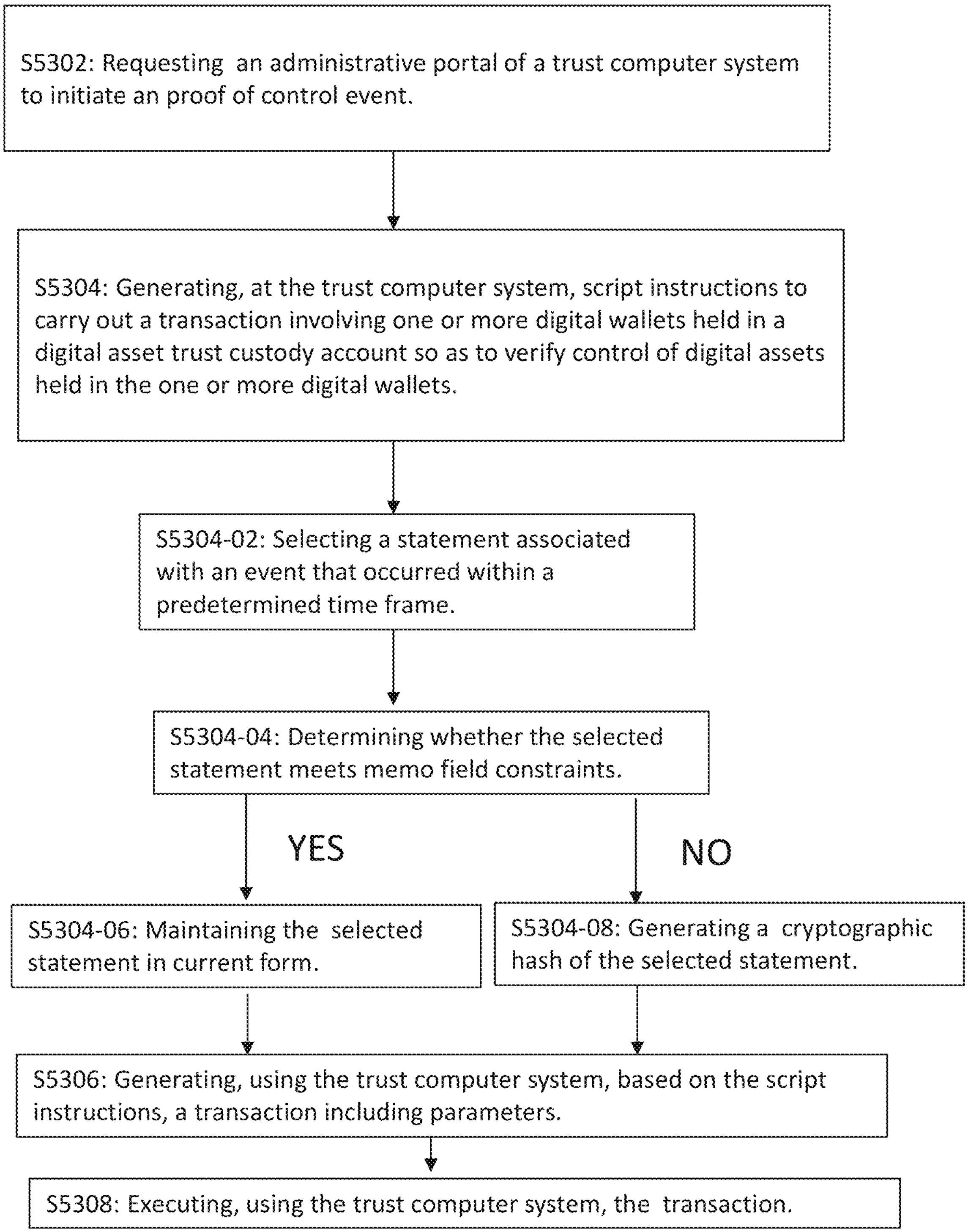
FIG. 53 is an exemplary flow chart for a method of providing proof of control from a custodial digital asset account.
Figure 54:
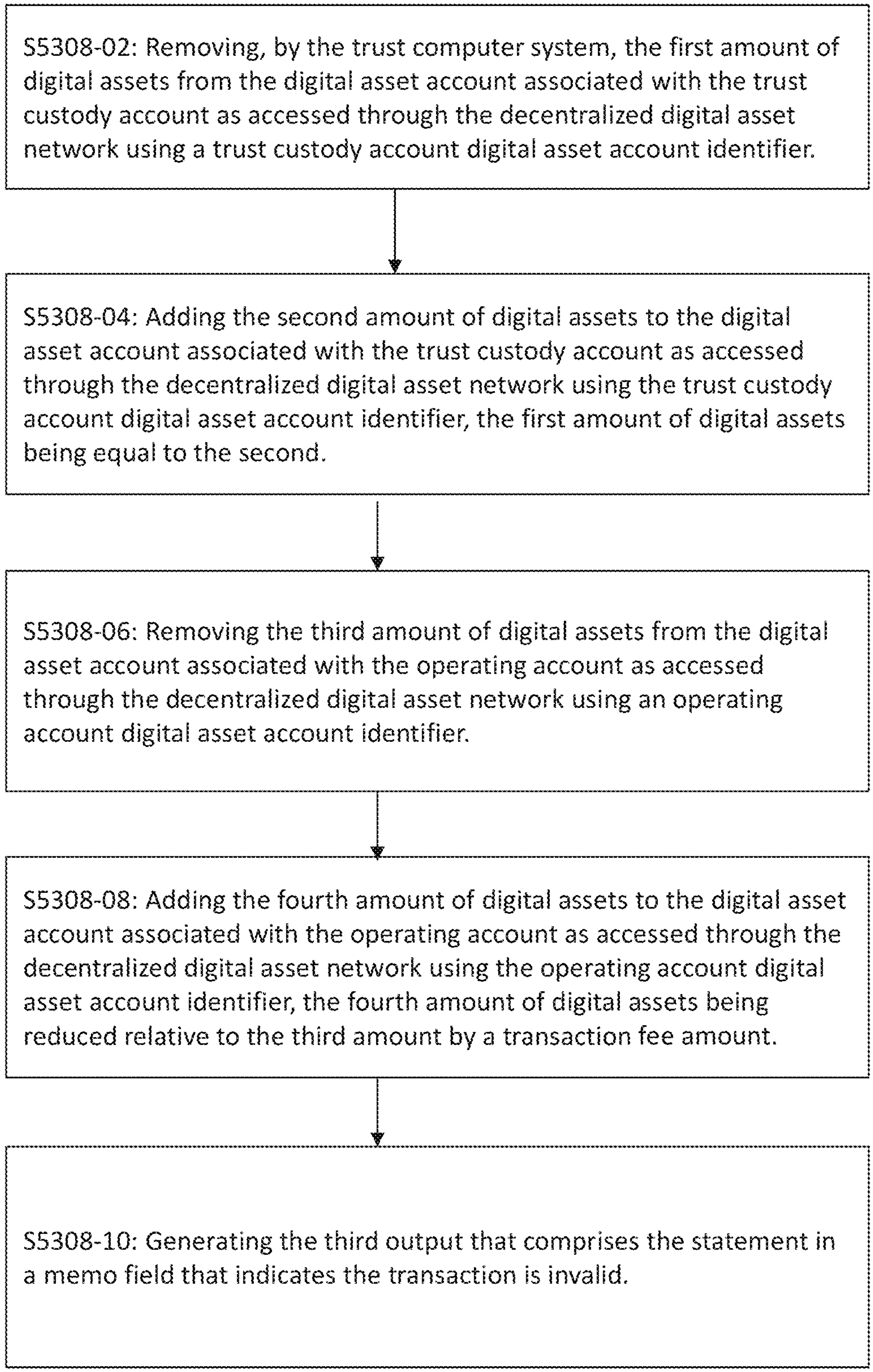
FIG. 54 is an exemplary flow chart illustrating the steps used to perform a transaction as part of the method to provide proof of control of the custodial account.

Referring to FIG. 53, the process for performing proof of control includes the following steps.

In Step S5302, an administrative portal of a trust computer system is requested to initiate an proof of control event. The trust computer system may be operatively connected to a decentralized digital asset network that uses a decentralized electronic ledger in the form of a blockchain maintained by a plurality of physically remote computer systems to track at least one of asset ownership or transactions in a digital math based asset system. Examples of a blockchain include Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, IOcoin, Terracoin, Liquidcoin, BBQcoin, BitBars, Gas, Tether and PhenixCoin. The request to initiate may come from, for example, an auditor and may include a statement of a recent event to use in the proof of control exercise.

In Step S5304, the trust computer system generates script instructions to carry out a transaction involving one or more digital wallets held in a digital asset trust custody account so as to verify control of digital assets held in the one or more digital wallets. Step S5304, may be performed though the following substeps. In Substep S5304-02, a statement is selected which is associated with an event that occurred within a predetermined time frame. For example, the message may relate to a recent event, such as an event that occurred within a very recent time period (e.g., the previous 10 minutes, previous hour, previous 12 hours, previous 24 hours, previous day, previous week, previous month, to name a few). For example, the message may be a recent newspaper headline, blog post title, price at a given date and time from an exchange, like the Gemini Auction price on a given date, to name a few. When a statement is provided as part of Step S5302, then the provided statement would be used.

Depending upon the length of the statement, various alternative processes may be employed. By way of example, for a short enough statement (e.g., less than 80 characters), the statement may be maintained in its original form. For example, "GeminiAuction02/08/18=8190.73". For a larger statement, like a "Express News Report on Feb. 8, 2018: Bitcoin price SURGE: Why is BTC bouncing back today? Cryptocurrency market rising, available at https://www.express.co.uk/finance/city/916246/bitcoin-price-news-why-BTC-bouncing-back-rising-today-cryptocurrency", a secure shortened version of the statement can be generated. For example, a cryptographic has of the statement can be applied.

In embodiments, where the length of the statement is not predetermined, the trust computer system can perform the following additional substeps as part of the Step S5304 process, including: SubStep S5304-04, the trust computer system may determine whether the statement fits within memo field length constraints of the script associated with the digital asset type. For example, Bitcoin uses "OP_RETURN outputs" as its mechanism for a memo field, which is limited to 80 bytes, and Ethereum uses Log Events on a pay-per-use basis. In SubStep S5304-06, if the determining SubStep S5304-04 indicates that the statement fits within the memo field length constraints, the trust computer system may maintain the statement in its original form. In SubStep S5304-08, if the determining SubStep S5304-04 indicates that the statement does not fit within the memo field length constraints, the trust system may generates a cryptographic hash of the statement to be used as a statement.

Next, in Step S5306, the trust computers system may generate, based on the script instructions, a transaction with the following parameters: (i) a first input of a first amount of digital assets to a digital asset account associated with the trust custody account as accessed through the decentralized digital asset network using a trust custody account digital asset account identifier; (ii) a first output of a second amount of digital assets from the digital asset account associated with the trust custody account as accessed through the decentralized digital asset network using the trust custody account digital asset account identifier, the first amount of digital assets being equal to the second amount of digital assets; (iii) a second input of a third amount of digital assets to a digital asset account associated with an operating account as accessed through the decentralized digital asset network using an operating account digital asset account identifier; (iv) a second output of a fourth amount of digital assets from the digital asset account associated with the operating account as accessed through the decentralized digital asset network using the operating account digital asset account identifier, the fourth amount of digital assets being reduced relative to the third amount by a transaction fee amount; (v) a third output that comprises the statement in a memo field; and (vi) applying a digital signature to the transaction using a private key associated with the trust custody account. At step S5308, the trust system will perform the transaction.

FIG. 53 illustrates an exemplary flow chart illustrating the substeps that may be performed in order to complete the transaction in step S5308. At SubStep S5308-02 the trust computed system removes the first amount of digital assets from the digital asset account associated with the trust custody account as accessed through the decentralized digital asset network using a trust custody account digital asset account identifier. At SubStep S5308-04, the trust computer system adds the second amount of digital assets to the digital asset account associated with the trust custody account as accessed through the decentralized digital asset network using the trust custody account digital asset account identifier, the first amount of digital assets being equal to the second amount of digital assets. At SubStep S5308-06, the trust computer system removes the third amount of digital assets from the digital asset account associated with the operating account as accessed through the decentralized digital asset network using an operating account digital asset account identifier. Next, at SubStep S5308-08 the trust computer system adds the fourth amount of digital assets to the digital asset account associated with the operating account as accessed through the decentralized digital asset network using the operating account digital asset account identifier, the fourth amount of digital assets being reduced relative to the third amount by a transaction fee amount. At SubStep S5308-10, the trust computer system generates a third output that comprises the statement in a memo field.

Examples of Financial Products Associated with ETPs Holding Digital Assets

In embodiments, insurance may be provided for digital assets. Such insurance may be provided to individual users of digital assets (including vendors), groups of users, exchanges, exchange agents, trusts providing exchange traded products associated with digital assets, to name a few. Insurance may be provided for a digital asset wallet and/or the contents of a digital asset wallet (e.g., insurance for 100 Bitcoin stored in a digital wallet). Such insurance may involve secure storage of the private key to a wallet and/or the public key. In embodiments, the blended digital math-based asset price as discussed herein may be used as a benchmark for such insurance.

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

NAV Calculation

In embodiments, an ETP may use a blended digital math-based asset price as a benchmark. Accordingly, a net asset value ("NAV") of shares in a trust for an exchange traded product holding digital math-based assets may be calculated based in part upon a blended digital math-based asset price or a digital asset index, which may in turn comprise a plurality of blended digital math-based asset prices. A NAV may be determined by obtaining, using one or more computers from one or more exchange computers, a value of digital math-based assets held by the trust at a defined time; calculating or obtaining, using the one or more computers, a blended digital asset value of the digital math-based assets during the predefined period of time; calculating, using the one or more computers, the value of the digital math-based assets held by the trust at a defined time by multiplying the units of each digital math-based asset held by the trust by the price per unit of each such digital math-based asset; determining or obtaining, using the one or more computers, estimated accrued but unpaid expenses, including sponsor fees, incurred by the trust since the last payment of a sponsor fee up to, but not included, the date on which the valuation is made; calculating, using the one or more computers, the adjusted net asset value of the trust by subtracting the estimated accrued but unpaid fees and expenses since the last payment of a sponsor fee up to, and included, the last valuation date of the digital math-based assets held by the trust on such date; determining or obtaining, using the one or more computers, estimated unpaid fees and expenses incurred by the trust since the last valuation date; calculating, using the one or more computers, net asset value of the trust by subtracting estimated accrued but unpaid fees and expenses incurred since the last valuation date form the adjusted net asset value of the trust; calculating, using the one or more computers, net asset value per share of the trust by dividing the net asset value of the trust by a number of outstanding shares of the trust; storing in one or more databases on computer readable media operatively connected to the one or more computers the accrued but unpaid fees and expenses, adjusted net asset value, net asset value and the net asset value per share of the trust; and publishing, from the one or more computers to one or more publication systems, the net asset value and the net asset value per share of the trust. In embodiments a time period of 12 hours, 24 hours, or 36 hours may be used.

In embodiments, NAV of a trust or its equivalent can be calculated by a computer system comprising one or more computer. For example, in embodiments, a NAV can be calculated using one or more computers on a daily basis (for each evaluation day, e.g., a day on which the trust shares are available to be created, redeemed and/or exchanged). In embodiments, a NAV can use one or more formulas to estimate a fair market value of a unit of a digital asset and/or a share in a trust at a given point in time. In embodiments, an industry standard formula can be used to calculate a NAV. In embodiments, a proprietary formula can be used to calculate a NAV. For example, one or more computers may calculate a digital asset price using data from the largest exchanges in the digital asset exchange market. In embodiments, a blended digital asset price can be calculated by one or more computers using an averaged price.

In embodiments, a blended digital asset price can be the price for digital assets determined each valuation day at a set time, such as, e.g., 3:00 p.m. Eastern Time. In embodiments, a blended digital math-based asset price may be obtained from a blended digital math-based asset index, which may be accessed via an API. In general, an API is a set of routines or subroutines, protocols and tools for building software applications, which facilitate communications between various software components. An API may be for a web-based system, operating system, database system, computer hardware or software library. An API specification can take many forms, but often includes specifications for routines, data structures, object classes, variables or remote calls. POSIX, Windows API and ASPI are examples of different forms of APIs. Documentation for the API is usually provided to facilitate usage. An example of such an order placing API is available with the Gemini Exchange, as discussed at https://docs.gemini.com/rest-api/#new-order. In embodiments, the system may calculate a blended digital asset price, by obtaining transaction data from one or more exchanges selected from a list of exchanges approved by, e.g., the sponsor, to determine either the average of the high and low prices on each exchange or the weighted (based on volume of shares traded) average of the transaction prices for the prior fixed time period (e.g., 12 or 24 hours) of trading activity on such one or more exchanges. In embodiments, the system may then average the price for each exchange, using weighting based on each exchange's volume during the period. Other methodologies can be used by the system to calculated the blended digital asset prices. For example, three exchanges, four exchanges, five exchanges, ten exchanges, or any number of exchanges as may be appropriate in view of the market for the math-based assets may be selected to determine the blended digital asset price. In embodiments, a time period of other than 12 or 24 hours may also be used depending upon the volume and volatility of the math-based asset price. For example, in a low volume period the time period may be increased to, e.g., 36 hours, while in a high volatility period the time period may be decreased to, e.g., 4 hours. In embodiments, a blended digital math-based asset price may be calculated by computing a volume weighted exponential moving average of actual transactions (e.g., considering price and volume of each executed transaction) from one or more digital asset exchange. In embodiments, the moving average may be taken over a period such as 2 hours. In embodiments, other periods may be used, such as 24 hours, 1 hour, 30 minutes, and/or 15 minutes, to name a few.

Figure 20A:
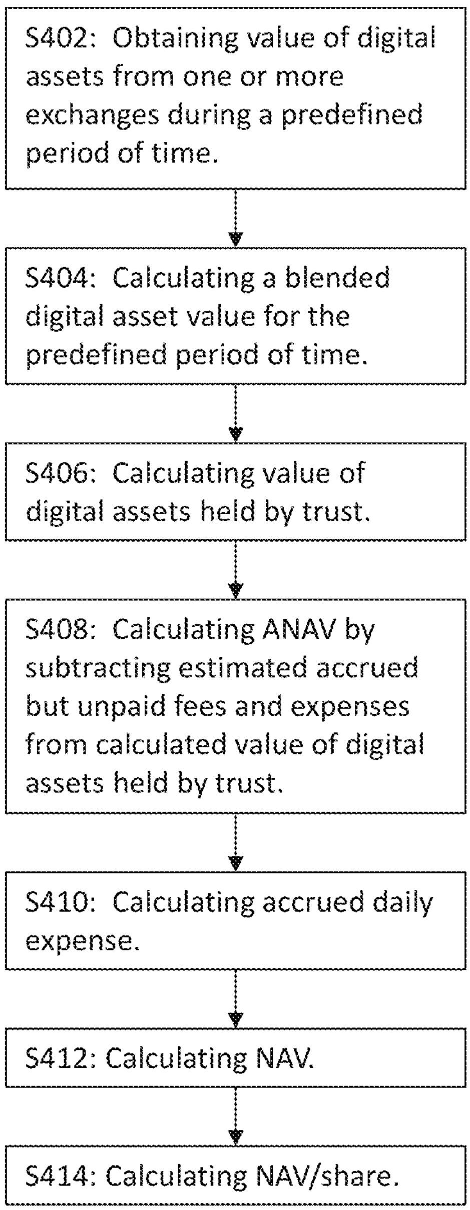
FIG. 20A is a flow chart of processes for calculating the NAV value of shares in a trust holding digital assets in accordance with embodiments of the present invention.

FIG. 20A is a flow chart of processes for calculating the NAV value of shares in a trust holding digital assets in accordance with embodiments of the present invention. In embodiments, these processes may be performed by a calculation agent 240, by one or more computers, and/or by some other entity using one or more computers. In a step S402, the one or more computers may obtain from one or more exchanges the value of digital assets during a predefined period of time. In a step S404 a blended digital asset value may be calculated for the predefined period of time. In embodiments, the blended digital asset value may also be obtained from an external computer system, such as an electronic published index system. In a step S406, the value of digital assets held by the trust may be calculated. In a step S408, the ANAV may be calculated. In embodiments, the ANAV may be calculated by subtracting estimated accrued but unpaid fees and expenses from the calculated value of digital assets held by the trust. In a step S410, the accrued daily expense may be calculated. In a step S412, the NAV may be calculated. In a step S414, the NAV per share (NAV/share) may be calculated.

Figure 20B:
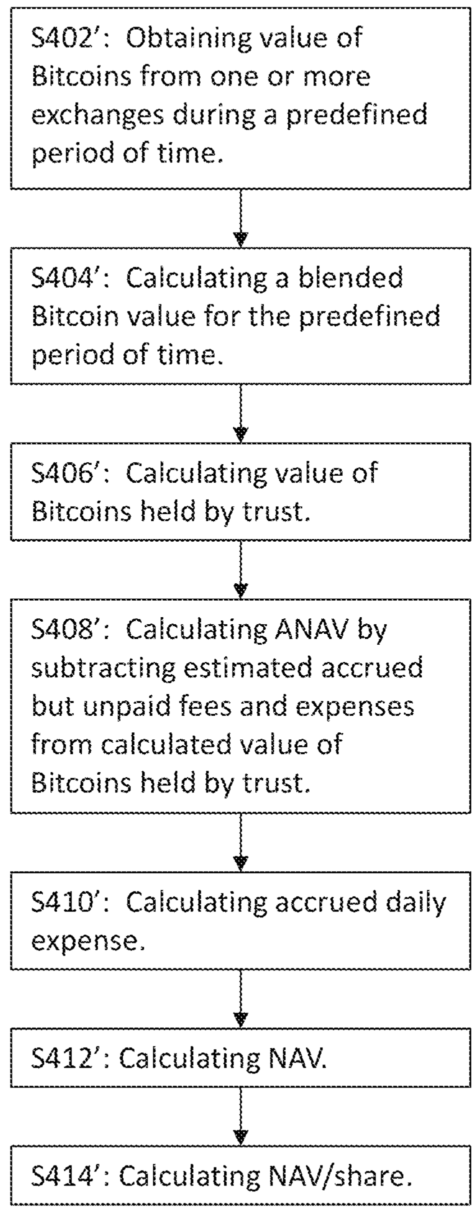
FIG. 20B is a flow chart of processes for calculating the NAV value of shares in a trust holding bitcoin in accordance with embodiments of the present invention.

FIG. 20B is a flow chart of processes for calculating the NAV value of shares in a trust holding bitcoin in accordance with embodiments of the present invention. In embodiments, these processes may be performed by a calculation agent 240, by one or more computers, and/or by some other entity using one or more computers. In a step S402', the one or more computers may obtain from one or more exchanges the value of bitcoin during a predefined period of time. In a step S404' a blended bitcoin value may be calculated for the predefined period of time. In a step S406', the value of bitcoin held by the trust may be calculated. In a step S408', the ANAV may be calculated. In embodiments, the ANAV may be calculated by subtracting estimated accrued but unpaid fees and expenses from the calculated value of bitcoin held by the trust. In a step S410', the accrued daily expense may be calculated. In a step S412', the NAV may be calculated. In a step S414', the NAV per share (NAV/share) may be calculated.

Figure 21A:
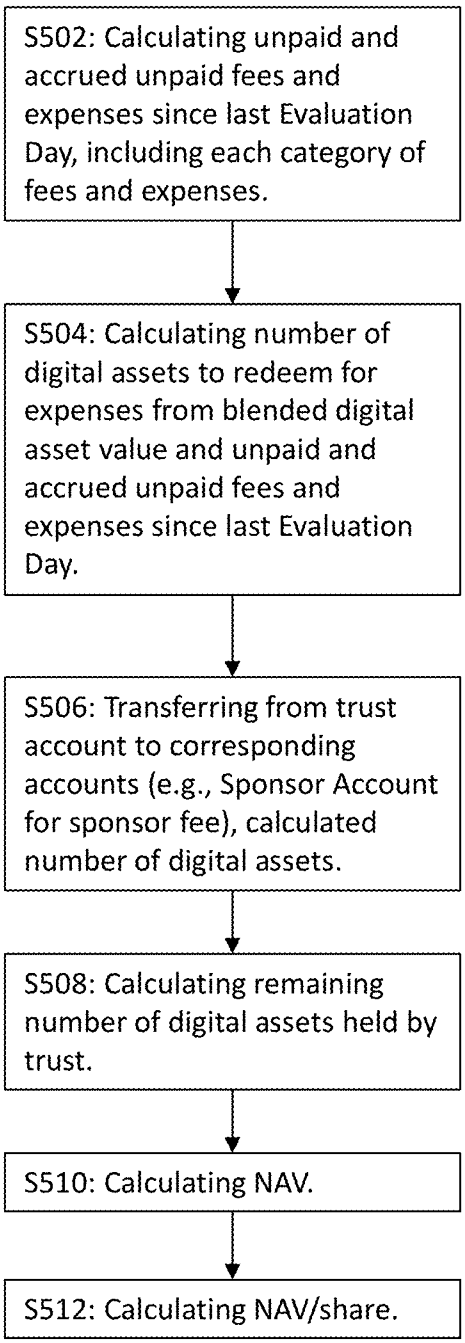
FIG. 21A is a flow chart of additional processes associated with evaluation day for calculating NAV value of shares in a trust holding digital assets in accordance with embodiments of the present invention.

FIG. 21A is a flow chart of additional processes associated with the evaluation day for calculating NAV value of shares in a trust holding digital assets in accordance with embodiments of the present invention. The processes described by FIG. 21A may be performed by one or more computers operated by one or more entities, such as a calculation agent 240. In a step S502, the unpaid and accrued unpaid fees and expenses since the last evaluation day, which may include each category of fees and/or expenses, may be calculated. In a step S504, the number of digital assets to redeem for expenses may be calculated from the blended digital asset value and the unpaid and accrued unpaid fees and expenses since the last evaluation day. In a step S506, the calculated number of digital assets may be transferred from the trust to corresponding accounts, e.g., a sponsor account for the sponsor fee. In a step S508, the remaining number of digital assets held by the trust may be calculated. In a step S510, the NAV may be calculated. In a step S512, the value of the NAV per share may be calculated.

Figure 21B:
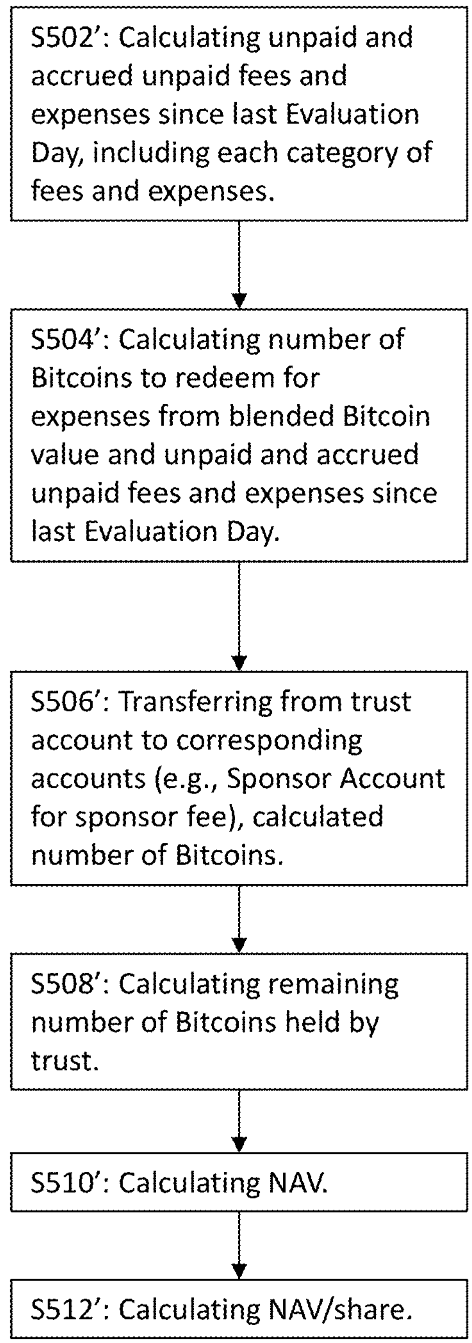
FIG. 21B is a flow chart of additional processes associated with evaluation day for calculating NAV value of shares in a trust holding bitcoin in accordance with embodiments of the present invention.

FIG. 21B is a flow chart of additional processes associated with the evaluation day for calculating NAV value of shares in a trust holding bitcoin in accordance with embodiments of the present invention. The processes described by FIG. 21B may be performed by one or more computers operated by one or more entities, such as a calculation agent 240. In a step S502', the unpaid and accrued unpaid fees and expenses since the last evaluation day, which may include each category of fees and/or expenses, may be calculated. In a step S504', the number of bitcoin to redeem for expenses may be calculated from the blended bitcoin value and the unpaid and accrued unpaid fees and expenses since the last evaluation day. In a step S506', the calculated number of bitcoin may be transferred from the trust to corresponding accounts, e.g., a sponsor account for the sponsor fee. In a step S508', the remaining number of bitcoin held by the trust may be calculated. In a step S510', the NAV may be calculated. In a step S512', the value of the NAV per share may be calculated.

The NAV and NAV per Share can be published daily after its calculation using one or more computers. A third party agent can be employed to perform the calculation and to electronically publish it. In embodiments, the following process can be used:

Step 1: Valuation of Digital Assets

In embodiments, a NAV and NAV per Share, can be struck using one or more computers each evaluation day (e.g., each day other than a Saturday or Sunday or any day on which the listing exchange 235 is not open for regular trading).

The NAV and NAV per Share striking can occur at or as soon as reasonably practicable after a predetermined time of day (e.g., 4:00 p.m. Eastern time) each evaluation day and can be conducted by the trustee.

The first step for striking the NAV may be the valuation of the digital assets held by the Trust. In embodiments, the calculation methodology for valuing the Trust's digital assets can be as follows:

Value of digital assets=(# of digital assets held by trust)×(blended digital asset price)

If the blended digital asset price is unavailable on any given day, the sponsor can instruct the use of the prior day's blended digital asset price or, if the prior day's blended digital asset Price is deemed unfair/unsuitable, such other price as it deems fair.

Step 2: Calculation of ANAV

Once the value of the digital assets in the trust has been determined on an evaluation day, the trustee, using one or more computers, can subtract all estimated accrued but unpaid fees (other than the fees accruing for such day on which the valuation takes place computed by reference to the value of the Trust or its assets), expenses and other liabilities of the trust from such NAV of the trust. The resulting figure is the adjusted net asset value ("ANAV") of the trust. The ANAV can be used to calculate fees of trustee and/or sponsor.

In embodiments, the ANAV can calculated using the following methodology:

ANAV=(value of digital assets)−(estimated accrued but unpaid fees/expenses/liabilities)

Step 3: Calculation of Daily Expense

Once the NAV has been determined, any fees or expenses that accrued since the last striking of the NAV can be calculated using one or more computers based on the evaluation day ANAV.

All fees accruing for the day (and each day since the last evaluation day) on which the valuation takes place computed by reference to the value of the trust or its assets can be calculated by one or more computers using the ANAV calculated for such evaluation day.

In embodiments, in arrears using the average of the daily ANAV for the prior month, the daily expense fee (for each day since prior evaluation day) can be estimated on a daily basis using the following methodology:

Daily Expense*=(Sponsor's Fee)+(other fees)+(other expenses or liabilities accruing since the prior Evaluation Day)

Step 4: Calculation of NAV and NAV per Share

In embodiments, the trustee can calculate using one or more computers the NAV, by subtracting from the ANAV the Daily Expense.

In embodiments, the trustee can also calculate using one or more computers the NAV per share by dividing the NAV of the trust by the number of the shares outstanding as of the close of trading. In embodiments, the number of shares outstanding as of the close of trading may be obtained from the NYSE Arca (which includes the net number of any Shares created or redeemed on such evaluation day).

Calculation Methodology:

NAV=ANAV−(Daily Expense)

NAV per Share=NAV÷(# of Shares outstanding)

The Blended Digital Asset Price

A blended digital asset price, such as a blended digital math-based asset price, can be calculated, using one or more computers, each evaluation day. Systems and methods for calculating a blended digital asset price are described in U.S. application Ser. No. 14/313,873, filed Jun. 24, 2014, the contents of which are incorporated herein by reference.

The calculation can occur as of and at or as soon as reasonably practicable after 3:00 p.m. Eastern time each evaluation day (time could also be noon, 1 p.m., 2 p.m.—simply needs to be sufficient time before NAV striking to complete the calculations).

The blended digital asset price can be the functional equivalent of a rules-based index and therefore has rules to populate the universe of data inputs and rules on calculation using such inputs. As discussed herein, the blended digital asset price can be used to create an index, to be electronically published. The index can, in turn, also serve as a price benchmark or can be used to create derivative products. Accordingly, in embodiments, a blended digital math-based asset index may be a benchmark for a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product, to name a few.

In embodiments, a blended digital asset price may be obtained from a digital asset index. For example, one or more computers may access (e.g., via an API) one or more blended digital math-based asset values from a computer or database of underlying digital asset index values. In embodiments, digital asset index values may be interpolated to determine a value at a requested point in time, e.g., 4 p.m. E.T.

Eligible Data Inputs for a Blended Digital Asset Price

In embodiments, data for the blended digital asset price can be drawn from the largest exchanges that publicly publish transaction data and principally utilize acceptable currencies, e.g., currencies other than the Chinese Yuan. In this example, the Yuan denominated exchanges may not be included because of manipulation of that currency and unreliability thereof. In embodiments, additional currency denominations may be added or excluded at one or more future dates, which may be dates following the initial formation of the trust.

The sponsor can approve each eligible exchange (which, in embodiments, can be no fewer than three to five exchanges at any given time).

Selection of Data Inputs for a Blended Digital Asset Price

The rules for the blended digital asset price can provide for the use in calculation of the data from the three largest exchanges (by volume) on the sponsor approved list.

In embodiments, this determination of the three exchanges for use can be done on a weekly basis, (e.g., on each Monday) based at least in part on the volume on each such exchange during the prior week. In embodiments, this determination could be done on a different periodic basis (e.g., on a daily basis or a monthly basis) or on a when needed basis (e.g., whenever some circumstances occurs requiring a change of determination).

In embodiments, so long as exchange selection is not on a daily basis, to the extent an exchange that has been selected for inclusion experiences a halt in trading for more than 24 consecutive hours (e.g., a lack of any recorded transactions during the prior 24 hours, regardless of the reason), that exchange can be replaced by the next largest exchange (by volume) on the sponsor approved list. In embodiments, this determination can be made automatically by one or more computers as part of an algorithm.

In embodiments, in the instance of a replacement, the restoration of daily volume on the halted exchange to a level more than the daily volume on the exchange that substituted for it could trigger a reversal of the substitution, if such restoration occurred prior to the next scheduled reconstitution of the included exchanges.

In embodiments, an exchange may be removed where there is a significant drop in trading on that exchange (e.g., 90% drop in trading volume) during a relevant time period (e.g., prior 24 hours, prior week, prior month, to name a few).

Figure 22:
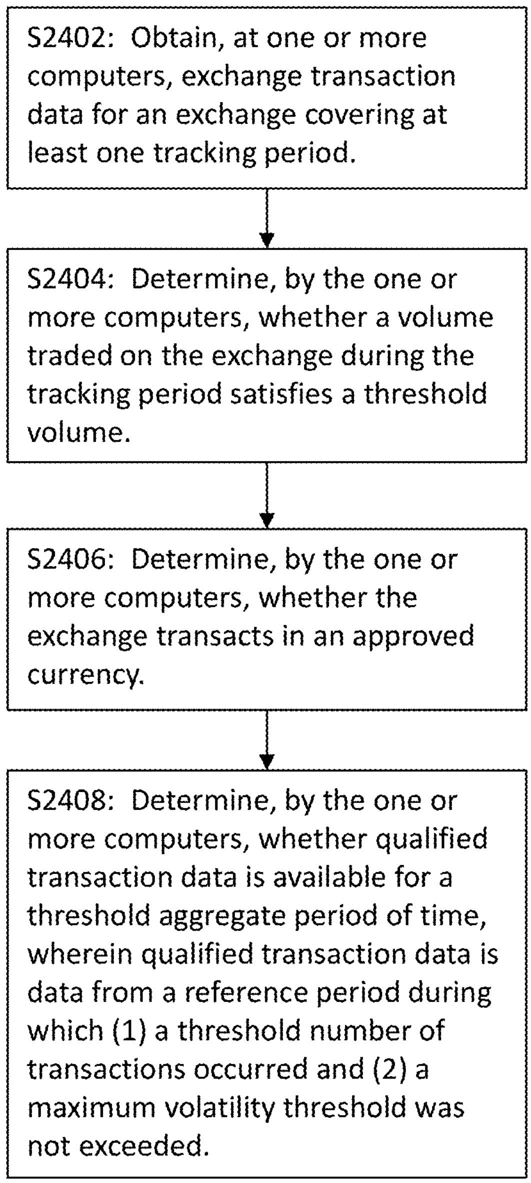
FIG. 22 is a flow chart of a process for determining qualified exchanges in accordance with exemplary embodiments of the present invention.

FIG. 22 illustrates an exemplary process for determining qualified or approved exchanges in accordance with the present invention. In embodiments, this process may be used to determine qualified money transmit businesses instead of exchanges and/or a combination thereof. The process may be programmed with computer code, which may be run on one or more processors. The process can utilize pre-defined criteria, rules, parameters, and/or thresholds to determine qualified exchanges. Such criteria can include transaction volume criteria, denomination types, geographic location, exchange data availability, exchange accessibility information (e.g., considerations of political or regulatory restrictions), regulatory compliance data, exchange customer data, and/or exchange owner data, to name a few. Thresholds can be expressed as absolute values and/or percentages.

In a step S2402, one or more computers may obtain exchange transaction data for an exchange, where the data covers at least one tracking period. The exchange data may be received via electronic transmission (e.g., over the Internet) and/or electronically accessed (e.g., using one or more APIs). The tracking period may be any period of time over which the exchange will be assessed for approval for use in the calculation of a blended digital asset price, such as 15 minutes, 1 hour, 12 hours, 24 hours, and/or 1 week, to name a few.

In a step S2404, the one or more computers may determine whether a volume traded on the exchange during the tracking period satisfies a threshold volume. In embodiments, a threshold volume may be 500 units of digital assets. In embodiments, a threshold volume may be expressed as a percent (e.g., a percent of the digital assets in circulation). The threshold may be modified periodically to help increase or decrease the number of qualified exchanges.

In a step S2406, the one or more computers may determine whether the exchange transacts in an approved currency. The computers may either test for an approved currency (e.g., by comparing to a database of approved currencies) or for an unapproved currency (e.g., by comparing to a database of unapproved currencies). In embodiments, only one currency may be approved, and the test for that currency may be hard-coded in exchange approval software. Currencies may be approved or unapproved based on considerations of reliability and/or stability, to name a few.

In a step S2408, the one or more computers may determine whether qualified transaction data is available for the exchange for a threshold aggregate period of time. Qualified transaction data may be data from a reference period during which a threshold number of transactions occurred (e.g., at least 3 transactions) and/or a maximum volatility threshold was not exceeded (e.g., the high and low price during the reference period did not fluctuate by more than 50% compared to the respective average high and low prices during that reference period of the other top (e.g., top 4) potential qualified exchanges by volume). In embodiments, transaction data may be evaluated from a plurality of reference periods to determine whether the data satisfies qualification criteria. In embodiments, transaction data to be qualified must satisfy qualification criteria for at least a specified period of time, which may be sub-divided into reference periods. For example, qualified transaction data may be determined for reference periods of 15 minutes, and to be a qualified exchange, the exchange must have qualified transaction data for an aggregate of at least 10 hours (40 reference periods) over a 24-hour tracking period. In embodiments, if an exchange satisfies each of the criteria examined in this exemplary process, it may be considered a qualified exchange for the tracking period over which it was examined. The determination of qualified exchanges may be performed at the end of each tracking period or on a rolling basis (e.g., re-evaluated at the end of each reference period).

Description of Electronic Data Pulled from Inputs

For each exchange on the approved list, the prior 24 hours of data setting forth each trade on the exchange by execution price and quantity transacted can be obtained, e.g., received and/or retrieved. Such transaction data may be obtained In embodiments, one or more digital asset prices, such as, e.g., auction price, closing price, traded value, bid price, ask price, and/or spot price, to name a few, may be obtained. In embodiments, only the highest and lowest exchange prices and their respective transaction volumes may be obtained. In embodiments, all exchange price and transaction data may be obtained. In embodiments, a shorter period of time than 24 hours may be used, e.g., 12 hours, 3 hours, to name a few, or a longer period of time such as 48 hours may be used, to insure a sufficient volume of transaction data is considered.

Application of Electronic Data

For each of the exchanges included in the calculation for any given evaluation day, an average price for such date can be used. In embodiments, using each average exchange price for such date, a blended and weighted average price for all exchanges can be extracted and used as the blended digital asset price.

In embodiments, the auction price and/or the blended price may be used as a benchmark for various financial products. As used herein, the term financial products includes, but is not limited to exchange traded notes, futures products (such as options), derivative products (such a puts and calls), other indices (such as volatility indices), swaps, currencies, fixed income products, bonds, securities and equities to name a few.

In embodiments, a blended digital asset price may be calculated by first calculating each selected exchange's daily average and then blending (e.g., averaging) the averages into a blended digital asset price. The daily average may be a time-weighted (e.g., exponential) moving mean and/or volume weighted mean. In other embodiments, a blended digital asset price may be calculated using the data from the selected exchanges (e.g., the top 3 qualified exchanges) without first determining single exchange averages.

Single Exchange Average

In embodiments, a single exchange averages may be used instead of a blended digital asset price. In other embodiments, single exchange averages may be combined into a blended digital asset price.

In embodiments, the single exchange average may be calculated by one or more computers using the unweighted mean average of the high and low trading prices for such day (the average price of each trade during the day—which could be subject to manipulation through outlier price trades).

In embodiments, the single exchange average may be calculated by one or more computers using the weighted mean average of the high and low trading prices for such day (e.g., the trading price for each share traded that day, rather than for each executed trade regardless of share size).

In embodiments, the single exchange average may be calculated by one or more computers using the median average of the high and low trading prices for such day.

In embodiments, the single exchange average may be calculated by one or more computers using the weighted median average of the high and low trading prices for such day.

In embodiments the single exchange average may be calculated by one or more computers using any of a median, weighted median, average, and/or weighted average (by volume, time, or otherwise), any of which may be taken of high and low trading prices for a time period (e.g., 1 day, 1 hour, 15 minutes, to name a few), of the second highest and second lowest trading prices for a time period, and/or of all trades during a time period. For example, all transaction price data for a time period may be weighted by the volume transacted at the prices and/or by time (e.g., linearly or exponentially) in order to give greater weight to the more recent price data. Coefficients or other factors may be used to adjust the weighting so as to dampen or exacerbate any price fluctuations. For example, in embodiments, a coefficient for exponential weighting may be 0.69. In other embodiments, such a coefficient may be approximately 0.5, approximately 0.6, approximately 0.7, approximately 0.8, approximately 0.9, to name a few. Accordingly, in embodiments, a coefficient of exponential weighting can fall with a range 0.5-0.9, within a range 0.6-0.8, or within a range 0.7-0.8, to name a few.

In embodiments, as discussed above, digital asset price may be determined via auction conducted either periodically or aperiodically.

Blended Digital Asset Price

In embodiments, the blended digital asset price can be calculated by the average of the single exchange averages. In embodiments, the average may be weighted by volume. An average may weight different exchanges differently in order to account for differences in ease of access of funds from an exchange and/or ease of transacting on the exchange. As described herein, a blended digital asset price may be calculated as part of providing a generated digital asset index.

In embodiments, a collar may be placed on a single exchange auction price as a benchmark. The collar may be based on a benchmark such as the spot price at a particular time, plus or minus a defined range, such as a percentage of the benchmark price. In embodiments, the collar could be set using percentages such as 1%, 2%, 3%, 5%, 10% of the benchmark price, to name a few. By way of illustration, the collar may be based on a 5% variation from a benchmark of 1 BTC=USD$10,000, such that the collar is between USD$9,500 and USD$10,500. The spot price may be based on the last transaction immediately prior to the auction. A spot price may be based on an average of the most recent bid/ask price for the digital asset. In embodiments, a collar may be set based on a blended digital asset price. For example, a single exchange digital asset price could be determined based on a volume weighted average and/or time weighted average of recent digital asset pricing. In embodiments, a blended digital asset price may be based on a pricing from digital assets taken from a plurality of exchanges. In embodiments, the collar price may be based on a blended digital asset price comprising a plurality of digital asset exchanges (e.g., 4) executing trade data for a fixed period of time (e.g., a 10 minute period) using a volume weighting with a fixed percentage (e.g., 5%) of the highest priced trades and a second fixed percentage (e.g., 5%) of the lowest priced trades removed.

For example, a collar may be placed on the auction price, by using fixed percentage (e.g., 1 percent, 5 percent, 10 percent) of an benchmark against the continuous book price at given time period or set of time period. In embodiments, the benchmark could be a midpoint of the spot price of the continuous book price at the given time period, (e.g., auction price), In embodiments, the benchmark could be a weighted average (such as a time weighted average, volume weighted average, or time and volume weighted average) of the continuous book during a pre-set window (e.g., 10 minutes for before auction, 1 hour before the auction, 12 hours before the auction, 24 hours before the auction, to name a few).

In embodiments, the collar may be a blended digital asset price as discussed elsewhere herein.

In embodiments, if the final auction price falls outside the collar, the auction may fail.

Figure 23A:
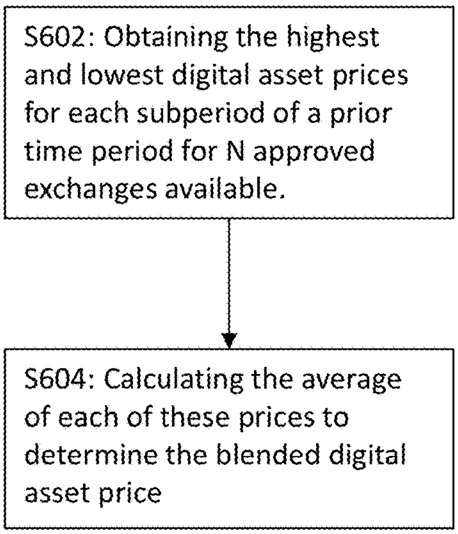
FIGS. 23A-23H are flow charts showing methods for calculating a blended digital asset price in accordance with exemplary embodiments of the present invention.

In embodiments, the blended digital asset price may be calculated as illustrated in FIG. 23A. In step S602, one or more computers may obtain the highest and lowest digital asset prices for each sub-period of a prior time period for N approved exchanges available. In embodiments, N may be the 3 largest approved exchanges. In step S604, each of these values may be averaged, using one or more computers, to determine a blended digital asset price for the prior sub-period. In embodiments, the blended digital asset price may be calculated for a 12-hour period or for a 24-hour period. In embodiments, the blended digital asset price may be calculated using a mean average transaction price weighted by volume.

Figure 23B:
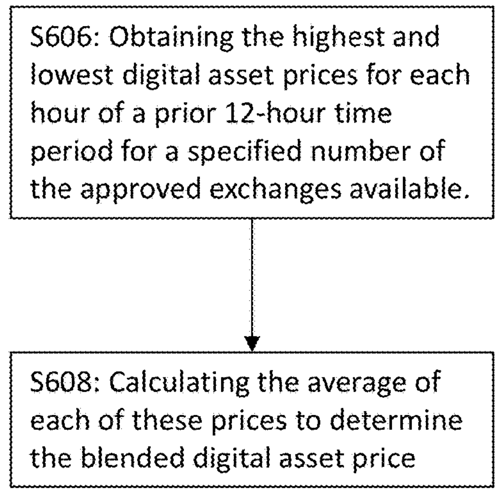

FIG. 23B illustrates a process for calculating the blended digital asset price using a 12-hour sub-period. In a step S606, one or more computers may obtain the highest and lowest digital asset prices for each hour of a prior 12-hour time period for a specified number N of the approved exchanges available. In a step S608, each of the values may be averaged, using one or more computers, to determine a blended digital asset price for the 12-hour period.

Figure 23C:
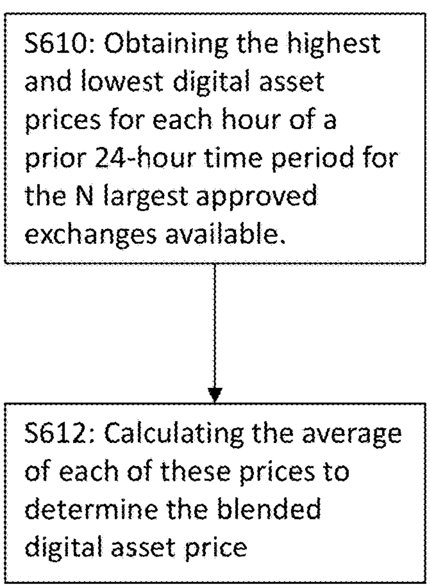

FIG. 23C illustrates a process for calculating the blended digital asset price using a 24-hour sub-period. In a step S610, one or more computers may obtain the highest and lowest digital asset prices for each hour of a prior 24-hour time period for a specified number N of the approved exchanges available. In a step S612, each of the values may be averaged, using one or more computers, to determine a blended digital asset price for the 24-hour period.

Figure 23D:
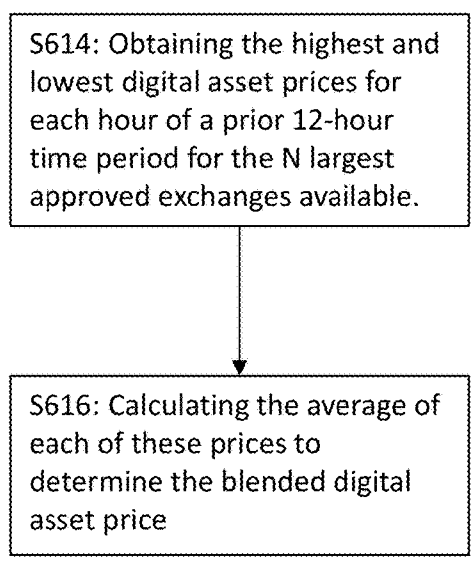

FIG. 23D illustrates a process for calculating the blended digital asset price using a 12-hour sub-period. In a step S614, one or more computers may obtain the highest and lowest digital asset prices for each hour of a prior 12-hour time period for the three largest of the approved exchanges available. In a step S616, each of the values may be averaged, using one or more computers, to determine a blended digital asset price for the 12-hour period.

Figure 23E:
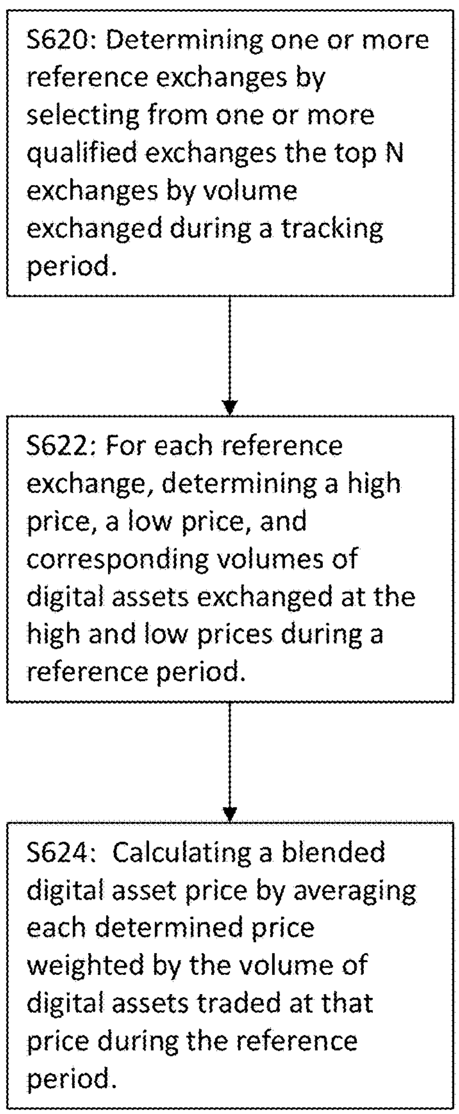

FIG. 23E illustrates another process for calculating a blended digital asset price. In a step S620, one or more computers may determine one or more reference exchanges. The reference exchanges may be the top N (e.g., 3) qualified exchanges by volume exchanged during a tracking period. A tracking period may be any period of time, such as 15 minutes, 30 minutes, 1 hour, 6 hours, or 12 hours, to name a few. Reference exchanges may be selected from a list of approved or qualified exchanges (e.g., approved by the sponsor). An exemplary process for approving exchanges to determine qualified exchanges is described herein with respect to FIG. 22. Reference exchanges may be determined each tracking period or may be determined over longer periods. For example, the reference exchanges may be determined at a fixed time each day. In a step S622, for each reference exchange, the one or more computers can determine highest and lowest exchange prices, as well as the corresponding volumes of digital assets exchanged at those high and low prices during a reference period. In embodiments, the reference period may be a different amount of time than the tracking period during which the reference exchanges are determined. In a step S624, one or more computers may calculate a blended digital asset price by averaging the high and low prices from each reference exchange, weighted by the respective volume of digital assets traded at each high and low price during the reference period.

Figure 23F:
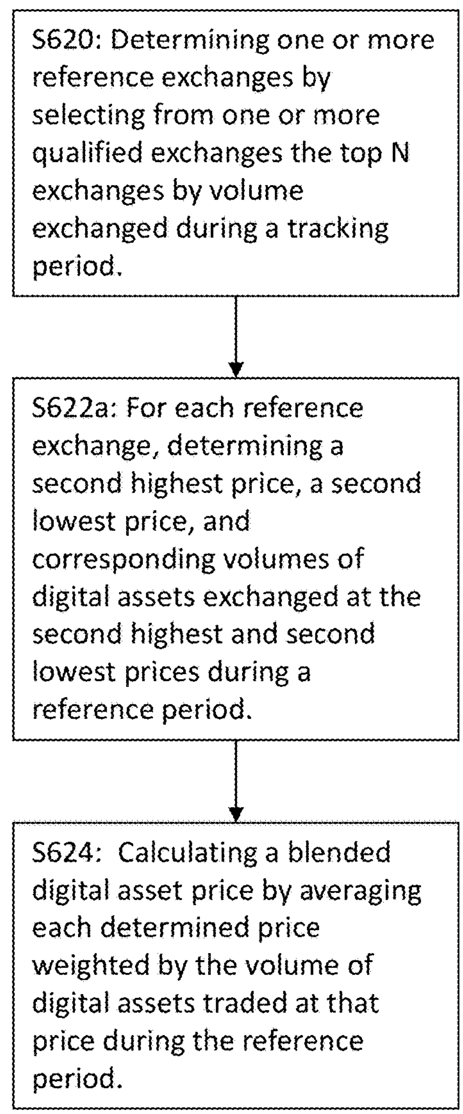

FIG. 23F illustrates another exemplary process for calculating a blended digital asset price. In a step S620, one or more reference exchanges may be determined, as described with respect to FIG. 23E. In a step S622*a*, for each reference exchange, the one or more computers can determine second highest and second lowest exchange prices, as well as the corresponding volumes of digital assets exchanged at those second highest and second lowest prices during a reference period. In a step S624, one or more computers may determine a weighted average of the determined second highest and second lowest prices from each reference exchange, where the weighted average is weighted by volume exchanged at each price, as discussed with respect to FIG. 23E.

Figure 23G:
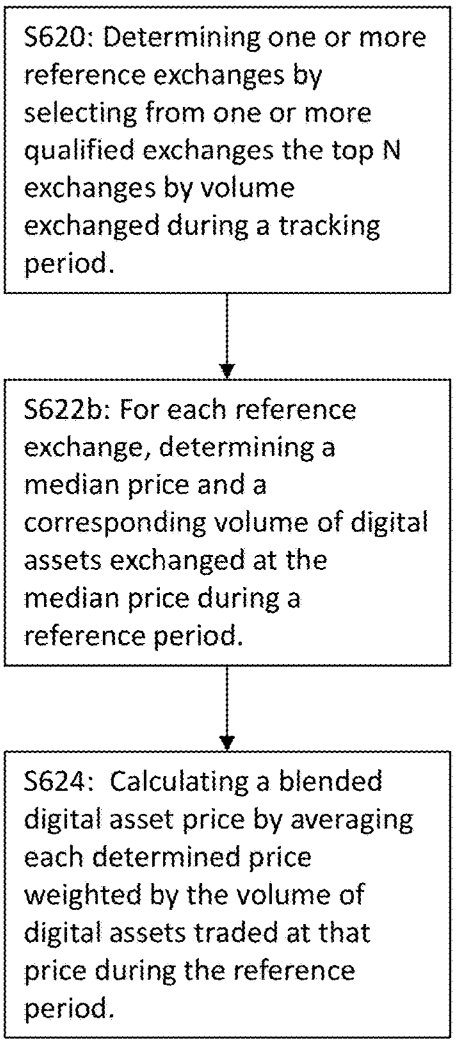

FIG. 23G illustrates another exemplary process for calculating a blended digital asset price. In a step S620, one or more reference exchanges may be determined, as described with respect to FIG. 23E. In a step S622*b*, for each reference exchange, the one or more computers can determine a median price and corresponding volumes of digital assets exchanged at that price during a reference period. In a step S624, one or more computers may determine a volume weighted average of the determined median prices from each reference exchange, as discussed with respect to FIG. 23E.

Figure 23H:
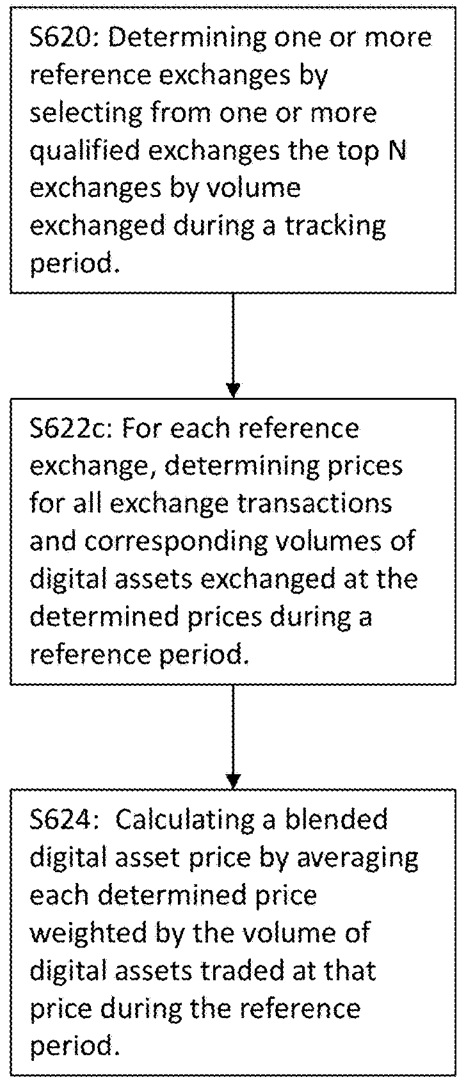

FIG. 23H illustrates another exemplary process for calculating a blended digital asset price. In a step S620, one or more reference exchanges may be determined, as described with respect to FIG. 23E. In a step S622*c*, for each reference exchange, the one or more computers can determine prices for all exchange transactions and corresponding volumes of digital assets exchanged at those prices during a reference period. In a step S624, one or more computers may determine a volume weighted average of the determined exchange prices from the one or more reference exchanges, as discussed with respect to FIG. 23E. In embodiments, the digital asset prices from each reference period may be weighted by time, e.g., so as to preference more recent reference periods. Such weighting may be exponential weighting, such as an exponentially time-weighted moving average. Other moving averages may be employed, with or without weighting, such as a simple moving average, a cumulative moving average, a weighted moving average, and/or a volume weighted moving average, to name a few. Transaction data may be weighted by both volume and time, for example, by applying a volume weighted average as well as an exponential time-weighted moving average. Accordingly, an exponential volume-weighted moving average may be employed, applying an exponential weighting to transaction volumes over shifting period of time (e.g., a trailing 2-hour window).

Figure 24:
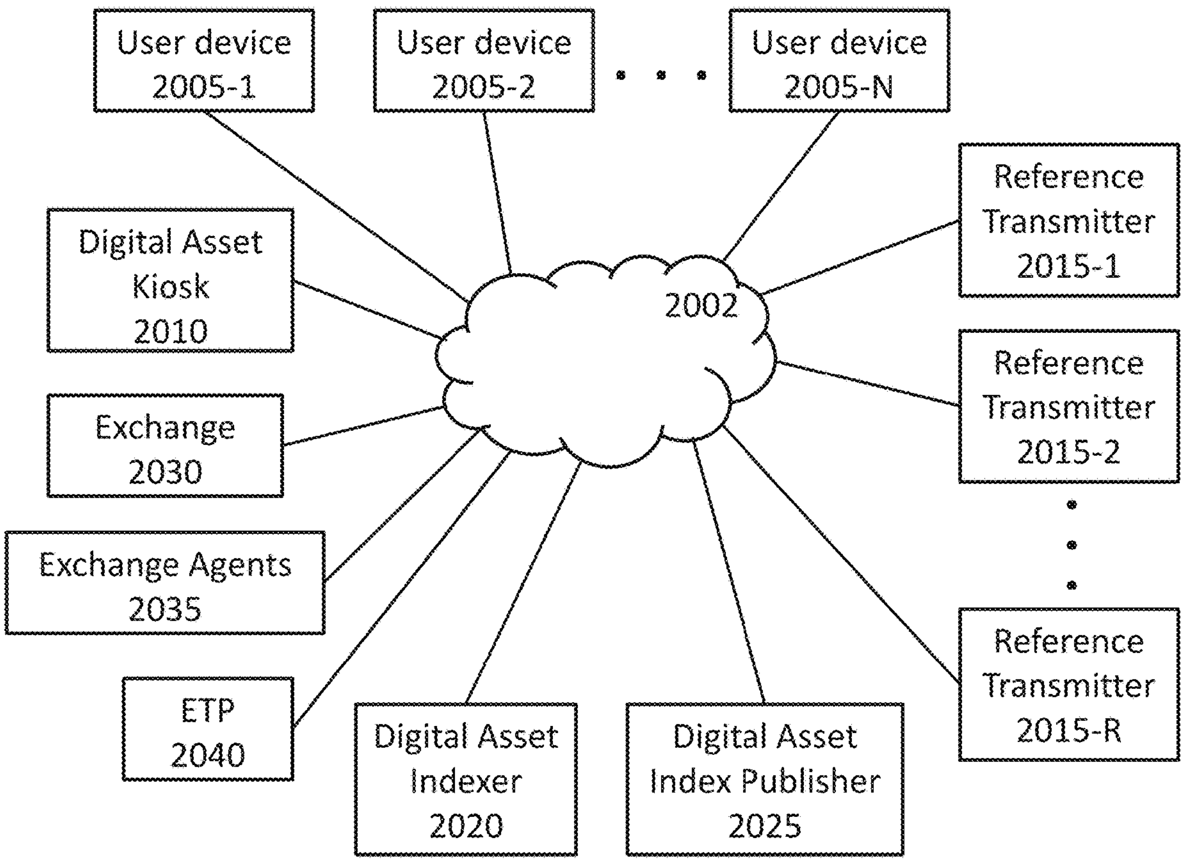
FIG. 24 is a schematic diagram of participants in a system for providing a digital asset index and a digital asset exchange in accordance with exemplary embodiments of the present invention.

FIG. 24 illustrates an exemplary system for providing a digital asset index in accordance with the present invention. A digital asset index system may include one or more user devices 2005 (e.g., 2005-1 to 2005-N), one or more digital asset kiosks 2010, one or more reference transmitters 2015 (e.g., 2015-1 to 2015-R), a digital asset indexer 2020, a digital asset index publisher 2025 (e.g., Winkdex, Bloomberg, Google, Yahoo, to name a few), one or more exchanges 2030, one or more exchange agents 2035, and/or an exchange traded product computer system 2040, to name a few. Any of the components involved in a digital asset index system may be connected directly (e.g., through wired or wireless connections) or indirectly, such as through a data network 2002. Any of the components of a digital asset index system can comprise or include a computer system comprising one or more computers. Accordingly, any of the components may have at least one or more processors, computer-readable memory, and communications portals for communicating with other components of the system and/or outside entities.

Still referring to FIG. 24, a user device 2005 may be a mobile phone, smart phone, PDA, computer, tablet computer, and/or other electronic device that can receive communications. A user device 2005 may run software, such as a digital wallet, for accessing a digital asset index or may access a digital asset index through a general Internet browser. A digital asset kiosk 2010 may also access a published digital asset index, as discussed herein. A digital asset indexer 2020 may generate one or more digital asset indices, and a digital asset index publisher 2025 may provide access to the one or more digital asset indices. For example, a digital asset index publisher 2025 may publish an index to a website, to a scrolling sign, and/or to software (e.g., an application such as a digital wallet client on a user device), to name a few. A digital asset indexer 2025 may deliver index data (which may include index values and other information, such as times corresponding to the values) and/or one or more index values to one or more destinations, such as user devices 2005 and/or computer systems, including third-party computer systems. Delivering index data can include transmission via a data network 2002, which can include transmission by email and/or SMS, to name a few. An application programming interface ("API") may be used to provide access to a digital asset index from one or more third-party devices or computer systems. An embeddable widget may be provided to enable display on a third-party website of digital asset index data and/or index visualizations (e.g., graphs, charts, and/or accompanying visualization options, such as time range).

Still referring to FIG. 24, data from one or more reference transmitters 2015 may be used to generate an index, as discussed herein. Transmitters may be money service businesses or money transmit businesses in the United States. Transmitters 2015 may be part of a digital asset exchange 2030. Exchanges 2030 outside the United States may function like transmitters, e.g., performing all or part of the roles ascribed herein to transmitters 2015, but without the same money transmit licenses as required in the United States.

Figure 25A:
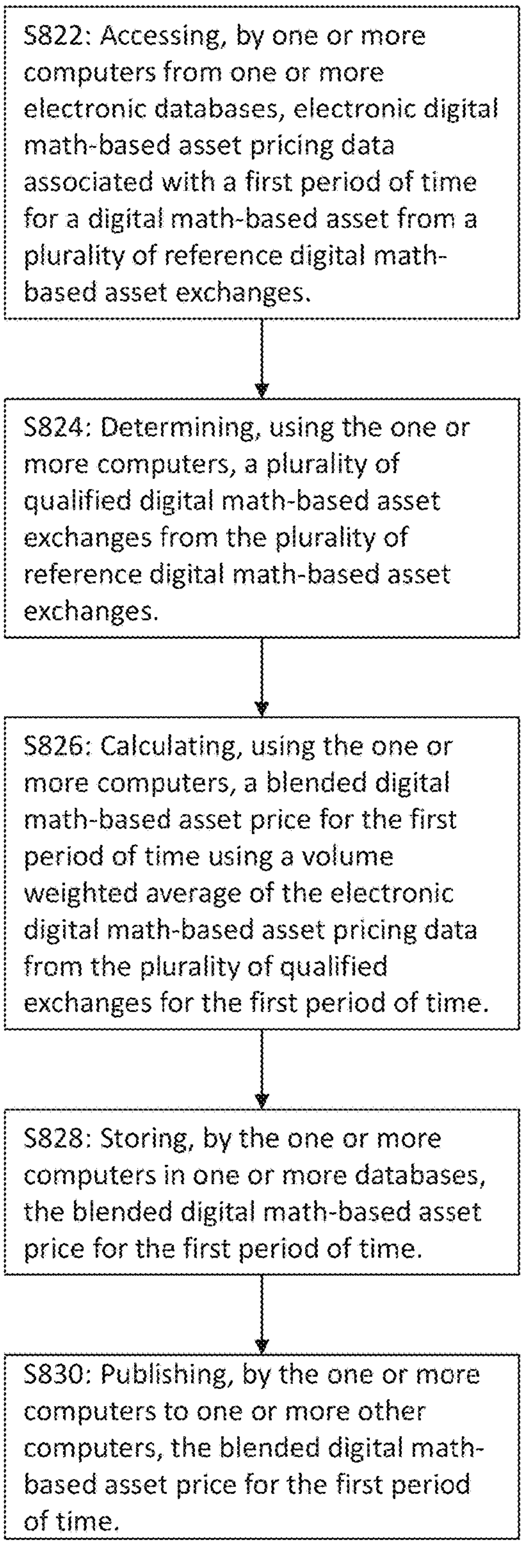
FIGS. 25A and 25B are flow charts of a method for creating an index of digital asset prices in accordance with exemplary embodiments of the present invention.

FIG. 25A is another flow chart of an exemplary process for providing a blended digital math-based asset price in accordance with the present invention.

In a step S822, one or more computers may access from one or more electronic databases stored on computer-readable memory, electronic digital math-based asset pricing data associated with a first period of time for a digital math-based asset from a plurality of reference digital math-based asset exchanges (e.g., four exchanges). In embodiments, the electronic pricing data can include transaction prices and/or bid and ask prices, to name a few. In embodiments, the one or more computers may access transaction data, including transaction volume data.

In a step S824, the one or more computers may determine a plurality of qualified digital math-based asset exchanges (e.g., three exchanges) from the plurality of reference digital math-based asset exchanges. In embodiments, the plurality of qualified exchanges may be determined by evaluating, by the one or more computers, electronic exchange selection criteria, which may comprise one or more electronic exchange selection rules.

In a step S826, a blended digital math-based asset price for the first period of time may be calculated, using the one or more computers, using a volume weighted average of the electronic digital math-based asset pricing data from the plurality of qualified exchanges for the first period of time.

In a step S828, the one or more computers may store in one or more databases the blended digital math-based asset price for the first period of time. In embodiments, the databases may be remotely located, e.g., in a cloud computing architecture. In embodiments, the databases may store one or more other blended digital math-based asset prices corresponding to one or more other periods of time.

In a step S830, the one or more computers may publish to one or more other computers the blended digital math-based asset price for the first period of time. As described herein, publishing can comprise transmitting the price to one or more computer, transmitting the price to one or more user electronic device (e.g., a mobile phone), providing the price to an electronic display (e.g., a scrolling display), and/or providing the price to a website, to name a few. In embodiments, the price may be published from the database of blended digital math-based asset prices. In other embodiments, the price may be published by the calculating computer directly, e.g., from working memory.

Figure 25B:
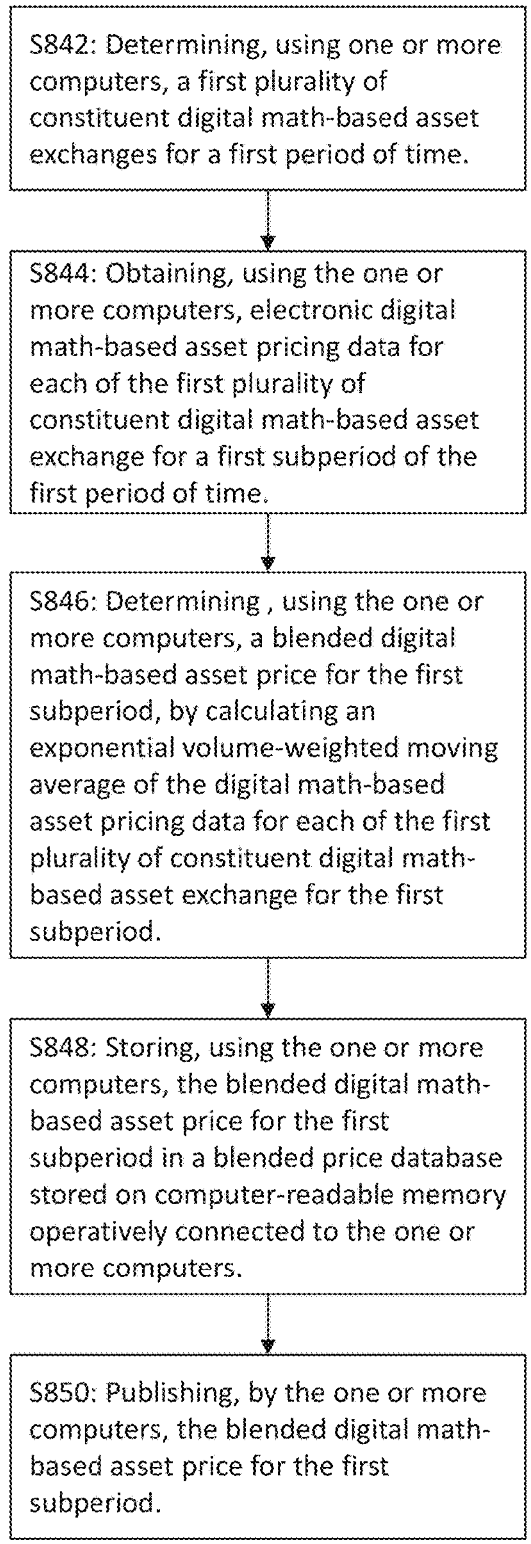

FIG. 25B is a flow chart of another exemplary process for electronically generating an index of digital asset prices.

In a step S842, a first plurality of constituent digital math-based asset exchanges may be determined, using the one or more computers, for a first period of time (e.g., a 24-hour period). In embodiments, electronic digital math-based asset pricing data and associated volume data may be obtained, at the one or more computers, for a first tracking period for each of a plurality of reference digital math-based asset exchanges. In embodiments, the total volume of transactions made on the respective exchange during the tracking period may be calculated, by the one or more computers, for each of the plurality of reference digital math-based asset exchanges. In embodiments, a first plurality of constituent digital math-based asset exchanges may be determined, by the one or more computers, by ranking the plurality of reference digital math-based asset exchanges by total volume for the tracking period and selecting a second plurality of the reference digital math-based asset exchanges (e.g., three) according to the largest total volumes, wherein the second plurality is less than the first plurality.

In embodiments, the process for determining the first plurality of constituent digital math-based asset exchanges can further comprise determining, by the one or more computers, for each of the plurality of reference digital math-based asset exchanges whether the total volume of transactions made on the respective exchange during the tracking period satisfies a threshold volume; determining, by the one or more computers, whether the digital math-based asset exchange transacts in an approved currency; and determining, by the one or more computers, for each of the plurality of reference digital math-based asset exchanges whether qualified transaction data is available from the respective digital math-based asset exchange for a threshold aggregate period of time, wherein qualified transaction data is data from a calculation period during which (1) a threshold number of transactions occurred and (2) a maximum volatility threshold was not exceeded, and wherein a calculation period is a subperiod of the tracking period.

In a step S844, electronic digital math-based asset pricing data may be obtained, using the one or more computers, for each of the first plurality of constituent digital math-based asset exchange for a first subperiod of the first period of time (e.g., a 2-hour period within the first period of time). In embodiments, electronic digital math-based asset pricing data (e.g., transaction prices, bid and ask prices, transaction volume data, to name a few) may be obtained, using the one or more computers, for each of the first plurality of constituent digital math-based asset exchange for a second subperiod of the first period of time.

In a step S846, a blended digital math-based asset price may be determined, using the one or more computers, for the first subperiod, by calculating an exponential volume-weighted moving average of the digital math-based asset pricing data for each of the first plurality of constituent digital math-based asset exchange for the first subperiod. In embodiments, a blended digital math-based asset price may be determined, using the one or more computers, for the second subperiod, by calculating an exponential volume-weighted moving average of the digital math-based asset pricing data for each of the first plurality of constituent digital math-based asset exchange for the second subperiod. In embodiments, the exponential moving average utilizes a coefficient between 0.6 and 0.8.

In a step S848, the blended digital math-based asset price may be stored, using the one or more computers, for the first subperiod in a blended price database stored on computer-readable memory operatively connected to the one or more computers. In embodiments, the blended digital math-based asset price may be stored, using the one or more computers, for the second subperiod in the blended price database. In embodiments, the blended price database may comprise at least blended digital math-based asset prices at a specified interval, e.g., prices every 15 seconds, every minute, and/or once per day, such as at a specified time each day, to name a few. Accordingly, prices at the intervals may be interpolated from the blended digital asset prices closest in time.

In a step S850, blended digital math-based asset price for the first subperiod may be published, by the one or more computers. In embodiments, blended digital math-based asset prices may be published, by the one or more computers, for a plurality of consecutive subperiods during the first period of time. In embodiments, the blended digital math-based asset price for the first subperiod or for the plurality of consecutive subperiods may be published from the blended price database. In embodiments, the blended digital math-based asset price may be published to one or more user devices. In embodiments, the blended digital math-based asset price may be electronically published through a dedicated website and/or through one or more electronic access points. The blended digital asset price can be published, using one or more computers, on the trust's website and distributed to APs. The blended digital asset price may form the basis of a digital asset index, as discussed herein. In embodiments, no intraday blended digital asset price may be required to be published throughout the day.

Still referring to step S850, a graphical representation of blended digital math-based asset prices may be generated, by the one or more computers. The graphical representation may include the blended digital math-based asset prices for the plurality of consecutive subperiods during the second period of time. The graphical representation may be provided from the one or more computers to the one or more second computers. In embodiments, the graphical representation includes a graphical representation of the digital math-based asset pricing data for each of the first plurality of constituent digital math-based asset exchanges for the plurality of consecutive subperiods during the second period of time. In embodiments, the graphical representation further includes a second graphical representation of volume data for each of the first plurality of constituent digital math-based asset exchanges for the plurality of consecutive subperiods during the second period of time.

In still other embodiments, an API for accessing the blended digital math-based asset price may be provided, by the one or more computers to one or more third computers. An electronic API request to access a blended digital math-based asset price for a subperiod may be received, by the one or more computers from the one or more third computers, and the blended digital math-based asset price for the first subperiod may be provided by the one or more computers to the one or more third computers.

In embodiments, generating a blended digital asset price and/or a blended digital asset price index can comprise accessing transaction data from a plurality of exchanges, as described herein. Such processes can include data normalization, which can convert data to a consistent and/or uniform format. For example, digital asset price data from one exchange may be provided in units of bitcoin, while price data from another exchange may be provided in units of milli-bitcoin, and data from another exchange may be provided in satoshis. Upon accessing the data from the different exchanges, the data may be converted to a common format, such as milli-bitcoin. In embodiments, time data may also be converted to a common format, e.g., 24-hour time, and/or a common time zone, e.g., GMT.

In an exemplary embodiment, a blended digital asset price may be calculated by blending the trading prices in U.S. dollars for the top three (by volume) qualified exchanges during the previous two-hour period using a volume-weighted exponential moving average. Constituent exchanges of the index can be selected according to rules, such as requiring that the exchanges have electronic trading platforms on which users may buy or sell digital assets with other users in exchange for U.S. dollars. The value of the index (including a daily spot price) can be determined using exchange transaction data on a moving average basis over a trailing two-hour period. The computer code used to generate the index may weight exchange transactions by volume on a proportional basis. In order to reflect the latest in pricing information, the most recent transactions may be weighted exponentially greater than earlier transactions in the two-hour period.

EXAMPLE OF ETP PROCESS

Without meaning to limit the scope of the present invention, the following examples illustrate exemplary embodiments in accordance with the present invention and set forth the basic operation of the trust on a day-to-day basis by reflecting exemplary creations, redemptions, payments of the sponsor's fee, netting of transfers, trustee instructions and actions, and the creation and activation of cold storage digital wallets from the cold storage vault security system.

Each of these examples assume the following facts:

There are two authorized participants (AP1 and AP2).

The Trust is comprised of 5,000,000 outstanding shares, represented by underlying assets totaling 999,370.51327457 bitcoin. Assuming a blended bitcoin price of $200.00, the trust NAV is $199,728,984.50 as of the open of business on Day 1. For the purpose of this example, the blended bitcoin price does not change.

Each creation unit is represented by 9,986.44922498 bitcoin. While the trust will be formed at 10,000 bitcoin per 50,000 share creation units on the purchase of the seed baskets, the operation of the trust and accumulation of accrued expenses will reduce the bitcoin per creation unit rate over time.

Of the 10,000 cold storage digital wallets generated by the trustee in the formation of the trust, the following is a breakdown of their use status:

- 1,000 wallets are in use in cold storage, with 999 wallets holding 1,000 bitcoin and one partially filled wallet holding 370.51327457 bitcoin;
- 422 cold storage wallets have expired due to use for spot checking or activation by recall of paper tokens; and
- 8579 wallets remain inactive in cold storage.

The partially filled cold storage digital wallets has index number 02814 and holds 370.51327457 bitcoin.

The sponsor's fee is 1.00% per annum.

In the exemplary embodiments described in the following examples, the trust operates by rounding only to the nearest Satoshi, which is one hundred-millionth of a bitcoin. As a result, transactions in bitcoin will be reflected to eight decimal places. To assist in the orderly netting and administration of the administrative portal and the cold storage security system, a three business day settlement period is used. The sponsor's fee represents the trust's only expected regular charge. These examples do not include extraordinary expenses, meaning that the sponsor's fee will be the only expense accruing on a daily basis. This will be reflected in the reduction of the bitcoin represented by a creation unit on each of the three days of the example.

Example 1

In Example 1, the following particular facts are assumed: AP1 places a creation order for three creation unit. AP2 places a redemption order for one creation unit. No Sponsor's Fee or extraordinary expenses payable on settlement date. The trust composition is: 5,000,000 outstanding Shares, representing 999,370.51327457 bitcoin. bitcoin per creation unit: 9,986.44922498. Amount of bitcoin in only partially-filled cold storage digital wallets (Index Number 02814): 370.51327457.

On day T, AP1 and AP2 place their orders for three creation units and one redemption, respectively. Trustee accepts the creation and redemption orders and confirms such receipt to AP1 and AP2.

On day T+1, trustee calculates expected netting to be 1 creation unit (i.e., 3 creation units created less 1 creation unit redeemed; no expected Sponsor's Fee or extraordinary expense payments). Trustee determines that no paper tokens need to be retrieved for withdrawals or distributions of bitcoin on the settlement date. The trustee determines and identifies 20 cold storage digital wallets from the Index Number-Public Key list for deposit activation for settlement date creations.

On day T+2, AP1 submits a creation wallet address supplement identifying the public key from which AP1 can deposit its creation deposit of 29,959.34767494 bitcoin. Using the administrative portal, trustee generates a wallet for the AP1 custody account and provides such wallet's public key to AP1 to receive the creation deposit. AP2 submits a redemption wallet address supplement identifying the public key to which AP2 can receive its redemption proceeds of 9,986.44922498 bitcoin. Using the administrative portal, trustee generates a wallet for the AP2 custody account and provides such wallet's public key to AP2 as the account distributing bitcoin. AP1 delivers 29,959.34767494 bitcoin to the public key identified for its AP1 custody account. Trustee acknowledges receipt of such creation deposit. AP2 delivers 50,000 shares to the trust through the third-party clearing agency (e.g., DTC) clearance process. Trustee acknowledges receipt of such share tender.

On day T+3 (Settlement Date), for netting purposes and using the administrative portal, trustee generates a wallet for the trust custody account and transfers 9,986.44922498 bitcoin from the AP1 custody account to such wallet in the trust custody account. Using the administrative portal, the trustee transfers 9,986.44922498 bitcoin from a trust custody account to the newly created wallet in the AP2 custody account; transfers such bitcoin from the AP2 custody account to wallet associated with the Public Key identified by AP2 as its outside account; and instructs the third-party clearing agency (e.g., the DTC) to cancel the 50,000 shares tendered by AP2, in settlement of the redemption. Using the administrative portal, trustee transfers 629.48672543 bitcoin from the AP1 custody account to partially-filled cold storage digital wallets (Index Number 02814) in cold storage; transfers 1,000 bitcoin each from AP1 custody account to 19 additional newly-activated cold storage digital wallets in cold storage; transfers 343.41172453 bitcoin from AP1 custody account to the newly activated cold storage digital wallets (Index Number 08649) in cold storage; and instructs the third-party clearing agency (e.g., the DTC) to transfer 150,000 newly issued shares to AP1 and to cancel the 50,000 shares tendered by AP2, in settlement of the creation.

At the end of this process, there is a net gain of 100,000 shares (2 creation units) issued and 19,972.89844996 bitcoin deposited into the trust; 20 cold storage digital wallets activated, no cold storage digital wallets expired. All temporary wallets are discarded after use. Amount of bitcoin in only partially-filled cold storage digital wallets (Index Number 08649): 343.41172453.

Example 2

Example 2 is treated as the next business day after settlement of Example 1. In Example 2, the following additional particular facts are assumed: AP1 places a creation order for two creation units. AP2 places a redemption order for two creation units. Sponsor's Fee of 837.22012681 bitcoin is due. The trustee can have calculated the sponsor's fee and the sponsor can have confirmed this calculation and provided a Public Key for its outside account prior to Day T. No extraordinary expenses are due payable on settlement date. The trust composition is: 5,100,000 outstanding shares, representing 1,019,343.41172453 bitcoin. The bitcoin per creation unit is: 9,985.35481959 (reduced because of four days of accrued but unpaid Sponsor's Fee). Amount of bitcoin in only partially-filled cold storage digital wallet (Index Number 08649): 343.41172453.

On day T, AP1 and AP2 place their orders for two creation units and two redemption units, respectively. Trustee accepts the creation and redemption orders and confirms such receipt to AP1 and AP2.

On day T+1, trustee calculates expected netting of 19,970.70963918 (i.e., 2 creation units created less 2 creation units redeemed less expected sponsor's fee, with no expected extraordinary expense payments). Trustee determines that one public key must be retrieved through paper tokens for sponsor's fee distributions on the settlement date and requests that the custodian deliver the paper token for the selected Index Number (cold storage digital wallet 00185) from sets A1, A2 and A3. The Trustee determines that only partially-filled cold storage digital wallet Index Number 08649 can be required for deposit activation for remainder bitcoin from the sponsor's fee distribution.

On day T+2, AP1 submits a creation wallet address supplement identifying the public key from which it can deposit its creation deposit of 19,970.70963917 bitcoin. Using the administrative portal, trustee generates a wallet for the AP1 custody account and provides such wallet's public key to AP1 to receive the creation deposit. AP2 submits a redemption wallet address supplement identifying the public key to which it can received its redemption proceeds of 19,970.70963917 bitcoin. Using the administrative portal, trustee generates a wallet for the AP2 custody account and provides such wallet's public key to AP2 as the account distributing bitcoin. Custodian delivers to trustee (or trustee collects from custodian's premises) the paper tokens for the selected Index Number (cold storage digital wallet 00185) from sets A1, A2 and A3. Trustee scans the QR codes, decrypts and reassembles the Private key and decrypts the public key for cold storage digital wallet 00185. AP1 delivers 19,970.70963917 bitcoin to the public key identified for its AP1 custody account. Trustee acknowledges receipt of such creation deposit. AP2 delivers 50,000 shares to the trust through the third-party clearing agency 250 (e.g., the DTC) clearance process. Trustee acknowledges receipt of such share tender.

On day T+3, settlement occurs. For netting purposes and using the administrative portal, Trustee generates a Wallet for the trust custody account and transfers 19,970.70963917 bitcoin from the AP1 Custody Account to such Wallet in the trust custody account. Using the administrative portal, the trustee transfers 19,970.70963917 bitcoin from the trust custody account to the newly created wallet in the AP2 custody account; transfers such bitcoin from the AP2 custody account to wallet associated with the public key identified by AP2 as its outside account; and instructs the third-party clearing agency (e.g., the DTC) to transfer 100, 000 newly issued shares to AP1, in settlement of the creation, and to cancel the 100,000 shares tendered by AP2, in settlement of the redemption. Using the administrative portal, trustee generates a wallet in the sponsor custody account and transfers 837.22012681 bitcoin from Index Number cold storage digital wallets 00185 to the newly created sponsor custody account wallet. Trustee also transfers such bitcoin from the sponsor custody account to the public key identified by sponsor as its outside account; and transfers 162.77987319 bitcoin from Index Number cold storage digital wallet 00185 to the partially filled index number cold storage digital wallet 08649 in cold storage.

At the end of this process, there is no net change of shares issued. bitcoin deposited with the Trust is reduced by 837.22012681. No new cold storage digital wallets activated by deposit; one cold storage digital wallets expired after recall from cold storage and use. All temporary wallets discarded after use. Amount of bitcoin in only partially-filled cold storage digital wallet (Index Number 08649): 506.19159772.

Example 3

Example 3 is treated as the next business day after settlement of Example 2. In Example 3, the following additional particular facts are assumed: AP2 places a redemption order for four creation units. AP1 does not place any order. No Sponsor's Fee or extraordinary expenses payable on settlement date. The trust composition is: 5,100, 000 outstanding shares, representing 1,018,506.19159772 bitcoin. bitcoin per creation unit is: 9,985.08121824 (reduced because of four days of accrued but unpaid Sponsor's Fee). Amount of bitcoin in only partially-filled cold storage digital wallet (index Number 08649): 506.19159772.

On day T, AP2 place its redemption order for four creation units. Trustee accepts the redemption order and confirms such receipt to AP2.

On day T+1, trustee calculates expected netting (none). Trustee determines that 40 public keys need to be retrieved through paper tokens for redemption distributions on the settlement date and requests that the custodian deliver the paper tokens for the selected Index Numbers from sets A1, A2 and A3. The trustee determines that only partially-filled cold storage digital wallets Index Number 08649 can be required for deposit activation for remainder bitcoin from the redemption proceeds withdrawal.

On day T+2, AP submits "redemption wallet address supplement" identifying the public key to which it can received its redemption proceeds of 39,940.32487295 bitcoin. Using the administrative portal, trustee generates a wallet for the AP2 custody account and provides such wallet's public key to AP2 as the account distributing bitcoin. Custodian delivers to trustee (or trustee collects from custodian's premises) the paper tokens for the selected 40 cold storage digital wallets by Index Number from Sets A1, A2 and A3. Trustee scans the QR codes, decrypts and reassembles the Private Keys and decrypts the Public Keys for the 40 cold storage digital wallets by Index Number. AP2 delivers 200,000 shares to the Trust through the third-party clearing agency (e.g., the DTC) clearance process. Trustee acknowledges receipt of such share tender.

On day T+3 (Settlement Date), using the administrative portal, the trustee transfers 1,000 bitcoin from each of 39 of the cold storage digital wallets pulled from cold storage to the newly created wallet in the AP2 custody account, totaling 39,000 bitcoin; transfers 940.32487295 bitcoin from the remaining cold storage digital wallet pulled from cold storage to the newly created wallet in the AP2 custody account; transfers 59.67512705 bitcoin from the remaining cold storage digital wallet to partially-filled cold storage digital wallet (Index Number 08649); transfers the total of 39,940.32487295 such bitcoin from the wallet in AP2 custody account to the public key identified by AP2 as its outside account; and instructs the third-party clearing agency (e.g., the DTC) to cancel the 200,000 shares tendered by AP2, in settlement of the redemption.

At the end of this process, there is a reduction of 20,000 shares issued by the trust and a reduction of 39,940.32487295 bitcoin deposited with the trust. No new cold storage digital wallets activated by deposit; forty cold storage digital wallets expired after recall from cold storage and use. All temporary wallets discarded after use. Amount of bitcoin in only partially-filled cold storage digital wallet (Index Number 08649): 565.86672477.

Digital Asset Transaction Kiosk

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

Figure 37:
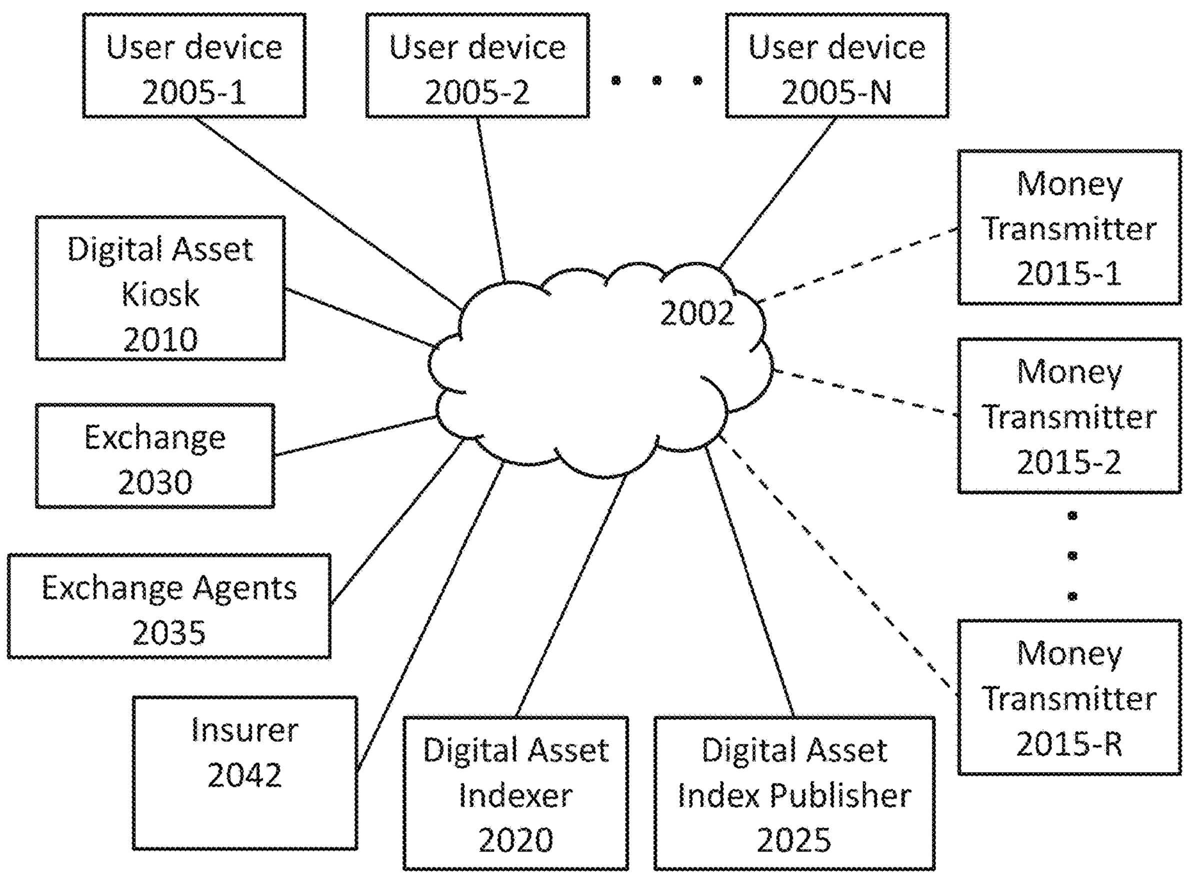
FIG. 37 is a schematic diagram of participants in a system including a digital asset kiosk and a digital asset exchange in accordance with exemplary embodiments of the present invention.

FIG. 37 illustrates an exemplary system including a digital asset kiosk for accessing a digital asset exchange in accordance with embodiments of the present invention. A digital asset kiosk system may include one or more user devices 2005 (e.g., 2005-1 to 2005-N), one or more digital asset kiosks 2010, one or more reference transmitters 2015 (e.g., 2015-1 to 2015-R), a digital asset indexer 2020, a digital asset index publisher 2025, one or more exchanges 2030, one or more exchange agents 2035, and/or one or more insurers 2042, to name a few. Any of the components involved in a digital asset kiosk system may be connected directly (e.g., through wired or wireless connections) or indirectly, such as through a data network 2002. Any of the components of a digital asset kiosk system can comprise or include a computer system comprising one or more computers. Accordingly, any of the components may have at least one or more processors, computer-readable memory, and communications portals for communicating with other components of the system and/or outside entities.

Still referring to FIG. 37, a user device 2005 may be a mobile phone, smart phone, PDA, computer, tablet computer, and/or other electronic device that can receive communications. A user device 2005 may run software, such as a digital wallet, for accessing a digital asset exchange or may access a digital asset exchange through a general Internet browser. A digital asset kiosk 2010 may also access a digital asset exchange, as discussed herein. A digital asset indexer 2020 may generate one or more digital asset indices, and a digital asset index publisher 2025 may provide access to the one or more digital asset indices. For example, a digital asset index publisher 2025 may publish an index to a website, to a scrolling sign, and/or to software (e.g., an application such as a digital wallet client on a user device), to name a few. A digital asset indexer 2025 may deliver index data (which may include index values and other information, such as times corresponding to the values) and/or one or more index values to one or more destinations, such as user devices 2005 and/or computer systems, including third-party computer systems. Delivering index data can include transmission via a data network 2002, which can include transmission by email and/or SMS, to name a few. An AP1 may be used to provide access to a digital asset exchange from one or more third-party devices or computer systems. An embeddable widget may be provided to enable display on a third-party website of digital asset exchange data and/or exchange data visualizations (e.g., graphs, charts, and/or accompanying visualization options, such as time range).

One or more insurers 2042 may provide insurance for fiat accounts, such as fiat exchange accounts. In embodiments, fiat exchange accounts may be held at an exchange partner bank. Such accounts may be insured by the Federal Deposit Insurance Corporation (FDIC). In embodiments, insurers 2042 may be private insurance companies. Insurers 2042 may also provide digital asset insurance, which may cover private key loss and/or theft and/or digital asset losses or thefts.

Still referring to FIG. 37, data from one or more money transmitters 2015 may be used to authorize users for access to an exchange, such as by performing anti-money laundering compliance processes, as described herein. Transmitters may be money service businesses or money transmit businesses in the United States. Money transmitters 2015 may be part of a digital asset exchange 2030. In embodiments, exchanges 2030 that are located outside the United States may function like transmitters, e.g., performing all or part of the roles ascribed herein to transmitters 2015, but without the same money transmit licenses as required in the United States.

Figure 38A:
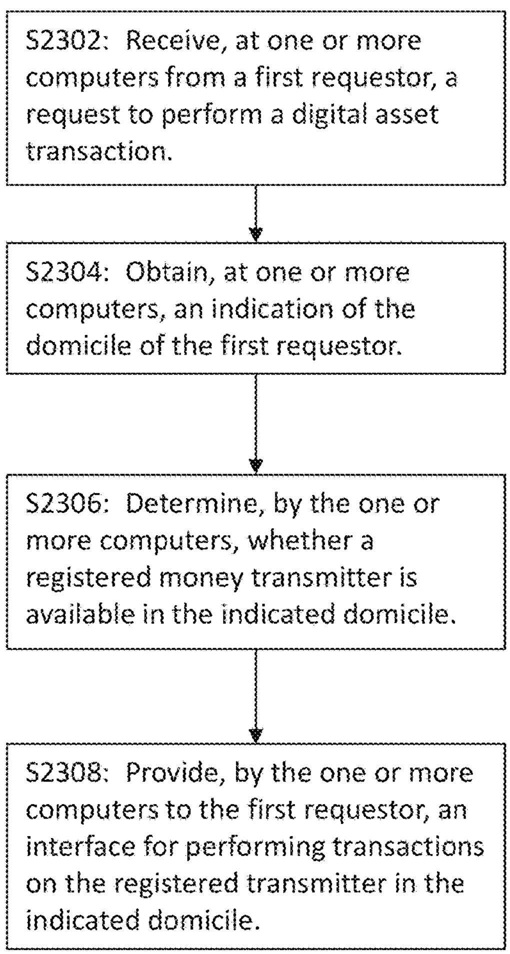
FIGS. 38A-B are flow charts of processes for determining a money transmit business to process transactions in accordance with exemplary embodiments of the present invention.
Figure 38B:
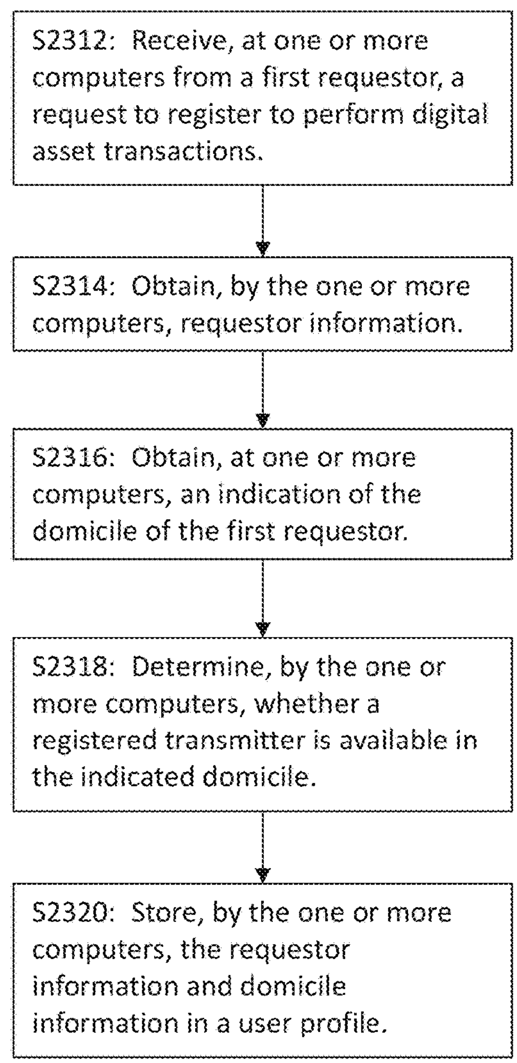

FIGS. 38A-B provide exemplary processes for determining the appropriate money transmit business for performing transactions, such as at a digital asset kiosk, even where the kiosk is located in a state other than the user's domicile. In embodiments, such processes may be performed for any potential user of an exchange seeking to create an exchange account, regardless of the user device used to access the exchange computer system. In embodiments, the processes described by FIGS. 38A-B may underlie any transactions performed at a digital asset kiosk. The processes may be performed when a user registers to use a digital asset kiosk or network of kiosks. Referring to FIG. 38A, in a step S2302, one or more computers may receive a request to perform a digital asset transaction. Digital asset transactions can include sending digital assets, transferring digital assets to accounts of different denominations (e.g., accounts denominated in different digital assets or in fiat currencies), transferring fiat currencies to digital asset accounts, depositing a fiat currency into a digital asset account, and/or withdrawing a fiat currency from a digital asset account, to name a few. In a step S2304, the one or more computers may obtain an indication of the domicile of the first requestor. In embodiments, the domicile may be a state in the United States. An indication of the domicile may be provided by scanning a government-issued ID, such as a driver's license, which may be used to search a database. Election registration may also be used to determine domicile. For corporations, the state in which they are registered may be their domicile. In embodiments, there may be a waiting period (e.g., one week) before the domicile is confirmed. Transactions may not be permitted until the domicile is confirmed and registration is completed. In a step S2306, the one or more computers may determine whether a state-registered money transmitter is available in the indicated state of domicile. A state-registered transmitter may be a money transmitter business. In embodiments, a domicile may not be a state, such as in the case of United States territories, and an appropriately registered transmitter may be required to proceed. In a step 2308, the one or more computers may provide to the requestor an interface for performing transactions using a transmitter registered in the indicated domicile. Any transaction performed by the requestor may be processed or otherwise handled by that transmitter.

FIG. 38B illustrates another exemplary process for determining the appropriate money transmit business for performing transactions involving digital assets. In a step S2312, one or more computers may receive a request from a requestor to register with a system and/or network for performing digital asset transactions. The requestor may be a natural person or a business. In a step S2314, the one or more computers may obtain requestor information, such as first and last name, address, contact information (e.g., telephone number, email address, to name a few), social security number, bank account information, digital asset wallet information, security information, requestor photograph, biometric information (e.g., handprint, fingerprint, retinal scan, facial analysis) and/or password information, to name a few. In a step S2316, the one or more computers may obtain an indication of the domicile of the requestor, as described with respect to step S2304 of FIG. 21A. In a step S2318, the one or more computers may determine whether a registered (e.g., state-registered) money transmitter is available in the indicated domicile. In a step S2320, the one or more computers may store the requestor information and the requestor domicile information in a user profile, which may use the password information and/or biometric information to provide secure access to a digital asset transaction system or network. A digital asset transaction card may be used (e.g., in conjunction with password or other security information) to provide access to a digital asset transaction system or network, such as through a digital asset kiosk.

Features of a Digital Asset Kiosk

Figure 39:
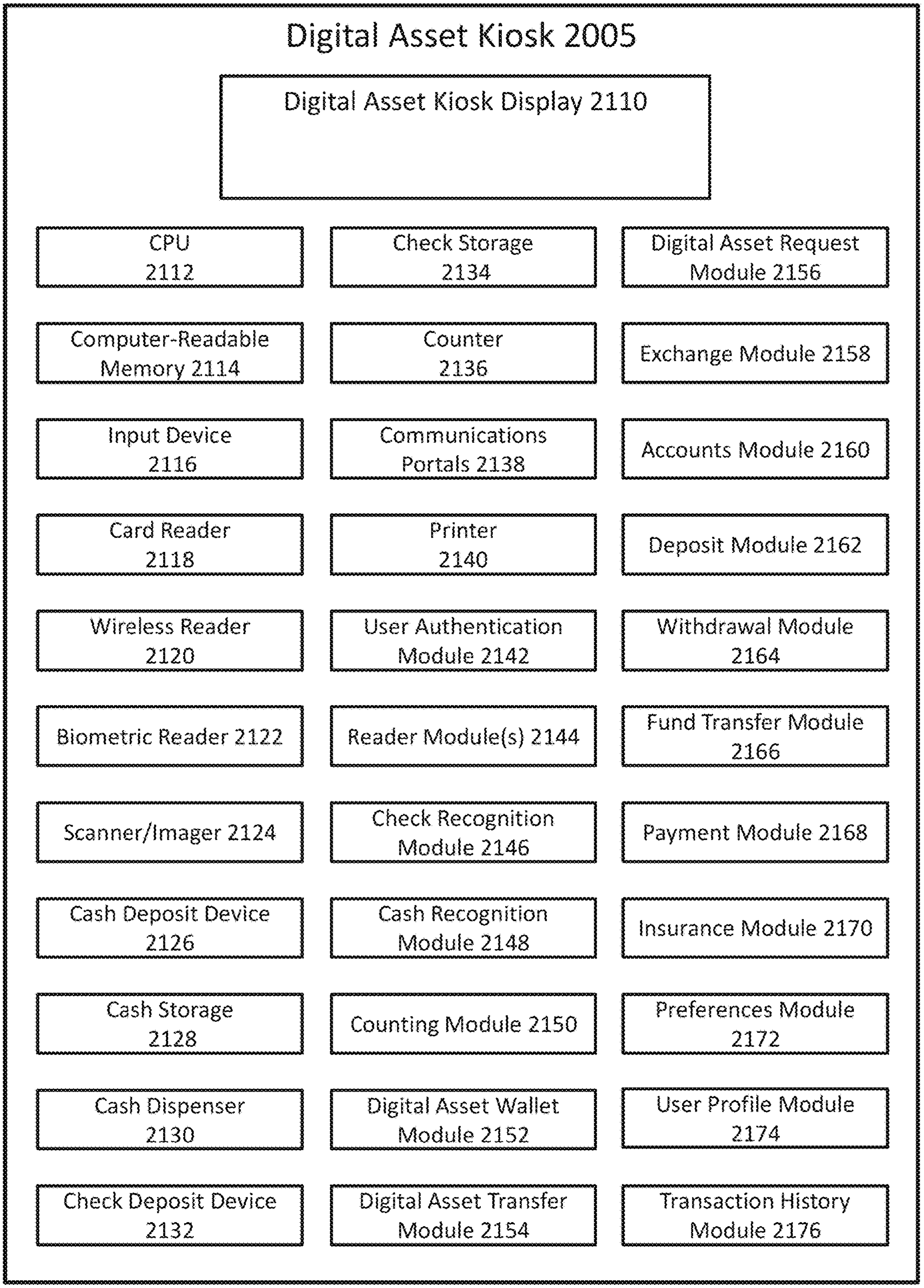
FIG. 39 is a schematic diagram of a digital asset kiosk in accordance with exemplary embodiments of the present invention.

FIG. 39 illustrates an exemplary digital asset kiosk in accordance with embodiments of the present invention. A digital asset kiosk 2005 may have one or more display device 2110, CPU 2112, computer-readable memory 2114, input device 2116, card reader 2118, wireless reader 2120, biometric reader 2122, scanner/imager 2124, cash deposit device 2126, cash storage 2128, cash dispenser 2130, check deposit device 2132, check storage 2134, counter 2136, communications portal 2138, and/or printer 2140. A digital asset kiosk 2005 may run one or more software applications, which may include one or more user authentication module 2142, reader module 2144, check recognition module 2146, cash recognition module 2148, counting module 2150, digital asset wallet module 2152, digital asset transfer module 2154, digital asset request module 2156, exchange module 2158, accounts module 2160, deposit module 2162, withdrawal module 2164, fund transfer module 2166, payment module 2168, insurance module 2170, preferences module 2172, user profile module 2174, and/or transaction history module 2176.

Still referring to FIG. 39, an input device 2116 may be a scanner, keyboard, touchscreen, mouse, microphone, and/or camera, to name a few. A card reader 2118 may be a device that can read magnetically encoded data on cards (e.g., magnetic strips on cards), RFID chips, and/or other cards with data storage, to name a few. A wireless reader 2120 may read data from one or more devices (e.g., smart phones) using wireless communication signals, such as Bluetooth or Wi-Fi. A biometric reader 2122 may be any of a palm scanner, fingerprint reader, retina scanner, facial recognizer, and/or voice recognizer, to name a few. In embodiments, a biometric reader 2122 may include a scanner (e.g., laser scanner), microphone, and/or camera. A scanner/imager 2124 may be used to scan identification cards (e.g., driver's licenses), documents (e.g., electric bills), money, checks, and/or other financial instruments (e.g., negotiable instruments).

Still referring to FIG. 39, a cash deposit device 2126 may receive paper money. In embodiments, coin may also be received by a digital asset kiosk 2005. A cash deposit device 2126 may comprise and/or operatively communicate with a scanner/imager 2124, which may be used to perform recognition of received cash. A cash deposit device 2126 need not be used to perform deposit transactions. Cash storage 2128 may store one or more monetary bills and/or coins. In embodiments, cash storage 2128 may store cash of different denominations. Cash storage 2128 may comprise a storage vault for secure storage of cash. A cash dispenser 2130 may dispense one or more monetary bills. In embodiments, it may dispense coins. A check deposit device 2132 may receive checks (e.g., personal checks, bearer checks, certified checks, cashier's checks, travelers checks, money orders and/or other negotiable instruments. In embodiments, a digital asset kiosk may receive other financial instruments or certificates thereof, such as stock certificates and/or bond certificates, to name a few.

FIG. 39 further illustrates a check deposit device 2132, which may comprise and/or operatively communicate with a scanner/imager 2124 and/or magnetic ink character recognition ("MICR") reader, which may be used to perform recognition of checks and/or other deposited financial instruments or certificates thereof. Those skilled in the art will appreciate that a check deposit device 2132 may be a check receipt device and need not be used in conjunction with deposit transactions. A check storage device 2134 may store one or more checks and/or other financial instruments or certificates thereof. A check storage device 2134 may comprise a vault for secure storage. A counter 2136 may determine an aggregate value of cash (e.g., monetary bills and/or coins), which can entail reading the value one or more bills and/or coins (e.g., upon receipt via cash deposit device 2126 and/or upon retrieval or other accessing of the contents of cash storage 2128). A communications portal 2138 may provide communications with one or more systems (e.g., a digital asset insurance system), devices (e.g., user electronic devices), and/or networks (e.g., a digital asset network, an ACH network), to name a few. A communications portal 2138 may comprise wired and/or wireless communications components, such as cable ports, cable, and/or wireless antennas, to name a few. A printer 2140 may print on one or more media of one or more sizes. A printer 2140 may print receipts (e.g., transaction receipts), transaction history reports, and/or account balance reports, to name a few.

Still referring to FIG. 39, software comprising one or more modules may run on the one or more CPUs 2112. A user authentication module 2142 can authenticate a user, which may entail identifying a user, confirming the identity of a user, and/or validating a user's authorization to use a digital asset kiosk and/or perform one or more transactions. A user authentication module 2142 may interact at least with an input device 2116, card reader 2118, wireless reader 2120, and/or biometric reader 2122, in order to confirm a user's identity. A card reader 2118 may read a user access card, and an input device 2116 may receive a user's passcode. Biometric readers 2122 may provide biometric confirmation of a user's identity. A reader module 2144 may interact with one or more card readers 2118, wireless readers 2120, and/or scanners/imagers 2124 to read card (e.g., with magnetic strips), QR codes, bar codes, RFID chips, and/or text, to name a few. A check recognition module 2146 may recognize one or more fields (e.g., drawer, drawee, account number, date, amount, to name a few) of a check or other financial instrument or certificate thereof. In embodiments, a check recognition module 2146 may comprise optical character recognition ("OCR") technology to read written fields (e.g., typewritten and/or handwritten). A check recognition module may interact with a scanner/imager 2124 and/or a MICR reader. A cash recognition module 2148 may interact with a scanner/imager 2124, a cash deposit device 2126, cash storage 2128, and/or a cash dispenser 2130 to determine denominations and/or values of cash, which may be paper bills and/or coins. A counting module 2150 may interact with a counter 2136 and/or other components of a digital asset kiosk to count and provide an aggregate value of cash (e.g., determine an amount of cash deposited or determine an amount of cash to retrieve for withdrawal) and/or checks (e.g., determine an aggregate value of checks deposited).

A digital asset wallet module 2152 may handle the creation of one or more digital asset wallets and/or the accessing of one or more existing digital asset wallets of one or more denomination. For example, a digital asset wallet module 2152 may handle wallets associated with a single digital asset, such as Bitcoin wallets, or handle wallets associated with a plurality of digital assets, such as Litecoin wallets, and/or Namecoin wallets, in addition to Bitcoin wallets, to name a few. In embodiments, a digital asset kiosk may provide a unified wallet or an umbrella wallet, which may hold assets of different denominations. Such a wallet may use one or more exchange rates to show (e.g., in a single denomination) an aggregate value of assets contained in the wallet. Such exchange rates may be associated with a specific exchange, or a blended exchange rate as discussed herein. The wallet may comprise sub-wallets to hold separately each differently denominated asset. In embodiments, the digital asset wallet module 2152 may also be linked to a fiat currency digital wallet module, which transacts in a fiat currency, such as dollars, euro, yen, to name a few.

The wallet may show a breakdown of the value or number of assets of each denomination that is stored in the wallet. A digital asset wallet module 2152 may otherwise show account balances for one or more digital asset wallets. A digital asset transfer module 2154 may process one or more types of transactions involving the sending of digital assets. Digital assets may be sent to one or more other accounts and/or digital wallets, which may be associated with the user, other people, and/or other institutions. A digital asset request module 2156 may handle the requesting of digital asset transfers. For example, a digital asset request module 2156 may provide an interface by which a user can designate an amount of digital assets to request as well as another user, account, or digital wallet address from which to request the digital assets.

An exchange module 2158 may process exchange and/or conversion transactions involving digital assets. Exchange transactions may involve the conversion of digital assets of one denomination to digital assets of a different denomination, digital assets to fiat currencies, and/or fiat currencies to digital assets. In embodiments, exchange and/or conversion transactions may entail the use of a money transmit business, which may be selected by an exchange module 2158 based on the domicile of a user (e.g., a user performing an exchange transaction, a user sending funds that require an exchange transaction, a user paying a bill that requires an exchange transaction, to name a few). Accordingly, an exchange module 2158 may be used in conjunction with one or more other modules to process any transactions requiring an exchange transaction. In embodiments, an exchange module 2158 may allow a user to select an exchange (e.g., from a list of exchanges) to be used for the transaction. Such an option may enable a user to choose select exchanges located in different geographic regions, such as other countries. An exchange module 2158 may display and/or otherwise communicate one or more exchange rates corresponding to one or more exchanges and/or money service businesses.

Still referring to FIG. 39, an accounts module 2160 may access one or more fiat currency accounts for use in transactions at a digital asset kiosk 2005. For example, an accounts module 2160 may access a fiat currency account denominated in USD to convert USD from the account to bitcoin. An accounts module 2160 may be used to create one or more fiat currency accounts. In embodiments, an accounts module 2160 may be used to store mixed denominations, which may include one or more fiat currencies and/or one or more digital assets of different denominations. An accounts module 2160 may access and/or create an umbrella account and/or a partitioned account to store different denominations. An accounts module 2160 may also provide balances for one or more accounts.

A deposit module 2160 may handle the physical deposit of money of one or more fiat currency and/or one or more checks or other financial instruments into a digital asset kiosk 2005. In embodiments, tokens and/or other physical embodiments of digital assets may be deposited, subject to applicable government regulations. A deposit module 2160 may control, interface with, and/or receive data from any of a cash deposit device 2126, check deposit device 2132, and/or counter 2136, to name a few. In embodiments, a deposit module 2162 may handle the deposit of funds of any denomination (e.g., funds from money and/or financial instruments inserted into a digital asset kiosk 2005) into one or more accounts of any denomination.

A withdrawal module 2164 may process withdrawals of money in any denomination using a digital asset kiosk 2005. Withdrawals may be made from any fiat currency account, investment account, and/or digital asset account. In embodiments, physical embodiments of one or more digital assets may be withdrawn, in conformance with applicable laws.

A fund transfer module 2166 can handle transactions involving the transfer of funds between accounts and/or between people and/or entities. Transfers of funds between accounts can entail moving digital assets from one account to another, which may be denominated differently, moving fiat currency from one account to another, which may be denominated differently, moving digital assets to an account denominated in a fiat currency, and/or moving funds from a fiat currency account to a digital asset account, to name a few. Transfers between differently denominated accounts, including transfers between digital asset and fiat currency accounts, may entail one or more exchange transactions. A fund transfer module 2166 may access (e.g., through one or more AP1) price and/or exchange data from one or more exchanges and/or may show one or more exchange rates associated with one or more exchanges. A fund transfer module 2166 may provide an interface for selecting options related to a fund transfer transaction and/or may implement commands to carry out a fund transfer transaction. Fund transfers can be between accounts with a common owner. Fund transfers can also be from one person or entity to another person or entity.

A payment module 2168 may handle payments using a digital asset kiosk 2005. A payment module 2168 may enable the paying of one or more bills (e.g., electric bill, gas bill, Internet bill, credit card bill, to name a few). A payment module 2168 may process automatic bill pay using digital assets, which may be converted to a fiat currency prior to payment.

An insurance module 2170 may handle the insuring of one or more digital asset accounts and/or transactions. An insurance module 2170 may communicate with one or more insurers to provide insurance options with users, such as basic insurance plans, premium plans, and/or custom coverage plans. Insurance options may comprise different coverage amounts, different premiums, and/or different asset storage policies, to name a few.

A preferences module 2172 may provide an interface for receiving user preferences and/or may implement those preferences. Preferences can include the language that is used, a default account to use for fund transfers, and/or a default exchange, to name a few. One or more preferences may be stored as part of a user profile such that the preferences may be loaded when a user logs into a digital asset kiosk 2005.

A user profile module 2174 can store user data (e.g., name, contact information, address, telephone number, email address, social security number, government ID information, biometric information, photograph, username, password, security questions, and/or membership data associated with a digital asset kiosk network, to name a few). A user profile module 2174 may store information associated with one or more fiat currency accounts and/or digital asset accounts (e.g., digital asset wallets), so that a user may access and/or use those accounts via a digital asset kiosk 2005.

A transaction history module 2176 may track and/or display account activity for one or more accounts. A transaction history module 2176 may show destinations, recipients, amounts, and/or dates of fund transfers and/or payments and/or may show withdrawals, deposits, exchange transactions, and/or insurance transactions.

Figure 40A:
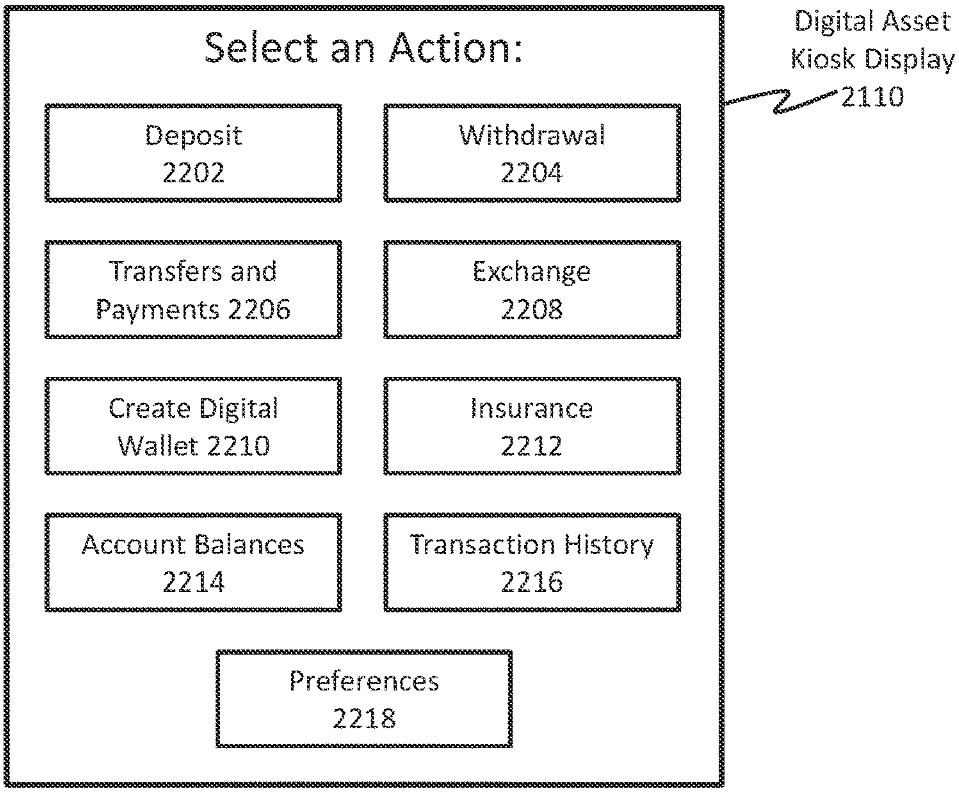
FIGS. 40A-Q are schematic diagrams of a digital asset kiosk display showing exemplary interfaces for various transactions and functions involving digital assets in accordance with exemplary embodiments of the present invention.
Figure 40B:
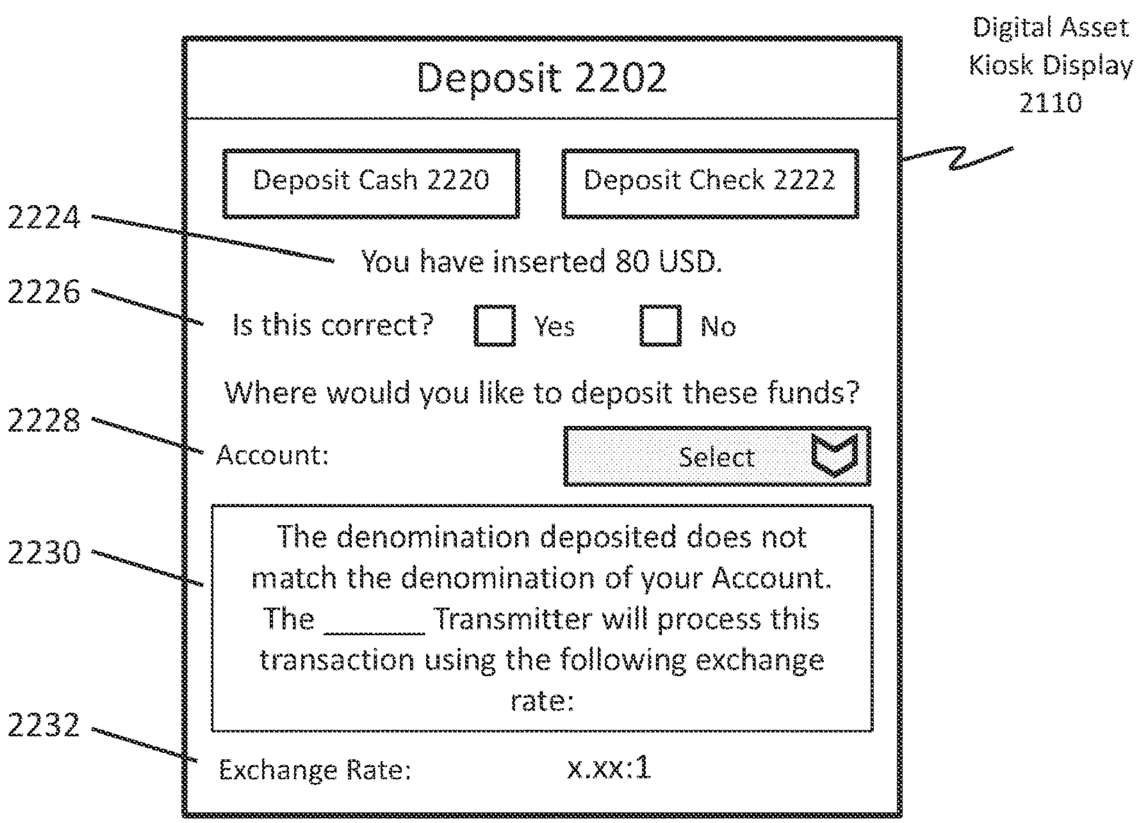
Figure 40C:
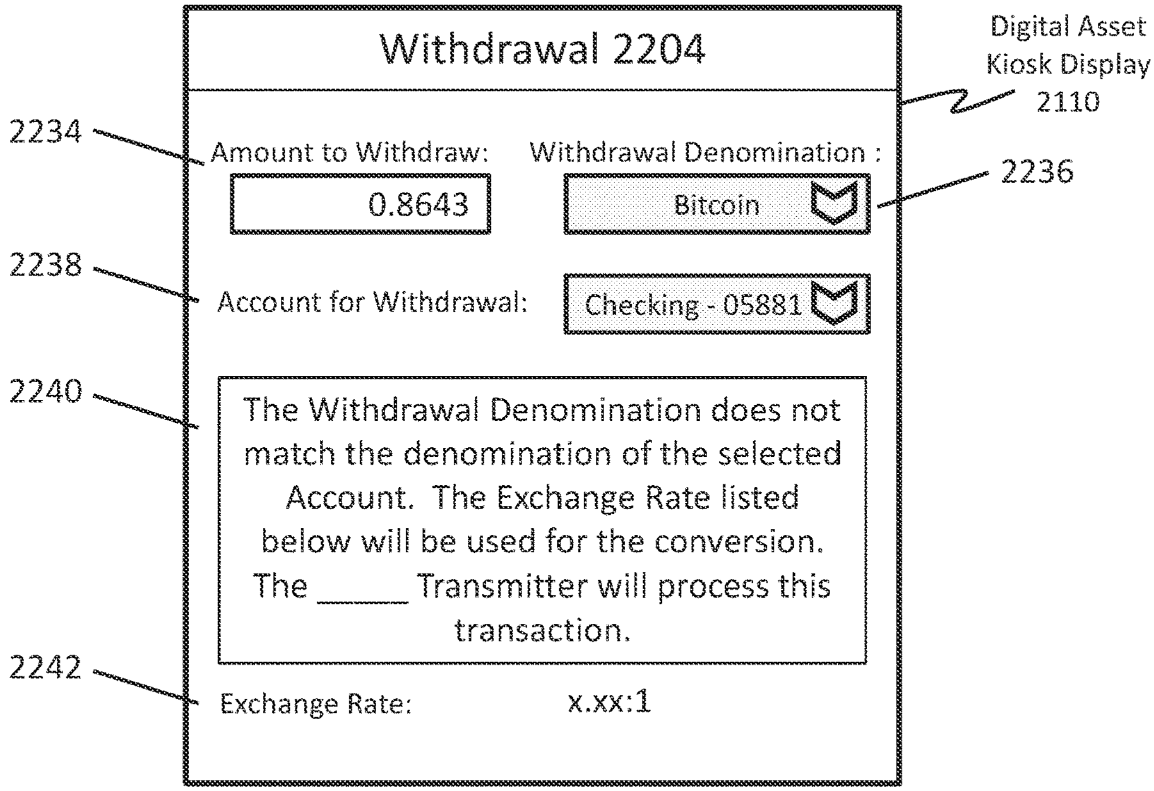
Figure 40D:
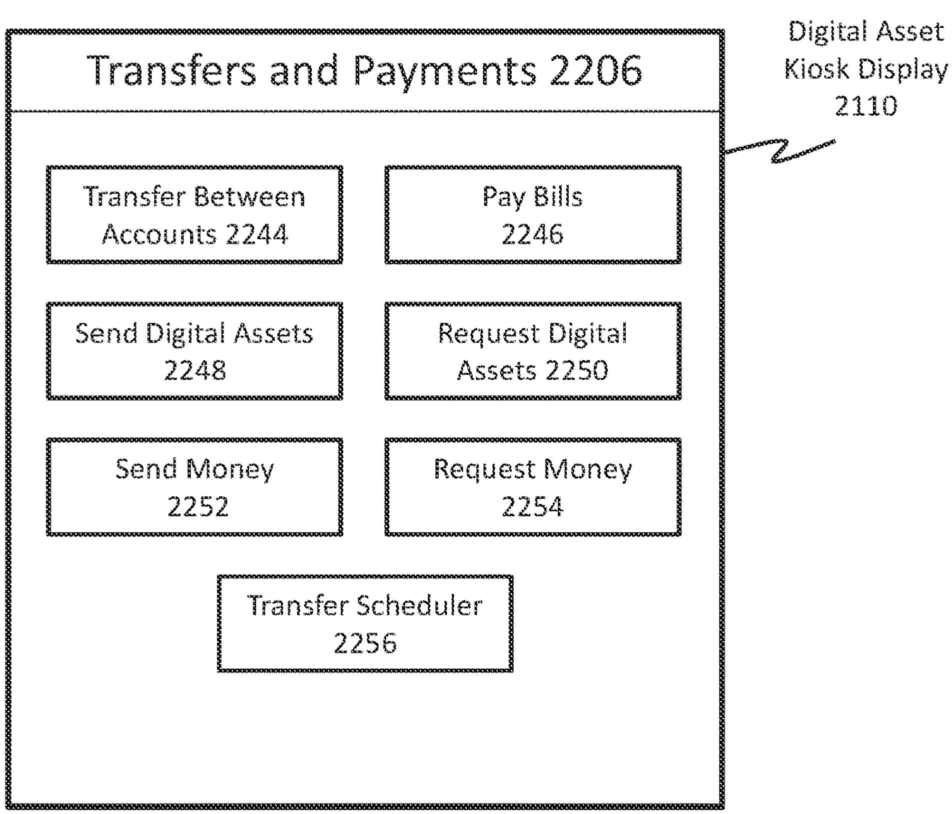
Figure 40E:
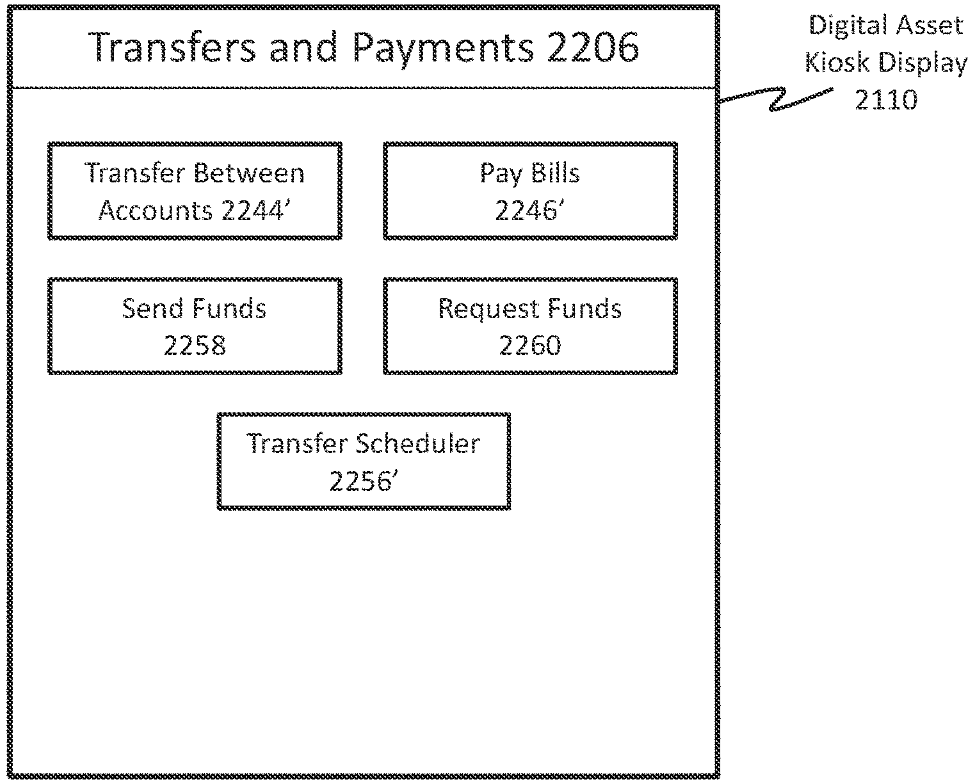
Figure 40F:
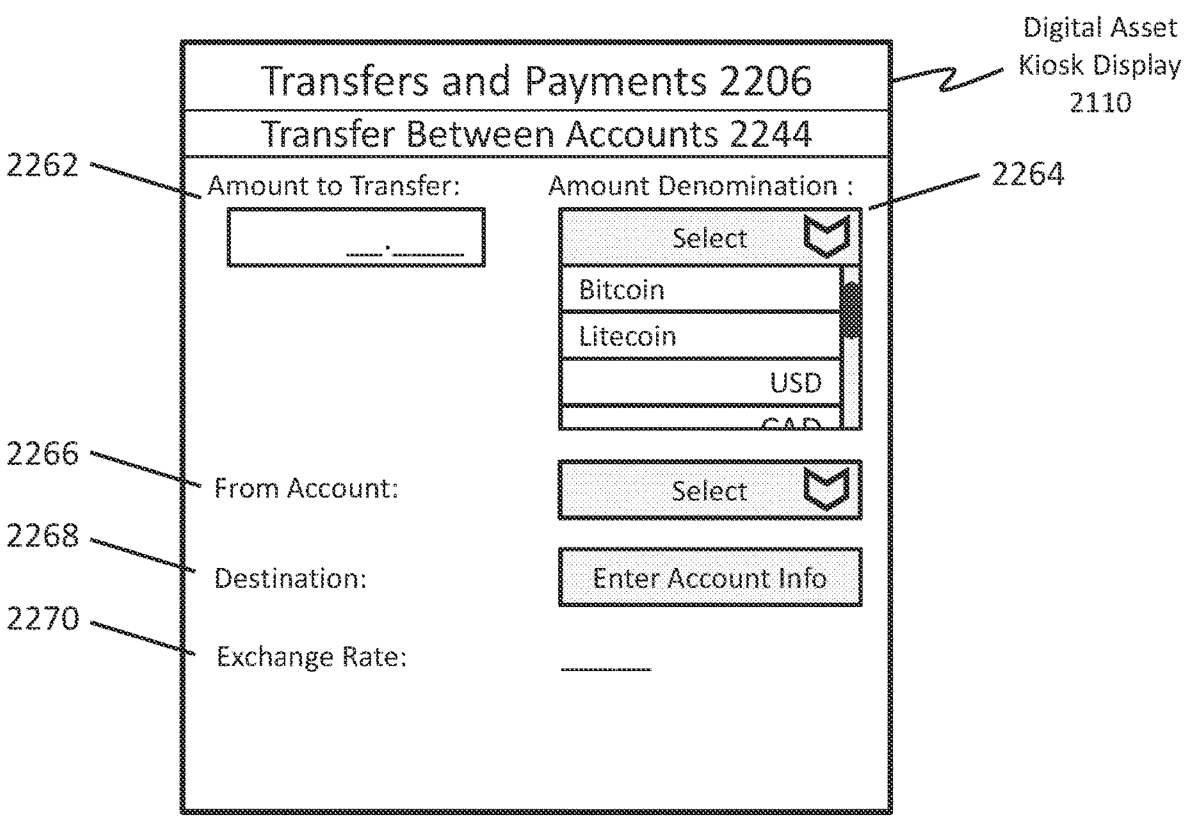
Figure 40G:
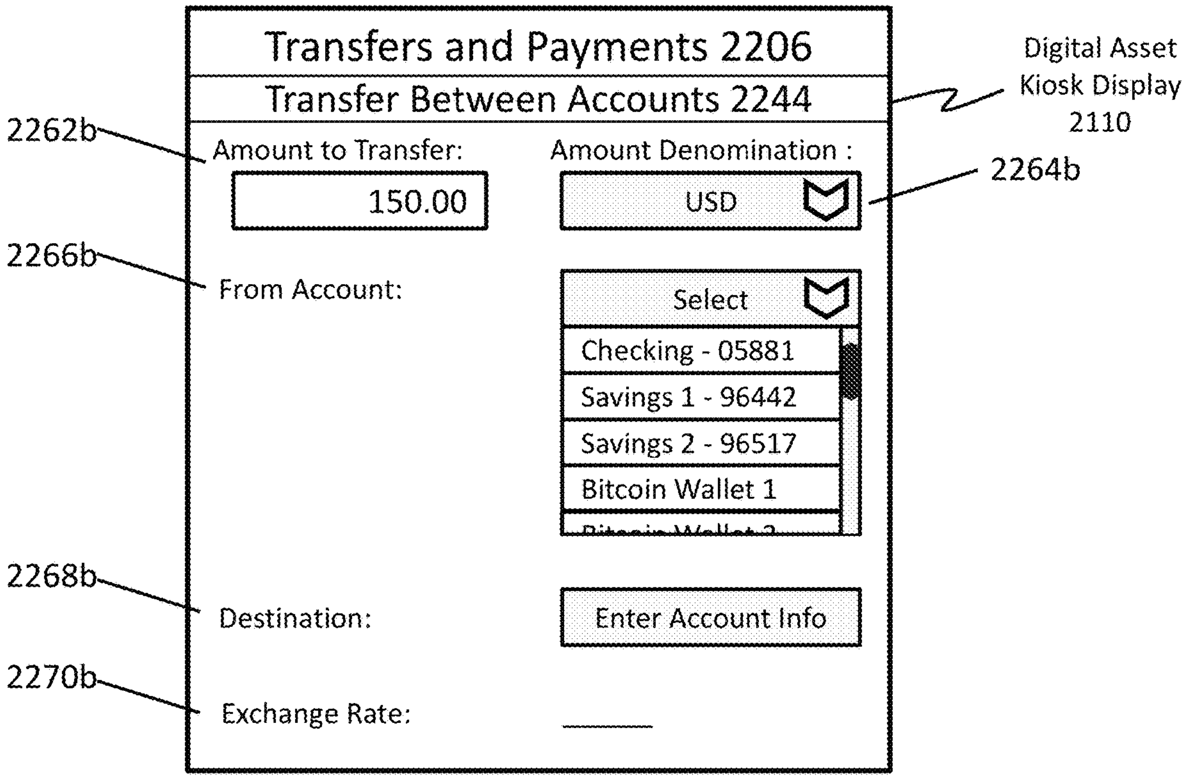
Figure 40H:
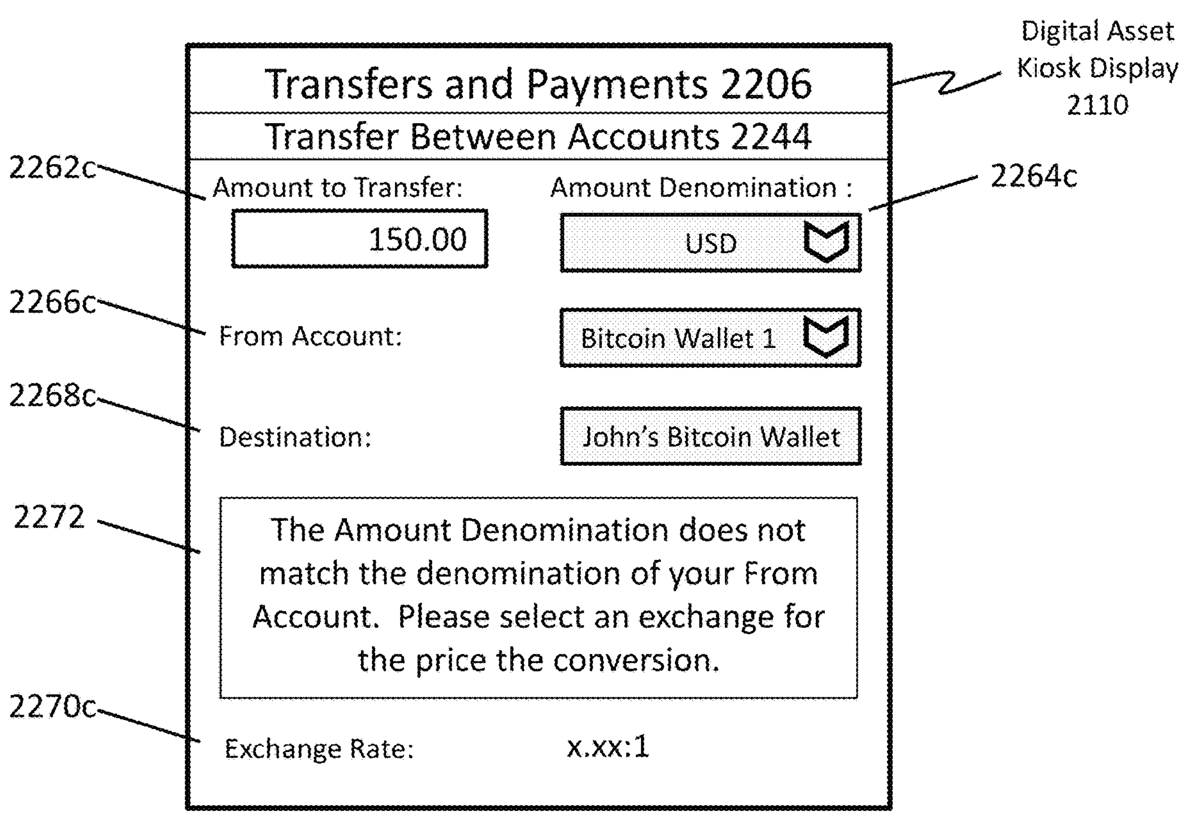
Figure 40I:
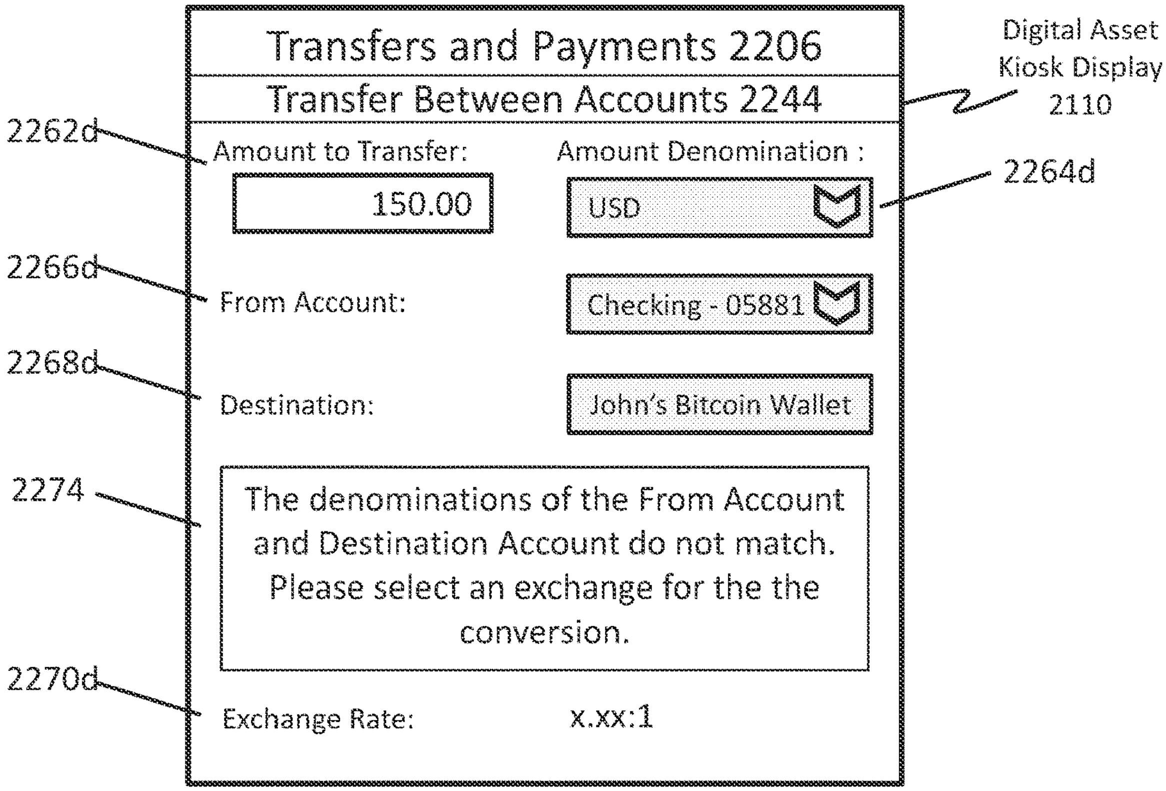
Figure 40J:
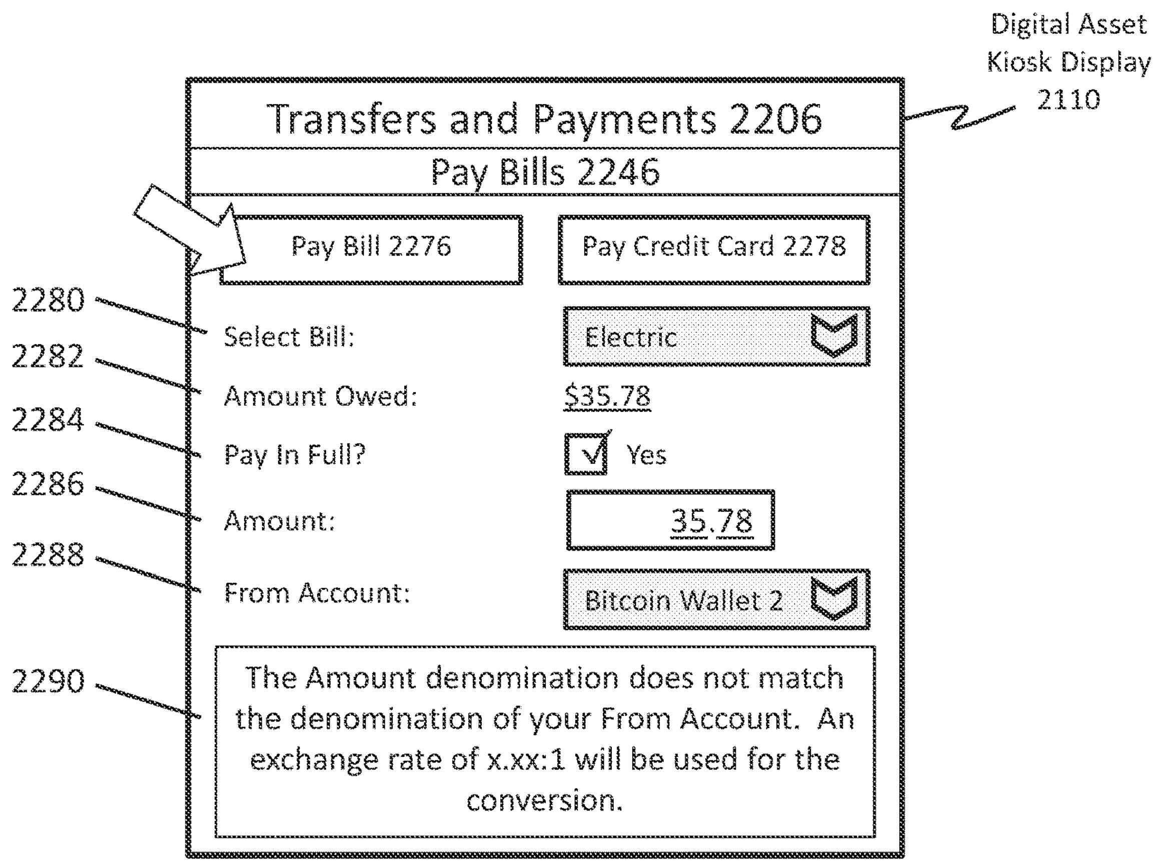
Figure 40K:
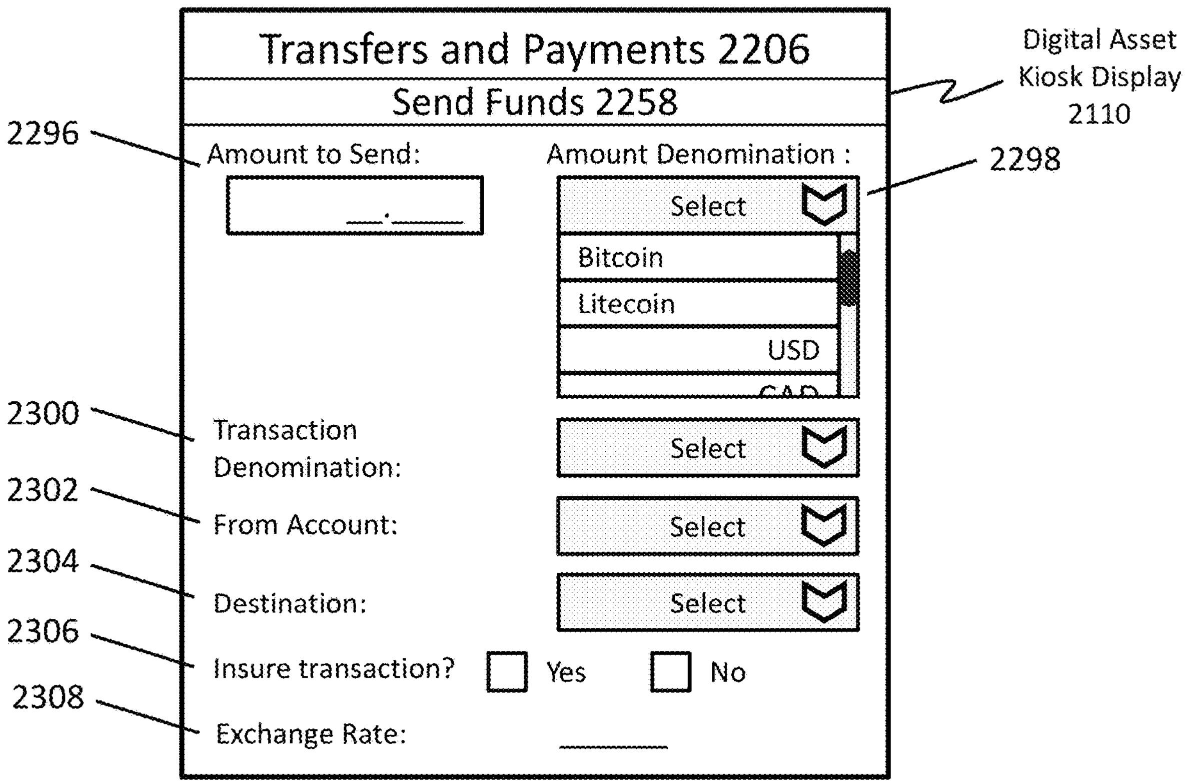
Figure 40L:
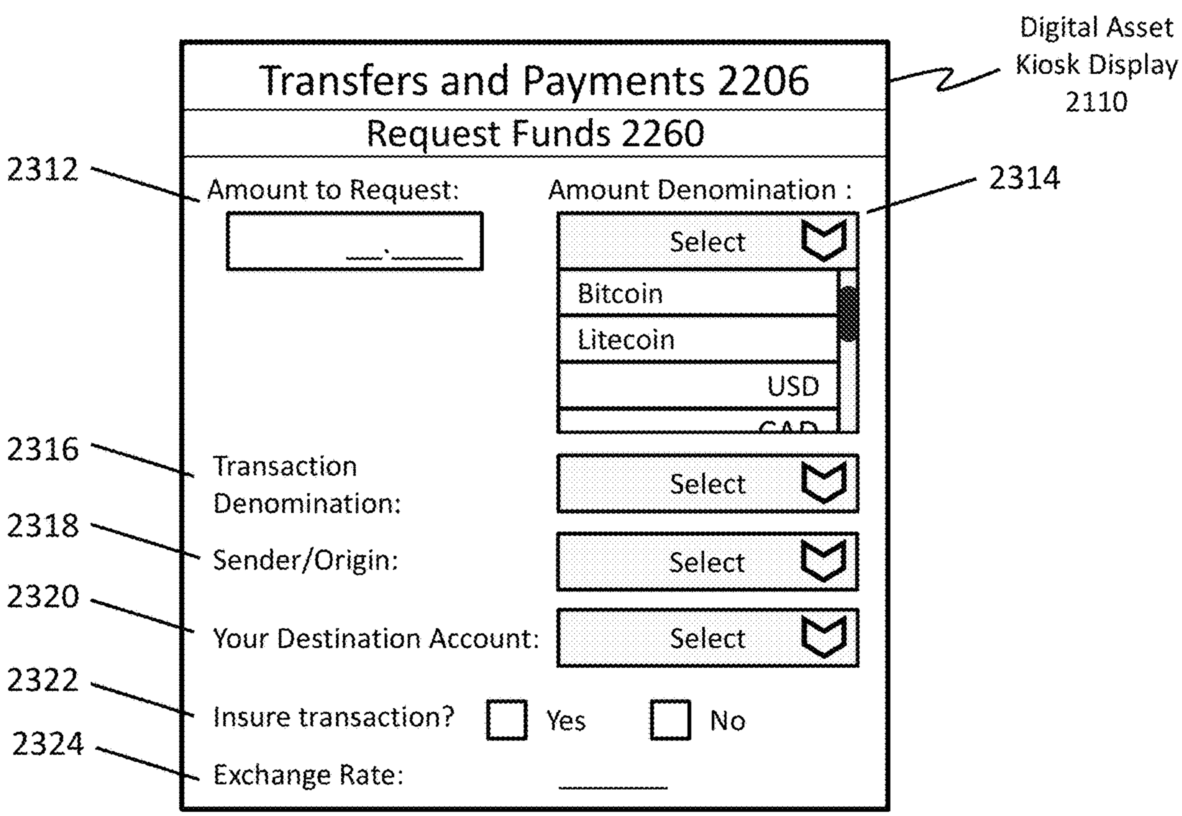
Figure 40M:
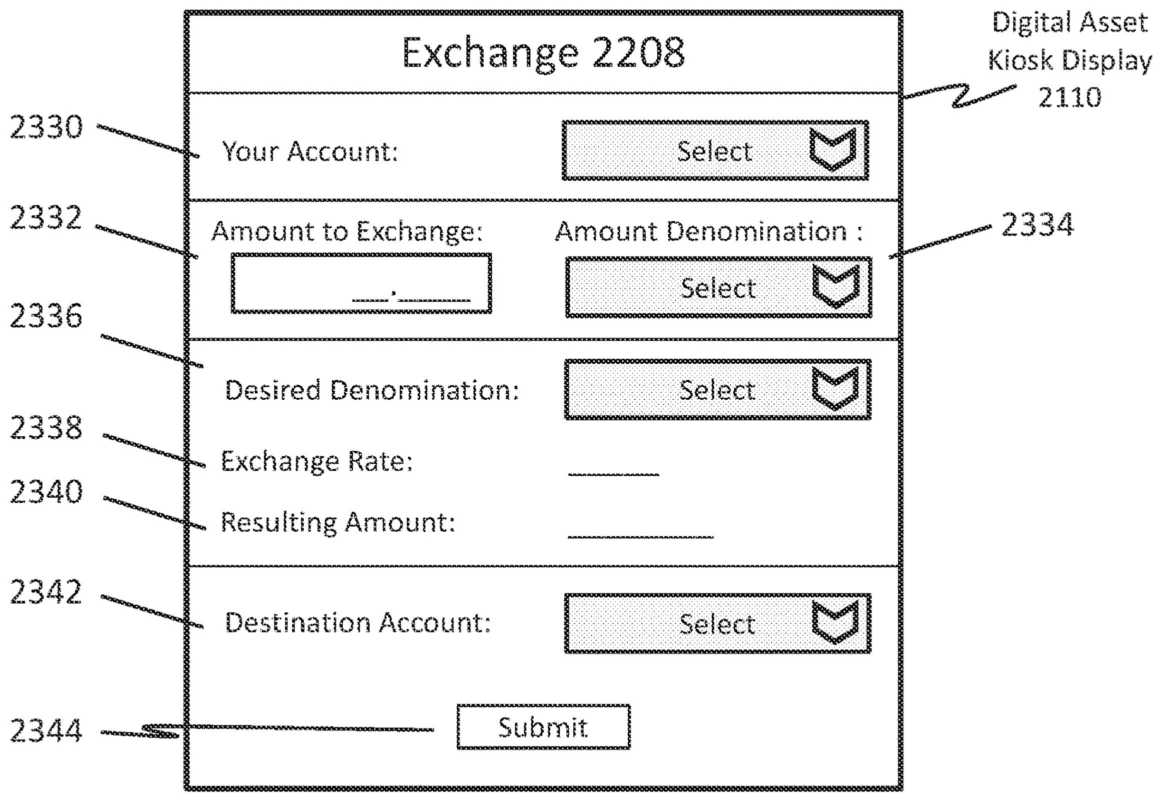
Figure 40N:
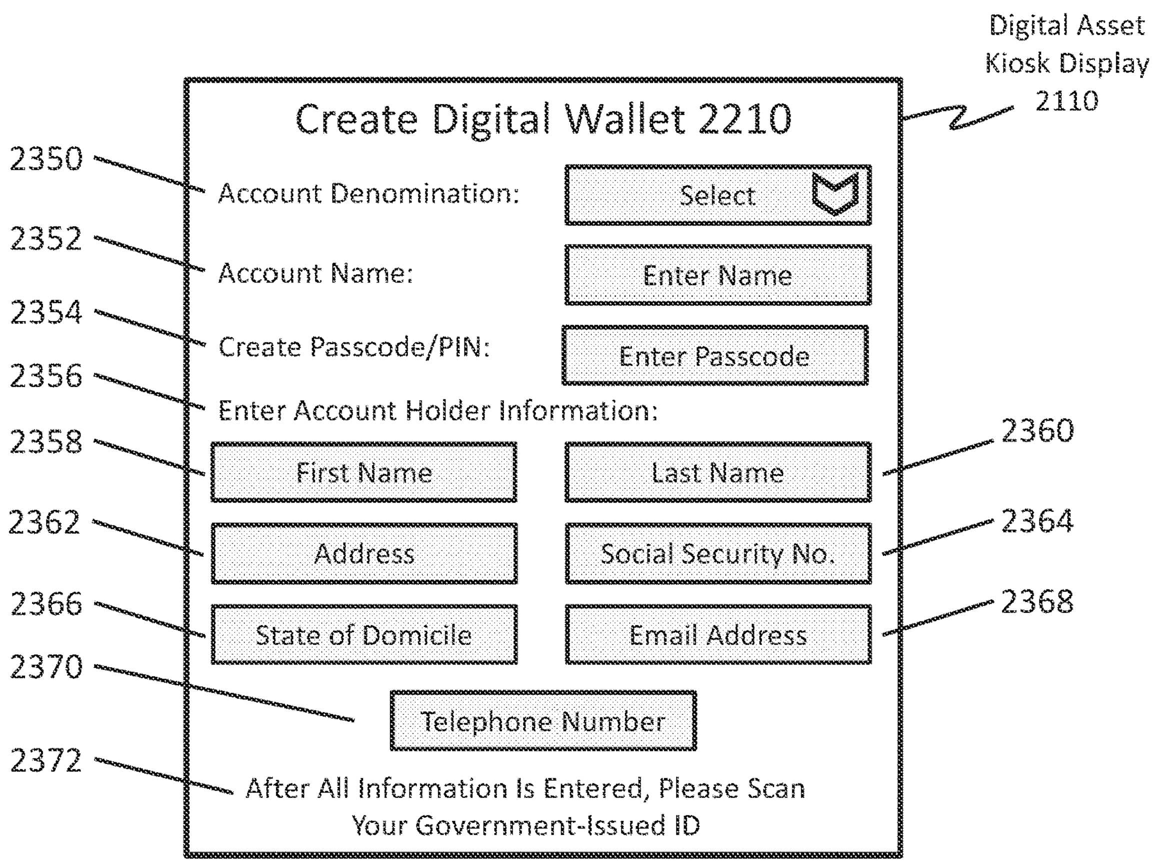
Figure 40O:
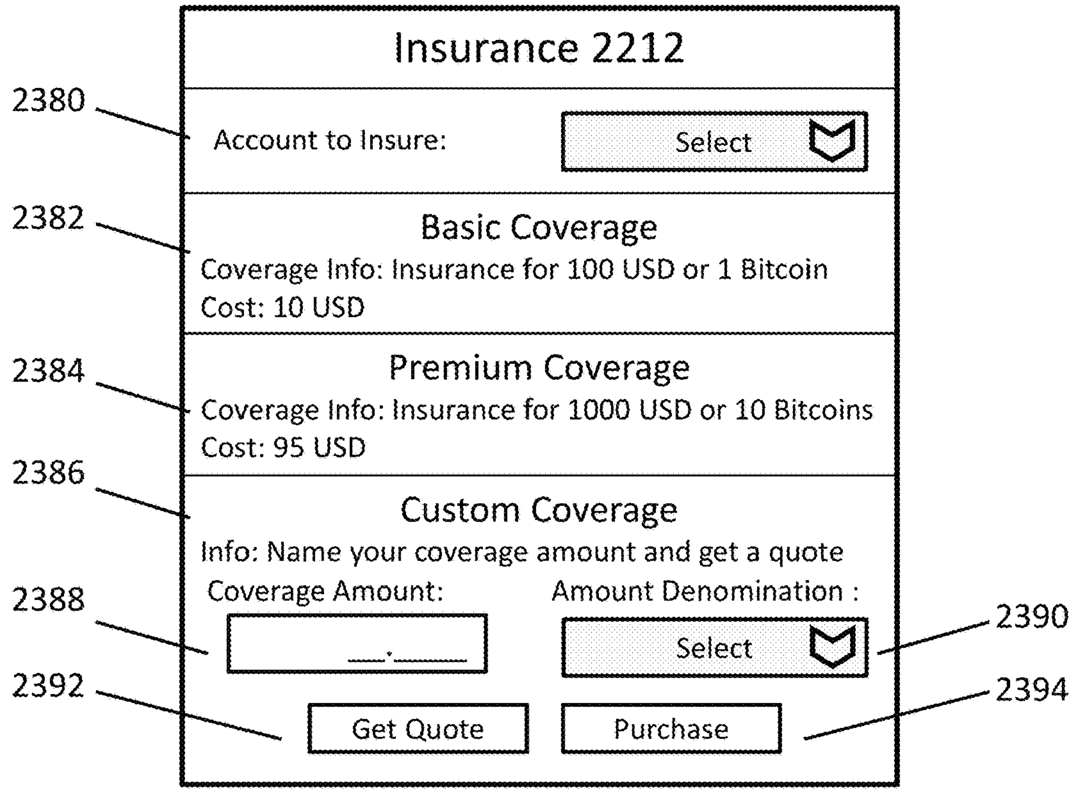
Figure 40P:
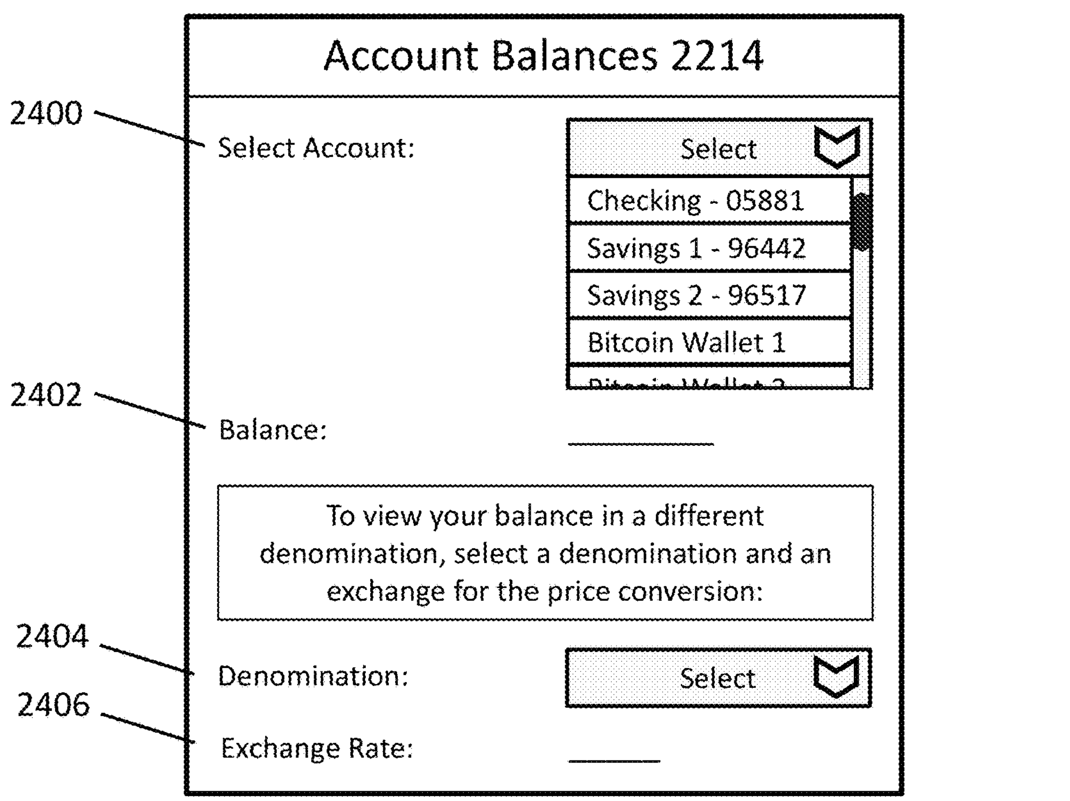
Figure 40Q:
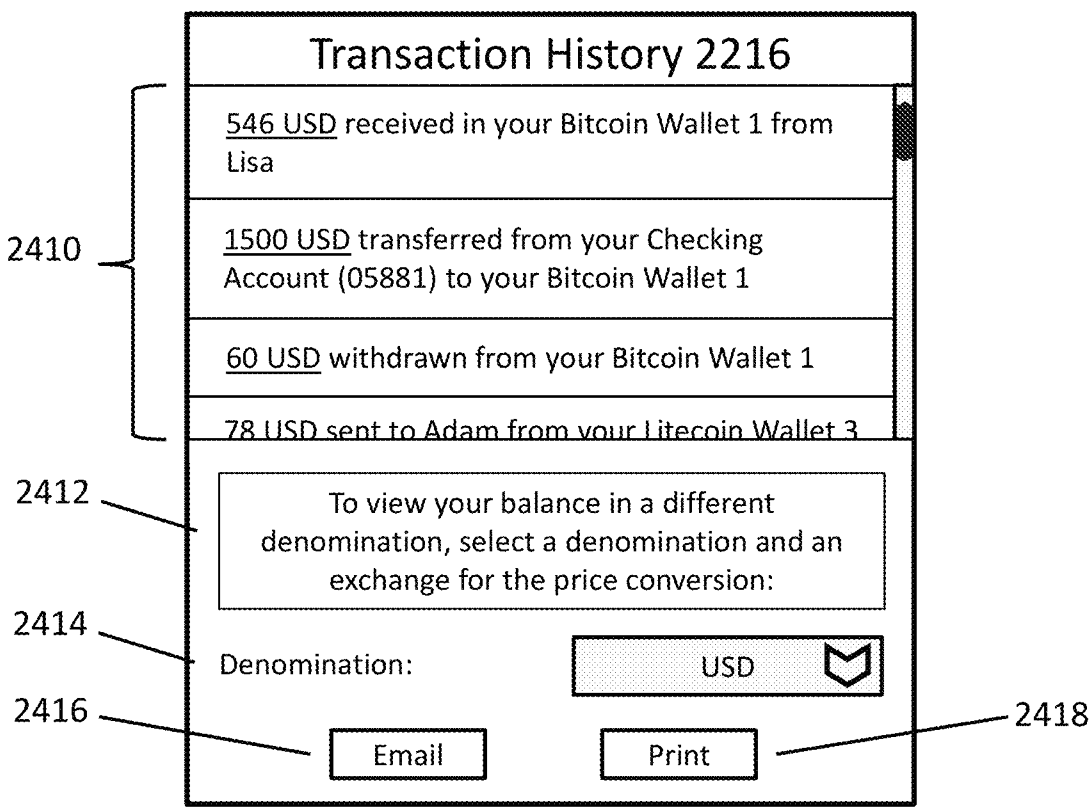

FIGS. 40A-Q illustrate exemplary screen shots of a digital asset kiosk performing transactions in accordance with embodiments of the present invention. In embodiments, certain transactions illustrated in FIGS. 40A-Q (e.g., transactions that do not involve deposits or withdrawals or fiat currency) may be performed from a digital wallet or other digital asset client (e.g., a website or downloadable software on a computer, tablet computer, and/or mobile device, to name a few).

FIG. 40A illustrates an exemplary digital asset kiosk menu, which identifies actions that may be performed using an exemplary kiosk.

FIG. 40B illustrates an exemplary deposit 2202 being performed using an exemplary kiosk.

FIG. 40C illustrates an exemplary withdrawal 2204 being performed using an exemplary kiosk.

FIG. 40D illustrates an exemplary digital asset kiosk transfers and payments 2206 menu, which identifies fund transfer and payment transactions that may be performed using an exemplary kiosk.

FIG. 40E illustrates another exemplary digital asset kiosk transfers and payments 2206 menu.

FIGS. 40F-H illustrates an exemplary transfer between accounts 2244 being performed using an exemplary kiosk.

FIG. 40I illustrates another exemplary transfer between accounts 2244 being performed using an exemplary kiosk.

FIG. 40J illustrates an exemplary bill payment 2246 being performed using an exemplary kiosk.

FIG. 40K illustrates an exemplary transaction to send funds 2258 being performed using an exemplary kiosk. The user can be prompted or otherwise provided with an interface to enter or select a transaction amount 2296, which is the amount to send. A denomination option 2298 may allow the user to select the denomination for the transaction amount 2296. For example, a user may specify 1 unit of a digital asset (e.g., 1.00 bitcoin), 100.00 USD, 50.00 CAD, and/or any amount of any supported currency that complies with any transaction rules or limits in effect. The software may provide a transaction denomination option 2300, which may allow a user to select the denomination of assets in which to transmit the funds. An origin account option 2302 may allow a user to select the account from which fund will be sent. In embodiments, an account may be a digital wallet. A destination option 2304 may allow a user to select a destination for the funds, which may be another user, an account (e.g., an account number or other identifier), and/or a digital wallet (e.g., a public address corresponding to a digital wallet). Where the amount denomination 2298 does not match the transaction denomination 2300, the software may access one or more digital asset exchanges to obtain and/or display an exchange rate 2308 and/or to compute the value in the desired transaction denomination and/or display that value. Accordingly, in embodiments, the software may show the exchange rate 2308 (e.g., 104.00 USD to 1 unit of a digital asset) and/or may compute the exchange value or approximate value before the transaction is processed. For example, upon a user's input of 2 units of a digital asset, the software may display "208.00 USD" or vice versa. Where the transaction denomination 2300 does not match the denomination of assets in the origin account 2302, the software may obtain an exchange rate and compute the corresponding amount of assets to send from the origin account 2302. This exchange information may be displayed or otherwise provided to the user. The software may also provide an interface or prompt the user for selection of transaction insurance options 2306. The user may select a yes option to insure the transaction or a no option to decline insurance. If insurance is selected, a user may enter a coverage amount. By default, the coverage amount may be the transaction amount 2296. The software may provide pre-determined coverage amount options and may indicate the cost of each. If the user enters a different coverage amount, the software may then determine the cost of insurance (e.g., recurring premiums or an up-front cost) or may provide the user with a get quote option, which can calculate, fetch, and/or otherwise obtain and display the associated cost of the selected coverage amount. In embodiments, limits may be placed on the coverage amount.

FIG. 40L illustrates an exemplary request of funds 2260 being performed using an exemplary kiosk.

FIG. 40M illustrates an exemplary exchange transaction 2208 being performed using an exemplary kiosk in accordance with embodiments of the present invention.

FIG. 40N illustrates an exemplary creation of a digital wallet 2210 being performed using an exemplary kiosk.

FIG. 40O illustrates an exemplary action to obtain account insurance 2212 being performed using an exemplary kiosk. In embodiments, insurance may involve secure storage of one or more keys to access an account.

FIG. 40P illustrates an exemplary action to check account balances 2214 being performed using an exemplary kiosk. Account balances may be emailed and/or printed by the kiosk. In embodiments, alerts may notify a user (e.g., by phone, email, text message) when there is account activity for one or more accounts, when balances reach a certain level, and/or when transactions of a certain size are performed.

FIG. 40Q illustrates an exemplary action to check a transaction history 2216 being performed using an exemplary kiosk. A digital asset kiosk may be used to view a transaction history of one or more accounts, which may include any fiat currency accounts and digital asset accounts that have been used in digital asset transactions. The transaction history may be printed by the kiosk and/or emailed or otherwise communicated to a user.

In embodiments, an external application (e.g., mobile application, desktop downloadable software, or a website, to name a few) may integrate with a digital asset kiosk. A user may initiate a kiosk transaction using the external application. For example, a user may send, using the external application, transaction instructions to sell digital assets. When the sending of digital assets to from the user to the buyer is confirmed (e.g., by a digital asset network or by an exchange), an electronic notification may be provided to the user to notify the user that the transfer was confirmed and/or that fiat currency is available for withdrawal. In embodiments, the fiat currency received from a buyer, which may be the exchange itself, may be stored in an exchange fiat currency account associated with the user. As described herein, the exchange fiat currency account may be a pooled account for a plurality of exchange users. In embodiments, the pooled account may provide insurance, such as FDIC insurance or insurance from another governmental body. The user may then log in at a digital asset kiosk and select an option to withdraw fiat currency. The kiosk may then provide the currency to the user. This integration of an external application to an exchange and kiosk system can eliminate the need for a user to log into a kiosk, initiate a transaction, and wait for the transaction to occur and clear before funds are available for withdrawal.

Figure 41:
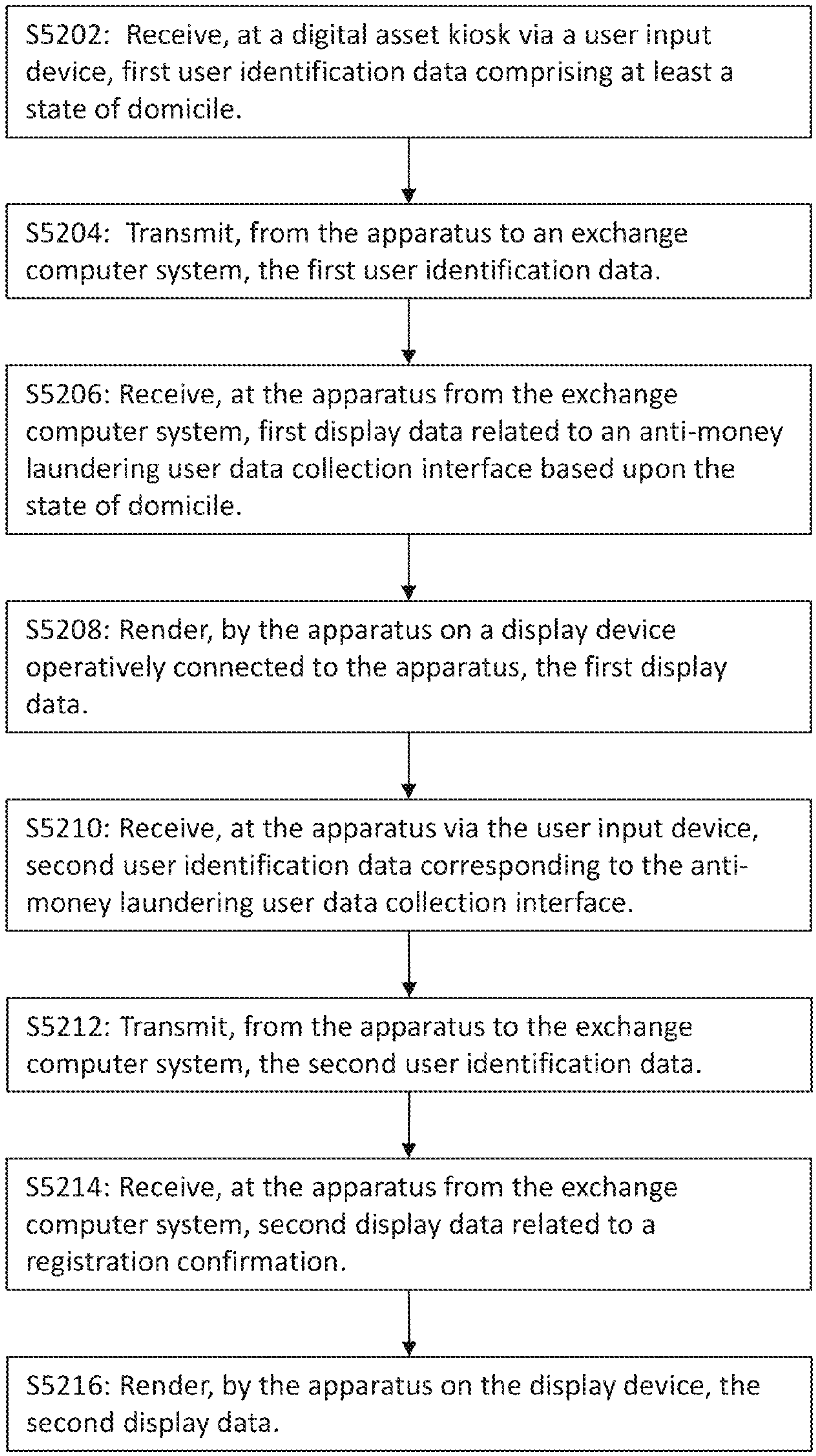
FIG. 41 is a flow chart of an exemplary process for performing an exchange transaction from an electronic kiosk in accordance with exemplary embodiments of the present invention.

FIG. 41 is a flow chart of an exemplary process for performing an exchange transaction from an electronic kiosk.

In a step S5202, a digital asset kiosk may receive via a user input device first user identification data comprising at least a state of domicile.

In a step S5204, the digital asset kiosk may transmit to an exchange computer system, the first user identification data.

In a step S5206, the digital asset kiosk may receive from the exchange computer system, first display data related to an anti-money laundering user data collection interface based upon the state of domicile.

In a step S5208, the digital asset kiosk may render on a display device operatively connected to the apparatus, the first display data.

In a step S5210, the digital asset kiosk may receive via the user input device, second user identification data corresponding to the anti-money laundering user data collection interface.

In a step S5212, the digital asset kiosk may transmit to the exchange computer system, the second user identification data.

In a step S5214, the digital asset kiosk may receive from the exchange computer system, second display data related to a registration confirmation.

In a step S5216, the digital asset kiosk may render on the display device, the second display data.

Accordingly, in embodiments, an apparatus, which may be an electronic kiosk, may be programmed to perform the following steps: receiving, at the apparatus via a user input device, first user identification data comprising at least a state of domicile; transmitting, from the apparatus to an exchange computer system, the first user identification data; receiving, at the apparatus from the exchange computer system, first display data related to an anti-money laundering user data collection interface based upon the state of domicile; rendering, by the apparatus on a display device operatively connected to the apparatus, the first display data; receiving, at the apparatus via the user input device, second user identification data corresponding to the anti-money laundering user data collection interface; transmitting, from the apparatus to the exchange computer system, the second user identification data; receiving, at the apparatus from the exchange computer system, second display data related to a registration confirmation; and rendering, by the apparatus on the display device, the second display data.

In embodiments, such an apparatus may be an electronic kiosk. In embodiments, such an apparatus may be a user device, such as a smart phone, tablet computer, and/or computer.

In embodiments, the apparatus may be further programmed to perform the steps of receiving, at the apparatus from the exchange computer system, third display data related to exchange transaction options; rendering, by the apparatus on the display device, the third display data; receiving, at the apparatus via a user input device, a selection of an exchange transaction option related to a fiat withdrawal and a corresponding transaction request comprising at least a fiat withdrawal amount; and transmitting, from the apparatus to the exchange computer system, the transaction request.

In embodiments, an apparatus programmed to perform the following steps: receiving, at the apparatus via an input device, user account credentials; transmitting, from the apparatus to the exchange computer system, the user account credentials; receiving, at the apparatus from the exchange computer system, first display data corresponding to a plurality of exchange transaction options for an authenticated user; rendering, by the apparatus, the first display data on a display device operatively connected to the apparatus; receiving, at the apparatus via the input device, user selections corresponding to a first exchange transaction option that is an exchange transaction order; receiving, at the apparatus via the input device, exchange transaction order parameters; transmitting, from the apparatus to the exchange computer system, the exchange transaction order parameters; receiving, at the apparatus from the exchange computer system, second display data corresponding to order placement confirmation; and rendering, by the apparatus, the second display data on the display device.

Digital Asset Notification System

Figure 42A:
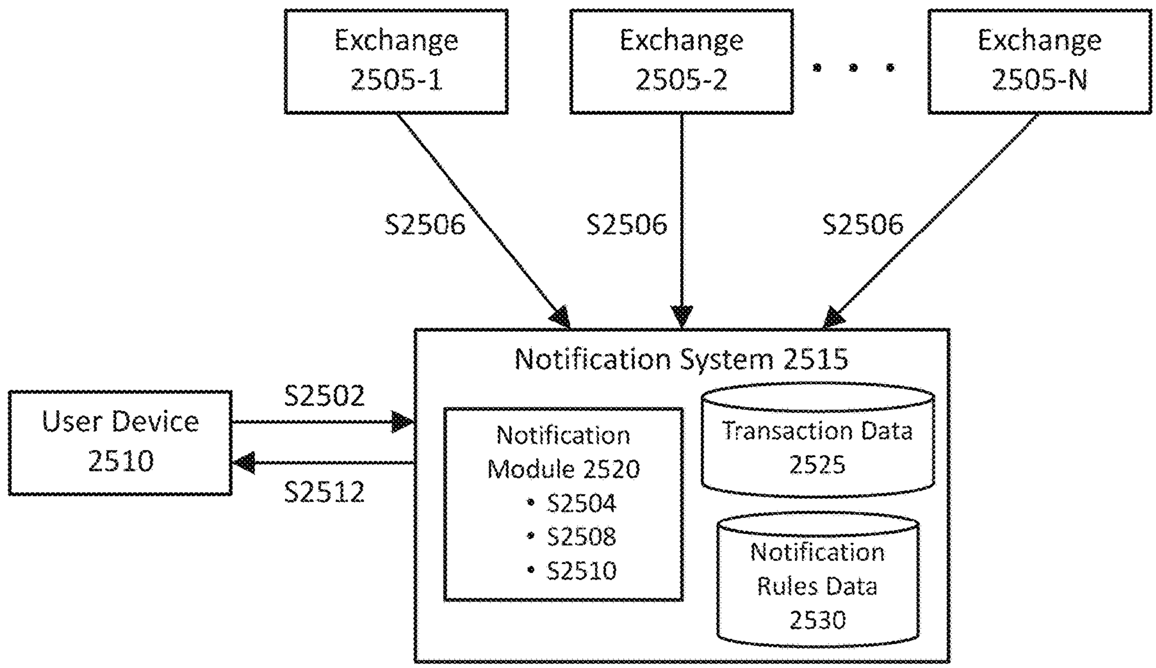
FIGS. 42A-B are a schematic diagram and corresponding flow chart showing participants in and processes for digital asset notifications in accordance with exemplary embodiments of the present invention.
Figure 42B:
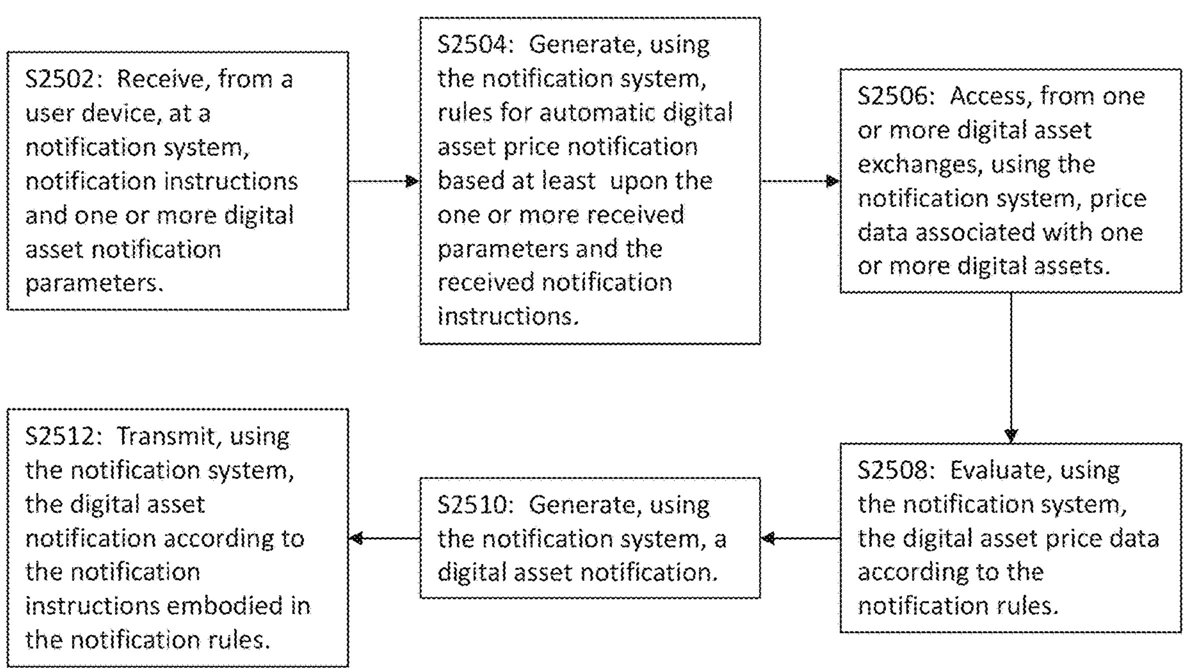

FIGS. 42A-B are a schematic diagram and corresponding flow chart showing an exemplary system and an exemplary process for providing digital asset notifications. Notifications may be provided as a feature of a digital wallet application and/or as a stand-alone service.

As shown in FIG. 42A, a user may subscribe for one or more notifications from a user device 2510, which may be a phone, smart phone, PDA, computer, tablet computer, to name a few. Notifications may also be received by a user device 2510. A notification system 2515 may receive digital asset price data from one or more digital asset exchange 2505 (e.g., 2505-1, 2505-2, . . . 2505-N). FIG. 25A illustrates the flow of steps and participants involved in performing the steps in an exemplary process for providing digital asset notifications, as described in greater detail herein with respect to FIG. 25B.

Referring again to FIG. 42A, a notification system 2515 can include a notification module 2520, price data 2525, and notification rules data 2530. A notification system 2515 can comprise one or more computers or computer systems having at least one or more processors, computer-readable memory comprising one or more databases, one or more communications portals for communicating with one or more other computers or computer systems, and/or one or more input devices. A notification module 2520 may be software that can process received notification instructions, generate notification rules, access digital asset price data, perform calculations and determinations using the price data and the notification rules, generate notifications, and/or transmit notifications, to name a few, as discussed herein with respect to FIG. 25B. In embodiments, the processes attributed to a notification module 2520 may be performed by one or more other software modules. In embodiments, one or more steps in a digital asset notification process may be decentralized, e.g., performed by a user device. Price data 2525 can include prices for one or more digital assets from one or more digital asset exchanges 2505. Price data 2525 can span any time period (e.g., the past 10 minutes, the past 24-hours, the past week, the past 3 months, all historical data, to name a few). Notification rules data 2530 may include user account data associated with notification settings, notification requests from users, generated notification rules, notifications, and notification history data, to name a few. Notification requests may comprise one or more notification instructions, and/or one or more digital asset notification parameters. Notification instructions may specify the frequency of notifications (e.g., real-time, once a day, once a week, to name a few), the notification alert types (e.g., SMS, email, mobile application push notifications, to name a few), and/or notification recipient information (e.g., email address, telephone number, mobile device ID, digital wallet ID, to name a few). Notification parameters may vary by notification type. For example, notification parameters may identify digital assets, digital asset exchanges, price thresholds (including price difference thresholds), time thresholds, rate thresholds (e.g., rate of increase, rate of decrease), exchange availability thresholds (e.g., whether a particular exchange is open for trading), to name a few, as required to set notifications as discussed herein.

FIG. 42B shows steps for providing digital asset notifications in accordance with exemplary embodiments of the present invention. In a step S2502, a notification system 2515 may receive from a user device 2510 notification instructions and one or more digital asset notification parameters. The received notification instructions and notification parameters may be stored by the notification system 2515. In embodiments, a user device 2510 may request notifications or otherwise activate or edit notifications by toggling notification settings through a software application (e.g., a mobile application or computer software) and/or through a website, to name a few. A user may also transmit a request for notifications, as through email, which request may indicate notification instructions and/or parameters or may trigger default or pre-programmed notification instructions and/or parameters.

In a step S2504, the notification system 2515 may generate one or more rules for automatic digital asset price notification based at least upon the one or more received parameters and the received notification instructions. For example, a notification rule may be a logical rule comprising a condition and an action. When the condition is satisfied, the action may be performed. Conditions may relate to the type of notification (e.g., price of a particular digital asset drops below a threshold, price exceeds a threshold, exchange is unavailable), and actions may relate to the type of notification (e.g., send an SMS to a particular mobile telephone number). The generated notification rules may be stored by the notification system 2515 and/or incorporated into price monitoring and comparison operations performed by a notification module 2520.

In a step S2506, the notification system 2515 may access, from one or more digital asset exchanges 2505, price data associated with one or more digital assets. A notification module 2520 may perform the step of accessing digital price data, e.g., by interfacing through one or more exchanges 2505 through one or more exchange APIs or by otherwise receiving or fetching the price data, as from a price feed. Price data may be normalized or otherwise formatted to be compatible with the notification system 2515.

In a step S2508, the notification system 2515 may evaluate the digital asset price data according to the notification rules. A notification module 2520 may perform step S2508. In embodiments, evaluation of digital asset price data may comprise comparing the price data to a price threshold to determine whether the threshold was reached and/or crossed.

In a step S2510, the notification system 2515 may generate one or more digital asset notifications. Notification generation may be performed by the notification module 2520. Digital asset notifications may be emails, SMS messages, push notifications, or other notifications, messages, or alerts, and they may indicate that notification criteria have been satisfied (e.g., price thresholds exceeded). Digital asset notifications may be price notifications, indicating the price of one or more digital assets.

In a step S2512, the notification system 2515 may transmit to one or more user devices 2510 the digital asset notification according to the notification instructions embodied in the notification rules. For example, notifications may be transmitted both to a cell phone, to an email account, and to a digital wallet client running on a computer. In embodiments, the user device 2510 that requests notifications (e.g., by setting notification settings) in a step S2502 may be a different user device from the user device that receives notifications in a step S2512. In embodiments, the users associated with the user devices that request notifications and receive notifications may be different users.

Figure 43A:
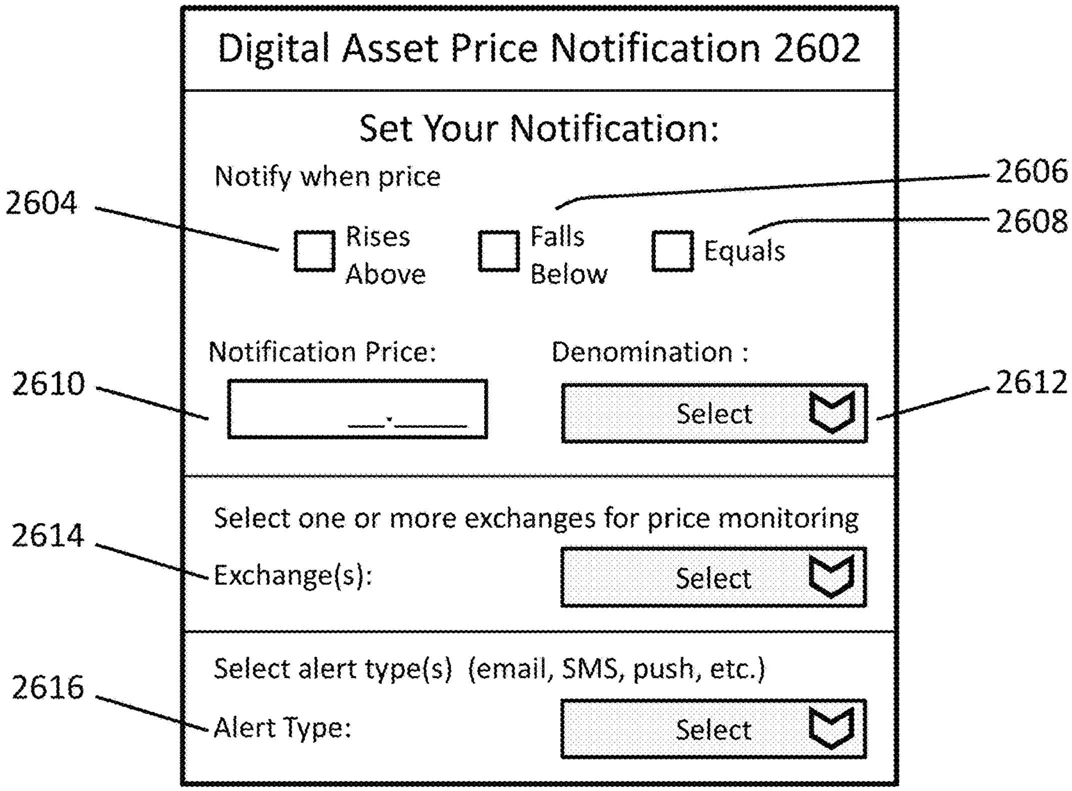
FIGS. 43A-B are exemplary screen shots associated with setting digital asset notification in accordance with exemplary embodiments of the present invention.
Figure 43B:
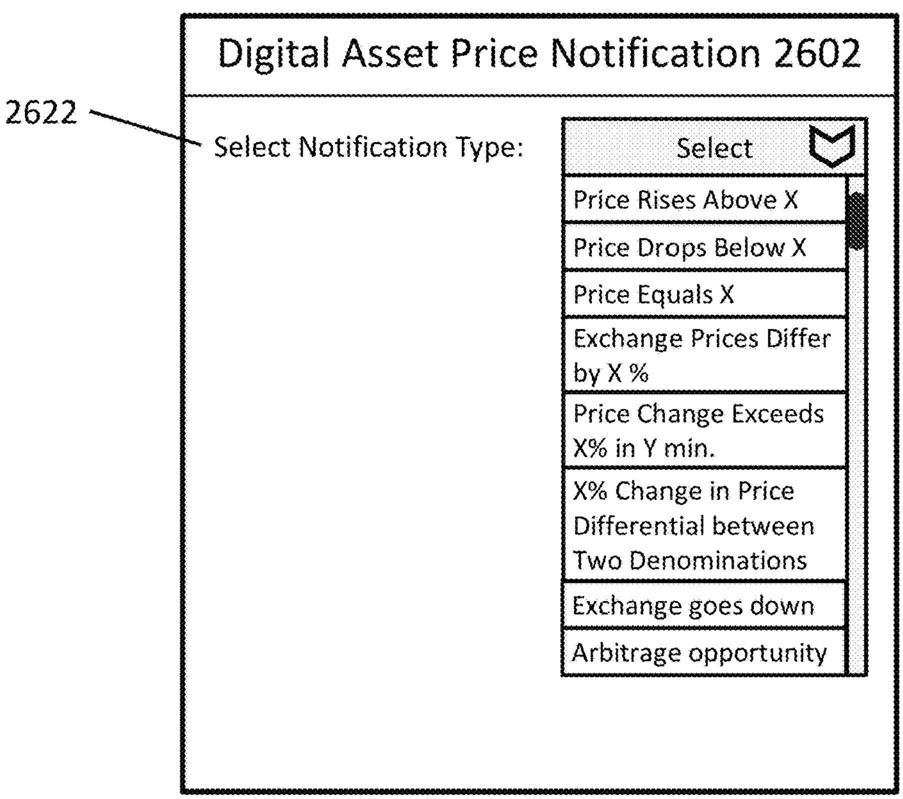

FIGS. 43A-B are exemplary screen shots for setting digital asset notifications in exemplary embodiments of the present invention. FIG. 26A shows a digital asset price notification setup menu 2602. A user can select from various options related to a price threshold, including a rises above option 2604, a falls below option 2602, or an equals option 2608. A user can set a notification price 2610 and the corresponding denomination 2612, which comprise the price threshold. In embodiments, a user can set a notification price 2610 for a particular digital asset, but express the price in a different denomination (e.g., set a notification for when the price of one bitcoin rises above 500 USD). A user may select one or more exchanges 2614 from which to monitor digital asset prices. A user may also select an alert type 2616, which can be used to set notification instructions. Alert types can include email, SMS, push notifications, to name a few.

FIG. 43B shows an exemplary interface for selecting a notification type 2622 in accordance with embodiments of the present invention. Notification types can indicate when a digital asset price rises above a threshold value, when a digital asset price drops below a threshold value, when a digital asset price equals a threshold value, when digital asset prices from two or more exchanges differ by a threshold amount (e.g., a percentage price difference), when a rate of digital asset price change meets or exceeds a threshold (e.g., the bitcoin price in USD changes 5% in 2 minutes, the Litecoin price rises by 10 Litecoin in 1 hour, to name a few), when the price differential between two denominations meets or exceeds a threshold (e.g., the ratio of bitcoin price to USD changes by 2%), when an exchange is unavailable (e.g., a particular exchange is not processing trades, an exchange from a list of exchanges to monitor is not available for trading, an exchange having an typical average daily volume exceeding some threshold is unavailable for trading), when volume of one or more exchanges satisfies (e.g., exceeds, reaches, or falls below) a threshold volume, when a difference in price between two exchanges satisfies a threshold (e.g., when prices from two predefined exchanges exceed a specified amount, or when the price differential of some threshold amount or percentage exists between any two of a plurality of exchanges being monitored), when a difference in transaction volume between two exchanges satisfies a threshold, and/or when an arbitrage opportunity exists (e.g., the conversion from USD to EUR to bitcoin yields more bitcoin than the conversion from USD to bitcoin directly), to name a few. In embodiments, a notification type may comprise a digital wallet activity monitor, which may alert a user when any transactions or other activity is performed using a specified digital wallet. Such monitoring may entail monitoring a public ledger or transaction log, such as the Bitcoin blockchain. A user may input a wallet address or public key in order to request monitoring of the wallet. A user may input or select rules for wallet monitoring notifications, such as to receive notifications for any transactions involving the wallet, when assets are sent from the wallet, when assets exceeding a threshold amount are sent from the wallet, and/or when assets are sent to an address not on an approved list, to name a few. The notification system may generate and perform electronic monitoring instructions corresponding to the rules received from the user. A notification system may operate a digital asset network node in order to monitor an electronic transaction ledger. After a notification type 2622 is selected, a user may be required to input or otherwise set corresponding parameters, such as digital asset denominations to monitor, price thresholds, rates of price change, time periods for monitoring, and/or exchanges to monitor, to name a few.

Figure 44A:
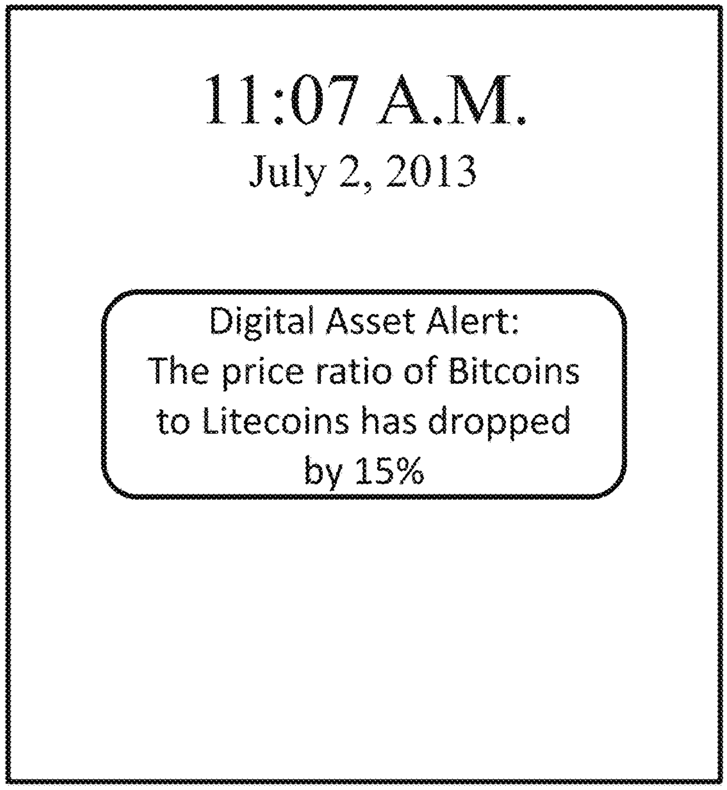
FIGS. 44A-C are exemplary screen shots of digital asset notifications in accordance with exemplary embodiments of the present invention.
Figure 44B:
Figure 44C:
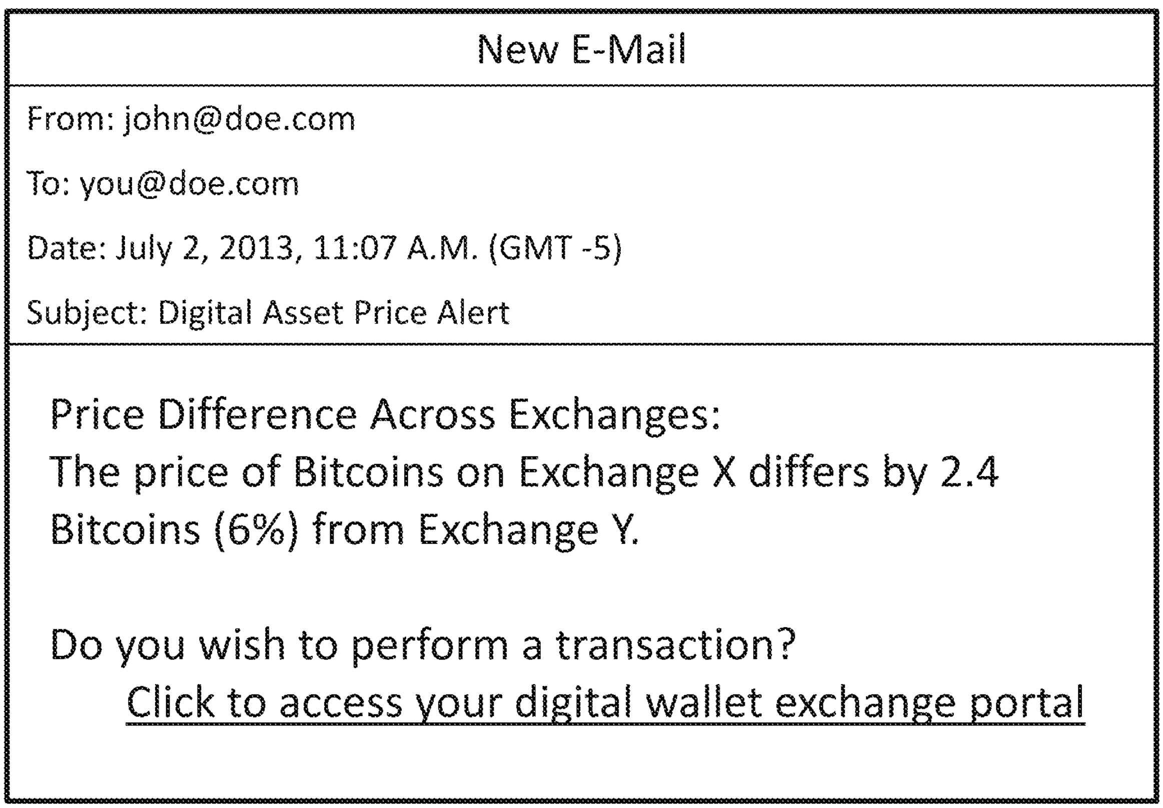

FIGS. 44A-C are exemplary automated digital asset transactions in accordance with exemplary embodiments of the present invention. FIG. 44A illustrates an exemplary push notification, which may be received and/or displayed on a smart phone. The exemplary notification indicates that the price ratio of bitcoin to Litecoin has dropped by 15%. FIG. 44B illustrates an exemplary SMS notification. It indicates that the price of bitcoin is dropping at a rate of 22% per hour. FIG. 44C is an exemplary email notification. It indicates that there is a digital asset price difference across exchanges (e.g., Exchange X and Exchange Y) and shows an absolute value of the price difference (e.g., 2.4 bitcoin) as well as a percentage difference (e.g., 6%). The email notification also provides a user with a link (e.g., a hyperlink to a website or to a software application) to access an exchange function of a digital wallet in order to perform one or more exchange transactions. Notifications can also include an option (e.g., a button, link, and/or other navigational tool or interface) to manage alerts, which can include setting notification types, alert types, and/or settings therefor. In other embodiments, alerts may be provided within applications, such as within a digital wallet client.

Digital Asset Automated Transaction System

Figure 45A:
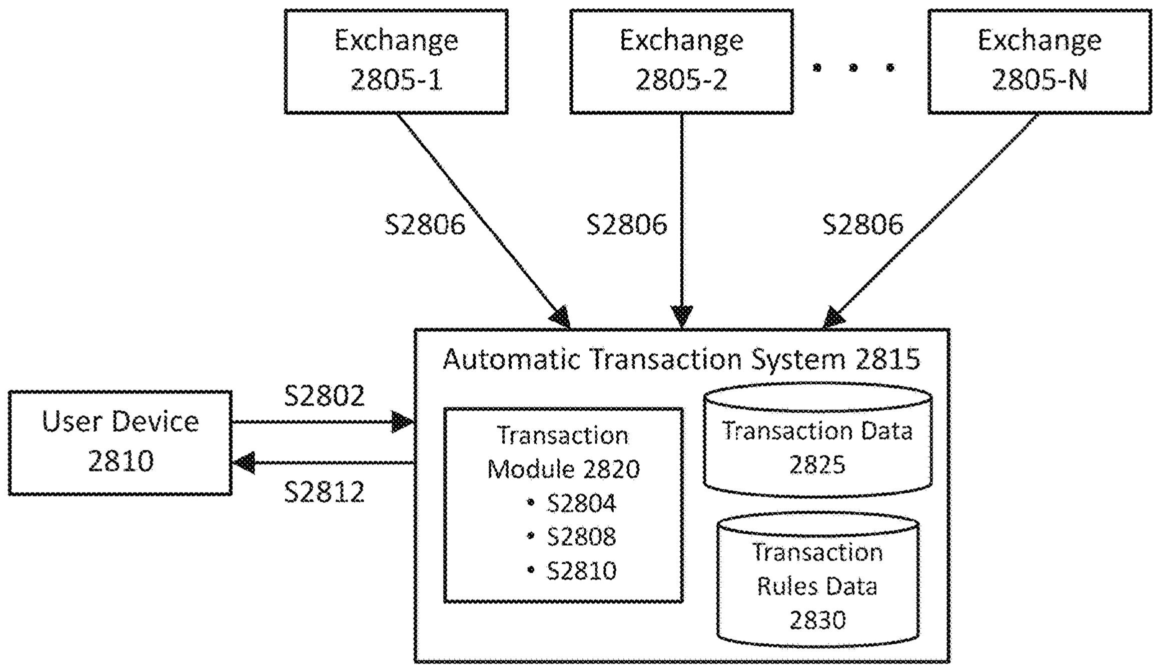
FIGS. 45A-B are a schematic diagram and corresponding flow chart showing participants in and processes for automated digital asset transactions in accordance with exemplary embodiments of the present invention.
Figure 45B:
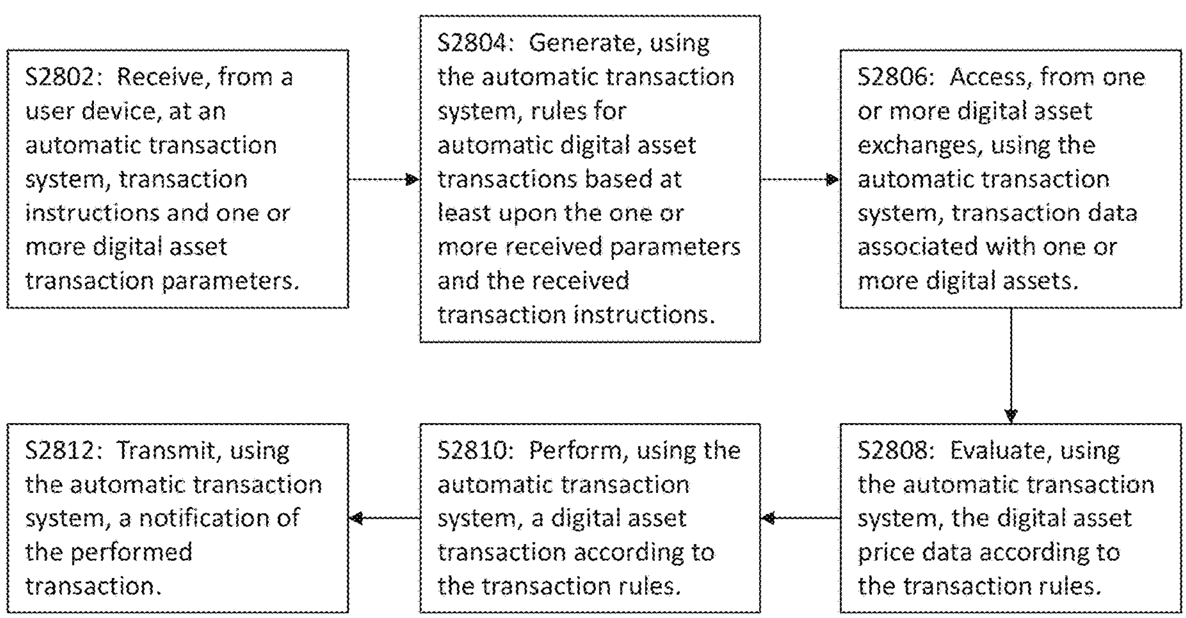

FIGS. 45A-B are a schematic diagram and corresponding flow chart showing an exemplary system and an exemplary process for performing automated digital asset transactions. Automated transactions may be provided as a feature of a digital wallet application and/or as a stand-alone service. A stand-alone service may require a link to a digital wallet, bank account, credit card, and/or a deposit of funds with the stand-alone service.

FIG. 45A is a schematic diagram of an exemplary automatic digital asset transaction system and the entities involved in such a system. A user can arrange, from a user device 2810, for automated digital asset transactions. A user device 2810 can include a phone, smart phone, PDA, computer, and/or tablet computer, to name a few. A user may use a plurality of user devices 2810 in connection with the automatic digital asset transaction system of embodiments of the present invention.

An automatic digital asset transaction system 2815 can receive data, such as digital asset transaction data and/or digital asset price data, from one or more exchange 2805 (e.g., 2805-1, 2805-2, . . . , 2805-N), which may be digital asset exchanges. In embodiments, data may be received from one or more exchange agents.

Still referring to FIG. 45A, an automatic digital asset transaction system 2815 can comprise one or more computers or computer systems having at least one or more processors, computer-readable memory comprising one or more databases, one or more communications portals for communicating with one or more other computers or computer systems, and/or one or more input devices. An automatic digital asset transaction system 2815 can include a transaction module 2820, price data 2825, and/or transaction rules data 2830, to name a few. Price data 2585 can include prices for one or more digital assets from one or more digital asset exchanges 2805, which may also comprise exchange rate data. Price data 2825 can span any time period. In embodiments, one or more databases may store the data described herein. In embodiments, one or more software modules may perform the functions attributed herein to a transaction module 2820.

A transaction module 2820 may be software that can receive transaction instructions and transaction parameters, generate transaction rules, access data from one or more exchanges 2805, evaluate digital asset price data according to transaction rules, perform automated transactions (e.g., when pre-defined conditions are met), request authority (e.g., from a user) to proceed with an automatically generated transaction, and/or provide notifications of completed transactions, to name a few. In embodiments, one or more steps in a digital asset notification process may be decentralized, e.g., performed by a user device.

FIG. 45B shows steps for performing automated digital asset transactions in accordance with exemplary embodiments of the present invention. In a step S2802, an automatic transaction system 2815 may receive, from a user device 2810, transaction instructions and one or more transaction parameters. In embodiments, transaction parameters may include a digital asset strike price, e.g., to sell a specified amount of digital assets when the price equals, rises above, or falls below a predefined threshold, wherein the amount of digital assets to transact may be specified in a different denomination, such as USD. Transaction parameters thus may indicate digital asset denominations, digital asset amounts (expressed in any denomination, including fiat currency denominations), digital asset exchanges, time periods, rates of change, and/or absolute amounts of change, to name a few. Transaction instructions may indicate actions regarding digital assets, such as whether to buy, sell, hold, and/or convert to a different denomination of digital asset or fiat currency, to name a few.

In a step S2804, the automatic transaction system 2815 may generate one or more rules for automatic digital asset transactions based at least upon the one or more received transaction parameters and the received transaction instructions. The generated rules may be logical rules comprising one or more conditions and one or more actions to perform when the conditions are met or not met. Such logical rules may be implemented by computer code running on one or more computers associated with the automatic transaction system 2815. The generation of transaction rules may be performed by a transaction module 2820.

In a step S2806, the automatic transaction system 2815 may access, from one or more digital asset exchanges 2805, transaction data, which may include price data, associated with one or more digital assets. The automatic transaction system 2815 may store transaction data 2825 in one or more databases. The transaction data may be fetched or otherwise received, e.g., using APIs or data feeds from one or more exchanges 2805 or exchange agents. Transaction data may be normalized or otherwise formatted to be compatible with an automatic transaction system 2815, which formatting may be performed by a transaction module 2820.

In a step S2808, the automatic transaction system 2815 may evaluate the digital asset transaction data according to the generated transaction rules. In embodiments, evaluation of the digital asset transaction data may involve testing the transaction data against one or more logical conditions embodied in the transaction rules. For example, the transaction data may be evaluated to determine whether the digital asset price has reached or crossed a threshold value or whether a rate of change in the price has met or crossed a threshold value. A transaction module 2820 may perform the evaluation of the transaction data.

In a step S2810, the automatic transaction system 2815 may perform one or more digital asset transactions according to the transaction rules. Transactions may be performed, initiated, and/or verified by a transaction module 2820. The digital asset transactions may only be performed when one or more conditions are satisfied. In embodiments, an alert of a potential transaction and/or a request for authorization may be sent to a user before automatically performing a transaction. Receipt of a user's authorization by the automatic transaction system 2815 may be required before the system will perform a transaction. Authorization may be provided through telephone (e.g., dialing a number and entering certain digits), SMS (e.g., replying to a text message, sending a code, and/or sending another message authorizing a transaction), email (e.g., replying to an email and/or sending a certain message in the body and/or subject line), website (e.g., clicking an "Authorize" button), and/or within a software application, such as a digital wallet, to name a few. In embodiments, a request for authorization may be sent, and the transaction may be performed automatically if no response is received within a predetermined amount of time, settings for which may be set in advance by a user and/or set by default.

In a step S2812, the automatic transaction system 2815 may transmit one or more notifications of the performed transaction to one or more user devices 2810. Notifications may be generated by a transaction module 2820. In embodiments, notifications of incomplete, pending, and/or failed transactions may be transmitted. In embodiments, the automatic transaction system 2815 may provide a portal or other mechanism for a user to monitor and/or receive updates regarding transaction statuses. The automatic transaction system 2815 may provide a log of all transactions and/or automatic transactions performed by the system and/or by a user. In embodiments, the automatic transaction system 2815 may provide a log of all transaction opportunities, including declined transactions (e.g., not authorized by a user).

Digital Asset Automated Arbitrage System

Figure 46A:
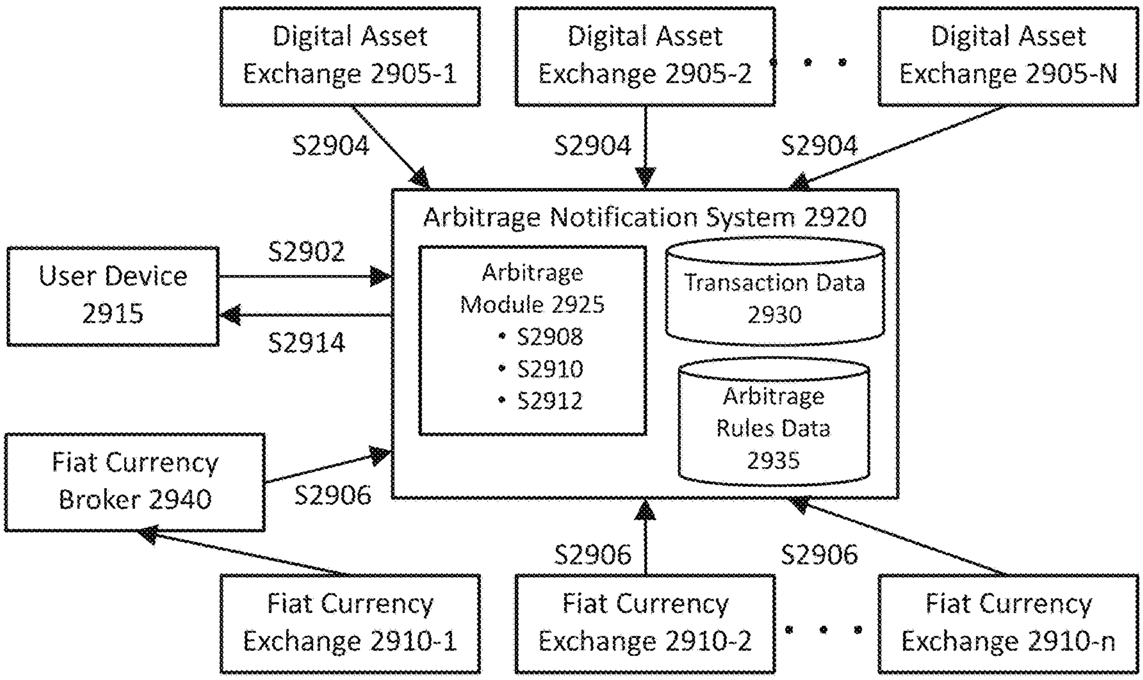
FIGS. 46A-B are a schematic diagram and corresponding flow chart showing participants in and processes for providing digital asset arbitrage opportunity notifications in accordance with exemplary embodiments of the present invention.
Figure 46B:
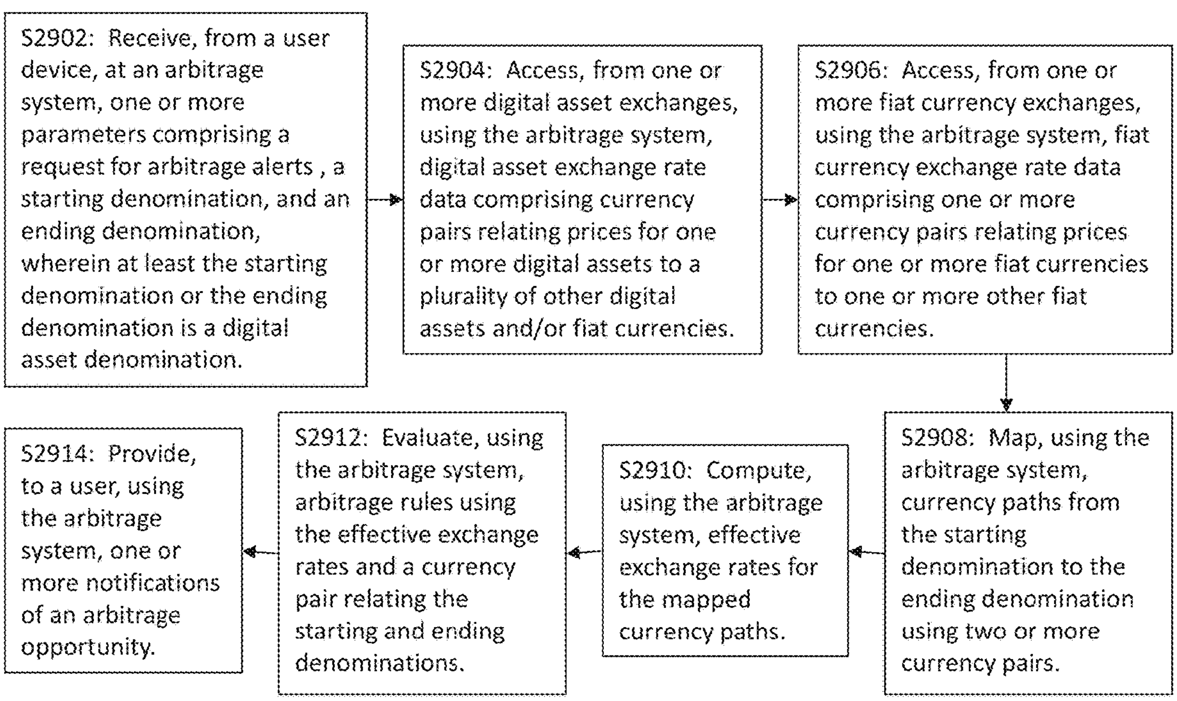

FIGS. 46A-B are a schematic diagram and corresponding flow chart showing an exemplary system and an exemplary process for providing notifications of digital asset arbitrage opportunities. Arbitrage opportunities can arise due to exchange rate differences between different currency pairs. Embodiments of the present invention provide an automated system to map exchange rate transactions involving a plurality of exchanges and at least one digital asset and to compare the corresponding effective exchange rate to an exchange rate for a single currency pair. If the mapped plurality of exchange transactions has a different exchange rate from the rate for the single currency pair, an arbitrage notification system may provide notifications of the corresponding arbitrage opportunity. A transaction may be mapped from a digital asset to a fiat currency with any number of intermediate fiat currency and/or digital asset exchange transactions, from a fiat currency to a digital asset with any number of intermediate fiat currency and/or digital asset exchange transactions, and/or from a fiat currency to a fiat currency with at least one intermediate digital asset exchange and any number of other intermediate exchanges. Accordingly, one or more foreign exchange transactions may be performed, as described herein.

FIG. 46A is a schematic diagram of an exemplary arbitrage notification system and the entities involved in such a system. A user can arrange, from a user device 2915, for arbitrage notifications. A user device 2915 can include a phone, smart phone, PDA, computer, and/or tablet computer, to name a few. A user may use a plurality of user devices 2915 in connection with the arbitrage notification system of embodiments of the present invention.

An arbitrage notification system 2920 can receive data, such as digital asset transaction data, from one or more digital asset exchange 2905 (e.g., 2905-1, 2905-2, . . . , 2905-N). In embodiments, data may be received from one or more digital asset exchange agents. An arbitrage notification system 2920 can also receive data, such as fiat currency price data, from one or more fiat currency exchanges 2910 (e.g., 2910-1, 2910-2, . . . 2910-*n*). In embodiments, fiat currency price data may be received from one or more fiat currency brokers 2940. In embodiments, receiving data may entail fetching data, such as by using an API to access data from one or more exchange.

Still referring to FIG. 29A, an arbitrage notification system 2920 can comprise one or more computers or computer systems having at least one or more processors, computer-readable memory comprising one or more databases, one or more communications portals for communicating with one or more other computers or computer systems, and/or one or more input devices. An arbitrage notification system 2920 can include an arbitrage module 2925, price data 2930, and/or arbitrage rules data 2935, to name a few. Transaction data 2930 can include prices for one or more digital assets, which may come from one or more digital asset exchanges 2905, as well as prices for one or more fiat currencies, which may come from one or more fiat currency exchanges 2910. Transaction data 2930 can also include volume transacted. Transaction data may comprise exchange rate data, such as currency pairs, which relate the exchange rate between two differently denominated currencies or assets. Transaction data 2930 can span any time period. In embodiments, one or more databases may store the data described herein. In embodiments, one or more software modules may perform the functions attributed herein to an arbitrage module 2925.

An arbitrage module 2925 may be software that receives and/or processes requests for arbitrage alerts, generates arbitrage notification rules, stores arbitrage notification rules, executes operations to access data from digital asset and fiat currency exchanges, maps exchange transactions, computes effective exchange rates for mapped transactions, evaluates effective exchange rates and direct exchange rates in accordance with arbitrage notification rules, and/or provides notifications of arbitrage opportunities, to name a few. In embodiments, one or more steps in an arbitrage notification process may be decentralized, e.g., performed by a user device.

FIG. 46B is a flow chart showing steps in an exemplary process for providing arbitrage alerts in exemplary embodiments of the present invention. In a step S2902, an arbitrage notification system 2920 may receive, from a user device 2915, one or more parameters comprising a request for arbitrage alerts, a starting denomination, and/or an ending denomination, where the starting and/or ending denomination is a digital asset denomination. In embodiments, both the starting and ending denominations may be fiat currency denominations. Parameters may identify digital assets, fiat currencies, threshold amounts (e.g., specifying notifications for arbitrage opportunities with 2% returns or higher), alert types, notification frequencies, and/or notification recipients, to name a few. The arbitrage notification system 2920 may generate and/or store arbitrage notification rules based upon the received parameters. Arbitrage notification rules may comprise notification criteria. Arbitrage notification rules may be logical rules comprising conditions (e.g., to test for the presence of arbitrage opportunities satisfying the received parameters) and/or corresponding notification actions. In embodiments of the present invention, arbitrage opportunities may relate to a futures market and/or futures prices including at least one digital asset.

In a step S2904, the arbitrage notification system 2920 may access, from one or more digital asset exchanges 2905, digital asset exchange rate data, which may comprise currency pairs relating prices for one or more digital assets to a plurality of other digital assets and/or fiat currencies. In embodiments, other digital asset data may be accessed. For example, a USD/BTC currency pair would provide a ratio of U.S. dollars to bitcoin, which would comprise an exchange rate. Such a currency pair may be used to compute transactions from USD to bitcoin and from bitcoin to USD (using the reciprocal of the exchange rate). Accessing digital asset exchange rate data may entail using one or more APIs for one or more digital asset exchanges 2905 to fetch the price data and/or receiving a data stream of price data. In embodiments, digital asset exchange rate data may be obtained from one or more broker or exchange agent.

In a step S2906, the arbitrage notification system 2920 may access, from one or more fiat currency exchanges 2910, fiat currency exchange rate data, which may comprise one or more currency pairs relating prices for one or more fiat currencies to one or more other fiat currencies. An example of a fiat currency pair is EUR/USD, which relates Euros to U.S. dollars. Fiat currency exchange rate data may be accessed using one or more APIs for one or more fiat currency exchanges and/or by reading a data feed from one or more exchanges, to name a few. In embodiments, a fiat currency exchange 2910 may be an exchange in the foreign exchange market. In embodiments, exchange rate data may be obtained from one or more exchange agent or broker, such as a fiat currency broker 2940.

In a step S2908, the arbitrage notification system 2920 may map currency paths from a starting denomination to an ending denomination using at least two currency pairs or at least three denominations, since two currency pairs may share a common base. In embodiments, the arbitrage notification system 2920 may calculate arbitrage opportunities from the starting denomination to the ending denomination and/or from the ending denomination to the starting denomination. For the path from the starting to the ending denomination, the first currency pair in the currency path should include the starting denomination, while the last pair in the currency path should include the ending denomination. A currency path can include any number of intermediate currency pairs, which may or may not be cross currency pairs. For example, a currency path from USD to BTC may involve 1/(EUR/USD)*(EUR/JPY)*(JPY/BTC), where EUR/JPY is an intermediate cross currency pair. In embodiments, no starting or ending denominations may be received in a step S2902, and the arbitrage notification system 2920 may determine one or more currency paths relating a variety of denominations to detect the presence of any arbitrage opportunity among denominations supported by the arbitrage notification system 2920. In embodiments, only a starting or an ending denomination may be received, in which case the arbitrage notification system 2920 may determine a plurality of currency paths that start and/or end with the received denomination.

In a step S2910, the arbitrage notification system 2920 may compute effective exchange rates for the mapped currency paths. An effective exchange rate may relate the prices of two endpoints of a currency path. The effective exchange rate may be computed by multiplying the exchange rate for each currency pair in the currency path.

In a step S2912, the arbitrage notification system 2920 may evaluate (e.g., by processing on a computer system) arbitrage notification rules to determine the presence of an arbitrage opportunity meeting notification criteria and to determine actions to perform (e.g., notifications to transmit) based thereupon. In embodiments, evaluating arbitrage notification rules may entail, in part, comparing the computed effective exchange rates for one or more currency paths to a direct exchange rate associated with a currency pair relating the starting and ending denominations. Where the effective exchange rate differs from the direct exchange rate, as related by the direct starting/ending currency pair, an arbitrage opportunity may exist. An arbitrage opportunity can exist where the effective exchange rate is either greater than or less than the direct exchange rate.

The arbitrage notification system 2920 can formulate one or more transactions to take advantage of the arbitrage opportunity. The transactions required and the order in which they should be performed will depend, at least in part, on whether the effective exchange rate is greater than or less than the direct exchange rate. In embodiments, transactions may be structured to convert from one denomination to a different denomination. In other embodiments, circular transactions may be structured to perform a plurality of currency conversions and end with the original currency, ideally of a greater amount than transacted at the start (e.g., performing transactions according to a currency path from a starting to an ending denomination, followed by a direct transaction from the ending denomination to the starting denomination). Notifications may be provided to alert one or more users of the existence and/or details of such formulated transactions.

Accordingly, in a step S2914, the arbitrage notification system 2920 may provide to one or more user devices 2915 one or more notifications of one or more arbitrage opportunities. Notifications may indicate the existence of an arbitrage opportunity. Notifications may indicate a projected return on a series of transactions (e.g., 5% increase in bitcoin holdings, 23 BTC increase, 800 USD increase, to name a few). Notifications may also indicate a currency path and/or a plurality of formulated transactions. Notifications can be provided to a plurality of devices associated with a user and via a plurality of media (e.g., SMS, email, automated telephone call, push notification, to name a few).

Figure 47A:
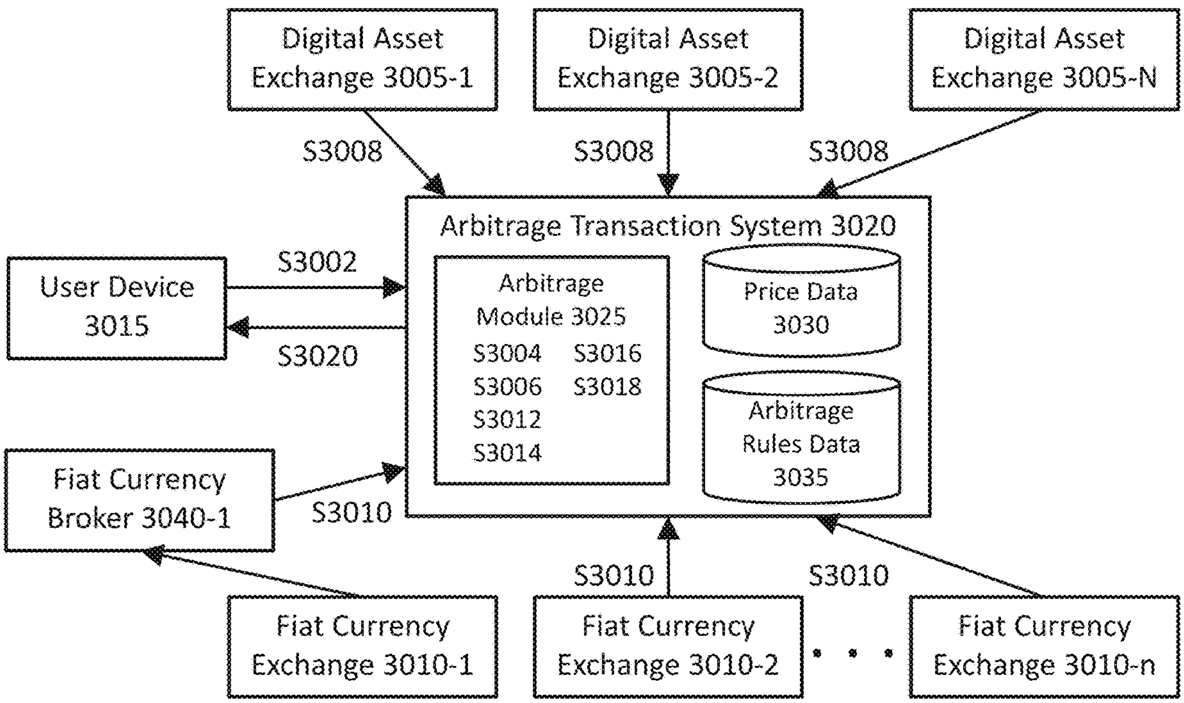
FIGS. 47A-B are a schematic diagram and corresponding flow chart showing participants in and processes for performing automated digital asset arbitrage transactions in accordance with exemplary embodiments of the present invention.
Figure 47B:
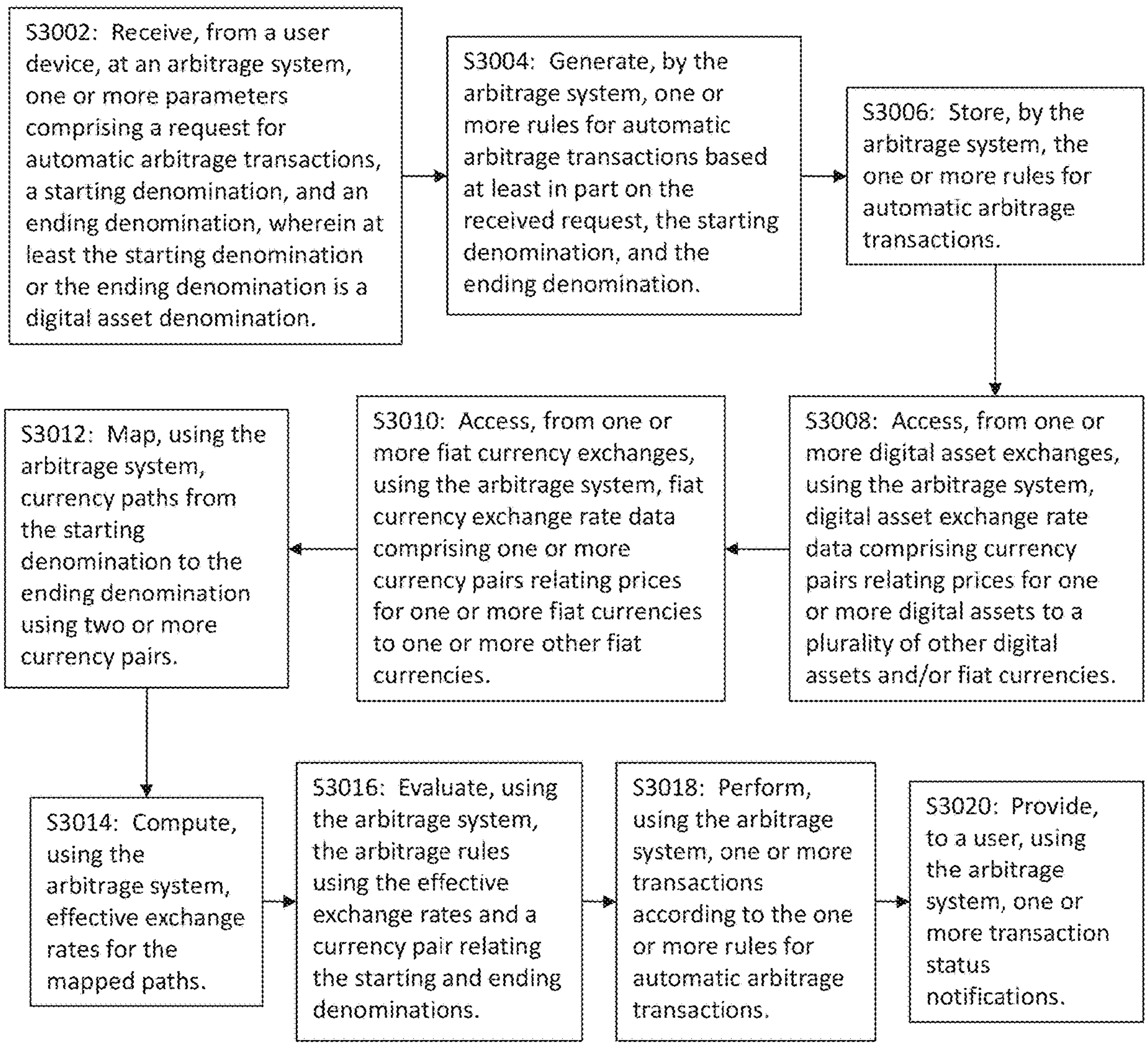

FIGS. 47A-B are a schematic diagram and corresponding flow chart showing an exemplary system and an exemplary process for performing digital foreign exchange systems opportunities in accordance with embodiments of the present invention. The exemplary system and processes described with respect to FIGS. 47A-B are similar to the exemplary arbitrage notification system discussed with respect to FIGS. 46A-B, with the added capability to execute formulated transactions to take advantage of determined arbitrage opportunities. Transactions may be performed to exchange digital assets to fiat currencies, digital assets to other digital assets, fiat currencies to digital assets, and/or fiat currencies to other fiat currencies involving intermediate digital asset exchange transactions. In embodiments, circular transactions may be performed to convert a starting digital asset to one or more intermediate denominations and then back to the starting digital asset. Circular transactions may also be performed to convert a starting fiat currency to one or more intermediate denominations involving at least one digital asset and then back to the starting fiat currency.

FIG. 47A is a schematic diagram of an exemplary arbitrage transaction system and the entities involved in such a system. A user can arrange, from a user device 3015, for automated arbitrage transactions. A user device 3015 can include a phone, smart phone, PDA, computer, and/or tablet computer, to name a few. A user may use a plurality of user devices 3015 in connection with the arbitrage transaction system of embodiments of the present invention (e.g., to set transaction settings, to confirm or authorize transactions, and/or to receive transaction status notifications).

An arbitrage transaction system 3020 can receive data, such as digital asset price data, from one or more digital asset exchange 3005 (e.g., 3005-1, 3005-2, . . . , 3005-N). In embodiments, data may be received from one or more digital asset exchange agents or brokers. An arbitrage transaction system 3020 can also receive data, such as fiat currency price data, from one or more fiat currency exchanges 3010 (e.g., 3010-1, 3010-2, . . . 3010-*n*). In embodiments, fiat currency price data may be received from one or more fiat currency brokers 3040. In embodiments, receiving data may entail fetching data, such as by using an API to access data from one or more exchange.

Still referring to FIG. 47A, an arbitrage transaction system 3020 can comprise one or more computers or computer systems having at least one or more processors, computer-readable memory comprising one or more databases, one or more communications portals for communicating with one or more other computers or computer systems, and/or one or more input devices. An arbitrage transaction system 3020 can include an arbitrage module 3025, price data 3030, and/or arbitrage rules data 3035, to name a few. Price data 3030 can include prices for one or more digital assets, which may come from one or more digital asset exchanges 3005, as well as prices for one or more fiat currencies, which may come from one or more fiat currency exchanges 3010. Price data 3030 may comprise exchange rate data, such as currency pairs, which relate the exchange rate between two differently denominated currencies or assets. Price data 3030 can span any time period. Price data 3030 may be converted into any form necessary for processing or normalizing against other price data (e.g., price data may be stored in 15-second increments). In embodiments, one or more databases may store the data described herein. In embodiments, one or more software modules may perform the functions attributed herein to an arbitrage module 3025.

An arbitrage module 3025 may be software that receives and/or processes requests for automated arbitrage transactions, generates arbitrage transaction rules, stores arbitrage transaction rules, executes operations to access data from digital asset and fiat currency exchanges, maps exchange transactions, computes effective exchange rates for mapped transactions, evaluates effective exchange rates and direct exchange rates according to arbitrage transaction rules, requests and/or processes transaction confirmation, performs transactions, and/or provides notifications of arbitrage transaction statuses, to name a few. In embodiments, one or more steps in an arbitrage notification process may be decentralized, e.g., performed by a user device.

FIG. 47B is a flow chart showing steps in an exemplary process for providing arbitrage alerts in exemplary embodiments of the present invention. In a step S3002, an arbitrage transaction system 3020 may receive, from a user device 3015, one or more parameters comprising a request for automated arbitrage transactions, a starting denomination, and an ending denomination. In embodiments, the starting denomination or the ending denomination may be a digital asset denomination, or the starting and ending denomination may be a fiat currency denomination and at least one intermediate digital transaction will be performed. In embodiments, the system may not receive a starting or an ending denomination or may not receive either. In such cases, the system may identify all possible transactions using whatever denomination is received or using any denominations supported by the arbitrage transaction system 3020. The parameters may be transaction criteria to determine when to perform transactions and/or parameters to govern how to perform transactions. Parameters may identify digital assets, fiat currencies, threshold amounts (e.g., specifying notifications for arbitrage opportunities with 2% returns or higher), amount of assets or currencies approved for automatic trading, transaction authorization settings, digital wallet information, transaction status alert types, notification frequencies, and/or notification recipients, to name a few.

In a step S3004, the arbitrage transaction system 3020 may generate one or more rules for automatic arbitrage transactions based at least in part on the received request for automatic arbitrage transactions and the starting and ending denominations, as may be determined by the system if not specified by a user.

In a step S3006, the arbitrage transaction system 3020 may store one or more rules for automatic arbitrage transactions. The rules may be stored in a database (e.g., for retrieval and use by arbitrage opportunity evaluation software or devices programmed to perform such operations) or integrated directly into a program for testing and evaluating exchange rate data, to name a few.

In a step S3008, the arbitrage transaction system 3020 may access, from one or more digital asset exchanges 3005, digital asset exchange rate data, which may comprise currency pairs relating prices for one or more digital assets to a plurality of other digital assets and/or fiat currencies. Accessing digital asset exchange rate data may entail using one or more APIs for one or more digital asset exchanges 3005 to fetch the price data and/or receiving a data stream of price data. In embodiments, digital asset exchange rate data may be obtained from one or more broker or exchange agent.

In a step S3010, the arbitrage transaction system 3020 may access, from one or more fiat currency exchanges 3010, fiat currency exchange rate data, which may comprise one or more currency pairs relating prices for one or more fiat currencies to one or more other fiat currencies. Fiat currency exchange rate data may be accessed using one or more APIs for one or more fiat currency exchanges and/or by reading a data feed from one or more exchanges, to name a few. In embodiments, a fiat currency exchange 3010 may be an exchange in the foreign exchange market. In embodiments, exchange rate data may be obtained from one or more exchange agent or broker, such as a fiat currency broker 3040.

In a step S3012, the arbitrage transaction system 3020 may map currency paths from a starting denomination to an ending denomination using at least two currency pairs or at least three denominations, since two currency pairs may share a common base. The mapping of currency paths is described herein with respect to step S2908.

In a step S3014, the arbitrage transaction system 3020 may compute effective exchange rates for the mapped currency paths. An effective exchange rate may relate the prices of two endpoints of a currency path. The effective exchange rate may be computed by multiplying the exchange rate for each currency pair in the currency path.

In a step S3016, the arbitrage transaction system 3020 may evaluate (e.g., by processing on a computer system) arbitrage transaction rules to determine the presence of an arbitrage opportunity meeting transaction criteria and to determine actions to perform (e.g., seeking authorization to perform a transaction and/or performing a transaction, to name a few) based thereupon. In embodiments, evaluating arbitrage transaction rules may entail, in part, comparing the computed effective exchange rates for one or more currency paths to a direct exchange rate associated with a currency pair relating the starting and ending denominations. Where the effective exchange rate differs from the direct exchange rate, as related by the direct starting/ending currency pair, an arbitrage opportunity may exist, and transactions may be formulated accordingly. Transactions may be structured to convert from one denomination to a different denomination (e.g., following one or more mapped currency paths). In other embodiments, circular transactions may be structured to perform a plurality of currency conversions and end with the original currency, ideally of a greater amount than transacted at the start (e.g., performing transactions according to a currency path from a starting to an ending denomination, followed by a direct transaction from the ending denomination to the starting denomination).

In embodiments, requests for authorization to proceed with a transaction may be sent to a user. In embodiments, if a response is not received from a user within a set period of time, the transaction may proceed.

In a step S3018, the arbitrage transaction system 3020 may perform one or more transactions according to the one or more rules for automatic arbitrage transactions. In embodiments, the performed transactions may follow the mapped currency paths.

In a step S3020, the arbitrage transaction system 3020 may provide one or more transaction status notifications. Transaction status notifications may indicate that one or more transactions were executed automatically, and/or the details of the transactions. Transaction status notifications may also indicate failed and/or pending transactions.

Digital Asset Foreign Exchange System

As previously described with respect to FIGS. 46A-B and 47A-B, foreign exchange transactions may be performed using one or more digital asset exchanges. In embodiments, a digital asset exchange may comprise a foreign exchange module configured to handle foreign exchange transactions. In embodiments, a separate foreign exchange system may interact with one or more digital asset exchanges to perform foreign exchange transactions.

Figure 48A:
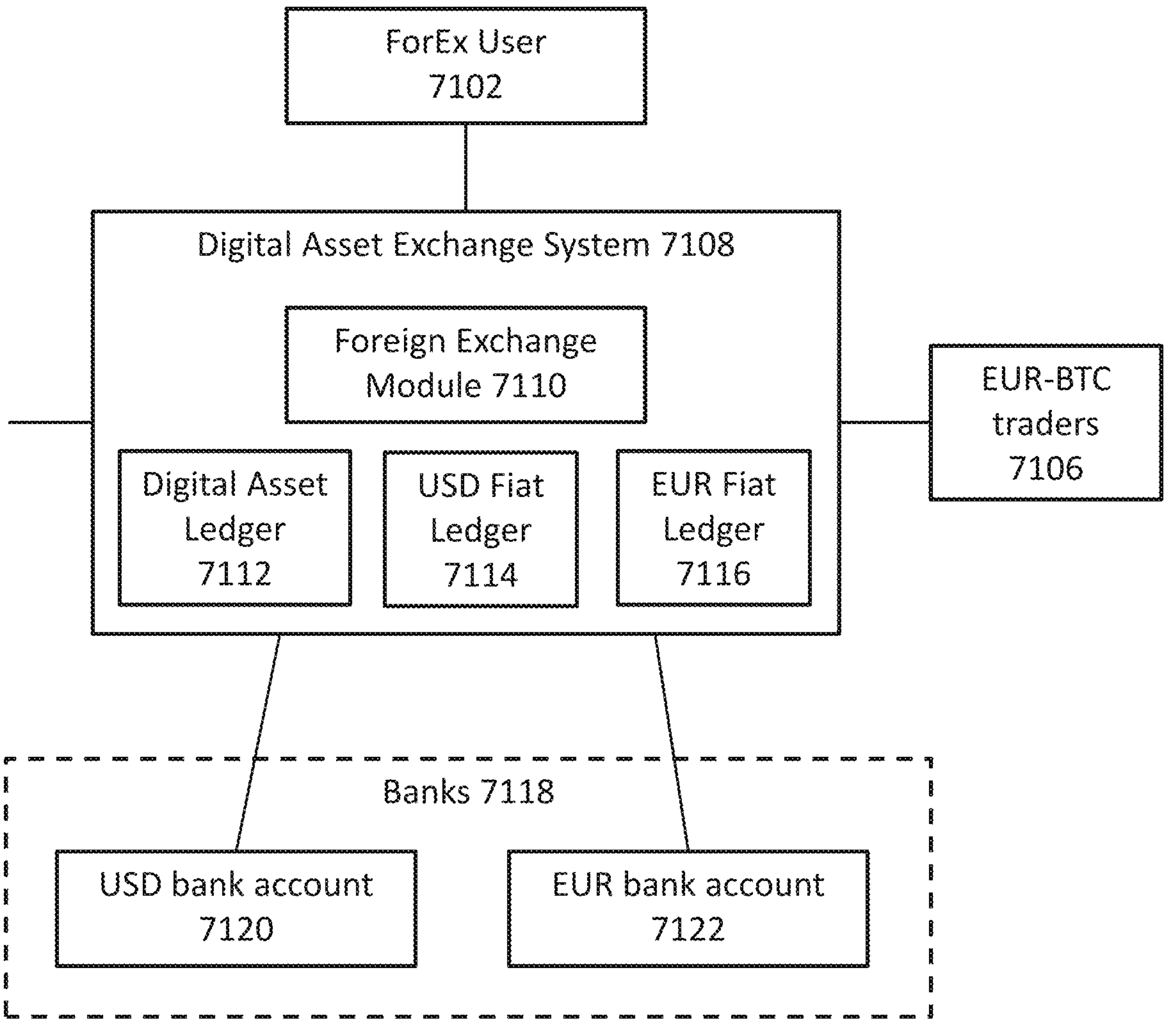
FIGS. 48A-C are schematic diagrams of foreign exchange systems in accordance with exemplary embodiments of the present invention.
Figure 48B:
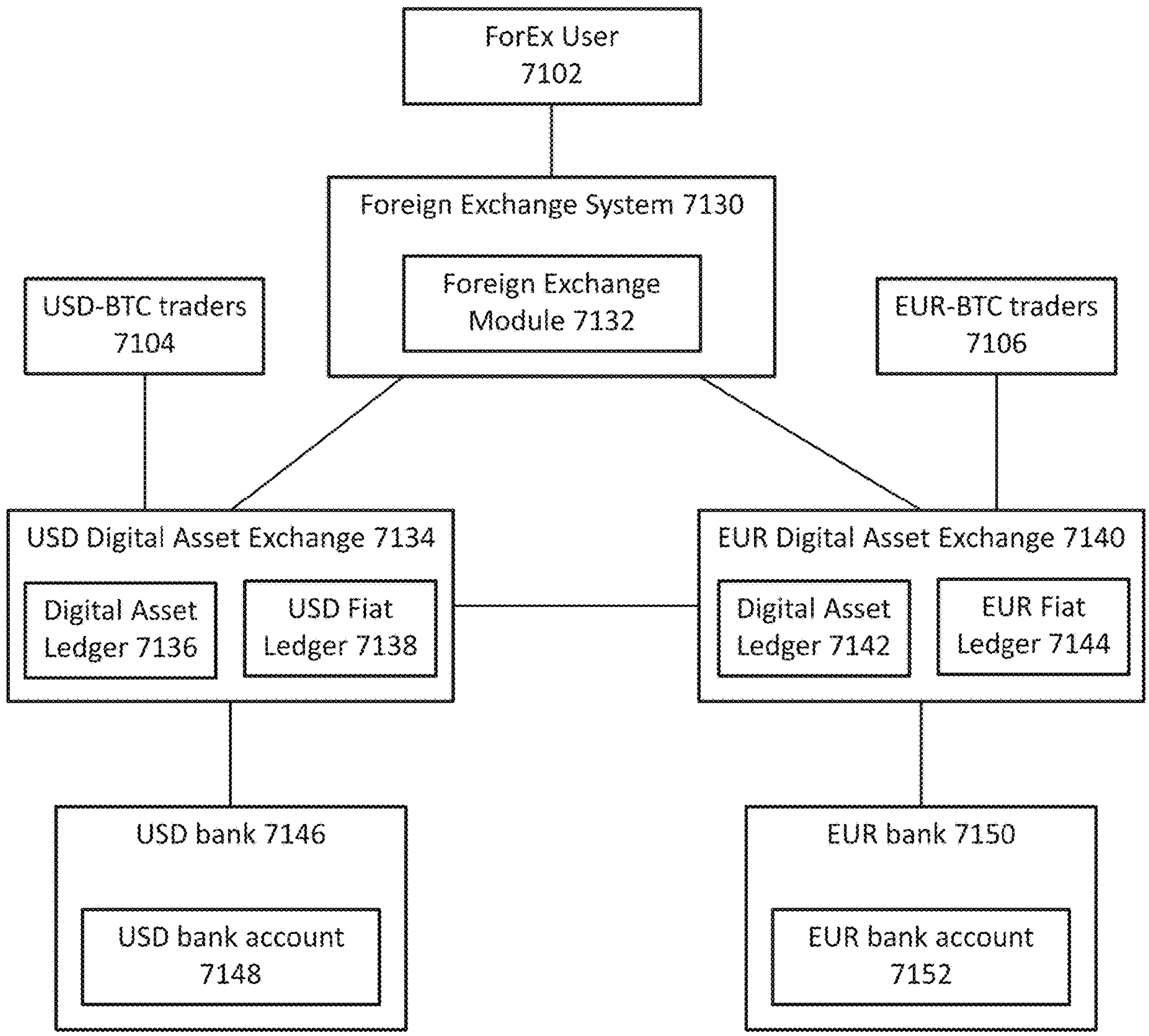
Figure 48C:
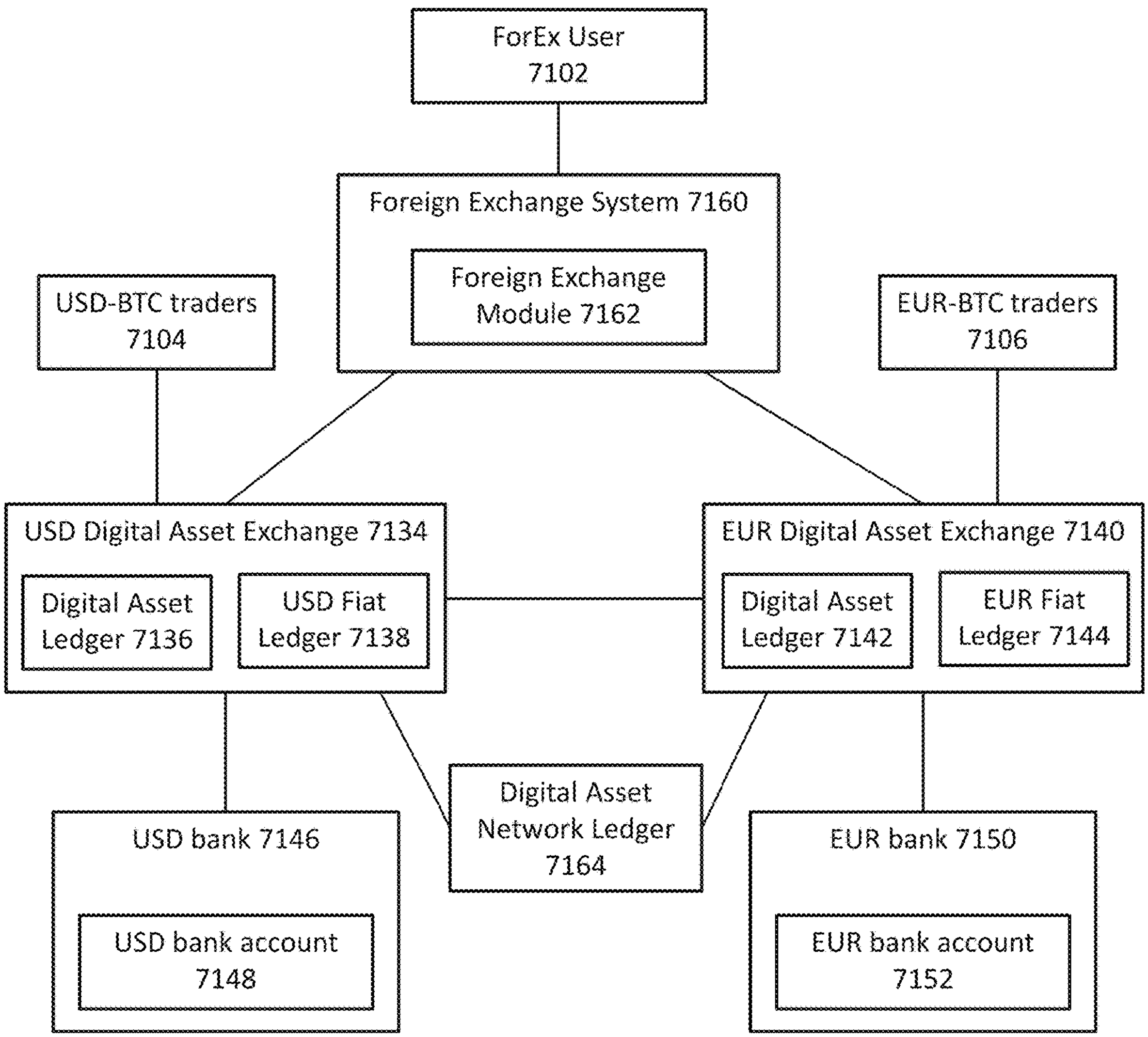

FIGS. 48A-C are schematic diagrams of foreign exchange systems in accordance with exemplary embodiments of the present invention.

FIG. 48A shows exemplary participants in an embodiment of a digital asset-based foreign exchange system. A digital asset exchange computer system 7108 can include a foreign exchange module 7110, which may be stored in non-transitory computer-readable memory operatively connected to the computer system and which may be configured to run on one or more processors of the computer system. The foreign exchange module 7110 can process foreign exchange transactions. The digital asset exchange computer system 7108 can include a digital asset electronic ledger 7112, a first fiat currency electronic ledger 7114, and a second fiat currency electronic ledger 7116. In embodiments, the exchange computer system 7108 may be operatively connected to one or more banks 7118 comprising at least a first fiat currency bank account 7120, denominated in the first fiat currency, and a second fiat currency bank account 7122, denominated in the second fiat currency. In embodiments, account 7120 may be associated with a first bank, and account 7122 may be associated with a second bank. In embodiments, they may be associated with the same bank. In embodiments, the foreign exchange system may handle a plurality of fiat currencies. The system may be connected to a bank account for each fiat currency and may have a fiat currency ledger for each currency. In embodiments, the foreign exchange system may handle a plurality of digital asset types, and the system may have a respective digital asset ledger for each digital asset type.

FIG. 48B shows exemplary participants in another embodiment of a foreign exchange system. A foreign exchange system 7130 may be independent of one or more digital asset exchanges and/or fiat currency exchanges but may be operatively connected to them. For example, it may be operatively connected to a first digital asset exchange 7134 configured to exchange a first digital asset with a first fiat currency. The system may also be operatively connected to a second digital assert exchange 7140 configured to exchange the first digital asset with a second fiat currency. In embodiments, a single digital asset exchange may be configured to perform exchange transactions between a digital asset and multiple fiat currencies. Each digital asset exchange may be operatively connected to a bank with one or more bank accounts denominated in the respective fiat currency. In embodiments, the foreign exchange system 7130 may be affiliated with a particular digital asset exchange.

FIG. 48C shows another embodiment of a foreign exchange system. The system is similar to that described in FIG. 48B, but it includes a digital asset network ledger 7164. Exchange transactions at the one or more exchanges may be broadcast to a network ledger, such as the Bitcoin blockchain. The digital asset exchanges may transfer digital assets among each other using the network ledger 7164.

Figure 49A:
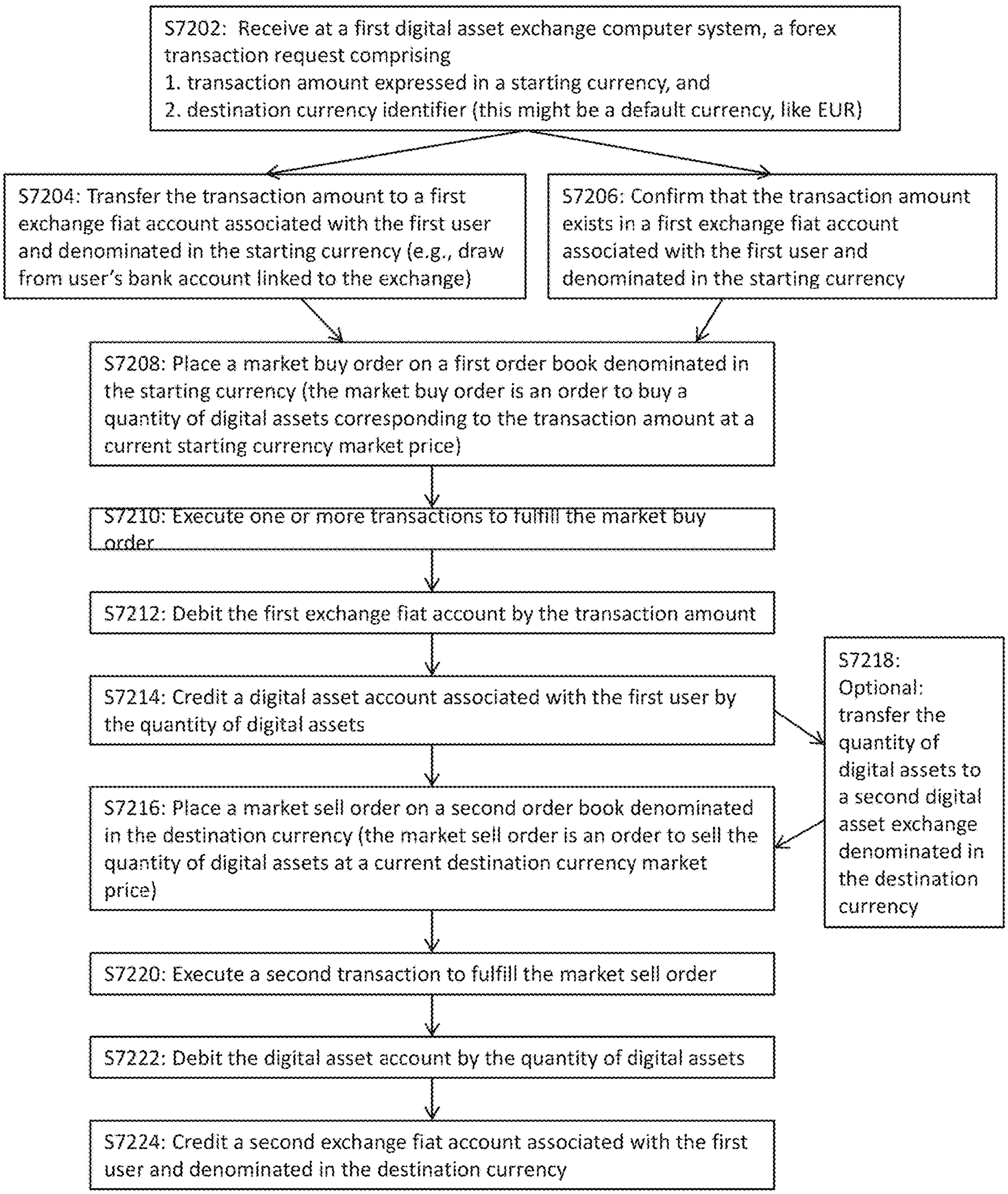
FIGS. 49A-B are flow charts of exemplary processes for performing foreign exchange transactions in accordance with exemplary embodiments of the present invention.
Figure 49B:
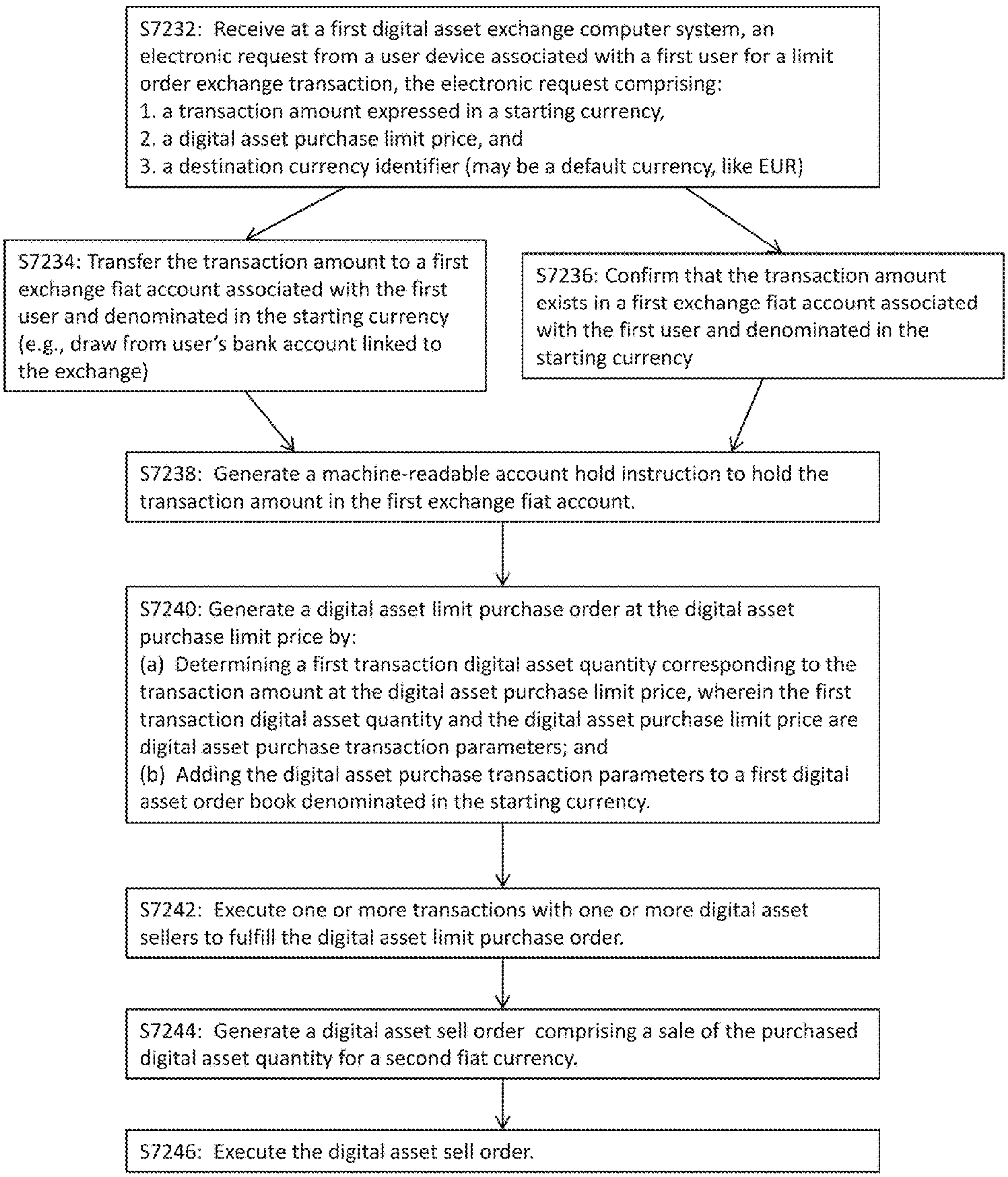

FIGS. 49A-B are flow charts of exemplary processes for performing foreign exchange transactions.

Referring to FIG. 49A, at a step S7202, a first digital asset exchange computer system may receive a foreign exchange transaction request. The request may comprise a transaction amount expressed in a starting currency, and a destination currency identifier, which may be a default currency identifier, such as EUR.

In a step S7204, the computer system may transfer or have transferred the transaction amount to a first exchange fiat account associated with the first user and denominated in the starting currency (e.g., draw from user's bank account linked to the exchange but unaffiliated with the exchange and deposit in the first exchange fiat account, which may be affiliated with the exchange). As an alternative, in a step S7206, the computer system may confirm that the transaction amount exists in the first exchange fiat account associated with the first user and denominated in the starting currency.

In a step S7208, the computer system may place a market buy order on a first order book denominated in the starting currency. The market buy order may be an order to buy a quantity of digital assets corresponding to the transaction amount at a current starting currency market price.

In a step S7210, the computer system may execute one or more transactions to fulfill the market buy order. In embodiments, the first digital asset exchange may execute these transactions, e.g., upon receiving a transaction request from the computer system.

In a step S7212, the computer system may debit (e.g., using a fiat currency electronic ledger) the first exchange fiat account by the transaction amount.

In a step S7214, the computer system may credit (e.g., using a digital asset electronic ledger) a digital asset account associated with the first user by the quantity of digital assets. Optionally, where the first exchange handles transactions in the starting currency and a second exchange handles transaction in the destination currency, in a step S7218, the computer system may transfer the quantity of digital assets to a second digital asset exchange denominated in the destination currency.

In a step S7216, the computer system may place a market sell order on a second order book denominated in the destination currency. The market sell order may be an order to sell the quantity of digital assets at a current destination currency market price.

In a step S7220, the computer system may execute one or more second transactions to fulfill the market sell order. In embodiments, the second digital asset exchange may execute these transactions, e.g., upon receiving a transaction request from the computer system.

In a step S7222, the computer system may debit the digital asset account by the quantity of digital assets.

In a step S7224, the computer system may credit a second exchange fiat account associated with the first user and denominated in the destination currency.

FIG. 49B shows another exemplary process for performing a foreign exchange transaction.

In a step S7232, a first digital asset exchange computer system may receive an electronic request from a user device associated with a first user for a limit order exchange transaction. The electronic request may comprise a transaction amount expressed in a starting currency, a digital asset purchase limit price, and a destination currency.

In a step S7234, the first digital asset exchange computer system may transfer the transaction amount to a first exchange fiat account associated with the first user and denominated in the starting currency. Alternatively, in a step S7236, the first digital asset exchange computer system may confirm that the transaction amount exists in a first exchange fiat account associated with the first user and denominated in the starting currency.

In a step S7238, the first digital asset exchange computer system may generate a machine-readable account hold instruction to hold the transaction amount in the first exchange fiat account.

In a step S7240, the first digital asset exchange computer system may generate a digital asset limit purchase order at the digital asset purchase limit price by determining a first transaction digital asset quantity corresponding to the transaction amount at the digital asset purchase limit price, wherein the first transaction digital asset quantity and the digital asset purchase limit price are digital asset purchase transaction parameters; and adding the digital asset purchase transaction parameters to a first digital asset order book denominated in the starting currency.

In a step S7242, the first digital asset exchange computer system may execute one or more transactions with one or more digital asset sellers to fulfill the digital asset limit purchase order.

In a step S7244, the first digital asset exchange computer system may generate a digital asset sell order comprising a sale of the purchased digital asset quantity for a second fiat currency.

In a step S7246, the first digital asset exchange computer system may execute the digital asset sell order.

In embodiments, a foreign exchange system may perform this process by interacting with one or more digital asset exchanges.

Examples of Financial Products Associated with a Digital Asset Exchange

In embodiments, insurance may be provided for digital assets, e.g., held by a digital asset exchange. Such insurance may be provided to individual users of digital assets (including vendors), groups of users, exchanges, exchange agents, trusts providing exchange traded products associated with digital assets, to name a few. Insurance may be provided for a digital asset wallet and/or the contents of a digital asset wallet (e.g., insurance for 100 Bitcoin stored in a digital wallet). Such insurance may involve secure storage of the private key to a wallet and/or the public key. In embodiments, the blended digital math-based asset price as discussed herein may be used as a benchmark for such insurance.

In embodiments, a digital asset kiosk, such as a digital math-based asset kiosk, may be used to perform one or more transactions associated with digital assets. The transactions may require an appropriate money transmit business in order to meet regulatory requirements. In embodiments, a person or entity must use a money transmit business registered in the person or entity's domicile.

In embodiments, a digital asset exchange may provide and/or support transactions (e.g., formation, buying, and/or selling) of derivate products. Such exchange traded derivatives can include options such as calls and/or puts. A digital asset exchange may also support digital asset lending, delayed settlements, derivative swaps, futures, and/or forwards, to name a few.

Additional Embodiments

In embodiments, a computer-implemented method may comprise the steps of (i) determining, by a trust computer system including one or more computers, share price information based at least in part upon a first quantity of digital math-based assets held by a trust at a first point in time and a second quantity of shares in the trust at the first point in time; (ii) receiving, at the trust computer system from one or more authorized participant user devices of an authorized participant, an electronic request to purchase a third quantity of shares; (iii) determining, by the trust computer system, a fourth quantity of digital math-based assets based at least in part upon the share price information and the third quantity of shares; (iv) obtaining, using the trust computer system, one or more destination digital asset account identifiers (e.g., one or more digital asset account addresses, and/or one or more digital asset account public keys, to name a few) corresponding to one or more destination digital asset accounts for receipt of digital math-based assets from the authorized participant; (v) transmitting, from the trust computer system to the one or more authorized participant user devices, the one or more destination digital asset account identifiers and an electronic amount indication of the fourth quantity of digital math-based assets; (vi) receiving, at the trust computer system, an electronic transfer indication of a transfer of digital math-based assets to the destination asset account; (vii) verifying, by the trust computer system using a decentralized electronic ledger maintained by a plurality of physically remote computer systems, a receipt of the fourth quantity of digital math-based assets in the one or more destination digital asset accounts; and (viii) issuing or causing to be issued, using the trust computer system, the third quantity of shares to the authorized participant.

In embodiments, the computer-implemented method may further comprise the step of, after the determining step (i) above, transmitting, from the trust computer system to the one or more authorized participant user devices, the share price information. In embodiments, the determining step (i) above may further comprise the steps of determining, by the trust computer system, a fifth quantity of digital math-based assets held by the trust that are attributable to shareholders; determining, by the trust computer system, a sixth quantity of digital math-based assets by subtracting from the fifth quantity a seventh quantity of digital math-based assets associated with trust expenses; and dividing the sixth quantity by an eighth quantity of outstanding shares.

In embodiments, the verifying step (vii) above may further comprise the steps of accessing, using the trust computer system, a plurality of updates to the decentralized electronic ledger (e.g., new blocks added to a bitcoin blockchain); analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger.

In embodiments, the computer-implemented method may further comprise the step of transferring, using the trust computer system, the fourth quantity of digital math-based assets into one or more digital asset accounts associated with a trust custody account.

In embodiments, the computer-implemented method may further comprise the step of transmitting, from the trust computer system to the one or more authorized participant user devices, an electronic receipt acknowledgement indicating the receipt of the fourth quantity of digital math-based assets.

In embodiments, the computer-implemented method may further comprise the step of transmitting or causing to be transmitted, to the one or more authorized participant user devices, an electronic share issuance indication of the issuing of the third quantity of shares.

In embodiments, the share price information may be a quantity of digital math-based assets per share and/or per a basket of shares corresponding to a number of shares associated with one creation unit of shares. In embodiments, the basket of shares may comprise one or more quantities of shares selected from the group consisting of: 5,000 shares, 10,000 shares, 15,000 shares, 25,000 shares, 50,000 shares, and 100,000 shares.

In embodiments, the electronic transfer indication may further comprise an identification of one or more origin digital asset accounts.

In embodiments, the trust computer system may be operated by a trustee of the trust and/or an administrator of the trust on behalf of the trust.

In embodiments, a computer-implemented method may comprise the steps of (i) determining, by a trust computer system comprising one or more computers, share price information based at least in part upon a first quantity of digital math-based assets held by a trust at a first point in time and a second quantity of shares in the trust at the first point in time; (ii) receiving, at the trust computer system from the one or more authorized participant user devices of the authorized participant, an electronic request to redeem a third quantity of shares; (iii) determining, by the trust computer system, a fourth quantity of digital math-based assets based at least in part upon the share price information and the third quantity of shares; (iv) obtaining, by the trust computer system, one or more destination digital asset account identifiers corresponding to one or more destination digital asset accounts for receipt by the authorized participant of a transfer of the fourth quantity of digital math-based assets from the trust; (v) obtaining, using the trust computer system, one or more origin digital asset account identifiers corresponding to one or more origin digital asset accounts for the transfer; (vi) initiating, using the trust computer system, the transfer of the fourth quantity of digital math-based assets from the one or more origin digital asset accounts to the one or more destination digital asset accounts; (vii) broadcasting, using the trust computer system, the transfer to a decentralized electronic ledger maintained by a plurality of physically remote computer systems; (viii) verifying, by the trust computer system using the decentralized electronic ledger, a receipt of the fourth quantity of digital math-based assets at the one or more destination digital asset accounts; and (ix) canceling or causing to be canceled, using the trust computer system, the third quantity of shares from the authorized participant.

In embodiments, the computer-implemented method may further comprise the step of transmitting, from the trust computer system to the one or more authorized participant user devices, the share price information.

In embodiments, the computer-implemented method may further comprise the steps of obtaining, using the trust computer system, a net asset value per share; determining, using the trust computer system, a digital math-based asset value of the third quantity of shares based upon the net asset value per share; determining, using the trust computer system, transaction fees associated with the electronic request; and determining, using the trust computer system, the fourth quantity of digital math-based assets by subtracting the transaction fees from the digital math-based asset value of the third quantity of shares.

In embodiments, the computer-implemented method may further comprise the step of determining, by the trust computer system, a settlement period associated with the electronic request.

In embodiments, the computer-implemented method may further comprise the step of retrieving or causing to be retrieved, using the trust computer system, one or more private keys associated with the one or more origin digital asset accounts; and accessing the one or more origin digital asset accounts using at least the one or more private keys.

In embodiments, the computer-implemented method may further comprise the steps of issuing, using the trust computer system, retrieval instructions for retrieving a plurality of encrypted private keys corresponding to the one or more origin digital asset accounts; receiving, at the trust computer system, the plurality of encrypted private keys; and obtaining, using the trust computer system, one or more private keys by decrypting the plurality of private keys.

In embodiments, the computer-implemented method may further comprise the steps of issuing, using the trust computer system, retrieval instructions for retrieving a plurality of private key segments corresponding to the one or more origin digital asset accounts; receiving, at the trust computer system, the plurality of private key segments; and obtaining, using the trust computer system, one or more private keys by assembling the plurality of private keys.

In embodiments, the computer-implemented method may further comprise the steps of issuing, using the trust computer system, retrieval instructions for retrieving a plurality of encrypted private key segments corresponding to the one or more origin digital asset accounts; receiving, at the trust computer system, the plurality of encrypted private key segments; and obtaining, using the trust computer system, one or more private keys by decrypting the plurality of private key segments and assembling the segments into one or more private keys.

In embodiments, the computer-implemented method may further comprise the steps of issuing, using the trust computer system, retrieval instructions for retrieving a plurality of encrypted private key segments corresponding to the one or more origin digital asset accounts; receiving, at the trust computer system, the plurality of encrypted private key segments; obtaining, using the trust computer system, one or more first private keys by decrypting the plurality of private key segments and assembling the segments into one or more first private keys; and obtaining, using the trust computer system, at least one second private key corresponding to the one or more origin digital asset accounts. In embodiments, the one or more first private keys and the at least one second private key may be keys for one or more multi-signature digital asset accounts.

In embodiments, the computer-implemented method may further comprise the steps of accessing, using the trust computer system, a plurality of updates to the decentralized electronic ledger (e.g., new blocks added to a bitcoin blockchain); analyzing, using the trust computer system, each of the plurality of updates for a first confirmation of the receipt by a node in a network associated with the digital math-based asset; and determining, using the trust computer system, a final confirmation of the receipt after detecting first confirmations of the receipt in a predetermined number of the plurality of updates to the decentralized electronic ledger.

In embodiments, the transaction fees may be denominated in a unit of the digital math-based asset. In embodiments, the share price information may comprise a net asset value per share, an adjusted net asset value per share, and/or a net asset value per a basket of shares corresponding to a number of shares associated with one creation unit of shares.

In embodiments, the basket of shares may comprise one or more quantities of shares selected from the group consisting of: 5,000 shares, 10,000 shares, 15,000 shares, 25,000 shares, 50,000 shares, and 100,000 shares.

In embodiments, the electronic request may comprise a redemption order.

In embodiments, the trust computer system may be operated by a trustee of the trust and/or an administrator of the trust on behalf of the trust.

In embodiments, the one or more origin digital asset accounts may correspond to a trust custody account.

In embodiments, the one or more destination digital asset accounts may correspond to an authorized participant custody account.

In embodiments, a computer-implemented method may comprise the steps of (i) generating, using a computer system comprising one or more computers, one or more digital asset accounts capable of holding one or more digital math-based assets; (ii) obtaining, using the computer system, one or more private keys corresponding to the one or more digital asset accounts; (iii) dividing, using the computer system, each of the one or more private keys into a plurality of private key segments; (iv) encrypting, using the computer system, each of the plurality of private key segments; (v) associating, using the computer system, each of the plurality of private key segments with a respective reference identifier; (vi) creating, using the computer system, one or more cards for each of the encrypted plurality of private key segments wherein each of the one or more cards has fixed thereon one of the encrypted plurality of private key segments along with the respective associated reference identifier; and (vii) tracking, using the computer system, storage of each of the one or more cards in one or more vaults.

In embodiments, the computer-implemented method may further comprise the steps of generating, using the computer system, electronic transfer instructions for an electronic transfer of the quantity of digital math-based assets to the one or more digital asset accounts; and broadcasting, using the computer system, the electronic transfer instructions to a decentralized electronic ledger maintained by a plurality of physically remote computer systems.

In embodiments, the computer system includes at least one isolated computer that is not directly connected to an external data network.

In embodiments, the encryption step (iv) above, may further comprise implementing, using the computer system, a symmetric-key and/or asymmetric-key encryption algorithm.

In embodiments, the one or more cards may be plastic, a paper product, index cards, sheets of paper, metal, and/or laminated.

In embodiments, each of the encrypted plurality of private key segments along with the respective associated reference identifier may be fixed on the one or more cards via printing, etching. In embodiments, each of the encrypted plurality of private key segments may be fixed on the one or more cards via a magnetic encoding and/or scanable code. In embodiments, the scanable code may be a bar code and/or a QR code.

In embodiments, the one or more vaults may be geographically remote from each other. In embodiments, the one or more vaults may include a bank vault and/or a precious metal vault. In embodiments, the one or more vaults may comprise a main set of vaults and one or more sets of backup vaults. In embodiments, the main set of vaults may be located in a geographically proximate area and at least one of the one or more sets of backup vaults are located in a geographically remote area. In embodiments, the geographically proximate area may be a metropolitan area of a first city.

In embodiments, each of the plurality of private key segments corresponding to a first private key may be stored in separate vaults.

In embodiments, the computer-implemented method may further comprise the steps of receiving, at the computer system, a quantity of digital math-based assets; and storing, using the computer system, the quantity of digital math-based assets in the one or more digital asset accounts.

In embodiments, a computer-implemented method may comprise the steps of (i) generating, using a computer system comprising one or more computers, one or more digital asset accounts capable of holding one or more digital math-based assets; (ii) obtaining, using the computer system, a first plurality of private keys corresponding to each of the one or more digital asset accounts; (iii) dividing, using the computer system, a first private key of the first plurality of private keys into a second plurality of first private key segments; (iv) encrypting, using the computer system, each of the second plurality of first private key segments; (v) associating, using the computer system, each of the second plurality of first private key segments and a second private key with a respective reference identifier; (vi) creating, using the computer system, one or more cards for each of the encrypted second plurality of first private key segments wherein each of the one or more cards has fixed thereon one of the encrypted second plurality of first private key segments along with the respective associated reference identifier; and (vii) tracking, using the computer system, storage of each of the one or more cards in one or more vaults and storage of the second private key.

In embodiments, the computer-implemented method may further comprise the step of encrypting, using the computer system, the second private key.

In embodiments, the computer-implemented method may further comprise the step of electronically storing the second private key on a computer-readable substrate.

In embodiments, the computer-implemented method may further comprise the steps of generating, using a computer system comprising one or more computers, one or more digital asset accounts capable of holding one or more digital math-based assets; obtaining, using the computer system, one or more private keys corresponding to the one or more digital asset accounts; encrypting, using the computer system, each of the one or more private keys; dividing, using the computer system, each of the one or more encrypted private keys into a plurality of private key segments; associating, using the computer system, each of the plurality of private key segments with a respective reference identifier; creating, using the computer system, one or more cards for each of the plurality of private key segments wherein each of the one or more cards has fixed thereon one of the plurality of private key segments along with the respective associated reference identifier; and tracking, using the computer system, storage of each of the one or more cards in one or more vaults.

In embodiments, the one or more digital asset accounts may comprise multi-signature digital asset accounts.

In embodiments, a computer-implemented method may comprise the steps of (i) determining, using a computer system comprising one or more computers, one or more digital asset account identifiers corresponding to one or more digital asset accounts capable of holding one or more digital math-based assets; (ii) accessing, using the computer system, key storage information associated with each of the one or more digital asset account identifiers; (iii) determining, using the computer system, based upon the key storage information, storage locations corresponding to each of a plurality of private key segments corresponding to each of the one or more digital asset accounts; (iv) issuing or causing to be issued, retrieval instructions for retrieving each of the plurality of private key segments; (v) receiving, at the computer system, each of the plurality of private key segments; (vi) decrypting, using the computer system, each of the plurality of private key segments; (vii) assembling, using the computer system, each of the plurality of private key segments into one or more private keys.

In embodiments, the computer-implemented method may further comprise the step of accessing, using the computer system, the one or more digital asset accounts associated with the one or more private keys.

In embodiments, the computer-implemented method may further comprise the steps of accessing, using an isolated computer of the computer system, wherein the isolated computer is not directly connected to an external data network, the one or more digital asset accounts associated with the one or more private keys; generating, using the isolated computer, transaction instructions comprising one or more transfers from the one or more digital asset accounts; transferring the transaction instructions to a networked computer of the computer system; and broadcasting, using the networked computer, the transaction instructions to a decentralized electronic ledger maintained by a plurality of physically remote computer systems.

In embodiments, the key storage information may comprise a reference identifier associated with one or more stored private key segments.

In embodiments, a system may comprise (i) one or more networked computers comprising one or more processors and computer-readable memory; (ii) one or more isolated computers comprising one or more processors and computer-readable memory and configured to generate digital asset accounts and generate transaction instructions for digital math-based asset transactions; (iii) a writing device configured to write digital asset account keys; and (iv) a reading device configured to read digital asset account keys.

In embodiments, the system may further comprise an accounting computer comprising one or more processors and computer-readable memory and configured to track digital math-based asset transactions involving one or more specified digital asset accounts.

In embodiments, the one or more isolated computers, the writing device, and the reading device may be located within a Faraday cage.

In embodiments, the isolated computer may not be physically connected to an external data network.

In embodiments, the writing device may be a printer and/or an engraver.

In embodiments, the reading device may be a disk drive, an electronic card reader. a QR reader, and/or a scanner. In embodiments, the scanner may be a bar code scanner.

In embodiments, the writing and/or device may be operationally connected to the one or more isolated computers.

In embodiments, a secure system for storing digital math-based assets may comprise (a) an electronic isolation chamber; (b) one or more isolated computers within the electronic isolation chamber and comprising one or more processors and computer-readable memory operatively connected to the one or more processors and having stored thereon instructions for carrying out the steps of (i) generating, using the one or more isolated computers, one or more digital asset accounts capable of holding one or more digital math-based assets; (ii) obtaining, using the one or more isolated computers, one or more private keys corresponding to the one or more digital asset accounts; (iii) dividing, using the one or more isolated computers, at least one of the one or more private keys for each digital asset account into a plurality of private key segments, wherein each private key segment will be stored; (iv) associating, using the one or more isolated computers, each of the plurality of private key segments with a respective reference identifier; and (v) transmitting, from the one or more isolated computers to one or more writing devices operatively connected to the one or more isolated computers, electronic writing instructions for writing a plurality of cards, collated into a plurality of sets having only one private key segment per digital asset account, and each card containing one of the plurality of private key segments along with the respective associated reference identifier; (c) the one or more writing devices located within the electronic isolation chamber and configured to perform the electronic writing instructions, including collating the plurality of cards into the plurality of sets; and (d) one or more reading devices located within the electronic isolation chamber and configured to read the plurality of private key segments along with the respective associated reference identifier from the one or more cards.

In embodiments, a computer-implemented method may comprise the steps of (i) receiving, at a computer system comprising one or more computers, an electronic request to transfer first respective quantities of digital math-based assets from each of a first plurality of digital asset accounts; (ii) accessing, using the computer system, each of the first plurality of digital asset accounts; (iii) generating, using the computer system, transaction instructions comprising one or more transfers of the first respective quantities from each of the first plurality of digital asset accounts; and (iv) broadcasting, using the computer system, the transaction instructions to a decentralized electronic ledger maintained by a plurality of physically remote computer systems.

In embodiments, the first respective quantities of digital math-based assets comprise different quantities for different digital asset accounts.

In embodiments, a computer-implemented method for dynamically providing a graphical user interface for an electronic order book may comprise receiving, by an exchange computer system comprising one or more computers from non-transitory computer-readable memory operatively connected to the one or more computers, from a user device, a request to access the electronic order book associated with a digital asset traded on an electronic exchange, and accessing, by the exchange computer system, electronic order book information comprising digital asset order information for a plurality of digital asset orders, the digital asset order information comprising respective order prices denominated in a fiat currency and respective order quantities for each of the plurality of pending digital asset orders, wherein the plurality of pending digital asset orders includes pending digital asset purchase orders and pending digital asset sell orders. The method may further comprise calculating, by the exchange computer system, information for a first graphical user interface by determining, by the exchange computer system, at each respective order a price first cumulative quantity of digital assets subject to the pending digital asset purchase orders; and determining, by the exchange computer system, at each respective order price a second cumulative quantity of digital assets subject to the pending digital asset sell orders. The method may also comprise generating, by the exchange computer system, first machine-readable instructions to render the first graphical user interface including a first electronic order book graphical representation, the first electronic order book graphical representation comprising: (i) a first axis depicting price denominated in the fiat currency; (ii) a second axis depicting digital asset quantity; (iii) a first set of graphical indicators on a first side of the first axis showing at each price visible along the first axis the first cumulative quantity of digital assets subject to the pending digital asset purchase orders; and (iv) a second set of graphical indicators on a second side of the first axis showing at each price visible along the first axis the second cumulative quantity of digital assets subject to the pending digital asset sell orders. The method may comprise transmitting, by the exchange computer system to the first user electronic device, the first machine-readable instructions so as to cause an application (e.g., downloadable dedicated application, such as a mobile application, or a web browser application) at the first user electronic device to render the first graphical user interface on a display associated with the first user electronic device.

In embodiments, the method may further comprise receiving, at the exchange computer system from the first user electronic device, first digital asset order information corresponding to a first prospective digital asset purchase order, the first digital asset order information comprising a first order quantity of the digital asset and a first order price parameter related to a first order price of the digital asset, the first order price denominated in the fiat currency. The method may comprise storing, by the exchange computer system in the non-transitory computer-readable memory, the first digital asset order information as a prospective digital asset purchase order. The method may comprise calculating, by the exchange computer system, information for a second graphical user interface (e.g., a new interface or an updated version of the prior graphical user interface) by determining, by the exchange computer system, at each respective order price a second order quantity of digital assets subject to the first prospective digital asset purchase order and determining, by the exchange computer system, at each respective order price a third cumulative quantity of digital assets subject to the digital asset sell orders that would remain after fulfilling the first prospective digital asset purchase order. The method may comprise generating, by the exchange computer system, second machine-readable instructions to render the second electronic graphical user interface including a second electronic order book graphical representation comprising a graphical representation of the first prospective digital asset purchase order superimposed on a modified first electronic order book graphical representation, the second electronic order book graphical representation comprising (i) the first axis depicting price denominated in the fiat currency; (ii) the second axis depicting digital asset quantity; (iii) the first set of graphical indicators on the first side of the first axis; (iv) the second set of graphical indicators on the second side of the first axis; (v) a third set of graphical indicators on the first side of the first axis showing at each price visible along the first axis the respective second order quantity of digital assets subject to the first prospective digital asset purchase order; and (vi) a fourth set of graphical indicators on the second side of the first axis showing at each price visible along the first axis the respective third cumulative quantity of digital assets subject to the digital asset sell orders that would remain after fulfilling the first prospective digital asset purchase order. The method may comprise transmitting, by the exchange computer system to the first user electronic device, the second machine-readable instructions so as to cause the application at the first user electronic device to render the second graphical user interface on the display.

In embodiments, the machine-readable instructions may be rendered in a webpage by a web browser. In embodiments, the machine-readable instructions may be rendered by a downloadable application, such as a mobile application running on the user electronic device.

In embodiments, the first axis may be a horizontal axis.

In embodiments, the second axis may have a logarithmic scale. In embodiments, at least one of the first axis or the second axis of the first electronic order book graphical representation have a different scale than the corresponding first axis and the corresponding second axis of the second electronic order book graphical representation.

In embodiments, the first order price parameter may comprise a market order indicator and the first order price is a market price. In embodiments, the third set of graphical indicators may not be displayed.

In embodiments, the first order price parameter may comprise a limit order indicator and the first order price may be a limit price specified by the user. In embodiments, the first prospective digital asset purchase order may be characterized as out of the money and the third respective cumulative quantity of digital assets at each price may be zero.

In embodiments, the step of calculating information for a second electronic order book graphical representation may further comprise determining, by the exchange computer system, at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. In the second electronic order book graphical representation, the first set of graphical indicators may show at each price visible along the first axis the fourth cumulative quantity of digital assets.

In embodiments, the method may comprise receiving, at the exchange computer system from the first user electronic device, first digital asset order information corresponding to a first prospective digital asset sell order, the first digital asset order information comprising a first order quantity of the digital asset and a first order price parameter related to a first order price of the digital asset, the first order price denominated in the fiat currency. The method may comprise storing, by the exchange computer system in the non-transitory computer-readable memory, the first digital asset order information as a prospective digital asset sell order. The method may comprise calculating, by the exchange computer system, information for a second graphical user interface (e.g., a new graphical user interface or an updated version of the prior graphical user interface) by determining, by the exchange computer system, at each respective order price a second order quantity of digital assets subject to the first prospective digital asset sell order; and determining, by the exchange computer system, at each respective order price a third cumulative quantity of digital assets subject to the digital asset purchase orders that would remain after fulfilling the first prospective digital asset sell order. The method may comprise generating, by the exchange computer system, second machine-readable instructions to render the second graphical user interface including a second electronic order book graphical representation comprising a graphical representation of the first prospective digital asset purchase order superimposed on a modified first electronic order book graphical representation, the second electronic order book graphical representation comprising (i) the first axis depicting price denominated in the fiat currency; (ii) the second axis depicting digital asset quantity; (iii) the first set of graphical indicators on the first side of the first axis; (iv) the second set of graphical indicators on the second side of the first axis; (v) a third set of graphical indicators on the first side of the first axis showing at each price visible along the first axis the respective third cumulative quantity of digital assets subject to the digital asset purchase orders that would remain after fulfilling the first prospective digital asset sell order; and (vi) a fourth set of graphical indicators on the second side of the first axis showing at each price visible along the first axis the respective second order quantity of digital assets subject to the first prospective digital asset sell order. The method may comprise transmitting, by the exchange computer system to the first user electronic device, the second machine-readable instructions so as to cause the application at the first user electronic device to render the second graphical user interface on the display.

In embodiments, the step of calculating information for a second electronic order book graphical representation may further comprise determining, by the exchange computer system, at each respective order price a fourth cumulative quantity of digital assets subject to both the digital asset purchase orders and the first prospective digital asset purchase order that would remain after fulfillment of at least a portion of the first prospective digital asset purchase order by the pending digital asset sell orders. In the step of generating machine-readable instructions for the second electronic order book graphical representation, the first set of graphical indicators may show at each price visible along the first axis the fourth cumulative quantity of digital assets.

In embodiments, the present invention generally relates to systems, methods, and program products for use with custodial electronics wallets for an ETPs or other financial products holding digital assets, including digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, I0coin, Terracoin, Liquidcoin, BBQcoin, BitBars, Gas, Tether and PhenixCoin, to name a few. For purposes of discussion, without limiting the scope of the invention, embodiments involving bitcoin may be discussed to illustrate the present invention. The disclosure can encompass other forms of digital assets, digital math-based assets, peer-to-peer electronic cash system, digital currency, synthetic currency, or digital crypto-currency.

In embodiments, the present invention generally relates to systems, methods, and program products providing particular applications of an electronic digital asset exchange facilitating the purchase and sale of digital math-based assets, including digital math-based assets, such as Bitcoin, Ethereum, Ripple, Cardano, Litecoin, NEO, Stellar, IOTA, NEM, Dash, Monero, Lisk, Qtum, Zcash, Nano, Steem, Bytecoin, Verge, Siacoin, Stratis, BitShares, Dogecoin, Waves, Decred, Ardor, Hshare, Komodo, Electroneum, Ark, DigiByte, E-coin, ZClassic, Byteball Bytes, PIVX, Cryptonex, GXShares, Syscoin, Bitcore, Factom, MonaCoin, ZCoin, SmartCash, Particl, Nxt, ReddCoin, Emercoin, Experience Points, Neblio, Nexus, Blocknet, GameCredits, DigitalNote, Vertcoin, BitcoinDark, Bitcoin Cash, Skycoin, ZenCash, NAV Coin, Achain, HTMLCOIN, Ubiq, BridgeCoin, Peercoin, PACcoin, XTRABYTES, Einsteinium, Asch, Counterparty, BitBay, Viacoin, Rise, Guiden, ION, Metaverse ETP, LBRY Credits, Crown, Electra, Burst, MinexCoin, Aeon, SaluS, DECENT, CloakCoin, Pura, ECC, DeepOnion, Groesticoin, Lykke, Steem Dollars, I/O Coin, Shift, HempCoin, Mooncoin, Dimecoin, Namecoin, Feathercoin, Diamond, Spectrecoin, Filecoin, Tezos, PPCoin, Tonal bitcoin, IxCoin, Devcoin, Freicoin, IOcoin, Terracoin, Liquidcoin, BBQcoin, BitBars, Gas, Tether and PhenixCoin, to name a few. For purposes of discussion, without limiting the scope of the invention, embodiments involving bitcoin may be discussed to illustrate embodiments of the present invention. The disclosure can encompass other forms of digital assets, digital math-based assets, peer-to-peer electronic cash system, digital currency, synthetic currency, or digital crypto-currency. The disclosure may also encompass assets or utilities, in the forms of “tokens,” that may reside on top of a blockchain. For example, a token may in the form of a digital asset that exists on another digital asset's platform. A more specific example is Ethereum's ERC20 token, implemented by the ERC20 protocol that defines a set of rules which need to be met in order for the token to be accepted on the Ethereum platform.

In embodiments, systems and methods of the present invention may take into account blockchain forks, such as a “hardfork.” A fork or hardfork may be a radical change to the blockchain protocol that makes previously invalid blocks/transactions valid (or vice-versa), and as such requires all nodes or users to upgrade to the latest version of the protocol software. Put differently, a hard fork is a permanent divergence from the previous version of the blockchain, and nodes running previous versions will no longer be accepted by the newest version. This essentially creates a fork in the blockchain, one path which follows the new, upgraded blockchain, and one path which continues along the old path. Generally, after a short period of time, those on the old chain will realize that their version of the blockchain is outdated or irrelevant and quickly upgrade to the latest version. In regards to bitcoin, examples of forks include Bitcoin Cash and Bitcoin Gold.

In embodiments, the present invention may be used in connection with products or services other than ETPs, which can include digital asset price calculators, digital asset indices, digital asset account monitoring systems, correlation of news events to digital asset prices, exchanges for converting from, to, or between digital assets, such as digital math-based assets, automated notification, transaction, and/or arbitrage systems involving digital assets, including digital math-based assets, kiosk systems for transacting or interacting with digital math-based assets, digital asset insurance systems, digital asset secure storage systems, and/or other financial products based on the same.

A digital asset exchange computer system may provide a technological platform to convert between digital assets and fiat currencies and/or between digital assets and other digital assets. Exchanges known in the art have suffered from security breaches, money-laundering risk, and an inability to authenticate customer's using their real-world identities, and inefficiencies. The systems, methods, and program products of the present invention provide technological solutions to these problems.

In embodiments, the present invention may be used in connection with other products or services related to digital assets and digital asset exchanges, which can include automated notification, transaction, and/or arbitrage systems involving digital assets, including digital math-based assets, and/or kiosk systems for transacting or interacting with digital math-based assets.

In embodiments, the present invention generally relates to systems, methods, and program products providing an electronic digital asset exchange facilitating the purchase and sale of digital math-based assets, including digital math-based assets. The electronic digital asset exchange provides a technological solution to user identity verification, anti-money laundering verification, and secure storage of digital math-based assets and fiat currency associated with customer accounts.

In embodiments, a method may comprise the steps of (i) providing, by a digital math-based asset computer system comprising one or more computers, one or more exchange account databases stored on non-transitory computer-readable memory and comprising for a plurality of exchange accounts fiat account information for an associated insured fiat account associated with an exchange; digital math-based asset account information for an associated digital math-based asset account associated with the exchange; and user authentication data (e.g., a username and password, multi-factor authentication data, to name a few); and further comprising for a subset of exchange accounts institutional account information associating each of one or more exchange institutional accounts with one or more institutional user access accounts each having respective user authentication data; (ii) providing, by the digital math-based asset computer system, an orders database stored on the non-transitory computer-readable memory comprising at least digital math-based asset purchase order information comprising purchase order digital math-based asset quantities and corresponding purchase order fiat amounts; and digital math-based asset sell order information comprising sell order digital math-based asset quantities and corresponding sell order fiat amounts; (iii) providing, by the digital math-based asset computer system, an electronic ledger comprising, for each of the plurality of exchange accounts, fiat account balance data and digital math-based asset account balance data; (iv) receiving, at the digital math-based asset computer system from a first user electronic device associated with a first user access account associated with an institutional exchange account, a first electronic digital math-based asset purchase order comprising first purchase order information comprising a purchase order digital math-based asset quantity and a corresponding purchase order fiat amount; (v) verifying, by the digital math-based asset computer system, that first fiat account balance data indicating a first fiat account balance of a purchaser insured fiat account associated with the institutional exchange account at least equals the purchase order fiat amount; (vi) storing, by the digital math-based asset computer system in the orders database, the first purchase order information; (vii) receiving, at the digital math-based asset computer system, from a second user electronic device associated with a second exchange account, a first electronic digital math-based asset sell order comprising first sell order information comprising a sell order digital math-based asset quantity and a corresponding sell order fiat amount; (viii) verifying, by the digital math-based asset computer system, that first digital math-based asset account balance data indicating a first digital math-based asset account balance of a seller digital math-based asset account associated with the second exchange account at least equals the sell order quantity; (ix) storing, by the digital math-based asset computer system in the orders database, the first sell order information; (x) matching, by the digital math-based asset computer system, the first electronic digital math-based asset purchase order with the first electronic digital math-based asset sell order; (xi) generating, by the digital math-based asset computer system, machine-readable transaction instructions for an exchange transaction having a transaction digital math-based asset quantity satisfying the first electronic digital math-based asset purchase order and the first electronic digital math-based asset sell order; and a transaction fiat amount satisfying the first electronic digital math-based asset purchase order and the first electronic digital math-based asset sell order; and (xii) executing, by the digital math-based asset computer system, the machine-readable transaction instructions by updating the electronic ledger by decreasing, by the transaction fiat amount, the first fiat account balance data corresponding to the purchaser insured fiat account; increasing, by the transaction fiat amount, second fiat account balance data corresponding to a seller insured fiat account associated with the second exchange account; decreasing, by the transaction digital math-based asset quantity, the first digital math-based asset account balance data corresponding to the seller digital math-based asset account; and increasing, by the transaction digital math-based asset quantity, second digital math-based asset account balance data corresponding to a purchaser digital math-based asset account associated with the institutional exchange account.

In embodiments, an insured omnibus fiat account may comprise a plurality of the associated insured fiat accounts. In embodiments, at least one insured fiat account may be insured by the Federal Deposit Insurance Corporation. In embodiments, a digital wallet may hold digital math-based assets corresponding to a plurality of the digital math-based asset accounts.

In embodiments, the method may further comprise the step of transmitting, from the digital math-based asset computer system, an electronic transaction confirmation. In embodiments, an electronic transaction confirmation may be transmitted to the first user electronic device. In further embodiments, an electronic transaction confirmation may be transmitted to the second user electronic device. In still further embodiments, an electronic transaction confirmation may be transmitted to the second user electronic device to a computer system associated with an institution associated with the exchange institutional account.

In embodiments, the security systems and methods described herein may be used, e.g., as security protocols, associated with various financial products, such as a derivative product, an exchange traded derivative product, a fund, a company, an exchange traded fund, a note, an exchange traded note, a security, a debt instrument, a convertible security, an instrument comprising a basket of assets including one or more digital math-based assets, and/or an over-the-counter product.

In embodiments, an apparatus may be programmed to perform the following steps: receiving, at the apparatus via a user input device, first user identification data comprising at least a state of domicile; transmitting, from the apparatus to an exchange computer system, the first user identification data; receiving, at the apparatus from the exchange computer system, first display data related to an anti-money laundering user data collection interface based upon the state of domicile; rendering, by the apparatus on a display device operatively connected to the apparatus, the first display data; receiving, at the apparatus via the user input device, second user identification data corresponding to the anti-money laundering user data collection interface; transmitting, from the apparatus to the exchange computer system, the second user identification data; receiving, at the apparatus from the exchange computer system, second display data related to a registration confirmation; and rendering, by the apparatus on the display device, the second display data.

In embodiments, such an apparatus may be an electronic kiosk. In embodiments, such an apparatus may be a user device, such as a smart phone, tablet computer, and/or computer.

In embodiments, the apparatus may be further programmed to perform the steps of receiving, at the apparatus from the exchange computer system, third display data related to exchange transaction options; rendering, by the apparatus on the display device, the third display data; receiving, at the apparatus via a user input device, a selection of an exchange transaction option related to a fiat withdrawal and a corresponding transaction request comprising at least a fiat withdrawal amount; and transmitting, from the apparatus to the exchange computer system, the transaction request.

In embodiments, an apparatus programmed to perform the following steps: receiving, at the apparatus via an input device, user account credentials; transmitting, from the apparatus to the exchange computer system, the user account credentials; receiving, at the apparatus from the exchange computer system, first display data corresponding to a plurality of exchange transaction options for an authenticated user; rendering, by the apparatus, the first display data on a display device operatively connected to the apparatus; receiving, at the apparatus via the input device, user selections corresponding to a first exchange transaction option that is an exchange transaction order; receiving, at the apparatus via the input device, exchange transaction order parameters; transmitting, from the apparatus to the exchange computer system, the exchange transaction order parameters; receiving, at the apparatus from the exchange computer system, second display data corresponding to order placement confirmation; and rendering, by the apparatus, the second display data on the display device.

While the present application primarily discusses digital currency, the proof of custody method discussed herein may be used in conjunction with other products as well. Proof of custody systems and methods discussed herein, may be implemented for any type of financial product or service in which custodial wallets are used. Other embodiments of the present invention may also be used in conjunction with other financial products, such as using pricing discussions involving indices created with blended digital asset prices and/or auctions as benchmarks for financial products, such as exchange traded notes, futures products (such as options), derivative products (such a puts and calls), other indices (such as volatility indices), swaps, currencies, fixed income products, bonds, securities, equities to name a few.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A computer-implemented method comprising the steps of:

(a) generating, by a trust computer system, script instructions to carry out a transaction involving one or more digital wallets held in a trust custody account so as to verify control of digital assets held in the one or more digital wallets, the trust computer system being operatively connected to a decentralized digital asset network that uses a decentralized electronic ledger in the form of a blockchain maintained by a plurality of physically remote computer systems to track at least one of asset ownership or transactions in a digital math-based asset system, the step of generating script instructions comprises:

(i) accessing a statement associated with an event that occurred within a predetermined time frame;

(ii) determining whether the statement fits within memo field length constraints of a script associated with a digital asset type corresponding to the digital assets;

(iii) if the determining step (ii) indicates that the statement fits within the memo field length constraints, maintaining the statement in its original form; and (iv) if the determining step (ii) indicates that the statement does not fit within the memo field length constraints, generating a cryptographic hash of the statement;

(b) generating, by the trust computer system, based on the script instructions, a transaction with the following parameters:

(i) a first input of a first amount of digital assets from a digital asset account associated with the trust custody account as accessed through the decentralized digital asset network using a trust custody account digital asset account identifier;

(ii) a first output of a second amount of digital assets to the digital asset account associated with the trust custody account as accessed through the decentralized digital asset network using the trust custody account digital asset account identifier, the first amount of digital assets being equal to the second amount of digital assets;

(iii) a second input of a third amount of digital assets from a digital asset account associated with an operating account as accessed through the decentralized digital asset network using an operating account digital asset account identifier;

(iv) a second output of a fourth amount of digital assets to the digital asset account associated with the operating account as accessed through the decentralized digital asset network using the operating account digital asset account identifier, the fourth amount of digital assets being reduced relative to the third amount by a transaction fee amount;

(v) a third output that comprises the statement in a memo field;

(vi) applying a digital signature to the transaction using a private key associated with the trust custody account;

(c) broadcasting, by the trust computer system to the decentralized digital asset network, the transaction to be recorded in the decentralized electronic ledger;

wherein the decentralized digital asset network processes the transaction;

(d) verifying, by the trust computer system, the transaction to confirm that the transaction was recorded in the decentralized electronic ledger.

2. The computer-implemented method of claim 1, wherein the determining step (ii) indicates that the statement does not fit within the memo field length constraints and the third output comprises the statement as the cryptographic hash.

3. The computer-implemented method of claim 1, wherein the statement is a news headline.

4. The computer-implemented method of claim 1, wherein the predetermined time frame is a most recent time period as measured backwards from a present time.

5. The computer-implemented method of claim 1, wherein the trust computer system is associated with an administrative computer system of at least one of the following types of financial markets: futures exchange, commodities exchange, currency exchange, spot exchange and lending exchange.

6. The computer-implemented method of claim 1, wherein the trust computer system is associated with an administrative computer system of at least one of the following types of investment funds: exchange traded fund and mutual fund.

7. The computer-implemented method of claim 1, wherein the digital math-based asset is bitcoin.

8. The computer-implemented method of claim 1, wherein the digital math-based asset is based on a mathematical protocol for proof of work.

9. The computer-implemented method of claim 8, wherein the mathematical protocol is open source.

10. The computer-implemented method of claim 8, wherein the mathematical protocol includes a one-way cryptographic algorithm.

11. The computer-implemented method of claim 8, wherein the mathematical protocol includes a sequential hard memory function.

12. The computer-implemented method of claim 1, wherein the digital math-based asset is based on a mathematical protocol for proof of stake.

13. The computer-implemented method of claim 12, wherein the mathematical protocol is open source.

14. The computer-implemented method of claim 12, wherein the digital math-based asset is based on a cryptographic mathematical protocol.

15. The computer-implemented method of claim 1, wherein the digital math-based asset is based on a mathematical protocol for a hybrid of proof of work and proof of stake.

16. The computer-implemented method of claim 1, wherein the digital math-based asset is based on a mathematical protocol for proof of stake velocity.

17. The computer-implemented method of claim 1, wherein the mathematical protocol relies upon ownership of respective digital math-based asset as a function of duration of ownership.

18. The computer-implemented method of claim 1, wherein the digital math-based asset is based on a mathematical protocol for proof of burn.

19. The computer-implemented method of claim 1, wherein a number of digital math-based assets in the decentralized digital assert network is limited.

20. The computer-implemented method of claim 1, wherein a number of digital math-based assets in the decentralized digital assert network is not limited.

21. The computer-implemented method of claim 1, wherein a specified number of digital math-based assets in the decentralized digital assert network is added into circulation during a defined time period.

22. The computer-implemented method of claim 1, wherein the step of generating, by a trust computer system, script instructions is initiated in response to a request for proof of control from a verifier computer system that sends a pre-selected statement to the trust computer system.

23. The computer-implemented method of claim 22, wherein the verifier computer system is an auditor computer system.

24. The computer-implemented method of claim 22, further comprising the steps of:

(e) accessing, by the verifier computer system, a plurality of updates to the decentralized electronic ledger;

(f) analyzing, by the verifier computer system, each of the plurality of updates for a confirmation of receipt, by a node in the decentralized digital asset network, of the third output; and (g) determining, by the verifier computer system, whether the statement in the third output is correct by comparing the statement with the pre-selected statement.

* * * * *